US005396339A

United States Patent [19]

Stern et al.

[11] Patent Number: 5,396,339

[45] Date of Patent: Mar. 7, 1995

[54] REAL-TIME DISK SYSTEM

[75] Inventors: John Stern, Menlo Park; Jose Alvarez, Sunnyvale; Luigi Gallo, Woodside; Douglas J. George, San Jose, all of Calif.

[73] Assignee: Accom, Inc., Menlo Park, Calif.

[21] Appl. No.: 803,502

[22] Filed: Dec. 6, 1991

[51] Int. Cl.[6] .......... G11B 7/00

[52] U.S. Cl. .......... 358/342

[58] Field of Search .......... 358/335, 342, 310, 105, 358/140, 11; 360/51, 26, 32, 53, 39, 35.1

[56] References Cited

U.S. PATENT DOCUMENTS

| | | | |
|---|---|---|---|
| 4,602,296 | 7/1986 | Murakoshi | 360/10.1 |
| 4,724,495 | 2/1988 | Hedberg et al. | 360/22 |
| 4,823,196 | 4/1989 | Goddard | 358/342 |
| 4,963,991 | 10/1990 | Honjo | 358/310 |
| 4,987,489 | 1/1991 | Hurley et al. | 358/105 |
| 5,084,789 | 1/1992 | Kamo et al. | 360/53 |
| 5,105,313 | 4/1992 | Stewart | 360/10.3 |

*Primary Examiner*—Tommy P. Chin
*Assistant Examiner*—Robert Chevalier
*Attorney, Agent, or Firm*—Flehr, Hohbach, Test, Albritton & Herbert

[57] ABSTRACT

A real-time disk system (10) stores and plays back D1 digital 10-bit 4:2:2 component video and audio signals from magnetic storage disks (12). The system (10) has a main channel subsystem (14) with an associated smooth motion option (16) and a second or key channel option subsystem (18) with an associated smooth motion option (20). Serial and parallel D1 digital video inputs (30) and (32) and outputs (34) and (36) are connected to each of the channels (14) and (18) and to control subsystem (22). In the main channel (14), the serial and parallel D1 input (30) is connected through an input board (60) to a video processing board (62). The video board (62) is connected by a bidirectional, 11×2 wide bus (64) to disk arrays (66) and (68). Digital video signal information is stored and retrieved in parallel to and from the disk arrays (66) and (68) without requiring any serial to parallel or parallel to serial conversion. Smooth motion option (20) processes a group of video fields by creating a plurality of additional fields between two original fields in the group of video fields by a combination of motion adaptive interpolation and frame repetition.

11 Claims, 33 Drawing Sheets

RTD 4224 SYSTEM CONFIGURATION

FIG. 2 RTD 4224 SYSTEM

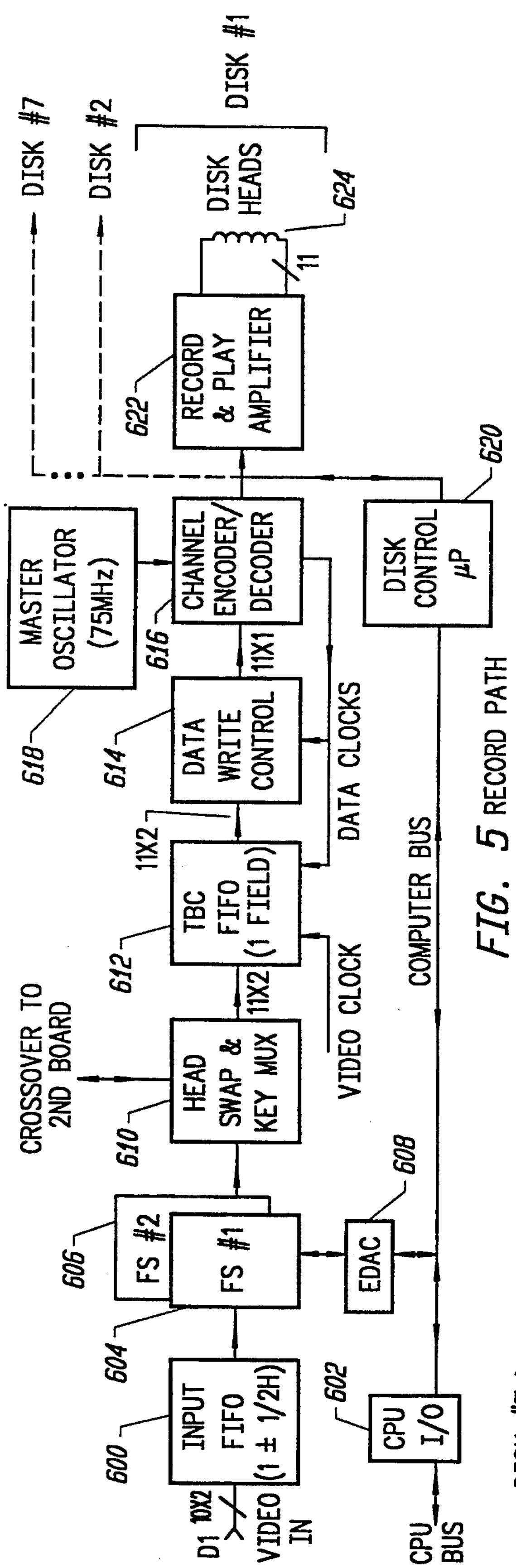
FIG. 5 RECORD PATH
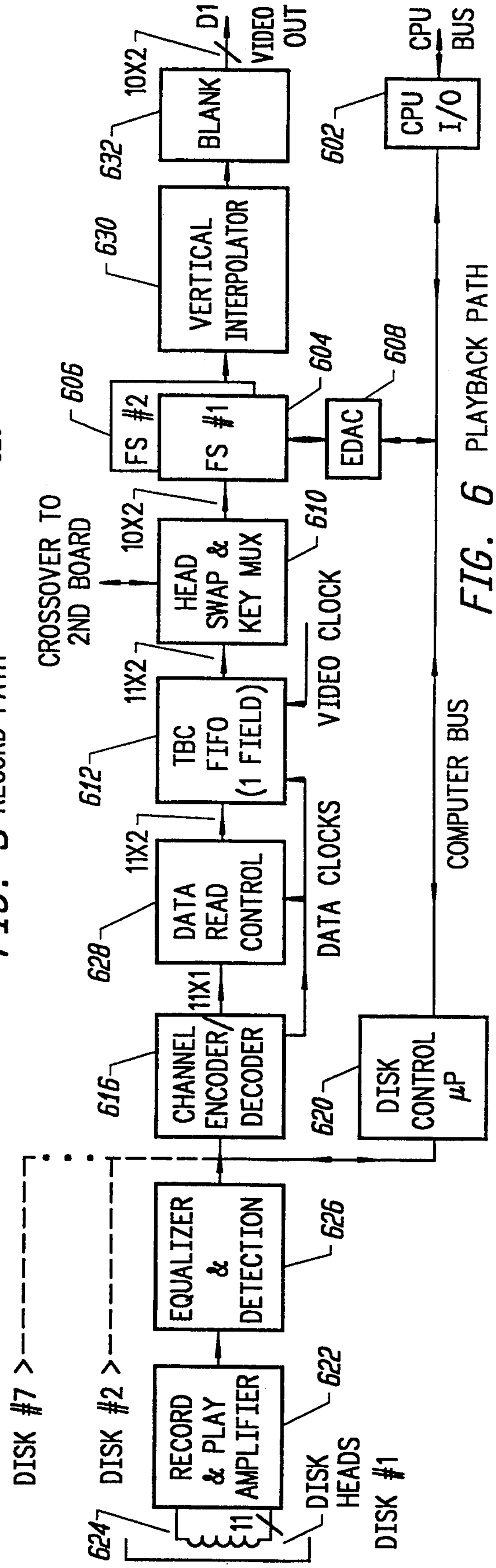
FIG. 6 PLAYBACK PATH

SMOOTH MOTION PROCESSOR WITH FEATURES

| | K1 | K2 | K3 | K4 | SW1 | SW2 | NLTF | DELAY |
|---|---|---|---|---|---|---|---|---|
| SMO-MO | +1 | −1 | +1 | n/N<br>−n/N | C | B<br>A | 1−M | 2·FS |
| DNR | −1 | +1 | +1 | +1 | D | A | 1−M | 1·FS |
| AVG | 1/N | +1 | 0 | +1 | D | 0 | 1 | N·FS |
| TRANSP | 0 | 0 | 0 | 0 | C | A | 1 | 1·FS |
| N-FRAME INTEGRATE | +1 | +1 | 0 | +1 | D | 0 | 1 | N·FS |

| | K1 | K2 | SW1 | SW2 | DELAY |
|---|---|---|---|---|---|
| SMO-MO | +1 | −1 | C | B A | 2·FS |
| DNR | −1 | +1 | D | A | 1·FS |
| AVG | I/N | +1 | D | 0 | N·FS |
| TRANSP | 0 | 0 | C | A | 1·FS |
| N-FRAME INTEGRATE | +1 | +1 | D | 0 | N·FS |

26

MENU #5
SEGMENT EDIT

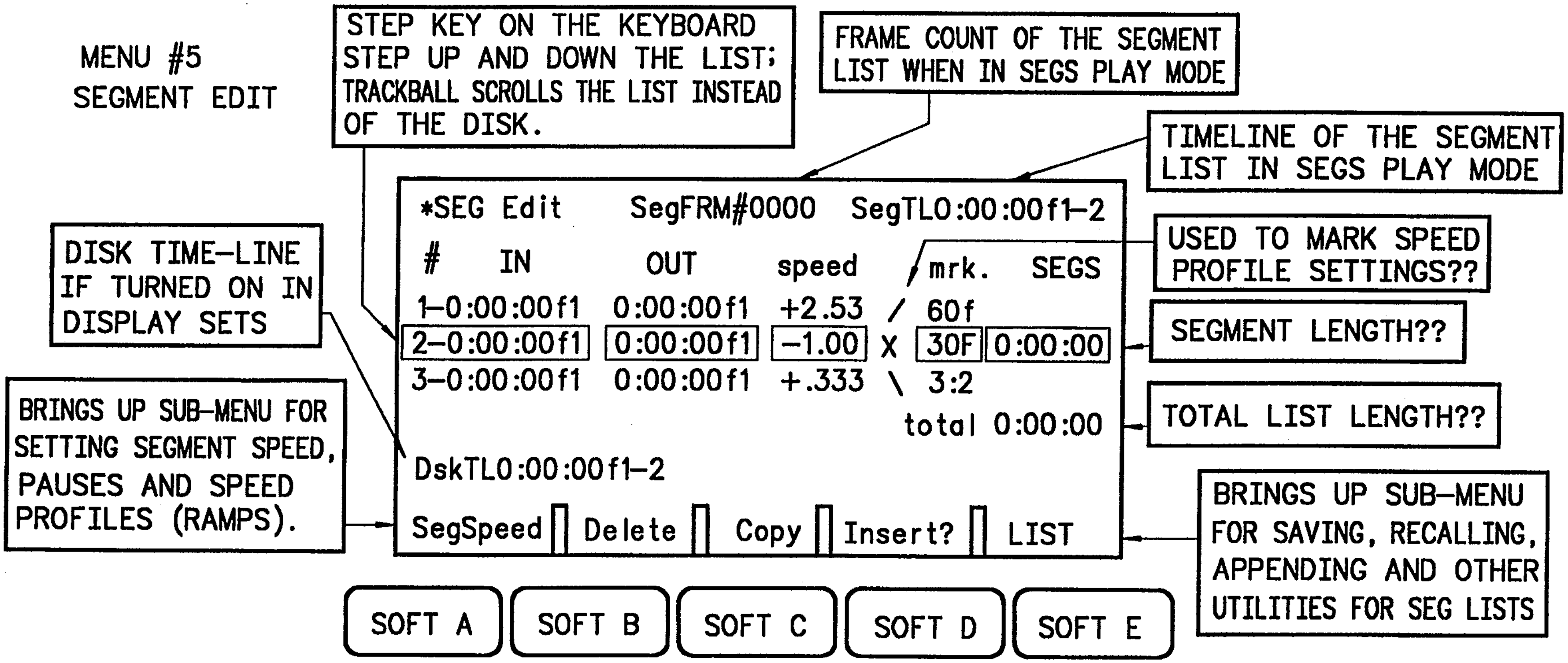

NOTE: IN NORM MODE "SEG INSERT" KEY INSERTS A NEW SEGMENT AT THE END OF THE LIST. IN SEG EDIT MODE, "SEG INSERT" INSERTS A SEGMENT AHEAD OF THE HIGH-LIGHTED SEGMENT. "DELETE" WILL REMOVE A SEGMENT, BUT THE SEGMENT PARAMETERS NEED TO BE HELD IN A TEMP BUFFER. WHEN IN SEG EDIT, "DELETE" FOLLOWED BY "SEG INSERT" IS USED TO MOVE A SEGMENT FROM ONE PLACE IN THE LIST TO ANOTHER. "COPY PUTS THE HIGH-LIGHTED SEGMENT PARAMETERS IN THE TEMP BUFFER.

SAVE LIST
RECALL LIST
APPEND LIST
LIST LENGTH

FIG. 17E

REAL-TIME DISK SYSTEM

BACKGROUND OF THE INVENTION

1. Field of the Invention

The present invention relates generally to a system that can record or play short segments of digital component video on specially-modified computer disk storage media. More particularly, it relates to such a system in which the video segments are stored and retrieved directly in parallel from the disk storage media without serial-to-parallel or parallel-to-serial conversion of a video signal stream. It further relates to such a system that can be expanded two dimensionally for multiuser and larger capacity requirements. It further relates to such a system incorporating smoothed motion.

2. Description of the Prior Art

It is known to record video on magnetic disks in order to be able to retrieve and display stored video images in real time. Commercially available real-time disk systems are available from Abekas and Quantel. The Quantel product is described in U.S. Pat. No. 4,668,106, issued Aug. 18, 1987 to Keller et al. The system disclosed by Keller et al. uses parallel-transfer disks to record 4:2:2 D1 digital video images. However, the number of parallel data channels on the disk does not match the number of bits in a pixel. A complicated parallel to serial converter is therefore required to record on disk. U.S. Pat. Nos. 4,638,381; 4,647,986 and 4,674,064, issued Jan. 20, 1987, Mar. 3, 1987 and Aug. 18, 1987 to Vaughn, Vaughn et al. and Vaughn disclose a parallel-transfer disk system for real-time recording of digitized X-rays, but this system also does not have the same number of parallel data channels on the disk as the number of bits in a pixel. It therefore also requires a very complicated serial-to-parallel and parallel-to-serial converter.

A system for generating interlaced slow motion video by spatial and temporal interpolation is described in U.S. Pat. No. 4,987,489, issued Jan. 22, 1991 to Hurley et al. In this system, successive fields of an input video signal are stored in field stores and are spatially interpolated as well as temporally filtered to produce new fields depending on the amount of motion detected in a scene.

SUMMARY OF THE INVENTION

Accordingly, it is an object of this invention to provide a real-time disk system in which video images are stored on a disk and retrieved from the disk in parallel signal streams without requiring any parallel to serial or serial to parallel conversion.

It is another object of the invention to provide such a real-time disk system that can be expanded two dimensionally for multiuser and larger capacity requirements.

It is a further object of the invention to provide such a system incorporating smoothed slow motion utilizing motion-adaptive temporal-linear interpolation and frame repetition to produce a smooth fade over between two frames.

It is still another object of the invention to provide a video processing system with smoothed slow motion which is able to perform film-to-video transfers.

It is a still further object of the invention to provide such a video processing system with smoothed slow motion which provides film-to-video transfers with reduced jitter and judder artifacts.

The attainment of these and related objects may be achieved through use of the novel real-time disk system herein disclosed. A real-time disk system in accordance with this invention has a video processor connected by a plurality of parallel data channels to a disk storage means having a like plurality of storage surfaces and a like plurality of interface circuits. One of the like plurality of interface circuits is connected between one of the plurality of parallel data channels and one of the like plurality of storage surfaces.

An improved video processing system in accordance with the invention has a means for smooth motion processing a group of video fields by creating a plurality of additional fields between two original fields in the group of video fields by a combination of motion adaptive interpolation and frame repetition.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 5 and 6 are flow charts showing operation of the system of Figures 1–4 for recording and playing back video images.

DETAILED DESCRIPTION OF THE INVENTION

Figure 1:
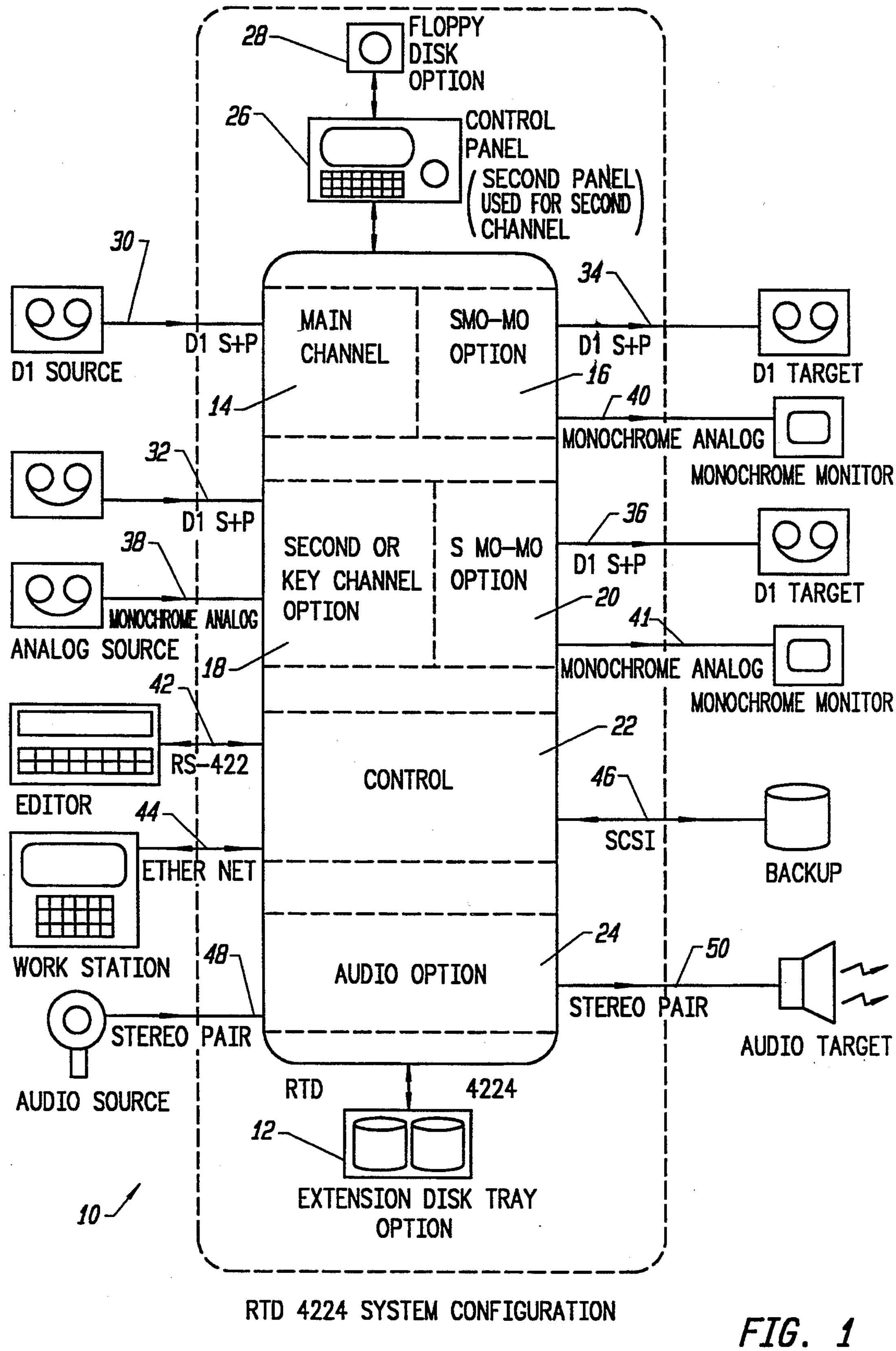
FIG. 1 is a block diagram of a real-time disk system in accordance with the invention.

Turning now to the drawings, more particularly to FIG. 1, there is shown a real-time disk system 10 for storing and playing back D1 digital 10-bit 4:2:2 component video and audio signals from magnetic storage disks 12. D1 is a shorthand notation for the RP-125 525 lines/frame digital video standard, and the compatible EBU 601/656 625 lines/frame standard. The system 10 has a main channel subsystem 14 with an associated smooth motion option 16 and a second or key channel option subsystem 18 with an associated smooth motion option 20. A control subsystem 22 is connected to the main channel subsystem 14 and the second channel subsystem 18. An audio option subsystem 24 is also connected to the control subsystem 22. A control panel 26 and associated floppy disk option 28 for the channel 14 are connected to the control subsystem 22. A second control panel and associated floppy disk option (not shown) for the channel 18 are also connected to the control subsystem 22.

Serial and parallel D1 digital video inputs 30 and 32 and outputs 34 and 36 are connected to each of the channels 14 and 18 and to the control su. bsystem 22. Monochrome analog input 38 and monochrome analog output 40 and 41 are also connected to the channels 14 and 18 and to the control subsystem 22. Bidirectional RS-422 port 42, Ethernet port 44 and SCSI port 46 are connected to the channels 14 and 18 and to the control subsystem 22. An audio input 48 and an audio output 50 are connected to the control subsystem 22 and to the audio option subsystem 24.

The audio option subsystem 24 includes two high quality audio tracks to provide the audio reference for video editing. The tracks have analog inputs and outputs and are stored digitally. The audio normally plays synchronously with the video but can be slipped (offset). The audio tracks are meant for editing reference, and no capability is provided for audio editing.

In use of the system 10, video is meant to be chopped up and reassembled during the editing process, while the audio must stay intact. The audio is therefore stored on its own, standard computer disk in the disks 12.

Figure 2:
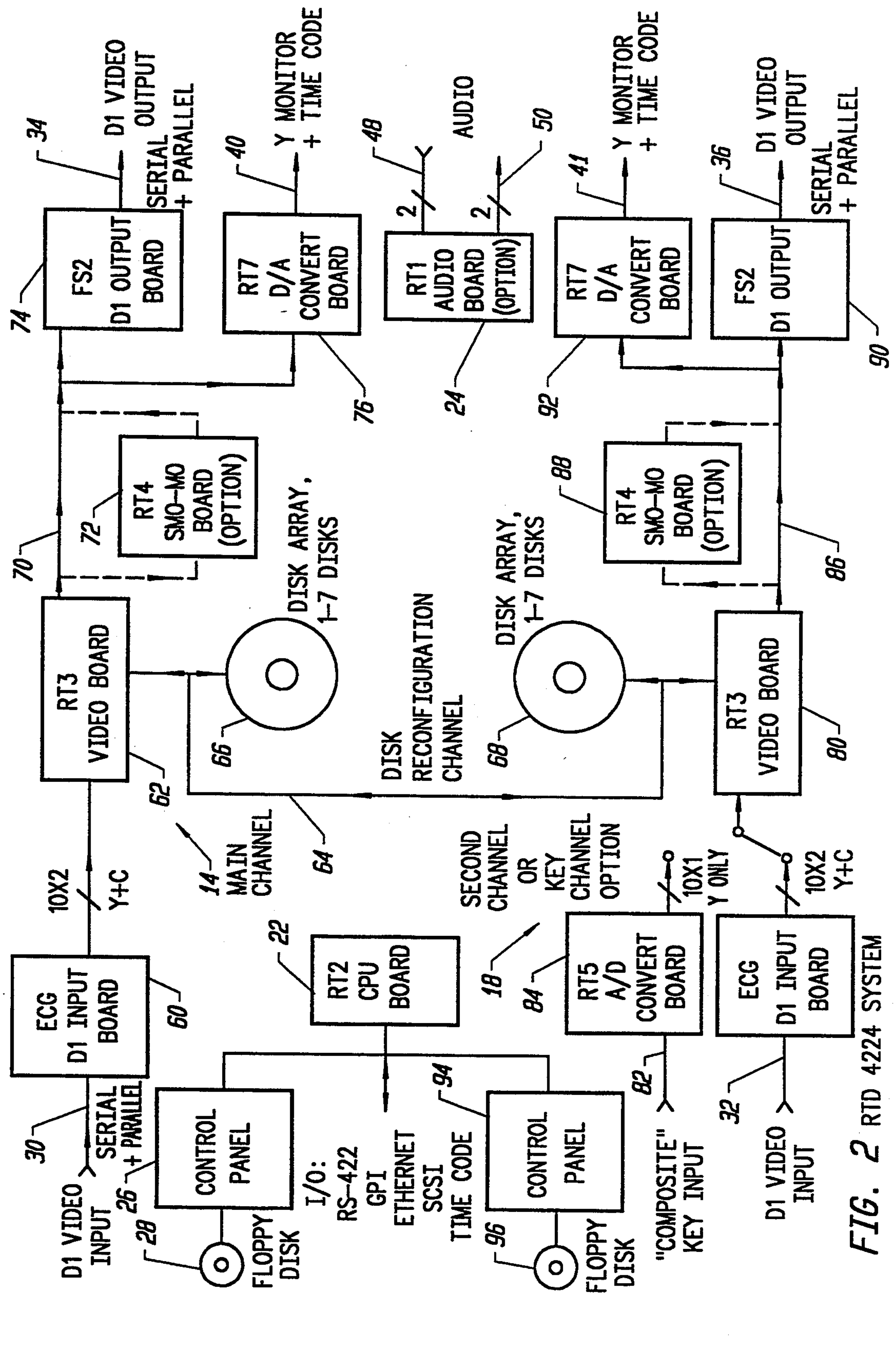
FIG. 2 is a more detailed block diagram of a first portion of the system shown in FIG. 1.

FIG. 2 shows details of the main channel subsystem 14 and the second or key channel subsystem 18. In the main channel 14, the serial and parallel D1 input 30 is connected through an input board 60 to a video processing board 62. The video board 62 is connected by a bidirectional, 11×2 wide bus 64 to disk arrays 66 and 68. Output 70 of the video board 62 is connected to optional smooth motion processing board 72, D1 output board 74 and digital to analog (D/A) conversion board 76. Outputs 34 and 40 are respectively provided by the boards 74 and 76.

In the second or key channel, the serial and parallel D1 input 32 is connected through an input board 78 to a video processing board 80. A composite key input 82 is also selectively connected to the video processing board 80 through an A/D converter board 84. The video board 80 is also connected by the bidirectional, 11×2 wide bus 64 to the disk arrays 66 and 68. Output 86 of the video board 80 is connected to optional smooth motion processing board 88, D1 output board 90 and digital to analog (D/A) conversion board 92. Outputs 36 and 41 are respectively provided by the boards 90 and 92.

Control or CPU board 22 is connected to control panel 26 for the main channel 14 and control panel 94 for the second channel 18. Control panel 26 is connected to floppy disk drive 28, and control panel 94 is connected to floppy disk drive 96.

Figure 3:
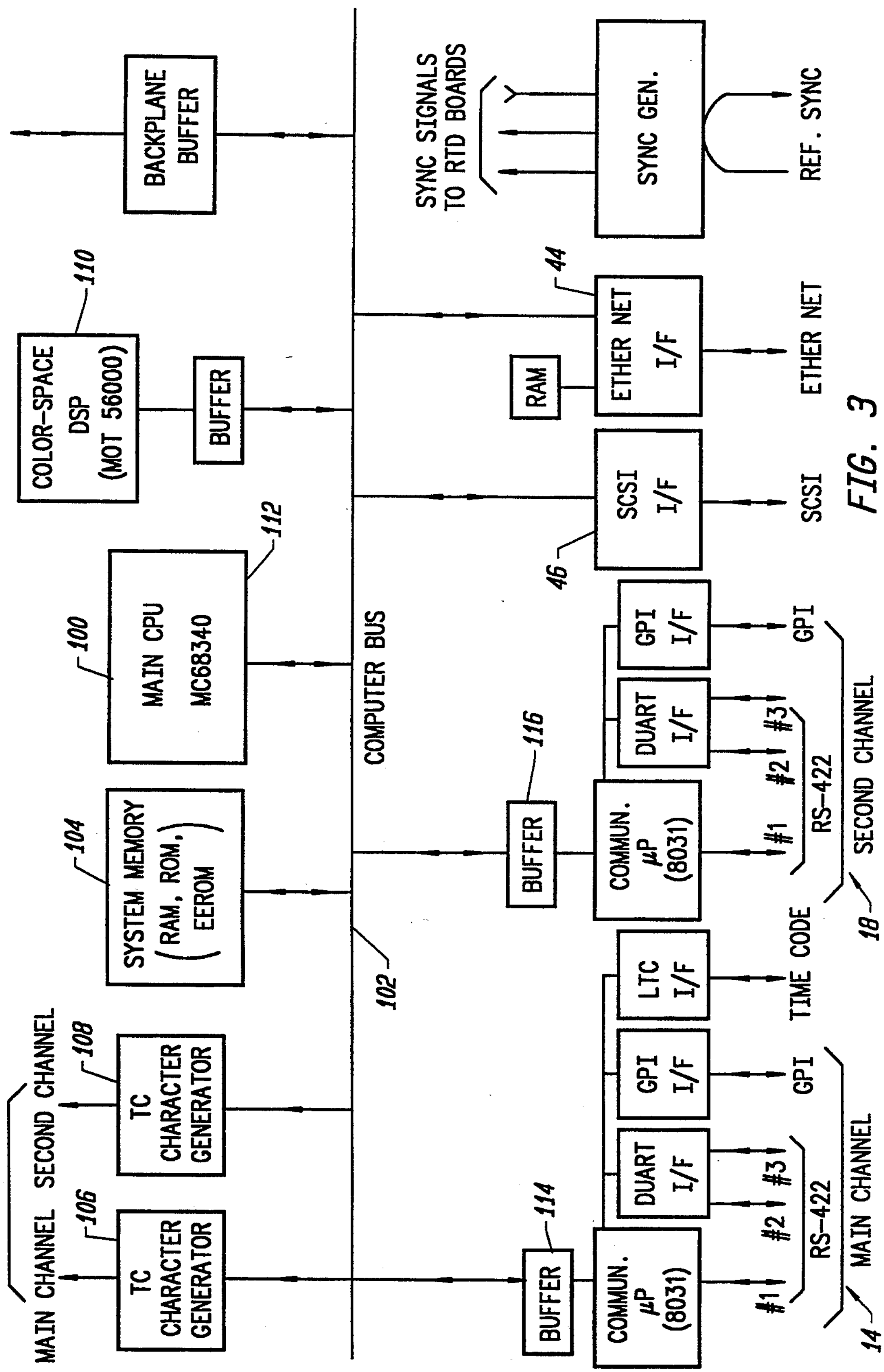
FIG. 3 is a more detailed block diagram of a second portion of the system shown in FIG. 1.

Details of the control or CPU board 22 are provided in FIG. 3. A main CPU 100, implemented with a Motorola 68340 type microprocessor, is connected bidirectionally to a computer bus 102. System memory 104, comprising RAM, ROM and EEROM, is also connected bidirectionally to the bus 102. Time code overlay generators 106 and 108 for the main channel 14 and second channel 18 are connected to the bus 102, and provide a time-code character generation facility impressed over the analog monitor outputs.. A color space digital signal processor 110, implemented with a Motorola 56000 type DSP processor, is connected to the bus 102 bidirectionally through buffer 112. Main channel 14 is connected to the bus 102 bidirectionally through buffer 114, and second channel 18 is connected to the bus 102 bidirectionally through buffer 116. SCSI and Ethernet ports 46 and 44 are also connected to the bus 102. The control subsystem 22 is configured for variable speed operation in both the forward and reverse directions.

Figure 4:
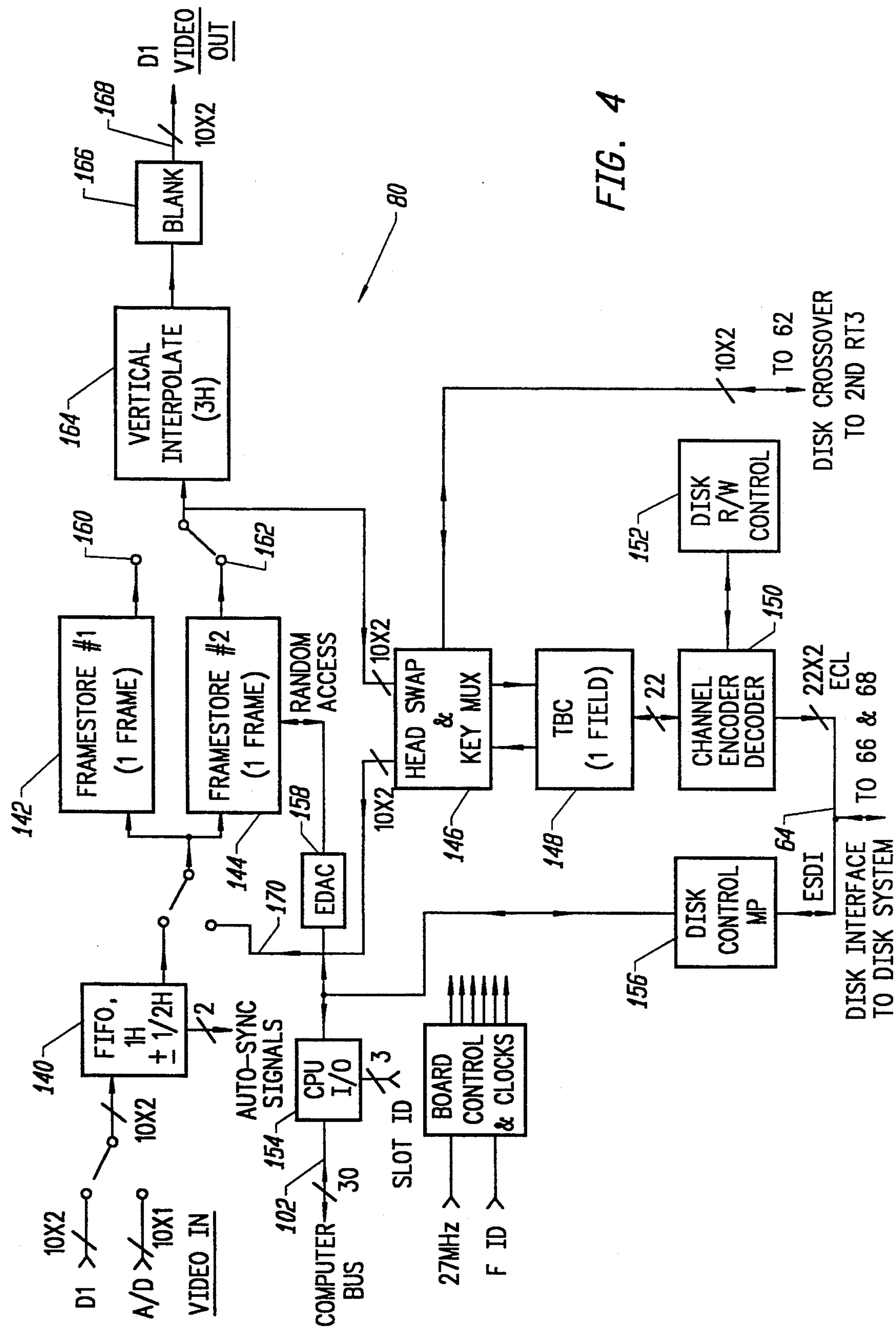
FIG. 4 is a more detailed block diagram of a third portion of the system shown in FIG. 1.

Details of the video board 80 are shown in FIG. 4. The video board 62 is essentially a duplicate of the video board 80, with omission of the input from the A/D converter board 84. The outputs from D1 input board 78 and A/D converter board 84 (FIG. 2) are supplied through a FIFO memory 140 selectively to framestores 142 and 144. The head swap and key multiplexer 146 connects either to input or output of framestores 142 and 144, and to the video board 62 and to a time base corrector 148. The time base corrector 148 is connected to the disks 66 and 68 through a channel encoder/decoder 150. A disk read/write control 152 is also connected to the encoder/decoder 150.

The computer bus 102 (see also FIG. 3) is connected through a CPU input/output circuit 154 and a disk control microprocessor 156 with an ESDI interface to the disks 66 and 68. The computer bus 102 is also connected to the framestores 142 and 144 through an EDAC (Error-Detection And Correction) block 158 for random access to the framestores.

Outputs 160 and 162 from the framestores 142 and 144 are selectively connected to a vertical interpolator 164. The vertical interpolator 164 is connected to a blanking circuit 166. Output 168 of the blanking circuit 166 is D1 video. The outputs 160 and 162 from the framestores 142 and 144 are also selectively connected to the multiplexer 146 to provide inputs to the disks 66 and 68. Outputs from the disks 66 and 68 are provided through the multiplexer 146 at 170 and through the framestores 142 and 144.

In order to store and retrieve digital video signal information in parallel, without requiring any serial to parallel or parallel to serial conversion, the disk systems 66 and 68 must meet certain requirements. A D1 video signal in its native form runs at 27 Mwords/s in both 525 lines/frame (U.S. standard) and 625 lines/frame (European standard), and each word comprises 8–10 bits depending on the application. When a D1 signal is time-compressed to eliminate unneeded horizontal and vertical blanking intervals (but not data-compressed), it runs at a rate of 21 Mwords/s. This rate allows sufficient vertical-interval information to record DVITC (Digital Vertical-Interval Time Code). A 10-bit time-compressed D1 signal thus runs at 26 MBytes/s, and the storage target of 30 seconds of D1 video consumes 784 MBytes. This points to using a standard 1–1.2 GByte disk drive to meet the storage capacity requirement, and modifying it to meet the bandwidth requirement.

The real-time disk system starts with a standard 1.2 GByte, $5\frac{1}{4}''$ magnetic Winchester disk drive, with ESDI interface. The disk has 6 individual platters, which present 12 recording surfaces. In ordinary disk practice, 1 surface is dedicated to servo use and the remaining 11 surfaces are read or written one at a time. But for real-time disk use, the disk is modified to access all 11 data channels at once, each with its own preamplifier, equalization, and channel encoder/decoder. This increases the disk bandwidth by a factor of 11, which is sufficient to support the aggregate data rate of 21 Mwords/s.

Each disk consists of 1923 cylindrical tracks, hereafter referred to as cylinders, and each cylinder spans 11 recording surfaces to present an 11-bit parallel signal. A cylinder has both the capacity and bandwidth to store 1 TV field of 4:2:2 video, so 1923 cylinders yield slightly in excess of 30 seconds of video in 525 L/F. The disk spins at the precise rate of 1 revolution per TV field, which is 3600 RPM in 525 and 3000 RPM in 625. The time to hop from a cylinder to its nearest neighbor, known as seek time (about 3 ms), is just short enough to allow recording of real-time 4:2:2 video in a contiguous fashion, but too long to perform "random-access" by seeking to an arbitrary cylinder. Therefore to perform true random-access record & playback, at least 2 disks in tandem are required. A video caching technique to make use of multiple disks is described below. Because this seeking process takes time that could otherwise be spent recording data, the data rate is boosted from 21 Mwords/s to 25 Mwords/s to account for this dead time.

The 1.2 GByte drives come with a standard ESDI interface whose primary use in the real-time disk is control of seeking and spindle-lock. An ESDI interface supports a maximum of 7 disks in tandem. 7 disks give $3\frac{1}{2}$ minutes of record and play time as the upper limit of an expanded system, but this limit can be doubled through the disk reconfiguration technique. This technique allows 2 RT3 video boards in a single real-time disk system to share their disk dam through an auxiliary reconfiguration channel.

Each picture has a data header recorded with it, containing such information as time-code, 525/625, field count, etc. Each disk has in addition 2 cylinders devoted to overall "directory" information. This is termed the disk header below, as distinguished from the individual picture headers.

The 11-bit signal is recorded raw, not error-corrected. To provide some measure of error-protection, the 11th channel is used to "pinch-hit" for any of the 10 data channels with a hard error, on a cylinder-by-cylinder basis. The majority of cylinders do not require any channels skipped since the number of disk defects is low. The chances of 2 or more channels with hard errors is minuscule; should this situation be encountered, then the channel corresponding to the more significant bit is skipped in favor of the spare (11th ) surface. All disk cylinders are expected to be ultimately usable. A table governing the use of surface-skipping is placed at the disk header of each drive, determined when the disk is first formatted.

Pictures recorded in 525 may not be played back directly in 625, or vice-versa. This is because the same record clock is used in both standards, but since the disk rotational rate varies, the apparent played-back clock rate will be incorrect when the video standards are crossed.

Random Access and Disk Caching

A single disk does not allow true random-access playback of video, due to inordinate disk seek times that exceed the 3 ms allowed for continuous play. Therefore at least 2 disks are required to achieve random-access playback. There are two techniques available to record and play back video over multiple disks in such a fashion as to allow random-access playback of any imaginable sequence of video fields.

The first technique doles successive recorded fields onto each disk in succession in a "round-robin" manner. Thus with an even number of disks, random-access playback can be achieved as long as access takes place at a frame (field pair) boundary; 1 disk plays while another seeks. However, this technique can fail with an odd number of disks, for 2 successive fields may now reside on the same disk, but widely separated.

The second technique, known as disk caching, records a clip (sequence of fields) onto the first logical disk in the system for as long as possible, then records on the second disk for as long as possible, and so on. However, not all disk cylinders are given up for recording, rather a small number are reserved for caching. On playback, if 2 fields are required that reside on a common disk but cannot be fetched without excessive seek time, then before the playback is attempted caching is performed. Caching consists of writing an identical copy of the TV field which may not be reached in time onto another disk in its reserved cache area, so that during playback this second disk may provide the needed field without delay. A cached field may be required at each break in continuous play, and also at the end of a sequence if looping is to occur. Thus if a real-time disk user creates an edited video sequence consisting of N individual smaller sequences, then up to N cache fields may be required. A practical limit to this number N is 100, for edit segments are rarely composed of more than this many short segments. By reserving 100 cache field cylinders on each disk, out of 1923 cylinders at least 1800 are left for recording, and the 30 second record/playback goal is still met.

Disk caching has the disadvantage that, once an edit sequence is defined, a short time must elapse while the real-time disk automatically assembles its cache fields through hidden disk read/write operations. However, the caching technique holds two key advantages over the "round-robin" technique. First, caching works with any number of disks in a multiple-disk system, while round-robin works only with an even number. Second, caching records video sequences in contiguous fashion on disk while round-robin breaks them up immediately. If the disks are later reconfigured, for example a disk given up for key channel use, then large portions of an original recording are left intact and may still be played, while in round-robin all previous recordings are effectively lost.

The real-time disk basic unit can hold up to 3 disks in a disk tray, due to physical constraints. The disks can be allocated in any combination between main channel and second channel, by plugging cables appropriately, but the common configurations are listed below:

| | |
|---|---|
| 1 disk: | 30 seconds main channel, no random-access |
| 2 disks: | 60 seconds main channel, random-access, or; 30 seconds main and key, no random-access |
| 3 disks: | 90 seconds main channel, random-access, or; 60 seconds main and key, random-access |

To achieve more storage, extension disk trays are added with extension cables. The ESDI guidelines must be followed; no more than 7 disks total on either the main or second channel. Record/play time in a 2-channel system can be increased for either channel when the other channel is idle, by accessing the idle channel's disks through the disk reconfiguration channel. Record/play time can be further increased by connecting 2 or more units in tandem, with the video output of the first unit feeding the video input of the second unit, and so on. Control of the aggregate joined units is assumed through a single control panel, and the RS-422 control panel communication is chained from unit to unit.

The second channel when used as a key channel is assumed 4:0:0 (monochrome), and so recording will take place somewhat differently from the main 4:2:2 channel so as not to waste disk space. The key channel has its own data bus and disk system, separate from the main channel. Since the bandwidth of the key channel is ½ that of the main channel, only 5 bits at a time are recorded in either the 5 more-significant or 5 less-significant bit positions, for the entire cylinder. This multiplexing technique permits recording a second, independent TV field in the remaining 5 bit positions at a later time without disturbing the first recorded field. By recording field 1 of a frame in the upper 5 bit positions, and field 2 in the lower bit positions, a cylinder may hold an entire frame (field pair) of video. During playback, all 10 bits are played back. This effectively captures 1 frame during the time that only 1 field is needed. With this technique, random-access may be achieved with only 1 disk, for the second field may be displayed during the time the disk is seeking a distant cylinder.

Multiuser Capability

By utilizing the second channel to its full 4:2:2 capability, the disk system may support 2 independent users each with their own control panel and set of disks. This permits 3 modes of operation:

a) both users may operate completely independently, constrained only that both must work within the same video standard.

b) when one user is absent the other may have access to the entire disk system disk capacity, thus boosting his record/play time. The system is configured through the control system to let the sole user employ the disks of the absent user through the reconfiguration channel.

c) when one user is absent the other may have access to the second channel as an independent record/-play channel. This lets one channel record while the other channel is playing, for example, and thus allow multiple-generation image compositing by interposing an external compositing module between the played channel output and the simultaneous recorded channel input. After each pass the record/play role of each channel is swapped, and successive generations of compositing may be built up without loss of signal quality.

CPU board 22 controls the operation of both users by multitasking the control software.

Record Path

Referring to FIG. 6, Record Path. D1 4:2:2 video at 10 bit per pixel precision enters Input FIFO (first-in, first-out memory) 600 at the left. This FIFO affords a nominal 1 TV line delay ±½ TV line, to allow for potential input video mistiming. Video then enters one of 2 Framestores 604 or 606, which are used in a "ping-pong" manner to store alternate video frames. These framestores are constructed from 256K×4 VRAMs which permit either a single-bandwidth sequential video input or video output, as well as simultaneous random access through the CPU port. The random-access port of each framestore connects to the local computer bus through EDAC (error-detection-and-correction) block 608, and then to the main CPU bus through CPU interface block 602. Video from the framestores is output for viewing through vertical interpolator 630 and blanking circuit 632, shown in Playback Path (FIG. 6); no vertical interpolation is required while viewing this "live" video. The same framestore video is passe. d to disk Head-Swap and Key-Channel Multiplexing circuit 610. The function of this block is to repeat a disk data channel that might be unreliable onto the spare 11th data channel, to enhance overall data integrity, and also to cross-connect to another similar board through the Crossover channel to make use of that board's attached disks. Video of 11 bits per pixel emanates from 610, and passes to TBC (time-base correction) FIFO 612. This FIFO directly matches pixels at video rate (27 MHz) to the disk-channel data rate (25 MHz), and is ½ TV field ±½ field in depth. It consists of a single 1 field×4 bit FRAM (field random-access memory, part TI TMS4C1050) per pixel bit plane, 11 bit planes in all. The luminance (Y) and chrominance (C) signals from each bit plane then pass to Data Write Control PAL 614, which interleaves the Y and C into a single bit stream for recording, and also generates timing signals for Channel Encoder/Decoder 616. The Channel Encoder/Decoder is used as an encoder while recording, and is part SSI 32D5372 used one per bit plane. The Channel Encoder generates a (1,7) RLL (run-length-limited) channel code, which is an industry standard for magnetic disk recording. Since the (1,7) code generates 3 channel bits for every pair of dam bits, the Channel Encoder is fed with a 3× data clock of rate 75 MHz from Master Oscillator 618. The Disk Control microprocessor 620 generates the disk ESDI control signals. Both control signals and data signals are combined in a single cable to connect to the disk subsystems. Up to 7 disk subsystems may be attached, due to the ESDI control limit of 7 devices. Of the 7 possible disk subsystems, only 1 will be recording or playing back at any instant; the remainder will either be idle or seeking a distant cylinder. In the disk subsystem, the disk is modified to bring all 11 data head connections out, and each Disk Head 624 is supplied with its own Record and Play Amplifier 622, part SSI 32R4610.

High-level control for recording and playing is assumed by the system CPU 100 which controls the CPU bus. The Disk Control microprocessor 620 takes its instructions from the CPU in high-level description such as which disk subsystem to enable, which disk cylinder to seek, read vs. write, and so forth, and in turn both controls the ESDI bus at critical timing points so as not to overtax the system CPU and synchronizes the disk rotation rate to the video field rate. Each recorded cylinder is prefixed with identifying header information, which is written into Framestore 604 or 606 directly ahead of the video through the random-access port with EDAC 608 turned "on." The EDAC imparts a high degree of data confidence to the header information. The EDAC method consists of simply repeating each bit 5 times, then taking a majority-vote among the 5 received bits upon playback to decode. This EDAC method of repetition is very powerful, but seldom used in other engineering practice due to excessive redundancy. However in this application the redundant information is insignificant in relation to the sheer mass of video information contained within a single disk cylinder.

Playback Path

Referring to FIG. 6, Playback Path. Since the real-time disk system does not allow simultaneous record and playback of video, the same elements used in the record path are reconnected backward during playback, thus reducing system cost. Each of 11 Disk Heads 622 connects to Record and Play Amplifier 622, and the analog dam then sent to Equalizer and Detection stage 626, part SSI 32P541. Data detection is performed in a conventional way, and need not be described here. Disk Control microprocessor 620 plays the same role as it does during recording. Detected digital data is sent to Channel Encoder and Decoder 616, which locks a PLL (Phase-Locked Loop) to each data channel, and decodes the (1,7) RLL channel code. Data Read Control PAL 628 deinterleaves each data stream to recover Y and C separately, and passes Y and C to TBC FIFO 612 for time-base correction. Data out of the TBC FIFO, now at video rate, passes to Head-Swap and Key-Channel Multiplexing circuit 610 which substitutes the 11th data channel for any individual data channel previously deemed unreliable. Video data is now at 10 bits per pixel, and enters one of 2 Framestores 604 or 606, which are used again iri a "ping-pong" manner to store alternate video frames. The cylinder header information is recovered by reading the framestore holding the appropriate cylinder while turning "on" EDAC block 608, and reading the header information from the system CPU (not shown) through CPU Interface 602. Video from the framestores passes to Vertical Interpolator 630, whose function is to shift a field's video up or down ½ line to avoid the picture hopping experienced when a TV field is displayed during the opposite field time, i.e., an original TV field 1 displayed during TV field 2. This situation is termed *opposite interlace polarity*, and might arise, for example, when performing fast-motion playback by simply dropping TV fields. When no opposite interlace polarity is encountered, the Vertical Interpolator merely passes the video unaltered. From here the video passes through Blanking circuit 632, which performs horizontal and vertical blanking in accordance with the D1 standard, and then to the output.

Motion-Adaptive Smooth-Motion Processing Option

In this application, the SMO-MO Option is represented by devices 16 and 20 in FIG. 1. For the case of smooth motion portrayal, the new proposed system takes the concept of motion-adaptive standards converters a step forward by creating not one, but many new fields/frames in between two originals. The two original frames are not necessarily contiguous in time, but for most cases they will be since this is the way frames are stored in the real time disk.

The motion information is derived from localized absolute frame differences. Processing of the motion field starts by rectifying the frame differences and performing a two-dimensional filter in order to eliminate higher order aliasing frequencies that result naturally from rectification and rounding. This two-dimensional processing serves to transform the difference signal into a valid representation of motion.

The motion field signal serves as input to a non-linear transfer function which makes a dynamic soft-switch between two different processing modes. Such soft-switching characteristic is controlled by threshold parameters that can be set dynamically via external control.

For areas of the scene where strong motion is detected, new frames (in between) are created by repeating the previous or current original frame, with the aim of avoiding severe blur that would be caused by temporal interpolation. On the other hand, for areas where little motion is detected, the new frames are created via proportional temporal interpolation. It is assumed that there is little difference in these areas. From one frame to another, there would be virtually no loss of resolution or blurring caused by this processing. Temporal interpolation has the added advantage of providing noise reduction. The majority of cases will fall somewhere in between these two extremes; here, a combination of temporal interpolation and frame repetition will be done according to the value dictated by the non-linear transfer function. The net effect of this processing shall be to 'squeeze' the time display closer to the original frames and therefore providing quick but smooth transitions in areas of relative large motion, without the inconvenience ofjudder.

Devices 16 and 20 in FIG. 1 can be configured dynamically to perform motion-adaptive recursive noise reduction. The same motion detection signal path that produces the motion field can be used to implement recurslye noise reduction when the Smooth Motion option is not being used. Alternatively, two different devices can provide both options by simple cascading of output of one board to the input of another.

The SMO-MO processing board is able to perform film-to-video transfers as described below. In order to improve the judder created by the traditional 3:2 pull-down conversion, the new system performs linear proportional interpolation along the time axis. In this case the same hardware acts in this special mode for material that is known to have proceeded from a Telecine Machine (already converted from film to video). The process involves 'undoing' the 3:2 pull-down (or any other pulldown sequence) and temporally interpolating the new frames according to the proper position dictated by sampling-rate conversion theory.

In addition to the features mentioned above, the same piece of hardware can be configured to provide a temporal averaging over N video frames. The output rate of frames will be reduced. by N, and therefore will produce an effective speed up unless the results are stored back to the real-time disk storage or routed to another similar hardware for display at any desired speed factor.

Explanation of the SMO-MO Hardware

The hardware for Smooth Motion Processing with added features mentioned above is able to support several operating modes: motion adaptive time interpolation, motion adaptive noise reduction, motion adaptive film-to-video transfers, and N-frame temporal average.

Motion Adaptive interpolation:

This mode of operation is used to provide the capabilities of slow motion and fast motion rendition. In the case of slow motion portrayal of information stored in disk, it creates the necessary in-between frames corresponding to a slow-down factor determined by the user. For instance, if the user specifies a slow-down factor of 10, then 9 new frames will be created in-between any two actual frames in the specified sequence. It is possible to specify non-integer factors, if desired. The effect of the motion adaptive soft-switch or fade between temporal interpolation and frame repetition is controlled by threshold levels set externally.

The same hardware is able to perform recursive noise reduction based on any two input fields. When not operating in smooth motion processing mode, the user of the system gets the option of continuous noise reduction based on the processed motion field. The advantages of non-linear fading are thus realized for the conventional recursive noise reducer implementation.

It is also possible to perform motion adaptive noise reduction on film material from a Telecine by undoing the effect of the 3:2 pulldown (br any other pulldown sequence), carrying out noise reduction, and reforming the 3:2 pulldown sequence. As explained below, the film material can be adaptively temporally interpolated with two identical hardware devices connected in series and set to the proper operating modes.

As mentioned above the simplest way of performing these film transfers is to use the ubiquitous 3:2 Pull-Down where conversion is made from film rates of 24 or 25 frames per second (Fps) by simply resampling by repetition to a higher temporal frequency and displaying the information at that new temporal frequency. A better way is to perform electronic time interpolation to create frames that are correctly 'located' in time according to the 2/5 and 5/2 time relationship between film and video temporal sampling frequencies, in the 525 L/F standard. This is simply a special case for the Smooth Motion processing option, and can be handled easily. Input video is reconstituted to the original frame rate, then the intermediate frames are generated by motion adaptive temporal interpolation as explained above.

N-Frame Time Averaging

Under certain circumstances, and in order to both perform either N-frame noise reduction or artistic processing of video sequences, the hardware is able to perform arithmetic averaging over any set of frames N. There will be a delay of N input frames between each output frame, accompanied with a speed up by N. Processing options with more than one hardware device:

A combination of similar hardware will allow the realization of several medes of operation that are not possible with a single device. For instance, with only two identical hardware units it is possible to accomplish the following features:

For video sequences recorded from conventional Telecine machines: reconstitution to film rates (24 Fps) without degradation, motion adaptive noise reduction, and motion adaptive transfer to video rates.

For video sequences recorded at normal video rates: N-frame averaging and speed up to normal play; Motion adaptive noise reduction and smooth motion slow down or speed up.

After an introduction to the basic concepts used in the SMO-MO option (16 and 20, FIG. 1 ), a more detailed explanation of the hardware implementation (72 and 88, FIG. 2) shall follow.

Motion-Adaptive Temporal-Linear Interpolation

Temporal-linear interpolation in this application refers to the process of creating new video frames from linear combinations of other video frames. The originating video frames are typically, but not necessarily, contiguous in time. These frames will be referred to as 'original' or 'base' frames in this application.

Figure 7:
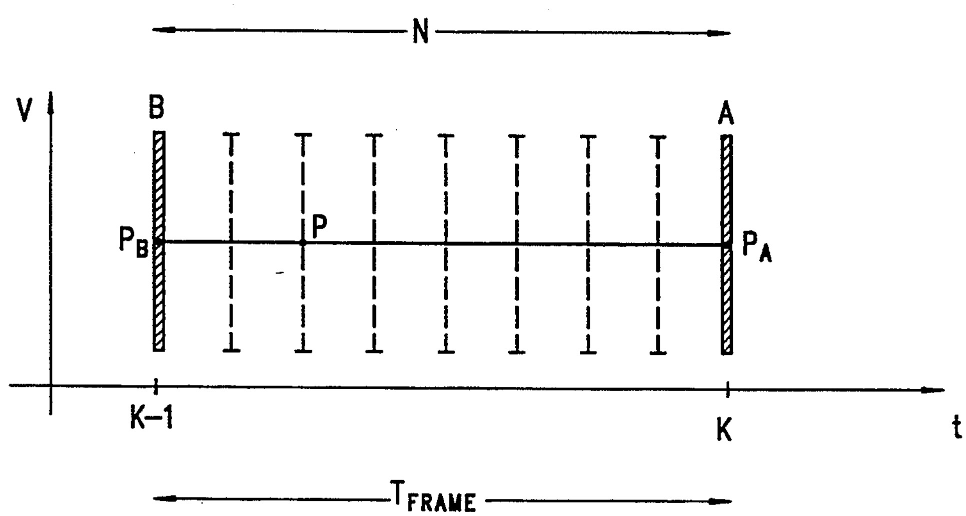
FIG. 7 is a schematic representation useful for understanding operation of a portion of the system shown in FIGS. 1–5.

FIG. 7 illustrates the case of linear interpolation between two frames A and B to produce a plurality of new frames. Frame B occurs first in time, and frame A occurs $T_{frame}$ seconds later (Tframe may be 1/30 sec., i.e., the frame time for NTSC). The newly created frames are linear first order combinations of the base frames.

In the example illustrated in FIG. 7, the newly created frames will be displayed at the normal rate, therefore, they will be separated in time by $T_{frame}$ seconds. It should be clear that the appearance of slow motion will be generated since the original frames will be displayed at a rate of $1/(N^*T_{frame})$. In this example, the parameter N is the slow-down factor; and the parameter n indicates the new frame being temporally interpolated.

It can be said that frame B smoothly fades-over frame A. This fade-over or proportional interpolation in the time domain is used for cases where there is no significant motion on a pixel-by-pixel basis from frame B to frame A. In areas where there is strong motion, Frame A or B is repeated depending which one is 'closer' in time to the newly generated frame n. Therefore, there are two reciprocal fade-overs: the first, done between A and B so that the newly created frame I is $$I=(T)(A)+(1-T)(B)$$

where $$T=n/N;\ 0<T<1.0$$

and the second, between the interpolated result I and the frame repetition F, which has the value of A or B depending on whether frame I belongs to the interval $0<T<0.5$ or $0.5<=T<1.0$. Variable M denotes the amount of motion detected between frames A and B:

$$P=(M)^*(F)+(1-M)^*(I)$$

where $$F=A \text{ or } B;\ 0<M<1.0$$

Variables A and B represent the values of two pixels (PA and PB) at the same spatial position, but delayed by $T_{frame}$.

The formula above corroborates the fact that when there is no motion detected (M=0), the output pixel P will be simply the linearly interpolated result I. When there is strong motion detected between A and B (M=1), the value of F will be used as output. For all other cases in between M=1 and M=0, a reciprocal combination of the two signals I and F will be used.

A non-linear transfer function which can be easily implemented as a dynamic look-up table guarantees that the degree to which M is effective can be tailored to specific situations in which a system operator may require to artificially set the value of M to 0 or 1, or at various values in the interval.

Figure 8:
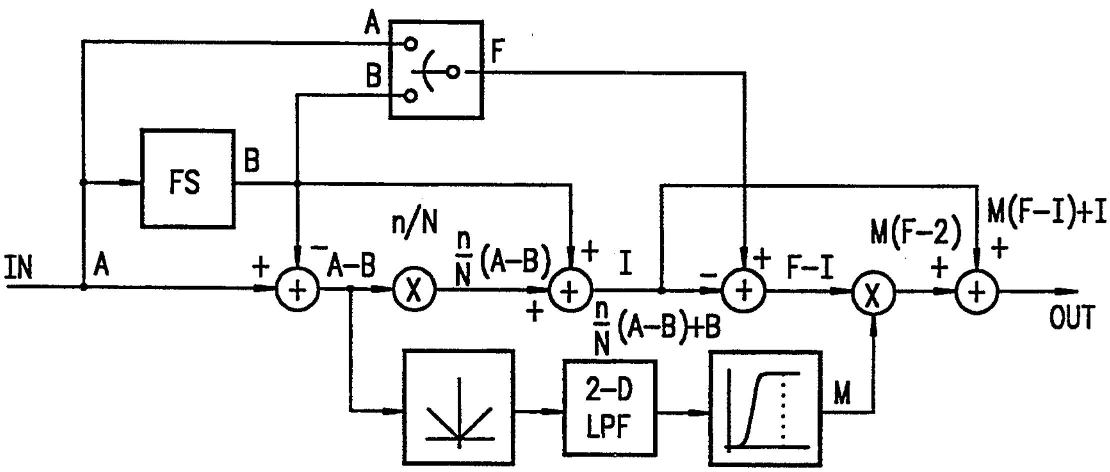
FIG. 8 is a block diagram of a fourth portion of the system shown in FIG. 1.

The process described in the equations above is illustrated in the diagram and formulas of FIG. 8. However, the block diagram of FIG. 8 is not the most economical implementation for a hardware system.

The formulas indicated at each stage of the signal path in FIG. 8 represent the signal processing done on picture data. The output OUT on a pixel-by-pixel basis can be represented by the following equation:

$$Pout=M[F-I]+I$$

By substituting the equations for I and F:

$$Pout=M[F-[T(A-B)+B]]+[T(A-B)+B]$$

This equation simplifies to:

$$Pout=T(1-M)(A-B)+F \quad (1)$$

Where, for the interval $0<=n<N/2$:

$$F=B \text{ and } T=n/N, \text{ for } 0<=T<N/2 \quad \text{(increasing T)}$$

And, for the interval $N/2<=n<N$:

$$F=A \text{ and } T=-n/N, \text{ for } N/2>=T>0 \quad \text{(decreasing T)}$$

As seen from the previous equations, the values of F and T depend on whether intermediate frames are created for the interval $0<n<N/2$, or the interval $N/2<=n<N$.

Figure 9A:
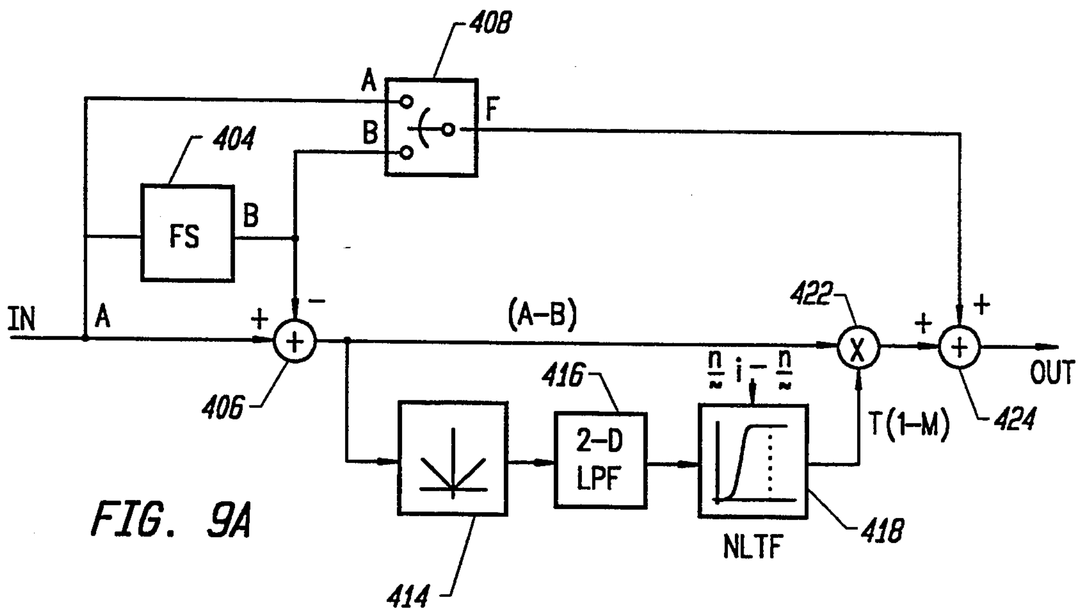
FIGS. 9A and 9B are block diagrams of another embodiment of the system portion shown in FIG. 8.

The block diagram of equation (1) is represented in FIG. 9A, and forms the basis for the hardware implementation. In this figure, digitized video is delayed by one frame-time Tframe by means of device 404. Device 408 is used to multiplex frames A or B; its output corresponds to variable F in the equations above. Video data is subtracted by device 406 and such difference signal is used to detect motion by means of devices 414, 416 and 418, which perfoms rectification, two-dimensional filtering and non-linear transfer function (NLTF), respectively. The output of device 418 constitutes a representation of the amount of motion that occurs between two frames, and is the signal which dictates the adaptive temporal-linear interpolation process. The difference signal out of 406 is mixed with the signal out of 418 by means of 422, which in its simplest form can be a digital multiplier/accumulator (MAC). Device 424 performs the addition of signals from 408 and 422, and corresponds directly to the value Pout represented in equation (1).

The block diagram of FIG. 9A can be directly implemented in hardware, but as explained below, a number of useful features can be added to such system. In such case, the individual processing blocks are more complex since they must perform various signal processing operations depending on the operating mode. The processing extensions of the adaptive technique described above are referred to as 'Smooth Motion Processor with Features', which is implemented as a single processing board integrated into the real-time disk main system described above.

Figure 14A:
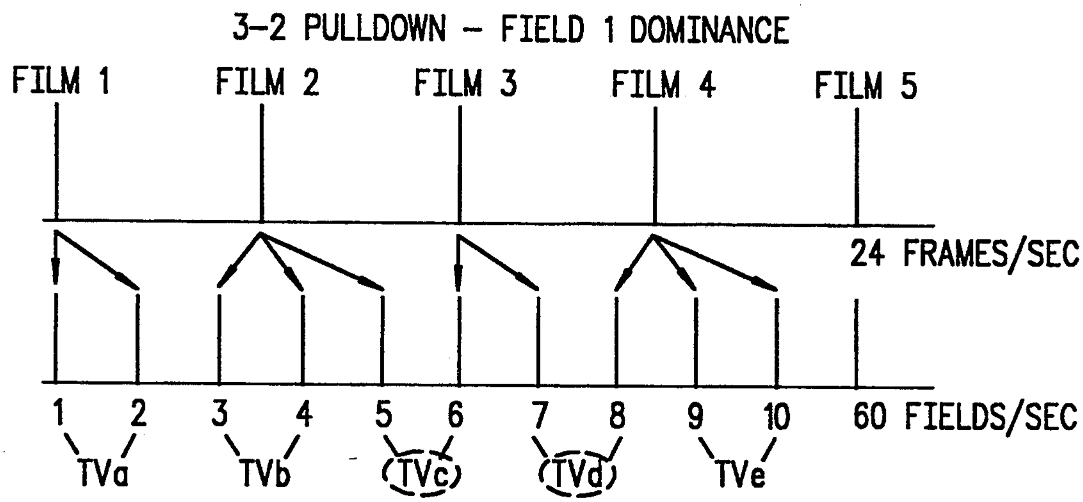
FIGS. 14A, 14B and 14C are flow diagrams useful for further understanding operation of an aspect of the system shown in FIG. 1.
Figure 14B:
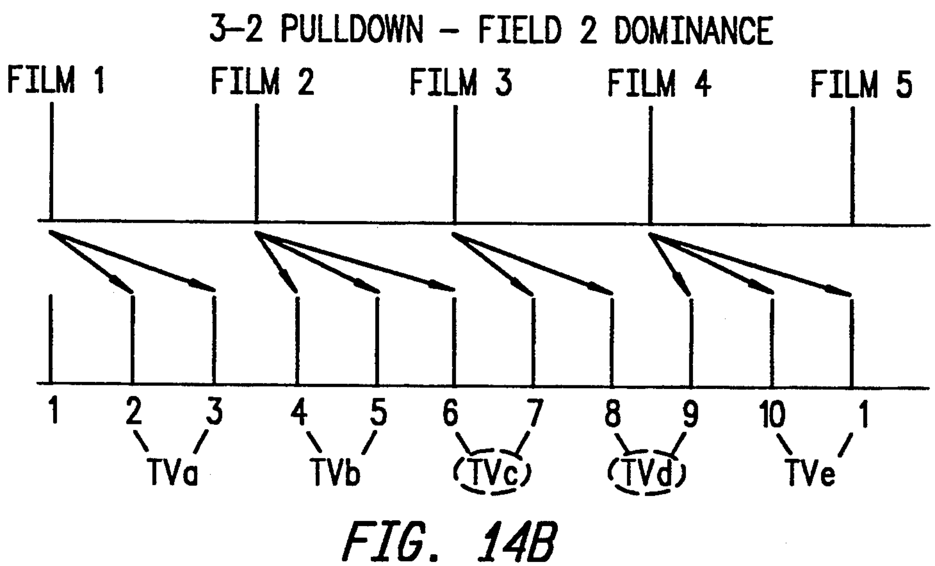

Motion-Adaptive Film-to-Video Transfers The most common way of converting motion picture film material to television video frames is done by 3:2 pull-down, as shown in FIG. 14*a* and 14*b*. Converted television frames TVa, TVb and TVe are generated from single film frames, therefore, there is no inter-field motion and thus no motion artifacts between odd and even fields. On the other hand, converted television frames TVc and TVd are known as 'jittery frames' because the odd and even fields are created from different film frames, and therefore, there is the possibility of interfield motion shown as a jitter effect. In the 3:2 pull;down technique, three television fields are created from even-numbered film frames; and two television fields are created from odd-numbered film frames. Besides jitter effects, this conversion causes judder (abrupt motion artifacts when large portions of the scene move from one frame to the next) for scenes that originally depicted smooth motion on film media.

Figure 14C:
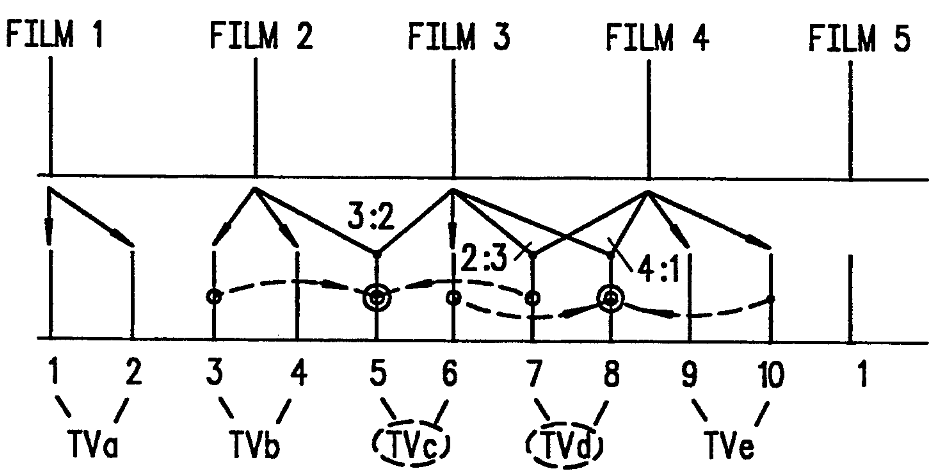
Figure 15:
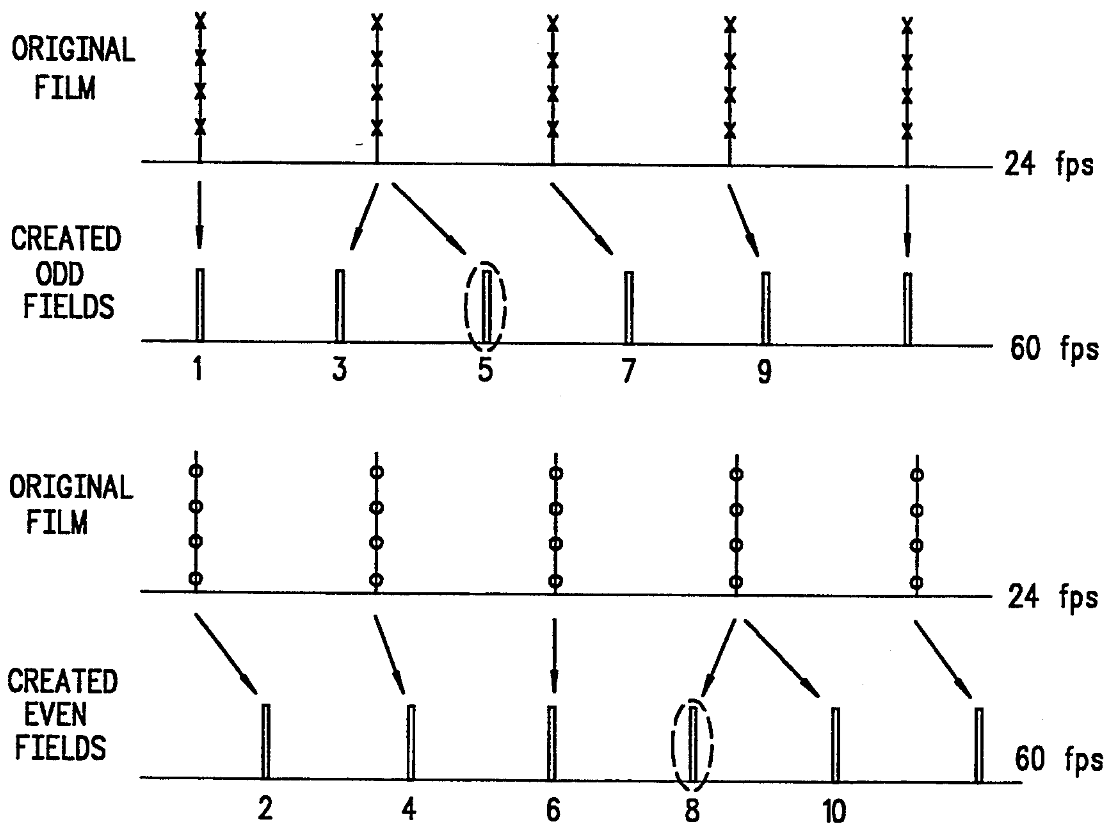
FIG. 15 is a flow diagram useful for further understanding operation of another aspect of the system shown in FIG. 1.

The Smooth Motion system proposed can be used in the SMOoMO mode to reduce the jitter effects indicated above. This is shown in FIG. 14*c*, where new TV fields to replace the 'jittery' ones are created via motion-adaptive linear interpolation between the previous and following fields. FIG. 14*c* shows that Odd field 5 is created from previous Odd field 3 (originated from film frame 2) and subsequent Odd field 7 (originated from film frame 3). Even field 8 is generated in similar manner. FIG. 15 shows this same process on a field basis.

Figure 16A:
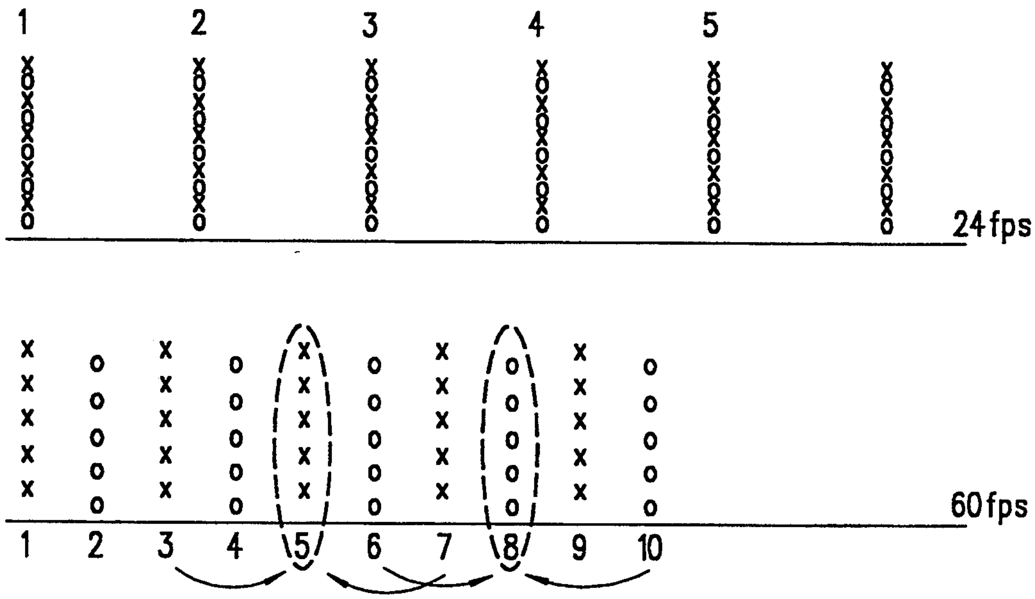
FIGS. 16A and 16B are flow diagrams useful for further understanding operation of an aspect of the system shown in FIG. 1.
Figure 16B:
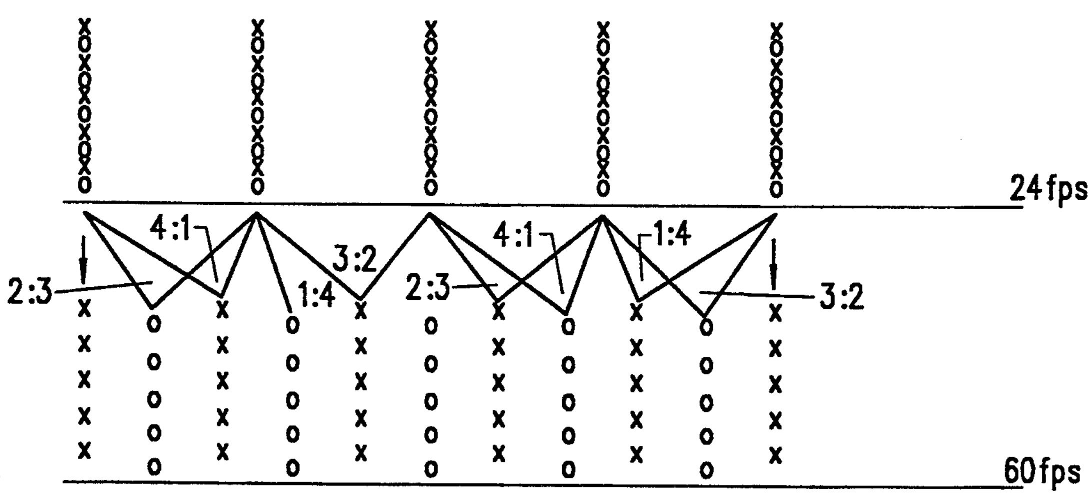

Although the technique depicted in FIGS. 14A–14C and 15 will show improvements in jitter for two frames out of five, smooth motion scenes will still show judder due to the repetition of entire film frames at the incorrect temporal positions for the television field rate. The Smooth Motion processing system can be used to 'position' the newly created television fields in the 'correct' temporal position for the smooth portrayal of motion from the originating film frames. This process is shown in FIG. 16B (FIG. 16A is simply a reiteration of the first technique outlined in the above paragraph). Each new field is generated proportionally with the factors indicated by the arrows. This proportional interpolation is motion-compensated with the previous and subsequent frames and, in the limiting case of M=1 (large motion detected between frames), it reverts automatically to the familiar 3:2 pull-down case (simple repetition of entire frames).

The two techniques mentioned above assume the correct identification of video fields that have been generated with the 3:2 pull-down technique. The Real-Time Disk System must 'undo' the 3:2 pull-down and present the 'original' frames to the Smooth Processing System. Correct identification is done by noting two contiguous 'jitter frames'. The next 'stable frame' will be 'Frame 4' as indicated in FIGS. 14A–14C. The correct identification can be done visually by a system operator, or automatically by using information from the Global Motion Processor 420 indicated in FIG. 12A. The automatic identification of the b 3:2 pull-down sequence is not guaranteed to work with 100% success, but for most material it will correctly recognize the 'jittery frames' and therefore the correct sequence.

It has been thus shown that the Smooth Motion Processing system can be used to accomplish motion-adaptive film-to-video conversion and that this process will produce better results for special cases where the 'traditional' 3:2 pull-down method shows jitter and/or judder artifacts.

Hardware Description for Smooth-Motion Processing Board with Features

Figure 10A:
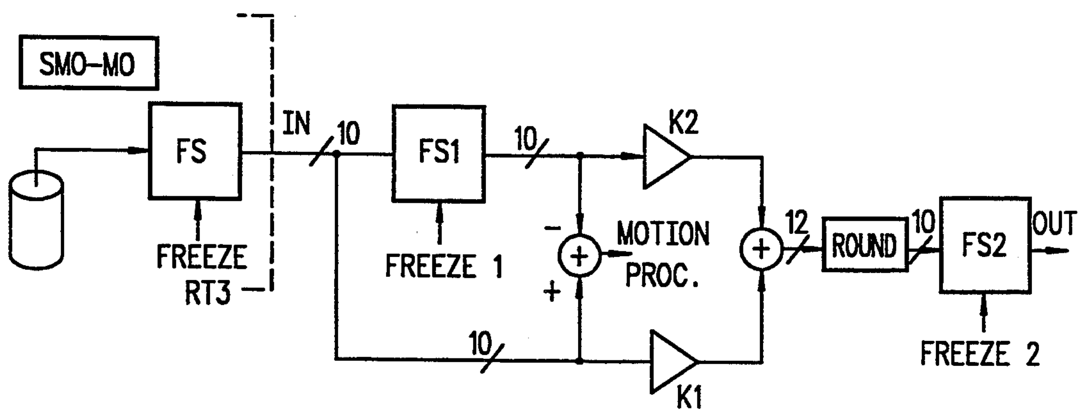
FIG. 10A is a block and flow diagram representation of operation of the system in a Smooth Motion Mode.
Figure 9B:
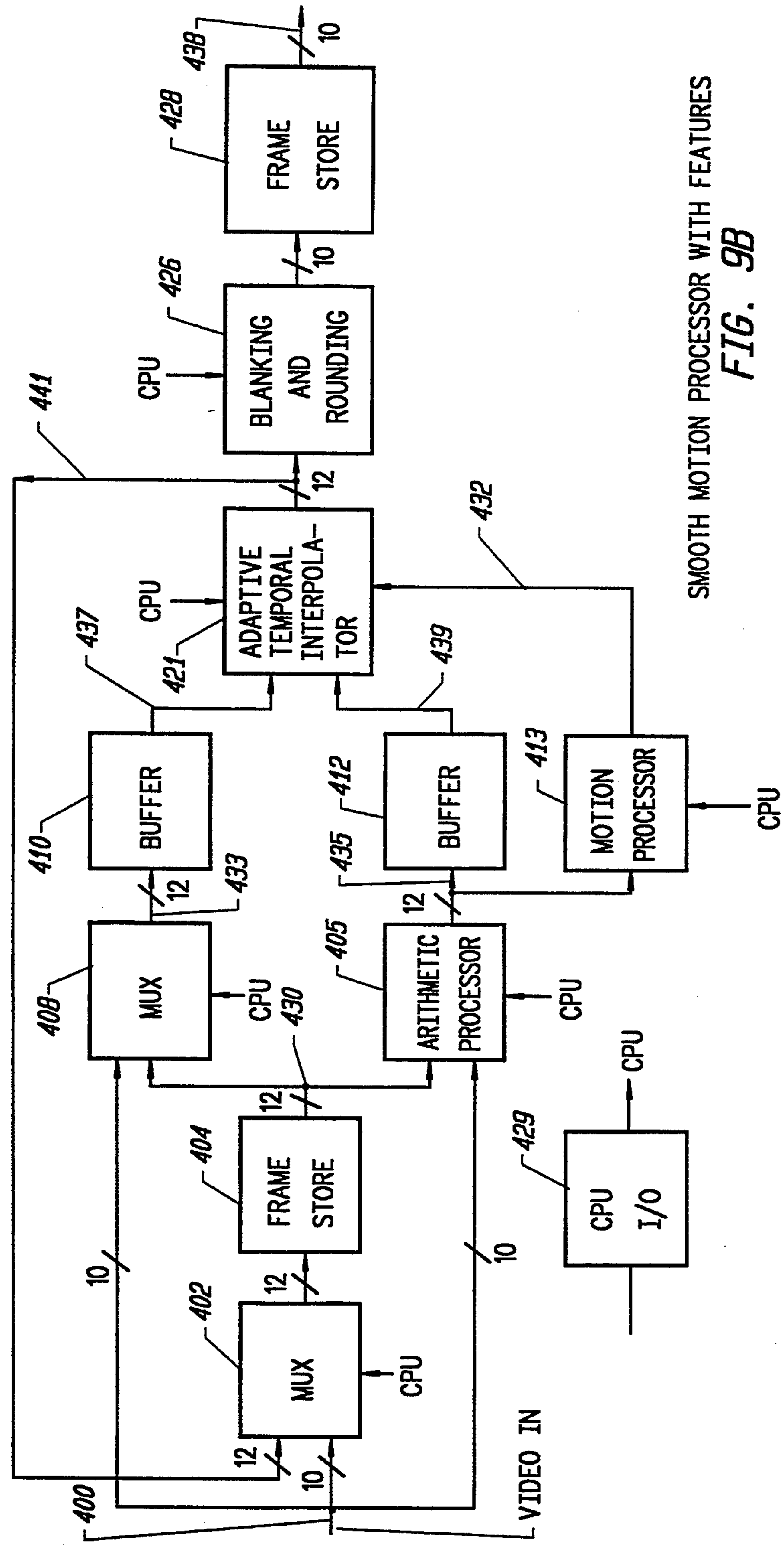

This processing board is referred to as RT4 SMO-MO, devices 72 and 88 in FIG. 2; its processing blocks are depicted in FIG. 9B. This board can operate in various modes described in subsequent sections and depicted in FIGS. 10A and 11. The operating modes are Smooth Motion Mode (SMO-MO), Recursive Noise Reduction Mode, and Average/Integration Mode.

Figure 11:
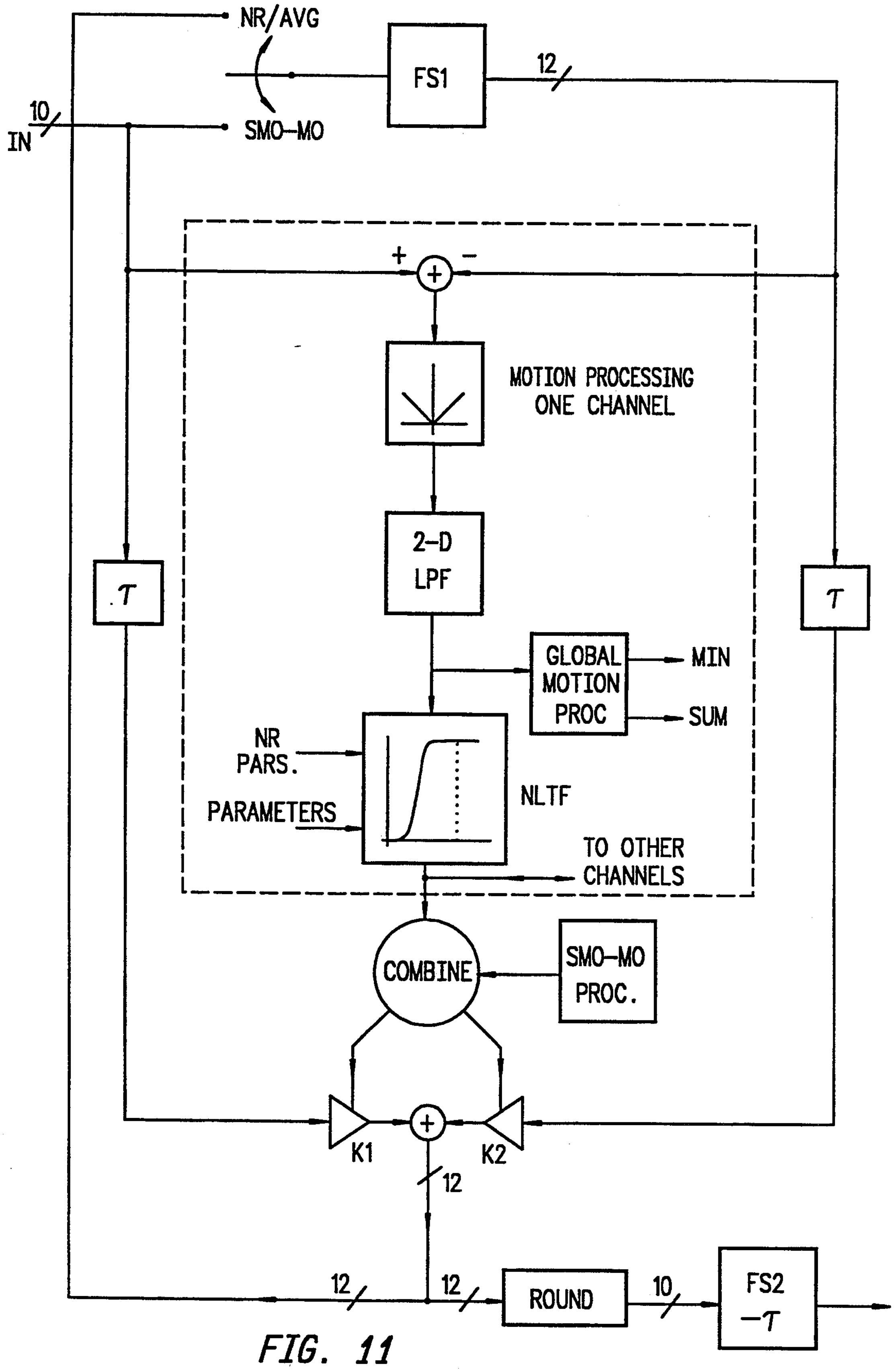
FIG. 11 is a conceptual block and schematic diagram integrating the various modes of the system shown in FIGS. 1–5 and 8–9.

FIG. 11 depicts the concept of integrating the above operating modes into a single system.

Each operating mode is selected by CPU I/O device 429, which receives instructions from device 22, RT2

CPU Board. Although the digital input signals are 10-bit wide, this board processes the information with an accuracy of 12-bits internally.

The correspondence of various signals in the system with variables in the formulas described above is as follows: (note that the value of T is input into device 8 by means of device 11 ):

| SIGNAL | VARIABLE |
| --- | --- |
| Input signal 400 | A |
| Frame-delayed signal 430 | B |
| Multiplexed signal 433 | F |
| Motion signal 432 | (1 − M) |
| Interpolation factor from 429 T | |

The signal processing flow indicated in FIG. 9B starts with the input signal 400 and delayed signal 430 being processed by Arithmetic Processor 405, which yields a weighted sum or difference according to the operating mode. The output of 405 is used by 413 to create a motion detection signal. Device 408 is used to select the value of F as discussed above. Devices 410 and 412 serve to delay signals 433 and 435 so that they correspond to the same processing pixel at the input of device 421. Signal 432 out of the motion processor is used by 421 to perform adaptive temporal-linear interpolation. The value of T, as well as other parameters in the system, including the selection of various NLTFs is effected by means of 429. Signal 441 can be used as feedback to the input stage. When multiplexer 402 selects signal 441, a feedback loop is formed. This feedback loop is useful to perform recursive noise reduction. Signal 44 1 is also rounded to 10-bits and blanked if necessary for proper display by means of device 426. At the output stage, device 428 provides a constant signal delay from input 400 to output 438.

Figures 12A, 12B:
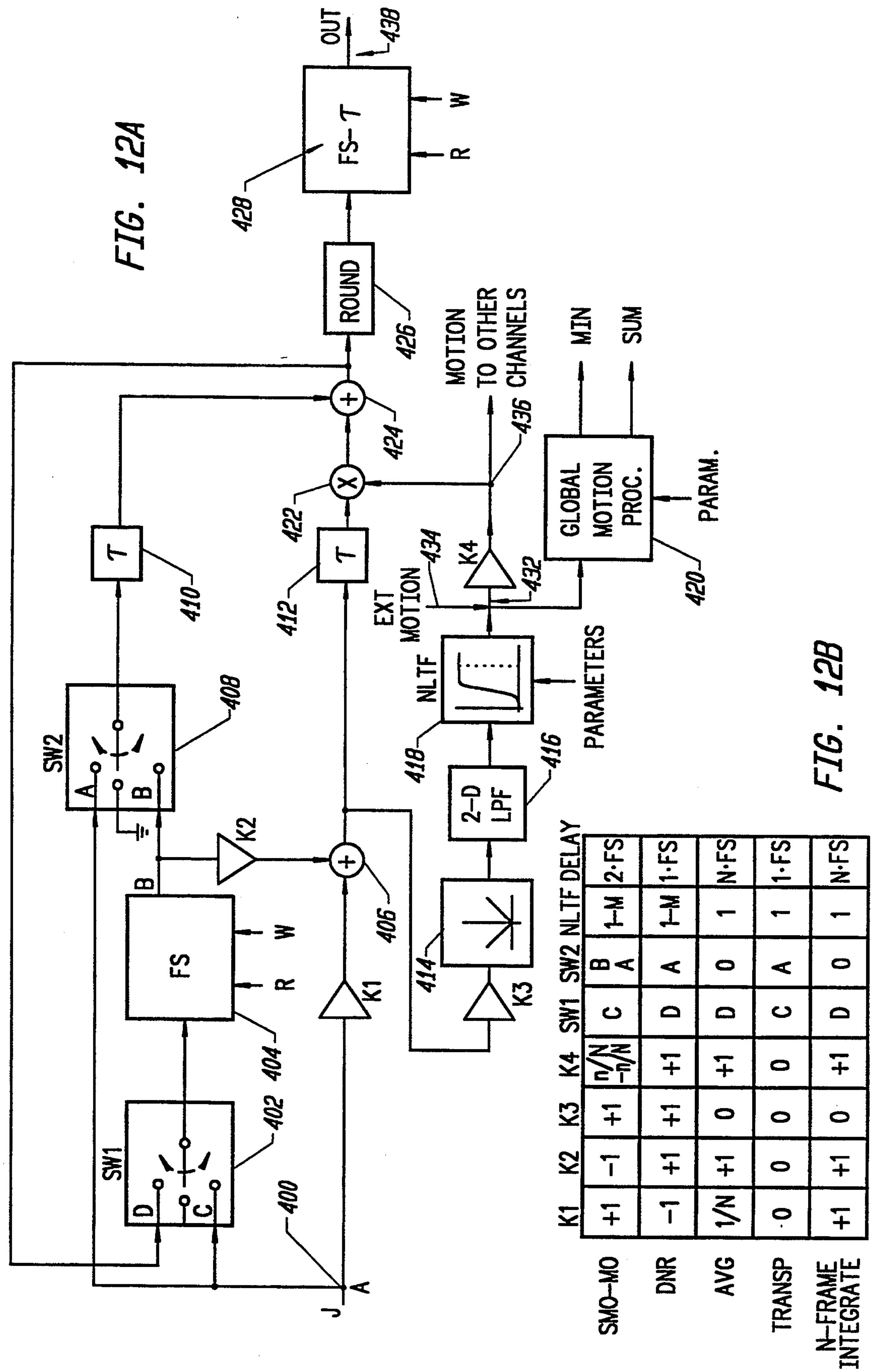
FIG. 12A is a more detailed block diagram of a fifth portion of the system shown in FIG. 1, for implementing the integrated modes of operation shown in FIG. 11.
FIG. 12B is a table useful for understanding operation of the system portion shown in FIG. 12A.

A more detailed block diagram of the hardware implementation is depicted in FIG. 12A. Device 22 (FIG. 1) controls the values of the system parameters, the coefficients K1 through K4, the settings of the multiplexer/switches SW1 and SW2, and the output of the non-linear transfer function NLTF. The table of FIG. 12B shows the particular settings for each operating mode. The system is designed so that the settings in the table need to be modified no more often than on a TV field-time basis.

The various operating modes are described below. Refer to FIGS. 12A and 12B.

Smooth-Motion (SMO-MO) Mode:

The setting of SW1 to position C, and the values for K1=1 and K2=−1 effectively cause the input signal 400 to be subtracted from signal 430 (which is the input delayed a whole frame by device 404). The value of K3=1 permits this difference signal to be processed by devices 414, 416 and 418 for properly estimating motion between signals 400 and 430.

Device 414 is a rectifier which generates the absolute value of the difference signal. This signal is low-pass filtered by device 416 in the horizontal and vertical direction in order to eliminate high-frequency alias components produced by rectification. Device 416 also transforms the signal into a close representation of motion, i.e., a motion field between signals 400 and 430. The non-linear transfer function (device 418) makes the decision as to what constitutes large or small motion between frames, and contains multiple threshold parameters (selected by 429, FIG. 9B), which indicate the critical transition regions from no-motion to full-motion. A soft, non-linear transition is performed in each region indicated by the threshold parameters. The output of the non-linear transfer function constitutes the motion field signal 432.

The value of K4 is (n/N) or (−n/N) depending on the number n of the frame being created in the interval [0:N/2] or [N/2:N]. The value of K4 increases for the first interval, and decreases for the second, as indicated in a previous section. The motion signal 432 can also be modified externally at input 434. Signal 436 is the motion compensated linear interpolated coefficient. This signal is also used by other channels (Chroma and Key) for smooth-motion processing and noise reduction (explained below).

Global motion processor 420 is used to calculate the total sum of the motion field between frames A and B, as well as the minimum pixel motion detected. The minimum and total values are used to change system characteristics during scene changes and to change the NLTF according to scene content. There are other uses derived from the global motion processor, which are explained in other sections below.

Switch SW2 is changed from B to A every N/2 created frames, and added to the output of device 422 by device 424. This produces the desired motion-compensated fade-in between linear interpolated and original frames, as the case may be on a pixel-by-pixel basis.

General purpose delay elements 410 and 412 are used for properly aligning the signals in time. Rounding to 10-bits is performed by device 436. Variable frame delay device 438 is used to provide a constant delay between input 400 to output 438. The maximum delay between input and output for this operating mode is 2 frame times.

Digital Nois.e Reduction (DNR) Mode

All the switches and coefficients used for the SMO-MO case are used here, with small differences indicated in the control table of FIG. 12B. There are four main differences between the DNR and SMO-MO modes. First, SW1 is set to position D, which means that the signal out of device 424 is fed-back to the input of frame delay device 404; therefore, the output of device 406 is a first-order IIR (Infinite Impulse Response) filter. Second, SW2 is always set to A, which is a requirement dictated by the concept of recursive noise reduction as illustrated in FIG. 10B. Third, the non-linear transfer function parameters are different and are influenced in different ways by the global motion processor 420. Fourth, the total delay between input 400 and output 438 is one frame, due to the fact that there is no need to wait for processing two frames in order to create the desired noise reduction for the current frame.

Average (AVG) and N-frame Integration (INT) Modes:

The purpose of averaging over N frames is to produce special effects and noise reduction for video clips where there is no motion, although there is nothing that prevents the user to utilize the system in this mode for all types of inputs. Noise reduction in this mode is possible because it has been proven that the effect of random noise can be 'averaged out' when the value of N is very large. Integration is used when dealing with material obtained at low illumination and for which it is desired to bring the average signal level to a higher value.

Control settings for both modes of operation are essentially the same, with the exception of K1. The coefficient K1 performs the averaging operation on a sample-per-sample basis in the AVG mode.

The value of K3 is set to zero since there is no need to perform motion detection. This value also selects the output of the NLTF as indicated in the control table of FIG. 12B. The value of K4 can be set to 1 as indicated, but it can be changed just as easily to provide a constant offset when needed.

The total delay between input and output is dependent on the number of frames N being averaged or integrated.

Transparent (TRANSP) mode:

When this system is not in use, i.e., none of its features are desired, the input signal 400 is passed through the hardware to the output 438 with a delay of exactly one frame time.

Figures 13A, 13B:
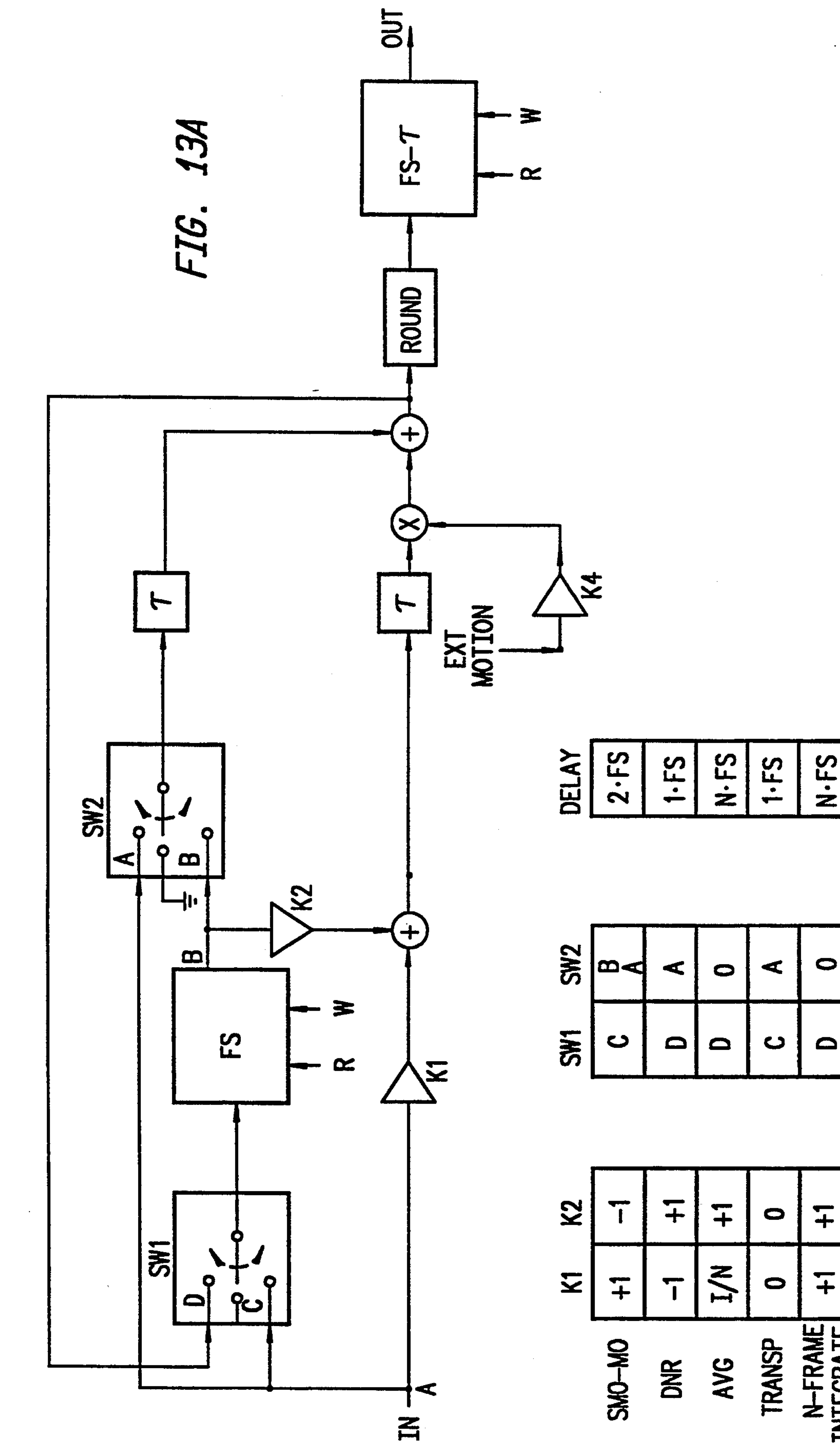
FIG. 13A is a block diagram of a sixth portion of the system shown in FIG. 1.
FIG. 13B is a table useful for understanding operation of the system portion shown in FIG. 13A.

Chrominance and Key Channels:

The processing for the chroma and key signals is depicted in the block diagram of FIG. 13A. The motion detection path has been eliminated. The motion information is derived from the luminance channel and is input through EXT MOTION and optionally modified by K4, if desired. The control table is shown in FIG. 13B, and is similar to the control table for the luminance signal described above.

Control Panel

Figure 17:
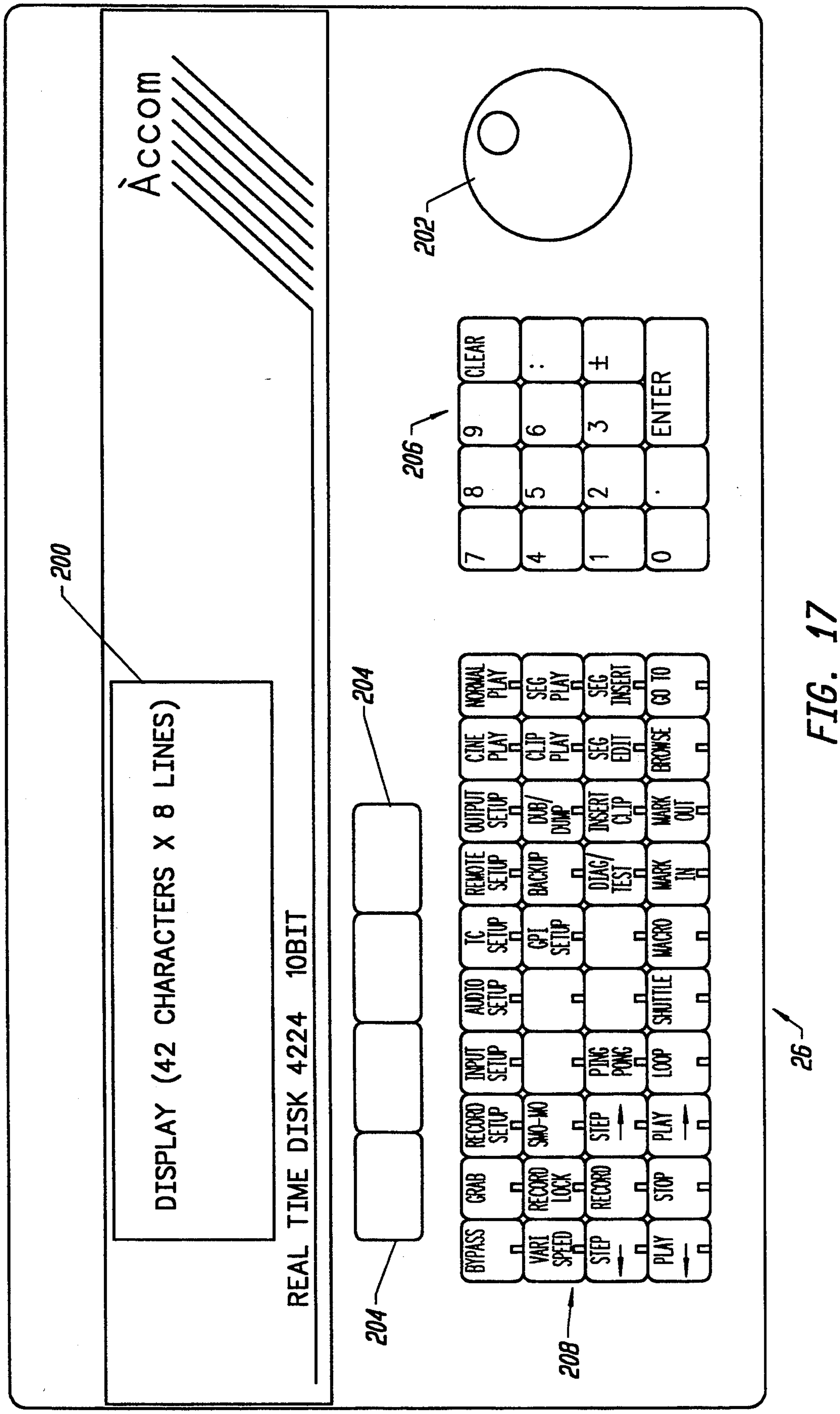
FIG. 17 is a plan view of a control panel for the system shown in FIG. 1.
Figure 17A:
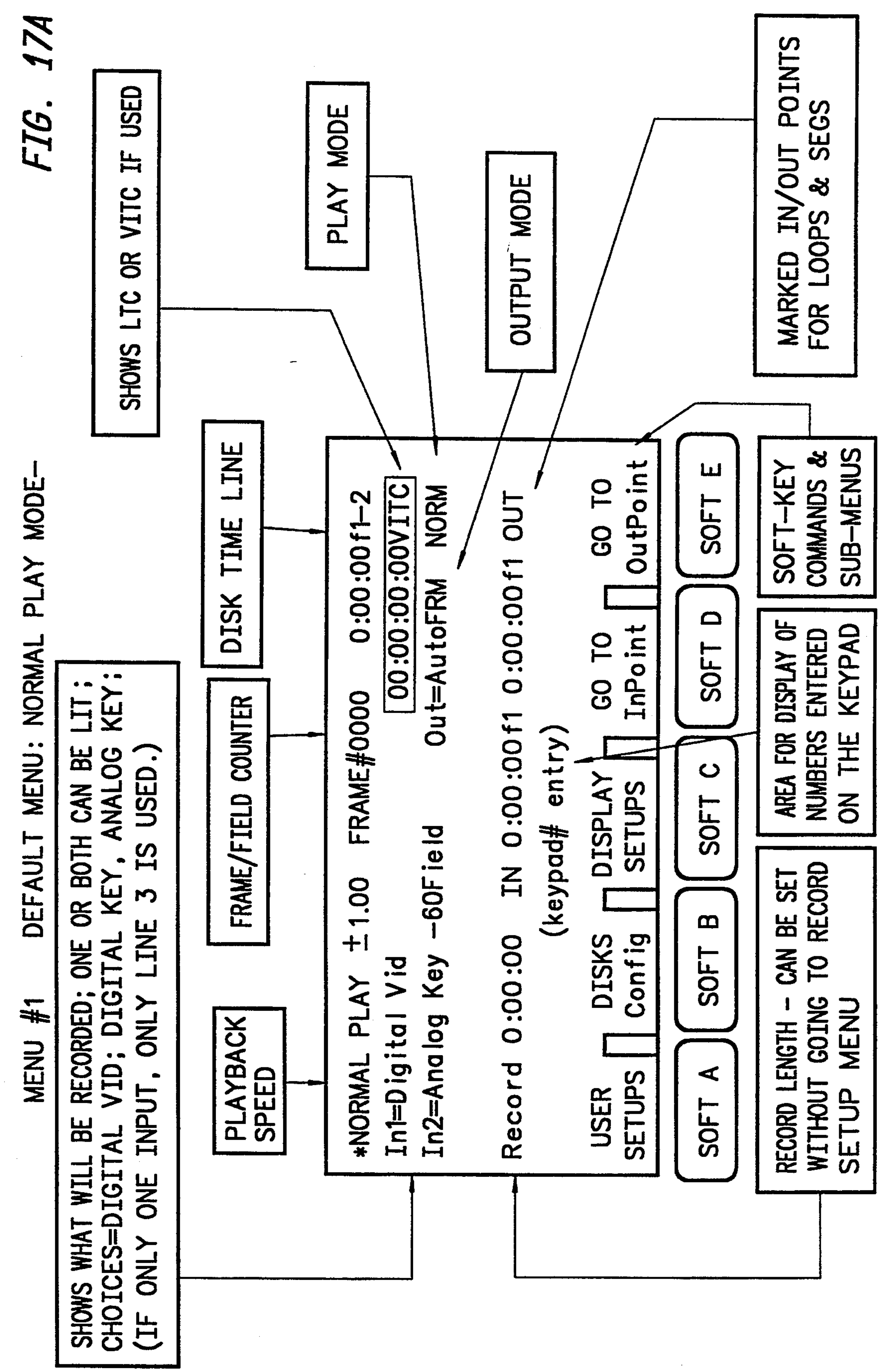
FIGS. 17A–17R are schematic representations of display screens generated in use of the system shown in FIG. 1.
Figure 17B:
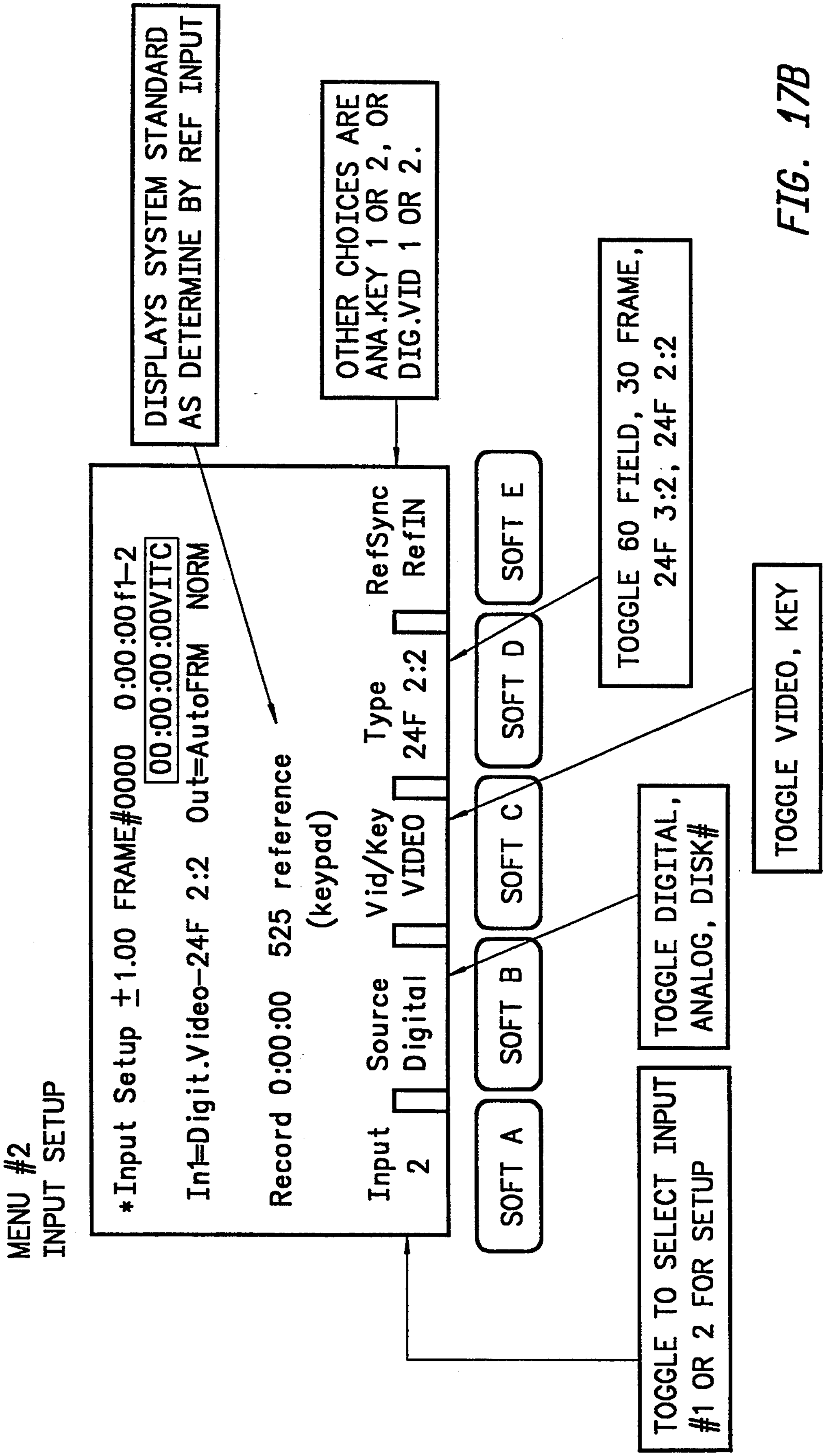
Figure 17C:
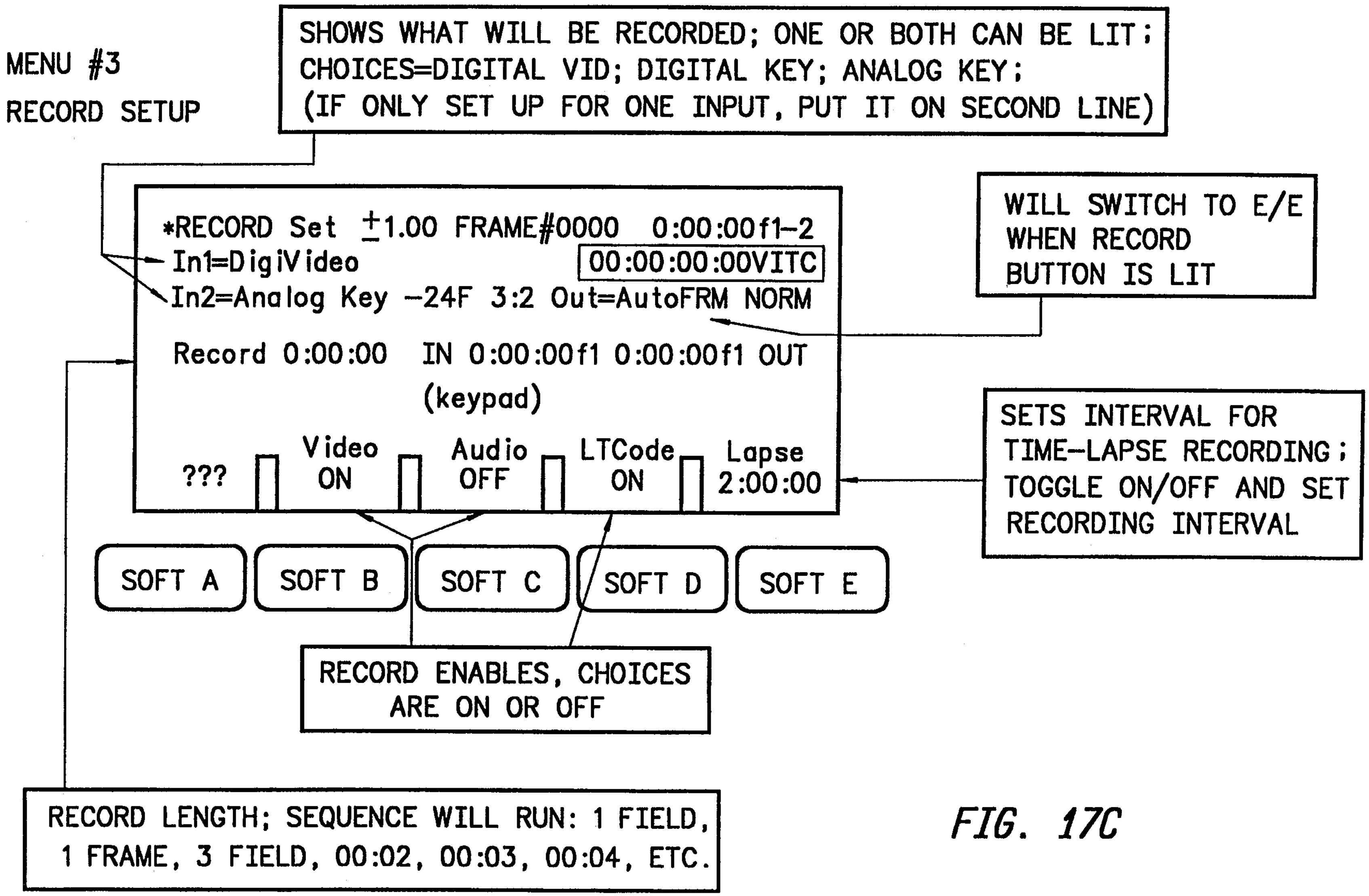
Figure 17D:
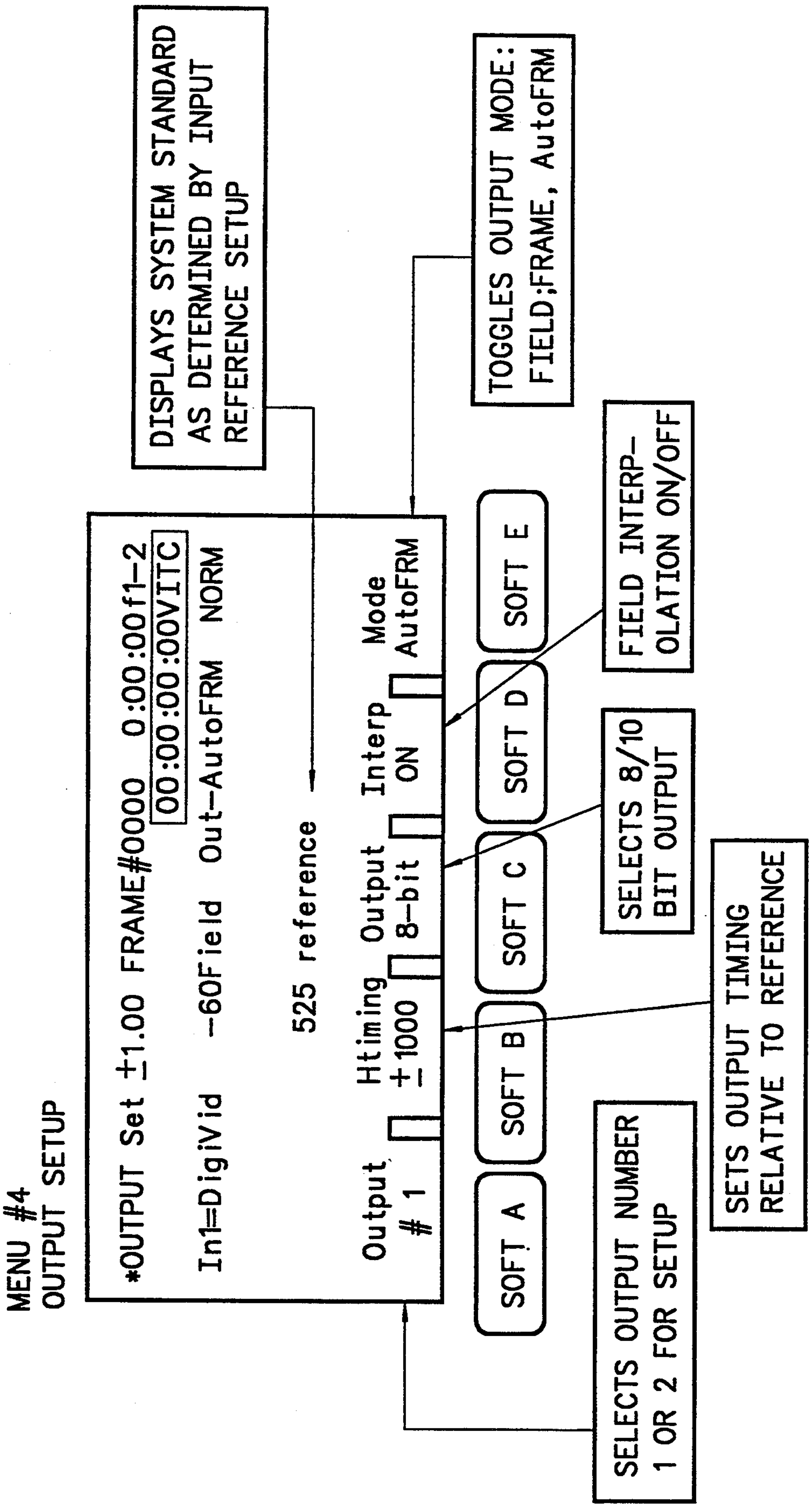
Figure 17F:
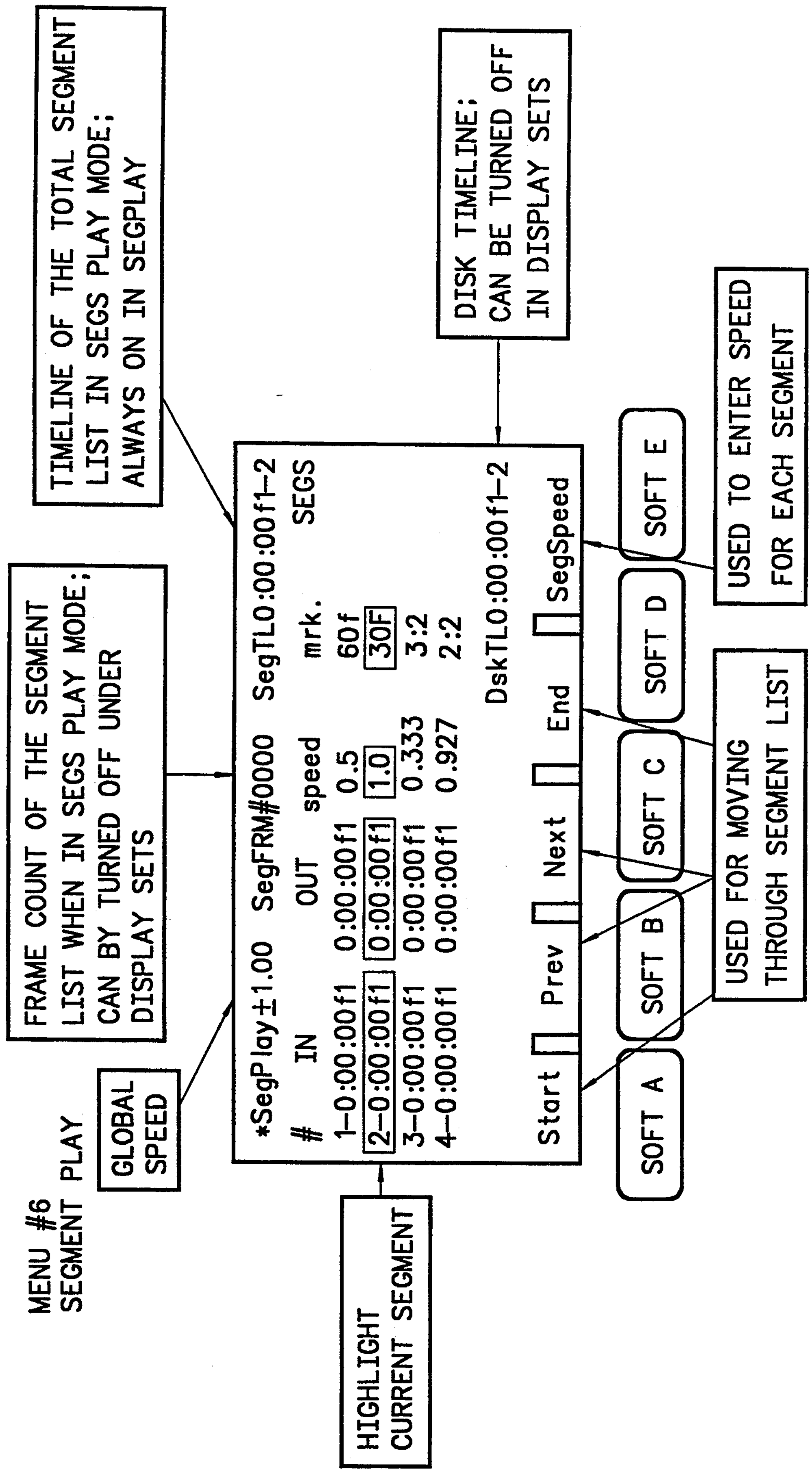
Figure 17G:
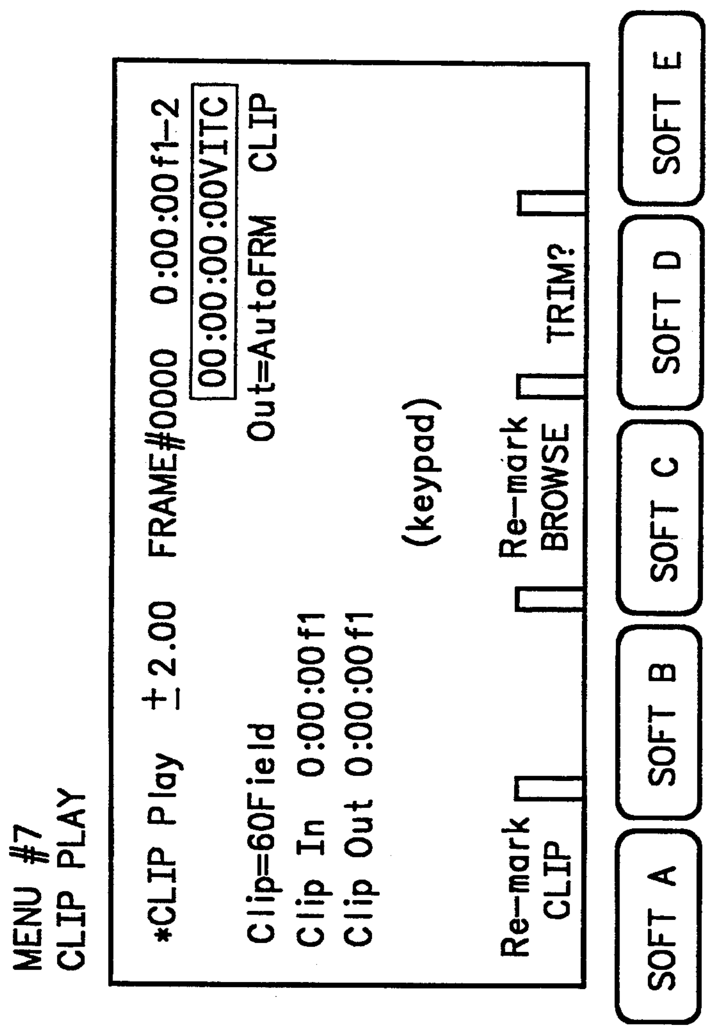
Figure 17H:
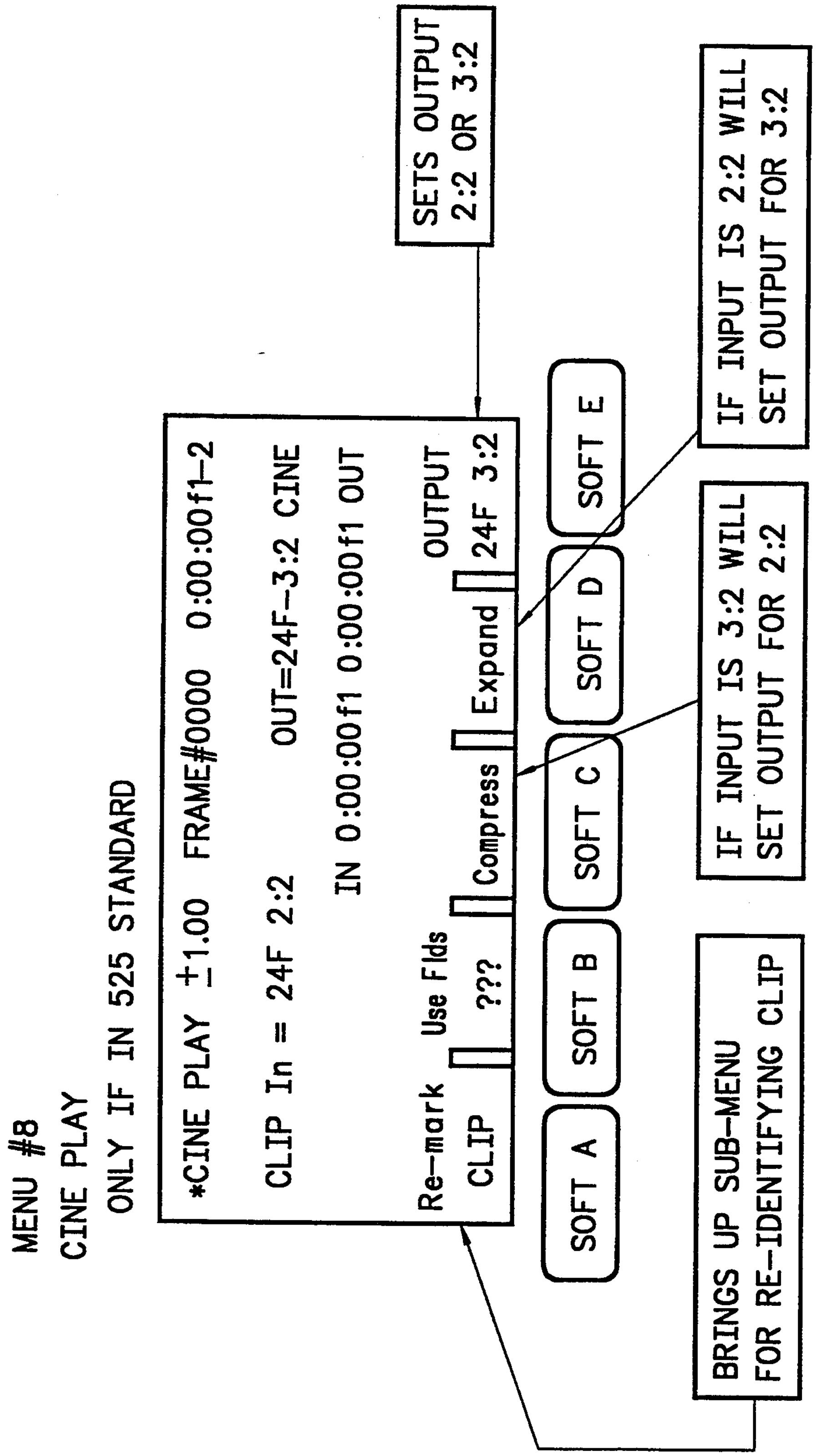
Figure 17I:
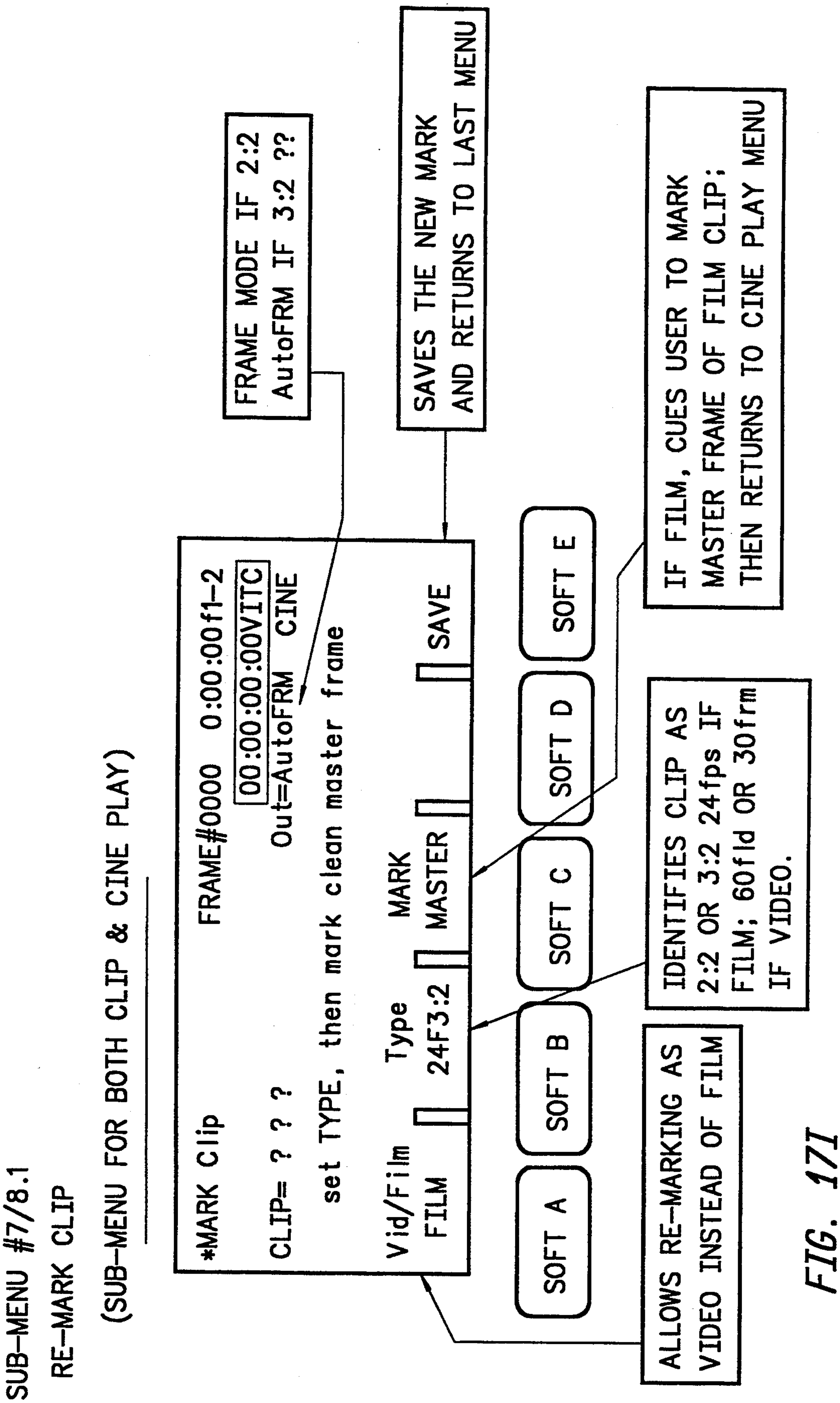
Figure 17J:
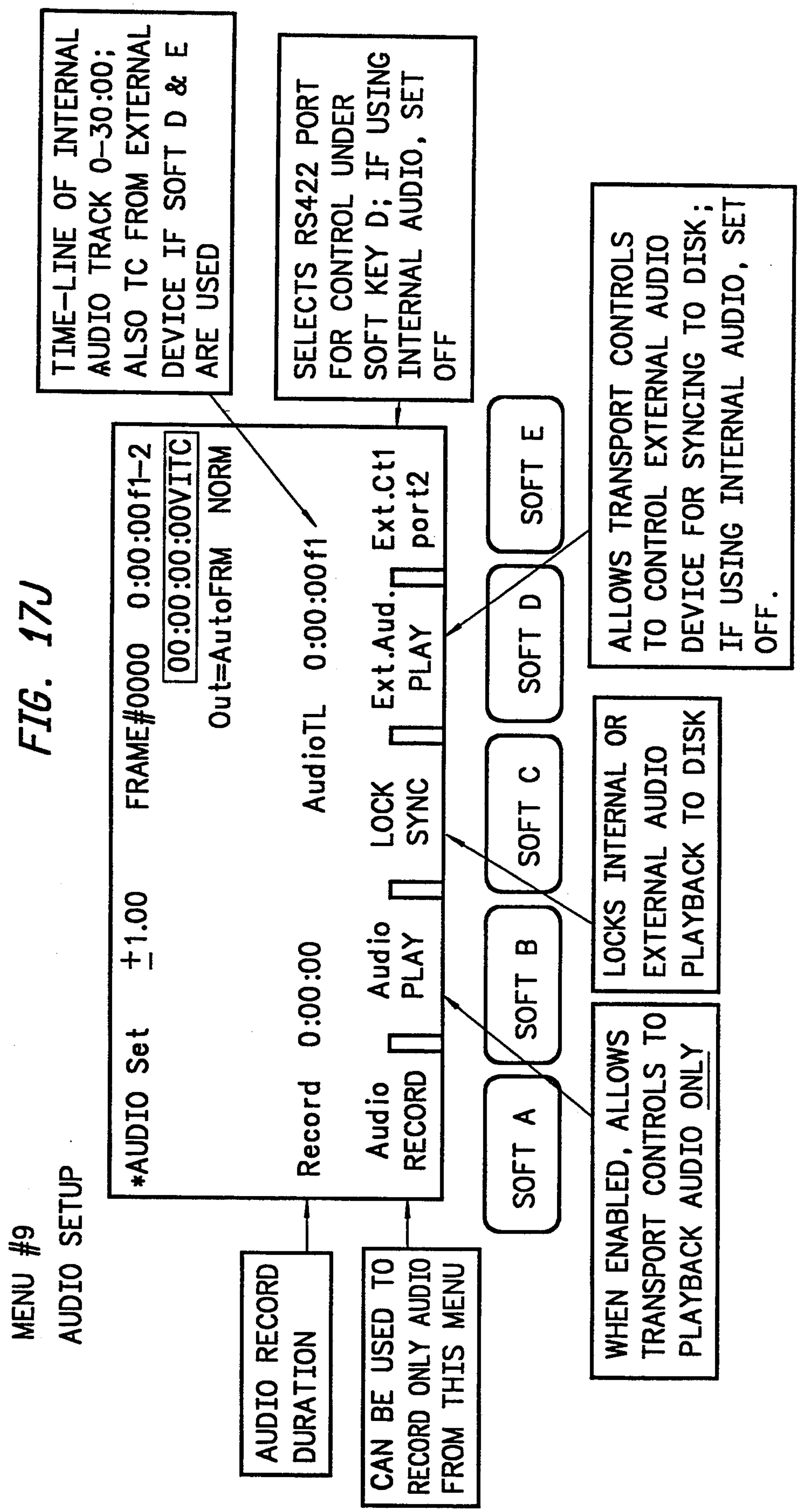
Figure 17K:
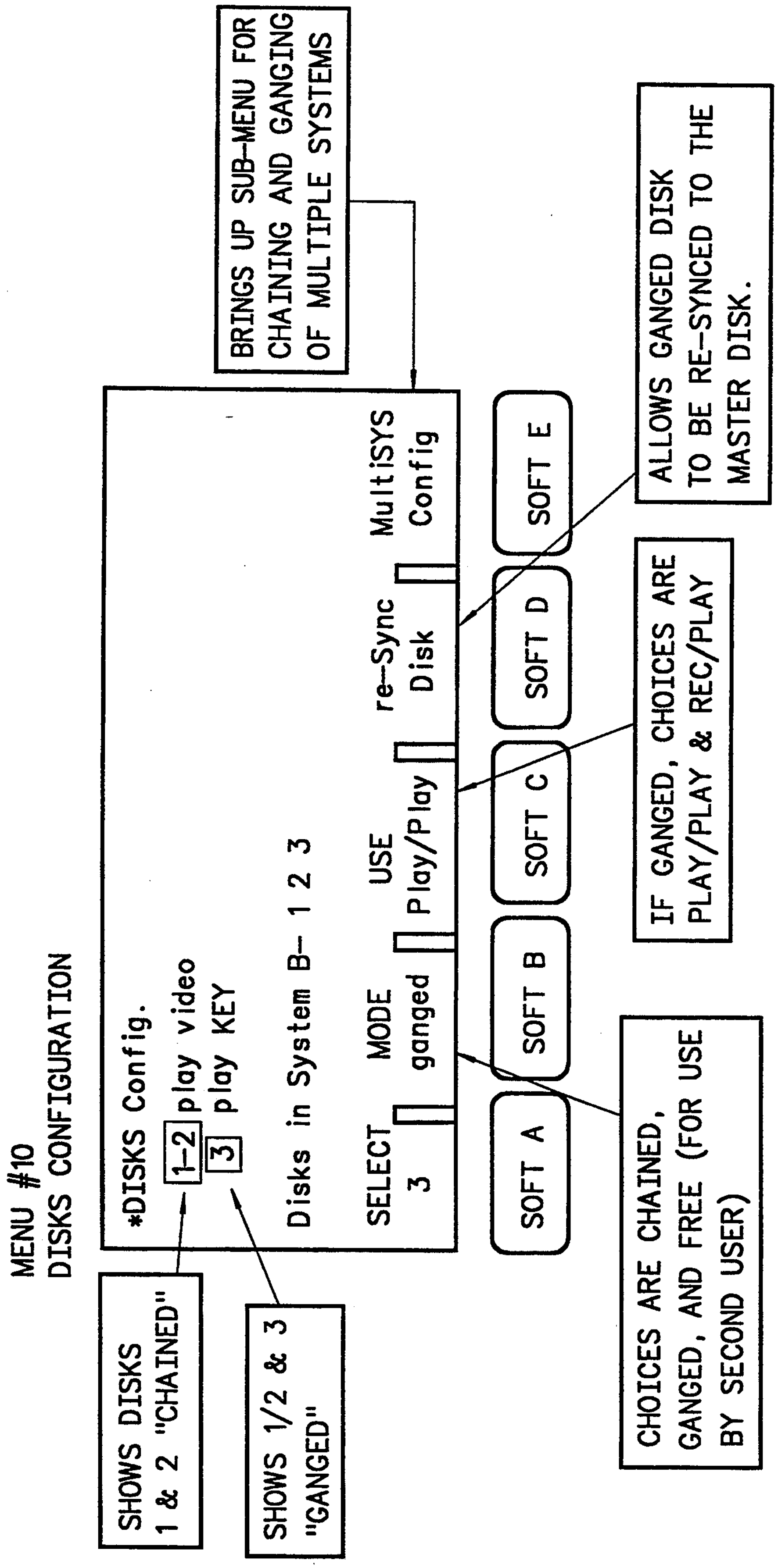
Figure 17L:
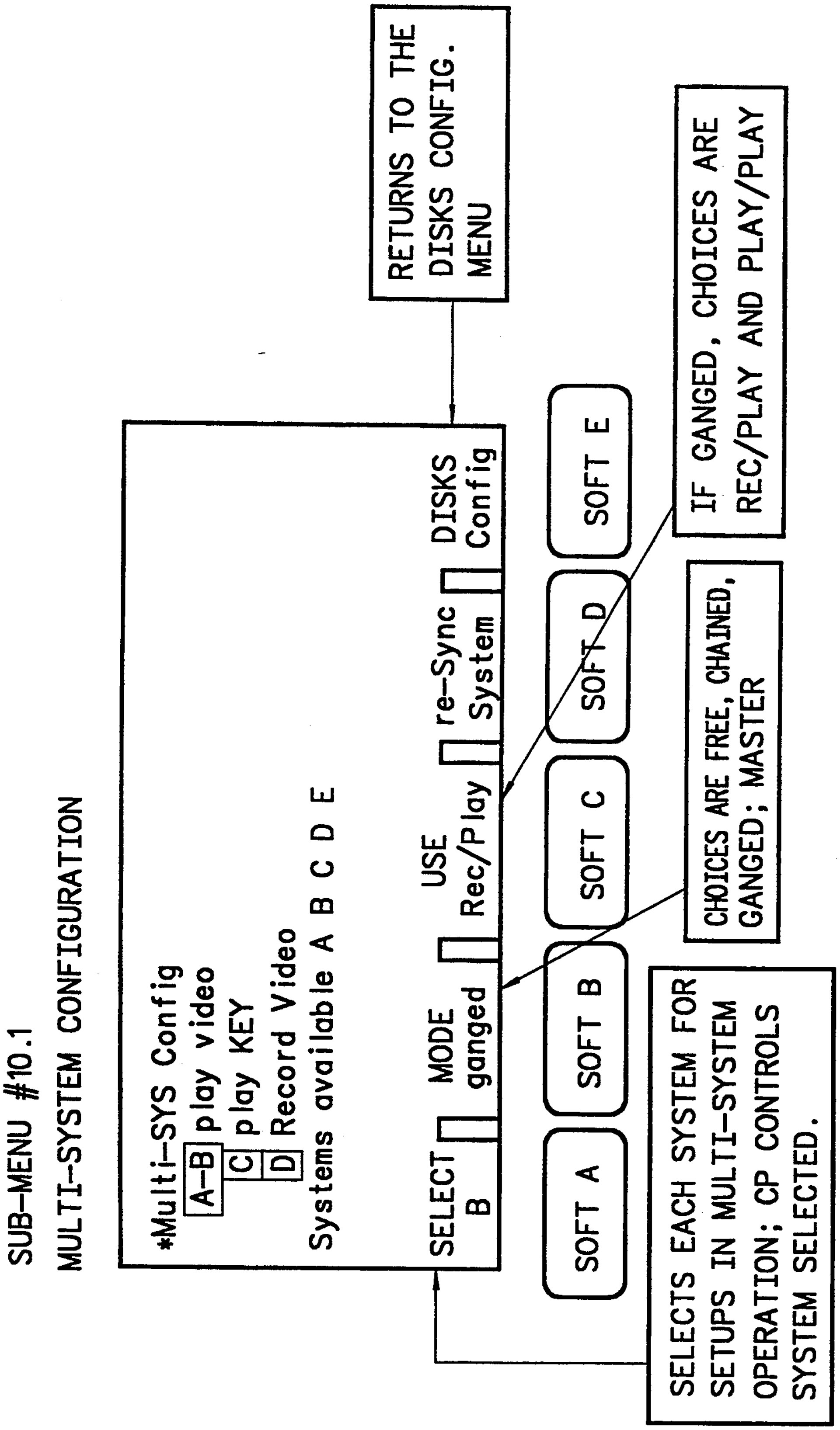
Figure 17M:
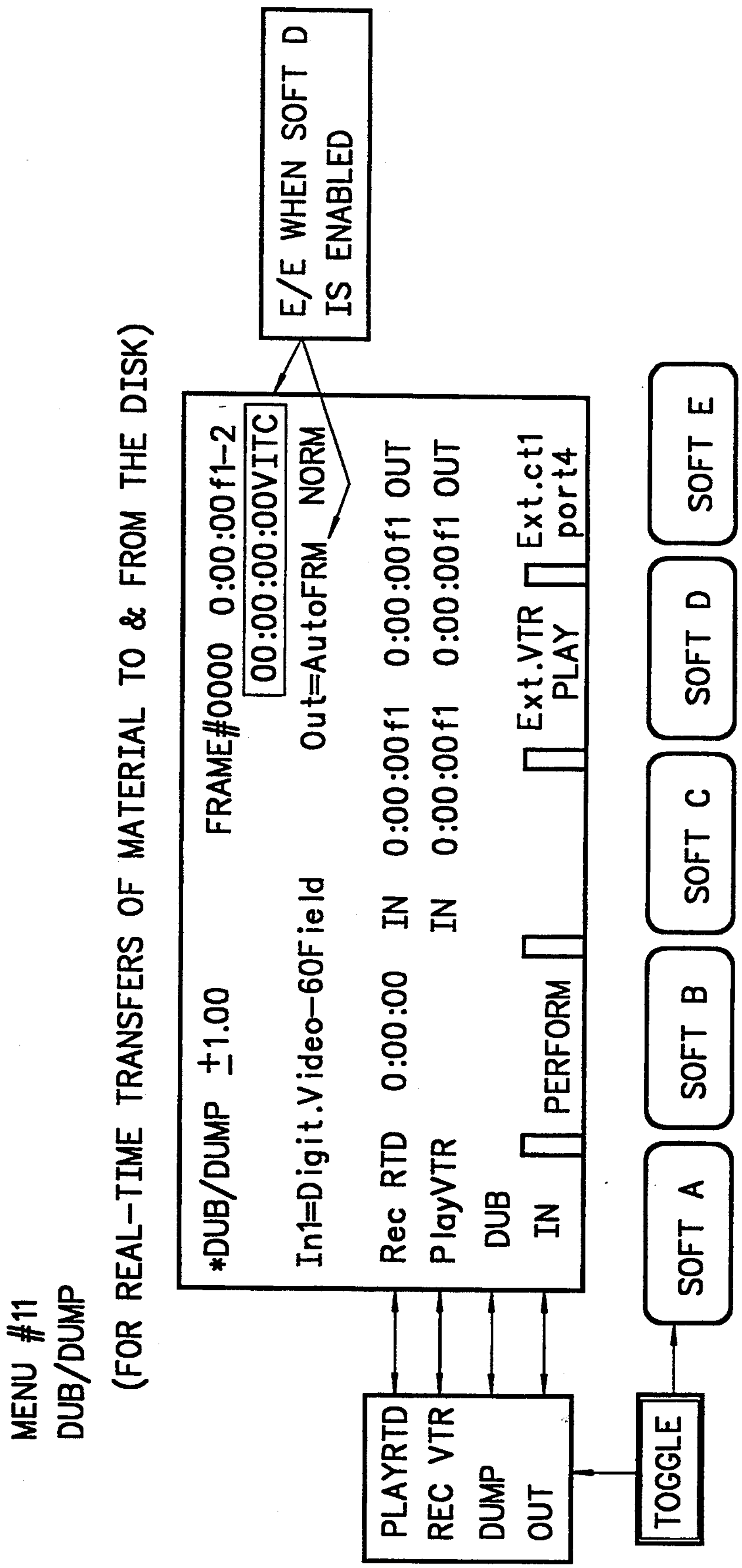
Figure 17N:
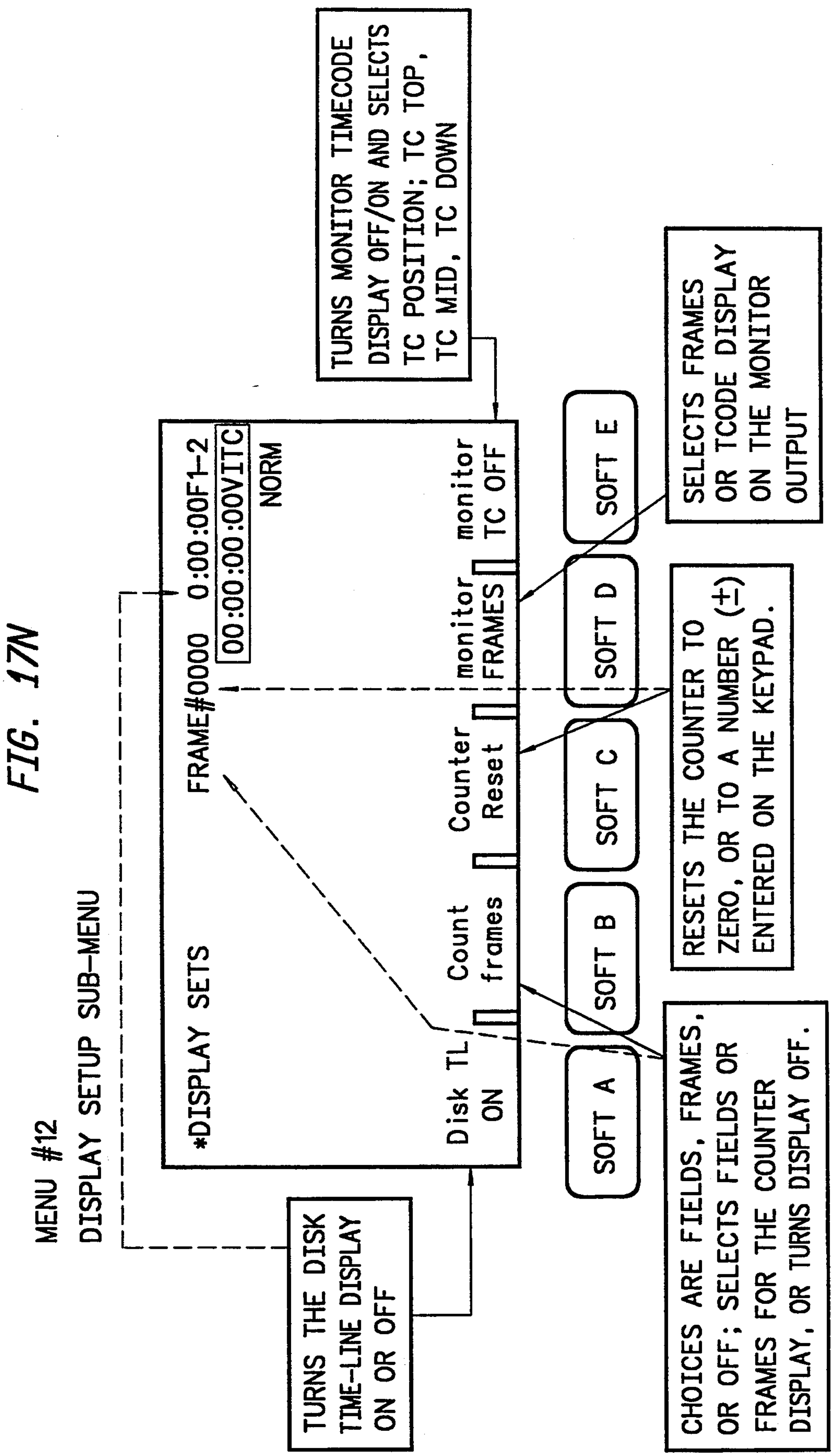
Figure 170:
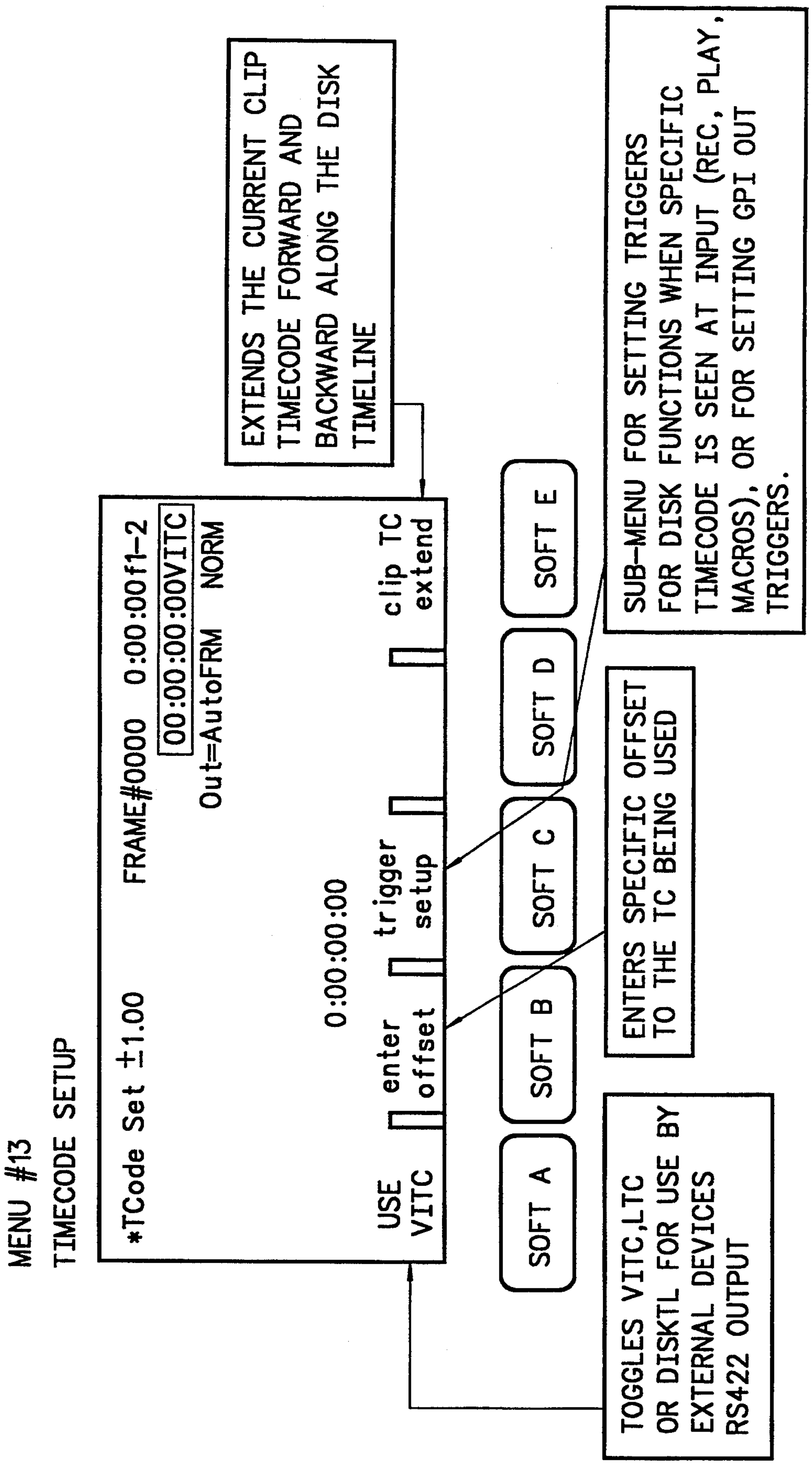
Figure 17P:
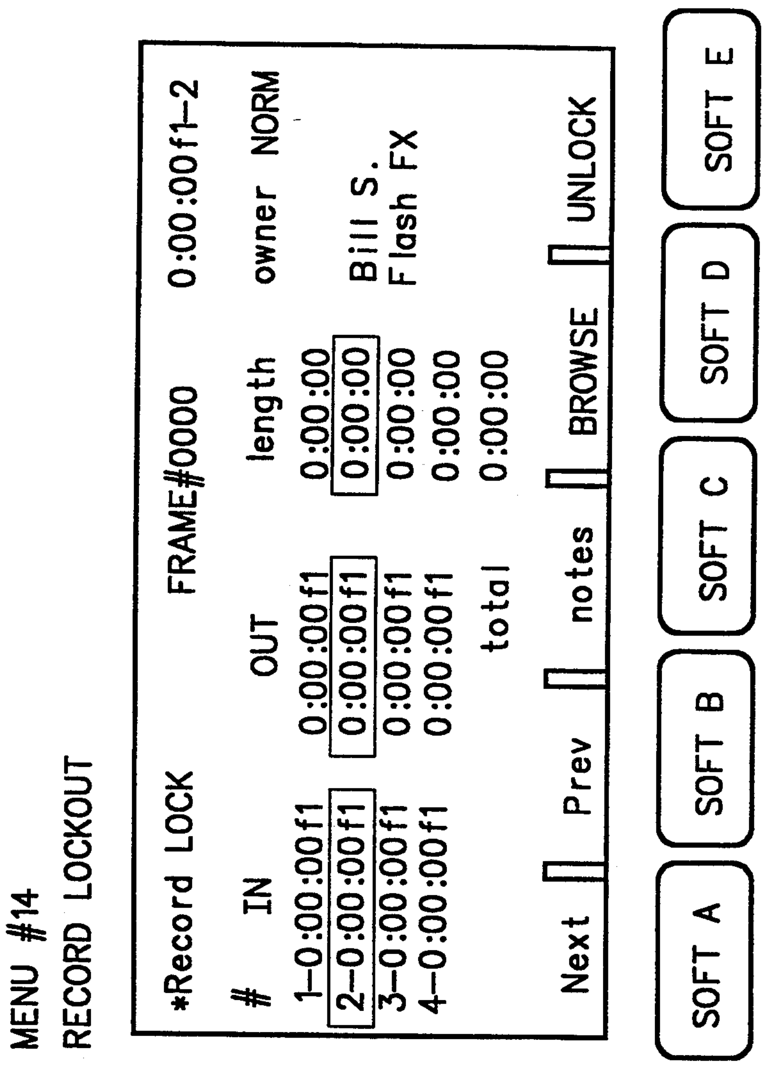
Figure 17Q:
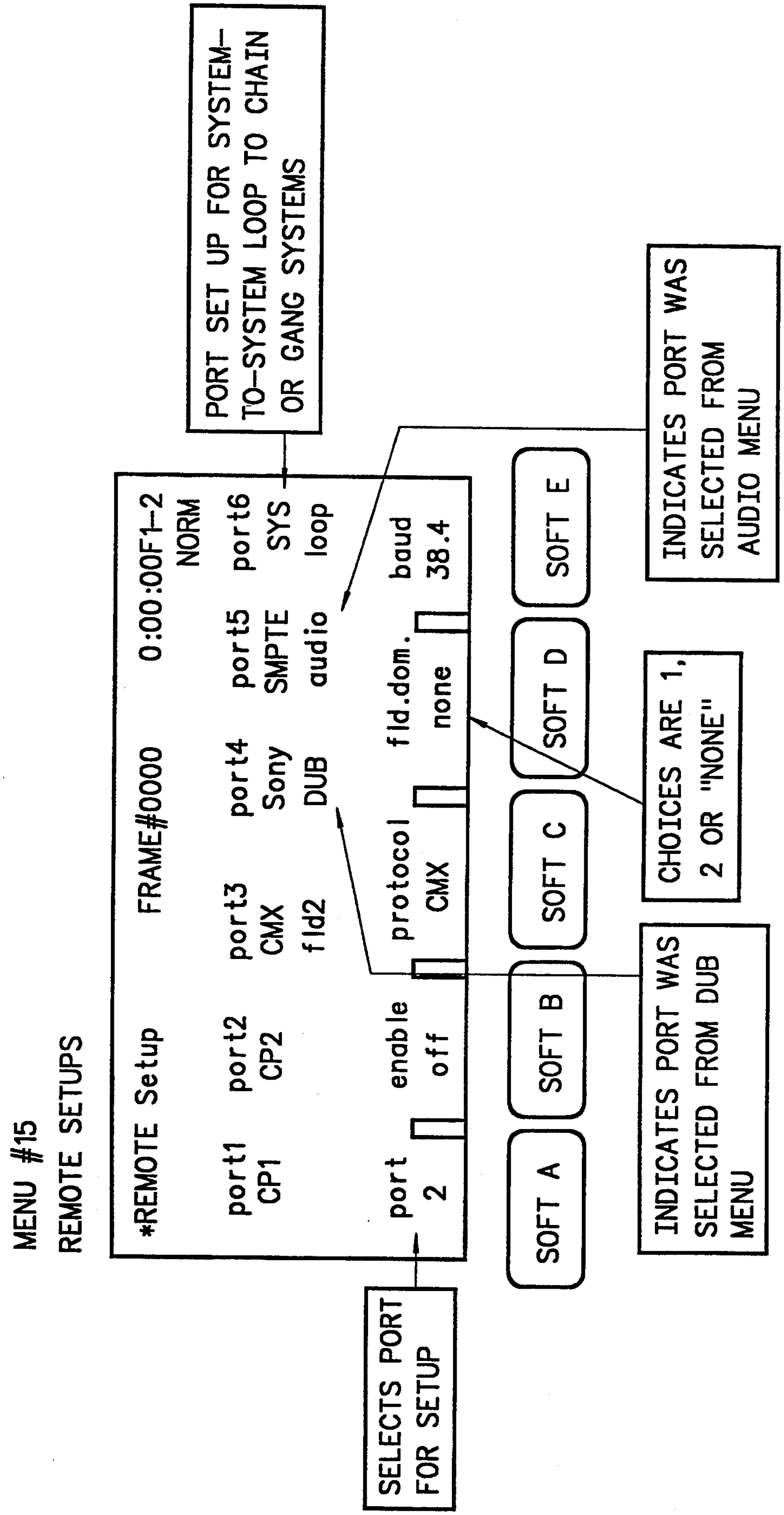
Figure 17A:
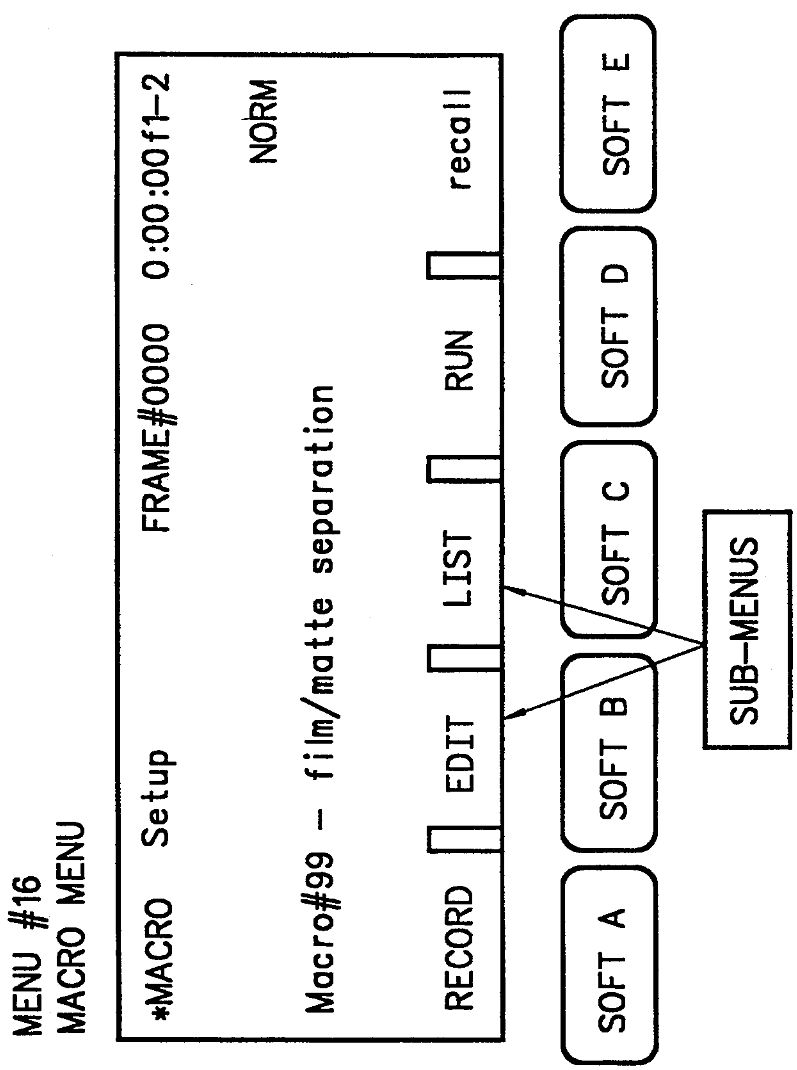

FIG. 17 shows further details of the control panel 26. FIGS. 17A–17R show display screens generated in use of the system 10. The RTD control panel 26 consists of a 42×8 character display 200; a rotary control 202 to support jog, shuttle and variable-speed functions; 5 "soft" keys 204, whose meaning depends upon individual menu context, lying below the character display 200; 15 keys 206 in the keypad group, without indicator LEDs; and 40 keys 208 in the keyboard group with indicator LEDs, logically grouped into 5 smaller groups: the playback mode group, the transport control group, the segment group, the setup group, and the remainder.

Keypad Keys

Clear - clears any keypad entry.

Enter - completes the numerical entry for the function selected.

key - used to define decimal values, as in variable speed play.

key - used to delineate time-code numeric fields.

±key - pressed once to set negative numbers, twice to set positive numbers for moving in field/frames increments when used before GoTo. "±", (number), then "GoTo" will move the disk back (−) the number of frames entered; "±", "±", (number), then "GoTo" will move the disk ahead (+) the number of frames entered.

0–9 keys - to enter numerical values.

Keyboard Keys

PLAYBACK MODE GROUP

Normal Play (LED on/off) - when ON allows playback access to the entire disk; also used to return from sub-menus to the normal play (default) menu.

Clip Play (LED on/off) - when ON limits the disk playback to the current clip. GoTo can be used to move to another clip by clip # or by time-code/disk time-line. A clip is defined automatically as any recording made at one time with no changes in the record setup. Clips can be trimmed in the Clip Play menu.

Segment Play (LED on/off) - when ON enters the SEGS Play menu and limits the playback to disk tracks as defined in the current segment list.

Cine Play (LED on/off) - when ON, and when a clip has been identified as 24 or 30 fps film, and when the master frame of a 24 fps clip has been marked, several special playback modes will be used for real-time and especially non-real-time playback and jog of the clip. Other advanced modes will be possible with the "Smooth Motion" (SMO-MO) option.

When Cine Play is selected and the current clip has not been previously "marked", it should bring up a sub-menu which provides for identifying a clip as 24 or 30 fps film (or animation); if 24 fps it will demand the identification of any "master" frame of the 3:2 TV/film frame sequence.

If SMO-MO is installed and turned on, real-time playback of 24 fps film can introduce new "mixed" fields in place of the duplicate 3rd field of the 3:2 sequence. If SMO-Mo is installed and turned on, playback of 30 fps film OR animation can introduce "smoothed" fields in real-time and non-real time playbacks.

NOTE on Playback Modes: Normal, Clip & Segment are mutually exclusive modes. Cine Play can be used with the other playback modes.

TRANSPORT CONTROLS GROUP

Play→(LED) - plays the disk video at 1X speed, unless Vari-Speed is turned ON.

Play←(LED) - plays the disk video at 1X speed, unless Vari-Speed is turned ON.

Stop (LED) - stops any play or record operation in progress. If the disk has been under external editor or EtherNet control, returns control of the disk to the CP. None of the transport control LEDs should be lit while under external control.

Step→-will step the disk forward along its time line either one field or one frame as determined in the Output Setup.

Step←-will step the disk backward along its time-line either one field or one frame as determined in the Output Setup.

Loop (LED on/off) - when ON will allow all plays, steps, etc. to reach the end of the disk, clip or segment and automatically jump back to the first frame, in effect creating a continuous loop of video.

Ping Pong (LED on/off) - will allow all normal or variable speed plays to automatically reverse when reaching the end of the disk, clip or segment, and reverse again when back at the beginning.

NOTE: "Loop" and "PingPong" are mutually exclusive. If one is selected the other is automatically deselected.

Vari-Speed (LED on/off) - when ON, all plays will be at the speed entered by the keypad. This entered value will only be changed by entering another value (#'s followed by pressing "Vari-Speed) OR by using the position ring of the transport knob to increase or decrease the entered value while in play. Vari-Speed can be turned on while the disk is playing, which causes the speed to go from the 1X normal to the speed set.

SMO-MO (LED on/off) - enables the operation of the optional Smooth Motion board if installed. Brings up the Smooth Motion setup menu.

Record (LED on/off) - followed by "Play→" will begin recording the number of frames as entered in the Record Length. Pressing "Stop" while recording will end the recording. Pressing any other button before "Play→" will de-select "Record".

Record Lock (LED) - will be used in conjunction with the "MARK" keys to protect tracks of the disk so they cannot be erased. The LED will turn ON any time a protected section of the disk is or would be accessed by any operation.

GoTo (LED) - when disk is stopped will send disk to the frame/field as entered by the keypad numbers. The sequence can be either "GoTo", "(numerical entry)", then"ENTER", OR "(numerical entry)" and "GoTo".

In Segment Play; "GoTo", "#", "ENTER" will send the disk to the first frame of the segment number entered.

"±" used ahead of the numerical entry will increment the disk by the time value entered.

"Field" used after the numerical entry will increment the disk by the number of fields entered.

Shuttle (LED on/off) - when the LED is OFF, the rotary control is used for jogging (position control). When the LED is ON, the rotary control is used for shuttle (speed control).

SEGMENT GROUP

Mark In - Marks the current disk track as the first field/-frame of a loop or segment. Can also be used to mark a record in-point. Would suggest that numerical keypad entry of a time-line value followed by "Mark In" would work the same without the disk needing to physically go to that frame.

Mark Out - same as "Mark In", but for the last frame of a loop or segment.

Seg Insert - hitting Seg Insert will identify the current "Mark In / Mark Out" points as the start and end of a new segment, and insert that new segment into the segment list. If in Normal Play mode the new segment will be added to the end of the segment list. If in SEGS Play, the new segment will be inserted ahead of the currently highlighted segment.

Seg Edit - Brings up the Segments Editing menu (delete, copy, seg/speed, move).

Insert Clip - will take the current clip and insert it as a new segment in the segment list, without needed to manually mark the in- and out-points.

SETUP GROUP

Bypass (LED on/off) - toggles the output video between the disk output as determined in the OUTPUT Setup and the input as determined in INPUT Setup.

GRAB (LED on/off) - if pressed while playing disk video will "freeze" the output video. If pressed while in Bypass, will freeze the input video. The video will stay frozen until GRAB is pressed again.

Record Setup (LED) - brings up the menu used to set up all record enables, to allow recording any combination of video, time code and audio.

Input Setup (LED) - brings up the menu used to set up and mark the input source to be recorded.

Audio Setup (LED) - brings up the Audio setup menu; lit anytime internal or external audio is synced/-locked to disk playback.

TC Setup (LED) - brings up the Time Code setup menu; use VITC, LTC or RTD time-line; adjust/-slide timelines, etc.

Output Setup (LED) - brings up the Output Setup menu; used to set output mode field-frame-autoframe, field interpolation on/off, set output timing, and select 8- or 10-bit output.

GPI Setup (LED) - brings up the GPI menu; used to assign functions to GPI ins - Record, Play, Stop, Step→, Step←, macro #s.

Remote Setup (LED) - brings up the Remote Setup menu. Used to enable/set up all RS422 ports, set editor protocols, etc. LED will be on if the system is being controlled by any external device.

REMAINDER

Dub/Dump (LED) - will bring up a menu which allows the control of an external device (VTR), and 1) marking the clip of the external device to be recorded, and executing the recording from the external device onto the RTD, or 2) marking the recording start point on the external device, and executing the transfer of material from the RTD to the external device. This must be frame accurate.

Backup (LED) - will bring up the menu which controls the setups for the SCSI ports, and the backup and restore operations of the SCSI device; also will be used to set Ethernet address, etc.

Diag/Test (LED) - will bring up the menu which contains all diagnostics and test patterns and routines.

Browse (LED) - in Normal, Clip or Cine Play mode will display clip keyframes. In Seg Play will display the segment keyframes. This button also brings up a menu which will allow other 'browse' choices, such as last frames, next frames, bracket the current frame, etc.

Macros (LED) - brings up the Macro menu for recording and running macros, along with the macro edit sub-menu.

Attached hereto and forming a part hereof is an appendix, consisting of a source code listing in the "C" programming language of a system control and user interface program for the system 10.

Major Advantages over Prior Art

It should now be readily apparent to those skilled in the art that a novel realtime disk system capable of achieving the stated objects of the invention has been provided. In particular, 1) No other disk, PTD (Parallel-Transfer Disk) or otherwise, has both the bandwidth and capacity to store 30 seconds of 10-bit D 1 4:2:2 video in real time.

2) The disk contains 11 data channels, used as 10 channels plus an extra error-protection channel. The video data is also 10-bit precision. This forms a direct match between the video data and the disk data without the use of complicated parallel-to-serial and serial-to-parallel data conversion, as used in the past.

3) Each of the 11 identical disk data channels is built using industry-standard magnetic-disk ICs, which keeps the cost low.

4) Internal control of the system is performed at two levels. The system CPU performs all user interface and high-level functions, while a dedicated disk-processor CPU manages low-level disk functions. This separation of duties greatly facilitates the real-time control implementation.

5) 2-channel operation within a single unit provides the following possibilities: 1 full 4:2:2 channel plus 1 simultaneous 4:0:0 key channel; 2 independent 4:2:2 channels which may record and play at once, to accommodate multiple-generation image compositing; 2 independent users each with their own control panel and disk system; or 1 user may take over the disks of the second user when that user is absent, and thus increase his record time. This provides flexible and cost-effective operation.

6) Record/play time may be increased in 3 ways: more disks may be added up to the bus limit (7 maximum); a 2-channel system can allocate all disks to 1 channel; and multiple units may be chained to provide effectively a single unit with the combined record/play time.

7) A single board can provide alternately real-time smooth-motion processing, noise reduction, frame averaging, or frame integration.

This new apparatus provides multiple improved features as indicated below, in a single piece of hardware.

It should further be apparent to those skilled in the art that various changes in form and details of the invention as shown and described may be made. It is intended that such changes be included within the spirit and scope of the claims appended hereto.

```
/*
 *-----------------------------------------------------------------------------
 * rampex.c      Copyright 1991 Accom Inc.
 *
 *
 * Responsible Person: Jeffrey Wu
 *
 * This file contains code to receive/transmit messages from/to ampex editor
 * to support the editor remote control.
 *
 *-----------------------------------------------------------------------------
 */
#include        "rglobal.h"
#include        "rcom.h"
#include        "rtime.h"
#include        "rdisk.h"
#include        "rampex.h"
#include        "rui.h"
#include        "rmacro.h"

/*
 * This routine receives and analyze messages from Ampex ACE editor
 * Called from vertical interrupt.
 * !! We should arrange the DPRAM configuration so that, same item for
 * different port will have a fixed offset, this way coding is easier.
 * For now, bPortNo is called with 1( COM2 ).
 */
        void
RtRxMsgAmpex( bPortNo )
                                UINT8   bPortNo;
{
                                UINT8   bRxReady;
                                UINT8   rbMsg[32];      /* Ampex msg size max per fr is 20*/
                                UINT8   bnByte;         /* # of bytes for this msg      */
        register        UINT16  i;
                                UINT8   bnMsgReceived;
        /*
         * If not selected, return.
         * !! We may want to display in remote menu: "Unselected" .
         */
        if( !ReadComByte( I_SELECTED_COM2 ) )
                return;
        /*
         * In Ampex mode, Com Processor still sets up I_MSG_CNT_COM2?
         * If no data received, return.
         *
         */
        bRxReady                        = ReadComByte( I_RX_READY );
        if( !( bRxReady & RX_READY_COM2 ) )
                return;
        /*
         * For Ampex, it is probably always one message and has less than 20 bytes.
         */
        bnMsgReceived                   = ReadComByte( I_MSG_CNT_COM2 );
        /*
         * Handle each message:
         */
        while ( bnMsgReceived )
        {
                if( RxComMsgByte(COM2) != SC_STX )
                        continue;
                bnByte                  =  RxComMsgByte(COM2);
```

```
            for( i = 0; i < bnByte; i++ )
                    rbMsg[i]                    = (UINT8) RxComMsgByte(COM2);
            /*
             * Now Process the message, the total byte count being in bnByte,
             * the msg being in rbMsg[].
             * Then handles all messages bundled in this SC_STX leading string.
             */
        i                                       = 0;
        while( i < bnByte )
        {
                switch( rbMsg[i] )
                {
                default:
                /*      UiSetAndDispStr( 1, ROW_NO_ERR_MSG,
                /*                              "Unknown Ampex Transport Command." );
                */
                        break;
                case S_STATUS:          /* Status request                       */
                        RtSetupStatus();
                        i++;
                        break;
                case S_XSTATUS:         /* Extended status request              */
                        RtSetupXStatus();
                        i++;
                        break;
                case S_DFER:            /* Timeline msg: Defer                  */
                        if( RtInsertOneTlMsg( rbMsg[i+5], &rbMsg[i+6], &rbMsg[i+1] )
                                        != TRUE )
                                return;
                        i                                       += rbMsg[i+5] + 4
+ 2;
                        break;
                case S_TCUE:            /* Timeline msg: Cue TC                 */
                        /*RtCueTc();
                        */
                        i++;
                        break;
                case S_TSTOP:           /* Stop timeline                        */
                        gsIntTl.fRunning                = FALSE;
                        i++;
                        break;
                case S_TCLEAR:          /* "Clear timeline" msg                 */
                        grsTlb[0].tcExec.fUndef = TRUE;
                        i++;
                        break;
                case S_TRUN:            /* "Run timeline" msg                   */
                        gsIntTl.fRunning                = FALSE;
                        TcStrToTc( &rbMsg[i+1], TC_STR_AMPEX, &gsIntTl.tcCurr );
                        gsIntTl.fRunning                = TRUE;
                        i                                       += 5;
                        break;
                case S_TRAN:            /* If caught here, must be Immed. cmd   */
                        if( RtAmpexCtrlRtd( rbMsg[i+1], &rbMsg[i+2] ) != TRUE )
                                return;
                        i                                       += rbMsg[i+1] + 2;
                        break;
                }
        }
        /*
         * Read the command count again in case it has changed
         * Update the cmd count
         */
        bnMsgReceived                           = ReadComByte(I_MSG_CNT_COM2);
        WriteComByte( I_MSG_CNT_COM2, --bnMsgReceived );
    }
    return;
}

/*
 * This routine inserts one timeline msg to timeline buffer
 * !! I think this routine also needs to be done in real-time, so that
 * the tl cmd that's very close to start of timeline can be executed in time.
 */
    FLAG
```

```
RtInsertOneTlMsg( bnMsgByte, pstrMsg, pbBcdTc )
	UINT8		bnMsgByte;
	UINT8		*pstrMsg;
	UINT8		*pbBcdTc;
{
	UINT8		bTcCmpResult;
	TC			tcExec;
	UINT8		iTlb;
	UINT8		i;
	/*
	 * pstr points to 4-byte BCD timecode followed by byte cnt and msg itself.
	 * convert the BCD timecode string to TC( ie our Rtd format timecode ).
	 */
	TcStrToTc( pbBcdTc, TC_STR_AMPEX, &tcExec );
	/*
	 * Find the place to insert, tcExec remains in ascending order.
	 */
	for ( iTlb = 0; grsTlb[iTlb].tcExec.fUndef != TRUE; iTlb++ )
	{
		if( TcCmp( tcExec, grsTlb[iTlb].tcExec, &bTcCmpResult ) != TRUE )
			return( FALSE );
		if ( bTcCmpResult == TC_CMP_1ST_ST_2ND )
			break;
	}
	if ( grsTlb[iTlb].tcExec.fUndef == TRUE )
	{
		/*
		 * Append, but still need to shift EOT only
		 */
		if ( iTlb + 1 >= N_TLB_ENTRY_MAX )
		{
/*			UiSetAndDispStr( 1, ROW_NO_ERR_MSG, "Timeline Buffer Full." );
*/
			return( FALSE );
		}
		else
			grsTlb[iTlb+1].tcExec.fUndef	= TRUE;
	}
	else
	{
		/*
		 * Here, iTlb is the place to insert.
		 * but first shift all entries behind to make room.
		 * Point to End-Of-Table Marker, start moving backwards.
		 */
		for ( i = 0; grsTlb[i].tcExec.fUndef != TRUE; i++ );

		if ( i + 1 >= N_TLB_ENTRY_MAX )
		{
/*			UiSetAndDispStr( 1, ROW_NO_ERR_MSG, "Timeline Buffer Full." );
*/
			return( FALSE );
		}
		for ( ; i >= iTlb; i-- )
			grsTlb[i+1]				= grsTlb[i];
		/*
		 * Now, insert the msg in index "iTlb" of the Timeline Buffer Table.
		 */
		grsTlb[iTlb].tcExec			= tcExec;
		for( i = 0; i < bnMsgByte; i++ )
			grsTlb[iTlb].rbMsg[i]	= *pstrMsg++;
	}
	return( TRUE );
}
/*
 * The routine handles the editor ctrl of the RTD
 */
	FLAG
RtAmpexCtrlRtd( bnMsgByte, pstrMsg )
	UINT8		bnMsgByte;
	UINT8		*pstrMsg;
{
	UINT8		iChar;
	/*
	 * Must loop to catch all tr cmds hidden under this S_TRAN
```

```
 */
iChar                    = 0;
while( iChar < bnMsgByte )
{
        switch( pstrMsg[iChar] )
        {
        default:
/*              UiSetAndDispStr( 1, ROW_NO_ERR_MSG,
/*                                    "Does Not Support This Command Currently." );
*/
                break;
        case ST_READY:           /* Turn scanner on/off                       */
        case ST_EE:                      /* Control Tape/EE                   */
        case ST_CF:                      /* Set color framer mode             */
        case ST_LTC:             /* Retired, no longer used by Ampex          */
        case ST_VITC:            /* Retired, no longer used by Ampex          */
        case ST_EDMODE:          /* Set edit mode                             */
        case ST_ENABLE:          /* Control channel enable                    */
        case ST_TCMODE:          /* Control timecode generator                */
        case ST_SPEED:           /* Control transport speed                   */
        case ST_TCG:             /* Load timecode generator                   */
        case ST_LDUBG:           /* Load user bit generator                   */
        case ST_STOP:            /* Stop the transport                        */
                if( ( gwRt3State & RT3_DISK_STATE ) !=  RT3_DISK_IDLE )
                {
                        gfPlayAborted = TRUE;
                        gfRecAborted = TRUE;
                }
                break;

        case ST_PLAY:            /* Enter play mode                           */
                rcMacroBtnMsgPacket[1] = BUTTONDOWN_CHAR;
                rcMacroBtnMsgPacket[2] = '2';     /* Play fwd button msg   */
                rcMacroBtnMsgPacket[3] = '0';
                RxOneMsgCp( rcMacroBtnMsgPacket );
                rcMacroBtnMsgPacket[1] = BUTTONUP_CHAR;
                rcMacroBtnMsgPacket[2] = '2';
                rcMacroBtnMsgPacket[3] = '0';
                RxOneMsgCp( rcMacroBtnMsgPacket );
                break;

        case ST_ROLL:            /* Play and synchronize to external ref   */
        case ST_TSO:             /* Play tape speed overwrite                 */
        case ST_VARPLAY:         /* Variable play mode                        */
        case ST_SHUTTLE:         /* Shuttle, also used for fast fwd/rev    */
        /*      Shuttle();               /* !! right now, it toggles, NO way!!   */
        case ST_PREROLL:         /* Transport preroll duration                */
        case ST_SYNC:            /* Sync point. Mark a sync pt for cue     */
        case ST_CONTROL:         /* Ctrl pt. Mark sync pt 4 non-std play   */
        case ST_CUE:             /* Cue cmd. Cue to a "park" position      */
        case ST_SEARCH:          /* Search to an exact position               */
        case ST_ENTRY:           /* Channel record entry                      */
                break;                   /* !! Need to maintain ALL_CH status */
        case ST_EXIT:            /* Channel record exit                       */
                break;
        case ST_CHASE:           /* Chase a moving target,ampx vtr don't   */
        case ST_RDREADY:         /* Read ready status                         */
        case ST_RDEE:            /* Read Tape/EE status                       */
        case ST_RDCF:            /* Read color framer status                  */
        case ST_RDLTC:           /* Retired. Read LTC on/off                  */
        case ST_RDVITC:          /* Retired. Read VITC on/off                 */
        case ST_RDEDMODE:        /* Read edit mode status                     */
        case ST_RDENABLE:        /* Read Channel enables                      */
        case ST_RDTCMODE:        /* Read TC generator mode                    */
        case ST_RDSPEED:         /* Read speed                                */
        case ST_RDTCG:           /* Read TC generator                         */
        case ST_RDUB:            /* Read the TC user bits off tape            */
        case ST_FJOG:            /* Jog fwd one frame                         */
        case ST_RJOG:            /* Jog rev one frame                         */
        case ST_ACCURACY:        /* Syncronism frame accuracy window          */
        case ST_TMLOAD:          /* Load current time src                     */
        case ST_NBASE:           /* Read machine standard                     */
        case ST_CFSEL:           /* Color framer source selection          */
        case ST_RDCFSRC:         /* Read color framer source selection     */
        case ST_TMSEL:           /* Select current time source                */
        case ST_RDTMSEL:         /* Read curr time source                     */
```

```
            case ST_REELSEL:        /* Reel Select, Ampex VTR don't support  */
            case ST_RDREEL:         /* Read reel select. Ampex VTR don't     */
            case ST_HSMUTE:         /* High spd mute, Ampex VTR don't        */
            case ST_RDHSMUTE:       /* Read hs mute, Ampex VTR don't         */
            case ST_EDFIELD:        /* Select edit field                     */
            case ST_RDEDFIEL:       /* Read the selected edit field          */
            case ST_TLSRC:          /* Timeline source select                */
            case ST_SLEW:           /* Slew fwd or rev a number of frames    */
            case ST_STILL:          /* AST play type when stopped( fr/fd )   */
            case ST_RDUBG:          /* Read curr active usr bit generator    */
            case ST_AUXDSEL:        /* Aux data select. Ampex VTR don't      */
            case ST_RDAUXDSE:       /* Read aux data select.Ampex VTR don't  */
            case ST_AUXDLOAD:       /* Aux data load. Ampex VTR don't        */
            case ST_AUXDREAD:       /* Aux data read. Ampex VTR don't        */
            case ST_CHARGEN:        /* Ctrl char generator display           */
            case ST_RDCHARGE:       /* Read char generator mode              */
            case ST_RDTLSEL:        /* Read timeline source                  */
            case ST_RDVLINE:        /* Read VITC record lines                */
            case ST_RDEDONE:        /* Read last ch to go in rec while in ed*/
            case ST_RDSTILL:        /* Read AST playback mode when stopped   */
            case ST_FFDJOG:         /* Jog fwd one field                     */
            case ST_RFDJOG:         /* Jog rev one field                     */
            case ST_RDCFFLD:        /* Read off tape color frame field       */
            case ST_REHMODE:        /* Rehearse mode                         */
                    break;
            }
            /*
             * !! advance index for each case
             */
        }
        return( TRUE );
}
/*
 * This routine sets up the status and loads the buffer before sending.
 */
        void
RtSetupStatus()
{
        register        UINT16  i;
                                TC              tcCurrPosition;
                                UINT8   rbStatus[6];
        /*
         * Byte 0..3 indicates the current disk position.
         * !! How do we decide fDropFrame? By a global flag?
         */
        tcCurrPosition.lFieldNo         = gwFieldNum;
        tcCurrPosition.fDropFrame       = FALSE;
        tcCurrPosition.fUndef           = FALSE;
        TcToTcStr( tcCurrPosition, TC_STR_AMPEX, &rbStatus[0] );
        /*
         * Byte 4 indicates several status:
         *              TV Standard is NTSC or PAL.
         *              DF or Non-DF
         *              Internal timeline running or not
         *              Timeline buffer full or not
         */
        if( ( gbVideoStd & STD_TV_STD ) == STD_NTSC )
                rbStatus[4]                     |=   F_STD_NTSC;
        else
                rbStatus[4]                     &= ~ F_STD_NTSC;

        if( tcCurrPosition.fDropFrame )
                rbStatus[4]                     |=   F_DF;
        else
                rbStatus[4]                     &= ~ F_DF;

        if( gsIntTl.fRunning )
                rbStatus[4]                     |=   F_TL_RUNNING;
        else
                rbStatus[4]                     &= ~ F_TL_RUNNING;

        for ( i = 0; grsTlb[i].tcExec.fUndef != TRUE; i++ );
        if ( i == N_TLB_ENTRY_MAX - 1 )
                rbStatus[4]                     |=   F_TLB_FULL;
        else
                rbStatus[4]                     &= ~ F_TLB_FULL;
```

```
        /*
         * Byte 5 indicates RTD transport mode
         */
        if( grfLedStatus[SHUTTLE_LED] && gwPlaySpd != 0 )
        {
                if( gfFwdAtEnd )
                        rbStatus[5]             = TR_FAST_FWD;
                else
                if( gfRevAtEnd )
                        rbStatus[5]             = TR_REWIND;
                else
                        rbStatus[5]             = TR_SHUTTLING;
        }
        else
        if( ( gwRt3State & RT3_DISK_STATE )     == RT3_PLAYING )
                rbStatus[5]                     = TR_PLAYING;
        else
        if( ( gwRt3State & RT3_DISK_STATE )     == RT3_RECORDING )
                rbStatus[5]                     = TR_RECORDING;
        else
        if( ( gwRt3State & RT3_DISK_STATE )     == RT3_DISK_IDLE )
                rbStatus[5]                     = TR_STOPPED;

        RtLoadMsgCom( COM2, &rbStatus[0], 6 );
        return;
}
/*
 *      This routine sets up the extended status and loads the buffer before sending
 */
        void
RtSetupXStatus()
{
        UINT8   rbXStatus[4];

        rbXStatus[0]                    = TY_MACHINE_TR;
        rbXStatus[1]                    = 0x00; /* All Ampex VTR returns 0x00          */
        rbXStatus[2]                    = 0x01; /* Amp VTR returns diff #, none do 0x01 */
        rbXStatus[3]                    = 0x00; /* No error                            */
        RtLoadMsgCom( COM2, &rbXStatus[0], 4 );
        return;
}
/*
 * This routine loads pMsg contents for bnBytes bytes into grsOutBuf[bPortNo]
 * before it was send to the Dp Ram.
 * grsOutBuf[bPortNo] may contain something already, so just append pMsg in it.
 * The iOutBufCurr in grsOutBuf[bPortNo] points to the next available location
 */
        FLAG
RtLoadMsgCom( bPortNo, pMsg, bnBytes )
        UINT8   bPortNo;
        UINT8   *pMsg;
        UINT8   bnBytes;
{
                                UINT8   iOutBufCurr;
        register        UINT8   i;

/*      if( pMsg == NULL )
/*              UiSetAndDispStr( 1, ROW_NO_ERR_MSG, "No Messgage To Send.");
*/


/*      if( grsOutBuf[bPortNo].iOutBufCurr + bnBytes > (UINT8)S_COM_PORT_OUT_BUF )
/*              UiSetAndDispStr( 1, ROW_NO_ERR_MSG, "Output Buffer Overflow.");
*/

        iOutBufCurr                                     = grsOutBuf[bPortNo].iOutBufCurr;
        for( i = 0 ; i < bnBytes; i++ )
                grsOutBuf[bPortNo].rbOutBuf[iOutBufCurr + i]    = pMsg[i];
        grsOutBuf[bPortNo].iOutBufCurr  += bnBytes;
        return( TRUE );
}
/*
 * This routine transmit message to Ampex ACE editor
 */
        void
```

```
RtTxMsgAmpex( bPortNo )
        UINT8   bPortNo;
{
        register        UINT8   i;
        /*
         * Add the "header"
         */
        grsOutBuf[bPortNo].rbOutBuf[0]    = SC_STX;
        grsOutBuf[bPortNo].rbOutBuf[1]    = grsOutBuf[bPortNo].iOutBufCurr;
        /*
         * Send it out ( don't use TxComMsg(), it is for Cp ).
         */
        TxComMsgByte( bPortNo, grsOutBuf[bPortNo].rbOutBuf[0] );
        TxComMsgByte( bPortNo, grsOutBuf[bPortNo].rbOutBuf[1] );
        for( i = 0; i < grsOutBuf[bPortNo].rbOutBuf[1]; i++ )
                TxComMsgByte( bPortNo, grsOutBuf[bPortNo].rbOutBuf[2+i] );
        /*
         * !! We should have a counter part of Receive Ready for Main to let
         * Comm Porcessor know that something is ready in Dp Ram to send out.
         */
        /*
         * Reset the index to 2
         */
        grsOutBuf[bPortNo].iOutBufCurr  = 2;
        return;
}


/*
 *-----------------------------------------------------------------------
 *  rclip.c     Copyright 1991 Accom Inc.
 *
 *      Responsible Person: Kevin Hsu
 *
 *      This file contains routines for clip list management.
 *-----------------------------------------------------------------------
 */
#include "rglobal.h"
#include "rui.h"
#include "rclip.h"
#include "rdisk.h"

/*
 * local FUNCTION PROTOTYPE declaration.
 */
static void MoveClipTableDown( void );
static void MoveClipTableUp( void );
static void DispClipTable( UINT8 );
static void     DispClipParameter( UINT8, UINT8 );

        void
ShowClip()
{
        DispClipParameter( bCurrClipNo, 4 );
}

        void
ScrollClipTable( bScrollDir )
        UINT8 bScrollDir;
{
        switch ( bScrollDir )
        {
                case SCROLL_DOWN:
                        MoveClipTableDown();
                        break;

                case SCROLL_UP:
                        MoveClipTableUp();
        }
}

        static void
MoveClipTableDown()
{
        if ( GetClipData( CLIP_NO, (UINT8) (bCurrClipNo + 1) ) != EOT )
        {
```

```
                bCurrClipNo++;
                fDontDispClip = FALSE;
        }
        else
                fDontDispClip = TRUE;
        DispClipTable( bCurrClipNo );
}

        static void
MoveClipTableUp()
{
        if ( bCurrClipNo > 0 )
                bCurrClipNo--;
        DispClipTable( bCurrClipNo );
}

        static void
DispClipTable( bCurrClipNo )
        UINT8   bCurrClipNo;
{
        DispClipParameter( bCurrClipNo, 4 );
        UiDispHighLight( HIGH_LIGHT_CLIP, 4 );

        if ( bCurrClipNo == 0 )
                UiClearSpecifiedLine( LINE_3 );
        else
                DispClipParameter( bCurrClipNo, 3 );

        if ( fDontDispClip == TRUE )
                UiClearSpecifiedLine( LINE_5 );
        else
                DispClipParameter( bCurrClipNo, 5 );
}

        static void
DispClipParameter( bCurrClipNo, bYPos )
        UINT8   bCurrClipNo;
        UINT8   bYPos;
{
        PrintDec( gStr1, (UINT16) GetClipData( CLIP_NO, bCurrClipNo ), 3, 0, 255 );
        UiDispStr( gStr1, 1, bYPos );
        UiDispFieldCntAsTc( (UINT16) GetClipData( REC_START, bCurrClipNo ), 6, bYPos, FALSE, FALSE
);
        UiDispFieldCntAsTc( (UINT16) GetClipData( REC_END, bCurrClipNo ), 15, bYPos, FALSE, FALSE
);
}


/*
 *------------------------------------------------------------------------
 *  rcom.c      Copyright 1991 Accom Inc.
 *
 *      Responsible Person: Jeffrey Wu
 *
 *  This file contains RS-422 serial port send & receive routines.
 *------------------------------------------------------------------------
 */
#include "rglobal.h"
#include "rcom.h"
#include "rhw.h"
#include "rui.h"

static UINT8                    riRxBuf[N_COM_PORT];
static UINT8                    riTxBuf[N_COM_PORT];

UINT8   volatile                bnMsgReceived[N_COM_PORT];

/*
 * MACRO operation.
 */
static UINT32                   liIdle = 0;

/*
 * Returns 0 if port address is busy, 1 if NOT busy
 */
```

```
#define PORT_BUSY_COM0  ( ReadRtdReg(RT2, STS_REG) & R2_BUSY_COM0 )
#define PORT_BUSY_COM1  ( ReadRtdReg(RT2, STS_REG) & R2_BUSY_COM1 )
/*
 * This routine sends a whole string of bytes out to serial port bPortNo.
 * it does the job by calling TxComMsgByte() which sends one byte out
 */
        void
TxComMsg( bPortNo, pstrMsg )
        UINT8           bPortNo;
        UINT8           *pstrMsg;
{
        while( *pstrMsg )
                TxComMsgByte(bPortNo, *pstrMsg++);
}

/*
 * This routine receive a message byte from serial port bPortNo
 *
 *      Characters are transmitted by putting them into certain areas of the Dual
 *      Port RAM. There are 3 - 256 byte transmit buffers, 1 for each of the 3
 *      COM Ports. A 1 byte offset into each buffer is used to point to the next
 *      location to put a transmit character.
 *
 *      In setting up a character to be sent, the Main uP, will write the byte and
 *      then move its write pointer.
 *
 *      The Communication Processor checks the byte at its read pointer and as soon
 *      as it sees a non-zero character present, it sends it out and moves the
 *      pointer to the next byte.
 */
        void
TxComMsgByte( bPortNo, bDataToSend )
        UINT8   bPortNo;
        UINT8   bDataToSend;
{
        switch( bPortNo )
        {
        case COM1:
                QueueComByte( BASE_TX_COM1 + riTxBuf[COM1], bDataToSend );
                riTxBuf[COM1]++;
#if 1
                QueueComByte( BASE_TX_COM1 + riTxBuf[COM1], NULL );
#endif
                break;

        case COM2:
                QueueComByte( BASE_TX_COM2 + riTxBuf[COM2], bDataToSend );
                riTxBuf[COM2]++;
#if 1
                QueueComByte( BASE_TX_COM2 + riTxBuf[COM2], NULL );
#endif
                break;

        case COM3:
                QueueComByte(BASE_TX_COM3 + riTxBuf[COM3], bDataToSend );
                riTxBuf[COM3]++;
#if 1
                QueueComByte(BASE_TX_COM3 + riTxBuf[COM3], NULL );
#endif
                break;
        }
}

/*
 * This routine receive a message byte from serial port bPortNo
 */
        UINT8
RxComMsgByte( bPortNo )
        UINT8 bPortNo;
{
        UINT8           bDataRecved;                            /* Data Byte received    */

        switch ( bPortNo )
        {
        case COM1:
                /*
```

```
            * Read the data byte, if it is NULL char, then return;
            * Else, clear that location in receive buffer and advance the index.
            * RxBuf index will auto wrap-around. GREAT!
            */
           bDataRecved = ReadComByte(BASE_RX_COM1 + riRxBuf[COM1]);
           if ( !bDataRecved )
                   return(NULL);

                WriteComByte(BASE_RX_COM1 + riRxBuf[COM1], NULL);
                riRxBuf[COM1]++;
                break;

        case COM2:
                bDataRecved = ReadComByte(BASE_RX_COM2 + riRxBuf[COM2]);
                if ( !bDataRecved )
                        return(NULL);

                WriteComByte(BASE_RX_COM2 + riRxBuf[COM2], NULL);
                riRxBuf[COM2]++;
                break;

        case COM3:
                bDataRecved = ReadComByte(BASE_RX_COM3 + riRxBuf[COM3]);
                if ( !bDataRecved )
                        return(NULL);

                WriteComByte(BASE_RX_COM3 + riRxBuf[COM3], NULL);
                riRxBuf[COM3]++;
                break;
        }

        /*
         * Return the data byte received
         */
        return(bDataRecved);
}


/*
 * Read a byte from DP RAM and test the busy line for conflict
 */
        UINT8
ReadComByte( woffAddr  )
        UINT16  woffAddr;
{
        /*
         * Read the byte from the specified index into the DP RAM.
         */
        return ((UINT8) *ABS_ADDR( COM_SEG, (woffAddr << 1) ));
}


/*
 * Write a byte to DP RAM and test the busy line for conflict
 */
        void
WriteComByte( woffAddr, bDataToWrite )
        UINT16  woffAddr;
        UINT8   bDataToWrite;
{
        /*
         * Write the byte !
         */
        *ABS_ADDR(COM_SEG, (woffAddr << 1) ) = (UINT16) bDataToWrite;
}


/*
 * Write a character to DP RAM data queue, the location is first
 * read to ensure that the queue is not full.
 */
        void
QueueComByte( woffAddr, bDataToQueue )
        UINT16  woffAddr;
        UINT8   bDataToQueue;
```

```
{
        UINT16          wcntTry = 500;

        /*
         * Read the byte to make sure the queue isn't full
         */
        while ( ReadComByte( woffAddr ) && wcntTry-- );

        /*
         * Write the byte into Queue
         */
        *ABS_ADDR( COM_SEG, (woffAddr << 1) ) = (UINT16) bDataToQueue;
}

static UINT8 DispStr[7];;;;;

/*
 *  This is non real-time and is for control panel( COM1 ) only.
 *      Receive messages from the receive buffer and post events.
 */
        FLAG
RxMsgCp()
{
        UINT8   bComMode;
        UINT8   bRxReady;
        UINT8   rbMsg[32];      /* What's the max cp msg size? */
        /* don't know the max size yet, floppy disk will dictate */

        UINT8   *pstrMsg;
        UINT8   bRxChar;


        /*
         *  Make sure COM1 is configured as control panel.
         */
        bComMode                                = ReadComByte( I_COM_MODE );
        if( ( bComMode & COM_MODE_MASK_COM1 ) != COM_MODE_CMD_COM1 )
        {
                UiSetAndDispStr( 1, ROW_NO_ERR_MSG,
                                                        "COM1 Not Configured As Control
Panel." );
                return( FALSE );
        }
        /*
         * Clear the message count
         */
        bnMsgReceived[COM1]     = 0;

        /*
         * Check if data received in COM1
         * If so, read the message count in bnMsgReceived.
         */
        bRxReady                                = ReadComByte( I_RX_READY );


        /*
         * MACRO operation.
         */
        if ( bRxReady & RX_READY_COM1 )
                bnMsgReceived[COM1] = ReadComByte( I_MSG_CNT_COM1 );
        else
        {
                if (( gfRunMacro == TRUE ) && ( gfLoadMacro == TRUE ))
                {
                        if ( gfLoadMacroForEncoder == TRUE )
                        {
                                LoadMacroInMsgPacketForEncoder();
                        }
                        else
                                LoadMacroInMsgPacket();
                }
                else if (( gfRunMacro == TRUE ) && ( gfLoadMacro == FALSE ) &&
                                ( gfResumeMacroPlay == TRUE ))
                {
```

```
                ResumeMacroPlay();
                glPlayFirstTicks = GetTicks();
                gfResumeMacroPlay = FALSE;
        }
        return(TRUE);
}

/*
 * Handle each message:
 * Validate and pass only good string to PostEventCp() to post event.
 */
while ( bnMsgReceived[COM1] )
{
        pstrMsg = &rbMsg[0];
        while ( bRxChar = (UINT8) RxComMsgByte(COM1) )
        {
                *pstrMsg = bRxChar;                          /* put the new char
in buffer */
                pstrMsg++;                                   /* move the
buffer pointer */
                if ( bRxChar == TERMINATOR )     /* if the end of a message */
                        break;                               /* exit now
*/
        }

        *pstrMsg = '\0';

        /*
         * MACRO operation.
         */
        if ( gsUiState.eCurrMode == MACRO )
        {
                if (( rbMsg[1] == 'K' ) && ( rbMsg[2] == '3' ) && ( rbMsg[3] == '9' ))
                {
                        while ( lIdle++ < 40000 );
                        lIdle = 0;
                }
        }

        if (( gfRunMacro == TRUE ) && ( gfPauseMacro == FALSE ))
        {
                switch ( rbMsg[1] )
                {
                        case 'K':
                                glPlayTime -= ( GetTicks() - glPlayFirstTicks );
                                if (( rbMsg[2] != '1' ) || ( rbMsg[3] != 'F' ))
                                        LoadStopMacro();
                                gfPauseMacro = TRUE;
                                break;

                        case 'U':
                                break;

                        default:
                                return(TRUE);
                }
        }

        RxOneMsgCp( &rbMsg[0] );
        /*
                 * Read the command count again in case it has changed
                 */
                bnMsgReceived[COM1] = ReadComByte(I_MSG_CNT_COM1);
                /*
                 * Update the cmd count
                 */
                WriteComByte( I_MSG_CNT_COM1, --bnMsgReceived[COM1] );
        }
        return( TRUE );
}

        FLAG
RxOneMsgCp( prbMsg )
        UINT8   *prbMsg;
{
```

```
                        EVENT   eMsg;
                        FLAG    fGoodStr = FALSE;
                        UINT16  wsMsg;
    register    UINT8   *pstrMsg;

    /*
     *      !! For debugging, may do TxComMsg( COM1, rbMsg ) to echo recved str
     * Validate first byte.
     */
    if( prbMsg[0] != ORIGINATOR )
    {
/*          UiSetAndDispStr( 1, ROW_NO_ERR_MSG,
/*                                                  "Invalid Control Panel Message."
);
*/
            return( FALSE );
    }

    /*
     * Find length of string
     */
    pstrMsg = prbMsg;
    while (*pstrMsg++ != '\0');
    wsMsg = pstrMsg - prbMsg;

    switch ( prbMsg[1] )
    {
    case BUTTONDOWN_CHAR:
            eMsg            = BUTTONDOWN_EVENT;
            fGoodStr        = (FLAG)( wsMsg == sizeof( BUTTONDOWN_MSG ));
            break;

    case BUTTONUP_CHAR:
            eMsg            = BUTTONUP_EVENT;
            fGoodStr        = (FLAG)( wsMsg == sizeof( BUTTONUP_MSG ));
            break;

    case ENCODER_CHAR:
            eMsg            = ENCODER_EVENT;
            fGoodStr        = (FLAG)( wsMsg == sizeof( ENCODER_MSG ));
            break;

    case POWERUP_CHAR:
            eMsg            = POWERUP_EVENT;
            fGoodStr        = (FLAG)( wsMsg == sizeof( POWERUP_MSG ));
            break;

    case VERSION_CHAR:
            eMsg            = VERSION_EVENT;
            fGoodStr        = (FLAG)( wsMsg == sizeof( VERSION_MSG ));
            break;
    case REGREAD_CHAR:
            eMsg            = REG_READ_EVENT;
            fGoodStr        = (FLAG)( wsMsg == sizeof( READ_REG_MSG ));
            break;

    case REGWRITE_CHAR:
            eMsg            = REG_WRITE_EVENT;
            fGoodStr        = (FLAG)( wsMsg == sizeof( WRITE_REG_MSG ));
            break;

    default:
#if 0       /* JIF 10/17    */
            UiSetAndDispStr( 1, ROW_NO_ERR_MSG,
                                                    "Invalid Control Panel Message."
);
#endif  /* JIF 10/17    */
            return( FALSE );
    }
    if( fGoodStr )
    {
            PostEventCp( eMsg, prbMsg );
            gsUiState.fCPConnect = TRUE;
    }
    return( TRUE );
}
```

```
/*
 * This routine initialize all three COM ports to CMD mode ( ie. Control Panel )
 * reset the TX/RX buffer indexes and set up the baud rate, # of stop bits,
 * parity, # of bits per character.
 */
        void
InitCom()
{
        UINT16  wcntTimeOut;

        /*
         * Clear the ready flag to initialize a communication processor reset
         */
        WriteComByte(I_MAIN_READY_4COM, F_NOT_READY);

        wcntTimeOut = 10000;
        /*
         * Wait until the communication processor sees the reset
         */
        while ( (ReadComByte(I_COM_READY) != F_NOT_READY) && --wcntTimeOut );

        riTxBuf[COM1] = riTxBuf[COM2] = riTxBuf[COM3] = 0;
        riRxBuf[COM1] = riRxBuf[COM2] = riRxBuf[COM3] = 0;

        WriteComByte(I_I_TX_BUF_COM1, riTxBuf[COM1]);
        WriteComByte(I_I_TX_BUF_COM2, riTxBuf[COM2]);
        WriteComByte(I_I_TX_BUF_COM3, riTxBuf[COM3]);
        WriteComByte(I_I_RX_BUF_COM1, riRxBuf[COM1]);
        WriteComByte(I_I_RX_BUF_COM2, riRxBuf[COM2]);
        WriteComByte(I_I_RX_BUF_COM3, riRxBuf[COM3]);

        /*
         * Set up as command mode
         */
        WriteComByte( I_COM_MODE,
                        COM_MODE_CMD_COM1 | COM_MODE_CMD_COM2 | COM_MODE_CMD_COM3 );

#if 1           /* use 9600 for test only */

        WriteComByte(I_CONFIG_COM1,
                        BAUD_38400 | S_CHAR_8_BITS | PARITY_NONE | N_STOP_BIT_1);
        WriteComByte(I_CONFIG_COM2,
                        BAUD_38400 | S_CHAR_8_BITS | PARITY_NONE | N_STOP_BIT_1);
        WriteComByte(I_CONFIG_COM3,
                        BAUD_38400 | S_CHAR_8_BITS | PARITY_NONE | N_STOP_BIT_1);

#else           /* use 9600 for test only */

        WriteComByte(I_CONFIG_COM1,
                        BAUD_9600 | S_CHAR_8_BITS | PARITY_NONE | N_STOP_BIT_1);
        WriteComByte(I_CONFIG_COM2,
                        BAUD_9600 | S_CHAR_8_BITS | PARITY_NONE | N_STOP_BIT_1);
        WriteComByte(I_CONFIG_COM3,
                        BAUD_9600 | S_CHAR_8_BITS | PARITY_NONE | N_STOP_BIT_1);

#endif          /* use 9600 for test only */

        /*
         * Set the ready to flag to tell communication processor it's ready
         */
        WriteComByte(I_MAIN_READY_4COM, F_READY );

        wcntTimeOut = 10000;
        /*
         * Wait until the communication processor becomes ready
         */
        while ( (ReadComByte(I_COM_READY) != F_READY) && --wcntTimeOut );
}

/*
 * This routine is called from UI remote control menu when
 * user selects a controller device for one of the port.
 */
        FLAG
```

```
SetupComAmpex( bPortNo )
        UINT8           bPortNo;
{
        UINT8           bComMode;
        UINT16  wcntTimeOut;

        if( bPortNo == COM1 )
                return( FALSE );
        if( bPortNo >= N_COM_PORT )
                return( FALSE );
        /*
         * Set Mode Register byte in DPRAM to Ampex/SMPTE Mode.
         */
        bComMode                                = ReadComByte( I_COM_MODE );
        /*
         * Here, bPortNo can only be 1( COM2 ) or 2( COM3 ).
         */
        if( bPortNo == COM2 )
        {
                bComMode                &= ~COM_MODE_MASK_COM2;
                bComMode                |=  COM_MODE_AMPEX_COM2;
        }
        else
        if( bPortNo == COM3 )
        {
                bComMode                &= ~COM_MODE_MASK_COM3;
                bComMode                |=  COM_MODE_AMPEX_COM3;
        }
        WriteComByte( I_COM_MODE, bComMode );
        /*
         * Put RTD's Smpte addr at the 2 byte index I_OUR_ADDR_COMx for Com
         * processor to see.
         * When outside controller selects RTD, Com processor will check this info.
         */
         if( bPortNo == COM2 )
         {
                WriteComByte( I_OUR_ADDR_HI_COM2, SMPTE_ADDR_HI_RTD );
                WriteComByte( I_OUR_ADDR_LO_COM2, SMPTE_ADDR_LO_RTD );
         }
         else
         if( bPortNo == COM3 )
         {
                WriteComByte( I_OUR_ADDR_HI_COM3, SMPTE_ADDR_HI_RTD );
                WriteComByte( I_OUR_ADDR_LO_COM3, SMPTE_ADDR_LO_RTD );
         }
         /*
          * Clear the TX/RX buffer index, and  set up the com parameters.
          * !! Do we need to clear the MainReady flag( see top of InitCom() )?
          * it might destroy communication with other ports.
          */
         if( bPortNo == COM2 )
         {
                riTxBuf[COM2] = riRxBuf[COM2] = 0;
                WriteComByte(I_I_TX_BUF_COM2, riTxBuf[COM2]);
                WriteComByte(I_I_RX_BUF_COM2, riRxBuf[COM2]);
                WriteComByte(I_CONFIG_COM2,
                        BAUD_38400 | S_CHAR_8_BITS | PARITY_ODD | N_STOP_BIT_1);
         }
         else
         if( bPortNo == COM3 )
         {
                riTxBuf[COM3] = riRxBuf[COM3] = 0;
                WriteComByte(I_I_TX_BUF_COM3, riTxBuf[COM3]);
                WriteComByte(I_I_RX_BUF_COM3, riRxBuf[COM3]);
                WriteComByte(I_CONFIG_COM3,
                        BAUD_38400 | S_CHAR_8_BITS | PARITY_ODD | N_STOP_BIT_1);
         }
         return( TRUE );
}


/*-----------------------------------------------------------------------------
 * rdisk.c        Copyright 1991 Accom Inc.
 *
 *
```

```
* Responsible Person: Jeffrey Wu
*
* This file contains both high level and low level disk management functions.
*
* A play segment is totally independent of a record clip. It can be any subset
* of a record clip, or it can encompass over two or more record clips. It
* can also starts or ends partially in any subclip.
*
* A play segment list is a group of play segments set up by the user.
* But each time we record, we record a clip, there is no such thing as
* record segment.
*
* OpenRec() is the highest level routine for recording.
*
* Everytime we record a clip or delete a clip, we need to update the
* Clip Table. CloseRec() is the routine to update these tables after
* recording. There is no equivalent of ClosePlay() routine, because there
* is no need to update any tables after playing.
*
* There are four PLAY modes:
*
*       1. Normal play: close-ended play.
*       2. Clip play: Plays a recorded clip.
*       3. Segment play: Plays a segment list.
*       4. Cine play: Plays film.
*
* OpenPlay() and OpenSegPlay() are the highest level routines for playing,
* OpenSegPlay() is for segment play, OpenPlay() is for all other plays. It
* basically does, for each play segment set up by the user,: Examines the
* Clip Table, and set up the Disk Allocation Table ( rsDa[] ) which is
* part of the Play Info Struct. It first locates the play start point in
* one of disk then build one DA entry for one play segment.
*
* When allocating disk to record, we make sure that the length for any
* subclip will be at least FC_DISK_SEEK_ALLOWANCE cylinders (ie.
* minimum disk seek time needed. ) This is so that the next disk to record
* always have enough time to do random access seek, so that real-time record
* will work.
*
* Although protected by this scheme, when user specifies a play segment,
* it can still start in a clip less than FC_DISK_SEEK_ALLOWANCE cylinders
* away from the clip end point, or similarly, ends in a subclip less than
* FC_DISK_SEEK_ALLOWANCE away from the subclip start point. If this occurs,
* random access disk seek will fail, causing real-time play to fail.
* ( because there would not be enough time to seek the next disk to play. )
* This problem is fixed by the routine FixupDaForPlay().
*
* The other problem fixed by FixupDaForPlay() is that when building Disk
* Allocation Table for a play clip, it might extend over to the next record
* clip. Since different record clips're done at different times, it might
* happen that the first disk to play in the next record clip conflicts with
* the last disk to play in the previous record clip, causing not being able
* to perform random access seek and thus failing real time playing. ( because
* same disk can't read and seek at the same time ). In between play clips,
* the same problem may occur too.
*
* The way to solve the above two problems are called "disk cache":
* Each disk will have some "cache" area allocated, any time, the problem
* occurs, we just utilize these temp disk buffers to copy video over and
* create new Disk Allocation Table entry, thus fixing the problem.
*
* The RTD system can support up to 2 disk controller channels.
* Each one will be capable of carrying 7 disks maximum thru the ESDI interface.
* Each disk contains 1923 cylinders.
*
*
* TO DO: Disk Xover direction. ( in IO_CTRL_REG )
*        wFc/lFc type cast UINT16/SINT32 problem.
*               in Rt*(), first frame need to write FS only.
*               what will be max number of clips.
*             !!
*---------------------------------------------------------------------------
*/
#include "rglobal.h"
#include "rhw.h"
```

```
#include "rtime.h"
#include "rdisk.h"
#include "rdiskctl.h"
#include "rui.h"

#define TEST_DISK                                    1

#define NEXT_DISK_SAME                          2       /* One of RtSeekNextDisk() returns*/
#define EXCLUDE_NO_DISK                         0xFF
#define VALUE_SPD_UNDEFINED                     0xFFFF
#define SIGN_SPD_UNDEFINED                      2       /* Be careful, also logical true */

FLAG    gfSetRegAllowed = TRUE;
static  CYL_HEAD                                        sCylHead;
/*
 * Local clip table
 */
static  struct clip                                     rsClip[ N_CLIP_MAX ];


/*
 * Local Locked Record Timeline Table
 */
static  LOCK                                            rsLock[N_DISK_CTRL_MAX][N_LOCK_MAX]
/*=
/*{
/*      { { { (SINT32)0, FALSE, FALSE }, 1800 }, { { (SINT32)0, FALSE, TRUE}, 0} },
/*}
*/
;
/*
 * Record Info Table and Play Info Table
 */
REC_INFO        sRecInfo;
PLAY_INFO       sPlayInfo;
/*
 * Local Bad Surface Table
 *
 * Each entry indicates a bad surface ( head number ), 0 if all good,
 * 1-11 for the bad surface.
 * This table stays the same since power-up.
 */
static  UINT8   rbBadSurface            [N_DISK_CTRL_MAX * N_DISK_PER_CTRL_MAX]
                                                                [N_CYL_PER_DISK] ;

/*
 * Current Cylinder number in disk cache area that are available for use,
 */
static  UINT16  riCacheBuf[N_DISK_CTRL_MAX * N_DISK_PER_CTRL_MAX];
static  FLAG    rfDiskPresent[N_DISK_CTRL_MAX * N_DISK_PER_CTRL_MAX];
/*
 * Format()
 * For each cylinder:
 * A. Call FindBadSurface() to find bad surface in bBadSurface, put in sCylHead.
 * B. Also Set in sCylHead, bClipNo to NULL, wccForClip to NULL, fLocked to
 *        FALSE and wccForLock to NULL.
 * C. Put sCylHead in beginning of FS1, field-1, write whole field back out
 *        to current disk cylinder.
 *
 *
 */
        FLAG
Format()
{
        UINT8           bDiskNo;
        UINT16          wcntTimeout = 50000;
        UINT8           bResult;
        UINT16          wTestCnt;
        UINT16          wCylNo;
        CYL_HEAD        sCylHead;
        UINT8           bBadSurface;
        CYL_HEAD        *pVRam;
        /*
```

```
 * Spin up the disk in sequence to detect the disk's existence
 * and set up rfDiskPresent[].
 * If disk exists, then lock the disk drive with the external sync signal.
 * !! For now, just do for bDiskCtrlNo==0, need to do for bDiskCtrlNo==1 too
 */
UiClearDisp();
/*
 * Before initializing the disks, disk controller has to be ready
 */
do
{
        if ( RxDiskMsgByte( 0, N_DISK_PR_CTRL_MAX,I_DISK_CTRL_READY, &bResult )    ≠

                return( FALSE );
}
while( ( bResult != F_READY ) && ( --wcntTimeout != 0 ) );
if ( bResult != F_READY )
{
        UiSetAndDispStr( 1, ROW_NO_ERR_MSG, "Disk Control 1 not ready." );
        return( FALSE );
}

/*
 * For each disk, send cmd to spin up the disk, wait till it is executed
 */
for ( bDiskNo = DISK1; bDiskNo != N_DISK_PER_CTRL_MAX; bDiskNo++ )
{
        StrCpy( gStr1,  " Initializing Disk " );
        PrintDec( gStr2, bDiskNo+1, 1, 1, 7 );
        StrCat( gStr1, gStr2 );
        UiDispStr( gStr1, 1, (UINT8) (bDiskNo+1) );
        wTestCnt = 200;

        do
        {
                if( TxDiskMsgByte( 0, (UINT8)bDiskNo, I_DISK_CMD, CMD_DISK_SPIN_UP )
                                != TRUE )
                        return( FALSE );
                do
                {
                        if( RxDiskMsgByte( 0, (UINT8)bDiskNo, I_DISK_CMD, &bResult )
                                != TRUE )
                        return( FALSE );
                }
                while ( bResult != CMD_DISK_NULL );

                PrintDec( gStr1, (200-wTestCnt), 3, 0, 200 );
                UiDispStr( gStr1, 23, (UINT8) (bDiskNo+1) );
                /*
                 * Shall we wait for a while here ?
                 * Set up the Disk Presence Table.
                 */
                if( RxDiskMsgByte(0, (UINT8)bDiskNo, I_DISK_PRESENT, &bResult)
                                != TRUE )
                        return( FALSE );
        }
        while ( bResult != TRUE && --wTestCnt);

        rfDiskPresent[ 0 * N_DISK_PER_CTRL_MAX + bDiskNo] = bResult;
        /*
         * If disk present, need to lock the disk drive to the external
         * sync signal.
         */
        if ( rfDiskPresent[0 * N_DISK_PER_CTRL_MAX + bDiskNo] == TRUE )
        {
                UiDispStr( "Present", 23, (UINT8) (bDiskNo+1) );

                wcntTimeout = 60000;
                while ( wcntTimeout-- );

                UiDispStr( "Locking", 36, (UINT8) (bDiskNo+1) );
                do
                {
                        if( TxDiskMsgByte( 0, (UINT8)bDiskNo,
```

```
                I_DISK_CMD, CMD_DISK_SPINDLE_SYNC ) != TRUE )
        return( FALSE );

        RxDiskMsgByte(0, (UINT8)bDiskNo, I_DISK_LOCKED, &bResult);

        /* if disk is not locked, send spindle lock cmd again */
    }
        while ( bResult == FALSE );
        UiDispStr( "Locked ", 36, (UINT8) (bDiskNo+1) );

        wcntTimeout = 60000;
        while ( wcntTimeout-- );

        UiClearDisp();

        StrCpy( gStr1,  "Formatting Disk " );
        PrintDec( gStr2, bDiskNo+1, 1, 1, 7 );
        StrCat( gStr1, gStr2 );
        UiDispStr( gStr1, 5, 1 );
        /*
         * Need to read all 1923 cylinders to determine all bad surfaces .
         */
        for ( wCylNo = 0; wCylNo <  N_CYL_PER_DISK; wCylNo++ )
        {
                StrCpy( gStr1,  "Cyl #" );
                PrintDec( gStr2, wCylNo, 4, 0, 1922 );
                StrCat( gStr1, gStr2 );
                UiDispStr( gStr1, 30, 1);

                StrCpy( gStr1, "Error Count For Cylinder Heads :" );
                UiDispStr( gStr1, 5, 2);

                if( FindBadSurface( 0, bDiskNo, wCylNo, &bBadSurface) != TRUE
)
                        return( FALSE );

                wcntTimeout = 10000;
                while ( wcntTimeout-- );

                sCylHead.bBadSurface            = bBadSurface;
                sCylHead.bClipNo                        = NULL;
                sCylHead.wccForClip                     = NULL;
                sCylHead.fLocked                        = FALSE;
                sCylHead.wccForLock                     = NULL;

                pVRam                                           = (CYL_HEAD
*) BASE_VRAM_RT3;
                *pVRam                                          = sCylHead;
                if( WriteOneCyl( 0, bDiskNo, wCylNo ) != TRUE )
                        return( FALSE );
        }
    }
    else
        UiDispStr( "Not Present", 23, (UINT8) (bDiskNo+1) );
  }
  return( TRUE );
}
/*
 * This routine finds the bad channel for wCylNo on bDiskNo:
 *              Do twice, first time with 0-9 channels, second time 1-10 channels:
 *              ( 1st time, FS register head swap contain 15.( no swap )
 *              ( 2nd time, FS register head swap contain 0.( use 10 to replace 0 )
 *              1. Write the pattern "AAAA" followed by "5555" to FS1, field-1
 *                      until 64K is filled.
 *              2. Write from FS1, field-1 to current disk cylinder.
 *              3. Read from current disk cylinder to FS2, field-1.
 *              4. Do for each word in the first 64K :
 *                      4.1 Read one word at a time, from both FS's, compare 1st 10 bits.
 *                      4.2 If different, bit 0 - 9 corresponds to surface # 2 - 9, 0, 1.
 *                      4.3 Continue until end , list all the different words by surface #.
 *
 * Comp bits : 15       14      13      12      11      10      9       8       7       65
4       3       2       1       0
```

```
 * Video bits:                                         1      0      9      87
6      5      4      3      2
 *
 * The bit # for video bits are the ones to put in head swap parameter, but
 * it may not be the actual head #( surface # ).
 * NOTE: wcntErr[] array index is the VIDEO BIT #.
 */
        FLAG
FindBadSurface( bDiskCtrlNo, bDiskNo, wCylNo, pbBadSurface )
        UINT8           bDiskCtrlNo;
        UINT8           bDiskNo;
        UINT16          wCylNo;
        UINT8           *pbBadSurface;
{
                                UINT16          rwcntErr[11];
                                UINT16          wcntErrMost;
                                UINT8           bBadSurface;
                                UINT16          i;
        register        UINT16          j,k;
                                UINT16          wSrc, wDst, wResult;
                                UINT8           bDataRead;
                                UINT32          lAbsVRamAddr;

        for( k = 0; k < 11; k++ )
                rwcntErr[k]                                     = 0;

        grwOutRegRt3[IO_CTRL_REG]                       &= ~ B_HEAD_SWAP;

        for( i = 0; i < 2 ; i++ )
        {
                if ( i == 0 )
                        grwOutRegRt3[IO_CTRL_REG]       |= 15 << 8;     /* No replace    */
                if ( i == 1 )
                        grwOutRegRt3[IO_CTRL_REG]       |= 0 << 8;      /* Replace #0 with #10
        */
                /*
                 * FS1, field-1 is 1MB, but we just write 32K bytes.
                 */
                for( j  = 0; j < 0x7FFF ; j += 4 )
                {
                /*  !! old way. may not work
                /*      pwVRam  = (UINT16 *) ( RT3_VRAM_PTR + j + 2 );
                /*      *pwVRam = 0x5555;
                */
                        lAbsVRamAddr                            = RT3_VRAM_PTR + j ;
                        *WORD_PTR( lAbsVRamAddr )       = 0xAAAA;
                        lAbsVRamAddr                            = RT3_VRAM_PTR + j + 2 ;
                        *WORD_PTR( lAbsVRamAddr )       = 0x5555;
                }
                /*
                 * Write it to disk.
                 * Select FS1 timing mode
                 * Select FS1 sequential read bit
                 * !! We may need to disable all FS2 bits.
                 * Select field 1 of FS1 to read from
                 */
                grwOutRegRt3[TIMING_REG] &= ~ B_FS1_TIMING;
                grwOutRegRt3[TIMING_REG] |=   V_FS1_READ_FROM_FS_NORM;

                grwOutRegRt3[FS_CTRL_REG]       |=   F_FS1_SEQ_READ;
                grwOutRegRt3[FS_CTRL_REG]       &= ~ F_FS1_SEQ_WRITE;
                grwOutRegRt3[FS_CTRL_REG]       &= ~ F_FS1_SEQ_BYPASS;
                grwOutRegRt3[FS_CTRL_REG]       &= ~ F_FS2_SEQ_READ;
                grwOutRegRt3[FS_CTRL_REG]       &= ~ F_FS2_SEQ_BYPASS;

                grwOutRegRt3[FS_CTRL_REG]       &= ~ F_FS1_FIELD_2;
                if( TxDiskMsgWord( bDiskCtrlNo, (UINT8) bDiskNo,
                                I_DISK_CYL_NO, wCylNo ) != TRUE )
                        return( FALSE );
                if( TxDiskMsgByte( bDiskCtrlNo, (UINT8) bDiskNo,
                                I_DISK_CMD, CMD_DISK_SEEK_N_WRITE ) != TRUE )
                        return( FALSE );
                /*
                 *  Wait till the writing is done
                 */
```

```
while( TRUE )
{
        if( RxDiskMsgByte( bDiskCtrlNo, (UINT8) bDiskNo, I_DISK_CMD,
                &bDataRead) != TRUE )
                return( FALSE );

        if ( bDataRead == CMD_DISK_NULL )
                break;
}
/*
 * Read it back from disk.
 * Select disk video instead of input video for writing to Fs
 * Select FS2 timing mode
 * Select FS2 sequential write bit
 * !! We may need to disable all FS1 bits.
 * Select field 1 of FS2 to write to
 */
grwOutRegRt3[IO_CTRL_REG]       &= ~ F_INPUT_TO_FS;
grwOutRegRt3[IO_CTRL_REG]       |=   F_DISK_TO_FS;

grwOutRegRt3[TIMING_REG] &= ~ B_FS2_TIMING;
grwOutRegRt3[TIMING_REG] |=   V_FS2_DISK_TO_FS_NORM;

grwOutRegRt3[FS_CTRL_REG]       |=   F_FS2_SEQ_WRITE;
grwOutRegRt3[FS_CTRL_REG]       &= ~ F_FS2_SEQ_READ;
grwOutRegRt3[FS_CTRL_REG]       &= ~ F_FS2_SEQ_BYPASS;

grwOutRegRt3[FS_CTRL_REG]       &= ~ F_FS2_FIELD_2;

if( TxDiskMsgWord( bDiskCtrlNo, (UINT8) (bDiskNo ),
                I_DISK_CYL_NO, wCylNo ) != TRUE )
        return( FALSE );
if( TxDiskMsgByte( bDiskCtrlNo, (UINT8) (bDiskNo ),
                I_DISK_CMD, CMD_DISK_SEEK_N_READ ) != TRUE )
        return( FALSE );
/*
 * Wait till reading is done.
 */
while( TRUE )
{
        if( RxDiskMsgByte( bDiskCtrlNo, (UINT8) bDiskNo, I_DISK_CMD,
                &bDataRead) != TRUE )
                return( FALSE );

        if ( bDataRead == CMD_DISK_NULL )
                break;
}
/*
 * Now, compare all 32K bytes on a word basis.
 */
for( j  = 0; j < 0x7FFF ; j += 2 )
{
/*      pwVRam          = (UINT16 *) ( BASE_VRAM_RT3 + j );
/*      wSrc            = *pwVRam;
/*      pwVRam      += S_VRAM_EACH_FRAME;
/*      wDst            = *pwVRam;
*/
                lAbsVRamAddr                            = RT3_VRAM_PTR + j ;
                wSrc                                    = *WORD_PTR( lAbsVRamAddr
);
                lAbsVRamAddr                            =  RT3_VRAM_PTR   +   j   +
S_VRAM_EACH_FRAME;
                wDst                                    = *WORD_PTR( lAbsVRamAddr
);

                if( wSrc != wDst )
                {
                        /*
                         * If first time ( no swap ),
                         * for each word, compare all LS 10 bits one by one.
                         * The formula video bit # = ( comp bit # + 2 ) % 10
                         * provides the relationship between comp bits and video bits.
                         * If second time ( channel #0 out, channel #10 in ),
                         * for each word, only compare bit 8, which is video ch #10.
                         */
```

```
                        if ( i == 0 )
                        {
                                for ( k = 0; k < 10; k++ )
                                {
                                        wResult = wSrc ^ wDst;
                                        if( wResult & ( 1 << k  ) )
                                                rwcntErr[(k+2)%10]++;
                                }
                        }
                        if ( i == 1 )
                        {
                                wResult = wSrc ^ wDst;
                                if( wResult & ( 1 << 8  ) )
                                        rwcntErr[10]++;
                        }
#if     0
                        StrCpy( gStr1, "Src " );
                        PrintDec( gStr2, wSrc, 5, 0, 32767 );
                        StrCat( gStr1, gStr2 );
                        UiDispStr( gStr1, 1, 3 );

                        StrCpy( gStr1, "Dst " );
                        PrintDec( gStr2, wDst, 5, 0, 32767 );
                        StrCat( gStr1, gStr2 );
                        UiDispStr( gStr1, 1, 6 );
#endif
                }
        }
}
/*
 * !! To add the rejection criteria
 */
/*
 * Choose the bit with the highest error rate
 */
wcntErrMost                             = 0;
for( k = 0; k < 11; k++ )
{
        if( rwcntErr[k] > wcntErrMost )
        {
                wcntErrMost             = rwcntErr[k];
                bBadSurface             = (UINT8) k;
        }
}
*pbBadSurface                   = bBadSurface;
/*
 * Now display title and rwcntErr[]
 * First group, at line 4 and 5
 */
UiDispStr( "  hd0   hd1   hd2   hd3   hd4   hd5", 1, 4 );

StrCpy( gStr1,  "" );
for( k = 0; k < 6; k++ )
{
        StrCat( gStr1, " " );
        PrintDec( gStr2, rwcntErr[k] , 5, 0, 32767 );
        StrCat( gStr1, gStr2 );
}
UiDispStr( gStr1, 1, 5 );
/*
 * Second group, at line 7 and 8
 */
UiDispStr( "  hd6   hd7   hd8   hd9  hd10 Hd# to Swap", 1, 7 );

StrCpy( gStr1,  "" );
for( k = 6; k < 11; k++ )
{
        StrCat( gStr1, " " );
        PrintDec( gStr2, rwcntErr[k] , 5, 0, 32767 );
        StrCat( gStr1, gStr2 );
}
StrCat( gStr1, "    " );
PrintDec( gStr2, bBadSurface, 2, 0, 99 );
StrCat( gStr1, gStr2 );
```

```
        UiDispStr( gStr1, 1, 8 );
        return( TRUE );
}
/*
 * Tests the disk which were found to verify that they are spindle locked
 */
        void
TestIfDisksAreLocked()
{
        UINT8           bDiskNo;
        UINT8           bResult;

        for ( bDiskNo = DISK1; bDiskNo != N_DISK_PER_CTRL_MAX; bDiskNo++ )
        {
                /*
                 * If disk present, check if spindle is locked
                 * If not, need to lock the disk drive to the external
                 * sync signal. also count for number of disks on line.
                 */
                if ( grfDiskPresent[0 * N_DISK_PER_CTRL_MAX + bDiskNo] == TRUE )
                {
                        RxDiskMsgByte(0, (UINT8)bDiskNo, I_DISK_LOCKED, &bResult);

                        /* if disk is not locked, send spindle lock cmd */
                        if (! bResult )
                                TxDiskMsgByte( 0, (UINT8)bDiskNo,
                                                I_DISK_CMD, CMD_DISK_SPINDLE_SYNC );
                }
        }

}


#define DISK_INIT_CNT           100

/*
 * This routine spin up the disk in sequence, detect the disk's existence
 * and set up grfDiskPresent[], grbDiskMap[] and grnDiskOnLine[].
 * Also sets up rsClip[], rsLock[] and rbBadSurface[] tables.
 * If disk exists, then lock the disk drive with the external sync signal.
 * !! For now, just do for bDiskCtrlNo==0, need to do for bDiskCtrlNo==1 too
 */
        FLAG
InitDisks()
{
        UINT8           bDiskNo;
        UINT16          wcntTimeout = 50000;
        UINT8           bResult;
        UINT16          wTestCnt;
#ifndef TEST_DISK
        UINT16          wCylNo;
        CYL_HEAD        sCylHead;
        UINT16          wnCylMoreToGo;
#endif

        UiClearDisp();

        /*
         * Before initializing the disks, disk controller has to be ready
         */
        do
        {
                if ( RxDiskMsgByte( 0, N_DISK_PR_CTRL_MAX,I_DISK_CTRL_READY, &bResult )     != [illegible]
)
                        return( FALSE );
        }
        while( ( bResult != F_READY ) && ( --wcntTimeout != 0 ) );
        if ( bResult != F_READY )
        {
                UiSetAndDispStr( 1, ROW_NO_ERR_MSG, "Disk Control 1 not ready." );
                return( FALSE );
        }

        /*
         * For each disk, send cmd to spin up the disk, wait till it is executed
```

```
 */
grnDiskOnLine[0]                    = 0;
for ( bDiskNo = DISK1; bDiskNo != N_DISK_PER_CTRL_MAX; bDiskNo++ )
{
        StrCpy( gStr1,  " Initializing Disk " );
        PrintDec( gStr2, bDiskNo+1, 1, 1, 7 );
        StrCat( gStr1, gStr2 );
        UiDispStr( gStr1, 1, (UINT8) (bDiskNo+1) );
        wTestCnt = DISK_INIT_CNT;

        do
        {
                if( TxDiskMsgByte( 0, (UINT8)bDiskNo,
                                I_DISK_CMD, CMD_DISK_SPIN_UP ) != TRUE )
                        return( FALSE );
                do
                {
                        if( RxDiskMsgByte( 0, (UINT8)bDiskNo,
                                I_DISK_CMD, &bResult ) != TRUE )
                        return( FALSE );
                }
                while ( bResult != CMD_DISK_NULL );

                PrintDec( gStr1, (DISK_INIT_CNT-wTestCnt), 3, 0, DISK_INIT_CNT );
                UiDispStr( gStr1, 23, (UINT8) (bDiskNo+1) );
                /*
                 * Shall we wait for a while here ?
                 * Set up the Disk Presence Table.
                 */
                if( RxDiskMsgByte(0, (UINT8)bDiskNo, I_DISK_PRESENT, &bResult)
                                != TRUE )
                        return( FALSE );
        }
        while ( bResult != TRUE && --wTestCnt);

        grfDiskPresent[ 0 * N_DISK_PER_CTRL_MAX + bDiskNo] = bResult;
        /*
         * If disk present, need to lock the disk drive to the external
         * sync signal. also count for number of disks on line.
         */
        if ( grfDiskPresent[0 * N_DISK_PER_CTRL_MAX + bDiskNo] == TRUE )
        {
                /*
                 * Set up Disk Map Table, and Number of On-Line Disks.
                 * if grbDiskMap[0] == 2, grbDiskMap[1] == 5, means there are
                 * two on line disks and physical location is at 0 1 (2) 3 4 (5)...
                 * bDiskNo is the 2 or 5.
                 */
                grbDiskMap[0 * N_DISK_PER_CTRL_MAX + grnDiskOnLine[0]] = bDiskNo;
                grnDiskOnLine[0]++;

                UiDispStr( "Present", 23, (UINT8) (bDiskNo+1) );

                wcntTimeout = 30000;
                while ( wcntTimeout-- );

                UiDispStr( "Locking", 36, (UINT8) (bDiskNo+1) );

                do
                {
                        if( TxDiskMsgByte( 0, (UINT8)bDiskNo,
                                        I_DISK_CMD, CMD_DISK_SPINDLE_SYNC ) != TRUE )
                                return( FALSE );

                        RxDiskMsgByte(0, (UINT8)bDiskNo, I_DISK_LOCKED, &bResult);

                        /* if disk is not locked, send spindle lock cmd again */
                }
                while ( bResult == FALSE );
                UiDispStr( "Locked ", 36, (UINT8) (bDiskNo+1) );
        }
        else
                UiDispStr( "Not Present", 23, (UINT8) (bDiskNo+1) );
}
```

```
        gwMarkIn                                                = 0;
        gwMarkOut                                               = grrDiskOnLine[0] * N_CYL_AVAIL_PER_DISK;
        gwRecDur                                                = grrDiskOnLine[0] * N_CYL_AVAIL_PER_DISK;
        gwPlayDur                                               = grrDiskOnLine[0] * N_CYL_AVAIL_PER_DISK;

#ifndef TEST_DISK
        /*
         * Clear clip table and lock tl table  first.
         * Assume not in middle of any clip, to start off( wnCylMoreToGo == 0 ).
         */
        rsClip[0].bClipNo                                       = EOT;
        rsLock[0][0].tcStart.fUndef        = TRUE;
        wnCylMoreToGo                                           = 0;
        /*
         * In the cylinder header:
         * bClipNo should be initialized to NULL; wccForClip to NULL;
         * fLocked to FALSE, wccForLock to NULL.
         *
         * Process for each on-line disk, set up clip table( rsClip[] ),
         * lock table( rsLock[] ) and bad surface table( rbBadSurface[] ).
         */
        for ( bDiskNo = DISK1; bDiskNo < N_DISK_PER_CTRL_MAX; bDiskNo++ )
        {
                if ( !grfDiskPresent[0 * N_DISK_PER_CTRL_MAX + bDiskNo] )
                        continue;
                /*
                 * Need to read all 1923 cylinders for setting up bad surface table.
                 * Only need to read 1800 cylinders for clip table and lock table.
                 */
                for ( wCylNo = 0; wCylNo <  N_CYL_PER_DISK; wCylNo++ )
                {
                        /* Read to FS1, field-1, with normal timing mode  */
                        if( ReadOneCyl( 0, bDiskNo, wCylNo, FS1, FALSE, FALSE ) != TRUE )
                                return( FALSE );
                        sCylHead                                        =    *(CYL_HEAD
*)BASE_VRAM_RT3;

                        if( wCylNo < N_CYL_AVAIL_PER_DISK )
                        {
                                /*
                                 * Clips don't have nested or overlap situations. Locks do!
                                 * If not in middle of any clip, keep looking for next clip,
                                 * else, decrement the count and just bypass it.
                                 * We trust whatever the frist cylinder says.
                                 */
                                if( wnCylMoreToGo == 0 )
                                {
                                        if( ( sCylHead.bClipNo != NULL ) &&
                                                ( sCylHead.wccForClip != NULL ) )
                                        {
                                                /*
                                                 * Found a beginning cylinder of a clip,
                                                 * so insert into clip table.
                                                 */
                                                if( InsertOneClip( 0, bDiskNo, wCylNo, sCylHead
)
                                                                        != TRUE )
                                                        return( FALSE );
                                                wnCylMoreToGo                   =
sCylHead.wccForClip - 1;
                                        }
                                }
                                else
                                        wnCylMoreToGo--;
                                /*
                                 * For locked tl, we do need to check every cylinder
                                 * to handle nested locking situation. However, we trust
                                 * whatever the 1st cylinder says for the locked tl segment.
                                 */
                                if( sCylHead.fLocked && sCylHead.wccForLock !=NULL )
                                        if( InsertOneLock( bDiskNo, sCylHead ) != TRUE )
                                                return( FALSE );
                        }
                        /*
                         * Set up rbBadSurface[] here
```

```
                    */
                    rbBadSurface[0 * N_DISK_PER_CTRL_MAX + bDiskNo][wCylNo]
                                                                           =
sCylHead.bBadSurface;
                }

        }
#endif
        return( TRUE );
}

        FLAG
InsertOneClip( bDiskCtrlNo, bDiskNo, wCylNo, sCylHead )
        UINT8           bDiskCtrlNo;
        UINT8           bDiskNo;
        UINT16          wCylNo;
        CYL_HEAD        sCylHead;
{
        register        UINT16  i;
                                UINT16  iClip;
                                TC              tcRec;

        /*
         * Convert to tc first
         * !! Assume non drop frame for now.
         */
        if( DiskPositionToTc( bDiskCtrlNo, bDiskNo, wCylNo, FALSE, &tcRec) != TRUE )
                return( FALSE );
        /*
         * Find the place to insert in the Clip Table .
         * ( criteria being "tcRecStart" in ascending order ).
         * Also shift all entries behind to make room.
         */
        if( PrepareClipTable( tcRec, &iClip ) != TRUE )
                return( FALSE );
        /*
         * Now, insert!
         */
        rsClip[iClip].bClipNo           = sCylHead.bClipNo;

        i = 0;
        while( ( rsClip[iClip].rcClipName[i] = sCylHead.rcClipName[i] ) != '\0')
                i++;

        rsClip[iClip].tcRecStart = tcRec;

        if( TcAddFc( rsClip[i].tcRecStart, sCylHead.wccForClip,
                        &rsClip[i].tcRecEnd ) != TRUE )
                return( FALSE );
        rsClip[iClip].btySrcTc          = sCylHead.btySrcTc;

        return( TRUE );
}
        FLAG
InsertOneLock( bDiskNo, sCylHead )
        UINT8           bDiskNo;
        CYL_HEAD        sCylHead;
{
        return( TRUE );
}

/*
 * This routine is NON REAL-TIME.
 *
 * It sets up the Record Info Structure for later real-time processing to use.
 *
 * Then, this routine will position the disk head and set up framestore
 * for initial condition then enter the real-time recording.
 *
 */
        FLAG
OpenRec( bDiskCtrlNo, tcRecStart, wfcRecDur, bClipNo, rcClipName, btySrcTc, bnColFcDisp,bnRowFcDisp,
pwfcRecDurRealRet )
        UINT8           bDiskCtrlNo;            /* Disk Channel to work on                      */
```

```
        TC              tcRecStart;                 /* TC to start recording */
        UINT16          wfcRecDur;              /* Need this many total cyls     */
        UINT8           bClipNo;                /* User-chosen clip number       */
        char            rcClipName[20];         /* User-chosen clip name         */
        UINT8           btySrcTc;               /* Source timecode type          */
        UINT8           bnColFcDisp;            /* Col. # to display fc update   */
        UINT8           bnRowFcDisp;            /* Col. # to display fc update   */
        UINT16          *pwfcRecDurRealRet;     /* Real record duration          */
{
        UINT16          i;
        UINT16          wfcRecDurReal;

#ifdef  TEST_DISK
        /*
         * Assume all record timeline unlocked( available ), no clip in clip table.
         */
        rsLock[bDiskCtrlNo][0].tcStart.fUndef           = TRUE;

        rsClip[0].bClipNo                                                       = EOT;
        for ( i = 0; i < N_CYL_PER_DISK; i++ )
                rbBadSurface[bDiskCtrlNo * N_DISK_PER_CTRL_MAX + 0][i] = (UINT8)0;
#endif
        /*
         * Validate the ( tcRecStart, wfcRecDur ) timeline
         * including checking to see if it has been locked or not.
         */
        if( ValidateRecTl( bDiskCtrlNo, tcRecStart, wfcRecDur, &wfcRecDurReal )
                        != TRUE )
                return( FALSE );
        /*
         * If Clip number exists, don't do it.
         */
        for ( i = 0; rsClip[i].bClipNo != EOT; i++ )
        {
                if ( rsClip[i].bClipNo == bClipNo )
                {
                        UiSetAndDispStr( 1, ROW_NO_ERR_MSG, "Clip number exists already!" );
                        return( FALSE );
                }
        }
        /*
         * Build Disk Allocation Table
         * PLAY_SPD_NORMAL and NULL are dummies for wSegPlaySpd and bSegSeqNo,
         * won't be used later in real-time recording,
         * they are only meaningful in segment play.
         */
        if( BuildDaTable( bDiskCtrlNo, tcRecStart, wfcRecDurReal, PLAY_SPD_NORMAL,
                        NULL, &sRecInfo.rsDa[0], &sRecInfo.nDaTotal ) != TRUE )
                return( FALSE );
        /*
         * Set up other misc fields in Record Info Struct
         */
        sRecInfo.bClipNo                        = bClipNo;

        sRecInfo.tcStart                        = tcRecStart;
        sRecInfo.wfcCurr                        = 0;
        sRecInfo.wfcTotal                       = wfcRecDurReal;

        i = 0;
        while ( ( sRecInfo.rcClipName[i] = rcClipName[i] ) != '\0' )
                i++;

        /*
         * !! btySrcTc and gbVideoStd may come from different place
         */
        sRecInfo.btySrcTc                       = btySrcTc;
        sRecInfo.bVideoStd                      = gbVideoStd;
        sRecInfo.bDiskCtrlNo            = bDiskCtrlNo;
        /*
         * On entering real-time, start out with first disk to record entry
         */
        sRecInfo.iDaCurr                        = 0;
        sRecInfo.bnRowFcDisp            = bnRowFcDisp;
        sRecInfo.bnColFcDisp            = bnColFcDisp;
        sRecInfo.bnDiskWrDelay          = 0;
        sRecInfo.bnCheatTemp1           = 0;
```

```
        sRecInfo.bnCheatTemp2           = 0;
        /*
         * Set up Fs for initial condition for recording.
         */
        if( OpenFs( FS_MODE_REC ) != TRUE )
                return( FALSE );
        /*
         * Set up the non real-time part of the cylinder header in advance
         */
        SetCylHead();
        /*
         * Seek all disks used, so they are all ready when real-time begins.
         */
        for( i = 0; i < sRecInfo.nDaTotal; i++ )
        {

                while(  gfField2 );
                if( TxDiskMsgWord( bDiskCtrlNo,(UINT8)(sRecInfo.rsDa[i].bDiskNo),
                                I_DISK_CYL_NO, sRecInfo.rsDa[i].wCylNoStart ) != TRUE )
                        return( FALSE );

                if( TxDiskMsgByte( bDiskCtrlNo,(UINT8)(sRecInfo.rsDa[i].bDiskNo),
                                I_DISK_CMD, CMD_DISK_SEEK) != TRUE )
                        return( FALSE );
        /*  !! These don't test DPRAM busy. Saved for now.
        /*      /* Directly put it       */
        /*      TX_DISK_MSG_WORD(pw, bDiskCtrlNo,(UINT8)(sRecInfo.rsDa[i].bDiskNo),
        /*                      I_DISK_CYL_NO, sRecInfo.rsDa[i].wCylNoStart );
        /*      TX_DISK_MSG_BYTE( bDiskCtrlNo,(UINT8)(sRecInfo.rsDa[i].bDiskNo),
        /*                      I_DISK_CMD, CMD_DISK_SEEK);
        */
        }
        /*
         * Wait until all disk seeks are done then enter real-time.
         */
#if     0       /* May be thrown away    */
        for( i = 0; i < sRecInfo.nDaTotal; i++ )
        {
                while( TRUE )
                {
                        if( RxDiskMsgByte( sRecInfo.bDiskCtrlNo,
                                        sRecInfo.rsDa[i].bDiskNo, I_DISK_CMD, &bDataRead) != TRUE
)
                                return( FALSE );

/*                      Saved for now.
/*                      /* Directly get it       */
/*                      RX_DISK_MSG_BYTE( sRecInfo.bDiskCtrlNo,
/*                                      sRecInfo.rsDa[i].bDiskNo, I_DISK_CMD, bDataRead );
*/
                        if ( bDataRead == CMD_DISK_NULL )
                                break;
                }
        }
#endif  /* May be thrown away    */
        while(  gfField2 );
        while( !gfField2 );
        while(  gfField2 );
        *pwfcRecDurRealRet      = wfcRecDurReal;
#ifndef TEST_DISK
                StrCpy( gStr1, "" );
                for( i = 0; i < sRecInfo.nDaTotal; i++ )
                {
                        PrintDec( gStr2, sRecInfo.rsDa[i].bDiskNo, 1, 0, 9 );
                        StrCat( gStr1, gStr2 );

                        if ( grnDiskOnLine[bDiskCtrlNo] == 1 )
                                StrCat( gStr1, ":" );

                        if ( grnDiskOnLine[bDiskCtrlNo] == 1 )
                        {
                                PrintDec( gStr2, sRecInfo.rsDa[i].wCylNoStart, 4, 0, 9999 );
                                StrCat( gStr1, gStr2 );
                        }
                        else
```

```
                {
                        PrintDec( gStr2, sRecInfo.rsDa[i].wCylNoStart, 3, 0, 999 );
                        StrCat( gStr1, gStr2 );
                }

                if ( grnDiskOnLine[bDiskCtrlNo] == 1 )
                        StrCat( gStr1, ":" );

                if ( grnDiskOnLine[bDiskCtrlNo] == 1 )
                {
                        PrintDec( gStr2, sRecInfo.rsDa[i].wcc, 4, 0, 9999 );
                        StrCat( gStr1, gStr2 );
                }
                else
                {
                        PrintDec( gStr2, sRecInfo.rsDa[i].wcc, 3, 0, 999 );
                        StrCat( gStr1, gStr2 );
                }

                if ( grnDiskOnLine[bDiskCtrlNo] == 1 )
                        StrCat( gStr1, ";" );
        }
        PrintDec( gStr2, sRecInfo.nDaTotal, 1, 0, 9 );
        StrCat( gStr1, gStr2 );
        StrCat( gStr1, "." );
        if ( grnDiskOnLine[bDiskCtrlNo] == 1 )
        {
                PrintDec( gStr2, (UINT16)sRecInfo.tcStart.lFieldNo,
                        4, 0, 9999 );
                StrCat( gStr1, gStr2 );

                StrCat( gStr1, ":" );

                PrintDec( gStr2, sRecInfo.wfcTotal, 4, 0, 9999 );
                StrCat( gStr1, gStr2 );
        }
        UiDispStr( gStr1, 1, ROW_NO_ERR_MSG );
#endif
        return( TRUE );
}

/*
 * This routine
 */
        FLAG
ValidateRecTl( bDiskCtrlNo, tcRecStart, wfcRecDur, pwfcRecDurRealRet )
        UINT8   bDiskCtrlNo;
        TC              tcRecStart;
        UINT16  wfcRecDur;
        UINT16  *pwfcRecDurRealRet;
{
        TC              tcRecEnd;
        FLAG    fAnyAreaLocked;
        UINT16  wfcRecDurReal;

        /*
         * Check if record duration is too short
         */
        if ( wfcRecDur < FC_DISK_SEEK_ALLOWANCE )
        {
                UiSetAndDispStr ( 1, ROW_NO_ERR_MSG, "Record duration too short!" );
                return( FALSE );
        }

        if ( TcAddFc( tcRecStart, wfcRecDur, &tcRecEnd ) != TRUE )
                return( FALSE );
        /*
         * Compare with each of the locked area to see if there is any overlap
         * !! Don't check lock for now.
         */
        fAnyAreaLocked  = FALSE;
/*      for ( i = 0; rsLock[bDiskCtrlNo][i].tcStart.fUndef != TRUE; i++ )
/*      {
/*              if( TcCmp( tcRecStart, rsLock[bDiskCtrlNo][i].tcStart,
/*                              &bTcCmpResult ) != TRUE )
```

```
/*                      return( FALSE );
/*              switch( bTcCmpResult )
/*              {
/*              case TC_CMP_1ST_ST_2ND:
/*                      if( TcCmp( tcRecEnd, rsLock[bDiskCtrlNo][i].tcStart,
/*                                      &bTcCmpResult ) != TRUE )
/*                              return( FALSE );
/*                      if(     bTcCmpResult == TC_CMP_1ST_GT_2ND )
/*                              fAnyAreaLocked  = TRUE;
/*                      break;
/*              case TC_CMP_1ST_GT_2ND:
/*                      if( TcCmp( tcRecStart, rsLock[bDiskCtrlNo][i].tcEnd,
/*                                      &bTcCmpResult ) != TRUE )
/*                              return( FALSE );
/*                      if( bTcCmpResult == TC_CMP_1ST_ST_2ND )
/*                              fAnyAreaLocked  = TRUE;
/*                      break;
/*              case TC_CMP_1ST_EQ_2ND:
/*                      fAnyAreaLocked          = TRUE;
/*                      break;
/*              }
/*              if ( fAnyAreaLocked )
/*                      break;
/*      }
*/
        if( fAnyAreaLocked )
        {
                UiSetAndDispStr(1, ROW_NO_ERR_MSG,
                                        "Can't record, there are locked areas.");
                return( FALSE );
        }
        /*
         * Check if record start time too big
         */
        if( tcRecStart.lFieldNo  >=
                        N_CYL_AVAIL_PER_DISK * grnDiskOnLine[bDiskCtrlNo] )
        {
                UiSetAndDispStr(1, ROW_NO_ERR_MSG, "Rec Start Out Of Range.");
                return( FALSE );
        }
        /*
         * Check if record duration fall off disk end, if so, shorten it.
         */
        if( tcRecEnd.lFieldNo           >
                        N_CYL_AVAIL_PER_DISK * grnDiskOnLine[bDiskCtrlNo] )
        {
                UiSetAndDispStr( 1, ROW_NO_ERR_MSG,
                        "Record Duration Shortened." );
                wfcRecDurReal   =
                        N_CYL_AVAIL_PER_DISK * grnDiskOnLine[bDiskCtrlNo]
                        - (UINT16)tcRecStart.lFieldNo;
                /*
                 * Make sure even number of fields, ie. record in frame units.
                 */
                if( wfcRecDurReal % 2 == 1 )
                *pwfcRecDurRealRet      = wfcRecDurReal - 1 ;
        }
        else
                *pwfcRecDurRealRet      = wfcRecDur;

        return( TRUE );
}

/*
 * This routine builds "Disk Allocation" Table for later
 * real time recording or playing.
 */
        FLAG
BuildDaTable( bDiskCtrlNo, tcStart, wfcDur, wSegPlaySpd, bSegSeqNo, psDaRet, pnDaTotalRet )
        UINT8           bDiskCtrlNo;
        TC                      tcStart;
        UINT16          wfcDur;
        SINT16          wSegPlaySpd;
        UINT8           bSegSeqNo;
        DA                      *psDaRet;                       /*      Ptr     to      sDa
```

```
Returned                    */
        UINT8           *pnDaTotalRet;
{
        UINT8           iDiskStart;
        UINT16          wfcMoreToGo;
        UINT16          i;

        iDiskStart                              = (UINT8)(tcStart.lFieldNo / N_CYL_AVAIL_PER_DISK);
        wfcMoreToGo                             = wfcDur;
        for ( i = iDiskStart; i < grnDiskOnLine[bDiskCtrlNo]; i++, psDaRet++ )
        {
                psDaRet->bDiskNo = grbDiskMap[ bDiskCtrlNo * N_DISK_PER_CTRL_MAX + i];

                psDaRet->wCylNoStart     = psDaRet->wCylNoStartSave      =
                ( i == iDiskStart )? (UINT16)tcStart.lFieldNo% N_CYL_AVAIL_PER_DISK : 0;

                if( psDaRet->wCylNoStart + wfcMoreToGo <= N_CYL_AVAIL_PER_DISK )
                {
                        psDaRet->wcc                    = psDaRet->wccSave      = wfcMoreToGo;
                        psDaRet->wSegPlaySpd    = wSegPlaySpd;  /* Only for seg play    */
                        psDaRet->bSegSeqNo              = bSegSeqNo;    /*  Only  for  seg
play    */
                        break;
                }
                else
                {
                        psDaRet->wcc            = psDaRet->wccSave         =
                                                                N_CYL_AVAIL_PER_DISK
- psDaRet->wCylNoStart;
                        wfcMoreToGo             -=   N_CYL_AVAIL_PER_DISK   -
psDaRet->wCylNoStart;
                }
                psDaRet->wSegPlaySpd    = wSegPlaySpd;  /* Only for seg play    */
                psDaRet->bSegSeqNo              = bSegSeqNo;    /* Only for seg play    */
        }
        if( i == grnDiskOnLine[bDiskCtrlNo] )
        {
                UiSetAndDispStr ( 1, ROW_NO_ERR_MSG, "Duration Too Long." );
                return( FALSE );
        }
        /*
         * Set up total Da entries built.  No need to mark bDiskNo 0xFF
         */
                *pnDaTotalRet                                   = (UINT8)( i - iDiskStart  + 1 );
                return( TRUE );
        }
        /*
         * This real time function gets executed every field.
         * Called from RtVertIntr() which, in turn, is called from the vertical
         * interrupt handler.
         *
         * It basically does three things:
         *              1. Communicate with the disk controller through DP RAM.
         *              2. Set up the Fs and its data path thru video board hardware registers.
         *              3. Update the Rec Info Table as it goes.
         *
         * First frame only write to FS. If also read from FS, it reads garbage,
         * that's bad.  ie. First frame, don't write to disk.
         *
         * Last frame only need to read from FS. If also write to FS, it writes garbage,
         * but it doesn't matter, since we don't read it from FS to disk.
         * ie. Last frame keep doing what we have been doing.
         * !! bnCheatTemp2 is a different issue, need to test it, if no longer needed,
         *  get rid of it.
         */
                FLAG
        RtRecording( )
        {
                DA                      *psDaCurr;
                /*
                 * !! Temporarily use cheat number to detect first time entering real-time,
                 */
                if ( sRecInfo.bnDiskWrDelay == 0 )
                {
                        /*
```

```
            * On first entering, we need to make sure
            * If field-1 editing, it starts recording during field-1.
            * So the picture recorded during field-1 always has a even timecode.
            * If field-2 editing, it starts recording during field-2.
            * So the picture recorded during field-2 always has a odd timecode.
            * The net effect is, no matter field-1 or field-2 editing, we always
            * have even tc for field-1 pictures, odd tc for field-2 pictures.
            */
            if (    ( gfField2  && !gfField2Editing ) ||
                            ( !gfField2  &&  gfField2Editing )      )
                    return( TRUE );
    }
    /*
     * !! Temporary cheat number. To be deleted when real problem found & fixed
     * The problem is first 2 fields always records bad pictures,( something
     * has to do with the video being later than control signal ).
     * So we repeat recording onto first cylinder three times.
     * !!Changed to that first two fields don't do any recording, ( to avoid
     * writing gargabe to disk ).
     * !! Changed again back to repeat recording onto 1st cyl three times after
     * it failed for the FS version( first field bad. )
     * !! Only first time since boot works, second and on, it is bad, either
     * in field or frame rec/play modes. As long as you don't read, rec is good.
     * first read, it is good, afterwards, it is bad.
     * Just do writing input video to FS.
     * !! This may or may not be disk seek needs wait longer problem.
     * Change back to not repeat writing to 1st cyl to make f1/2 sequence right.
     */
    if ( sRecInfo.bnDiskWrDelay < 2 )
            sRecInfo.bnDiskWrDelay++;
    else
    {
            psDaCurr                                                =
&sRecInfo.rsDa[sRecInfo.iDaCurr];
            /*
             * Write Cylinder Header into beginning of Y framestore in VRAM .
             */
            RtSetCylHead( *psDaCurr );
            /*
             * Send Seek and Write for the next cylinder.
             */
            if( TxDiskMsgWord( sRecInfo.bDiskCtrlNo, (UINT8) (psDaCurr->bDiskNo),
                            I_DISK_CYL_NO, psDaCurr->wCylNoStart ) != TRUE )
                    return( FALSE );
            if( TxDiskMsgByte( sRecInfo.bDiskCtrlNo, (UINT8) (psDaCurr->bDiskNo),
                            I_DISK_CMD, CMD_DISK_SEEK_N_WRITE ) != TRUE )
                    return( FALSE );
            if ( sRecInfo.bnCheatTemp2 == 0 )
            {
                    gwFieldNum = sRecInfo.wfcCurr + (UINT16)sRecInfo.tcStart.lFieldNo;
                    UiDispRtFieldAndTc( TRUE, TRUE );
            }
            /*
             * If stop button pushed, exit real time recording.
             * In such case, when updating tables, we need to look at
             * a different wccSave from the one originally saved.
             */
            if( gfFieldMode || gfField2 )
            {
                    if ( gfRecAborted )
                    {
                            psDaCurr->wccSave         -= psDaCurr->wcc - 1;
                            sRecInfo.wfcTotal              = sRecInfo.wfcCurr + 1 ;
                            gfRecAborted                   = FALSE;
                            gwRt3State                             = gfEvenFrame?

RT3_FREEZE_FS1_NO_RECORD :

RT3_FREEZE_FS2_NO_RECORD ;
                            if( gfFieldMode )
                            {
                                    if( gfField2 )
                                            gbtyFieldRepeat  =        (UINT8)
                                                             ( gfEvenFrame?

TY_FIELD_REPEAT_F2_FS1 :
```

```
TY_FIELD_REPEAT_F2_FS2 ) ;
                                    else
                                            gbtyFieldRepeat  =        (UINT8)
                                                             ( gfEvenFrame?
TY_FIELD_REPEAT_F1_FS1 :

TY_FIELD_REPEAT_F1_FS2 ) ;
                            }
                            else
                                    gbtyFieldRepeat          = TY_FIELD_REPEAT_NONE_FWD;

                            glFrameCntCopy                   = 0L;
                            gfRecEnabled                     = FALSE;
                            gwMarkOut                                =   gwMarkIn   +
sRecInfo.wfcTotal;
                            gwPlayDur                                = sRecInfo.wfcTotal;
                            if ( gsUiState.eCurrMode == NORM )       /* if in normal play
menu */
                                    UiDispFieldCntAsTc( gwMarkOut, 30, 5, FALSE, TRUE );
                            return(TRUE);
                    }
            }
            if( sRecInfo.wfcCurr == sRecInfo.wfcTotal - 1 )
            {
                    /*
                     * Somehow, we need to stay in real-time at least one more field
                     * to make the last field recorded correctly, otherwise, it gets
                     * the same picture as the previous field.
                     * Don't know what is needed in rt ( try to delete one at a time
                     * the things run in rt, it still works when all are gone.
                     * Even we stay in rt for 200 fields, the last cylinder recorded
                     * don't have descrepancy with previous scenes.
                     */
                    if( sRecInfo.bnCheatTemp2 < 1 )
                            sRecInfo.bnCheatTemp2++;
                    else
                    {
                            glFrameCntCopy           = 0L;
                            gfRecEnabled             = FALSE;
                            gwRt3State                       = gfEvenFrame?
RT3_FREEZE_FS1_NO_RECORD :

RT3_FREEZE_FS2_NO_RECORD ;
                            if( gfFieldMode )
                            {
                                    if( gfField2 )
                                            gbtyFieldRepeat  =        (UINT8)
                                                             ( gfEvenFrame?
TY_FIELD_REPEAT_F2_FS1 :

TY_FIELD_REPEAT_F2_FS2 ) ;
                                    else
                                            gbtyFieldRepeat  =        (UINT8)
                                                             ( gfEvenFrame?
TY_FIELD_REPEAT_F1_FS1 :

TY_FIELD_REPEAT_F1_FS2 ) ;
                            }
                            else
                                    gbtyFieldRepeat          = TY_FIELD_REPEAT_NONE_FWD;
                    }
                    return(TRUE);
            }
            else
            {
                    if( sRecInfo.bnCheatTemp1 < 2 )
                            sRecInfo.bnCheatTemp1++;
                    else
                    {
                            if ( ( psDaCurr->wcc == 1 ) &&
                                            ( sRecInfo.iDaCurr < sRecInfo.nDaTotal - (UINT8)1
) )
                            {
                                    /*
                                     * Advance to next disk allocation entry.
```

```
                                        * Disk seek for the next disk must have been done .
                                        * Checked already at end of non real time.
                                        */
                                       sRecInfo.iDaCurr++;
                               }
                               else
                               {
                                       psDaCurr->wCylNoStart++;
                                       psDaCurr->wcc--;
                               }
                               sRecInfo.wfcCurr++;
                       }
               }
               /*
                * Set the Head Swap Parameter for next field.
                */
               grwOutRegRt3[IO_CTRL_REG]               &= ~ B_HEAD_SWAP;
               grwOutRegRt3[IO_CTRL_REG]               |= rbBadSurface
                                                       [sRecInfo.bDiskCtrlNo * N_DISK_PER_CTRL_MAX
+

sRecInfo.rsDa[sRecInfo.iDaCurr].bDiskNo]

[sRecInfo.rsDa[sRecInfo.iDaCurr].wCylNoStart] << 8;
        }
        return( TRUE );
}

/*
 * After real-time recording is done, update the Clip Table.
 */
        FLAG
CloseRec( bDiskCtrlNo )
        UINT8   bDiskCtrlNo;
{
        /*
         *      Out of real-time, update Clip Table,
         */
        if ( UpdateClipTable() != TRUE )
                return( FALSE );

#ifndef TEST_DISK

        StrCpy( gStr1, "X" );
        PrintDec( gStr2, rsClip[0].bClipNo, 2, 0, 99 );
        StrCat( gStr1, gStr2 );
        StrCat( gStr1, ":" );
        PrintDec( gStr2, (SINT16)rsClip[0].tcRecStart.lFieldNo, 5, 0, 32767 );
        StrCat( gStr1, gStr2 );
        StrCat( gStr1, ":" );
        PrintDec( gStr2, (SINT16)rsClip[0].tcRecEnd.lFieldNo, 5, 0, 32767 );
        StrCat( gStr1, gStr2 );
        StrCat( gStr1, ":" );
        PrintDec( gStr2, rsClip[1].bClipNo, 3, 0, 999 );
        StrCat( gStr1, gStr2 );
        StrCat( gStr1, "." );
        UiDispStr( gStr1, 1, 6 );

#endif
        return( TRUE );
}
/*
 * This routine updates the Clip Table after recording a clip.
 */
        FLAG
UpdateClipTable()
{
        register        UINT16          iClip;
                        UINT16          i;
                        TC                      tcRecEnd;
                        UINT8           bTcCmpResult;
        /*
         * First update existing clips that have been
         * totally or partially overwritten
         */
```

```
if ( TcAddFc( sRecInfo.tcStart, sRecInfo.wfcTotal, &tcRecEnd ) != TRUE )
        return( FALSE );
/*
 * Do for each existing clip
 */
for ( iClip = 0; rsClip[iClip].bClipNo != EOT; iClip++ )
{
        if( TcCmp( sRecInfo.tcStart, rsClip[iClip].tcRecStart,
                        &bTcCmpResult ) != TRUE )
                return( FALSE );
switch( bTcCmpResult )
{
case TC_CMP_1ST_ST_2ND:
        if( TcCmp( tcRecEnd, rsClip[iClip].tcRecStart, &bTcCmpResult )
                        != TRUE )
                return( FALSE );
        if(     bTcCmpResult == TC_CMP_1ST_GT_2ND )
        {
                if( TcCmp( tcRecEnd, rsClip[iClip].tcRecEnd, &bTcCmpResult )
                                != TRUE )
                        return( FALSE );

                if( bTcCmpResult == TC_CMP_1ST_ST_2ND )
                {
                        /* Cut Clip Head        */
                        rsClip[iClip].tcRecStart = tcRecEnd;
                }
                else
                {
                        /* Delete a Clip        */
                        for( i = iClip; rsClip[i].bClipNo != EOT; i++ )
                                rsClip[i]       = rsClip[i+1];
                }
        }
        break;
case TC_CMP_1ST_GT_2ND:
        if( TcCmp( sRecInfo.tcStart, rsClip[iClip].tcRecEnd,
                        &bTcCmpResult ) != TRUE )
                return( FALSE );
        if( bTcCmpResult == TC_CMP_1ST_ST_2ND )
        {
                if( TcCmp( tcRecEnd, rsClip[iClip].tcRecEnd, &bTcCmpResult )
                                != TRUE )
                        return( FALSE );

                if( bTcCmpResult == TC_CMP_1ST_ST_2ND )
                {
                        if( MakeTwoClips( sRecInfo.tcStart, tcRecEnd, iClip )
                                        != TRUE )
                                return( FALSE );
                }
                else
                {
                        /*      Cut Clip Tail   */
                        rsClip[iClip].tcRecEnd          = sRecInfo.tcStart;
                }
        }
        break;
case TC_CMP_1ST_EQ_2ND:
        if( TcCmp( tcRecEnd, rsClip[iClip].tcRecEnd, &bTcCmpResult )
                        != TRUE )
                return( FALSE );
        if( bTcCmpResult == TC_CMP_1ST_ST_2ND )
        {
                /* Cut Clip Head        */
                rsClip[iClip].tcRecStart = tcRecEnd;
        }
        else
        {
                /* Delete a Clip        */
                for( i = iClip; rsClip[i].bClipNo != EOT; i++ )
                        rsClip[i]       = rsClip[i+1];
        }
        break;
}
}
/*
```

```
         * Then, find the place to insert in the Clip Table .
         * ( criteria being "tcRecStart" in ascending order ).
         * And shift all entries behind to make room.
         */
        if( PrepareClipTable( sRecInfo.tcStart, &iClip ) != TRUE )
                return( FALSE );
        /*
         * Now, insert the newly created clip into the clip table!
         */
        rsClip[iClip].bClipNo           = sRecInfo.bClipNo;

        i = 0;
        while( ( rsClip[iClip].rcClipName[i] = sRecInfo.rcClipName[i] ) != '\0')
                i++;
        /*
         * !! If exists, sRecInfo.rsDa[0].wccSave has the smaller of
         * wfcRecDur and 1800 - wCylNoStartSave
         */
        rsClip[iClip].tcRecStart = sRecInfo.tcStart;
        if ( TcAddFc( sRecInfo.tcStart, sRecInfo.wfcTotal,
                        &rsClip[iClip].tcRecEnd ) != TRUE )
                return( FALSE );
        rsClip[iClip].btySrcTc          = sRecInfo.btySrcTc;
        rsClip[iClip].bVideoStd         = sRecInfo.bVideoStd;
        return( TRUE );
}
        FLAG
MakeTwoClips( tcRecStart, tcRecEnd, iClip )
        TC              tcRecStart;                     /* New tcRecEnd for the first clip*/
        TC              tcRecEnd;                       /*  New  tcRecStart  for  the  second
clip    */
        UINT16  iClip;                          /* Index to the clip to be spawned      */
{
        UINT16  i;
        /*
         * First shift all entries behind iClip to make room
         */
        for ( i = 0; rsClip[i].bClipNo != EOT; i++ );

        if ( i + 1 >= N_CLIP_MAX )
        {
                UiSetAndDispStr( 1, ROW_NO_ERR_MSG, "Can't Add, Clip Table Full." );
                return( FALSE );
        }

        for ( ; i > iClip; i-- )
                rsClip[i+1]                             = rsClip[i];    /* struct copy  */

        rsClip[iClip+1].tcRecEnd = rsClip[iClip].tcRecEnd;
        rsClip[iClip].tcRecEnd          = tcRecStart;
        /*
         * !! Might need to change N_CLIP_MAX to 1800*7, & wClipNo and gwClipNoNext
         * to create and use gwClipNoNext here.
         */
        rsClip[iClip+1].bClipNo         = rsClip[iClip].bClipNo;
        i = 0;
        while( ( rsClip[iClip+1].rcClipName[i] = rsClip[iClip].rcClipName[i] )
                        != '\0')
                i++;
        rsClip[iClip+1].tcRecStart      = tcRecEnd;
        rsClip[iClip+1].btySrcTc = rsClip[iClip].btySrcTc;
        rsClip[iClip+1].bVideoStd       = rsClip[iClip].bVideoStd;
        return( TRUE );
}

/*
 * This routine finds a place in Clip Table,
 * ( the criteria being that tcRecStart remains in ascending order. )
 * and returns the index in piClipRet.
 * It also shifts all entries behind to make room,
 */
        FLAG
PrepareClipTable( tcToInsert, piClipRet )
                TC              tcToInsert;
                UINT16  *piClipRet;
```

```
{
        register        UINT16          iClip;
                                UINT16          i;
                                UINT8           bTcCmpResult;
        /*
         * Insert a new entry to the Clip Table .
         * Make sure "tcRecStart" remains in ascending order.
         */
        for ( iClip = 0; rsClip[iClip].bClipNo != EOT; iClip++ )
        {
                if ( TcCmp( tcToInsert, rsClip[iClip].tcRecStart, &bTcCmpResult )
                                != TRUE )
                        return( FALSE );
                if ( bTcCmpResult == TC_CMP_1ST_ST_2ND )
                        break;
        }
        if ( rsClip[iClip].bClipNo == EOT )
        {
                /*
                 * Append, but still need to shift EOT only
                 */
                if ( iClip + 1 >= N_CLIP_MAX )
                {
                        UiSetAndDispStr( 1, ROW_NO_ERR_MSG, "Can't Add, Clip Table Full." );
                        return( FALSE );
                }
                rsClip[iClip+1].bClipNo         = EOT;
        }
        else
        {
                /*
                 * Insert, but first shift all entries behind to make room.
                 * Point to End-Of-Table Marker, start moving backwards.
                 */
                for ( i = 0; rsClip[i].bClipNo != EOT; i++ );

                if ( i + 1 >= N_CLIP_MAX )
                {
                        UiSetAndDispStr( 1, ROW_NO_ERR_MSG, "Can't Add, Clip Table Full." );
                        return( FALSE );
                }

                for ( ; i >= iClip; i-- )
                        rsClip[i+1]                             = rsClip[i];    /*   struct
copy    */
        }
        *piClipRet                                              = iClip;

        return( TRUE );
}

/*
 * This routine is NON REAL-TIME.
 *
 *
 * This routine is to handle segment play specifically.
 *
 * Its main function is to set up the Play Info Structure for later
 * real-time processing to use.
 *
 * It builds rsDa[] entries for each play segment. rsDa[] is part of the
 * Play Info Structure. One play segment can have one or more DA's, but
 * one DA can't possibly represent more than one play segment.
 *
 * Finally, this routine will position the disk head and set up framestore
 * for initial condition then enter the real-time playing.
 */
        FLAG
OpenSegPlay( bDiskCtrlNo, fPlayFwd, bnColFcDisp, bnRowFcDisp )
        UINT8           bDiskCtrlNo;
        FLAG            fPlayFwd;                       /* Global direction             */
        UINT8           bnColFcDisp;
        UINT8           bnRowFcDisp;
{
        UINT16          wInPoint;
```

```
UINT16          wOutPoint;
SINT16          wSegPlaySpd;
UINT8           iSeq;
TC                      tcPlayStart;
UINT16          wfcPlayDur;
UINT8           nDaTotal;
UINT16          i;
UINT16          wIdNo;
/*
 * !! bDiskCtrlNo is the same for all clips in the segment play
 * it can be main video, or key channel or both.
 */
sPlayInfo.iDaCurr       = 0;

for( iSeq = 1; ; iSeq++ )
{
        /*
         * If iSeq do not exist, ie. end of list reached
         */
        if( GetSegData( iSeq, ID_NO, &wIdNo ) == FALSE )
                break;
        if( GetSegData( iSeq, IN_POINT, &wInPoint ) != TRUE )
                return( FALSE );
        if( wInPoint >=
                        (UINT16) N_CYL_AVAIL_PER_DISK * grnDiskOnLine[bDiskCtrlNo] )
        {
                StrCpy( gStr1,  " Segment   " );
                PrintDec( gStr2, (UINT8)wIdNo, 2, 1, 99 );
                StrCat( gStr1, gStr2 );
                StrCat( gStr1, "  In Point Out Of Range!" );
                UiDispStr( gStr1, 1, ROW_NO_ERR_MSG );
                UpdateSegListDisp( iSeq );
                return( FALSE );
        }
        tcPlayStart.lFieldNo            = wInPoint;
        tcPlayStart.fDropFrame          = FALSE;
        tcPlayStart.fUndef                      = FALSE;

        if( GetSegData( iSeq, OUT_POINT, &wOutPoint ) != TRUE )
                return( FALSE );
        if( wOutPoint >
                        (UINT16) N_CYL_AVAIL_PER_DISK * grnDiskOnLine[bDiskCtrlNo] )
        {
                StrCpy( gStr1,  " Segment   " );
                PrintDec( gStr2, (UINT8)wIdNo, 2, 1, 99 );
                StrCat( gStr1, gStr2 );
                StrCat( gStr1, "  Out Point Out Of Range!" );
                UiDispStr( gStr1, 1, ROW_NO_ERR_MSG );
                UpdateSegListDisp( iSeq );
                return( FALSE );
        }
        if( wOutPoint == wInPoint )
        {
                StrCpy( gStr1,  " Segment   " );
                PrintDec( gStr2, (UINT8)wIdNo, 2, 1, 99 );
                StrCat( gStr1, gStr2 );
                StrCat( gStr1, "  Ignored! Zero Duration. " );
                UiDispStr( gStr1, 1, ROW_NO_ERR_MSG );
                continue;
        }
        /*
         * For one segment, always build from small to large, but if OUT < IN,
         * just play reverse. Since fPlayFwd( the global dir ) should'nt change,
         * we can only toggle the sign of wSegPlaySpd( ie. local direction ) to
         * show the "OUT < IN" effect. So tcPlayStart is always the smaller one.
         */
        if( GetSegData( iSeq, PLAY_SPD, &wSegPlaySpd ) != TRUE )
                return( FALSE );

        if( wOutPoint < wInPoint )
        {
                tcPlayStart.lFieldNo    = wOutPoint;
                wSegPlaySpd                             = -wSegPlaySpd;
        }
```

```
		wfcPlayDur					=	ABS((SINT16)wOutPoint	-
(SINT16)wInPoint);
		if( BuildDaTable ( bDiskCtrlNo, tcPlayStart, wfcPlayDur, wSegPlaySpd,
				iSeq, &sPlayInfo.rsDa[sPlayInfo.iDaCurr], &nDaTotal ) != TRUE
)
			return( FALSE );
		/*
		 * Accumulate nDaTotal: DA's built for this segment.
		 */
		sPlayInfo.iDaCurr			+= nDaTotal;
	}

	if( sPlayInfo.iDaCurr == 0 )
	{
		UiSetAndDispStr( 1, ROW_NO_ERR_MSG, "Nothing To Play!" );
		return( FALSE );
	}

	sPlayInfo.nDaTotal				= sPlayInfo.iDaCurr;

#ifndef TEST_DISK
		StrCpy( gStr1, "" );
		for( i = 0; i < sPlayInfo.nDaTotal; i++ )
		{
			PrintDec( gStr2, sPlayInfo.rsDa[i].bDiskNo, 1, 0, 9 );
			StrCat( gStr1, gStr2 );

			PrintDec( gStr2, sPlayInfo.rsDa[i].wCylNoStart, 4, 0, 9999 );
			StrCat( gStr1, gStr2 );

			PrintDec( gStr2, sPlayInfo.rsDa[i].wcc, 3, 0, 999 );
			StrCat( gStr1, gStr2 );

			StrCat( gStr1, ":" );
		}
		PrintDec( gStr2, sPlayInfo.nDaTotal, 1, 0, 9 );
		StrCat( gStr1, gStr2 );

		PrintDec( gStr2, sPlayInfo.wfcTotal, 4, 0, 9999 );
		StrCat( gStr1, gStr2 );
		UiDispStr( gStr1, 1, 6 );
#endif
	/*
	 * Complete the rest of the play info table.
	 */
	if( CompletePlayInfo( bDiskCtrlNo, TRUE, NULL, NULL, fPlayFwd,
			bnColFcDisp, bnRowFcDisp ) != TRUE )
		return( FALSE );

	return( TRUE );
}

/*
 * This routine is NON REAL-TIME.
 *
 * This routine is to handle normal play, clip play and cine play.
 * NOT SEGMENT PLAY.
 *
 * Its main function is to set up the Play Info Structure for later
 * real-time processing to use.
 *
 * Then, this routine will position the disk head and set up framestore
 * for initial condition then enter the real-time playing.
 */
	FLAG
OpenPlay( bDiskCtrlNo, tcPlayTblStart, wfcPlayTblDur, wPlayStart, wPlayEnd,
fPlayFwd, bnColFcDisp, bnRowFcDisp )
	UINT8		bDiskCtrlNo;		/* Disk Channel to work on		*/
	TC			tcPlayTblStart;		/* Start play tc		*/
	UINT16		wfcPlayTblDur;		/* Play duration		*/
	UINT16		wPlayStart;
	UINT16		wPlayEnd;
	FLAG		fPlayFwd;
	UINT8		bnColFcDisp;
	UINT8		bnRowFcDisp;
```

```
{
        UINT16          i;
        TC                      tcPlayTblEnd;
        UINT16          wfcPlayTblDurReal;

#ifdef  TEST_DISK
        for ( i = 0; i < N_CYL_PER_DISK; i++ )
                rbBadSurface[bDiskCtrlNo * N_DISK_PER_CTRL_MAX + 0][i]    = (UINT8) 0;
#endif
        if ( wfcPlayTblDur == 0 )
        {
                UiSetAndDispStr( 1, ROW_NO_ERR_MSG, "Can't Play. Zero Play Dur!");
                return( FALSE );
        }
        /*
         * Avoid play duration too long to do
         */
        if ( TcAddFc( tcPlayTblStart, wfcPlayTblDur, &tcPlayTblEnd ) != TRUE )
                return( FALSE );
        /*
         * Check if play duration fall off disk end, if so, shorten it.
         */
        if( tcPlayTblEnd.lFieldNo               >
                        N_CYL_AVAIL_PER_DISK * grnDiskOnLine[bDiskCtrlNo] )
        {
                UiSetAndDispStr( 1, ROW_NO_ERR_MSG,
                        "Play Duration Shortened." );
                wfcPlayTblDurReal       =
                        N_CYL_AVAIL_PER_DISK * grnDiskOnLine[bDiskCtrlNo]
                        - (UINT16)tcPlayTblStart.lFieldNo;
        }
        else
        {
                wfcPlayTblDurReal       = wfcPlayTblDur;
        }
        /*
         * NULL is dummy for bSegSeqNo, won't be used later in real-time playing;
         * PLAY_SPD_NORMAL is to fake local segment speed ( non-existent ) to be
         * +100, so later in real-time, code can share with segment play.
         * they are only meaningful in segment play.
         */
        if( BuildDaTable( bDiskCtrlNo, tcPlayTblStart, wfcPlayTblDurReal,
                        PLAY_SPD_NORMAL, NULL, &sPlayInfo.rsDa[0], &sPlayInfo.nDaTotal )
                        != TRUE )
                return( FALSE );
        /*
         * Complete setting up the rest of the play info table.
         */
        if( CompletePlayInfo( bDiskCtrlNo, FALSE, wPlayStart, wPlayEnd, fPlayFwd,
                        bnColFcDisp, bnRowFcDisp ) != TRUE )
                return( FALSE );

        sPlayInfo.fUndef        = FALSE;
        return( TRUE );
}
/*
 * This routine fixes up the Da table for two possible problems,
 * then completes setting up the rest of play info table.
 * It is for both OpenSegPlay() and OpenPlay().
 */
        FLAG
CompletePlayInfo( bDiskCtrlNo, fSegPlay, wPlayStart, wPlayEnd, fPlayFwd, bnColFcDisp, bnRowFcDisp
)
        UINT8           bDiskCtrlNo;
        FLAG            fSegPlay;
        UINT16          wPlayStart;
        UINT16          wPlayEnd;
        FLAG            fPlayFwd;
        UINT8           bnColFcDisp;
        UINT8           bnRowFcDisp;
{
        UINT8           bDiskNo;
        UINT8           iDaCurr;
        UINT8           iDaStart;
        UINT16          i;
        /*
```

```
 * If play reverse, we start playing with the end cylinder
 */
for ( iDaCurr = 0; iDaCurr < sPlayInfo.nDaTotal ; iDaCurr++ )
{
        /*
         * If global dir fwd and local dir rev,( to play this DA rev )
         * or if global dir rev and local dir fwd,( to play this DA rev )
         * then need to modify the wCylNoStart so that it points to
         * the larger end.
         */
        if( ( !fPlayFwd && sPlayInfo.rsDa[iDaCurr].wSegPlaySpd > 0 ) ||
            (  fPlayFwd && sPlayInfo.rsDa[iDaCurr].wSegPlaySpd < 0 )  )
            sPlayInfo.rsDa[iDaCurr].wCylNoStart                    +=
sPlayInfo.rsDa[iDaCurr].wcc - 1;
}
/*
 * Now, fix up two problems by doing disk cacheing:
 * One: any DA entry having play duration less than FC_DISK_SEEK_ALLOWANCE.
 * Two: any DA entry having same disk # as previous DA entry.
 * But first, initialize the Cache buffer pointers.
 */
if( grnDiskOnLine[bDiskCtrlNo] > 1 )
{
        for ( bDiskNo = DISK1; bDiskNo < N_DISK_PER_CTRL_MAX; bDiskNo++ )
            riCacheBuf[bDiskCtrlNo * N_DISK_PER_CTRL_MAX + bDiskNo]
                                                                        =
I_CACHE_BUF_START;

        if ( FixupDaForPlay( bDiskCtrlNo, fPlayFwd ) != TRUE )
            return( FALSE );
}
/*
 * Accumulate total field count.
 * Also set up the save copy.
 */
sPlayInfo.wfcTotal                                  = 0;
for ( iDaCurr = 0; iDaCurr < sPlayInfo.nDaTotal ; iDaCurr++ )
{
        sPlayInfo.wfcTotal                          +               =
sPlayInfo.rsDa[iDaCurr].wcc;
        sPlayInfo.rsDa[iDaCurr].wCylNoStartSave
                                                                    =
sPlayInfo.rsDa[iDaCurr].wCylNoStart;
        sPlayInfo.rsDa[iDaCurr].wccSave
                                                                    =
sPlayInfo.rsDa[iDaCurr].wcc;
}
/*
 * If bypass FS, record has no delay.( specify the disk destination has no
 * delay. ). So field1 video goes on even tc for field1 editing.
 * To play it, must send disk read during field2( because 1 field delay
 * for play ), to get field1 video during field1 time.
 * In FS mode, both record and play adds 2 fields delay, the result is same.
 */
/*
 * On entering real-time,
 * If play fwd, start out with first Disk Allocation entry
 * If play rev, start out with last Disk Allocation entry.
 */
if( fSegPlay )
{
        sPlayInfo.wfcCurr                           = fPlayFwd ? 0 : sPlayInfo.wfcTotal
- 1;
        iDaStart                                            = fPlayFwd ?
                                                                  (UINT8)0   :
sPlayInfo.nDaTotal- (UINT8)1;
        sPlayInfo.iDaCurr                           = iDaStart;
}
else
{
        TC              tcCurr;
        UINT8   bDiskNoCurr;
        UINT16  wCylNoCurr;
```

```
            sPlayInfo.wPlayStart                        = wPlayStart;
            sPlayInfo.wPlayEnd                          = wPlayEnd;
            sPlayInfo.wfcCurr                           = fPlayFwd ? wPlayStart : wPlayEnd
- 1;
            tcCurr.lFieldNo                             = (SINT32)sPlayInfo.wfcCurr;
            tcCurr.fDropFrame                           = FALSE;
            tcCurr.fUndef                               = FALSE;
            TcToDiskPosition( 0, tcCurr, &bDiskNoCurr, &wCylNoCurr );

            for ( iDaCurr = 0; iDaCurr < sPlayInfo.nDaTotal ; iDaCurr++ )
                    if( sPlayInfo.rsDa[iDaCurr].bDiskNo == bDiskNoCurr )
                            break;
            sPlayInfo.rsDa[iDaCurr].wCylNoStart         = wCylNoCurr;
            if( fPlayFwd )
                    sPlayInfo.rsDa[iDaCurr].wcc
                                                                                =
sPlayInfo.rsDa[iDaCurr].wCylNoStartSave                                         +
sPlayInfo.rsDa[iDaCurr].wccSave
                                                                                -
sPlayInfo.rsDa[iDaCurr].wCylNoStart;
            else
                    sPlayInfo.rsDa[iDaCurr].wcc
                                                                                =
sPlayInfo.rsDa[iDaCurr].wccSave   -
                                                                                (
sPlayInfo.rsDa[iDaCurr].wCylNoStartSave
                                                                                -
sPlayInfo.rsDa[iDaCurr].wCylNoStart );
            iDaStart                                            = iDaCurr;
            sPlayInfo.iDaCurr                           = iDaStart;
    }
    sPlayInfo.fPlayFwd                                  = fPlayFwd;
    sPlayInfo.bDiskCtrlNo                       = bDiskCtrlNo;

    sPlayInfo.bnRowFcDisp                       = bnRowFcDisp;
    sPlayInfo.bnColFcDisp                       = bnColFcDisp;

    sPlayInfo.wUseFrameCnt                      = DONT_USE_FRAME_CNT;

    sPlayInfo.fDontReadDisk                     = FALSE;
    sPlayInfo.fDoneCylAdvForStep            = FALSE;
    /*
     * These two must wait until after entering real time, do one time only.
     */
    sPlayInfo.sCylAdv.wValueSpdCurr         = VALUE_SPD_UNDEFINED;
    sPlayInfo.sCylAdv.fSignGlobalSpd = SIGN_SPD_UNDEFINED;

    sPlayInfo.sCylAdv.wFrameNoCurr          = 0;
    sPlayInfo.sCylAdv.lfcAdvCurr            = (UINT32) 0;
    /*
     * Set up Fs for initial condition for playing.
     */
    if( OpenFs( FS_MODE_PLAY ) != TRUE )
            return( FALSE );
    /*
     * Do seek on the first disk to play, so
     * first disk will be ready when real-time action begins.
     */
    while(  gfField2 );
    if ( TxDiskMsgWord( bDiskCtrlNo,(UINT8)(sPlayInfo.rsDa[iDaStart].bDiskNo),
                    I_DISK_CYL_NO, sPlayInfo.rsDa[iDaStart].wCylNoStart ) != TRUE )
            return( FALSE );
    if ( TxDiskMsgByte( bDiskCtrlNo,(UINT8)(sPlayInfo.rsDa[iDaStart].bDiskNo),
                    I_DISK_CMD, CMD_DISK_SEEK ) != TRUE )
            return( FALSE );
#if 0   /* May be thrown away    */
    /*
     * Wait until first disk seek is done then enter real-time.
     * !! Implement time-out
     */
    while( TRUE )
    {
            if ( RxDiskMsgByte( sPlayInfo.bDiskCtrlNo,
                            (UINT8)(sPlayInfo.rsDa[iDaStart].bDiskNo),I_DISK_CMD,&bDataRead)
                            != TRUE)
```

```
                        return( FALSE );
                if ( bDataRead == CMD_DISK_NULL )
                        break;
        }
#endif  /* May be thrown away    */

        while(  gfField2 );
        while( !gfField2 );
        while(  gfField2 );

#ifndef TEST_DISK
                StrCpy( gStr1, "" );
                for( i = 0; i < sPlayInfo.nDaTotal; i++ )
                {
                        PrintDec( gStr2, sPlayInfo.rsDa[i].bDiskNo, 1, 0, 9 );
                        StrCat( gStr1, gStr2 );

                        PrintDec( gStr2, sPlayInfo.rsDa[i].wCylNoStart, 4, 0, 9999 );
                        StrCat( gStr1, gStr2 );

/*                      PrintDec( gStr2, sPlayInfo.rsDa[i].wcc, 4, 0, 9999 );
/*                      StrCat( gStr1, gStr2 );
*/

                        if( sPlayInfo.rsDa[i].wSegPlaySpd < 0 )
                                StrCat( gStr1, "-");

                        PrintDec( gStr2, ABS(sPlayInfo.rsDa[i].wSegPlaySpd), 4, 0, 9999 );
                        StrCat( gStr1, gStr2 );

                        StrCat( gStr1, ":" );
                }
PrintDec( gStr2, gwPlaySpd, 3, 0, 999 );
StrCat( gStr1, gStr2 );
/*              PrintDec( gStr2, sPlayInfo.nDaTotal, 1, 0, 9 );
/*              StrCat( gStr1, gStr2 );
/*
/*              PrintDec( gStr2, sPlayInfo.wfcTotal, 4, 0, 9999 );
/*              StrCat( gStr1, gStr2 );
*/
                UiDispStr( gStr1, 1, 6 );
#endif
        return( TRUE );
}

/*
 * This routine prepares for continuous play fwd/rev from the current position
 * Before calling this routine, gwFieldNum must match sPlayInfo table.
 */
        FLAG
OpenContPlay( fPlayFwd )
        FLAG    fPlayFwd;                               /* TRUE if Play Fwd is pressed   */
{
        /*
         * PLAY_FWD pressed while previous play was reverse.
         */
        if( fPlayFwd && !sPlayInfo.fPlayFwd )
                RtPrepareToTurn();
        /*
         * PLAY_REV pressed while previous play was forward.
         */
        if( !fPlayFwd && sPlayInfo.fPlayFwd )
                RtPrepareToTurn();

        sPlayInfo.sCylAdv.wValueSpdCurr                 = VALUE_SPD_UNDEFINED;
        sPlayInfo.sCylAdv.fSignGlobalSpd         = SIGN_SPD_UNDEFINED;
        sPlayInfo.wUseFrameCnt                                  = DONT_USE_FRAME_CNT;
        sPlayInfo.fDontReadDisk                                 = FALSE;
        sPlayInfo.fDoneCylAdvForStep                    = FALSE;
        sPlayInfo.sCylAdv.wFrameNoCurr                  = 0;
        sPlayInfo.sCylAdv.lfcAdvCurr                    = (UINT32) 0;
        if( OpenFs( FS_MODE_PLAY ) != TRUE )
                return( FALSE );
        return( TRUE );
}
```

```
/*
 * This is a real time function which gets executed every field!
 *
 * Called from RtVertIntr() which, in turn, is called from the vertical
 * interrupt handler. ( IspField() ).
 *
 * It basically does three things:
 *
 *              1. Communicate with the disk controller through DP RAM.
 *              2. Set up the Fs and its data path thru video board hardware registers.
 *              3. Update the Play Info Table as it goes.
 *
 * First frame only write to FS. If first frame also read, it'll read garbage.
 * That's bad, ie.
 *                Field Step                              Frame Step( right on boundary )
 *                                                                                        ( See
StepFwd() comments )
 *    gfField2 : f1  f2    f1  f2          f1  f2    f1  f2
 * gfEvenFrame : E   E     O   O        E   E     O   O
 * to write to : f1  f2    f1  f2              f1  f2    f1  f2
 *             : FS2 FS2   FS1 FS1         FS2 FS2   FS1 FS1
 *  to read fr : f1  f2    f1  f2          f1  f2    f1  f2
 *               FS1 FS1   FS2 FS2         FS1 FS1   FS2 FS2
 * video field : f2  f1    f2  f1                    f2  f1    f2  f1
 *                                   |    |                     |        |
 *                 (asked)(available)       (asked)  (available)
 *                                            |                    |
 *                                                  (see)          (see)
 * Ask : Send disk read cmd;
 * Available: video in FS;
 * See: appear at output.
 *
 * At field 1 time, field 2 video will be written into FS2/f2 ( if even Frame )
 * for both field step and frame step. Will be there at field2 time. Will be
 * available for read at next field 1 for field step( total 2 fields delay ) ,
 * next field 2 for frame step( total 3 fields delay, 4 if not on frame bound ).
 *
 * !! Can't handle print two rt msg in one field for now.
 */
static  knt     = 1;
        FLAG
RtPlaying( )
{
        DA                     *psDaCurr;
        CYL_HEAD          *pVRam;
        FLAG              fInForStep                      = FALSE;
        /*
         * !! First make sure, it comes in at the right frame:
         */
        if( sPlayInfo.wUseFrameCnt == TO_USE_FRAME_CNT )
        {
                sPlayInfo.lFrameCntCopy          = glFrameCntTimer;
                sPlayInfo.wUseFrameCnt           = USING_FRAME_CNT;
        }

#if 0
if( sPlayInfo.wUseFrameCnt == USING_FRAME_CNT )
{
StrCpy( gStr1, "C" );
PrintDec( gStr2, (UINT16)knt, 4, 0, 9999 );
StrCat( gStr1, gStr2 );
StrCat( gStr1, ":" );
PrintDec( gStr2, (UINT16)sPlayInfo.wfcCurr, 4, 0, 9999 );
StrCat( gStr1, gStr2 );
StrCat( gStr1, ":" );
PrintDec( gStr2, (UINT16)gfEvenFrame, 1, 0, 9 );
StrCat( gStr1, gStr2 );
StrCat( gStr1, ":" );
PrintDec( gStr2, (UINT16)gfField2, 1, 0, 9 );
StrCat( gStr1, gStr2 );
StrCat( gStr1, ":" );
PrintDec( gStr2, (UINT16)sPlayInfo.fPlayFwd, 1, 0, 9 );
StrCat( gStr1, gStr2 );
StrCat( gStr1, ";" );
UiDispStr( gStr1, 1, 6 );
```

```
knt++;
}
#endif
        /*
         * Only set wValueSpdCurr and fSignGlobalSpd first time entering rt.
         * If segment play, there are specific segment local speeds,
         *              multiply them with the global speed. ( both sign and value )
         * If non-seg play, no local speed, but since we fake local speed of
         *              +100, do it as in segment play.
         *
         * fSignGlobalSpd only records the sign of the gwPlaySpd.
         * It may not be replaced by sPlayInfo.fPlayFwd because
         * for example, when positive global speed( gwPlaySpd ) and pressed
         * PLAY_REV, then fPlayFwd will be FALSE while fSignGlobalSpd will be TRUE.
         */
        if( sPlayInfo.sCylAdv.fSignGlobalSpd == SIGN_SPD_UNDEFINED )
        {
                sPlayInfo.sCylAdv.wValueSpdCurr          = (UINT16) ABS
                        ( (SINT32)gwPlaySpd * sPlayInfo.rsDa[sPlayInfo.iDaCurr].wSegPlaySpd
                        / 100 );
                sPlayInfo.sCylAdv.fSignGlobalSpd =(FLAG)((gwPlaySpd>=0)? TRUE:FALSE);
        }
        /*
         * gnStepFwd == 1 is the common way to provide a field delay thru the Fs.
         * Real stepping, normal / abort play end all end up in here one last time.
         */
        if( gnStepFwd == 1 || gnStepRev == 1 )
        {
                if( gwPlayState  == PLAY_STATE_STEPPING_FWD ||
                        gwPlayState == PLAY_STATE_STEPPING_REV ||
                        sPlayInfo.wUseFrameCnt == USING_FRAME_CNT )
                        /*
                         * If stepping/jogging, back to real world as aborted
                         */
                        gfPlayAborted    = TRUE;
                SetupForFreeze();
                if( gnStepFwd == 1 )
                        gnStepFwd               = 0;
                else
                if( gnStepRev == 1 )
                        gnStepRev               = 0;
                return( TRUE );
        }

        /*
         * For step/jog, the sequence is Check(CylAdv)/Read/Display;
         * For play, the sequence is Read/Display/Check(CylAdv);
         * Incorporate testing for end condition in RtCylAdvForStep()
         * Foe step/jog, we need to do cylinder advance before we do field1/2 check.
         * For both field step and frame step, > 1 , means still need to advance.
         */
        if( gnStepFwd > 1 || gnStepRev > 1 )
        {
                /*
                 * field1 time won't update registers, RT3_TOGGLE_FS_PLAYING
                 * won't take effect, while disk'll still consume 1 step cnt,
                 * so wait until field2
                 */
                if( gfFieldMode && !gfField2 )
                        return( TRUE );

                if( !sPlayInfo.fDoneCylAdvForStep )
                {
                        if( RtCylAdvForStep() != TRUE )
                        {
                                SetupForFreeze();
                                if( gnStepFwd > 1 )
                                        gnStepFwd                               = 0;
                                else
                                if( gnStepRev > 1 )
                                        gnStepRev                               = 0;
                                return( FALSE );
                        }
                        sPlayInfo.fDoneCylAdvForStep     = TRUE;
                }
```

```
}
/*
 * Jog must do cyl advance first. Otherwise, because we enter on time f2,
 * and will have a f2 video( wfcCurr ).
 */
if( sPlayInfo.wUseFrameCnt == USING_FRAME_CNT  )
{
        if( ( sPlayInfo.fPlayFwd && sPlayInfo.wfcCurr==sPlayInfo.wfcTotal-1 ) ||
                (!sPlayInfo.fPlayFwd && sPlayInfo.wfcCurr== 0 ) )
        {
                gnStepFwd = 1;
                return( TRUE );
        }
        if( RtCylAdvForPlay() != TRUE )
                return( FALSE );
}
/*
 * Normal speed play or frame step need to follow this rule:
 *
 *         In time field 2, we send read for field 1 video ( ie. even tc_video )
 *         In time field 1, we send read for field 2 video ( ie. odd  tc video )
 *
 * Why, because we want to:
 *
 *       To play field 1 video at field 1 time;
 *       To play field 2 video at field 2 time.
 */
psDaCurr                                = &sPlayInfo.rsDa[sPlayInfo.iDaCurr];
if(     ( !gfFieldMode && ( gnStepRev > 1 ) ) ||
        ( !gfFieldMode && ( gnStepFwd > 1 ) ) ||
        ( ( gnStepFwd == 0 && gnStepRev == 0 ) && sPlayInfo.fPlayFwd &&
                ( sPlayInfo.sCylAdv.wValueSpdCurr == PLAY_SPD_NORMAL ) ) )
{
        if( ( ( psDaCurr->wCylNoStart % 2 == 0 ) && !gfField2 ) ||
                ( ( psDaCurr->wCylNoStart % 2 == 1 ) &&  gfField2 )  )
                return( TRUE );
}
#if 1
if( ( gnStepFwd == 0 && gnStepRev == 0 ) && !sPlayInfo.fPlayFwd &&
                ( sPlayInfo.sCylAdv.wValueSpdCurr == PLAY_SPD_NORMAL ) )
{
        if( ( ( psDaCurr->wCylNoStart % 2 == 0 ) &&  gfField2 ) ||
                ( ( psDaCurr->wCylNoStart % 2 == 1 ) && !gfField2 )  )
                return( TRUE );
}
#endif
if( gnStepFwd > 1 )
{
        gnStepFwd--;
        fInForStep                      = TRUE;
}
else
if( gnStepRev > 1 )
{
        gnStepRev--;
        fInForStep                      = TRUE;
}
/*
 * Send Seek and Read for the next cylinder.
 * If told not to read any disk ( fDontReadDisk TRUE ),
 * then just to seek next disk later( for variable speed issue ).
 */
if ( sPlayInfo.fDontReadDisk )
        sPlayInfo.fDontReadDisk  = FALSE;
else
{
        if( TxDiskMsgWord( sPlayInfo.bDiskCtrlNo, (UINT8)(psDaCurr->bDiskNo),
                        I_DISK_CYL_NO, psDaCurr->wCylNoStart ) != TRUE )
                return( FALSE );

        if( TxDiskMsgByte( sPlayInfo.bDiskCtrlNo,(UINT8)(psDaCurr->bDiskNo),
                        I_DISK_CMD, CMD_DISK_SEEK_N_READ ) != TRUE )
                return( FALSE );

}
/*
```

```
 * Display absolute disk time only if it is not segment play.
 * Don't use gwMarkIn, cause it may change anytime.
 * Save this static play start time in advance in play info table.
 * If in seg play, inform UI curr seg, so it can update screen display.
 */
if( gwPlayMode != PLAY_MODE_SEG )
{
        gwFieldNum      = sPlayInfo.wfcCurr;
        UiDispRtFieldAndTc( TRUE, TRUE );
}
else
{
        TC      tcRec;
        /*
         * !! Temp display seg relative time in the absolute disk time position
         * This screws up gwFieldNum which should indicate where disk is.
         * Correct gwFieldNum afterwards.
         */
        gwFieldNum                                      = sPlayInfo.wfcCurr;
        UiDispRtFieldAndTc( TRUE, TRUE );
        if( DiskPositionToTc( sPlayInfo.bDiskCtrlNo, psDaCurr->bDiskNo,
                        psDaCurr->wCylNoStart, FALSE, &tcRec) != TRUE )
                return( FALSE );
        gwFieldNum                                      = (UINT16)tcRec.lFieldNo;
        gsUiState.bSequenceNoCurr       = psDaCurr->bSegSeqNo;
}
/*
 * If coming in this real-time for STEP business, return now .
 */
if( fInForStep )
{
        sPlayInfo.fDoneCylAdvForStep    = FALSE;
        return( TRUE );
}
/*
 * Check for stop button press here after read, not before read.
 * otherwise, wfcCurr is one ahead of what it really shows.
 *
 * If stopped, playing can't possibly finish, except when at the two ends.
 * Leave gfPlayAborted TRUE unless it has really finished already.
 * this flag serves as an indicator for playing finished or not.
 * Notice the difference between record and play.
 * ( RtReording() set gfRecAborted to FALSE immediately. )
 *
 * If field mode, check for abort every field;
 * If in frame mode, check for abort every frame.
 */
if( gfFieldMode ||      !gfField2 )
{
        if ( gfPlayAborted )
        {
                /*
                 * Last one field longer to allow the last read video come in.
                 */
                gnStepFwd       = 1;
                /*
                 * If done last field, then it is considered not aborted.
                 */
                if((sPlayInfo.fPlayFwd&& sPlayInfo.wfcCurr == sPlayInfo.wfcTotal- 1)
                        && ( !sPlayInfo.fPlayFwd && sPlayInfo.wfcCurr == 0 ) )
                        gfPlayAborted   = FALSE;
                return( TRUE );
        }
}
if( sPlayInfo.wUseFrameCnt == USING_FRAME_CNT )
{
        if( !gfField2 )
        {
                /*
                 * Check ending at f1, either by frame cnt done, or reached end.
                 */
                if( ( ( UINT16)( glFrameCntTimer - sPlayInfo.lFrameCntCopy )
                        >= sPlayInfo.wFrameCntToPlay ) ||
                        ( sPlayInfo.fPlayFwd &&
                                sPlayInfo.wfcCurr == sPlayInfo.wfcTotal - 1 ) ||
                        (!sPlayInfo.fPlayFwd && sPlayInfo.wfcCurr == 0  ) )
```

```
                {
                        gnStepFwd       = 1;
                        return( TRUE );
                }
        }
}
/*
 * The following handles playing fwd/rev with loop/pingpong modes
 */
if( sPlayInfo.wUseFrameCnt == DONT_USE_FRAME_CNT )
{
        if ( sPlayInfo.fPlayFwd )
        {
                /*
                 * If reached play table end or mark out.
                 */
                if( ( sPlayInfo.wfcCurr == sPlayInfo.wfcTotal - 1 ) ||
                        ( gwPlayMode !=PLAY_MODE_SEG &&
                                sPlayInfo.wfcCurr == sPlayInfo.wPlayEnd - 1 ) )
                {
                        switch( gbtyPlayRepeat )
                        {
                        case TY_PLAY_REPEAT_PINGPONG:
                                /* Can Pingpong in real-time. No seek ahead of time*/
                                if( !grfLedStatus[SHUTTLE_LED] )
                                        RtPrepareToPong();
                                else
                                        gnStepFwd       = 1;
                                break;

                        case TY_PLAY_REPEAT_LOOP:
                        case TY_PLAY_REPEAT_NONE:
                                gnStepFwd               = 1;
                                        break;
                                }
                                return(TRUE);
                        }
                        else
                        {
                                /*
                                 * If instructed to change direction,
                                 * ( from PLAY_FWD/PLAY_REV btns ) then do it.
                                 */
                                if( gwPlayState == PLAY_STATE_PLAYING_REV )
                                {
                                        RtPrepareToTurn();
                                        return( TRUE );
                                }
                                if( RtCylAdvForPlay() != TRUE )
                                        return( FALSE );
                        }
                }
                else
                {
                        /*
                         * If reached play table start or reached mark in.
                         */
                        if( ( sPlayInfo.wfcCurr ==  0 ) ||
                                ( gwPlayMode !=PLAY_MODE_SEG &&
                                        sPlayInfo.wfcCurr == sPlayInfo.wPlayStart ) )
                        {
                                switch( gbtyPlayRepeat )
                                {
                                case TY_PLAY_REPEAT_PINGPONG:
                                        /* Can Pingpong in real-time. No seek ahead of time
*/
                                        if( !grfLedStatus[SHUTTLE_LED] )
                                                RtPrepareToPong();
                                        else
                                                gnStepFwd       = 1;
                                        break;

                                case TY_PLAY_REPEAT_LOOP:
                                case TY_PLAY_REPEAT_NONE:
                                        gnStepFwd               = 1;
                                        break;
```

```
                        }
                        return(TRUE);
                }
                else
                {
                        /*
                         * If instructed to change direction,
                         * ( from PLAY_FWD/ PLAY_REV btn) then do it.
                         */
                        if( gwPlayState == PLAY_STATE_PLAYING_FWD )
                        {
                                RtPrepareToTurn();
                                return( TRUE );
                        }
                        if( RtCylAdvForPlay() != TRUE )
                                return( FALSE );
                }
        }
}
/*
 * Set the Head Swap Parameter for next field.
 */
grwOutRegRt3[IO_CTRL_REG]               &= ~ B_HEAD_SWAP;
grwOutRegRt3[IO_CTRL_REG]               |= rbBadSurface
                                        [sPlayInfo.bDiskCtrlNo * N_DISK_PER_CTRL_MAX
+

sPlayInfo.rsDa[sPlayInfo.iDaCurr].bDiskNo]
                                        [sPlayInfo.rsDa[sPlayInfo.iDaCurr].wCylNoStart]
<< 8;
        /*
         * !! May need to check first for CMD_DISK_NULL for disk read completion
         */
        /*
         * Read the cylinder header from the Y Fs through random access port.
         * EDAC was turned on before entering real-time .
         * If Odd frame, ( ie. we just did a write Fs1, read from Fs2),
         * so header comes from Fs1; Else, it comes from Fs2.
         */
        pVRam           = (CYL_HEAD *)BASE_VRAM_RT3;
        pVRam      += ( gfEvenFrame ) ? S_VRAM_EACH_FRAME : 0;
        pVRam      += ( gfField2 ) ? S_VRAM_EACH_FIELD : 0;
        sCylHead        = *pVRam;
        return( TRUE );
}
        static  void
SetupForFreeze()
{
        gwRt3State              = ( gfEvenFrame )?
                                RT3_FREEZE_FS2_NO_RECORD : RT3_FREEZE_FS1_NO_RECORD ;

        /*
         * For var-spd playing, do field repeat for both frame/field mode.
         */
        if( ( sPlayInfo.sCylAdv.wValueSpdCurr != PLAY_SPD_NORMAL ) &&
                gwPlayState != PLAY_STATE_STEPPING_FWD &&
                gwPlayState != PLAY_STATE_STEPPING_REV )
        {
                gbtyFieldRepeat                         =       (UINT8)
                                        ( gfEvenFrame?  TY_FIELD_REPEAT_F2_FS2 :
TY_FIELD_REPEAT_F2_FS1 );
        }
        else
        {
                if( gfFieldMode )
                {
                        if( gfField2 )
                                gbtyFieldRepeat         =       (UINT8)
                                        ( gfEvenFrame?  TY_FIELD_REPEAT_F2_FS2 :
TY_FIELD_REPEAT_F2_FS1 ) ;
                        else
                                gbtyFieldRepeat         =       (UINT8)
                                        ( gfEvenFrame?  TY_FIELD_REPEAT_F1_FS2 :
```

```
TY_FIELD_REPEAT_F1_FS1 ) ;
            }
            else
            {
                    /*
                     * For special mode, after freezing, frame/field back to normal,
                     * we will play f2 storage during f1, play f1 storage during f2.
                     * because f2 storage really stores f1 video and vice versa for
                     * special mode.
                     */
                    if( !sPlayInfo.fPlayFwd && gwPlayState == PLAY_STATE_PLAYING_REV )
                            gbtyFieldRepeat         = TY_FIELD_REPEAT_NONE_REV;
                    else
                            gbtyFieldRepeat         = TY_FIELD_REPEAT_NONE_FWD;
            }
            }
            gwPlayState             = PLAY_STATE_NULL;
            return;
    }
            FLAG
    FakeFrameStepFwd()
    {
            /*
             * Get it to f2 video to start with
             */
            if( sPlayInfo.wfcCurr % 2 == 0 )
            {
                    gnStepFwd       = 1;
                    gnStepRev       = 0;
                    if( RtCylAdvForStep() != TRUE )
                            return( FALSE );
            }
            /*
             * Back up 4 fields to get ready to do frame step fwd
             * Remember RtCylAdvForStep() doesn't change gnStepRev.
             */
            gnStepFwd       = 0;
            gnStepRev       = 1;
            if( RtCylAdvForStep() != TRUE )
                    return( FALSE );
            if( RtCylAdvForStep() != TRUE )
                    return( FALSE );
            if( RtCylAdvForStep() != TRUE )
                    return( FALSE );
            if( RtCylAdvForStep() != TRUE )
                    return( FALSE );

            return( TRUE );
    }
    /*
     * This routine prepares the Play Info Table to change play direction.
     * Change of direction occurs DURING THE PLAY by a button press.
     * Called by OpenContPlay() and RtPlaying(). Don't repeat the current field.
     * Don't check speed change( both value and sign ) to avoid confusion.
     *
     * Example: ( 50, 5, spd+ ), ( 102, 5, spd- ), ( 80, 2, spd+ ) and fPlayFwd,
     *          So, it did 50,5; 51,4; 52,3; 53,2; 54,1; 102,5; 101,4; 100,3; ...
     *          When turn, if at ( 100, 3, spd- ), we need to point to (101, 2, spd-).
     */
            void
    RtPrepareToTurn()
    {
            UINT8   iDaCurr;

            for ( iDaCurr = 0; iDaCurr < sPlayInfo.nDaTotal ; iDaCurr++ )
            {
                    /*
                     * Save copy will never change, so calculate new wCylNoStart first
                     */
                    if( ( sPlayInfo.fPlayFwd && sPlayInfo.rsDa[iDaCurr].wSegPlaySpd >= 0) ||
                            (!sPlayInfo.fPlayFwd && sPlayInfo.rsDa[iDaCurr].wSegPlaySpd < 0 ) )

                            sPlayInfo.rsDa[iDaCurr].wCylNoStartSave
                                    += sPlayInfo.rsDa[iDaCurr].wccSave - 1;
                    else
```

```
                sPlayInfo.rsDa[iDaCurr].wCylNoStartSave
                        -= sPlayInfo.rsDa[iDaCurr].wccSave - 1;

        if( iDaCurr == sPlayInfo.iDaCurr )
        {
                if( sPlayInfo.rsDa[iDaCurr].wcc ==
                                        sPlayInfo.rsDa[iDaCurr].wccSave )

         {
                /*
                 * Just done the first cyl on this DA, so get to previous DA.
                 * In case of slomo repeat field, it might be still sitting on
                 * the same edge of the play table. So don't advance iDaCurr.
                 */
                if( sPlayInfo.fPlayFwd )
                {
                        if( sPlayInfo.iDaCurr > 0 )
                                sPlayInfo.iDaCurr--;
                }
                else
                {
                        if( sPlayInfo.iDaCurr < sPlayInfo.nDaTotal - (UINT8)1
)
                                sPlayInfo.iDaCurr++;
                }
         }
         else
         {
                if( ( sPlayInfo.fPlayFwd &&
                                sPlayInfo.rsDa[iDaCurr].wSegPlaySpd >=
0) ||
                        (!sPlayInfo.fPlayFwd &&
                                sPlayInfo.rsDa[iDaCurr].wSegPlaySpd<
0 ) )
                        sPlayInfo.rsDa[iDaCurr].wCylNoStart-- ;
                else
                        sPlayInfo.rsDa[iDaCurr].wCylNoStart++ ;

                sPlayInfo.rsDa[iDaCurr].wcc
                        = sPlayInfo.rsDa[iDaCurr].wccSave -
                                sPlayInfo.rsDa[iDaCurr].wcc;
         }
        }
        else
        {
                sPlayInfo.rsDa[iDaCurr].wCylNoStart
                        =  sPlayInfo.rsDa[iDaCurr].wCylNoStartSave;
                sPlayInfo.rsDa[iDaCurr].wcc
                        =  sPlayInfo.rsDa[iDaCurr].wccSave;
        }
    }
    if( sPlayInfo.fPlayFwd )
    {
        if( sPlayInfo.wfcCurr > 0 )
                sPlayInfo.wfcCurr-- ;
    }
    else
    {
        if( sPlayInfo.wfcCurr < sPlayInfo.wfcTotal - 1 )
                sPlayInfo.wfcCurr++;
    }
    sPlayInfo.fDontReadDisk                 = FALSE;
    sPlayInfo.sCylAdv.wFrameNoCurr      = 0;
    sPlayInfo.sCylAdv.lfcAdvCurr        = (UINT32) 0;
    gwPlayState                                         = sPlayInfo.fPlayFwd?
                                                        PLAY_STATE_PLAYING_REV    :
PLAY_STATE_PLAYING_FWD;
    /*
     * Last thing to do is to toggle this.
     */
    sPlayInfo.fPlayFwd      = (FLAG)( sPlayInfo.fPlayFwd ? FALSE : TRUE );
    return;
}
/*
 * This routine prepares the Play Info Table to change play direction.
```

```
 * Change of direction occurs AT THE END OF PLAY in PING PONG mode.
 * Called by RtPlaying() only. Repeat the end cylinder.
 * Don't check speed change( both value and sign ) to avoid confusion.
 * This routine is actually a special case for RtPrepareToTurn().
 */
        void
RtPrepareToPong()
{
        UINT8   iDaCurr;

        for ( iDaCurr = 0; iDaCurr < sPlayInfo.nDaTotal ; iDaCurr++ )
        {
                /*
                 * Save copy was never changed, so calculate new wCylNoStart first
                 */
                if( ( sPlayInfo.fPlayFwd && sPlayInfo.rsDa[iDaCurr].wSegPlaySpd >= 0) ||
                        (!sPlayInfo.fPlayFwd && sPlayInfo.rsDa[iDaCurr].wSegPlaySpd < 0 ) )

                        sPlayInfo.rsDa[iDaCurr].wCylNoStartSave
                                += sPlayInfo.rsDa[iDaCurr].wccSave - 1;
                else
                        sPlayInfo.rsDa[iDaCurr].wCylNoStartSave
                                -= sPlayInfo.rsDa[iDaCurr].wccSave - 1;

                sPlayInfo.rsDa[iDaCurr].wCylNoStart
                                                = sPlayInfo.rsDa[iDaCurr].wCylNoStartSave;
                sPlayInfo.rsDa[iDaCurr].wcc
                                                = sPlayInfo.rsDa[iDaCurr].wccSave;
        }
        if( grfLedStatus[SHUTTLE_LED] || gwPlayMode == PLAY_MODE_SEG  )
        {
                sPlayInfo.wfcCurr                               = sPlayInfo.fPlayFwd ?
                                                                                sPlayInfo.wfcTotal
- 1 : 0;
                sPlayInfo.iDaCurr                               = sPlayInfo.fPlayFwd ?

sPlayInfo.nDaTotal- (UINT8)1 : (UINT8)0;
        }
        else
        {
                TC              tcCurr;
                UINT8   bDiskNoCurr;
                UINT16  wCylNoCurr;

                sPlayInfo.wfcCurr                               = sPlayInfo.fPlayFwd ?
                                                                                (
sPlayInfo.wPlayEnd - 1 ) :

sPlayInfo.wPlayStart    ;
                tcCurr.lFieldNo                                 = (SINT32)sPlayInfo.wfcCurr;
                tcCurr.fDropFrame                               = FALSE;
                tcCurr.fUndef                                   = FALSE;
                TcToDiskPosition( 0, tcCurr, &bDiskNoCurr, &wCylNoCurr );

                for ( iDaCurr = 0; iDaCurr < sPlayInfo.nDaTotal ; iDaCurr++ )
                        if( sPlayInfo.rsDa[iDaCurr].bDiskNo == bDiskNoCurr )
                                break;
                sPlayInfo.rsDa[iDaCurr].wCylNoStart         = wCylNoCurr;
                if( sPlayInfo.fPlayFwd )
                        sPlayInfo.rsDa[iDaCurr].wcc
                                                                                        =
sPlayInfo.rsDa[iDaCurr].wCylNoStartSave
                                                                                        +
sPlayInfo.rsDa[iDaCurr].wccSave
                                                                                        -
sPlayInfo.rsDa[iDaCurr].wCylNoStart;
```

Appendix to Gallo et al
Appl. Docket No. A-55041/WEH

```
                else
                        sPlayInfo.rsDa[iDaCurr].wcc
                                                                                        =
sPlayInfo.rsDa[iDaCurr].wccSave  -
                                                                                        (
```

```
sPlayInfo.rsDa[iDaCurr].wCylNoStartSave

sPlayInfo.rsDa[iDaCurr].wCylNoStart );
                sPlayInfo.iDaCurr                                   = iDaCurr;
        }
        sPlayInfo.fDontReadDisk                          = FALSE;
        sPlayInfo.sCylAdv.wValueSpdCurr              = VALUE_SPD_UNDEFINED;
        sPlayInfo.sCylAdv.fSignGlobalSpd = SIGN_SPD_UNDEFINED;
        sPlayInfo.sCylAdv.wFrameNoCurr               = 0;
        sPlayInfo.sCylAdv.lfcAdvCurr                 = (UINT32) 0;
        gwPlayState                                                   = sPlayInfo.fPlayFwd?

PLAY_STATE_PLAYING_REV :

PLAY_STATE_PLAYING_FWD ;
        /*
         * Do this lastly
         */
        sPlayInfo.fPlayFwd                             = (FLAG)( sPlayInfo.fPlayFwd? FALSE :
TRUE);
        return;
}

/*
 * For Loop Mode, we need to get out real-time, call this routine.
 * then reenter. The reason is disk seek can't make it.
 * Don't check speed change( both value and sign ) to avoid confusion.
 * For Pingpong Mode, don't need to get out real-time.
 */
        FLAG
OpenLoopPlay( )
{
        UINT8           iDaCurr;
        UINT8           iDaStart;

        /*
         * Retrieve all DA entries from the saved copy.
         */
        for ( iDaCurr=0; iDaCurr < sPlayInfo.nDaTotal ; iDaCurr++ )
        {
                sPlayInfo.rsDa[iDaCurr].wCylNoStart
                                                                        =
sPlayInfo.rsDa[iDaCurr].wCylNoStartSave;
                sPlayInfo.rsDa[iDaCurr].wcc
                                                                        =
sPlayInfo.rsDa[iDaCurr].wccSave;
        }
        if( gwPlayMode == PLAY_MODE_SEG )
        {
                sPlayInfo.wfcCurr                                 = sPlayInfo.fPlayFwd ?
sPlayInfo.wfcTotal - 1;                                                      0 :
                iDaStart                                              = sPlayInfo.fPlayFwd
?
sPlayInfo.nDaTotal- (UINT8)1;                                          (UINT8)0   :
                sPlayInfo.iDaCurr                                 = iDaStart;
        }
        else
        {
                UINT16  wPlayStart;
                UINT16  wPlayEnd;
                TC              tcCurr;
                UINT8   bDiskNoCurr;
                UINT16  wCylNoCurr;

                /*
                 * Might be able to loop each time with dynamic markin/out
                 */
                if( gwMarkOut < gwMarkIn )
                {
                        wPlayStart                                = gwMarkOut ;
                        wPlayEnd                                  = gwMarkIn ;
                }
                else
```

```
            {
                    wPlayStart                                      = gwMarkIn ;
                    wPlayEnd                                        = gwMarkOut ;
            }
            if( !gfFieldMode )
            {
                    if( wPlayStart % 2 == 1 )
                            wPlayStart                      -= 1;
                    if( wPlayEnd   % 2 == 1 )
                            wPlayEnd                        -= 1;
            }
            sPlayInfo.wPlayStart                    = wPlayStart;
            sPlayInfo.wPlayEnd                              = wPlayEnd;
            sPlayInfo.wfcCurr                               = sPlayInfo.fPlayFwd ? wPlayStart
:
                                                                                  wPlayEnd
- 1;
            tcCurr.lFieldNo                                 = (SINT32)sPlayInfo.wfcCurr;
            tcCurr.fDropFrame                               = FALSE;
            tcCurr.fUndef                                   = FALSE;
            TcToDiskPosition( 0, tcCurr, &bDiskNoCurr, &wCylNoCurr );

            for ( iDaCurr = 0; iDaCurr < sPlayInfo.nDaTotal ; iDaCurr++ )
                    if( sPlayInfo.rsDa[iDaCurr].bDiskNo == bDiskNoCurr )
                            break;
            sPlayInfo.rsDa[iDaCurr].wCylNoStart     = wCylNoCurr;
            if( sPlayInfo.fPlayFwd )
                    sPlayInfo.rsDa[iDaCurr].wcc
                                                                                  =
sPlayInfo.rsDa[iDaCurr].wCylNoStartSave
                                                                                  +
sPlayInfo.rsDa[iDaCurr].wccSave
                                                                                  -
sPlayInfo.rsDa[iDaCurr].wCylNoStart;
            else
                    sPlayInfo.rsDa[iDaCurr].wcc
                                                                                  =
sPlayInfo.rsDa[iDaCurr].wccSave  -
                                                                                  (
sPlayInfo.rsDa[iDaCurr].wCylNoStartSave
                                                                                  -
sPlayInfo.rsDa[iDaCurr].wCylNoStart );
            iDaStart                                        = iDaCurr;
            sPlayInfo.iDaCurr                               = iDaStart;
    }
    sPlayInfo.fDontReadDisk                 = FALSE;
    sPlayInfo.sCylAdv.wFrameNoCurr  = 0;
    sPlayInfo.sCylAdv.lfcAdvCurr    = (UINT32) 0;
    /*
     * Set up Fs for initial condition for playing.
     * Head Swap paramters needs reset when looping.
     */
    if( OpenFs( FS_MODE_PLAY ) != TRUE )
            return( FALSE );
            /*
             * Do seek on the first disk to play, so
             * first disk will be ready when real-time action begins.
             */
            /* Function call         */
            while(  gfField2 );
            if ( TxDiskMsgWord( sPlayInfo.bDiskCtrlNo,
                            (UINT8)(sPlayInfo.rsDa[iDaStart].bDiskNo),
                            I_DISK_CYL_NO, sPlayInfo.rsDa[iDaStart].wCylNoStart ) != TRUE )
                    return( FALSE );
            if ( TxDiskMsgByte( sPlayInfo.bDiskCtrlNo,
                            (UINT8)(sPlayInfo.rsDa[iDaStart].bDiskNo),
                            I_DISK_CMD, CMD_DISK_SEEK ) != TRUE )
                    return( FALSE );
            while(  gfField2 );
            while( !gfField2 );
            while(  gfField2 );
            return( TRUE );
}
/*
 * This routine prepares the Play Info Table to loop.
```

```
 * fPlayFwd TRUE  : Forward loop;
 *                  FALSE : Reverse loop.
 * Called by RtPlaying() only.
 * Don't check speed change( both value and sign ) to avoid confusion.
 */
        void
RtPrepareToLoop()
{
        UINT8   iDaCurr;

        sPlayInfo.iDaCurr        = sPlayInfo.fPlayFwd?    (UINT8) 0 :

sPlayInfo.nDaTotal - (UINT8)1;
        sPlayInfo.wfcCurr        = sPlayInfo.fPlayFwd?    0 : sPlayInfo.wfcTotal - 1;

        for ( iDaCurr=0; iDaCurr < sPlayInfo.nDaTotal ; iDaCurr++ )
        {
                sPlayInfo.rsDa[iDaCurr].wCylNoStart
                                                                                        =
sPlayInfo.rsDa[iDaCurr].wCylNoStartSave;
                sPlayInfo.rsDa[iDaCurr].wcc
                                                                                        =
sPlayInfo.rsDa[iDaCurr].wccSave;
        }
        sPlayInfo.fDontReadDisk                 = FALSE;
        sPlayInfo.sCylAdv.wFrameNoCurr    = 0;
        sPlayInfo.sCylAdv.lfcAdvCurr      = (UINT32) 0;
        return;
}

/*
 * This routine handles cylinder advance for playing( both normal and
 * non-normal speed ) . Takes care of both fwd and rev direction.
 * It handles the seek-ahead requirement for next disk and the advance
 * to next disk .
 * !! Didn't check if seek ready. If flashes later on, this might
 * be the cause.
 * For CINE/CLIP/NORMAL PLAY:
 *              sPlayInfo.fPlayFwd is the only direction.
 * For SEG PLAY:
 *              sPlayInfo.fPlayFwd is the global direction;
 *              while psDaCurr->wSegPlaySpd implies the local direction,
 *              the seg go fwd if sPlayInfo.fPlayFwd is fwd and wSegPlaySpd is positive;
 *              the seg go rev if sPlayInfo.fPlayFwd is fwd and wSegPlaySpd is negative;
 *              the seg go rev if sPlayInfo.fPlayFwd is rev and wSegPlaySpd is positive;
 *              the seg go fwd if sPlayInfo.fPlayFwd is rev and wSegPlaySpd is negative;
 */
        FLAG
RtCylAdvForPlay()
{
        UINT32          lfcAdvNext;
        UINT16          wfcToJumpExpect;
        UINT16          wfcToJumpMore;
        DA                      *psDaCurr;
        SINT16          wSpdNew;
        UINT16          wResult;

        psDaCurr                                                =
&sPlayInfo.rsDa[sPlayInfo.iDaCurr];
        if( sPlayInfo.wUseFrameCnt == DONT_USE_FRAME_CNT )
        {
                /*
                 * Each field, grab a sample of new speed
                 * to catch the gwPlaySpd change or the new DA wSegPlaySpd change.
                 */
                if( psDaCurr->wSegPlaySpd == 100 )
                        wSpdNew = gwPlaySpd;
                else
                        wSpdNew = (SINT16)((SINT32)gwPlaySpd*psDaCurr->wSegPlaySpd/100);
                /*
                 * If global speed changes sign, time to turn, also update sCylAdv.
                 */
                if( ( sPlayInfo.sCylAdv.fSignGlobalSpd == TRUE && gwPlaySpd < 0 ) ||
                        ( sPlayInfo.sCylAdv.fSignGlobalSpd == FALSE && gwPlaySpd > 0 ) )
                {
```

```
                        sPlayInfo.sCylAdv.fSignGlobalSpd = (FLAG)
                                                                                  ( gwPlaySpd
> 0 ? TRUE : FALSE );
                        sPlayInfo.sCylAdv.wValueSpdCurr          = ABS( wSpdNew );
                        RtPrepareToTurn();
                        return( TRUE );
                }
                else
                /*
                 * If only speed magnitude changes, update sCylAdv accordingly.
                 */
                if( sPlayInfo.sCylAdv.wValueSpdCurr != (UINT16) ABS( wSpdNew ) )
                {
                        sPlayInfo.sCylAdv.wValueSpdCurr          = (UINT16) ABS( wSpdNew );
                        sPlayInfo.sCylAdv.wFrameNoCurr           = 0;
                        sPlayInfo.sCylAdv.lfcAdvCurr             = (UINT32) 0;
                }
        }
        /*
         * Handle cylinder advance for PLAY
         */
        if( sPlayInfo.sCylAdv.wValueSpdCurr == PLAY_SPD_NORMAL )
        {
                if ( psDaCurr->wcc == FC_DISK_SEEK_ALLOWANCE )
                {
                        if( ( wResult = RtSeekNextDisk() ) == FALSE )
                                return( FALSE );
                        if( wResult == NEXT_DISK_SAME )
                                gwCrossDaPlay    = TO_FREEZE_A_FRAME;
                }
                /*
                 * There must be a next DA entry; Otherwise,
                 * it should've been blocked at testing end for wfcCurr earlier .
                 *
                 * Don't change current disk data.
                 * ie. let it remain ( xxx, 1 ). This is to handle cases
                 * like: step fwd when play table is for rev, or vice versa.
                 *
                 * The current DA entry always left with the data that's played
                 * for the last time. eg. In play fwd (104, 1) means this DA
                 * was played at cyl 104, and it is the last cyl. If we leave
                 * ( 105, 0 ), it would screw up step rev when play table
                 * is for fwd.
                 */
                if ( psDaCurr->wcc == 1 )
                {
                        if( gwCrossDaPlay == TO_FREEZE_A_FRAME )
                                gwCrossDaPlay = FREEZE_A_FRAME_NOW;

                        if( sPlayInfo.fPlayFwd &&
                                        ( sPlayInfo.iDaCurr < sPlayInfo.nDaTotal - (UINT8)1 )
)
                                psDaCurr                 =
&sPlayInfo.rsDa[++sPlayInfo.iDaCurr];
                        if( !sPlayInfo.fPlayFwd &&
                                        ( sPlayInfo.iDaCurr > (UINT8)0 ) )
                                psDaCurr                 =
&sPlayInfo.rsDa[--sPlayInfo.iDaCurr];
                }
                else
                {
                        if(     (  sPlayInfo.fPlayFwd && psDaCurr->wSegPlaySpd > 0 ) ||
                                ( !sPlayInfo.fPlayFwd && psDaCurr->wSegPlaySpd < 0 ) )
                                psDaCurr->wCylNoStart++;
                        else
                                psDaCurr->wCylNoStart--;
                        psDaCurr->wcc--;
                }
                /*
                 * Disk advanced or not, must do all the following
                 */
                if(     sPlayInfo.fPlayFwd )
                        sPlayInfo.wfcCurr++;
                else
                        sPlayInfo.wfcCurr--;
```

```
}
else
{
        /*
         * This is the NON-NORMAL PLAY SPEED case.
         *
         * If field-1, make sure next field ( field-2 ) don't do any disk read,
         * ( TBC will freeze and output show the same as field-1 ), only do
         * the disk seek to the right cylinder.
         */
        if( !gfField2 )
                sPlayInfo.fDontReadDisk                         = TRUE;
        else
        {
                /*
                 * Same old speed as the previous frame:
                 *              Fast Motion, will either repeat or jump
                 *              Slow Motion, will either repeat or increment.
                 * Calculate wfcAdvNext  :
                 *      Total fields advanced at next frame, under current speed.
                 * lfcAdvCurr            :
                 *      Total fields advanced at curr frame, under current speed.
                 * wfcToJumpExpect       :
                 *      Field cnt expected to jump to get from curr frame to next frame.
                 */
                if( sPlayInfo.sCylAdv.wValueSpdCurr > PLAY_SPD_NORMAL )
                        lfcAdvNext          = 2 *
                                ( ( (UINT32)sPlayInfo.sCylAdv.wValueSpdCurr *
                                ( sPlayInfo.sCylAdv.wFrameNoCurr + 1 ) + 50 )
/ 100 );

                else
                        lfcAdvNext          =
                                ( ( (UINT32)sPlayInfo.sCylAdv.wValueSpdCurr *
                                ( sPlayInfo.sCylAdv.wFrameNoCurr + 1 )* 2 + 50
) / 100);

                wfcToJumpExpect     = (UINT16)
                                        (   l f c A d v N e x t   -
sPlayInfo.sCylAdv.lfcAdvCurr );

                if ( wfcToJumpExpect >= 2 )
                /*
                 * Next frame is a jump ( including cases like (2,2) to (4,4) )
                 */
                {
                        wfcToJumpMore                                   =
wfcToJumpExpect;
                        while( psDaCurr->wcc <= wfcToJumpMore )
                        {
                                if( sPlayInfo.iDaCurr == ( sPlayInfo.fPlayFwd?
                                        sPlayInfo.nDaTotal - (UINT8)1 : (UINT8)0 ) )
                                {
                                        /*
                                         * Not enough cyl cnt on curr DA,
                                         * and curr DA is at end already.
                                         * update wfcToJumpExpect to be the real jump
count.
                                         */
                                        wfcToJumpExpect                 -=
                                                                wfcToJumpMore
- (psDaCurr->wcc- 1);
                                        if( sPlayInfo.fPlayFwd )
                                        {
                                                if( psDaCurr->wSegPlaySpd > 0 )
                                                        psDaCurr->wCylNoStart   + =
psDaCurr->wcc -1;
                                                else
                                                        psDaCurr->wCylNoStart   - =
psDaCurr->wcc -1;
                                                sPlayInfo.wfcCurr               + =
wfcToJumpExpect;
                                        }
                                        else
                                        {
                                                if( psDaCurr->wSegPlaySpd > 0 )
                                                        psDaCurr->wCylNoStart   - =
```

```
psDaCurr->wcc -1;
                                        else
                                                psDaCurr->wCylNoStart    + =
psDaCurr->wcc -1;
                                        sPlayInfo.wfcCurr               - =
wfcToJumpExpect;
                                    }
                                    psDaCurr->wcc                       - =
psDaCurr->wcc -1;
                                    goto LSeekDisk; /* Go seek the very last
cylinder        */
                            }
                            /*
                             * The whole curr disk allocation
                             * ( or the left over cyl cnt for first pass )
                             * is jumped over onto next disk allocation.
                             * Record how many more to jump in wfcToJumpMore.
                             */
                            wfcToJumpMore                               - =
psDaCurr->wcc;
                            if ( sPlayInfo.fPlayFwd )
                                    psDaCurr        =
&sPlayInfo.rsDa[++sPlayInfo.iDaCurr];
                            else
                                    psDaCurr        =
&sPlayInfo.rsDa[--sPlayInfo.iDaCurr];
                    }
                    /*
                     * Here, the expected jump count can be satisfied at this DA
                     */
                    if( sPlayInfo.fPlayFwd )
                    {
                            if( psDaCurr->wSegPlaySpd > 0 )
                                    psDaCurr->wCylNoStart    += wfcToJumpMore;
                            else
                                    psDaCurr->wCylNoStart    -= wfcToJumpMore;
                            sPlayInfo.wfcCurr                   +       =
wfcToJumpExpect;
                    }
                    else
                    {
                            if( psDaCurr->wSegPlaySpd > 0 )
                                    psDaCurr->wCylNoStart    -= wfcToJumpMore;
                            else
                                    psDaCurr->wCylNoStart    += wfcToJumpMore;
                            sPlayInfo.wfcCurr                   -       =
wfcToJumpExpect;
                    }
                    psDaCurr->wcc                               -= wfcToJumpMore;
LSeekDisk:
                    if( TxDiskMsgWord( sPlayInfo.bDiskCtrlNo,
                            (UINT8)(psDaCurr->bDiskNo),
                                    I_DISK_CYL_NO, psDaCurr->wCylNoStart ) != TRUE
)
                            return( FALSE );

                    if( TxDiskMsgByte( sPlayInfo.bDiskCtrlNo,
                                    (UINT8)(psDaCurr->bDiskNo),
                                    I_DISK_CMD, CMD_DISK_SEEK ) != TRUE )
                            return( FALSE );
            }
            else
            if( wfcToJumpExpect == 1 )
            {
                    /*
                     * If increment or decrement, don't need to seek ahead of time.
                     * unless it is switching to next disk allocation entry.
                     * In which case, don't change current disk data.
                     * ie. let it remain ( xxx, 1 ). This is to handle cases
                     * like: step fwd when play table is for rev, or vice versa.
                     *
                     * The current DA entry always left with the data that's played
                     * for the last time. eg. In play fwd (104, 1) means this DA
                     * was played at cyl 104, and it is the last cyl. If we leave
                     * ( 105, 0 ), it would screw up step rev when play table
                     * is for fwd.
```

```
                                */
                                if ( psDaCurr->wcc == 1 )
                                {
                                        /* Get to next Disk Alloc Entry                */
                                        if ( sPlayInfo.fPlayFwd )
                                                psDaCurr        =
&sPlayInfo.rsDa[++sPlayInfo.iDaCurr];
                                        else
                                                psDaCurr        =
&sPlayInfo.rsDa[--sPlayInfo.iDaCurr];
                                        if( TxDiskMsgWord( sPlayInfo.bDiskCtrlNo,
                                                (UINT8)(psDaCurr->bDiskNo),
                                                I_DISK_CYL_NO, psDaCurr->wCylNoStart ) != TRUE
)
                                                return( FALSE );

                                        if( TxDiskMsgByte( sPlayInfo.bDiskCtrlNo,
                                                (UINT8)(psDaCurr->bDiskNo),
                                                I_DISK_CMD, CMD_DISK_SEEK ) != TRUE )
                                                return( FALSE );
                                }
                                else
                                {
                                        if( sPlayInfo.fPlayFwd )
                                                psDaCurr->wSegPlaySpd > 0 ? psDaCurr->wCylNoStart++
:
psDaCurr->wCylNoStart-- ;
                                        else
                                                psDaCurr->wSegPlaySpd > 0 ? psDaCurr->wCylNoStart--
:
psDaCurr->wCylNoStart++ ;
                                        psDaCurr->wcc--;
                                }
                                if( sPlayInfo.fPlayFwd )
                                        sPlayInfo.wfcCurr++;
                                else
                                        sPlayInfo.wfcCurr--;
                        }
                        /*
                         * Here, wfcToJumpExpect is 0, meaning next frame is a repeat,
                         * so don't change wCylNoStart, wcc and wfcCurr.
                         * Prepare for next frame
                         */
                        sPlayInfo.sCylAdv.wFrameNoCurr++;
                        sPlayInfo.sCylAdv.lfcAdvCurr            += wfcToJumpExpect;
                }
        }
        return( TRUE );
}

/*
 * This routine handles cylinder advance for stepping.
 * It takes into consideration both global direction( sPlayInfo.fPlayFwd ),
 * and segment local direction ( DA's wSegPlaySpd ) .
 * It handles the seek-ahead requirement for next disk and the advance
 * to next disk .
 * !! Didn't check if seek ready. If flashes later on, this might
 * be the cause.
 */

        FLAG
RtCylAdvForStep()
{
        DA                      *psDaCurr;

        psDaCurr        = &sPlayInfo.rsDa[sPlayInfo.iDaCurr];

        if( gnStepFwd > 0 )
        {
                if( sPlayInfo.fPlayFwd )
                {
                        if( sPlayInfo.wfcCurr  == sPlayInfo.wfcTotal - 1 )
                        {
                                switch( gbtyPlayRepeat )
                                {
```

```
                    case TY_PLAY_REPEAT_PINGPONG:
                            RtPrepareToPong();
                            break;

                    case TY_PLAY_REPEAT_LOOP:
                            RtPrepareToLoop();
                            break;

                    case TY_PLAY_REPEAT_NONE:
                            gnStepFwd               = 0;
                            gfPlayAborted    = FALSE;
                            UiBeep();
                            return( FALSE );
                    }
            }
            else
            {
                    if ( psDaCurr->wcc == FC_DISK_SEEK_ALLOWANCE )
                            if( RtSeekNextDisk() != TRUE )
                                    return( FALSE );
                    /*
                     * There must be a next DA entry; Otherwise, it should've
                     * been blocked at testing end for wfcCurr earlier .
                     */
                    if ( psDaCurr->wcc == 1 )
                    {
                            if( sPlayInfo.iDaCurr < sPlayInfo.nDaTotal - (UINT8)1
)
                                    sPlayInfo.iDaCurr++;
                    }
                    else
                    {
                            psDaCurr->wSegPlaySpd > 0 ? psDaCurr->wCylNoStart++ :
psDaCurr->wCylNoStart-- ;
                            psDaCurr->wcc--;
                    }
                    sPlayInfo.wfcCurr++;
            }
    }
    else
    {
            if( sPlayInfo.wfcCurr  == sPlayInfo.wfcTotal - 1 )
            {
                    switch( gbtyPlayRepeat )
                    {
                    case TY_PLAY_REPEAT_PINGPONG:
                            break;  /* Already ready for Pong              */

                    case TY_PLAY_REPEAT_LOOP:
                    case TY_PLAY_REPEAT_NONE:
                            gnStepFwd               = 0;
                            gfPlayAborted    = FALSE;
                            UiBeep();
                            return( FALSE );
                    }
            }
            else
            {
                    /*
                     * Get to PREVIOUS DA entry in the sense of reverse play table.
                     * There must be a previous DA entry; Otherwise, it should've
                     * been blocked at testing end for wfcCurr earlier .
                     * The PREVIUOS disk head must be right there where you need it.
                     */
                    if( psDaCurr->wcc == psDaCurr->wccSave )
                    {
                            if( sPlayInfo.iDaCurr < sPlayInfo.nDaTotal - (UINT8)1
)
                                    sPlayInfo.iDaCurr++;
                    }
                    else
                    {
                            psDaCurr->wCylNoStart++;
                            psDaCurr->wSegPlaySpd>0 ? psDaCurr->wcc++ : psDaCurr->wcc--;
```

```
                        }
                        sPlayInfo.wfcCurr++;
                }
        }
}
else
if( gnStepRev > 0 )
{
        if( sPlayInfo.fPlayFwd )
        {
                if( sPlayInfo.wfcCurr  == 0 )
                {
                        switch( gbtyPlayRepeat )
                        {
                        case TY_PLAY_REPEAT_PINGPONG:
                                break;  /* Already ready for Pong                    */

                        case TY_PLAY_REPEAT_LOOP:
                        case TY_PLAY_REPEAT_NONE:
                                gnStepRev               = 0;
                                gfPlayAborted    = FALSE;
                                UiBeep();
                                return( FALSE );
                        }
                }
                else
                {
                        /*
                         * Get to PREVIOUS DA entry in the sense of forward play table.
                         * There must be a previous DA entry; Otherwise, it should've
                         * been blocked at testing end for wfcCurr earlier .
                         * The PREVIUOS disk head must be right there where you need it.
                         */
                        if( psDaCurr->wcc == psDaCurr->wccSave )
                        {
                                if( sPlayInfo.iDaCurr > (UINT8)0 )
                                        sPlayInfo.iDaCurr--;
                        }
                        else
                        {
                                psDaCurr->wCylNoStart-- ;
                                psDaCurr->wSegPlaySpd > 0 ?
                                                        psDaCurr->wcc++ : psDaCurr->wcc--;
                        }
                        sPlayInfo.wfcCurr--;
                }
        }
        else
        {
                if( sPlayInfo.wfcCurr == 0 )
                {
                        switch( gbtyPlayRepeat )
                        {
                        case TY_PLAY_REPEAT_PINGPONG:
                                RtPrepareToPong();
                                break;

                        case TY_PLAY_REPEAT_LOOP:
                                RtPrepareToLoop();
                                break;

                        case TY_PLAY_REPEAT_NONE:
                                gnStepRev               = 0;
                                gfPlayAborted    = FALSE;
                                UiBeep();
                                return( FALSE );
                        }
                }
                else
                {
                        if ( psDaCurr->wcc == FC_DISK_SEEK_ALLOWANCE )
                                if( RtSeekNextDisk() != TRUE )
                                        return( FALSE );
                        /*
                         * There must be a next DA entry; Otherwise, it should've
                         * been blocked at testing end for wfcCurr earlier .
```

```
                                */
                                if ( psDaCurr->wcc == 1 )
                                {
                                        if( sPlayInfo.iDaCurr > (UINT8)0 )
                                                sPlayInfo.iDaCurr--;
                                }
                                else
                                {
                                        psDaCurr->wCylNoStart-- ;
                                        psDaCurr->wSegPlaySpd>0 ? psDaCurr->wcc-- : psDaCurr->wcc++;
                                }
                                sPlayInfo.wfcCurr--;
                        }
                }
        }
        return( TRUE );
}

/*
 * This routine does:
 * If there is a next disk allocation entry , then seek the next disk;
 * else. do nothing.
 * The purpose is to seek advance in order to cope with real time.
 */
        FLAG
RtSeekNextDisk()
{
        DA              *psDaNext;
        DA              *psDaCurr;

        if( ( sPlayInfo.fPlayFwd &&
                        ( sPlayInfo.iDaCurr < sPlayInfo.nDaTotal - (UINT8)1 ) ) ||
                ( !sPlayInfo.fPlayFwd &&
                        ( sPlayInfo.iDaCurr > (UINT8)0 ) ) )
        {
                /*
                 * Inc or Dec iDaCurr later when wcc reaches 0
                 */

                psDaCurr = &sPlayInfo.rsDa[sPlayInfo.iDaCurr];
                if ( sPlayInfo.fPlayFwd )
                        psDaNext = &sPlayInfo.rsDa[sPlayInfo.iDaCurr+1];
                else
                        psDaNext = &sPlayInfo.rsDa[sPlayInfo.iDaCurr-1];

                /*
                 * For single disk, or cache mistake, we still play the best we can
                 */
                if( psDaCurr->bDiskNo == psDaNext->bDiskNo )
                        return( NEXT_DISK_SAME );
                if( TxDiskMsgWord( sPlayInfo.bDiskCtrlNo,
                        (UINT8)(psDaNext->bDiskNo),I_DISK_CYL_NO, psDaNext->wCylNoStart)
                        != TRUE )
                        return( FALSE );

                if( TxDiskMsgByte( sPlayInfo.bDiskCtrlNo,
                        (UINT8)(psDaNext->bDiskNo), I_DISK_CMD, CMD_DISK_SEEK)
                        != TRUE)
                        return( FALSE );
        }
        return( TRUE );
}
/*
 * This routine fixes up two problems by performing disk caching:
 * one: any DA entry having play duration less than FC_DISK_SEEK_ALLOWANCE.
 * two: any DA entry having same disk # as previous DA entry.
 * When executing this routine, the generic wCylStart still is the less
 * cylinder number. ie. for Play Rev, we would have ( 102, 3 )  to indicate
 * ( 102, 101, 100 ), but here, it is still ( 100, 3 ). The conversion
 * will be done after calling FixupDaForPlay() in CompletePlayInfo().
 */
        FLAG
FixupDaForPlay( bDiskCtrlNo, fPlayFwd )
        UINT8   bDiskCtrlNo;
        FLAG    fPlayFwd;               /* Global direction                          */
```

```
{
        UINT8   bDiskNoPrev;
        UINT8   bDiskNoNext;
        UINT8   bDiskNoTo;
        UINT16  wCylNoStartTo;
        UINT8   iDa;
        UINT8   iDa2;
        UINT16  wccCurrDa;
        UINT16  wccToCopy;
        UINT16  i, j;
        FLAG    fCacheSrcFwd;
        /*
         * First, fix the problem that some DA entry may have
         * play duration less than FC_DISK_SEEK_ALLOWANCE cylinders
         * Don't worry about the very last DA entry, it doesn't matter
         */
        iDa = 0;
        while( TRUE )
        {
                /*
                 * Find the DA entry that is too short
                 */
                for ( ; iDa < sPlayInfo.nDaTotal - (UINT8)1; iDa++ )
                {
                        if ( sPlayInfo.rsDa[iDa].wcc < FC_DISK_SEEK_ALLOWANCE )
                                break;
                }
                if ( iDa == sPlayInfo.nDaTotal - (UINT8)1 )
                {
                        /*
                         * Done fixing up first type of problem.
                         * break out while loop to handle second type of problem.
                         */
                        break;
                }
                /*
                 * Fix up this short DA entry!
                 * Move iDa to any available disk cache area except
                 * previous disk and next disk. ( even current disk is OK )
                 */
                if ( iDa == 0 )
                        bDiskNoPrev             = EXCLUDE_NO_DISK;
                else
                        bDiskNoPrev             = sPlayInfo.rsDa[iDa-1].bDiskNo;

                if ( iDa == sPlayInfo.nDaTotal - (UINT8)1 )
                        bDiskNoNext             = EXCLUDE_NO_DISK;
                else
                        bDiskNoNext             = sPlayInfo.rsDa[iDa+1].bDiskNo;

                /*
                 * If two disk system, and no place to cache, only exclude the previous,
                 * let pass two fix the same-disk problem.
                 */
                if( ( bDiskNoNext!= bDiskNoPrev ) &&
                        ( bDiskNoNext!= EXCLUDE_NO_DISK && bDiskNoPrev!= EXCLUDE_NO_DISK )&&
                        ( grnDiskOnLine[bDiskCtrlNo] == 2 )       )
                        bDiskNoNext             = bDiskNoPrev;

                if( ( !fPlayFwd && sPlayInfo.rsDa[iDa].wSegPlaySpd > 0 ) ||
                        (  fPlayFwd && sPlayInfo.rsDa[iDa].wSegPlaySpd < 0 )       )
                        fCacheSrcFwd    = FALSE;
                else
                        fCacheSrcFwd    = TRUE;

                if( DiskCache( bDiskCtrlNo, sPlayInfo.rsDa[iDa].bDiskNo,
                                sPlayInfo.rsDa[iDa].wCylNoStart, sPlayInfo.rsDa[iDa].wcc,
                                fCacheSrcFwd,
                                bDiskNoPrev, bDiskNoNext, &bDiskNoTo, &wCylNoStartTo ) != TRUE
)
                        return( FALSE );
                /*
                 * This loop accumulates cyl cnt for current DA entry (ie. iDa ) to
                 * reach FC_DISK_SEEK_ALLOWANCE by copying its following entries.
                 */
```

```
for( i = 1, wccCurrDa = sPlayInfo.rsDa[iDa].wcc;
        wccCurrDa < FC_DISK_SEEK_ALLOWANCE && iDa + i < sPlayInfo.nDaTotal ;
                                                                        wcc
+= wccToCopy )
{

        if( ( !fPlayFwd && sPlayInfo.rsDa[iDa + i].wSegPlaySpd > 0 ) ||
                (  fPlayFwd && sPlayInfo.rsDa[iDa + i].wSegPlaySpd < 0 )   )
                fCacheSrcFwd                                = FALSE;
        else
                fCacheSrcFwd                                = TRUE;

        if ( sPlayInfo.rsDa[iDa+i].wcc >=
                (UINT16)(2 * FC_DISK_SEEK_ALLOWANCE)-sPlayInfo.rsDa[iDa].wcc)
        {
                /*
                 * Disk Copy only FC_DISK_SEEK_ALLOWANCE - wccCurrDa.
                 * ( in order to reach FC_DISK_SEEK_ALLOWANCE. )
                 */
                wccToCopy                = FC_DISK_SEEK_ALLOWANCE - wccCurrDa;
                if( DiskCopy( bDiskCtrlNo, sPlayInfo.rsDa[iDa+i].bDiskNo,
                        sPlayInfo.rsDa[iDa+i].wCylNoStart,  fCacheSrcFwd,
                        bDiskNoTo, wCylNoStartTo + sPlayInfo.rsDa[iDa].wcc,
                        wccToCopy ) != TRUE )
                        return( FALSE );
                if( fCacheSrcFwd )
                        sPlayInfo.rsDa[iDa+i].wCylNoStart
                                                += FC_DISK_SEEK_ALLOWANCE -
wccCurrDa;
                else
                        sPlayInfo.rsDa[iDa+i].wCylNoStart
                                                -= FC_DISK_SEEK_ALLOWANCE -
wccCurrDa;
                sPlayInfo.rsDa[iDa+i].wcc
                                                -= FC_DISK_SEEK_ALLOWANCE -
wccCurrDa;
        }
        else
        {
                /*
                 * Disk Copy the whole thing in iDa+i.
                 */
                wccToCopy                = sPlayInfo.rsDa[iDa+i].wcc;
                if( DiskCopy( bDiskCtrlNo, sPlayInfo.rsDa[iDa+i].bDiskNo,
                        sPlayInfo.rsDa[iDa+i].wCylNoStart, fCacheSrcFwd,
                        bDiskNoTo, wCylNoStartTo + sPlayInfo.rsDa[iDa].wcc,
                        wccToCopy ) != TRUE )
                        return( FALSE );
                /*
                 * Eliminate this entry
                 * next time thru the loop, it will examine the same entry
                 * which is actually the next entry, since it's shifted forward
                 */
                for ( j = i; iDa + j < sPlayInfo.nDaTotal - (UINT8)1; j++ )
                        sPlayInfo.rsDa[iDa+j]    = sPlayInfo.rsDa[iDa+j+1];
                sPlayInfo.nDaTotal--;
        }
}
/*
 * !! Bug for now. We should, at this point, go backward to
 * append these ( iDa ~ iDa+i ) entries to iDa - 1 to make up
 * for FC_DISK_SEEK_ALLOWANCE
 */
if ( ( iDa + i == sPlayInfo.nDaTotal ) &&
        ( wccCurrDa < FC_DISK_SEEK_ALLOWANCE ) )
{
        UiSetAndDispStr(1,ROW_NO_ERR_MSG, "trailing items can't play.");
        return( FALSE );
}
/*
 * At this point, current DA's cyl cnt reaches FC_DISK_SEEK_ALLOWANCE.
 * ( ie. wccCurrDa >= FC_DISK_SEEK_ALLOWANCE. )
 * Adjust its Play Info Table entry.
 * bSegSeqNo remains the same.
 * wSegPlaySpd always matches global direction to ensure absolute fwd.
```

```
          */
          sPlayInfo.rsDa[iDa].bDiskNo             = bDiskNoTo;
          sPlayInfo.rsDa[iDa].wCylNoStart  = wCylNoStartTo;
          sPlayInfo.rsDa[iDa].wcc                 = wccCurrDa;

          if( fPlayFwd )
                sPlayInfo.rsDa[iDa].wSegPlaySpd  =
                                                          A B S (
sPlayInfo.rsDa[iDa].wSegPlaySpd );
          else
                sPlayInfo.rsDa[iDa].wSegPlaySpd  =
                                                   - (    A B S (
sPlayInfo.rsDa[iDa].wSegPlaySpd ) );
        }
        /*
         * Then, fix the problem that any DA entry having same disk #
         * as previous DA entry. Since the first problem has been fixed
         * already, we are certain that the DA to copy will always have
         * something left.
         * Don't worry about the first DA entry.
         */
        for ( iDa = 1; iDa != sPlayInfo.nDaTotal; iDa++ )
        {
              if ( sPlayInfo.rsDa[iDa].bDiskNo == sPlayInfo.rsDa[iDa-1].bDiskNo )
              {
                    if( ( !fPlayFwd && sPlayInfo.rsDa[iDa].wSegPlaySpd > 0 ) ||
                          (  fPlayFwd && sPlayInfo.rsDa[iDa].wSegPlaySpd < 0 )     )
                          fCacheSrcFwd     = FALSE;       /*   Cache   source   cyl   #
decrement      */
                    else
                          fCacheSrcFwd     = TRUE;        /*   Cache   source   cyl   #
increment      */

                    if ( sPlayInfo.rsDa[iDa].wcc < 2 * FC_DISK_SEEK_ALLOWANCE  )
                    {
                          /*
                           * Move the whole thing, nDaTotal remains the same.
                           */
                          if( DiskCache( bDiskCtrlNo, sPlayInfo.rsDa[iDa].bDiskNo,
                                sPlayInfo.rsDa[iDa].wCylNoStart,sPlayInfo.rsDa[iDa].wcc,
                                fCacheSrcFwd,
                                sPlayInfo.rsDa[iDa].bDiskNo,sPlayInfo.rsDa[iDa].bDiskNo,
                                &bDiskNoTo, &wCylNoStartTo ) != TRUE )
                                return( FALSE );
                          /*
                           * wcc is not changed
                           * Neither is bSegSeqNo.
                           * wSegPlaySpd in the Destination always matches global dir,
                           * So as to ensure a absolute play fwd.
                           */
                          sPlayInfo.rsDa[iDa].bDiskNo                   = bDiskNoTo;
                          sPlayInfo.rsDa[iDa].wCylNoStart          = wCylNoStartTo;
                          if( fPlayFwd )
                                sPlayInfo.rsDa[iDa].wSegPlaySpd  =
                                                          A B S (
sPlayInfo.rsDa[iDa].wSegPlaySpd );
                          else
                                sPlayInfo.rsDa[iDa].wSegPlaySpd  =
                                                   - (    A B S (
sPlayInfo.rsDa[iDa].wSegPlaySpd ) );
                    }
                    else
                    {
                          /*
                           * Move FC_DISK_SEEK_ALLOWANCE cylinders for iDa, causing
                           * nDaTotal incremented by one.
                           */
                          if( DiskCache( bDiskCtrlNo, sPlayInfo.rsDa[iDa].bDiskNo,
                                sPlayInfo.rsDa[iDa].wCylNoStart, FC_DISK_SEEK_ALLOWANCE,
                                fCacheSrcFwd,
                                sPlayInfo.rsDa[iDa].bDiskNo,sPlayInfo.rsDa[iDa].bDiskNo,
                                &bDiskNoTo, &wCylNoStartTo ) != TRUE )
                                return( FALSE );
                          /*
                           * Insert a new entry in DA table, and modify the current entry.
                           */
```

```
                        for ( iDa2 = sPlayInfo.nDaTotal; iDa2 > iDa; iDa2-- )
                                sPlayInfo.rsDa[iDa2]                    =
sPlayInfo.rsDa[iDa2-1];
                        sPlayInfo.rsDa[iDa].bDiskNo                     = bDiskNoTo;
                        sPlayInfo.rsDa[iDa].wCylNoStart             = wCylNoStartTo;
                        sPlayInfo.rsDa[iDa].wcc                         =
FC_DISK_SEEK_ALLOWANCE;
                        /*
                         * wSegPlaySpd in the Destination always matches global dir,
                         * So as to ensure a absolute play fwd.
                         */
                        if( fPlayFwd )
                                sPlayInfo.rsDa[iDa].wSegPlaySpd  =
                                                                        A   B   S   (
sPlayInfo.rsDa[iDa+1].wSegPlaySpd );
                        else
                                sPlayInfo.rsDa[iDa].wSegPlaySpd  =
                                                        - (        A   B   S   (
sPlayInfo.rsDa[iDa+1].wSegPlaySpd ) );
                        sPlayInfo.rsDa[iDa].bSegSeqNo              =

sPlayInfo.rsDa[iDa+1].bSegSeqNo;
                        if( fCacheSrcFwd )
                                sPlayInfo.rsDa[iDa+1].wCylNoStart

FC_DISK_SEEK_ALLOWANCE ;                                                        + =
                        else
                                sPlayInfo.rsDa[iDa+1].wCylNoStart

FC_DISK_SEEK_ALLOWANCE ;                                                        - =
                        sPlayInfo.rsDa[iDa+1].wcc                    -         =
FC_DISK_SEEK_ALLOWANCE ;
                        sPlayInfo.nDaTotal                                      +1
                }
            }
        }
        return( TRUE );
}
/*
 * This routine first finds a destination to go to( it must not be
 * bExcludeDiskNo1 or bExcludeDiskNo2 ), then calls DiskCopy() to
 * copy the disk video over to destination, and returns the
 * destination disk # and start cylinder #.
 * bDiskNoFrom is OK to be the destination.
 */
        FLAG
DiskCache( bDiskCtrlNo, bDiskNoFrom, wCylNoStartFrom, wccToCache, fCacheSrcFwd,
                bExcludeDiskNo1, bExcludeDiskNo2, pbDiskNoToRet, pwCylNoStartToRet )
        UINT8   bDiskCtrlNo;
        UINT8   bDiskNoFrom;
        UINT16  wCylNoStartFrom;
        UINT16  wccToCache;
        FLAG    fCacheSrcFwd;
        UINT8   bExcludeDiskNo1;
        UINT8   bExcludeDiskNo2;
        UINT8   *pbDiskNoToRet;
        UINT16  *pwCylNoStartToRet;
{
        UINT8   bnDiskOnLine;
        UINT8   bDiskNoTo;
        UINT16  wCylNoStartTo;
        /*
         * Copy leading wccToCache cylinders to cache area on any other disk.
         */
        switch( bnDiskOnLine     = grnDiskOnLine[bDiskCtrlNo] )
        {
        default:
                StrCpy( gStr1,  " Error! Number of On-line disks is" );
                PrintDec( gStr1, bnDiskOnLine, 3, 0, 256 );
                UiDispStr( gStr1, 1, ROW_NO_ERR_MSG );
                return( FALSE );

        case 0:
                UiSetAndDispStr(1,ROW_NO_ERR_MSG,"No on-line disks." );
                return( FALSE );
```

```
        case 1:
                UiSetAndDispStr(1,ROW_NO_ERR_MSG,"Can't do disk cache.");
                return( FALSE );

        case 2:
        case 3:
        case 4:
        case 5:
        case 6:
        case 7:
                /*
                 * !! May need to modify to also search the other controller.
                 * Looking for the right disk number to go to
                 */
                for ( bDiskNoTo = DISK1; bDiskNoTo < N_DISK_PER_CTRL_MAX; bDiskNoTo++ )
                {
                        if( !grfDiskPresent[bDiskCtrlNo * N_DISK_PER_CTRL_MAX + bDiskNoTo] )
                                continue;
                        if(     ( bDiskNoTo == bExcludeDiskNo1 ) ||
                                        ( bDiskNoTo == bExcludeDiskNo2 )        )
                                continue;
                        if( ( wCylNoStartTo =
                                        riCacheBuf[bDiskCtrlNo*N_DISK_PER_CTRL_MAX+bDiskNoTo]
) +
                                        wccToCache <= (UINT16)N_CYL_PER_DISK )
                                /*
                                 * Found it.
                                 */
                                break;
                }
                if ( bDiskNoTo == N_DISK_PER_CTRL_MAX )
                {
                        UiSetAndDispStr ( 1, ROW_NO_ERR_MSG, "No disk or cache area left.");
                        return( FALSE );
                }
                /*
                 * Found the disk to go to. (ie. Any other on-line disk that has room. )
                 * Do the disk cache and adjust the cache buffer index.
                 */
                if( DiskCopy( bDiskCtrlNo, bDiskNoFrom, wCylNoStartFrom, fCacheSrcFwd,
                                        bDiskNoTo, wCylNoStartTo, wccToCache ) != TRUE )
                        return( FALSE );

                *pbDiskNoToRet                  = bDiskNoTo;
                *pwCylNoStartToRet              = wCylNoStartTo;
                break;
        }
        return( TRUE );
}
/*
 * This routine copies video from one disk to another disk as specified.
 * It reads each cylinder from disk to FS1 field1, and writes it out to
 * the other disk.
 */
        FLAG
DiskCopy( bDiskCtrlNo, bDiskNoFrom, wCylNoStartFrom, fCacheSrcFwd, bDiskNoTo, wCylNoStartTo,
                wccToCopy )
        UINT8   bDiskCtrlNo;
        UINT8   bDiskNoFrom;
        UINT16  wCylNoStartFrom;
        FLAG    fCacheSrcFwd;
        UINT8   bDiskNoTo;
        UINT16  wCylNoStartTo;
        UINT16  wccToCopy;
{
        UINT16  icntCyl;
        /*
         * Read one cylinder into FS1 field 1, then write it back out to disk.
         */
        gfSetRegAllowed = FALSE;
        for ( icntCyl = 0; icntCyl < wccToCopy; icntCyl++ )
        {
                if( ReadOneCyl( bDiskCtrlNo, bDiskNoFrom, fCacheSrcFwd?
                        (wCylNoStartFrom + icntCyl) : (wCylNoStartFrom - icntCyl),
                        FS1, FALSE, FALSE ) != TRUE )
```

```
                return( FALSE );
            /* !! wait a little */
            if(WriteOneCyl( bDiskCtrlNo, bDiskNoTo, wCylNoStartTo+icntCyl) != TRUE )
                return( FALSE );
        }
        gfSetRegAllowed = TRUE;
        /*
         * If "FROM" is in cache, decrement the index back;
         * "TO" must be in cache, so always increment the index.
         */
        if( wCylNoStartFrom >= I_CACHE_BUF_START )
            riCacheBuf[bDiskCtrlNo*N_DISK_PER_CTRL_MAX+bDiskNoFrom] -= wccToCopy;

        riCacheBuf[bDiskCtrlNo*N_DISK_PER_CTRL_MAX+bDiskNoTo]       += wccToCopy;
        return( TRUE );
}
/*
 * This routine reads one cylinder from disk into one of the two framestore.
 * and into one of the two fields. Read disk timing mode is specified too.
 */
        FLAG
ReadOneCyl( bDiskCtrlNo, bDiskNoFrom, wCylNoFrom, bFsNoTo, fToField2, fBrowse )
        UINT8   bDiskCtrlNo;    /* Source disk controller                         */
        UINT8   bDiskNoFrom;    /* Source disk number                             */
        UINT16  wCylNoFrom;             /* Source sylinder number                 */
        UINT8   bFsNoTo;                /* FS1 or FS2 as destination              */
        FLAG    fToField2;              /* TRUE if destination is field-2         */
        FLAG    fBrowse;                /* TRUE if Read from disk with browse timing */
{
        UINT8   bDataRead;
        /*
         * Set up the head swap parameter
         */
        grwOutRegRt3[IO_CTRL_REG]       &= ~ B_HEAD_SWAP;
        grwOutRegRt3[IO_CTRL_REG]       |= rbBadSurface
                [bDiskCtrlNo * N_DISK_PER_CTRL_MAX + bDiskNoFrom][wCylNoFrom] << 8;
        /*
         * Select disk video instead of input video for writing to Fs
         */
        grwOutRegRt3[IO_CTRL_REG]       &= ~ F_INPUT_TO_FS;
        grwOutRegRt3[IO_CTRL_REG]       |=  F_DISK_TO_FS;
        /*
         * Select timing mode & sequential write bit & field 2 bit.
         */
        if( bFsNoTo == FS1 )
        {
                grwOutRegRt3[TIMING_REG]        &= ~ B_FS1_TIMING;
                grwOutRegRt3[TIMING_REG]        |= fBrowse? V_FS1_DISK_TO_FS_BROWSE:

 V_FS1_DISK_TO_FS_NORM;
                grwOutRegRt3[FS_CTRL_REG]               |=   F_FS1_SEQ_WRITE;
                grwOutRegRt3[FS_CTRL_REG]               &= ~ F_FS1_SEQ_READ;
                grwOutRegRt3[FS_CTRL_REG]               &= ~ F_FS1_SEQ_BYPASS;
                                                                        /* !! may need
 disable all FS2 bits */

                if( fToField2 )
                        grwOutRegRt3[FS_CTRL_REG]       |=   F_FS1_FIELD_2;
                else
                        grwOutRegRt3[FS_CTRL_REG]       &= ~ F_FS1_FIELD_2;
        }
        else
        if( bFsNoTo == FS2 )
        {
                grwOutRegRt3[TIMING_REG]        &= ~ B_FS2_TIMING;
                grwOutRegRt3[TIMING_REG]        |= fBrowse? V_FS2_DISK_TO_FS_BROWSE:
 V_FS2_DISK_TO_FS_NORM;
                grwOutRegRt3[FS_CTRL_REG]               |=   F_FS2_SEQ_WRITE;
                grwOutRegRt3[FS_CTRL_REG]               &= ~ F_FS2_SEQ_READ;
                grwOutRegRt3[FS_CTRL_REG]               &= ~ F_FS2_SEQ_BYPASS;

                if( fToField2 )
                        grwOutRegRt3[FS_CTRL_REG]       |=   F_FS2_FIELD_2;
                else
                        grwOutRegRt3[FS_CTRL_REG]       &= ~ F_FS2_FIELD_2;
```

```
/*
 * OpenFs()
 *
 * This routine sets up framestore for initial condition
 * for either record or play.
 *
 *      fRecMode : FS_MODE_REC for record;
 *      fRecMode : FS_MODE_PLAY for play.
 */
        FLAG
OpenFs( fRecMode )
        FLAG    fRecMode;
{
        DA              sDaToDo;
        /*
         * Turn on the EDAC for VRAM random access port,
         * also select Key Channel Mode vs. Normal Mode.
         * Only done once.
         */
        grwOutRegRt3[SYS_CTRL_REG]              |= F_ENABLE_FS_EDAC;

        if ( gfKeyChanMode )
                grwOutRegRt3[IO_CTRL_REG]       |= F_KEY_MUX;
        else
                grwOutRegRt3[IO_CTRL_REG]       &= ~ F_KEY_MUX;
        /*
         * If Record, input video --> Fs;
         * If play, disk video --> Fs.
         */
        if ( fRecMode )
        {
                grwOutRegRt3[IO_CTRL_REG]       &= ~ F_DISK_TO_FS;
                grwOutRegRt3[IO_CTRL_REG]       |= F_INPUT_TO_FS;
        }
        else
        {
                grwOutRegRt3[IO_CTRL_REG]       &= ~ F_INPUT_TO_FS;
                grwOutRegRt3[IO_CTRL_REG]       |= F_DISK_TO_FS;
        }
        /*
         * Set the Head Swap Parameter for first disk entry first cylinder #.
         */
        grwOutRegRt3[IO_CTRL_REG]               &= ~ B_HEAD_SWAP;

        if ( fRecMode )
        {
                sDaToDo                                         = sRecInfo.rsDa[0];
                grwOutRegRt3[IO_CTRL_REG]       |= rbBadSurface
                        [sRecInfo.bDiskCtrlNo * N_DISK_PER_CTRL_MAX + sDaToDo.bDiskNo]
                        [sDaToDo.wCylNoStart] << 8;
        }
        else
        {
                /*
                 * If Forward Looping, it will be first DA entry;
                 * If Reverse Looping, it will be last DA entry.
                 */
                sDaToDo                                         =
sPlayInfo.rsDa[sPlayInfo.iDaCurr];
                grwOutRegRt3[IO_CTRL_REG]       |= rbBadSurface
                        [sPlayInfo.bDiskCtrlNo* N_DISK_PER_CTRL_MAX + sDaToDo.bDiskNo]
                        [sDaToDo.wCylNoStart] << 8;
        }
        /*
         * If recording, set up video input type.
         */
        if ( fRecMode )
                if( SetVideoInputType( gbtyVideoInput ) != TRUE )
                        return( FALSE );

        /*
         * Set up TBC input source( for recording ), output source ( for play ).
         * ( no disk xover for now ).
         */
        SetDiskXover( fRecMode );
```

```
        }
        WriteRt3Regs();

        if( TxDiskMsgWord( bDiskCtrlNo, (UINT8) (bDiskNoFrom ),
                        I_DISK_CYL_NO, wCylNoFrom ) != TRUE )
                return( FALSE );
        if( TxDiskMsgByte( bDiskCtrlNo, (UINT8) (bDiskNoFrom ),
                        I_DISK_CMD, CMD_DISK_SEEK_N_READ ) != TRUE )
                return( FALSE );
        /*
         * Keep looping until done
         */
        while( TRUE )
        {
                if( RxDiskMsgByte( bDiskCtrlNo, bDiskNoFrom, I_DISK_CMD, &bDataRead )
                                != TRUE )
                        return( FALSE );
                if( bDataRead == CMD_DISK_NULL )
                        break;
        }
        return( TRUE );
}
/*
 * This routine writes content of FS1 field 1 onto disk.
 */
        FLAG
WriteOneCyl( bDiskCtrlNo, bDiskNoTo, wCylNoTo )
        UINT8   bDiskCtrlNo;
        UINT8   bDiskNoTo;
        UINT16  wCylNoTo;
{
        UINT8   bDataRead;
        /*
         * Set up the head swap parameter
         */
        grwOutRegRt3[IO_CTRL_REG]        &= ~ B_HEAD_SWAP;
        grwOutRegRt3[IO_CTRL_REG]        |= rbBadSurface
                [bDiskCtrlNo * N_DISK_PER_CTRL_MAX + bDiskNoTo][wCylNoTo] << 8;
        /*
         * Select FS1 timing mode
         */
        grwOutRegRt3[TIMING_REG] &= ~ B_FS1_TIMING;
        grwOutRegRt3[TIMING_REG] |= V_FS1_READ_FROM_FS_NORM;
        /*
         * Select FS1 sequential read bit
         * !! We may need to disable all FS2 bits.
         */
        grwOutRegRt3[FS_CTRL_REG]        |= F_FS1_SEQ_READ;
        grwOutRegRt3[FS_CTRL_REG]        &= ~ F_FS1_SEQ_WRITE;
        grwOutRegRt3[FS_CTRL_REG]        &= ~ F_FS1_SEQ_BYPASS;
        grwOutRegRt3[FS_CTRL_REG]        &= ~ F_FS2_SEQ_READ;
        grwOutRegRt3[FS_CTRL_REG]        &= ~ F_FS2_SEQ_BYPASS;
        /*
         * Select field 1 of FS1 to read from
         */
        grwOutRegRt3[FS_CTRL_REG]        &= ~ F_FS1_FIELD_2;
        if( TxDiskMsgWord( bDiskCtrlNo, (UINT8) (bDiskNoTo ),
                        I_DISK_CYL_NO, wCylNoTo ) != TRUE )
                return( FALSE );
        if( TxDiskMsgByte( bDiskCtrlNo, (UINT8) (bDiskNoTo ),
                        I_DISK_CMD, CMD_DISK_SEEK_N_WRITE ) != TRUE )
                return( FALSE );
        /*
         * Keep looping until done
         */
        while( TRUE )
        {
                if( RxDiskMsgByte( bDiskCtrlNo, bDiskNoTo, I_DISK_CMD, &bDataRead )
                                != TRUE )
                        return( FALSE );
                if( bDataRead == CMD_DISK_NULL )
                        break;
        }
        return ( TRUE );
}
```

```
        /*
         * The following need be done for both recording and playing.
         * Clear the output path along the way: No Vertical Interpolator.
         * Disable "replace C with Y", it is for special key mode
         */
#if 0
        wValueSpdCurr           = (UINT16) ABS
                ( (SINT32)gwPlaySpd * sPlayInfo.rsDa[sPlayInfo.iDaCurr].wSegPlaySpd
                / 100 );
        if( fRecMode == FS_MODE_PLAY && gfViEnabled &&
                        wValueSpdCurr != PLAY_SPD_NORMAL )
        {
                grwOutRegRt3[SYS_CTRL_REG]                              & =     ~
F_3_LINE_DELAY_VI;
                grwOutRegRt3[SYS_CTRL_REG]                              | =
F_ENABLE_VERT_INTERP;
        }
        else
        {
                grwOutRegRt3[SYS_CTRL_REG]                              |       =
F_3_LINE_DELAY_VI;
                grwOutRegRt3[SYS_CTRL_REG]                              & =     ~
F_ENABLE_VERT_INTERP;
        }
#endif
        grwOutRegRt3[SYS_CTRL_REG]                              |= F_3_LINE_DELAY_VI;
        grwOutRegRt3[SYS_CTRL_REG]                              &= ~ F_ENABLE_VERT_INTERP;
        grwOutRegRt3[SYS_CTRL_REG]                              &= ~ F_REPLACE_C_WITH_Y;

        return( TRUE );
}

/*
 * RtSetFsForWrite()
 *
 * Set up the framestore "bFsNo" for writing to it.
 * Handle for both record and play situations.
 *
 * fRecMode TRUE  : Recording, select input video to write to Fs;
 * fRecMode FALSE : Playing,   select disk  video to write to Fs;
 *
 * This routine is also called by the non real-time routine: OpenFs().
 */
        FLAG
RtSetFsForWrite( bFsNo, fRecMode )
        UINT8   bFsNo;
        FLAG    fRecMode;
{
        /*
         * Select timing mode.
         * Also select the sequential write bit.
         * ( Same action for both record and play ).
         * Need to make sure other two bits ( sequential read and bypass ) are off.
         */
        switch( bFsNo )
        {
        default:
                UiSetAndDispStr ( 1, ROW_NO_ERR_MSG, "Illegal Frame Store Num." );
                return( FALSE );

        case FS1:       /* Frame Store 1        */
                grwOutRegRt3[TIMING_REG]                        &= ~ B_FS1_TIMING;
                grwOutRegRt3[TIMING_REG]                        |= ( fRecMode )?
                                                                        V_FS1_INPUT_TO_FS  :
V_FS1_DISK_TO_FS_NORM;

                grwOutRegRt3[FS_CTRL_REG]                       |= F_FS1_SEQ_WRITE;
                grwOutRegRt3[FS_CTRL_REG]                       &= ~ F_FS1_SEQ_READ;
                grwOutRegRt3[FS_CTRL_REG]                       &= ~ F_FS1_SEQ_BYPASS;
                break;

        case FS2:       /* Frame Store 2        */
                grwOutRegRt3[TIMING_REG]                        &= ~ B_FS2_TIMING;
                grwOutRegRt3[TIMING_REG]                        |= ( fRecMode )?
                                                                        V_FS2_INPUT_TO_FS  :
```

```
V_FS2_DISK_TO_FS_NORM;

                grwOutRegRt3[FS_CTRL_REG]                       |= F_FS2_SEQ_WRITE;
                grwOutRegRt3[FS_CTRL_REG]                       &= ~ F_FS2_SEQ_READ;
                grwOutRegRt3[FS_CTRL_REG]                       &= ~ F_FS2_SEQ_BYPASS;
                break;
        }
        return ( TRUE );
}
/*
 * RtSetFsForRead()
 *
 * Set up the framestore "bFsNo" for reading from it.
 * Same action for both record and play situations.
 */
        FLAG
RtSetFsForRead( bFsNo )
        UINT8   bFsNo;
{
        /*
         * Select timing mode .
         * Also select the sequential read bit.
         * Need to make sure sequential write bit and bypass bit are off.
         * And that the other Fs is not in sequential read or bypass.
         */
        switch( bFsNo )
        {
        default:
                UiSetAndDispStr ( 1, ROW_NO_ERR_MSG, "Illegal Frame Store Num." );
                return( FALSE );
        case FS1:       /* Frame Store 1        */
                grwOutRegRt3[TIMING_REG]                &= ~ B_FS1_TIMING;
                grwOutRegRt3[TIMING_REG]                |= V_FS1_READ_FROM_FS_NORM;

                grwOutRegRt3[FS_CTRL_REG]                       |= F_FS1_SEQ_READ;
                grwOutRegRt3[FS_CTRL_REG]                       &= ~ F_FS1_SEQ_WRITE;
                grwOutRegRt3[FS_CTRL_REG]                       &= ~ F_FS1_SEQ_BYPASS;
                grwOutRegRt3[FS_CTRL_REG]                       &= ~ F_FS2_SEQ_READ;
                grwOutRegRt3[FS_CTRL_REG]                       &= ~ F_FS2_SEQ_BYPASS;
                break;

        case FS2:       /* Frame Store 2        */
                grwOutRegRt3[TIMING_REG]                &= ~ B_FS2_TIMING;
                grwOutRegRt3[TIMING_REG]                |= V_FS2_READ_FROM_FS_NORM;

                grwOutRegRt3[FS_CTRL_REG]                       |= F_FS2_SEQ_READ;
                grwOutRegRt3[FS_CTRL_REG]                       &= ~ F_FS2_SEQ_WRITE;
                grwOutRegRt3[FS_CTRL_REG]                       &= ~ F_FS2_SEQ_BYPASS;
                grwOutRegRt3[FS_CTRL_REG]                       &= ~ F_FS1_SEQ_READ;
                grwOutRegRt3[FS_CTRL_REG]                       &= ~ F_FS1_SEQ_BYPASS;
                break;
        }
        return( TRUE );
}
/*
 * SetCylHead()
 *
 * This routine sets up those fields in sCylHead that can be set at
 * non real-time.
 *
 * After entering real time, it will sets up all other fields left
 * ( those that need be set at real-time ) before transferring the
 * whole picture header to the right place in VRAM.
 */
        void
SetCylHead()
{
        register        UINT16  i;

        /*
         * Set up non real-time part of picture header in sCylHead.
         */
        sCylHead.bVideoStd                      = gbVideoStd;
        /*      sCylHead.btySrcTc               = !!    */
        sCylHead.bClipNo                        = sRecInfo.bClipNo;
```

```
        i = 0;
        while( ( sCylHead.rcClipName[i] = sRecInfo.rcClipName[i] ) != '\0')
                i++;

        /*      sCylHead.bVers                  = !!    */
}
/*
 * RtSetCylHead()
 *
 * This routine sets up the cylinder header in sCylHead local struct,
 * then do a structure copy to transfer it to the right place in VRAM
 * before recording onto disk.
 *
 * Those fields that can be set at non-real time have been set already
 * in SetCylHead() which is called at end of OpenRec().
 * !! Probably don't need wFieldNoInClip.
 */
        void
RtSetCylHead( sDaCurr )
                DA      sDaCurr;
{
        CYL_HEAD                *pVRam;
        /*
         * Set up picture header in sCylHead
         * Only updates the entries that needs to update every field:
         * ie. wCylNo, bBadSurface, tcSrc, tcRec, biSubClip .
         * others should be prepared ahead of time.
         * !! wCylNo should be there in cylinder header on disk already.
         */
        sCylHead.wCylNo                         = sDaCurr.wCylNoStart;
        sCylHead.bBadSurface            = rbBadSurface
                        [sRecInfo.bDiskCtrlNo* N_DISK_PER_CTRL_MAX + sDaCurr.bDiskNo]
                        [sDaCurr.wCylNoStart];
        /*
         * !! How to set sCylHead.tcSrc and btySrcTc
         * if gbtySrcTc is LTC, then
         * if gbtySrcTc is VITC, then read in from VRAM vertical interval.
         */
        /*
         * Write the cylinder header to the Y Fs through random access port
         * EDAC was turned on before entering real-time .
         * If Odd frame, ( ie. Write Fs1, Read from Fs2),
         * so header goes to Fs2; Else, it goes to Fs1.
         */
        pVRam   = (CYL_HEAD *) BASE_VRAM_RT3;
        pVRam   += ( !gfEvenFrame ) ? S_VRAM_EACH_FRAME : 0;
        pVRam   += ( gfField2     ) ? S_VRAM_EACH_FIELD : 0;
        *pVRam  = sCylHead;
        /*
         * the picture is in the VRAM already ( done in previous frame ).
         */
}
/*
 * This routine converts tc to disk position.
 * !! more thoughts on drop frame issue.
 */
        void
TcToDiskPosition( bDiskCtrlNo, tc, pbDiskNoRet, pwCylNoRet )
        UINT8   bDiskCtrlNo;
        TC              tc;
        UINT8   *pbDiskNoRet;
        UINT16  *pwCylNoRet;
{
        UINT16  wFieldNo;
        UINT8   iDisk;

        wFieldNo                = (UINT16)tc.lFieldNo;
        iDisk                   = (UINT8)( wFieldNo / N_CYL_AVAIL_PER_DISK );
        *pbDiskNoRet    = grbDiskMap[ bDiskCtrlNo * N_DISK_PER_CTRL_MAX + iDisk ];
        *pwCylNoRet             = wFieldNo % N_CYL_AVAIL_PER_DISK;
        return;
}
/*
 * This routine converts disk position to tc
```

```
 * !! more thoughts on drop frame issue.
 */
        FLAG
DiskPositionToTc( bDiskCtrlNo, bDiskNo, wCylNo, fDropFrame, ptcRet )
        UINT8   bDiskCtrlNo;
        UINT8   bDiskNo;
        UINT16  wCylNo;
        FLAG    fDropFrame;
        TC              *ptcRet;
{
        UINT16  iDiskMap;
        /*
         * First form the record timecode from bDiskCtrlNo, bDiskNo and wCylNo
         */
        for ( iDiskMap = 0; iDiskMap < grnDiskOnLine[bDiskCtrlNo]; iDiskMap++ )
        {

                if( grbDiskMap[bDiskCtrlNo* N_DISK_PER_CTRL_MAX + iDiskMap] == bDiskNo )
                        break;
        }
        if( iDiskMap == grnDiskOnLine[bDiskCtrlNo] )
        {
                UiSetAndDispStr( 1, ROW_NO_ERR_MSG, "Disk Map Error." );
                return( FALSE );
        }
        (*ptcRet).lFieldNo              = iDiskMap * N_CYL_AVAIL_PER_DISK + wCylNo;
        (*ptcRet).fDropFrame    = fDropFrame;
        (*ptcRet).fUndef                = FALSE;
        return( TRUE );
}

/*
 * Low-level disk controller communication protocol :
 *
 * Dual Port RAM is a 2K bytes memory that's accessable from both the
 * main unit and the disk controller and serves as communications buffer
 * for the two sides.
 *
 * Out of the 2K bytes, each of the 7 disks is assigned 256 bytes space,
 * and is processed independently.
 *
 * Main processor first places the parameters in the DP RAM, then place the
 * command byte, Only the presence of a non-null command byte will trigger
 * the disk controller to fetch the message.
 *
 * One disk can only perform one command at a time.
 *
 * Disk controller will clear the command byte when it has accomplished the
 * request. The main processor can then place another command in DP Ram.
 *
 *      The disk control interface is handled using the following routines
 *              8 bit and 16 bit versions are different to simplify handling the
 *              hardware address differences.
 *
 *              TxDiskMsgByte()         -  Writes an 8 bit value to DPRAM
 *              TxDiskMsgWord()         -  Writes a 16 bit value to DPRAM
 *
 *              RxDiskMsgByte()         -  Reads an 8 bit value from DPRAM
 *              RxDiskMsgWord()         -  Reads a 16 bit value from DPRAM
 *
 *              Notes:
 *
 *                      1)  If not to test DPRAM busy, it won't even call these 4 funcs.
 *
 *                      2)      To access general data, Use disk 0 for both RT3 and RT5.
 *
 *                      3)      The DPRAM BUSY flag is opposite polarity from that in the
 *                              RT2 communications processors
 *
 */


        FLAG
TxDiskMsgByte( bDiskCtrlNo, bDiskNo, biDpRam, bDataToSend )
        UINT8   bDiskCtrlNo;
        UINT8   bDiskNo;
```

```
        UINT8   biDpRam;
        UINT8   bDataToSend;
{
        UINT32  lAbsDpRamAddr;

        lAbsDpRamAddr = grlAbsBaseDpRam[bDiskCtrlNo] +
                        ( ( bDiskNo * S_DPRAM_EACH_DISK + biDpRam ) << 1 );

        *BYTE_PTR(lAbsDpRamAddr) = bDataToSend;
        return( TRUE );
}

        FLAG
TxDiskMsgWord( bDiskCtrlNo, bDiskNo, biDpRam, wDataToSend )
        UINT8   bDiskCtrlNo;
        UINT8   bDiskNo;
        UINT8   biDpRam;
        UINT16  wDataToSend;
{
        UINT32  lAbsDpRamAddr;

        lAbsDpRamAddr = grlAbsBaseDpRam[bDiskCtrlNo] +
                        ( ( bDiskNo * S_DPRAM_EACH_DISK + biDpRam ) << 1 );

        /* Write the MSB        */
        *BYTE_PTR(lAbsDpRamAddr) = (UINT8) (wDataToSend >> 8);

        /* Write the LSB        */
        *BYTE_PTR(lAbsDpRamAddr+2)      = (UINT8) (wDataToSend & 0xff);
        return( TRUE );
}

        FLAG
RxDiskMsgByte( bDiskCtrlNo, bDiskNo, biDpRam, pbDataReadRet )
        UINT8   bDiskCtrlNo;
        UINT8   bDiskNo;
        UINT8   biDpRam;
        UINT8   *pbDataReadRet;
{
        UINT32  lAbsDpRamAddr;

        lAbsDpRamAddr = grlAbsBaseDpRam[bDiskCtrlNo] +
                        ( ( bDiskNo * S_DPRAM_EACH_DISK + biDpRam ) << 1 );

        *pbDataReadRet  = *BYTE_PTR(lAbsDpRamAddr);         /* read the data */
        return( TRUE );
}

        FLAG
iskMsgWord( bDiskCtrlNo, bDiskNo, biDpRam, pwDataReadRet )
        UINT8   bDiskCtrlNo;
        UINT8   bDiskNo;
        UINT8   biDpRam;
        UINT16  *pwDataReadRet;
{
        UINT16  wDataReadTmp;
        UINT32  lAbsDpRamAddr;

        lAbsDpRamAddr = grlAbsBaseDpRam[bDiskCtrlNo] +
                        ( ( bDiskNo * S_DPRAM_EACH_DISK + biDpRam ) << 1 );

        /* Read the MSB */
        wDataReadTmp    = *BYTE_PTR(lAbsDpRamAddr) << 8;

        /* Read the LSB */
        wDataReadTmp    |= *BYTE_PTR(lAbsDpRamAddr + 2);

        *pwDataReadRet                  = wDataReadTmp;

        return( TRUE );
}


/*
 * Select input video type: D1 Serial, D1 Parallel or A/D input.
```

```
 * Called by record preprocessing and by user event loop.
 *
 * While real-time recording or playing, user event looping still going on.
 *
 * If called by user event loop, need to followed by:
 * WriteRtdReg( RT3, SYS_CTRL_REG, grwOutRegRt3[SYS_CTRL_REG] );
 */
        FLAG
SetVideoInputType( btyVideoInput )
        UINT8   btyVideoInput;
{
        switch ( btyVideoInput )
        {
        default:
                UiSetAndDispStr ( 1, ROW_NO_ERR_MSG, "Illegal Video Input." );
                return( FALSE );
        case VIT_AD:
                grwOutRegRt3[SYS_CTRL_REG]                      &= ~ F_D1_VS_AD_IN;
                break;
        case VIT_D1_SERIAL:
                grwOutRegRt3[SYS_CTRL_REG]                      |= F_D1_VS_AD_IN;
                grwOutRegRt3[SYS_CTRL_REG]                      |= F_D1_SERIAL_IN;
                break;
        case VIT_D1_PARALLEL:
                grwOutRegRt3[SYS_CTRL_REG]                      |= F_D1_VS_AD_IN;
                grwOutRegRt3[SYS_CTRL_REG]                      &= ~ F_D1_SERIAL_IN;
                break;
        }
        return( TRUE );
}

/*
 * !! To do. To specify how it is going to operate first
 * For now, assume no xover for either recording or playing.
 * This routine should be called from user interface event loop.
 *
 * If called by user event loop, need to followed by:
 * WriteRtdReg( RT3, IO_CTRL_REG, grwOutRegRt3[IO_CTRL_REG] );
 */
        void
SetDiskXover( fRecMode )
        FLAG    fRecMode;
{
        if ( fRecMode )
        {
                /*
                 * Select TBC input source( recording ), no Xover.
                 */
                grwOutRegRt3[IO_CTRL_REG]                       |= F_TBC_IN_FROM_FS;
                grwOutRegRt3[IO_CTRL_REG]                       &= ~ F_TBC_IN_XOVR_FROM_FS;
        }
        else
        {
                /*
                 * Select TBC output source( playing ), no Xover.
                 */
                grwOutRegRt3[IO_CTRL_REG]                       |= F_TBC_OUT_TO_FS;
                grwOutRegRt3[IO_CTRL_REG]                       &= ~ F_TBC_OUT_XOVR_TO_FS;
        }
        /*
         * Default direction is 0
         */
        grwOutRegRt3[IO_CTRL_REG]                               &= ~ B_DISK_XOVR_DIR;
}
/*
 * This non real-time routine handles disk related tasks
 * for the go to feature.
 * For frame mode, gwGotoField should be even, so
 * ( gwGotoField, gwGotoField+1 ) should be the two fields in one frame.
 * gwFieldNum will be updated in real time play.
 */
        FLAG
HandleGoto()
{
        UINT8           bDiskNoGoto;
```

```
UINT16          wCylNoGoto;
TC                      tcGoto;
UINT16          i;
UINT16          j;
UINT8           btyPlayRepeatSave;
TC                      tcPlayTblStart;
UINT16          wPlayTblDur;
UINT16          wPlayStart;
UINT16          wPlayEnd;
TC                      tcCurr;
UINT8           bDiskNoCurr;
UINT16          wCylNoCurr;
UINT8           iDaCurr;

if( gwGotoField >= (UINT16) grnDiskOnLine[0] * N_CYL_AVAIL_PER_DISK )
{
        UiSetAndDispStr( 1, ROW_NO_ERR_MSG, "Out Of Range, Go To Disk End." );
        gwGotoField = (UINT16) grnDiskOnLine[0] * N_CYL_AVAIL_PER_DISK - 1;
}
/*
 * If in frame mode, make gwGotoField starts with field 1 ( ie. even tc )
 */
if( !gfFieldMode )
{
        if( gwGotoField % 2 == 1 )
                gwGotoField--;
}
/*
 * Validate goto for various play modes.
 * For normal play, no restriction, can go any where.
 */
switch( gwPlayMode )
{
case PLAY_MODE_NORM:
        break;
case PLAY_MODE_SEG:
        UiSetAndDispStr( 1, ROW_NO_ERR_MSG, "Can't Do Goto In Segment Play." );
        return( FALSE );
case PLAY_MODE_CLIP:
case PLAY_MODE_CINE:
        if(     ( gwMarkIn < gwMarkOut &&
                        ( gwGotoField >= gwMarkOut || gwGotoField < gwMarkIn ) ) ||
                ( gwMarkIn > gwMarkOut &&
                        ( gwGotoField <= gwMarkOut || gwGotoField > gwMarkIn ) )  )
        {
                UiSetAndDispStr( 1, ROW_NO_ERR_MSG, "Can't Do. Out Of Bound!" );
                return( FALSE );
        }
        break;
}
/*
 * From gwGotoField, find the disk position.
 * We should use gtcGoto or function parameter tcGoto here
 * !! See function header of GotoEntry()
 */
tcGoto.lFieldNo         = (SINT32)gwGotoField;
tcGoto.fDropFrame       = FALSE;
tcGoto.fUndef           = FALSE;
/*
 * !! Assume bDiskCtrlNo 0 for now,
 * should pass from high level or a global var.
 */
TcToDiskPosition( 0, tcGoto, &bDiskNoGoto, &wCylNoGoto );
/*
 * We should support directly do goto since power up or in video bypass.
 * ( without doing a play first, since at power up, we build a default
 * play ( whole disk), one-time register setting are done already. )
 * We only need to worry about the non one-time reg setting and the
 * reg setting that is messed up by power-on default bypass state.
 * So get ready to write to FS1.
 * !! Can't just do gwRt3State = RT3_TOGGLE_FS_PLAYING,
 * because it will toggle FS each frame and are for real-time only.
 */
tcPlayTblStart.lFieldNo         = 0;
tcPlayTblStart.fDropFrame       = FALSE;
tcPlayTblStart.fUndef           = FALSE;
```

```
        wPlayTblDur                                     =grnDiskOnLine[0] *N_CYL_AVAIL_PER_DISK;
        if( OpenPlay( 0, tcPlayTblStart, wPlayTblDur, (UINT16)tcGoto.lFieldNo,
                (UINT16)tcGoto.lFieldNo +( gfFieldMode? 1 : 2 ), TRUE, 27, 1 ) != TRUE )
                return( FALSE );
        gfPlayAborted                   = FALSE;
        gfPlayClosed                    = FALSE;
        gnStepFwd                               = 0;
        gnStepRev                               = 0;
        gwPlayState                             = PLAY_STATE_PLAYING_FWD;
        /*
         * Recover from the special mode, when we have TY_FIELD_REPEAT_NONE_REV.
         */
        if( !gfFieldMode )
                gbtyFieldRepeat         = TY_FIELD_REPEAT_NONE_FWD;
        /*
         * Change to no play repeat temporarily so it won't affect goto.
         */
        btyPlayRepeatSave               = gbtyPlayRepeat;
        gbtyPlayRepeat                  = TY_PLAY_REPEAT_NONE;
        while( gfField2 );
        gwRt3State                              = RT3_TOGGLE_FS_PLAYING;
        while( gwRt3State == RT3_TOGGLE_FS_PLAYING );
        gbtyPlayRepeat                  = btyPlayRepeatSave;
#if 1   /* jeff !! for now, TO DO: OpenContPlay() needs to add code to move
                play table pointer to match gwFieldNum so can play from curr pt */
        if(     ( gwMarkIn < gwMarkOut &&
                        ( gwFieldNum >= gwMarkOut || gwFieldNum < gwMarkIn ) ) ||
                ( gwMarkIn > gwMarkOut &&
                        ( gwFieldNum <= gwMarkOut || gwFieldNum > gwMarkIn ) )  )
        {
                gfRebuildPlay           = TRUE;
        }
        else
        {
                gfRebuildPlay           = FALSE;
                gfPlayAborted           = TRUE;
                /*
                 * Update the play table to match gwFieldNum.
                 */
                if( gwMarkOut < gwMarkIn )
                {
                        wPlayStart                      = gwMarkOut + 1;        /*  Get  to
even    */
                        wPlayEnd                        = gwMarkIn  + 1;        /*  Get  to
even    */
                }
                else
                {
                        wPlayStart                      = gwMarkIn ;
                        wPlayEnd                        = gwMarkOut ;
                }
                /*
                 * If frame mode, must be on frame boundary,
                 * shift forward if needed.
                 */
                if( !gfFieldMode )
                {
                        if( wPlayStart % 2 == 1 )
                                wPlayStart                      -= 1;
                        if( wPlayEnd   % 2 == 1 )
                                wPlayEnd                        -= 1;
                }
                sPlayInfo.wPlayStart                    = wPlayStart;
                sPlayInfo.wPlayEnd                              = wPlayEnd;
                sPlayInfo.wfcCurr                               = gwFieldNum;
                tcCurr.lFieldNo                                 = (SINT32)sPlayInfo.wfcCurr;
                tcCurr.fDropFrame                               = FALSE;
                tcCurr.fUndef                                   = FALSE;
                TcToDiskPosition( 0, tcCurr, &bDiskNoCurr, &wCylNoCurr );

                for ( iDaCurr = 0; iDaCurr < sPlayInfo.nDaTotal ; iDaCurr++ )
                        if( sPlayInfo.rsDa[iDaCurr].bDiskNo == bDiskNoCurr )
                                break;
                sPlayInfo.rsDa[iDaCurr].wCylNoStart     = wCylNoCurr;
                /*
```

```
                * Assume fwd, if next button press is rev, OpenContPlay() will
                * do RtPrepareToTurn() to adjust it.
                */
                sPlayInfo.rsDa[iDaCurr].wcc       = sPlayInfo.rsDa[iDaCurr].wCylNoStartSave
                                                                                         +
sPlayInfo.rsDa[iDaCurr].wccSave
                                                                                         -
sPlayInfo.rsDa[iDaCurr].wCylNoStart;
                sPlayInfo.iDaCurr                                = iDaCurr;
                sPlayInfo.fPlayFwd                               = TRUE;
        }
#else   /* jeff */
        gfRebuildPlay                 = TRUE;
#endif  /* jeff */

        /*
         * maintain the play info table.
         * If go out of bound, next play will play from beginning;
         * else, next play will play from where it's at, ie. the goto point.
         *
         * !!!! This makes assumption that the gwMarkIn and gwMarkOut coicides
         * with the sPlayInfo's play start and end points in rsDa[].
         * ( For clip play and normal play, rsDa[] is one contiguous chunk,
         * and any bDiskNo in rsDa[] is unique )
         * How do we handle seg play or cine play?
         * For seg play, it is harder to check if goto point is out of bound.
         * Should handle the same way as clip/normal play.
         */
/*      if( gwPlayMode == PLAY_MODE_CLIP || gwPlayMode == PLAY_MODE_NORM )
/*      {
/*              if(             ( gwMarkOut > gwMarkIn &&
/*                                      ( gwGotoField > gwMarkOut || gwGotoField < gwMarkIn )
)
/*                      ||      ( gwMarkOut < gwMarkIn &&
/*                                      ( gwGotoField < gwMarkOut || gwGotoField > gwMarkIn )
)       )
/*              {
/*                      /*
/*                       * Adjust the table so next play will start fresh.
/*                       */
/*                      sPlayInfo.wfcCurr                            = sPlayInfo.fPlayFwd
?
/*
sPlayInfo.wfcTotal - 1;                                                              0 :
/*
/*                      sPlayInfo.iDaCurr                            = sPlayInfo.fPlayFwd
?
/*
sPlayInfo.nDaTotal - (UINT8) 1;                                          (UINT8)    0    :
/*                      for( i = 0; i < sPlayInfo.nDaTotal; i++ )
/*                      {
/*                              sPlayInfo.rsDa[i].wCylNoStart
/*
sPlayInfo.rsDa[i].wCylNoStartSave;                                                       =
/*                              sPlayInfo.rsDa[i].wcc          = sPlayInfo.rsDa[i].wccSave;
/*                      }
/*              }
/*              else
/*              {
/*                      /*
/*                       * Adjust the table so next play will play from
/*                       * where it is currently at.( ie. the goto point. )
/*                       */
/*                      if ( sPlayInfo.fPlayFwd )
/*                      {
/*                              /* Locate the disk chunk */
/*                              for( i = 0; i < sPlayInfo.nDaTotal; i++ )
/*                                      if( sPlayInfo.rsDa[i].bDiskNo == bDiskNoGoto )
/*                                              break;
/*                              sPlayInfo.iDaCurr                          = (UINT8)i;
/*                              sPlayInfo.rsDa[i].wCylNoStart    = wCylNoGoto; /* Set above*/
/*                              sPlayInfo.rsDa[i].wcc                 = sPlayInfo.rsDa[i].wccSave
-
/*
sPlayInfo.rsDa[i].wCylNoStartSave );                        (     wCylNoGoto     -
```

```
/*                          /* Restore disk records ahead     */
/*                          for( j = i + 1; j < sPlayInfo.nDaTotal; j++ )
/*                          {
/*                                  sPlayInfo.rsDa[j].wCylNoStart
/*                                                                                 =
sPlayInfo.rsDa[j].wCylNoStartSave;
/*                                  sPlayInfo.rsDa[j].wcc    = sPlayInfo.rsDa[j].wccSave;
/*                          }
/*                          /*
/*                           * !! same as sPlayInfo.wfcCurr  = gwGotoField -
/*                           *
sPlayInfo.rsDa[0].wCylNoStartSave;
/*                           */
/*                          sPlayInfo.wfcCurr                                     = gwGotoField
- gwMarkIn;
/*                  }
/*                  else
/*                  {
/*                          /* Locate the disk chunk        */
/*                          for( i = 0; i < sPlayInfo.nDaTotal; i++ )
/*                                  if( sPlayInfo.rsDa[i].bDiskNo == bDiskNoGoto )
/*                                          break;
/*                          sPlayInfo.iDaCurr
/*                          sPlayInfo.rsDa[i].wCylNoStart              = (UINT8)i;
/*                          sPlayInfo.rsDa[i].wcc      = wCylNoGoto; /* Set above*/
-                                                            = sPlayInfo.rsDa[i].wccSave
/*
wCylNoGoto );                           ( sPlayInfo.rsDa[i].wCylNoStartSave -
/*
/*                          /* Restore disk records ahead    */
/*                          if ( i > 0 )
/*                          {
/*                                  for( j = i - 1 ; j >= 0; j-- )
/*                                  {
/*                                          sPlayInfo.rsDa[j].wCylNoStart    =
sPlayInfo.rsDa[j].wCylNoStartSave;
/*
/*                                          sPlayInfo.rsDa[j].wcc                  =
sPlayInfo.rsDa[j].wccSave;
/*
/*                                  }
/*                          }
/*                          /*
/*                           * !! same as sPlayInfo.wfcCurr  =
/*                           * wfcTotal - 1 -
/*                           *                 (
sPlayInfo.rsDa[sPlayInfo.nDaTotal-1].wCylNoStartSave -
/*                           *
/*                           */                          gwGotoField );
/*                          sPlayInfo.wfcCurr         = sPlayInfo.wfcTotal - 1 -
/*
- gwGotoField );                                               ( gwMarkOut
/*                  }
/*          }
/*          sPlayInfo.fDontReadDisk                           = FALSE;
/*          sPlayInfo.sCylAdv.wValueSpdCurr          = ABS( gwPlaySpd );
/*          sPlayInfo.sCylAdv.fSignGlobalSpd = (FLAG)
/*
>= 0 ) ? TRUE : FALSE );                                       ( ( gwPlaySpd
/*          sPlayInfo.sCylAdv.wFrameNoCurr            = 0;
/*          sPlayInfo.sCylAdv.lfcAdvCurr              = 0;
/*          /*
/*           * !! How to freeze the framestore so output monitor will show it.
/*           * This will make FS1 always ready for read. ( Reg set in VertIntr() )
/*           */
/*      }
*/
        return( TRUE );
}
/*
 *
 */
        FLAG
HandleBrowse( rtcToBrowse )
{                           TC                      rtcToBrowse[17];
```

```
register        UINT16          i;
register        UINT16          k;
                        UINT16          s;
                        UINT16          d;
                        UINT8           bDiskNoToBrowse;
                        UINT16          wCylNoToBrowse;
                        UINT32          lAbsSrcY;
                        UINT32          lAbsDstY;
                        UINT32          lAbsSrcC;
                        UINT32          lAbsDstC;
  /*
   * First, Do field-1. Repeat field-2 for video output.
   * Make sure output undisturbed
   * At this point, it shouldn't be in any other FS states.
   */
  if( ( gwRt3State & RT3_FS_STATE ) == RT3_FREEZE_FS1 )
          gbtyFieldRepeat         = TY_FIELD_REPEAT_F2_FS1;
  else
  if( ( gwRt3State & RT3_FS_STATE ) == RT3_FREEZE_FS2 )
          gbtyFieldRepeat         = TY_FIELD_REPEAT_F2_FS2;
  /*
   * Do for each tc to browse, until End of Table. ( maybe less than 16 ).
   */
  for( i = 0;  rtcToBrowse[i].fUndef != TRUE; i++ )
  {
          /*
   * !! Assume bDiskCtrlNo 0 for now,
   */
  TcToDiskPosition( 0, rtcToBrowse[i], &bDiskNoToBrowse, &wCylNoToBrowse);
  /*
   * Read into FS1, field-1, with browse timing mode
   */
  if( ReadOneCyl( 0, bDiskNoToBrowse, wCylNoToBrowse, FS1, FALSE, TRUE )
                  != TRUE )
          return( FALSE );
  /*
   * Now in FS1 field-1 is the H-direction 4:1 shrunk image.
   * Do memory transfer from FS1 field-1 to FS2 field-1:
   * Transfer the first 180 words for each of the Y, C components,
   * Throw away the next 3 * 180 words. ie. take 1 out of 4 lines.
   * !! Update the memory pointer in FS2 field-1 for next browse image.
   * !! How to overlap disk action with memory transfer.
   * 43200 is 240 * 180 ; 720 is 4 * 180
   */
  lAbsSrcY        = RT3_VRAM_PTR;
  lAbsDstY        = RT3_VRAM_PTR + S_VRAM_EACH_FRAME;
  lAbsSrcC        = RT3_VRAM_PTR + S_VRAM_Y_EACH_FIELD;
  lAbsDstC        = RT3_VRAM_PTR + S_VRAM_Y_EACH_FIELD + S_VRAM_EACH_FRAME;
  for( s = 0, d = 0 ; s <= 43200; s += 720, d += 180 )
  {
          for( k = 0; k < 180; k++ )
          {
                  /*
                   * Y info
                   */
                  lAbsSrcY                        += s + k ;
                  lAbsDstY                        += d + k ;
                  *WORD_PTR( lAbsDstY )   = *WORD_PTR( lAbsSrcY );
                  /*
                   * C info
                   */
                  lAbsSrcC                        += s + k ;
                  lAbsDstC                        += d + k ;
                  *WORD_PTR( lAbsDstC )   = *WORD_PTR( lAbsSrcC );
          }
  }
}
/*
 * Then, Do field-2. Repeat FS2 field-1 for video output.
 */
gbtyFieldRepeat         = TY_FIELD_REPEAT_F1_FS2;
/*
 * Do for each tc to browse, until End of Table
 * maybe less than 16.
 * Write to FS1 field-2 this time.
```

```
 * Memory transfer from FS1 field-2 to FS2 field-2
 */
for( i = 0;  rtcToBrowse[i].fUndef != TRUE; i++ )
{
        TcToDiskPosition( 0, rtcToBrowse[i], &bDiskNoToBrowse, &wCylNoToBrowse);
        /*
         * Read into FS1, field-2, with browse timing mode
         */
        if( ReadOneCyl( 0, bDiskNoToBrowse, wCylNoToBrowse, FS1, TRUE, TRUE )
                        != TRUE )
                return( FALSE );
        /*
         * Now in FS1 field-2 is the H-direction 4:1 shrunk image.
         * Do memory transfer from FS1 field-2 to FS2 field-2:
         * Transfer the first 180 words for each of the Y, C components,
         * Throw away the next 3 * 180 words. ie. take 1 out of 4 lines.
         * !! Update the memory pointer in FS2 field-2 for next browse image.
         * !! How to overlap disk action with memory transfer.
                 */
                lAbsSrcY        = RT3_VRAM_PTR + S_VRAM_EACH_FIELD;
                lAbsDstY        = RT3_VRAM_PTR + S_VRAM_EACH_FIELD + S_VRAM_EACH_FRAME;
                lAbsSrcC        = RT3_VRAM_PTR + S_VRAM_EACH_FIELD + S_VRAM_Y_EACH_FIELD;
                lAbsDstC        = RT3_VRAM_PTR + S_VRAM_EACH_FIELD + S_VRAM_Y_EACH_FIELD
                                                                                 +
S_VRAM_EACH_FRAME;
                for( s = 0, d = 0 ; s <= 43200; s += 720, d += 180 )
                {
                        for( k = 0; k < 180; k++ )
                        {
                                /*
                                 * Y info
                                 */
                                lAbsSrcY                        += s + k ;
                                lAbsDstY                        += d + k ;
                                *WORD_PTR( lAbsDstY )   = *WORD_PTR( lAbsSrcY );
                                /*
                                 * C info
                                 */
                                lAbsSrcC                        += s + k ;
                                lAbsDstC                        += d + k ;
                                *WORD_PTR( lAbsDstC )   = *WORD_PTR( lAbsSrcC );
                        }
                }
        }
        /*
         * Change to FS2 full frame for video output.
         * There it is!
         */
        gwRt3State                      = RT3_FREEZE_FS2_NO_RECORD;
        gbtyFieldRepeat         = TY_FIELD_REPEAT_NONE_FWD;
        return( TRUE );
}

/*
 * The type of returned value can be UINT8 or UINT32; remember applying
 * type casting.
 */

        UINT32
GetClipData( btyClipData, biClip )
        UINT8 biClip;
        UINT8 btyClipData;
{
        switch ( btyClipData )
        {
                case CLIP_NO:
                        return(( UINT32 )rsClip[ biClip ].bClipNo );
                        break;

                case CLIP_NAME:
/*                      return(( UINT32 )rsClip[ biClip ].rcClipName );
*/
                        break;

                case REC_START:
/*                      return( rsClip[ biClip ].tcRecStart );
*/
```

```
                        break;

                case REC_END:
        /*              return( rsClip[ biClip ].tcRecEnd );
        */
                        break;

                case VIDEO_STD:
                return(( UINT32 )rsClip[ biClip ].bVideoStd );
                break;

            case SRC_TC:
                return(( UINT32 )rsClip[ biClip ].btySrcTc );
                break;
        }
}

        FLAG
HandleJog( fJogFwd )
        FLAG    fJogFwd;
{
        UINT16  i;
        /*
         * If in disk playing or recording or system bypassing, ignore the jog knob
         */
        if( gwRt3State == RT3_TOGGLE_FS_BYPASSING )
        {
                UiSetAndDispStr( 1, ROW_NO_ERR_MSG, "Not In Play Mode." );
                return( FALSE );
        }
        if( ( gwRt3State & RT3_DISK_STATE ) == RT3_RECORDING )
        {
                UiSetAndDispStr( 1, ROW_NO_ERR_MSG, "Can't Do, Disk Recording." );
                return( FALSE );
        }
        if( ( gwRt3State & RT3_DISK_STATE ) == RT3_PLAYING )
                return( FALSE );
        /*
         * Take global speed and MarkIn/MarkOut into consideration
         */
        if( gwPlaySpd < 0 )
                fJogFwd = (FLAG)( fJogFwd? FALSE : TRUE );

        if( gwMarkOut < gwMarkIn )
                fJogFwd = (FLAG)( fJogFwd? FALSE : TRUE );
        /*
         * If previous keystroke is not Play/Step/Stop/Goto,
         * then open play first; else, jog it.
         */
        switch( geButton )
        {
                default:
                        if( sPlayInfo.fUndef || gfRebuildPlay )
                        {
                                if( BuildPlay( fJogFwd ) != TRUE )
                                        return( FALSE );
                        }
                        break;

                case PLAY_FWD:
                case PLAY_REV:
                case STEP_FWD:
                case STEP_REV:
                case STOP:
                case GOTO:
                case GRAB:
                        break;
        }
        if( gwPulseCount > gwLastPulseCount )
                sPlayInfo.wFrameCntToPlay       = (gwPulseCount - gwLastPulseCount)/ 40;
        else
                sPlayInfo.wFrameCntToPlay       = (gwLastPulseCount - gwPulseCount)/ 40;

        if( sPlayInfo.wFrameCntToPlay == 0 )
                return( TRUE );
```

```
        sPlayInfo.wUseFrameCnt                  = TO_USE_FRAME_CNT;
        gnStepFwd                                   = 0;
        gnStepRev                                   = 0;

#ifndef TEST_DISK
                StrCpy( gStr1, "X" );
                for( i = 0; i < sPlayInfo.nDaTotal; i++ )
                {
                        PrintDec( gStr2, sPlayInfo.rsDa[i].bDiskNo, 1, 0, 9 );
                        StrCat( gStr1, gStr2 );

                        PrintDec( gStr2, sPlayInfo.rsDa[i].wCylNoStart, 4, 0, 9999 );
                        StrCat( gStr1, gStr2 );

                        PrintDec( gStr2, sPlayInfo.rsDa[i].wcc, 4, 0, 9999 );
                        StrCat( gStr1, gStr2 );
                        StrCat( gStr1, ":" );
                }
                PrintDec( gStr2, sPlayInfo.nDaTotal, 1, 0, 9 );
                StrCat( gStr1, gStr2 );

                PrintDec( gStr2, sPlayInfo.wfcTotal, 4, 0, 9999 );
                StrCat( gStr1, gStr2 );

                PrintDec( gStr2, sPlayInfo.fPlayFwd, 1, 0, 9 );
                StrCat( gStr1, gStr2 );

                        StrCat( gStr1, ":" );
                PrintDec( gStr2, sPlayInfo.wFrameCntToPlay, 2, 0, 99 );
                StrCat( gStr1, gStr2 );

                UiDispStr( gStr1, 1, 2 );
#endif
/*
/*      if( (  fJogFwd && !sPlayInfo.fPlayFwd ) ||
/*              ( !fJogFwd &&  sPlayInfo.fPlayFwd )  )
/*      {
/*              RtPrepareToTurn();
/*              /* Get to f2 video since RtPrepareToTurn() don't repeat fd        */
/*              if( sPlayInfo.wfcCurr % 2 == 0 )
/*                      RtCylAdvForPlay();
/*      }
*/
        if( !fJogFwd && !sPlayInfo.fPlayFwd )
        {
                /* Get to f1 video for rev since RtPrepareToTurn() don't repeat fd        */
                if( sPlayInfo.wfcCurr % 2 == 1 )
                        RtCylAdvForPlay();
        }
        if( (  fJogFwd && !sPlayInfo.fPlayFwd ) ||
                ( !fJogFwd &&  sPlayInfo.fPlayFwd )  )
        {
                RtPrepareToTurn();
                /* Get to f2 video for fwd since RtPrepareToTurn() don't repeat fd        */
                /* Get to f1 video for rev since RtPrepareToTurn() don't repeat fd        */
                if( (  fJogFwd && sPlayInfo.wfcCurr % 2 == 0 ) ||
                        ( !fJogFwd && sPlayInfo.wfcCurr % 2 == 1 ) )
                        RtCylAdvForPlay();
        }

        sPlayInfo.sCylAdv.wValueSpdCurr             = PLAY_SPD_NORMAL;
        sPlayInfo.sCylAdv.fSignGlobalSpd        =(FLAG)((gwPlaySpd>=0)? TRUE:FALSE);
        sPlayInfo.fDontReadDisk                         = FALSE;
        gwPlayState             = fJogFwd? PLAY_STATE_PLAYING_FWD : PLAY_STATE_PLAYING_REV;
        gfPlayAborted   = FALSE;
        gfPlayClosed    = FALSE;
        if( fJogFwd )
        {
                switch( gwRt3State )
                {
                case RT3_FREEZE_FS1_NO_RECORD:
LTryAgain1:
                        while( gfEvenFrame || gfField2 );
                        if( !gfEvenFrame && !gfField2 )
                                gwRt3State = RT3_TOGGLE_FS_PLAYING;
```

```
                        else
                                goto LTryAgain1;
                        break;
                case RT3_FREEZE_FS2_NO_RECORD:
LTryAgain2:
                        while( !gfEvenFrame || gfField2 );
                        if( gfEvenFrame && !gfField2 )
                                gwRt3State = RT3_TOGGLE_FS_PLAYING;
                        else
                                goto LTryAgain2;
                        break;
                }
        }
        else
        {
                if( !gfFieldMode )
                        gbtyFieldRepeat  =  TY_FIELD_REPEAT_NONE_REV;
                switch( gwRt3State )
                {
                case RT3_FREEZE_FS1_NO_RECORD:
LTryAgain3:
                        while( gfEvenFrame || !gfField2 );
                        if( !gfEvenFrame && gfField2 )
                                gwRt3State = RT3_TOGGLE_FS_PLAYING;
                        else
                                goto LTryAgain3;
                        break;
                case RT3_FREEZE_FS2_NO_RECORD:
LTryAgain4:
                        while( !gfEvenFrame || !gfField2 );
                        if( gfEvenFrame && gfField2 )
                                gwRt3State = RT3_TOGGLE_FS_PLAYING;
                        else
                                goto LTryAgain4;
                        break;
                }
        }
        /*
         * Wait until it finishes
         */
        while( ( gwRt3State & RT3_DISK_STATE ) !=  RT3_DISK_IDLE );
#ifndef TEST_DISK
                StrCpy( gStr1, "Y" );
                for( i = 0; i < sPlayInfo.nDaTotal; i++ )
                {
                        PrintDec( gStr2, sPlayInfo.rsDa[i].bDiskNo, 1, 0, 9 );
                        StrCat( gStr1, gStr2 );

                        PrintDec( gStr2, sPlayInfo.rsDa[i].wCylNoStart, 4, 0, 9999 );
                        StrCat( gStr1, gStr2 );

                        PrintDec( gStr2, sPlayInfo.rsDa[i].wcc, 4, 0, 9999 );
                        StrCat( gStr1, gStr2 );

                        StrCat( gStr1, ":" );
                }
                PrintDec( gStr2, sPlayInfo.nDaTotal, 1, 0, 9 );
                StrCat( gStr1, gStr2 );

                PrintDec( gStr2, sPlayInfo.wfcTotal, 4, 0, 9999 );
                StrCat( gStr1, gStr2 );

                PrintDec( gStr2, sPlayInfo.fPlayFwd, 1, 0, 9 );
                StrCat( gStr1, gStr2 );

                PrintDec( gStr2, fJogFwd, 1, 0, 9 );
                StrCat( gStr1, gStr2 );
                UiDispStr( gStr1, 1, 4 );
#endif
/*      if( !gfFieldMode && !fJogFwd  )
/*      {
/*              if( FakeFrameStepFwd() != TRUE )
/*                      return( FALSE );
/*              gnStepFwd       = 3;    /* I knew you forgot the 1 field delay    */
/*              gnStepRev       = 0;
```

```
/*              gwPlayState      = PLAY_STATE_STEPPING_FWD;
/*              if( TxDiskMsgWord( 0,(UINT8)(sPlayInfo.rsDa[sPlayInfo.iDaCurr].bDiskNo),
/*                              I_DISK_CYL_NO, sPlayInfo.rsDa[sPlayInfo.iDaCurr].wCylNoStart)
/*                              != TRUE )
/*                      return( FALSE );
/*              if( TxDiskMsgByte( 0,(UINT8)(sPlayInfo.rsDa[sPlayInfo.iDaCurr].bDiskNo),
/*                              I_DISK_CMD, CMD_DISK_SEEK) != TRUE )
/*                      return( FALSE );
/*              sPlayInfo.wUseFrameCnt                  = DONT_USE_FRAME_CNT;
/*              gwRt3State       = RT3_TOGGLE_FS_PLAYING;
/*      }
*/
        return( TRUE );
}


/*
 *-----------------------------------------------------------------------
 *  rencoder.c   Copyright 1991 Accom Inc.
 *
 *      Responsible Person: Kevin Hsu
 *
 *-----------------------------------------------------------------------
 */
#include "rglobal.h"
#include "rui.h"
#include "rcom.h"

#define OVERSHOOT       5       /* 5 pulse overshoot */
#define BOOST_THR       10      /* threshold for boost */
#define BOOST_SCALE     5       /* boost scaling */

/*
 * local FUNCTION PROTOTYPE.
 */

/*
 * static variables declaration.
 */
static SINT16 E1base;
static SINT16 E1slide;
static SINT16 *E1ptr, E1ppQ;
static SINT16 E1pmin, E1pmax;
static SINT16 E1qmin, E1qmax;

/*
 *      routines to control encoder entry
 */

/*
 *      resets encoders to zero
 */
        void
ZeroEncoders()
{
        UIResetEncoder();
        gfEncoderPos = FALSE;                   /* clear the direction flags */
        gfEncoderNeg = FALSE;
        gwLastPulseCount = 0;                   /* reset the last count too */
        E1base = 0;
        E1slide = 0;
}

/*
 *      reset the Encoders so that they read (0, 0)
 */
        void
UIResetEncoder()
{
        RESET_ENCODER_MSG       theMsg;

        theMsg.cPrefix          = RESET_CHAR;
        theMsg.cOpcode          = RESET_ENCODER;
        theMsg.cTerminator      = TERMINATOR;
```

```
        MainTxStr( COM1, (char *) &theMsg );
        gwPulseCount = 0;
}

/*
 *      Register a variable with Encoder 1
 */
        void
RegisterE1( Qmin, Qmax, Qptr, ppQ )
        SINT16 Qmin, Qmax, *Qptr, ppQ;
{
        E1qmin = Qmin;
        E1qmax = Qmax;
        E1ppQ  = ppQ;
        E1ptr  = Qptr;
        E1pmin = ( Qmin - *Qptr ) * ppQ - OVERSHOOT;
        E1pmax = ( Qmax - *Qptr ) * ppQ + OVERSHOOT;
}

/*
 *      function interprets pulse count from Encoder 1
 *      and updates variable accordingly.
 */
        void
UpdateE1( PulseTotal )
        SINT16 PulseTotal;
{
        SINT16 Q;

        Q = *E1ptr;

        if(( PulseTotal - E1slide ) > E1pmax )
                E1slide = PulseTotal - E1pmax;
        else if(( PulseTotal - E1slide ) < E1pmin )
                E1slide = PulseTotal - E1pmin;

        Q += (( PulseTotal - E1slide - E1base ) / E1ppQ );

        XBOUND( Q, E1qmin, E1qmax );

        E1base += (( Q - *E1ptr ) * E1ppQ );
        *E1ptr = Q;
}
/*
 *      Updates base pointer for Encoder 1.
 *      Used after numeric pad entry to update Q  value
 */
        UINT8
ResetE1( Qnew )
        SINT16 Qnew;
{
        SINT16 deltaP, val = Qnew;

        if( val == XBOUND( Qnew, E1qmin, E1qmax ))
        {
                deltaP = (( Qnew - *E1ptr ) * E1ppQ );
                E1pmin -= deltaP;
                E1pmax -= deltaP;
                *E1ptr = Qnew;
                return( TRUE );
        }
        else
                return( FALSE );
}

/*
 * returns Shaft encoder value
 */
        SINT16
GetEncoderVal( cAsciiVal )
        SINT8   *cAsciiVal;
{
        SINT16  wBin;
        SINT8   bLoByte, bHiByte;
```

```
        GetHexBits( &bHiByte, cAsciiVal, 2 );
        GetHexBits( &bLoByte, cAsciiVal + 2, 2 );
        wBin = bHiByte & 0xff;
        wBin <<= 8;
        wBin |= bLoByte & 0xff;

        return( wBin );
}


/*
 *-------------------------------------------------------------------------
 *  rentry.c    Copyright 1991 Accom Inc.
 *
 *      Responsible Person: Kevin Hsu
 *
 *      This file contains routines for keypad entry.
 *-------------------------------------------------------------------------
 */
#include "rglobal.h"
#include "rui.h"
#include "rtime.h"
#include "rdisk.h"

#define FULL_ENTRIES 15         /* The maximal allowable TC entries from user */
#define VALUE_ENTRIES 5         /* The maximal allowable count entries from user */

/*
 * local FUNCTION PROTOTYPE declaration.
 */
static void             ToggleEntryMode( void );
static SINT32   TcToValue( void );

/*
 * static variables declaration.
 */
                                                                        /* for generic
keypad entry. */
static FLAG fEnterField = FALSE;
static FLAG fEnterDecimal = FALSE;
static FLAG fSignToggle = FALSE;
static FLAG fEnterNum = FALSE;
static UINT8 bEntryIndex = 2;
static UINT8 strDispEntry[ FULL_ENTRIES ] =
{ ' ', '{', '\0', '\0', '\0', '\0', '\0', '\0',
                        '\0', '\0', '\0', '\0', '\0', '\0', '\0' };

                                                                        /* for character
entry. */
static UINT8 strDispChar[2] = { '\0', '\0' };

        FLAG
CheckKeypadEntry( eButton )
        BUTTON_ID eButton;
{
        switch ( eButton )
        {
                case FIELD:
                        if (( fEnterDecimal == TRUE ) || ( fSignToggle == TRUE ) ||
                           (( gfTcEntry == FALSE ) && ( bEntryIndex > 2 )) ||
                           ( gbiField == ENTER_SEG_SPD ) || ( gfClipNoEntry == TRUE ))
                        {
                                UiDispError( grstrDispErrMsg, 1, ERROR );
                                break;
                        }
                        if ( SearchStrForChar( strDispEntry, ':' ) > 4 )
                        {
                                UiDispError( grstrDispErrMsg, 4, ERROR );
                                break;
                        }
                        if ( bEntryIndex == 2 )
                        {
                                if ( gfCheckSecondPress == FALSE )
                                        gfCheckSecondPress = TRUE;
```

```
                else
                {
                        if ( gfCheckWaitTime == OFF )
                                gliWaitTime = 0;
                        else
                        {
                                ToggleEntryMode();
                                gliWaitTime = 0;
                                gfCheckSecondPress = FALSE;
                                gfCheckWaitTime = OFF;
                        }
                }
                break;
        }
        fEnterField = TRUE;
        goto LAddNewChar;

case DECIMAL_POINT:
        if (( fEnterDecimal == TRUE ) || ( fEnterField == TRUE ) ||
                ( gfClipNoEntry == TRUE ))
                UiDispError( grstrDispErrMsg, 1, ERROR );
        else
        {
                if ( gfKeypadError == TRUE )
                {
                        ResetKeypadEntry();
                        gfKeypadError = FALSE;
                }
                if ( gfVariSpeed == OFF )
                        gfKeypadEntryFirst = YES;
                fEnterDecimal = TRUE;
                gfEntryExist = YES;
                if ( bEntryIndex < VALUE_ENTRIES + 2 )
                        strDispEntry[ bEntryIndex++ ] = '.';
                UiDispStr( strDispEntry, (UINT8) (42 - bEntryIndex), 6 );
        }
        break;

case ZERO:
case ONE:
case TWO:
case THREE:
case FOUR:
case FIVE:
case SIX:
case SEVEN:
case EIGHT:
case NINE:
        if ( gfKeypadError == TRUE )
        {
                ResetKeypadEntry();
                gfKeypadError = FALSE;
        }
        fEnterNum = TRUE;
        gfEntryExist = YES;
LAddNewChar:
        if (( gfRecord == OFF ) && ( gfGoto == OFF ) && ( gfVariSpeed == OFF ))
                gfKeypadEntryFirst = YES;
        if (( gfTcEntry == TRUE ) && ( fEnterDecimal == FALSE ) &&
                ( fSignToggle == FALSE ))
        {
                if ( bEntryIndex < FULL_ENTRIES - 1 )
                        strDispEntry[ bEntryIndex++ ] = (UINT8) (eButton + '0');
        }
        else
        {
                if ( bEntryIndex < VALUE_ENTRIES + 2 )
                        strDispEntry[ bEntryIndex++ ] = (UINT8) (eButton + '0');
        }
        UiDispStr( strDispEntry, (UINT8) (42 - bEntryIndex), 6 );
        break;

case SIGN_TOGGLE:
        if (( fEnterField == TRUE ) || ( gfClipNoEntry == TRUE ))
        {
```

```
                UiDispError( grstrDispErrMsg, 1, ERROR );
                break;
            }
            else
            {
                if ( gfKeypadError == TRUE )
                {
                    ResetKeypadEntry();
                    gfKeypadError = FALSE;
                }
                fSignToggle = TRUE;
                gfEntryExist = YES;
            }
            if ( gfVariSpeed == OFF )
                gfKeypadEntryFirst = YES;
            if ( strDispEntry[0] == ' ' )
            {
                strDispEntry[0] = strDispEntry[1];
                if ( gwPlaySpd < 0 )
                    strDispEntry[1] = '+';
                else
                    strDispEntry[1] = '-';
            }
            else
            {
                if ( strDispEntry[1] == '+' )
                    strDispEntry[1] = '-';
                else
                    strDispEntry[1] = '+';
            }
            UiDispStr( strDispEntry, (UINT8) (42 - bEntryIndex), 6 );
            break;

        case CLEAR_NUMERIC:
            ResetKeypadEntry();
            gfKeypadError = FALSE;
            break;

        case DO_IT:
            if (( gfKeypadEntryFirst == YES ) && ( gfRecord == OFF ) &&
                ( gfGoto == OFF ) && ( gfVariSpeed == OFF ) &&
                ( gfVariSpeedSession == OFF ))
            {
                UiDispError( grstrDispErrMsg, 3, WARNING );
                break;
            }
            if ( gfRecord == ON )
            {
                RecordEntry();
            }
            if ( gfGoto == ON )
            {
                GotoEntry();
                UiSetLed( GOTO_LED, OFF );
            }
            if (( gfVariSpeed == ON ) ||
               (( gfVariSpeedSession == ON ) && ( gfKeypadEntryFirst == YES )))
            {
                VariSpeedEntry();
            }
            if ( gfKeypadError == FALSE )
                ResetKeypadEntry();
            break;

            /* Multiple DO_it's won't wipe out current data */
            if ( gfVariSpeedSession == ON )
                break;

        default:
            return( FALSE );
    }

#if KVN_DEBUG
    PrintDec( gStr2, bEntryIndex, 1, 0, 20 );;;;;
```

```
        UiDispStr( gStr2, 7, 4 );;;;;
#endif

        return( TRUE );
}

        static void
ToggleEntryMode()
{
        if ( gfTcEntry == FALSE )
        {
                UiDispStr( "{}", 41, 6 );
                strDispEntry[ 1 ] = '{';
                gfTcEntry = TRUE;
        }
        else
        {
                UiDispStr( "[]", 41, 6 );
                strDispEntry[ 1 ] = '[';
                gfTcEntry = FALSE;
        }
}

        static SINT32
TcToValue()
{
        FLAG fGetValue = FALSE;
        UINT8 i, j;
        SINT32 lFieldCnt = 0;
        UINT8 bValue[2];
        UINT8 bFieldValue[4] = { 0, 0, 0, 0 };

        if (( fEnterDecimal == TRUE ) || ( fSignToggle == TRUE ))
                return (-2);
        for ( i = 2; i < FULL_ENTRIES - 1; i++ )
                if ( strDispEntry[ i ] == '\0' )
                        break;
        i--;

#if K    BUG
        intDec( gStr2, i, 1, 0, 20 );;;;;
        DispStr( gStr2, 5, 4 );;;;;


        /*
         * request field 2.
         */
        if ( strDispEntry[ i ] == ':' )
        {
                lFieldCnt += 1;
                i--;
        }
        for ( j = 0 ; j < 4 && i > 1 ; j++ )
        {
                bValue[0] = 0;
                bValue[1] = 0;
                if ( strDispEntry[ i ] != ':' )
                {
                        fGetValue = TRUE;
                        bValue[ 0 ] = (UINT8) (strDispEntry[ i-- ] - '0');
                        if ( strDispEntry[ i ] == '{' )
                        {
                                bFieldValue[ j ] = bValue[0];
                                break;
                        }
                        if ( strDispEntry[ i ] != ':' )
                        {
                                bValue[ 1 ] = (UINT8) (strDispEntry[ i-- ] - '0');
                                bFieldValue[ j ] = (UINT8) (bValue[1] * 10 + bValue[0]);
                        }
                        else
                        {
                                bFieldValue[ j ] = bValue[0];
                                fGetValue = FALSE;
                                i--;
```

```
                }
        }
        else if ( fGetValue == TRUE )
        {
                fGetValue = FALSE;
                j--;
                i--;
        }
        else
        {
                bFieldValue[ j ] = bValue[0];
                i--;
        }
    }

#if KVN_DEBUG
                PrintDec( gStr1, bFieldValue[0], 3, 0, 255 );;;;;
                UiDispStr( gStr1, 1, 5 );;;;;
                PrintDec( gStr1, bFieldValue[1], 3, 0, 255 );;;;;
                UiDispStr( gStr1, 11, 5 );;;;;
                PrintDec( gStr1, bFieldValue[2], 3, 0, 255 );;;;;
                UiDispStr( gStr1, 21, 5 );;;;;
                PrintDec( gStr1, bFieldValue[3], 3, 0, 255 );;;;;
                UiDispStr( gStr1, 31, 5 );;;;;
#endif

    if (( bFieldValue[0] > FRAME_LIMIT ) || ( bFieldValue[1] > SECOND_LIMIT ) ||
        ( bFieldValue[2] > MINUTE_LIMIT ) || ( bFieldValue[3] > HOUR_LIMIT ))
        return (-1);
    lFieldCnt += bFieldValue[0] * 2;
    lFieldCnt += bFieldValue[1] * 60;
    lFieldCnt += bFieldValue[2] * 3600;
    lFieldCnt += bFieldValue[3] * 21600;
    return ( lFieldCnt );
}

/*
 * !! I think we need to allow here for directly gotoing a tc
 * ie. should not be using gwGotoField, but something like gtcGoto;
 *     or a passed function parameter like tcGoto
 *    - Jeff
 */
    void
GotoEntry()
{
    UINT8   i;
    UINT32  j;
    SINT32  lDur;

    gfGoto = OFF;
    if ( gfTcEntry == TRUE )
    {
        lDur = TcToValue();
        if ( lDur == -1 )        /* invalid format */
        {
            UiDispError( grstrDispErrMsg, 4, ERROR );
            return;
        }
        if ( lDur == -2 )    /* illegal entry */
        {
            UiDispError( grstrDispErrMsg, 1, ERROR );
            return;
        }
        gwGotoField = (UINT16) lDur;
    }
    else
    {
        if (( fEnterDecimal == TRUE ) || ( fSignToggle == TRUE ))
        {
            UiDispError( grstrDispErrMsg, 1, ERROR );
            return;
        }
```

```
                for ( i = 2; i < VALUE_ENTRIES + 2 ; i++ )
                        if ( strDispEntry[ i ] == '\0' )
                                break;
                i--;
                gwGotoField = 0;
                for ( j = 1 ; j < 100000 ; j *= 10 )
                {
                if ( i > 1 )
                        gwGotoField += ( strDispEntry[ i-- ] - '0' ) * j;
                        else
                                break;
                }
#if KVN_DEBUG
        PrintDec( gStr2, gwGotoField, 5, 0, 32767 );;;;;
        UiDispStr( gStr2, 5, 4 );;;;;
#endif

        }
        /*
         * If currently playing, stop it.
         */
        HandleGoto();
}

        SINT32
MarkEntry()
{
        UINT8   i;
        UINT32  j;
        SINT32  lDur;
        UINT16  wMarkValue;

        if ( gfTcEntry == TRUE )
        {
                lDur = TcToValue();
                if ( lDur == -1 )        /* invalid format */
                {
                        UiDispError( grstrDispErrMsg, 4, ERROR );
                        return( -1 );
                }
                if ( lDur == -2 )    /* illegal entry */
                {
                        UiDispError( grstrDispErrMsg, 1, ERROR );
                        return( -2 );
                }
                return( lDur );
        }
        else
        {
                if (( fEnterDecimal == TRUE ) || ( fSignToggle == TRUE ))
                {
                        UiDispError( grstrDispErrMsg, 1, ERROR );
                        return( -2 );
                }
                for ( i = 2; i < VALUE_ENTRIES + 2 ; i++ )
                        if ( strDispEntry[ i ] == '\0' )
                                break;
                i--;
                wMarkValue = 0;
                for ( j = 1 ; j < 100000 ; j *= 10 )
                {
                if ( i > 1 )
                        wMarkValue += ( strDispEntry[ i-- ] - '0' ) * j;
                        else
                                break;
                }
#if KVN_DEBUG
        PrintDec( gStr2, wMarkValue, 5, 0, 32767 );;;;;
        UiDispStr( gStr2, 5, 4 );;;;;
#endif

        }
        return(( SINT32 )wMarkValue );
```

```
}

        void
RecordEntry()
{
        UINT8   i;
        UINT32  j;
        SINT32  lRecDur = 0;

        gfRecord = OFF;
        if ( gfTcEntry == TRUE )
        {
                lRecDur = TcToValue();
                if ( lRecDur == -1 )
                {
                        UiDispError( grstrDispErrMsg, 4, ERROR );
                        return;
                }
                if ( lRecDur == -2 )    /* illegal entry */
                {
                        UiDispError( grstrDispErrMsg, 1, ERROR );
                        return;
                }
        }
        else
        {
                if (( fEnterDecimal == TRUE ) || ( fSignToggle == TRUE ))
                {
                        UiDispError( grstrDispErrMsg, 1, ERROR );
                        return;
                }
                for ( i = 2; i < VALUE_ENTRIES + 2 ; i++ )
                        if ( strDispEntry[ i ] == '\0' )
                                break;
                i--;
                for ( j = 1 ; j < 100000 ; j *= 10 )
                {
                if ( i > 1 )
                        lRecDur += ( strDispEntry[ i-- ] - '0' ) * j;
                        else
                                break;
                }

#if KVN_DEBUG
        PrintDec( gStr2, gwGotoField, 5, 0, 32767 );;;;;
        UiDispStr( gStr2, 5, 4 );;;;;
#endif

        }
        /*
         * Always record even number of fields, ie. in frame units.
         */
        if( lRecDur % 2 == 1 )
                lRecDur--;

        gwRecDur = (UINT16) lRecDur;

        if ( gsUiState.eCurrMode == RECORD_SETUP )
                gwRecOut = gwRecIn + gwRecDur;
}

        void
ResetKeypadEntry()
{
        UINT8   i;

        if ( gfTcEntry == TRUE )
        {
                UiDispStr( "                                        ()", 1, 6 );
                strDispEntry[ 0 ] = ' ';
                strDispEntry[ 1 ] = '(';
        }
        else
        {
                UiDispStr( "                                        []", 1, 6 );
```

```
                strDispEntry[ 0 ] = ' ';
                strDispEntry[ 1 ] = '[';
        }
        for ( i = 2; i < FULL_ENTRIES - 1; i++ )
                strDispEntry[ i ] = '\0';
        bEntryIndex = 2;
        gfKeypadEntryFirst = NO;
        fEnterField = FALSE;
        fEnterDecimal = FALSE;
        fSignToggle = FALSE;
        fEnterNum = FALSE;
        gfEntryExist = NO;
}

/*
 *      print in decimal form to avoid 'sprintf' inclusion
 */
        void
PrintTcField(string, number, low, hi)
        SINT8   *string;
        SINT16  number, low, hi;

{
        register SINT16  i;
        register SINT8   *ptr;

        /* if out of limit, fill with '-' */
        if (number < low || number > hi)
        {
                ptr = string;

                for (i = 2; i; i--)
                        *ptr++ = '-';

                *ptr = '\0';
                return;
        }

        ptr = string + 2;
        *ptr-- = '\0';

        for (i = 2; i; i--, number /= 10 )
                if (number || (i == 2))
                        *ptr-- = (SINT8) (number % 10 + '0');
                else
                        *ptr-- = '0';
}

        UINT8
CharacterEntry()
{
#if 0
        if ( gbiCharStr == 8 )
        {
                UINT8 i;

                gbiCharStr = 0;
                for ( i = 0; i <= 8; i++ )
                {
                        gstrCharName[i] = '\0';
                }
        }
        if ( gstrDispChar[0] != '/' )
        {
                gstrCharName[ gbiCharStr ] = gstrDispChar[0];
                UiDispStr( gstrCharName, (UINT8) (14 - gbiCharStr++), 6 );
        }
        return ( gstrDispChar[0] );
#endif
}

/*
 * Speed entry and display management routines.
 */
```

```
	void
VariSpeedEntry()
{
	UINT8	i;

	gfVariSpeed = OFF;
	if ( fEnterField == TRUE )					/* illegal entry */
	{
		UiDispError( grstrDispErrMsg, 1, ERROR );
		return;
	}
	if (( fSignToggle == TRUE ) && ( fEnterNum == FALSE ))
	{
		/* for checking on sign toggle on normal speed before mode on */
		if ( gfFirstSpdEntry == TRUE )
			gwPlaySpd = PLAY_SPD_NORMAL;
		if (( strDispEntry[1] == '+' ) || ( strDispEntry[0] == ' ' ))
			gwPlaySpd = ABS( gwPlaySpd );
		else
			gwPlaySpd = -ABS( gwPlaySpd );
	}
	else
	{
		if (( gfTcEntry == TRUE ) && ( fEnterDecimal == FALSE ) &&
			( fSignToggle == FALSE ))
		{
			for ( i = 2; i < FULL_ENTRIES - 1; i++ )
				if ( strDispEntry[ i ] == '\0' )
					break;
			i--;
			gwPlaySpd = ( strDispEntry[ i-- ] - '0' ) * 100;
		if ( i > 1 )
				gwPlaySpd += ( strDispEntry[ i ] - '0' ) * 1000;
		}
		else
		{
			for ( i = 2; i < VALUE_ENTRIES + 2 ; i++ )
			{
				if ( strDispEntry[ i ] == '\0' )
				{
					i--;
					gwPlaySpd = ( strDispEntry[ i-- ] - '0' ) * 100;
					if ( i > 1 )
						gwPlaySpd += ( strDispEntry[ i ] - '0' ) * 1000;
					break;
				}
				if ( strDispEntry[ i ] == '.' )
				{
#if KVN_DEBUG
	PrintDec( gStr2, gwPlaySpd, 4, -32767, 32767 );;;;;
	UiDispStr( gStr2, 4, 5 );;;;;
#endif /* KVN */
					if (( strDispEntry[ i + 1 ] ) != '\0' )
						gwPlaySpd = ( strDispEntry[ i + 1 ] - '0' ) *
10;
					else
						gwPlaySpd = 0;
					if (( strDispEntry[ i + 2 ] ) != '\0' )
						gwPlaySpd += strDispEntry[ i + 2 ] - '0';
					if ( i - 1 > 1 )
						gwPlaySpd += ( strDispEntry[ i - 1 ] - '0' )
* 100;
					if ( i - 2 > 1 )
						gwPlaySpd += ( strDispEntry[ i - 2 ] - '0' )
* 1000;
#if KVN_DEBUG
	UiDispStr( "				", 1, 4 );;;;;
	strDispChar[0] = strDispEntry[ i - 2 ];;;;;
	UiDispStr( strDispChar, 1, 4 );;;;;
	strDispChar[0] = strDispEntry[ i - 1 ];;;;;
	UiDispStr( strDispChar, 5, 4 );;;;;
	strDispChar[0] = strDispEntry[ i + 1 ];;;;;
	UiDispStr( strDispChar, 10, 4 );;;;;
	strDispChar[0] = strDispEntry[ i + 2 ];;;;;
	UiDispStr( strDispChar, 15, 4 );;;;;
```

```
        PrintDec( gStr2, gwPlaySpd, 4, -32767, 32767 );;;;;
        UiDispStr( gStr2, 10, 5 );;;;;
#endif /* KVN */
                                                break;
                                        }
                                }
#if KVN_DEBUG
        PrintDec( gStr2, i, 1, 0, 20 );;;;;
        UiDispStr( gStr2, 1, 3 );;;;;
#endif
                }
                if ( strDispEntry[1] == '-' )
                        gwPlaySpd = -gwPlaySpd;
        }
        gwCurrVariSpd = gwPlaySpd;
        UiDispRtSpd( gwPlaySpd, SPD_X_DISP, SPD_Y_DISP );
        /* for checking on sign toggle on normal speed before mode on */
        gfFirstSpdEntry = FALSE;
#if KVN_DEBUG
        PrintDec( gStr2, gwPlaySpd, 4, -32767, 32767 );;;;;
        UiDispStr( gStr2, 4, 5 );;;;;
#endif /* KVN */
}

        void
SpeedBackToNormal()
{
        gwPlaySpd = PLAY_SPD_NORMAL;
        UiDispRtSpd( gwPlaySpd, SPD_X_DISP, SPD_Y_DISP );
}

        void
SpeedToVari()
{
        gwPlaySpd = gwCurrVariSpd;
        UiDispRtSpd( gwPlaySpd, SPD_X_DISP, SPD_Y_DISP );
}

        void
UiDispRtSpd( wPlaySpd, bXPos, bYPos )
        SINT16  wPlaySpd;
        UINT8   bXPos, bYPos;
{
        UINT8   i;
        UINT8   rcSpdAsciiValue[4];
        UINT8   strSpdValue[7] = { '+', ' ', '1', '.', '0', '0', '\0' };

        if ( wPlaySpd < 0 )
        {
                wPlaySpd = -wPlaySpd;
                strSpdValue[0] = '-';
        }
        else
                strSpdValue[0] = '+';

        for ( i = 3; i >= 1; i--, wPlaySpd /= 10 )
                if ( wPlaySpd > 0 )
                        rcSpdAsciiValue[i] = ( UINT8 )( wPlaySpd % 10 + '0' );
                else
                        rcSpdAsciiValue[i] = '0';
        rcSpdAsciiValue[0] = (UINT8) (wPlaySpd + '0');

        if ( rcSpdAsciiValue[0] == '0' )
                strSpdValue[1] = ' ';
        else
                strSpdValue[1] = rcSpdAsciiValue[0];
        strSpdValue[2] = rcSpdAsciiValue[1];
        strSpdValue[3] = '.';
        strSpdValue[4] = rcSpdAsciiValue[2];
        strSpdValue[5] = rcSpdAsciiValue[3];
        UiDispStr( strSpdValue, bXPos, bYPos );
}
```

```
        void
EnterSegSpd( pwPlaySpd )
        SINT16  *pwPlaySpd;
{
        UINT8   i;

        if (( fSignToggle == TRUE ) && ( fEnterNum == FALSE ))
        {
                if (( strDispEntry[1] == '+' ) || ( strDispEntry[0] == ' ' ))
                        *pwPlaySpd = ABS( *pwPlaySpd );
                else
                        *pwPlaySpd = -ABS( *pwPlaySpd );
        }
        else
        {
                if (( gfTcEntry == TRUE ) && ( fEnterDecimal == FALSE ) &&
                        ( fSignToggle == FALSE ))
                {
                        for ( i = 2; i < FULL_ENTRIES - 1; i++ )
                                if ( strDispEntry[ i ] == '\0' )
                                        break;
                        i--;
                        *pwPlaySpd = ( strDispEntry[ i-- ] - '0' ) * 100;
                if ( i > 1 )
                                *pwPlaySpd += ( strDispEntry[ i ] - '0' ) * 1000;
                }
                else
                {
                        for ( i = 2; i < VALUE_ENTRIES + 2 ; i++ )
                        {
                                if ( strDispEntry[ i ] == '\0' )
                                {
                                        i--;
                                        *pwPlaySpd = ( strDispEntry[ i-- ] - '0' ) * 100;
                                        if ( i > 1 )
                                                *pwPlaySpd += ( strDispEntry[ i ] - '0' ) * 1000;
                                        break;
                                }
                                if ( strDispEntry[ i ] == '.' )
                                {
#if KVN_DEBUG
        PrintDec( gStr2, *pwPlaySpd, 4, -32767, 32767 );;;;;
        UiDispStr( gStr2, 4, 5 );;;;;
#endif /* KVN */
                                        if (( strDispEntry[ i + 1 ] ) != '\0' )
                                                *pwPlaySpd = ( strDispEntry[ i + 1 ] - '0' )
* 10;
                                        else
                                                *pwPlaySpd = 0;
                                        if (( strDispEntry[ i + 2 ] ) != '\0' )
                                                *pwPlaySpd += strDispEntry[ i + 2 ] - '0';
                                        if ( i - 1 > 1 )
                                                *pwPlaySpd += ( strDispEntry[ i - 1 ] - '0' )
* 100;
                                        if ( i - 2 > 1 )
                                                *pwPlaySpd += ( strDispEntry[ i - 2 ] - '0' )
* 1000;
#if KVN_DEBUG
        UiDispStr( "                    ", 1, 4 );;;;;
        strDispChar[0] = strDispEntry[ i - 2 ];;;;;
        UiDispStr( strDispChar, 1, 4 );;;;;
        strDispChar[0] = strDispEntry[ i - 1 ];;;;;
        UiDispStr( strDispChar, 5, 4 );;;;;
        strDispChar[0] = strDispEntry[ i + 1 ];;;;;
        UiDispStr( strDispChar, 10, 4 );;;;;
        strDispChar[0] = strDispEntry[ i + 2 ];;;;;
        UiDispStr( strDispChar, 15, 4 );;;;;

        PrintDec( gStr2, *pwPlaySpd, 4, -32767, 32767 );;;;;
        UiDispStr( gStr2, 10, 5 );;;;;
#endif /* KVN */
                                        break;
                                }
                        }
```

```
#if KVN_DEBUG
        PrintDec( gStr2, i, 1, 0, 20 );;;;;
        UiDispStr( gStr2, 1, 3 );;;;;
#endif
                }
                if ( strDispEntry[1] == '-' )
                        *pwPlaySpd = -*pwPlaySpd;
        }
#if KVN_DEBUG
        PrintDec( gStr2, *pwPlaySpd, 4, -32767, 32767 );;;;;
        UiDispStr( gStr2, 4, 5 );;;;;
#endif /* KVN */
}


        void
EnterSegID( pbSegID )
        UINT8   *pbSegID;
{
        UINT8   i;

        if (( fEnterDecimal == TRUE ) || ( fSignToggle == TRUE ) ||

                ( fEnterField == TRUE ))
        {
                UiDispError( grstrDispErrMsg, 1, ERROR );
                return;
        }

        for ( i = 2; i < VALUE_ENTRIES + 2 ; i++ )
                if ( strDispEntry[ i ] == '\0' )
                        break;
        i--;

        if ( i > 3 )
        {
                UiDispError( grstrDispErrMsg, 0, ERROR );
                return;
        }
    *pbSegID = (UINT8) (strDispEntry[ i-- ] - '0');
        if ( i > 1 )
        *pbSegID += ( strDispEntry[ i-- ] - '0' ) * 10;
}


        SINT32
EntryToValue()
{
        UINT8   i;
        UINT32  j;
        SINT32  lTimeCode;

        if ( gfTcEntry == TRUE )
        {
                lTimeCode = TcToValue();
                if ( lTimeCode == -1 )
                        UiDispError( grstrDispErrMsg, 4, WARNING );
                if ( lTimeCode == -2 )    /* illegal entry */
                        UiDispError( grstrDispErrMsg, 1, ERROR );
        }
        else
        {
                if (( fEnterDecimal == TRUE ) || ( fSignToggle == TRUE ))
                {
                        UiDispError( grstrDispErrMsg, 1, ERROR );
                        return ( -2 );
                }
                for ( i = 2; i < VALUE_ENTRIES + 2 ; i++ )
                        if ( strDispEntry[ i ] == '\0' )
                                break;
                i--;
                lTimeCode = 0;
                for ( j = 1 ; j < 100000 ; j *= 10 )
                {
                if ( i > 1 )
```

```
                        lTimeCode += ( strDispEntry[ i-- ] - '0' ) * j;
                        else
                                break;
                }
        }
        return ( lTimeCode );
}


        void
MarkInRecTc()
{
        SINT32  lInPoint;

        lInPoint = EntryToValue();
        if ( lInPoint >= 0 )
                gwRecIn = ( UINT16 )lInPoint;                   /* set new mark in */
        gwRecOut = gwRecIn + gwRecDur;
}


        void
MarkOutRecTc()
{
        SINT32  lOutPoint;

        lOutPoint = EntryToValue();
        if ( lOutPoint >= 0 )
                gwRecOut = ( UINT16 )lOutPoint;                 /* set new mark in */
        gwRecDur = gwRecOut - gwRecIn;
}


/*
 *-----------------------------------------------------------------------
 *  rglobal.c   Copyright 1991 Accom Inc.
 *
 *      Responsible Person: Kevin Hsu
 *
 *      The file includes the declarations and definitions of global variables.
 *      Those variables are prefixed with 'g' to identify themselves as global
 *      variables.
 *-----------------------------------------------------------------------
 */
#include "rglobal.h"
#include "rui.h"
#include "rhw.h"
#include "rtime.h"
#include "rdisk.h"
#include "rampex.h"
#include "rcom.h"

/*
 *                      Global variables
 */
UINT8           gStr1[100], gStr2[60];                  /* for general use */
UINT8           gFieldStr[12];                                  /* for field entry */

UINT8           gstrIntr[100];

UINT8           gbFieldStatus = 0;
UINT8           gbtyVideoInput;
UINT8           gbVideoStd;
SINT16          gwKeypadEntryValue = 0;
UINT8           gbiCharStr = 0;
UINT8           gstrCharName[9] = { '\0', '\0', '\0', '\0', '\0', '\0', '\0', '\0', '\0' };
UINT8           gstrCharDisplay[2] = { '0', '\0' };
UINT8           *grstrDispErrMsg[ TOTAL_OF_MSG ] =
{
        "Out of Limit!",                                /*  0,  */
        "Illegal entry!",                               /*  1,  */
        "Max. Speed +/- 99.99",         /*  2,  This is for speed value */
        "Specify command.",                             /*  3,  DO_IT warning */
        "Invalid TC Format!",                   /*      4, Time Code */
```

```
        "List is full.",                              /*      5, Segment List is full */
        "No macro."                                   /*      6,  */
};

/*
 * RSEGMENT.C
 */
SEGMENT rsList[ TOTAL_LISTS ][ TOTAL_SEGS ];
struct seg_list gsSegList;
UINT8 *prstrMode[4] =
{
        "60f",
        "30F",
        "3:2",
        "2:2"
};

UINT8 *prstrProfile[3] =
{
        "\\ ",
        "- ",
        "/ "
};

/*
 * RMACRO.C
 */
MAIN_EVENT      gsMacroKnobMsgPacket;
UINT16 grwTotalEvents[ TOTAL_MACROS ];
MACROS rsMacro[ TOTAL_MACROS ][ TOTAL_EVENTS ];

UINT8           gbiStr = 0;

UINT16          gwRecIn;
UINT16          gwRecOut;
UINT16          gwMarkIn;
UINT16          gwMarkOut;
UINT16          gwPlayDur;
UINT16          gwRecDur;
UINT16          gwcntHiCmdCnt = HI_DELAY_TIME;
UINT16          gwFieldNum;
UINT32          glFrameCntTimer;
UINT32          glFrameCntCopy;
SINT16          gwPlaySpd;
UINT16          gwGotoField;
UINT16          gnStepFwd;
UINT16          gnStepRev;
UINT16          gnJogFwd;
UINT16          gnJogRev;
UINT16          gnGotoState;

/*
 * RUIEVENT.C
 */
SINT16          gwLastPulseCount = 0;
SINT16          gwPulseCount = 0;
SINT16          gwKnobZeroPoint;
SINT16          gwSpdTableIndex = 0;
SINT16          gwCountDifference;
SINT16          gwCountMax;
SINT16          gwCountMin;
SINT16          gwStorePlaySpd;
UINT32          gliWaitTime = 0L;
UINT8           gbiField = 1;
UINT16          gwMacroNo = 0;
UINT16          gwMacroTotalNo = 0;
UINT32          glPlayFirstTicks = 0L;
UINT32          glPlayTime = 0L;
BUTTON_ID       geModeBeforeMacro;                    /* the last operating mode */

/*
 *      RENTRY.C
 */
SINT16          gwCurrVariSpd = PLAY_SPD_NORMAL;
FLAG            gfKeypadEntryFirst = NO;
```

```
FLAG            gfClipNoEntry;
                        /* for checking on sign toggle on normal speed before mode on */
FLAG            gfFirstSpdEntry = FALSE;
FLAG            gfEntryExist = NO;

/* Encoder capture related */
UINT32          glLastTicks = 0L;
UINT32          glCurrTicks = 0L;
UINT32          glIdleTicks;
UINT32          glTicksLapse = 0L;
SINT16          gwCurrPulseCnt = 0;
SINT16          gwDeltaPulse = 1;                         /* switch between 1 and -1 */

/* Encoder run related */

FLAG            gf60Hz;
UINT16          gwRt3State;
FLAG            gfFwdAtEnd;
FLAG            gfRevAtEnd;
INT_TL          gsIntTl;
/*
 * grsOutBuf[] is the temporary output buffer, not the real Dp Ram;
 * Before message go out to the real Dp Ram, they first gets appended
 * in the temporary buffer.
 */
OUT_BUF         grsOutBuf[N_COM_PORT];
UINT8           gbChToRec;
FLAG            gfKeyChanMode;
FLAG            gfField2Editing;
FLAG            gfRecEnabled;
UINT16          gwCrossDaPlay;
UINT8           gbtyPlayRepeat;
UINT8           gbtyFieldRepeat;
FLAG            grfBdPresent[N_SLOT_MAX];
FLAG            grfDiskPresent[N_DISK_CTRL_MAX * N_DISK_PER_CTRL_MAX];
UINT8           grbDiskMap[N_DISK_CTRL_MAX * N_DISK_PER_CTRL_MAX];
UINT8           grnDiskOnLine[N_DISK_CTRL_MAX];
FLAG            gfRecClosed ;
FLAG            gfSegListChanged;
UINT16          gwPlayMode;
FLAG            gfPlayClosed ;
FLAG            gfRecAborted;
FLAG            gfPlayAborted;
FLAG            gfRebuildPlay;
FLAG            gfShuttleInit;

FLAG            grfLedStatus[NUM_OF_LEDS];
FLAG            gfSlaveRTDShouldPlay;
FLAG            gfSlaveRTDShouldRecord;
FLAG            gfSlaveRecStarted;
FLAG            gfSlavePlayStarted;
FLAG            gfMasterRtd;
UINT16          gwPlayState;
FLAG            gfFieldEntry;
FLAG            gfFieldMode;    /* TRUE if field mode; FALSE if frame mode        */

FLAG            volatile        gfInVertical;
FLAG            volatile        gfEvenFrame;
FLAG            volatile        gfField2;
FLAG            gfSegModify = FALSE;

/*
 * Why are we using two flags here.
 * we can just say gfEncoderDir ( TRUE: positive, FALSE: negative ).
 * if there are three states, then we say gnEncoderDir( state1, state2, state3)
 */
FLAG            gfEncoderPos = FALSE;
FLAG            gfEncoderNeg = FALSE;
FLAG            gfDecimalPoint = FALSE;
FLAG            gfKeypadError = FALSE;
FLAG            gfDataEntry = NO;
FLAG            gfRecord = OFF;
FLAG            gfGoto = OFF;
FLAG            gfVariSpeed = OFF;
```

```
FLAG            gfVariSpeedSession = OFF;
FLAG            gfTcEntry = FALSE;
FLAG            gfCheckSecondPress = FALSE;
FLAG            gfCheckWaitTime = OFF;
FLAG            gfNewSegmentMarkIn = FALSE;
FLAG            gfNewSegmentMarkOut = FALSE;
FLAG            gfLoadMacro = FALSE;
FLAG            gfRunMacro = FALSE;
FLAG            gfRecMacro = FALSE;
FLAG            gfRecMacroTimeLapse = FALSE;
FLAG            gfPauseMacro = FALSE;
FLAG            gfEndMacro = FALSE;
FLAG            gfMacroPlay = FALSE;
FLAG            gfResumeMacroPlay = FALSE;
FLAG            gfMacroRec = FALSE;
FLAG            gfNotMenuButton = FALSE;

/* Encoder capture related */
FLAG            gfEncoderEntry = FALSE;
FLAG            gfFwdFirst = TRUE;
FLAG            gfRevFirst = TRUE;
FLAG            gfDirChanged = FALSE;
FLAG            gfShortIdle = FALSE;

/* Encoder run related */
FLAG            gfLoadMacroForEncoder = FALSE;

FLAG            gfUpdateEEPROM;
FLAG            gfClearingEEPROM = NO;

HARD_KEY          *gpsCurrHardKey;

BUTTON_ID       geButtonBeforeLast;
BUTTON_ID       geLastButton;    /* Contains the button before the latest one      */
BUTTON_ID       geButton;

UINT16 far *grpwAbsBaseDpRam[N_DISK_CTRL_MAX] =
{
        ABS_BASE_DPRAM_RT3,
/*!! (jeff to put back when N_DISK_CTRL_MAX == 2) ABS_BASE_DPRAM_RT5 */
} ;

UINT32  grlAbsBaseDpRam[N_DISK_CTRL_MAX] =
{
        RT3_DISK_PTR,
#if 0
        RT5_DISK_PTR
#endif
};

/*
 * Define arrays for the output register data
 */
UINT16                     grwOutRegRt1[N_REG_RT1];
UINT16                     grwOutRegRt2[N_REG_RT2];
UINT16                     grwOutRegRt3[N_REG_RT3];
UINT16                     grwOutRegRt4[N_REG_RT4];
UINT16                     grwOutRegRt5[N_REG_RT3];
UINT16                     grwOutRegRt6[N_REG_RT4];
UINT16                     gwRT3MemoryMap, gwRT5MemoryMap;


UINT32                     grlRegAddr[N_BD_MAX];

MAIN_STATE                 gsUiState;
state of RTD */
BUTTON_ID                  eMenuWhenRecord;

/*
 * Timeline Buffer Table, sorted by tcExec in ascending order.
 * Table terminated by an undefined TC in tcExec field.
 */
TLB     grsTlb[N_TLB_ENTRY_MAX];
```

```
/*
 *      The current status of SOFTKEY selected.
 *      The index can indicate the particular menu and is associated with an ENUM
 *      definition which is defined in RMODE.H.
 */

SINT8 grbiSoft[ TOTALS_OF_MENU ][ TOTALS_OF_SOFTKEY ];

        void
InitGlobalVar()
{
        SINT8   i, j;

        for ( i = 0; i < TOTALS_OF_MENU; i++ )
                for ( j = 0; j < TOTALS_OF_SOFTKEY; j++ )
                        grbiSoft[i][j] = 0;

        gfUpdateEEPROM = FALSE;                 /* EEPROM not yet read, disable write */


        sPlayInfo.fUndef                        = TRUE;
        gfRebuildPlay                           = TRUE;
        gfRecClosed     = gfPlayClosed  = TRUE;
        /*
         * Startsout as field1 and odd frame. ( ie. frame 1 being odd )
         * No key channel, input video be D1 parallel.
         */
        gfEvenFrame                                     = FALSE;
        gfKeyChanMode                           = FALSE;
        gbtyVideoInput                          = VIT_D1_PARALLEL;
        gfRecAborted                            = FALSE;
        gfPlayAborted                           = FALSE;
        gnStepFwd                                       = 0;
        gnStepRev                                       = 0;
        gnJogFwd                                        = 0;
        gnJogRev                                        = 0;
        gwPlaySpd                                       = PLAY_SPD_NORMAL;      /*  Normal
speed           */
        gwRt3State                                      = RT3_TOGGLE_FS_BYPASSING;
        gfSegListChanged                        = FALSE;
        gwPlayMode                                      = PLAY_MODE_NORM;
        gfFwdAtEnd                                      = FALSE;
        gfRevAtEnd                                      = FALSE;
        gsIntTl.tcCurr.fUndef           = TRUE;
        grsTlb[0].tcExec.fUndef  = TRUE;
        gsIntTl.fRunning                        = FALSE;
        /*
         * The trouble is CP already programmed differently,
         * and don't need this grsOutBuf[COM0].
         * !! Maybe we should put Cp Comm in real-time too.
         */
        for( i = 0; i < N_COM_PORT; i++ )
                grsOutBuf[i].iOutBufCurr = 2;   /* Leave two bytes for header    */

        /*
         * !! Assume to record video only for now.
         */
        gbChToRec                                       = CH_VIDEO;
        gfFieldEntry                            = FALSE;
        gfInVertical                            = FALSE;
        gfSlaveRTDShouldPlay            = FALSE;
        gfSlaveRTDShouldRecord          = FALSE;
        gfSlaveRecStarted                       = FALSE;
        gfSlavePlayStarted                      = FALSE;
        gwPlayState                                     = PLAY_STATE_NULL;
        gfTcEntry                                       = TRUE;

        /*
         * Assume slave first, if can read back CP version, will set to TRUE
         * ( meaning master )
         */
        gfMasterRtd                                     = FALSE;
        gfFieldMode                                     = FALSE;        /*   assume   frame
mode    */
```

```
        /*
         * !! To be set by user, for now, assume field-1 editing
         */
        gfField2Editing                         = FALSE;
        gfRecEnabled                            = FALSE;
        gwCrossDaPlay                           = NORMAL_PLAYING;
        gwFieldNum                                      = 0;
        gbtyPlayRepeat                          = TY_PLAY_REPEAT_NONE;
        gbtyFieldRepeat                         = TY_FIELD_REPEAT_NONE_FWD;
        glFrameCntTimer                         = 0L;
        glFrameCntCopy                          = 0L;
        eMenuWhenRecord                         = NORM;
}


/*
 *-----------------------------------------------------------------------
 *  rhw.c       Copyright 1991 Accom Inc.
 *
 *      Responsible Person: Doug George
 *
 *  This file contains RTD - Hardware interface code
 *-----------------------------------------------------------------------
 */

#include "rglobal.h"
#include "rhw.h"
#include "rdiskctl.h"
#include "rtime.h"
#include "rdisk.h"
#include "rcom.h"
#include "rampex.h"
#include "rui.h"

#if RTD                         /* If the real hardware */
#include "v53.h"
#endif
/*
 *  Prototype
 */
void    SetRegSegs( void );
void    InitHwRegs( void );
void    WriteRt1Regs();
void    WriteRt2Regs();
void    WriteRt3Regs();
void    WriteRt4Regs();
void    WriteRt5Regs();
void    WriteRt6Regs();
void    WriteBdRegs( UINT8, UINT16 * );

extern  FLAG    gfSetRegAllowed;

/*
 * Default register values array
 */
static UINT16   rwRt1RegDft[N_REG_RT1] = {

RT1_CTRL_REG_DFT
                                                            };

static UINT16   rwRt2RegDft[N_REG_RT2] = {

RT2_CTRL_REG_DFT
                                                            };

static UINT16   rwRt3RegDft[N_REG_RT3] = {

RT3_CTRL_REG_DFT,
                                                            [illegible]
                                                            [illegible]
                                                            [illegible]
                                                            [illegible]
                                                            [illegible]
                                                            [illegible]
                                                            [illegible]
```

```
                                                                              [illegible]
                                                                              [illegible]
                                                                              [illegible]
                                                                              [illegible]
                                                                              };

static UINT16    rwRt4RegDft[N_REG_RT4] = {

RT4_CTRL_REG_DFT

                                                                              };

static UINT16    rwRt5RegDft[N_REG_RT3] = {

RT5_CTRL_REG_DFT,

                                                                              [illegible]
                                                                              [illegible]
                                                                              [illegible]
                                                                              [illegible]
                                                                              [illegible]
                                                                              [illegible]
                                                                              [illegible]
                                                                              [illegible]
                                                                              [illegible]
                                                                              [illegible]
                                                                              [illegible]
                                                                              };

static UINT16    rwRt6RegDft[N_REG_RT4] = {

RT6_CTRL_REG_DFT

                                                                              };

static UINT8     rbnRegEachBd[N_BD_MAX] = {

                                                                              [illegible]
                                                                              [illegible]
                                                                              [illegible]
                                                                              [illegible]

                                                                              [illegible]
                                                                              [illegible]
                                                                              };

#define INIT_TIMING_525_REF              ((1L<<16) - 9530L)                /*    11.x
lines    */
#define INIT_TIMING_525_INPUT     ((1L<<16) - 9547L)                                  [illegible]
#define INIT_TIMING_625_REF              ((1L<<16) - 9602L - (2 * 864L))       /*right?*/
#define INIT_TIMING_625_INPUT     ((1L<<16) - 9619L - ((2+3) * 864L))     /*right?*/

/*
 * InitHw()
 *
 * This routine initialize hardware to an appropriate value
 */

        void
InitHw()
{
        SetRegSegs();                                /* Define Register Segments     */
        TX_MAIN_READY_OFF(0);                   /* Tell disk control that main not ready*/
        HiReset();                                       /* Pulse the reset output */
        InitHwRegs();                                /* Initialize HW Reg Data       */
        TX_MAIN_READY_ON(0);                    /* Tell disk control that main is ready */
}


        void
SetRegSegs()
{
        /*
         * Initialize the register segment mapping table, segments are constant
         */
        grlRegAddr[RT1] = RT1_REG_PTR;
        grlRegAddr[RT2] = RT2_REG_PTR;
        grlRegAddr[RT3] = RT3_REG_PTR;
```

```
        grlRegAddr[RT4] = RT4_REG_PTR;
        grlRegAddr[RT5] = RT5_REG_PTR;
        grlRegAddr[RT6] = RT6_REG_PTR;
}


        void
InitHwRegs()
{
        UINT16  iwRegNo;

        for ( iwRegNo = 0; iwRegNo < N_REG_RT1 ; iwRegNo++ )      /* init Rt1 */
                grwOutRegRt1[iwRegNo] = rwRt1RegDft[iwRegNo];
        WriteRt1Regs();

        for ( iwRegNo = 0; iwRegNo < N_REG_RT2 ; iwRegNo++ )      /* init Rt2 */
                grwOutRegRt1[iwRegNo] = rwRt2RegDft[iwRegNo];
        WriteRt2Regs();

        for ( iwRegNo = 0; iwRegNo < N_REG_RT3 ; iwRegNo++ )      /* init Rt3 */
                grwOutRegRt3[iwRegNo] = rwRt3RegDft[iwRegNo];
        WriteRt3Regs();

        for ( iwRegNo = 0; iwRegNo < N_REG_RT4 ; iwRegNo++ )      /* init Rt4 */
                grwOutRegRt4[iwRegNo] = rwRt4RegDft[iwRegNo];
        WriteRt4Regs();

        for ( iwRegNo = 0; iwRegNo < N_REG_RT3 ; iwRegNo++ )      /* init Rt5 */
                grwOutRegRt5[iwRegNo] = rwRt5RegDft[iwRegNo];
        WriteRt5Regs();
        for ( iwRegNo = 0; iwRegNo < N_REG_RT4 ; iwRegNo++ )      /* init Rt6 */
                grwOutRegRt6[iwRegNo] = rwRt6RegDft[iwRegNo];
        WriteRt6Regs();
}


        void
WriteRt1Regs()
{
        UINT8   iwRegNo;

        for ( iwRegNo = 0; iwRegNo < N_REG_RT1 ; iwRegNo++ )
                WriteOneReg(RT1, iwRegNo, grwOutRegRt1[iwRegNo]);
}


        void
WriteRt2Regs()
{
        UINT8   iwRegNo;

        for ( iwRegNo = 0; iwRegNo < N_REG_RT2 ; iwRegNo++ )
                WriteOneReg(RT2, iwRegNo, grwOutRegRt2[iwRegNo]);
}


        void
WriteRt3Regs()
{
        UINT8   iwRegNo;

        for ( iwRegNo = 0; iwRegNo < N_REG_RT3 ; iwRegNo++ )
                WriteOneReg(RT3, iwRegNo, grwOutRegRt3[iwRegNo]);
}


        void
WriteRt4Regs()
{
        UINT8   iwRegNo;

        for ( iwRegNo = 0; iwRegNo < N_REG_RT4 ; iwRegNo++ )
                WriteOneReg(RT4, iwRegNo, grwOutRegRt4[iwRegNo]);
}
```

```
        void
WriteRt5Regs()
{
        UINT8   iwRegNo;

        for ( iwRegNo = 0; iwRegNo < N_REG_RT3 ; iwRegNo++ )
                WriteOneReg(RT5, iwRegNo, grwOutRegRt5[iwRegNo]);
}

        void
WriteRt6Regs()
{
        UINT8   iwRegNo;

        for ( iwRegNo = 0; iwRegNo < N_REG_RT4 ; iwRegNo++ )
                WriteOneReg(RT6, iwRegNo, grwOutRegRt6[iwRegNo]);
}


        void
HiReset()
{
        UINT16  wcntTimeout = 10000;

        CTRL_REG_RT2 = RT2_CTRL_REG_DFT;

        /*
         * Pulse the reset output and exit with default setting loaded
         */
        WriteOneReg(RT2, SYS_CTRL_REG, (RT2_CTRL_REG_DFT | R2_RESET));

        while ( wcntTimeout-- );                        /* wait a while with reset hi */

        WriteOneReg(RT2, SYS_CTRL_REG, RT2_CTRL_REG_DFT);
}


        void
HiSetAuxOutData( wData )
        UINT16 wData;
{
        WriteOneReg(RT2, SYS_CTRL_REG, wData);
}


        UINT16
HiReadStatus()
{
        return( ReadOneReg(RT2, STS_REG));
}


        void
BlankOutput(YBlank, CBlank)
        FLAG YBlank, CBlank;
{
        if (YBlank)
                grwOutRegRt3[IO_CTRL_REG] &= ~F_PASS_Y_TO_OUT;
        else
                grwOutRegRt3[IO_CTRL_REG] |= F_PASS_Y_TO_OUT;

        if (CBlank)
                grwOutRegRt3[IO_CTRL_REG] &= ~F_PASS_C_TO_OUT;
        else
                grwOutRegRt3[IO_CTRL_REG] |= F_PASS_C_TO_OUT;
}


        void
DebugToggle( wBit )
        UINT16 wBit;
{
        CTRL_REG_RT2 |= ( 1 << (wBit+11) );
        WriteOneReg(RT2, SYS_CTRL_REG, CTRL_REG_RT2);
```

```
        CTRL_REG_RT2 &= (~(1 << (wBit+11)) );
        WriteOneReg(RT2, SYS_CTRL_REG, CTRL_REG_RT2);
}

        void
LedToggle( fOn )
        FLAG    fOn;
{
        if (fOn)
                CTRL_REG_RT2 &= ~R2_TESTPASS;
        else
                CTRL_REG_RT2 |= R2_TESTPASS;

        WriteOneReg(RT2, SYS_CTRL_REG, CTRL_REG_RT2);
}


        void
HiSetAuxBit( bBit, fOn )
        UINT8   bBit;
        FLAG    fOn;
{
        if ( bBit <= 3 )
        {
                if (fOn)
                        CTRL_REG_RT2 |= (1 << (bBit+4));
                else
                        CTRL_REG_RT2 &= ~(1 << (bBit+4));
        }
}

        UINT16
HiGetAuxBit( bBit )
        UINT8 bBit;
{
        if ( bBit <= 3 )
                return ((HiReadStatus() & (1 << (bBit+4))) != 0);
        else
                return (0);
}


        UINT16
 ReadOneReg( bBdNo, bRegNo )
        UINT8   bBdNo, bRegNo;
{
        if ( bBdNo > N_BD_MAX )
                return(0);                                              /* not a valid
bd #, just exit */
        /*
         * Read from register address
         */
        return(*WORD_PTR(grlRegAddr[bBdNo] + (bRegNo<<1) ));
}


        void
WriteOneReg( bBdNo, bRegNo, wRegData )
        UINT8   bBdNo, bRegNo;
        UINT16  wRegData;
{
        if ( bBdNo > N_BD_MAX )
                return;                                                 /* not a valid
bd #, just exit */

        /*
         * Write to register address
         */
        *WORD_PTR(grlRegAddr[bBdNo] + (bRegNo<<1) ) = wRegData;
}



        void
```

```
WaitTopOfFrame()
{
        UINT32  lTicks;

        /*
        ** assume that if glFrameCntTimer is non-zero,
        ** the vertical interrupt is enabled
        */
        if (lTicks = glFrameCntTimer)
                while (lTicks == glFrameCntTimer);
}


        UINT32
GetTime()
{
        return( glFrameCntTimer );
}


#if 0
#define AVG             16
#define PLLUnlock       (PLLAvg > (AVG / 2))
#define SyncAbsent      (SyncAvg > (AVG / 2))
#define InputAbsent     (InputAvg > (AVG / 2))
#endif

        void
CheckWarnings()
{
#if 0
        UINT16  wSts;

        extern UINT16 volatile   wcntFrameIntr;

        wSts = RTD_regin(F_STATUS1);

        /*
        **      Average the PLL information
        */
        if (wSts & F_PLLUNLOCK)
                ++PLLAvg;
        else
                --PLLAvg;
        Bound(PLLAvg, 1, AVG);

        /*
        **      Average the Input information
        */
        if (wSts & F_PRES_IN)
                ++InputAvg;
        else
                --InputAvg;
        Bound(InputAvg, 1, AVG);

        /*
        **      Average the Sync Absent information
        */
        if (wcntFrameIntr == 0)
                ++SyncAvg;
        else
                --SyncAvg;
        Bound(SyncAvg, 1, AVG);


        switch ( CurSetup.syncSource )
        {
                case SyncHouse:
                        LedToggle(F_SIGABS, SyncAbsent);
                        break;

                case SyncInput:
```

```
                        LedToggle(F_SIGABS, InputAbsent);
                        break;

                case SyncFreeRun:
                        LedToggle(F_SIGABS, OFF);
                        break;
        }
#endif
}


        void
RtVertIntr()
{
                                UINT8   bFsToRead;
                                UINT8   bFsToWrite;
        register        UINT16  i;
                                UINT8   bTcCmpResult;

        gfInVertical    = TRUE;
        /*
         * Set up gfField2 for the new field
         */
        if( ReadOneReg(RT2, STS_REG) & R2_FIELD_TYPE )
        {                                                                       /* start of
field 1                                 */
                /*
                 * Special mode to handle playing reverse
                 */
                if( ( gwRt3State == RT3_TOGGLE_FS_PLAYING ) &&
                        ( gnStepFwd == 0 && gnStepRev == 0 ) && !sPlayInfo.fPlayFwd )
                {
                        if( gfField2 == TRUE )
                                /*
                                 * Means it just switched over from normal to special mode
                                 */
                                gfEvenFrame     = (FLAG)( ( gfEvenFrame )? FALSE : TRUE );
                        gfField2        = TRUE;
                }
                else
                {
                        gfField2        = FALSE;
                        glFrameCntTimer++;
                        gfEvenFrame     = (FLAG)( ( gfEvenFrame )? FALSE : TRUE );
                }
                if ( gwcntHiCmdCnt );                   /* if Hi count <> 0             */
                        gwcntHiCmdCnt--;                        /* decrement it         */
        }
        else                                                            /* start of field 2
                                */
        {
                if( ( gwRt3State == RT3_TOGGLE_FS_PLAYING ) &&
                        ( gnStepFwd == 0 && gnStepRev == 0 ) && !sPlayInfo.fPlayFwd )
                {
                        gfField2        = FALSE;
                        glFrameCntTimer++;
                        gfEvenFrame     = (FLAG)( ( gfEvenFrame )? FALSE : TRUE );
                }
                else
                {
                        gfField2        = TRUE;
                }
        }
#if 0
                if ( grfBdsPresent[RT1] )       WriteRt1Regs();
                if ( grfBdsPresent[RT2] )       WriteRt2Regs();
                if ( grfBdsPresent[RT3] )       WriteRt3Regs();
                if ( grfBdsPresent[RT4] )       WriteRt4Regs();
                if ( grfBdsPresent[RT5] )       WriteRt5Regs();
                if ( grfBdsPresent[RT6] )       WriteRt6Regs();

#else   /* !! For now, just dump Rt2 and Rt3    */
                WriteRt2Regs();
                WriteRt3Regs();
#endif
```

```
        /*
         * Set up GPI Lines for ITS Show
         */
        if ( gfSlaveRTDShouldPlay )                       /* if slave RTD is to play       */
                HiSetAuxBit(1, OFF);                      /* play on = 'L'                 */
        else
                                                          /* else turn off Slave
Play            */
                HiSetAuxBit(1, ON);                       /* play off = 'H'                */

        if ( gfSlaveRTDShouldRecord )
                HiSetAuxBit(0, OFF);                      /* record on = 'L'               */
        else
                                                          /* else turn off Slave
Record          */
                HiSetAuxBit(0, ON);                       /* record off = 'H'              */

        if ( grfLedStatus[SWAP_LED] )             /* is swapped, select background 1       */
                HiSetAuxBit(2, ON);                       /* 'H' : ICM background 1 */
        else
                                                          /* else select background
0               */
                HiSetAuxBit(2, OFF);                      /* 'L' : ICM background 0        */

        /*
         * Call real-time play routine, if enabled.
         */
        if( ( gwRt3State & RT3_DISK_STATE )       == RT3_PLAYING )
        {
#if 0
StrCpy( gStr1, "XX" );
PrintDec( gStr2, (UINT16)glFrameCntTimer, 4, 0, 9999 );
StrCat( gStr1, gStr2 );
StrCat( gStr1, ":" );
PrintDec( gStr2, (UINT16)gfField2, 1, 0, 9 );
StrCat( gStr1, gStr2 );
StrCat( gStr1, ";" );
UiDispStr( gStr1, 1, ROW_NO_ERR_MSG );
#endif
                if ( RtPlaying() != TRUE )                goto    LReturn;
        }

        if( ( gwRt3State & RT3_DISK_STATE ) == RT3_DISK_IDLE )
        {
                gfSlaveRTDShouldPlay              = FALSE;
                gfSlaveRTDShouldRecord            = FALSE;
        }
        /*
         * Set up (RT3) hardware register for next frame/field.
         * First frame is Frame 1 and is odd.
         */
        if( gfField2 )
        {
                /*
                 * Frame-paced instruction only be done at field 2. For next frame.
                 * If curr frame odd,   we want next frame(even) to read FS1, write FS2.
                 * If curr frame even , we want next frame(odd) to read FS2, write FS1.
                 */
                bFsToRead       =  (UINT8)( gfEvenFrame ? FS2 : FS1 );
                bFsToWrite      =  (UINT8)( gfEvenFrame ? FS1 : FS2 );
                /*
                 * If Bypass/play/record one frame, should make sure that
                 * "read whatever FS that was being read, write to the other FS".
                 */
                if( gfSetRegAllowed )
                {
                switch( gwRt3State )
                {
                /* Write input video to bFsToWrite for both bypass and record          */
                case RT3_TOGGLE_FS_RECORDING:    /* Next fr, wr input to bFsToWrite    */
                        if( !gfRecEnabled )
                        {
                                /*
                                 * To make sure RtRecording() be called at least 1 field later
                                 * than the register setting.
                                 */
                                gfRecEnabled    = TRUE;
                                glFrameCntCopy  = glFrameCntTimer;
```

```
		}
	case RT3_TOGGLE_FS_BYPASSING:	/* Next fr, wr input to bFsToWrite	*/
	case RT3_TOGGLE_FS_PLAYING:		/* Next fr, wr disk to bFsToWrite*/
		if( ( gwRt3State == RT3_TOGGLE_FS_PLAYING ) &&
			( gwCrossDaPlay == FREEZE_A_FRAME_NOW ) )
		{
			if( RtSetFsForRead( (UINT8)(gfEvenFrame? FS2 : FS1) ) != TRUE
)
				goto	LReturn;
			gwCrossDaPlay	= NORMAL_PLAYING;
		}
		else
		{
			if( RtSetFsForRead( bFsToRead ) != TRUE )
				goto	LReturn;
			if( RtSetFsForWrite(bFsToWrite, (FLAG)
					( ( gwRt3State == RT3_TOGGLE_FS_PLAYING )?
					FS_MODE_PLAY : FS_MODE_REC ) ) != TRUE )
				goto	LReturn;
		}
		break;

	case RT3_BYPASS_ONE_FRAME_FS1:	/* Bypass one new frame via FS1		*/
	case RT3_RECORD_ONE_FRAME_FS1:	/* Record one new frame via FS1		*/
	case RT3_PLAY_ONE_FRAME_FS1:	/* Play one next frame via FS1		*/

		if ( glFrameCntCopy == 0L )
		{
			if( RtSetFsForRead( FS2 ) != TRUE )
				goto	LReturn;
			if( RtSetFsForWrite( FS1, (FLAG)
					( ( gwRt3State == RT3_PLAY_ONE_FRAME_FS1 )?
						FS_MODE_PLAY : FS_MODE_REC ) ) != TRUE
)
				goto	LReturn;
			glFrameCntCopy	= glFrameCntTimer;
		}
		else
		{
			if( glFrameCntTimer == glFrameCntCopy + 1 )
			{
				switch( gwRt3State )
				{
				case RT3_PLAY_ONE_FRAME_FS1:
					gwPlayState				=
PLAY_STATE_NULL;
					gfPlayAborted			= TRUE;

				case RT3_BYPASS_ONE_FRAME_FS1:
					gwRt3State				=
RT3_FREEZE_FS1_NO_RECORD;
					break;
				case RT3_RECORD_ONE_FRAME_FS1:
					gwRt3State				=
RT3_FREEZE_FS1_RECORDING;
					break;
				}
				if( RtSetFsForRead( FS1 ) != TRUE )
					goto	LReturn;
				glFrameCntCopy	= 0L;
			}
		}

		break;

	case RT3_BYPASS_ONE_FRAME_FS2:	/* Bypass one new frame via FS2		*/
	case RT3_RECORD_ONE_FRAME_FS2:	/* Record one new frame via FS2		*/
	case RT3_PLAY_ONE_FRAME_FS2:	/* Play one next frame via FS2		*/

		if ( glFrameCntCopy == 0L )
		{
			if( RtSetFsForRead( FS1 ) != TRUE )
				goto	LReturn;
			if( RtSetFsForWrite( FS2, (FLAG)
```

```
                                ( ( gwRt3State == RT3_PLAY_ONE_FRAME_FS2 )?
                                        FS_MODE_PLAY : FS_MODE_REC ) ) != TRUE
)
                                goto    LReturn;
                        glFrameCntCopy  = glFrameCntTimer;
                }
                else
                {
                        if( glFrameCntTimer == glFrameCntCopy + 1 )
                        {
                                switch( gwRt3State )
                                {
                                case RT3_PLAY_ONE_FRAME_FS2:
                                        gwPlayState                     =
PLAY_STATE_NULL;
                                        gfPlayAborted           = TRUE;
                                case RT3_BYPASS_ONE_FRAME_FS2:
                                        gwRt3State                      =
RT3_FREEZE_FS2_NO_RECORD;
                                        break;
                                case RT3_RECORD_ONE_FRAME_FS2:
                                        gwRt3State                      =
RT3_FREEZE_FS2_RECORDING;
                                        break;
                                }
                                if( RtSetFsForRead( FS2 ) != TRUE )
                                        goto    LReturn;
                                glFrameCntCopy  = 0L;
                        }
                }
                break;
        }
        }
}
/*
 * These must be updated every field, to make field step works.
 */
if( gfSetRegAllowed )
{
switch( gwRt3State )
{
case RT3_FREEZE_FS1_NO_RECORD:
case RT3_FREEZE_FS1_RECORDING:
        if( RtSetFsForRead( FS1 ) != TRUE )
                goto    LReturn;
        break;

case RT3_FREEZE_FS2_NO_RECORD:
case RT3_FREEZE_FS2_RECORDING:
        if( RtSetFsForRead( FS2 ) != TRUE )
                goto    LReturn;
        break;

}
}
/*
 * Set up Fs Control Register Field1/Field2 bit for current field.
 * Bit clear: field 1;   Bit set : field 2
 * So video knows where to write to, or read from.
 */
if( gfSetRegAllowed )
{
switch( gbtyFieldRepeat )
{
        case TY_FIELD_REPEAT_NONE_FWD:
                if ( gfField2 )
                {
                        grwOutRegRt3[FS_CTRL_REG]                       &= ~
F_FS1_FIELD_2;
                        grwOutRegRt3[FS_CTRL_REG]                       &= ~
F_FS2_FIELD_2;
                }
                else
                {
```

```
                        grwOutRegRt3[FS_CTRL_REG]                                |=
F_FS1_FIELD_2;
                        grwOutRegRt3[FS_CTRL_REG]                                |=
F_FS2_FIELD_2;
                }
                break;

            /*
             * For the special case: play rev gfEvenframe and gfField2 swapped
             */
            case TY_FIELD_REPEAT_NONE_REV:
                if ( !gfField2 )
                {
                        grwOutRegRt3[FS_CTRL_REG]                                &~
F_FS1_FIELD_2;
                        grwOutRegRt3[FS_CTRL_REG]                                &~
F_FS2_FIELD_2;
                }
                else
                {
                        grwOutRegRt3[FS_CTRL_REG]                                |=
F_FS1_FIELD_2;
                        grwOutRegRt3[FS_CTRL_REG]                                |=
F_FS2_FIELD_2;
                }
                break;

            case TY_FIELD_REPEAT_F1_FS1:     /* FS1 repeat field-1, FS2 normal     */
                grwOutRegRt3[FS_CTRL_REG]                                        &~
F_FS1_FIELD_2;
                if ( gfField2 )
                        grwOutRegRt3[FS_CTRL_REG]                                &~
F_FS2_FIELD_2;
                else
                        grwOutRegRt3[FS_CTRL_REG]                                |=
F_FS2_FIELD_2;

                break;

            case TY_FIELD_REPEAT_F2_FS1:     /* FS1 repeat field-2, FS2 normal     */
                grwOutRegRt3[FS_CTRL_REG]                                        |=
F_FS1_FIELD_2;
                if ( gfField2 )
                        grwOutRegRt3[FS_CTRL_REG]                                &~
F_FS2_FIELD_2;
                else
                        grwOutRegRt3[FS_CTRL_REG]                                |=
F_FS2_FIELD_2;
                break;

            case TY_FIELD_REPEAT_F1_FS2:     /* FS1 normal, FS2 repeat field-1     */
                if ( gfField2 )
                        grwOutRegRt3[FS_CTRL_REG]                                &~
F_FS1_FIELD_2;
                else
                        grwOutRegRt3[FS_CTRL_REG]                                |=
F_FS1_FIELD_2;
                grwOutRegRt3[FS_CTRL_REG]                                        &~
F_FS2_FIELD_2;
                break;

            case TY_FIELD_REPEAT_F2_FS2:     /* FS1 normal, FS2 repeat field-2     */
                if ( gfField2 )
                        grwOutRegRt3[FS_CTRL_REG]                                &~
F_FS1_FIELD_2;
                else
                        grwOutRegRt3[FS_CTRL_REG]                                |=
F_FS1_FIELD_2;
                grwOutRegRt3[FS_CTRL_REG]                                        |=
F_FS2_FIELD_2;
                break;
        }
    }
#if 0
    if( ( ( gwRt3State & RT3_FS_STATE ) == RT3_FREEZE_FS1 ) ||
            ( ( gwRt3State & RT3_FS_STATE ) == RT3_FREEZE_FS2 )  )
```

```
/*
 * Could be either freeze no record or freeze recording
 */
{
        if( ( ( gbtyFieldRepeat == TY_FIELD_REPEAT_F1_FS1 ) ||
                ( gbtyFieldRepeat == TY_FIELD_REPEAT_F1_FS2 ) ) &&
              !gfField2 && geViEnabled == TOGGLE_ON )
        {
              /*
               * Next field is f2, we be doing " at f2 displaying a f1 video"
               */
              grwOutRegRt3[SYS_CTRL_REG]                        |=  F_3_LINE_DELAY_VI;
              grwOutRegRt3[SYS_CTRL_REG]                        |=  F_ENABLE_VERT_INTERP;
              if( ( gwRt3State & RT3_FS_STATE ) == RT3_FREEZE_FS1 )
              {
                    grwOutRegRt3[TIMING_REG]          &= ~ B_FS1_TIMING;
                    grwOutRegRt3[TIMING_REG]          |= V_FS1_READ_FROM_FS_NORM;
              }
              else
              {
                    grwOutRegRt3[TIMING_REG]          &= ~ B_FS2_TIMING;
                    grwOutRegRt3[TIMING_REG]          |= V_FS2_READ_FROM_FS_NORM;
              }
        }
        else
        if( ( ( gbtyFieldRepeat == TY_FIELD_REPEAT_F2_FS1 ) ||
                ( gbtyFieldRepeat == TY_FIELD_REPEAT_F2_FS2 )  ) &&
              gfField2  && geViEnabled == TOGGLE_ON )
        {
              /*
               * If next field is f1, we be doing " at f1 displaying a f2 video"
               */
              grwOutRegRt3[SYS_CTRL_REG]                        &= ~ F_3_LINE_DELAY_VI;
              grwOutRegRt3[SYS_CTRL_REG]                        |=  F_ENABLE_VERT_INTERP;
              if( ( gwRt3State & RT3_FS_STATE ) == RT3_FREEZE_FS1 )
              {
                    grwOutRegRt3[TIMING_REG]          &= ~ B_FS1_TIMING;
                    grwOutRegRt3[TIMING_REG]          |= V_FS1_READ_FROM_FS_DELAY;
              }
              else
              {
                    grwOutRegRt3[TIMING_REG]          &= ~ B_FS2_TIMING;
                    grwOutRegRt3[TIMING_REG]          |= V_FS2_READ_FROM_FS_DELAY;
              }
        }
        else
        {
              grwOutRegRt3[SYS_CTRL_REG]                        |=  F_3_LINE_DELAY_VI;
              grwOutRegRt3[SYS_CTRL_REG]                        &= ~ F_ENABLE_VERT_INTERP;
              if( ( gwRt3State & RT3_FS_STATE ) == RT3_FREEZE_FS1 )
              {
                    grwOutRegRt3[TIMING_REG]          &= ~ B_FS1_TIMING;
                    grwOutRegRt3[TIMING_REG]          |= V_FS1_READ_FROM_FS_NORM;
              }
              else
              {
                    grwOutRegRt3[TIMING_REG]          &= ~ B_FS2_TIMING;
                    grwOutRegRt3[TIMING_REG]          |= V_FS2_READ_FROM_FS_NORM;
              }
        }
}
if( gwRt3State == RT3_TOGGLE_FS_PLAYING )
{
        if( gfField2 && geViEnabled == TOGGLE_ON &&
              ( sPlayInfo.sCylAdv.wValueSpdCurr != PLAY_SPD_NORMAL ) &&
              ( gwPlayState == PLAY_STATE_PLAYING_FWD ||
                    ( gwPlayState == PLAY_STATE_PLAYING_REV ) ) )
        {
              /*
               * Next field is f1, we be doing " at f1 displaying a f2 video"
               */
              grwOutRegRt3[SYS_CTRL_REG]                        &= ~ F_3_LINE_DELAY_VI;
              grwOutRegRt3[SYS_CTRL_REG]                        |=  F_ENABLE_VERT_INTERP;
```

```
                        if( !gfEvenFrame )
                        {
                                grwOutRegRt3[TIMING_REG]        &= ~ B_FS1_TIMING;
                                grwOutRegRt3[TIMING_REG]        |= V_FS1_READ_FROM_FS_DELAY;
                        }
                        else
                        {
                                grwOutRegRt3[TIMING_REG]        &= ~ B_FS2_TIMING;
                                grwOutRegRt3[TIMING_REG]        |= V_FS2_READ_FROM_FS_DELAY;
                        }
                }
                else
                {
                        grwOutRegRt3[SYS_CTRL_REG]                      |=  F_3_LINE_DELAY_VI;
                        grwOutRegRt3[SYS_CTRL_REG]                      &= ~ F_ENABLE_VERT_INTERP;
                        if( gfField2 )
                        {
                                if( !gfEvenFrame )
                                {
                                        grwOutRegRt3[TIMING_REG]        &= ~ B_FS1_TIMING;
                                        grwOutRegRt3[TIMING_REG]        |= V_FS1_READ_FROM_FS_NORM;
                                }

                                else
                                {
                                        grwOutRegRt3[TIMING_REG]        &= ~ B_FS2_TIMING;
                                        grwOutRegRt3[TIMING_REG]        |= V_FS2_READ_FROM_FS_NORM;
                                }
                        }
                }
        }
#endif
        /*
         * Call real time record routine if enabled.
         */
        if( ( gwRt3State == RT3_TOGGLE_FS_RECORDING &&
                        gfRecEnabled && glFrameCntTimer > glFrameCntCopy ) ||
                ( gwRt3State == RT3_FREEZE_FS1_RECORDING ||
                  gwRt3State == RT3_FREEZE_FS2_RECORDING ) )
                if ( RtRecording() != TRUE )      goto    LReturn;

#if 0
if( ( gfAborted ) && ( gnStepFwd == 0 ) && fDisp )
{
PrintDec( gStr2, (UINT16)gwRt3State, 2, 0, 99 );
StrCat( gStr1, gStr2 );
StrCat( gStr1, ":" );
PrintDec( gStr2, (UINT16)gbtyFieldRepeat, 1, 0, 9 );
StrCat( gStr1, gStr2 );
StrCat( gStr1, ":" );
PrintDec( gStr2, (UINT16)gfEvenFrame, 1, 0, 9 );
StrCat( gStr1, gStr2 );
StrCat( gStr1, ":" );
PrintDec( gStr2, (UINT16)gfField2, 1, 0, 9 );
StrCat( gStr1, gStr2 );
UiDispStr( gStr1, 1, ROW_NO_ERR_MSG );
fDisp = FALSE;
}
if( ( gfAborted ) && ( gnStepFwd == 0 ) && fDisp2 )
{
        if( gwRt3State == RT3_FREEZE_FS1_NO_RECORD )
        {
                gbtyFieldRepeat = TY_FIELD_REPEAT_F1_FS1;
                grwOutRegRt3[FS_CTRL_REG]                               & =     ~
F_FS1_FIELD_2;
                if ( gfField2 )
                        grwOutRegRt3[FS_CTRL_REG]                       & =     ~
F_FS2_FIELD_2;
                else
                        grwOutRegRt3[FS_CTRL_REG]                       | =
F_FS2_FIELD_2;
        }
        else
        if( gwRt3State == RT3_FREEZE_FS2_NO_RECORD )
        {
```

```
                gbtyFieldRepeat = TY_FIELD_REPEAT_F1_FS2;
                if ( gfField2 )
                        grwOutRegRt3[FS_CTRL_REG]                               &=      ~
F_FS1_FIELD_2;
                else
                        grwOutRegRt3[FS_CTRL_REG]                               |=
F_FS1_FIELD_2;
                grwOutRegRt3[FS_CTRL_REG]                                       &=      ~
F_FS2_FIELD_2;
        }
        fDisp2 = FALSE;
}
#endif
        /*
         * !! For now. just do ampex.

         * We should receive for each port, by calling its func ptr for each port.
         */
/*      RtRxMsgAmpex( COM2 );
/*      RtTxMsgAmpex( COM2 );
*/
        /*
         * Run the internal timeline and
         * !! To Do: if matches against tc's in the Timeline buffer, then do it.
         */
        if( gsIntTl.fRunning )
                gsIntTl.tcCurr.lFieldNo++;

        for( i = 0; grsTlb[i].tcExec.fUndef != TRUE; i++ )
                if( TcCmp( gsIntTl.tcCurr, grsTlb[i].tcExec, &bTcCmpResult )
                        == TC_CMP_1ST_EQ_2ND )
                {
                        /*
                         * Do it!
                         */
                }


LReturn:
        gfInVertical = FALSE;
        return;
}


/*
 *------------------------------------------------------------------------
 * rinit.c      Copyright right 1991 Accom Inc.
 *
 *      Responsible Person: Jeffrey Wu
 *
 * This file defines the RTD initialization code
 *------------------------------------------------------------------------
 */
#include "rglobal.h"
#include "rui.h"
#include "rtime.h"
#include "rdisk.h"
#include "rdiskctl.h"
#include "rhw.h"

#define IN_REG0         0

static  UINT8   rbBdNoExpected[6]
=
{
        0x01, 0x02, 0x03, 0x04, 0x03, 0x04
};

        void
TestSysConfig()
{
        register        UINT8           iSlotID;
                        UINT16          wReg0;
                        UINT8           bReg0Low;
                        FLAG            fSystemOK = TRUE;       /* Be optimistic */
```

```
                UINT16          bLoopBack;
    /*
     * For each Slot 1..6, test if correct board is present
     */
    UiClearDisp();

    for ( iSlotID = SLOT1; iSlotID < N_SLOT_MAX; iSlotID++ )
    {
        grfBdPresent[iSlotID] = TRUE;                   /* Init flag to TRUE     */

        for ( bLoopBack = 0 ; bLoopBack < 8 ; bLoopBack++ )
        {
            WriteOneReg(iSlotID, 0, (bLoopBack<<5));

            if ( ((ReadOneReg(iSlotID, 0) & 0x00e0)>>5) != bLoopBack )
                grfBdPresent[iSlotID] = FALSE;          /* Set flag to FALSE
*/
        }

        if ( iSlotID == SLOT2)
            grfBdPresent[iSlotID] = TRUE;               /* Init flag to TRUE     */

        if ( grfBdPresent[iSlotID] )
        {
            /*
             * Read the word into wReg0
             */
            wReg0           = ReadOneReg( iSlotID, IN_REG0 );
            /*
             * Now test it to see if it is where it should be
             */
            bReg0Low        = (UINT8) (wReg0 & 0x07);

            if ( iSlotID != SLOT2 )                            /* Skip test
for RT2 */
                if ( bReg0Low != rbBdNoExpected[iSlotID] )
                {
                    fSystemOK = FALSE;                         /* Oh, well
            */
                    StrCpy( gStr1, "Board # " );
                    PrintDec( gStr2, bReg0Low, 1, 1, N_SLOT_MAX );
                    StrCat( gStr1, gStr2 );
                    StrCat( gStr1, " (1..6) is misplaced in Slot # " );
                    PrintDec( gStr2, iSlotID + 1, 1, 1, N_SLOT_MAX );
                    StrCat( gStr1, gStr2 );
                    StrCat( gStr1, " (1..6)" );
                    UiDispStr( gStr1, 1, (UINT8) (iSlotID+1) );
                }
        }
        else
        {
            StrCpy( gStr1, "Slot # " );
            PrintDec( gStr2, (UINT16) iSlotID+1, 1, 1, N_SLOT_MAX );
            StrCat( gStr1, gStr2 );
            StrCat( gStr1, " is Empty" );
            UiDispStr( gStr1, 1, (UINT8) (iSlotID+1) );
        }
    }

    /*
     * If any board is in wrong slot or no RT2 in Slot2 or no RT3 in Slot3,
     * then, error.
     */
    if (! ( fSystemOK && grfBdPresent[SLOT3] && grfBdPresent[SLOT2]) )
    {
        if ( fSystemOK )
            UiDispStr("System is incomplete, Unable to continue !!", 1, 8 );
        else
            UiDispStr("Invalid System Setup, Unable to continue !!", 1, 8 );

#if !DEBUG
        while (TRUE);                                          /* Sit here
and wait    */
#endif
    }
```

```
        UiClearDisp();

        UiDispStr("Now Configuring for Base Addressing",4,8);

        SetBaseAddr();                                          /* set to use base addresses
*/

        fSystemOK = TRUE;

        /* now retest the boards in system to verify they can be read/written */
        for ( iSlotID = SLOT1; iSlotID < N_SLOT_MAX; iSlotID++ )
        {
                if ( grfBdPresent[iSlotID] && (iSlotID != SLOT2) )
                {
                        for ( bLoopBack = 0 ; bLoopBack < 8 ; bLoopBack++ )
                        {
                                switch ( iSlotID )
                                {
                                        case SLOT1:
                                                CTRL_REG_RT1 &= ~R_LOOPBACK;      /* turn off
loopback */

                                                CTRL_REG_RT1 |= (bLoopBack<<5);   /* set loopback
bits */

                                                WriteOneReg(RT1, SYS_CTRL_REG, CTRL_REG_RT1);
                                                break;

                                        case SLOT2:
                                                CTRL_REG_RT2 &= ~R_LOOPBACK;      /* turn off
loopback */

                                                CTRL_REG_RT2 |= (bLoopBack<<5);   /* set loopback
bits */

                                                WriteOneReg(RT2, SYS_CTRL_REG, CTRL_REG_RT2);
                                                break;

                                        case SLOT3:
                                                CTRL_REG_RT3 &= ~R_LOOPBACK;      /* turn off
loopback */

                                                CTRL_REG_RT3 |= (bLoopBack<<5);   /* set loopback
bits */

                                                WriteOneReg(RT3, SYS_CTRL_REG, CTRL_REG_RT3);
                                                break;

                                        case SLOT4:
                                                CTRL_REG_RT4 &= ~R_LOOPBACK;      /* turn off
loopback */

                                                CTRL_REG_RT4 |= (bLoopBack<<5);   /* set loopback
bits */

                                                WriteOneReg(RT4, SYS_CTRL_REG, CTRL_REG_RT4);
                                                break;

                                        case SLOT5:
                                                CTRL_REG_RT5 &= ~R_LOOPBACK;      /* turn off
loopback */

                                                CTRL_REG_RT5 |= (bLoopBack<<5);   /* set loopback
bits */

                                                WriteOneReg(RT5, SYS_CTRL_REG, CTRL_REG_RT5);
                                                break;

                                        case SLOT6:
                                                CTRL_REG_RT6 &= ~R_LOOPBACK;      /* turn off
loopback */

                                                CTRL_REG_RT6 |= (bLoopBack<<5);   /* set loopback
bits */

                                                WriteOneReg(RT6, SYS_CTRL_REG, CTRL_REG_RT6);
                                                break;
                                }
                                if ( ((ReadOneReg(iSlotID, STS_REG) & 0x00e0)>>5) != bLoopBack
)
                                {
                                        StrCpy( gStr1, "Board RT" );
                                        PrintDec( gStr2, (UINT16) iSlotID+1, 1, 1, N_SLOT_MAX
);
                                        StrCat( gStr1, gStr2 );
                                        StrCat( gStr1, " does not respond at Base Address" );
```

```
                    UiDispStr( gStr1, 1, (UINT8) (iSlotID+1) );
                    fSystemOK = FALSE;
                }
            }
        }
    }

    /* If any board doesn't work with base addr, error, don't continue        */
    if (! fSystemOK )
    {
        UiDispStr("  System Failure, Unable to continue !!", 1, 8 );
        while (TRUE);                                   /* Sit here and wait
    */
    }
}


/*
 *      Initialize the control panel
 */
        void
InitCP()
{
        gsUiState.fCPConnect     = TRUE;        /* give benefit of the doubt */

        WaitTimeMS(1000);                        /* delay until the CP gets ready
*/
        UiResetCP();
        UiGetVersion();
        UiSetCPSend(SEND_CHANGE, 0);
        UiDimDisp( 5 );                          /* set to a dimmer level */
}


/*
**      Initialize the main state table, the second time
*/
        void
InitUiStates()
{
        gsUiState.lKeyTime = GetTicks();
        gsUiState.eNextMode = gsUiState.eLastMode = gsUiState.eCurrMode = NOBUTTON;
}


#define FSINITVAL       0x1401CB
        void
InitFs()
{
        UINT8   timer;

        /*
         * Do for RT3
         */
        /* turn off any serial activity */
        grwOutRegRt3[TIMING_REG] &= ~(B_FS1_TIMING + B_FS2_TIMING);
        WriteOneReg( RT3, TIMING_REG, grwOutRegRt3[TIMING_REG] );

        /* reset VRAM controllers */

        grwOutRegRt3[FS_CTRL_REG] &= ~(F_FS1_LOAD + F_FS2_LOAD);
        WriteOneReg( RT3, FS_CTRL_REG, grwOutRegRt3[FS_CTRL_REG] );
        grwOutRegRt3[TIMING_REG] &= ~(V_RESET_FS1 + V_RESET_FS2);
        WriteOneReg( RT3, TIMING_REG, grwOutRegRt3[TIMING_REG] );
        for (timer = 0; timer < 25; timer++);   /* wait for reset to settle */
        grwOutRegRt3[FS_CTRL_REG] |= F_FS1_LOAD + F_FS2_LOAD;
        WriteOneReg( RT3, FS_CTRL_REG, grwOutRegRt3[FS_CTRL_REG] );
        grwOutRegRt3[TIMING_REG] |= V_RESET_FS1 + V_RESET_FS2;
        WriteOneReg( RT3, TIMING_REG, grwOutRegRt3[TIMING_REG] );

        /* initialize FS1, FS2 */
        grwOutRegRt3[FS_CTRL_REG] &= ~(F_FS1_LOAD | F_FS1_R9 | F_FS1_C9);
        WriteOneReg( RT3, FS_CTRL_REG, grwOutRegRt3[FS_CTRL_REG] );
        WriteFsRt3( FS1, FSINITVAL, 0 );
        grwOutRegRt3[FS_CTRL_REG] |= F_FS1_LOAD;
```

```
        grwOutRegRt3[FS_CTRL_REG] &= ~(F_FS2_LOAD + F_FS2_R9 + F_FS2_C9);
        WriteOneReg(RT3, FS_CTRL_REG, grwOutRegRt3[FS_CTRL_REG]);
        WriteFsRt3( FS2, FSINITVAL, 0 );
        grwOutRegRt3[FS_CTRL_REG] |= F_FS2_LOAD;
        WriteOneReg(RT3, FS_CTRL_REG, grwOutRegRt3[FS_CTRL_REG]);

        /*
         * Do for RT5
         */
        /* reset VRAM controller */
        grwOutRegRt5[FS_CTRL_REG] &= ~(F_FS1_LOAD + F_FS2_LOAD);
        WriteOneReg( RT5, FS_CTRL_REG, grwOutRegRt5[FS_CTRL_REG] );
        grwOutRegRt5[TIMING_REG] &= ~(V_RESET_FS1 + V_RESET_FS2);
        WriteOneReg( RT5, TIMING_REG, grwOutRegRt5[TIMING_REG] );
        for (timer = 0; timer < 25; timer++);    /* wait for reset to settle */
        grwOutRegRt5[FS_CTRL_REG] |= F_FS1_LOAD + F_FS2_LOAD;
        WriteOneReg( RT5, FS_CTRL_REG, grwOutRegRt5[FS_CTRL_REG] );
        grwOutRegRt5[TIMING_REG] |= V_RESET_FS1 + V_RESET_FS2;
        WriteOneReg( RT5, TIMING_REG, grwOutRegRt5[TIMING_REG] );

        /* initialize FS1, FS2 */
        grwOutRegRt5[FS_CTRL_REG] &= ~(F_FS1_LOAD | F_FS1_R9 | F_FS1_C9);
        WriteOneReg( RT5, FS_CTRL_REG, grwOutRegRt5[FS_CTRL_REG] );
        WriteFsRt3( FS1, FSINITVAL, 0 );
        grwOutRegRt5[FS_CTRL_REG] |= F_FS1_LOAD;
        grwOutRegRt5[FS_CTRL_REG] &= ~(F_FS2_LOAD + F_FS2_R9 + F_FS2_C9);
        WriteOneReg(RT5, FS_CTRL_REG, grwOutRegRt5[FS_CTRL_REG]);
        WriteFsRt3( FS2, FSINITVAL, 0 );
        grwOutRegRt5[FS_CTRL_REG] |= F_FS2_LOAD;
        WriteOneReg(RT5, FS_CTRL_REG, grwOutRegRt5[FS_CTRL_REG]);
}

        FLAG
SetDiskCylLimits()
{
        UINT8           bDiskNo;
        UINT8           bResult;
        UINT32          lcntTimeout = 50000;

        UiClearDisp();

        /*
         * Before initializing the disks, disk controller has to be ready
         */
        do
        {
                if ( RxDiskMsgByte( 0, N_DISK_PR_CTRL_MAX,I_DISK_CTRL_READY, &bResult )    ≠ [illegible]
)
                        return( FALSE );
        }
        while( ( bResult != F_READY ) && ( --lcntTimeout != 0 ) );
        if ( bResult != F_READY )
        {
                UiSetAndDispStr( 1, ROW_NO_ERR_MSG, "Disk Controller 1 not ready." );
                return( FALSE );
        }

        lcntTimeout = 500000;
        while ( lcntTimeout-- );

        for ( bDiskNo = DISK1; bDiskNo != N_DISK_PER_CTRL_MAX; bDiskNo++ )
        {
                StrCpy( gStr1,  " Configuring Disk " );
                PrintDec( gStr2, bDiskNo+1, 1, 1, 7 );
                StrCat( gStr1, gStr2 );
                UiDispStr( gStr1, 1, (UINT8) (bDiskNo+1) );

                /*
                 * Send cmd to set the maximum # of cylinders
                 */

                if( TxDiskMsgWord( 0,(UINT8) bDiskNo,
                                I_DISK_N_CYL_MAX, N_CYL_PER_DISK ) != TRUE )
                        return( FALSE );
```

```
		if( TxDiskMsgByte( 0, (UINT8) bDiskNo,
				I_DISK_CMD, CMD_DISK_SET_CYL_LIMIT ) != TRUE )
			return( FALSE );
		do
		{
			if( RxDiskMsgByte( 0, (UINT8)bDiskNo,
				I_DISK_CMD, &bResult ) != TRUE )
			return( FALSE );
		}
		while ( bResult != CMD_DISK_NULL );

		StrCpy( gStr1,  "Max Cyl# Set: " );
		PrintDec( gStr2, N_CYL_PER_DISK, 4, 0, 9999 );
		StrCat( gStr1, gStr2 );
		UiDispStr( gStr1, 22, (UINT8) (bDiskNo+1) );

		lcntTimeout = 500000;
		while ( lcntTimeout-- );
	}

	UiDispStr( "Cylinder Limits Set for All Disks", 5, 8 );
	lcntTimeout = 500000;
	while ( lcntTimeout-- );
}


/*
 *-------------------------------------------------------------------------
 *  rintr.c     Copyright 1991 Accom Inc.
 *
 *      Responsible Person: Doug George
 *
 *  This file contains real time interrupt handling routines - serial tx & rx
 *-------------------------------------------------------------------------
 */

#include "rglobal.h"
#include "V53.h"
#include "rhw.h"
#include "rui.h"
#include "rcom.h"
SINT32  volatile                lcntTime;
UINT16  volatile                wcntFrameTime, wcntFieldTime, wcntFrameIntr;

static UINT8 volatile   bRtdIntr = INTR_ENA_RTD;


#define FP_SEG(fp)              ( *( (unsigned _far *) &(fp) + 1 ) )
#define FP_OFF(fp)              ( *( (unsigned _far *) &(fp) ) )

/*
 *  Interrupt handlers
 */
	void
IspNmi()
{
	start();
}

	void
IspTimer0()
{
	/*
	 * Increment the total system time
	 */
	lcntTime++;
	/*
	 * Increment the time this field
	 */
	wcntFieldTime++;
	/*
	 * Increment the time this field
	 */
	wcntFrameTime++;
```

```
#if 0           /* for test only */
        DebugToggle(1);
#endif          /* for test only */
        outp(V53_IIWEVEN, 0x60);
}


        void
IspTimer1()
{
#if 0           /* for test only */
        DebugToggle(2);
#endif          /* for test only */
        outp(V53_IIWEVEN, 0x62);
}


        void
IspField()
{
#if 0           /* for test only */
        DebugToggle(1);
#endif          /* for test only */

        /*
         * Reset the field time count
         */
        wcntFieldTime = 0;
        RtVertIntr();

#if 0           /* for test only */
        DebugToggle(4);
#endif          /* for test only */
        outp(V53_IIWEVEN, 0x64);
}


        void
IspFrame()
{
        ++wcntFrameIntr;
        /*
         * Reset the frame time count
         */
        wcntFrameTime = 0;

#if 0           /* for test only */
        DebugToggle(2);
#endif          /* for test only */
        outp(V53_IIWEVEN, 0x65);
}


        void
InitIntr()
{
        InstallVector(INTR_VECTOR_NMI,          (UINT32 far *) AuxNmi           );
        InstallVector(INTR_VECTOR_TIMER0,       (UINT32 far *) AuxTimer0        );
        InstallVector(INTR_VECTOR_TIMER1,       (UINT32 far *) AuxTimer1        );
        InstallVector(INTR_VECTOR_FIELD,        (UINT32 far *) AuxField );
        InstallVector(INTR_VECTOR_FRAME,        (UINT32 far *) AuxFrame );

        outp(V53_IIWEVEN,V_IIW_SINGLE | V_IIW_EDGE | V_IIW_COMMAND);
        outp(V53_IIWODD, BASE_VECTOR_ICU );
        outp(V53_IIWODD, bRtdIntr);
}


/*
 * !! Why don't we just put the whole thing in assembly
 */
        void
SetIntr( bIntr )
        UINT8 bIntr;
```

```
{
        OpcodeCli();
        outp(V53_IIWODD, bRtdIntr = bIntr );
        OpcodeSti();
}


        UINT8
GetIntr()
{
        return( bRtdIntr );
}

        void
InstallVector( vec, ptr )
        UINT16 vec;
        UINT32 far *ptr;
{
        UINT32 far *(far *tmp);

        FP_SEG(tmp) = 0;
        FP_OFF(tmp) = vec*4;

        *tmp = ptr;
}
/*
 * Timer0 is the interval timer interrupt source
 */
        void
InitTimer()
{
        outp(V53_TMD,V_TCT_INIT(0,V_TCT_RATEGEN));
        outp(V53_TCT0, (CNT_TIMER0 & 0xff) );
        outp(V53_TCT0, ((CNT_TIMER0 >> 8) & 0xff) );
#if 0           /* for test only */
        outp(V53_TMD,V_TCT_INIT(1,V_TCT_RATEGEN));
        outp(V53_TCT1, (CNT_TIMER1 & 0xff) );
        outp(V53_TCT1, ((CNT_TIMER1 >> 8) & 0xff) );
        outp(V53_TMD,V_TCT_INIT(2,V_TCT_SQUAREWAVE));
        outp(V53_TCT2, (CNT_TIMER0 & 0xff) );
        outp(V53_TCT2, ((CNT_TIMER0 >> 8) & 0xff) );
#else           /* for test only */
        outp(V53_TMD,V_TCT_INIT(1,V_TCT_RATEGEN));              /* make field rate */
        outp(V53_TCT1, (CNT_TIMER1 & 0xff) );
        outp(V53_TCT1, ((CNT_TIMER1 >> 8) & 0xff) );
        outp(V53_TMD,V_TCT_INIT(2,V_TCT_RATEGEN));              /* make frame rate */
        outp(V53_TCT2, (CNT_TIMER2 & 0xff) );
        outp(V53_TCT2, ((CNT_TIMER2 >> 8) & 0xff) );
#endif          /* for test only */
}


/*
 * Initialize all registers on the V53
 */
        void
InitV53()
{
        /* we must set up the expanded memory interrupt vector before we use it */
        InstallVector(INTR_VECTOR_MEMORY,       (UINT32 far *) XaRet    );

        /*
         * Set i/o to bytes
         */
        outp(V53_SCTL, V_SCTL_IOAG_BYTE);

        /*
         * Enable the interrupt controller and the timers
         */
        outp(V53_OPSEL,V_OPSEL_ICU | V_OPSEL_TCU );

        outp(V53_OPHA, V_OPHA_BASE);
        outp(V53_DULA, V_DULA_BASE);
        outp(V53_IULA, V_IULA_BASE);
        outp(V53_TULA, V_TULA_BASE);
```

```
outp(V53_SULA, V_SULA_BASE);
outp(V53_TCKS, V_TCKS_DIVIDE8 );

/*
 * Set wait states on RT2
 */
outp(V53_WAC,0);

/*
 * Set 16MB zones and 1MB zones
 */
outp(V53_WMB0,V_WMB0_EUMB_8MB | V_WMB0_ELMB_1MB);
outp(V53_WMB1,V_WMB1_UMB_256K | V_WMB1_LMB_256K);

/*
 *      The 0 Wait State times shown are derived from the
 *      following equation (from app note):
 *
 *       Memory Access Time = tCYK(2+N) - tDKA - tSDK *
 *
 *       Where:         tCYK = CPU Cycle Time
 *                      tDKA = Delay to Address Valid (40nS)
 *                      tSDK = Data Setup Time (7nS)
 *
 *      Each WAIT STATE which is added adds 1 CPU Cycle
 *
 *      13.5 MHz : 74.1 nS                    16.0 MHz : 62.5 nS
 *
 *      The V53 wait state timings are as follows:
 *
 *              13.5 MHz                          16.0 MHz
 *
 *             0 : 101 nS                          0 :  78 nS
 *             1 : 175 nS                          1 : 141 nS
 *             2 : 249 nS                          2 : 203 nS
 *             3 : 323 nS                          3 : 266 nS
 *             4 : 397 nS                          4 : 328 nS
 *             5 : 471 nS                          5 : 391 nS
 *             6 : 545 nS                          6 : 453 nS
 *             7 : 619 nS                          7 : 516 nS
 */


outp(V53_WCY0, V_WCY0_EUMW(2));                                      /* set 16MB
U     */
outp(V53_WCY1, V_WCY1_ELMW(2) | V_WCY1_EMMW(2) ); /* set 16MB L & M      */

outp(V53_WCY2, V_WCY2_LMW(0) | V_WCY2_MMW(1) );        /* set 1MB L & M      */
outp(V53_WCY3, V_WCY3_UMW(2) | V_WCY3_IOW(0) );        /* set 1MB H & I/O    */

outp(V53_WCY4, V_WCY4_RFW(2) | V_WCY4_DMAW(0));        /* set REFRESH& DMA   */

ExitExpanded();                                                       /* 
in norm mode */
/*
 * Initialize the expanded memory mapping tables
 */
outpw(V53_PGR1,         RT2_RAM_BASE);          /* RT2 RAM Page 0         */
outpw(V53_PGR2,         RT2_RAM_BASE+1);        /* RT2 RAM Page 1         */
outpw(V53_PGR3,         RT2_RAM_BASE+2);        /* RT2 RAM Page 2         */
outpw(V53_PGR4,         RT2_RAM_BASE+3);        /* RT2 RAM Page 3         */
outpw(V53_PGR5,         RT2_RAM_BASE+4);        /* RT2 RAM Page 4         */
outpw(V53_PGR6,         RT2_RAM_BASE+5);        /* RT2 RAM Page 5         */
outpw(V53_PGR7,         RT2_RAM_BASE+6);        /* RT2 RAM Page 6         */
outpw(V53_PGR8,         RT2_RAM_BASE+7);        /* RT2 RAM Page 7         */
outpw(V53_PGR9,         RT2_RAM_BASE+8);        /* RT2 RAM Page 8         */
outpw(V53_PGR10,        RT2_RAM_BASE+9);        /* RT2 RAM Page 9         */
outpw(V53_PGR11,        RT2_RAM_BASE+10);       /* RT2 RAM Page 10        */
outpw(V53_PGR12,        RT2_RAM_BASE+11);       /* RT2 RAM Page 11        */
outpw(V53_PGR13,        RT2_RAM_BASE+12);       /* RT2 RAM Page 12        */
outpw(V53_PGR14,        RT2_RAM_BASE+13);       /* RT2 RAM Page 13        */
outpw(V53_PGR15,        RT2_RAM_BASE+14);       /* RT2 RAM Page 14        */
outpw(V53_PGR16,        RT2_RAM_BASE+15);       /* RT2 RAM Page 15        */

/*
```

```
 * For non-RT2 addresses, use the SLOT # for base address
 */
	outpw(V53_PGR17, RT2_REG);			/* RT2 REGISTER Page */
	outpw(V53_PGR18, RT1_REG_SLOT);			/* RT1 REGISTER Page */
	outpw(V53_PGR19, RT3_REG_SLOT);			/* RT3 REGISTER Page */
	outpw(V53_PGR20, RT4_REG_SLOT);			/* RT4 REGISTER Page */
	outpw(V53_PGR21, RT2_COM0);			/* RT2 COMMUNICATION Page 0 */
	outpw(V53_PGR22, RT5_REG_SLOT);			/* RT5 REGISTER Page */
	outpw(V53_PGR23, RT2_COM1);			/* RT2 COMMUNICATION Page 1 */
	outpw(V53_PGR24, RT6_REG_SLOT);			/* RT6 REGISTER Page */
	outpw(V53_PGR25, RT2_EEPROM);			/* RT2 EEPROM Page */
	outpw(V53_PGR26, RT3_DISK_SLOT);		/* RT3 DISK CONTROL Page */
	outpw(V53_PGR27, RT2_ETHERNET);			/* RT2 EtherNet Page */
	outpw(V53_PGR28, RT5_DISK_SLOT);		/* RT5 DISK CONTROL Page */

	outpw(V53_PGR49, RT2_EPROM_BASE);		/* RT2 EPROM Page 0 */
	outpw(V53_PGR50, RT2_EPROM_BASE+1);		/* RT2 EPROM Page 1 */
	outpw(V53_PGR51, RT2_EPROM_BASE+2);		/* RT2 EPROM Page 2 */
	outpw(V53_PGR52, RT2_EPROM_BASE+3);		/* RT2 EPROM Page 3 */
	outpw(V53_PGR53, RT2_EPROM_BASE+4);		/* RT2 EPROM Page 4 */
	outpw(V53_PGR54, RT2_EPROM_BASE+5);		/* RT2 EPROM Page 5 */
	outpw(V53_PGR55, RT2_EPROM_BASE+6);		/* RT2 EPROM Page 6 */
	outpw(V53_PGR56, RT2_EPROM_BASE+7);		/* RT2 EPROM Page 7 */
	outpw(V53_PGR57, RT2_EPROM_BASE+8);		/* RT2 EPROM Page 8 */
	outpw(V53_PGR58, RT2_EPROM_BASE+9);	/* RT2 EPROM Page 9 */
	outpw(V53_PGR59, RT2_EPROM_BASE+10);	/* RT2 EPROM Page 10 */
	outpw(V53_PGR60, RT2_EPROM_BASE+11);	/* RT2 EPROM Page 11 */
	outpw(V53_PGR61, RT2_EPROM_BASE+12);	/* RT2 EPROM Page 12 */
	outpw(V53_PGR62, RT2_EPROM_BASE+13);	/* RT2 EPROM Page 13 */
	outpw(V53_PGR63, RT2_EPROM_BASE+14);	/* RT2 EPROM Page 14 */
	outpw(V53_PGR64, RT2_EPROM_BASE+15);	/* RT2 EPROM Page 15 */

	outpw(V53_PGR33, 0x02a4);			/* RT3 VRAM */
	outpw(V53_PGR34, 0x02a5);			/* RT3 VRAM */
	outpw(V53_PGR35, 0x02a6);			/* RT3 VRAM */
	outpw(V53_PGR36, 0x02a7);			/* RT3 VRAM */
	outpw(V53_PGR37, 0x0324);			/* RT5 VRAM */
	outpw(V53_PGR38, 0x0325);			/* RT5 VRAM */
	outpw(V53_PGR39, 0x0326);			/* RT5 VRAM */
	outpw(V53_PGR40, 0x0327);			/* RT5 VRAM */

	EnterExpanded();				/* now put into expanded
mode */
}


/*
 *-----------------------------------------------------------------------
 *  rlock.c      Copyright 1991 Accom Inc.
 *
 *      Responsible Person: Kevin Hsu
 *
 *      This file contains routines for record lockout list management.
 *-----------------------------------------------------------------------
 */
#include "rglobal.h"
#include "rui.h"
#include "rlock.h"
#include "rdisk.h"

/*
 * local FUNCTION PROTOTYPE declaration.
 */
static void MoveLockTableDown( void );
static void MoveLockTableUp( void );
static void DispLockTable( UINT8 );
static void     DispRecLockParameter( UINT8, UINT8 );

	void
ShowRecLock()
{
	DispRecLockParameter( bCurrLockNo, 4 );
}
```

```
        void
ScrollLockTable( bScrollDir )

        UINT8 bScrollDir;
{
        switch ( bScrollDir )
        {
                case SCROLL_DOWN:
                        MoveLockTableDown();
                        break;

                case SCROLL_UP:
                        MoveLockTableUp();
        }
}

        static void
MoveLockTableDown()
{
        if ( GetLockData( LOCK_NO, (UINT8) (bCurrLockNo + 1) ) != EOT )
        {
                bCurrLockNo++;
                fDontDispLock = FALSE;
        }
        else
                fDontDispLock = TRUE;
        DispLockTable( bCurrLockNo );
}

        static void
MoveLockTableUp()
{
        if ( bCurrLockNo > 0 )
                bCurrLockNo--;
        DispLockTable( bCurrLockNo );
}

        static void
DispLockTable( bCurrLockNo )
        UINT8   bCurrLockNo;
{
        DispRecLockParameter( bCurrLockNo, 4 );
        UiDispHighLight( HIGH_LIGHT_LOCK, 4 );

        if ( bCurrLockNo == 0 )
                UiClearSpecifiedLine( LINE_3 );
        else
                DispRecLockParameter( bCurrLockNo, 3 );

        if ( fDontDispLock == TRUE )
                UiClearSpecifiedLine( LINE_5 );
        else
                DispRecLockParameter( bCurrLockNo, 5 );
}

        static void
DispRecLockParameter( bCurrLockNo, bYPos )
        UINT8   bCurrLockNo;
        UINT8   bYPos;
{
        PrintDec( gStr1, (UINT16) GetLockData( LOCK_NO, bCurrLockNo ), 3, 0, 255 );
        UiDispStr( gStr1, 1, bYPos );
        UiDispFieldCntAsTc( (UINT16) GetLockData( LOCK_START, bCurrLockNo ), 6, bYPos, FALSE, FALSE
);
        UiDispFieldCntAsTc( (UINT16) GetLockData( LOCK_END, bCurrLockNo ), 15, bYPos, FALSE, FALSE
);
}


/*
```

```
*-----------------------------------------------------------------------
*  rmacro.c     Copyright 1991 Accom Inc.
*
*       Responsible Person: Kevin Hsu
*
*       This file contains routines for macro management.
*-----------------------------------------------------------------------
*/
#include "rglobal.h"
#include "rui.h"
#include "rmacro.h"

#if 1
#define EEPROM_DEBUG                    TRUE
#else
#define EEPROM_DEBUG                    FALSE
#endif
#if 1
#define MACRO_DEBUG                     TRUE
#else
#define MACRO_DEBUG                     FALSE
#endif

/*
 * local FUNCTION PROTOTYPE declaration.
 */
void    ShowDebug1( void );
void    ShowDebugRecMacro( void );
static void     MoveListsDown( void );
static void MoveListsUp( void );
static void DispLists( void );
static void DispEachList( UINT8, UINT8 );

        void
ClearMacros()
{
        UINT8 i, j;

        for ( i = 0 ; i < TOTAL_EVENTS ; i++ )
        {
                rsMacro[ bCurrMacroListNo-1 ][i].wSequenceNo = 0;
                rsMacro[ bCurrMacroListNo-1 ][i].cPrefix = NULL;
                for ( j = 0 ; j < 4 ; j++ )
                        rsMacro[ bCurrMacroListNo-1 ][i].uData.sEncoder.rbCount[j] = 0;
                rsMacro[ bCurrMacroListNo-1 ][i].uData.sEncoder.lTicksLapse = 0L;
        }
        grwTotalEvents[ bCurrMacroListNo-1 ] = 0;
        gwMacroNo = 0;
        gwMacroTotalNo = 0;
        RecMacroResetEncoder();
}

        void
InitMacros()
{
        if ( grwTotalEvents[0] )
                gwMacroTotalNo = grwTotalEvents[0];
}


        void
MacroDelay( bWhichDelay )
        UINT8   bWhichDelay;
{
        UINT32  lFirstTick;
        UINT16  wDelay;
        switch ( bWhichDelay )
        {
                case CURRENT:
                        wDelay    =    rsMacro[    bCurrMacroListNo-1    ][    gwMacroNo-1
].uData.sButton.wMacroDelay;
                        break;

                default:
                        wDelay = bWhichDelay;
```

```
                        break;
        }

#if 0
        PrintDec( gStr1, wDelay, 4, 0, 32767 );;;;;
        UiDispStr( gStr1, 1, 4 );;;;;
#endif

        lFirstTick = GetTicks();
        while ( GetTicks() - lFirstTick < wDelay );

#if 0
        UiDispStr( "      ", 1, 4 );;;;;
#endif
}

        void
RecUserInput( psEvent )
        MAIN_EVENT      *psEvent;
{
        BUTTON_ID eButtonID;

        switch ( psEvent->eType )
        {
                case BUTTONDOWN_EVENT:
                        eButtonID = GetButtonID( psEvent->uData.sButtonDown.rbButtonId );
                        switch( eButtonID )
                        {
                                case STEP_FWD:
                                case STEP_REV:
                                        rsMacro[    bCurrMacroListNo-1    ][    gwMacroNo
].uData.sButton.wMacroDelay =
                                                        2 * MACRO_DELAY;
                                        break;

                                case PLAY_REV:
                                case PLAY_FWD:
                                        if ( gwMacroNo )
                                        {
                                                eButtonID = GetButtonID( rsMacro[ bCurrMacroListNo-1
][ gwMacroNo-1 ].uData.sButton.rbButtonID );
                                                switch ( eButtonID )
                                                {
                                                        case PLAY_REV:
                                                        case PLAY_FWD:
                                                                rsMacro[ bCurrMacroListNo-1 ][
gwMacroNo-1 ].uData.sButton.wMacroDelay =
                                                                                        ( UINT16 )(
GetTicks() - lMacroTimeLapse );
                                                                break;

                                                        default :
                                                                break;
                                                }
                                        }
                                        lMacroTimeLapse = GetTicks();
                                        gfRecMacroTimeLapse = TRUE;
                                        break;
                                case STOP:
                                        if ( gfRecMacroTimeLapse == TRUE )
                                        {
                                                rsMacro[  bCurrMacroListNo-1  ][  gwMacroNo-1
].uData.sButton.wMacroDelay =
                                                        ( UINT16 )( GetTicks() - lMacroTimeLapse
);
                                                gfRecMacroTimeLapse = FALSE;
                                        }
                                        rsMacro[    bCurrMacroListNo-1    ][    gwMacroNo
].uData.sButton.wMacroDelay = MACRO_DELAY;
                                        break;

                                default :
                                        if ( gfRecMacroTimeLapse == TRUE )
                                                return;
                                        rsMacro[    bCurrMacroListNo-1    ][    gwMacroNo
```

```
].uData.sButton.wMacroDelay = MACRO_DELAY;
                                        break;
                        }
                        rsMacro[ bCurrMacroListNo-1 ][ gwMacroNo ].cPrefix = BUTTONDOWN_CHAR;
                        rsMacro[ bCurrMacroListNo-1 ][ gwMacroNo ].uData.sButton.rbButtonID[0]
=
                                psEvent->uData.sButtonDown.rbButtonId[0];
                        rsMacro[ bCurrMacroListNo-1 ][ gwMacroNo ].uData.sButton.rbButtonID[1]
=
                                psEvent->uData.sButtonDown.rbButtonId[1];
                        break;

                case ENCODER_EVENT:
                        rsMacro[ bCurrMacroListNo-1 ][ gwMacroNo ].cPrefix = ENCODER_CHAR;
                        rsMacro[ bCurrMacroListNo-1 ][ gwMacroNo ].uData.sEncoder.rbCount[0] =
                                psEvent->uData.sEncoder.rbData[0];
                        rsMacro[ bCurrMacroListNo-1 ][ gwMacroNo ].uData.sEncoder.rbCount[1] =
                                psEvent->uData.sEncoder.rbData[1];
                        rsMacro[ bCurrMacroListNo-1 ][ gwMacroNo ].uData.sEncoder.rbCount[2] =
                                psEvent->uData.sEncoder.rbData[2];
                        rsMacro[ bCurrMacroListNo-1 ][ gwMacroNo ].uData.sEncoder.rbCount[3] =
                                psEvent->uData.sEncoder.rbData[3];
                        rsMacro[ bCurrMacroListNo-1 ][ gwMacroNo ].uData.sEncoder.lTicksLapse
= glTicksLapse;
                        rsMacro[ bCurrMacroListNo-1 ][ gwMacroNo ].uData.sEncoder.wcntEvents =
wcntEvents;
#if MACRO_DEBUG
PrintDec( gStr1, (SINT16) wcntEvents, 4, 0, 32767 );;;;;
UiDispStr( gStr1, 31, 6 );;;;;
ShowDebugRecMacro();;;;;
#endif
                        wcntEvents = 0;
        }
        rsMacro[ bCurrMacroListNo-1 ][ gwMacroNo ].wSequenceNo = gwMacroNo + 1;
        if ( gwMacroNo >= TOTAL_EVENTS-1 )
                gwMacroNo = TOTAL_EVENTS-1;
        else
                gwMacroNo++;
}

        void
LoadMacroInMsgPacket()
{
        BUTTON_ID eButtonID;
        UINT16  wPulseCount1 = 0;
        UINT16  wPulseCount2 = 0;

        switch ( rsMacro[ bCurrMacroListNo-1 ][ gwMacroNo ].cPrefix )
        {
                case BUTTONDOWN_CHAR:
                        rcMacroBtnMsgPacket[1] = rsMacro[ bCurrMacroListNo-1 ][ gwMacroNo ].cPrefix;
                        rcMacroBtnMsgPacket[2] = rsMacro[ bCurrMacroListNo-1 ][ gwMacroNo
].uData.sButton.rbButtonID[0];
                        rcMacroBtnMsgPacket[3] = rsMacro[ bCurrMacroListNo-1 ][ gwMacroNo
].uData.sButton.rbButtonID[1];
                        eButtonID = GetButtonID( rsMacro[ bCurrMacroListNo-1 ][ gwMacroNo
].uData.sButton.rbButtonID );
                        switch( eButtonID )
                        {
                                case PLAY_FWD:
                                case PLAY_REV:
                                        glPlayTime = rsMacro[ bCurrMacroListNo-1 ][ gwMacroNo
].uData.sButton.wMacroDelay;
                                        glPlayFirstTicks = GetTicks();
                                        gfMacroPlay = TRUE;
                                        break;

                                case RECORD:
                                        eButtonID = GetButtonID( rsMacro[ bCurrMacroListNo-1 ][
gwMacroNo+1 ].uData.sButton.rbButtonID );
                                        switch ( eButtonID )
                                        {
                                                case PLAY_FWD:
                                                case PLAY_REV:
```

```
                                                gfMacroRec = TRUE;
                                                break;
                                        }
                                        break;

                                default :
                                        gfMacroPlay = FALSE;
                                        break;
                        }
                        RxOneMsgCp( rcMacroBtnMsgPacket );
                        rcMacroBtnMsgPacket[1] = BUTTONUP_CHAR;
                        rcMacroBtnMsgPacket[2] = rsMacro[ bCurrMacroListNo-1 ][ gwMacroNo
].uData.sButton.rbButtonID[0];
                        rcMacroBtnMsgPacket[3] = rsMacro[ bCurrMacroListNo-1 ][ gwMacroNo
].uData.sButton.rbButtonID[1];
                        RxOneMsgCp( rcMacroBtnMsgPacket );
                        gfLoadMacro = FALSE;
                        break;

                case ENCODER_CHAR:
#if MACRO_DEBUG
PrintDec( gStr1, (SINT16) gwMacroNo, 2, 0, 32767 );;;;;
UiDispStr( gStr1, 1, 8 );;;;;
PrintDec( gStr1, (SINT16) gwMacroTotalNo, 2, 0, 32767 );;;;;
UiDispStr( gStr1, 10, 8 );;;;;
#endif
                        if ( gwMacroNo == gwMacroTotalNo )
                        {
                                gfLoadMacro = FALSE;
                                gfEndMacro = TRUE;
                                break;
                        }
                        if ( rsMacro[ bCurrMacroListNo-1 ][ gwMacroNo+1 ].cPrefix == BUTTONDOWN_CHAR
)
                                break;

                        rcMacroKnobMsgPacket[1] = rsMacro[ bCurrMacroListNo-1 ][ gwMacroNo
].cPrefix;
                        /*
                         * encoder ID is '0' by default for RTD
                         * rcMacroKnobMsgPacket[2] = '0'
                         */
                        if ( rsMacro[ bCurrMacroListNo-1 ][ gwMacroNo ].uData.sEncoder.lTicksLapse
== 0 )
                        {
                                rcMacroKnobMsgPacket[3] = rsMacro[ bCurrMacroListNo-1 ][ gwMacroNo
].uData.sEncoder.rbCount[0];
                                rcMacroKnobMsgPacket[4] = rsMacro[ bCurrMacroListNo-1 ][ gwMacroNo
].uData.sEncoder.rbCount[1];
                                rcMacroKnobMsgPacket[5] = rsMacro[ bCurrMacroListNo-1 ][ gwMacroNo
].uData.sEncoder.rbCount[2];
                                rcMacroKnobMsgPacket[6] = rsMacro[ bCurrMacroListNo-1 ][ gwMacroNo
].uData.sEncoder.rbCount[3];
                        }
#if RTD
                        wPulseCount1 = GetEncoderVal( rsMacro[ bCurrMacroListNo-1 ][ gwMacroNo
].uData.sEncoder.rbCount );
                        wPulseCount2 = GetEncoderVal( rsMacro[ bCurrMacroListNo-1 ][ gwMacroNo+1
].uData.sEncoder.rbCount );
#endif


                        gwDeltaPulse = (SINT16)( wPulseCount2 - wPulseCount1 ) /
                                (SINT16)( rsMacro[ bCurrMacroListNo-1 ][ gwMacroNo+1
].uData.sEncoder.wcntEvents );
                        wRemainPulse = (SINT16)( wPulseCount2 - wPulseCount1 ) %
                                (SINT16)( rsMacro[ bCurrMacroListNo-1 ][ gwMacroNo+1
].uData.sEncoder.wcntEvents );
                        wDeltaTick = 1 + (UINT16)( rsMacro[ bCurrMacroListNo-1 ][ gwMacroNo+1
].uData.sEncoder.lTicksLapse )
                                / (UINT16)( rsMacro[ bCurrMacroListNo-1 ][ gwMacroNo+1
].uData.sEncoder.wcntEvents - 1 );
                        wRemainEvent = 1 + (UINT16)( rsMacro[ bCurrMacroListNo-1 ][ gwMacroNo+1
```

```
].uData.sEncoder.lTicksLapse )
                                % (UINT16)( rsMacro[ bCurrMacroListNo-1 ][ gwMacroNo+1
].uData.sEncoder.wcntEvents - 1 );
#if MACRO_DEBUG
PrintDec( gStr1, (SINT16) ( wPulseCount2 - wPulseCount1 ), 6, -32767, 32767 );;;;;
UiDispStr( gStr1, 1, 7 );;;;;
PrintDec( gStr1, (SINT16) rsMacro[ bCurrMacroListNo-1 ][ gwMacroNo+1 ].uData.sEncoder.lTicksLapse,
4, 0, 32767 );;;;;
UiDispStr( gStr1, 10, 7 );;;;;
PrintDec( gStr1, (SINT16) rsMacro[ bCurrMacroListNo-1 ][ gwMacroNo+1 ].uData.sEncoder.wcntEvents,
4, 0, 32767 );;;;;
UiDispStr( gStr1, 20, 7 );;;;;
#endif
                        gfLoadMacroForEncoder = TRUE;
                        ZeroEncoders();
                        lFirstTick = GetTicks();
                        RxOneMsgCp( rcMacroKnobMsgPacket );
                        wcntEvents = 1;

                        /* keep gfLoadMacro == TRUE */
                        break;
        }
        gwMacroNo++;
}


        void
LoadMacroInMsgPacketForEncoder()
{
        UINT16  wCurrTick;

        wcntEvents++;
        wCurrTick =( UINT16 )( GetTicks() - lFirstTick );
        if ( wcntEvents == wRemainEvent )
                wDeltaTick--;

        if (( wCurrTick >= wDeltaTick ) && (( wCurrTick % wDeltaTick ) == 0 ))
                RxOneMsgCp( rcMacroKnobMsgPacket );
        if  (  wCurrTick  >=  (  UINT16  )rsMacro[  bCurrMacroListNo-1  ][  gwMacroNo
].uData.sEncoder.lTicksLapse )
        {
                gwDeltaPulse = wRemainPulse;
                RxOneMsgCp( rcMacroKnobMsgPacket );
                gfLoadMacroForEncoder = FALSE;
        }

#if MACRO_DEBUG

PrintDec( gStr1, gwMacroNo, 2, 0, 32767 );;;;;
UiDispStr( gStr1, 31, 6 );;;;;
PrintDec( gStr1, gwMacroTotalNo, 2, 0, 32767 );;;;;
UiDispStr( gStr1, 36, 6 );;;;;
ShowDebugRunMacro();;;;;

#endif
}

        void
LoadStopMacro()
{
        rcMacroBtnMsgPacket[1] = 'K';
        rcMacroBtnMsgPacket[2] = '1';
        rcMacroBtnMsgPacket[3] = 'F';
        RxOneMsgCp( rcMacroBtnMsgPacket );
        rcMacroBtnMsgPacket[1] = 'U';
        RxOneMsgCp( rcMacroBtnMsgPacket );
}

        void
ResumeMacroPlay()
{
        gwMacroNo -= 1;
        rcMacroBtnMsgPacket[1] = 'K';
        rcMacroBtnMsgPacket[2]   =   rsMacro[   bCurrMacroListNo-1   ][   gwMacroNo
].uData.sButton.rbButtonID[0];
```

```
        rcMacroBtnMsgPacket[3]    =    rsMacro[   bCurrMacroListNo-1   ][   gwMacroNo
].uData.sButton.rbButtonID[1];
        RxOneMsgCp( rcMacroBtnMsgPacket );
        rcMacroBtnMsgPacket[1] = 'U';
        RxOneMsgCp( rcMacroBtnMsgPacket );
        gwMacroNo += 1;
}

/*
 *      Encoder entry capture and rerun routines.
 *
 */
        void
RecMacroResetEncoder()
{
        glCurrTicks = 0L;
        glLastTicks = 0L;
        glTicksLapse = 0L;
        gwCurrPulseCnt = 0;
        lFirstTick = 0L;
        wDeltaTick = 1;
        gfEncoderEntry = FALSE;
        gfFwdFirst = TRUE;
        gfRevFirst = TRUE;
        gfDirChanged = FALSE;
        gfShortIdle = FALSE;
        gfLoadMacroForEncoder = FALSE;
}

        void
WriteMacroTotalNo()
{
        grwTotalEvents[ bCurrMacroListNo-1 ] = gwMacroTotalNo;
}


/*
 *      This routine resides at DoPeriodicTasks() in RMAIN.C by RECORD and PLAY when
 *  the action is complete.
 */
        void
CheckMacroAfterPlayDone()
{
        if (( gfRecMacro == TRUE ) && ( gfRecMacroTimeLapse == TRUE ))
        {
                rsMacro[ bCurrMacroListNo-1 ][ gwMacroNo-1 ].uData.sButton.wMacroDelay =
                        ( UINT16 )( GetTicks() - lMacroTimeLapse );
                gfRecMacroTimeLapse = FALSE;
        }
}


        void
CountEventsForKnobMacro( psEvent )
        MAIN_EVENT      *psEvent;
{
        wcntEvents++;
        gsMacroKnobMsgPacket.eType = psEvent->eType;
        gsMacroKnobMsgPacket.uData.sEncoder.rbData[0] = psEvent->uData.sEncoder.rbData[0];
        gsMacroKnobMsgPacket.uData.sEncoder.rbData[1] = psEvent->uData.sEncoder.rbData[1];
        gsMacroKnobMsgPacket.uData.sEncoder.rbData[2] = psEvent->uData.sEncoder.rbData[2];
        gsMacroKnobMsgPacket.uData.sEncoder.rbData[3] = psEvent->uData.sEncoder.rbData[3];
}


        void
CheckMacrobeforeKeyDownProcess( psEvent )
        MAIN_EVENT      *psEvent;
{
        BUTTON_ID eButtonID;

        if ( gfRecMacro == TRUE )
        {
                if ( gfEncoderEntry == TRUE )
                {
```

```
                if ( rsMacro[ bCurrMacroListNo-1 ][ gwMacroNo-1 ].cPrefix == ENCODER_CHAR
)
                {
                        glLastTicks = glCurrTicks;
                        glCurrTicks = GetTicks();
                        glIdleTicks = glCurrTicks - glIdleTicks;
                        glTicksLapse = glCurrTicks - glLastTicks - glIdleTicks;
                        gwMacroNo -= 1;
                        RecUserInput( &gsMacroKnobMsgPacket );
                        gwMacroNo += 1;
                        glLastTicks = 0L;
                        RecMacroResetEncoder();
                        gfEncoderEntry = FALSE;
                        gfShortIdle = FALSE;
                }
        }
        eButtonID = GetButtonID( psEvent->uData.sButtonDown.rbButtonId );
        switch ( eButtonID )
        {
                case MACRO:
                        break;

                default:
                        RecUserInput( psEvent );
                        break;
        }
    }
}

    void
CheckRunMacroAfterKeyDnProcess()
{
    if ( gfRecMacro == TRUE )
    {
        if ( gwMacroNo == 1 )
        {
            if ( geButton != gsUiState.eCurrMode )
                gfNotMenuButton = TRUE;
        }
        UiDispStr( "[Macro Capture]", 1, MACRO_LINE );
    }

    if (( gfRunMacro == TRUE ) && ( gwMacroNo != 0 ))
    {
        if ( gfPauseMacro == TRUE )
        {
            UiDispStr( "[Macro Pause]  ", 1, MACRO_LINE );
            gfLoadMacro = FALSE;
        }
        else
        {
            UiDispStr( "[Macro Run]    ", 1, MACRO_LINE );
            switch ( geButton )
            {
                case SOFT2:
                case PLAY_REV:
                case PLAY_FWD:
                    break;

                case RECORD:
                    if ( gwMacroNo == gwMacroTotalNo )
                    {
                        gfLoadMacro = FALSE;
                        gfEndMacro = TRUE;
                        break;
                    }
                    else if ( gfMacroRec == TRUE )
                    {
                        gfLoadMacro = TRUE;
                        gfMacroRec = FALSE;
                        break;
                    }

                default:
```

```
                                        MacroDelay( CURRENT );
                                        if ( gwMacroNo == gwMacroTotalNo )
                                        {
                                                gfLoadMacro = FALSE;
                                                gfEndMacro = TRUE;
                                        }
                                        else
                                                gfLoadMacro = TRUE;
                                        break;
                        }
                }
        }
}
        void
CheckMacroForEncoder()
{
        if ( gfRecMacro == TRUE )
                glIdleTicks = GetTicks();

        if (( gfRunMacro == TRUE ) && ( gwMacroNo != 0 ))
        {
                if ( gfPauseMacro == TRUE )
                {
                        UiDispStr( "[Macro Pause]  ", 1, MACRO_LINE );
                        gfLoadMacro = FALSE;
                }
                else
                {
                        UiDispStr( "[Macro Run]    ", 1, MACRO_LINE );
                        if ( gwMacroNo == gwMacroTotalNo )
                        {
                                gfLoadMacro = FALSE;
                                gfEndMacro = TRUE;
                        }
                        else
                                gfLoadMacro = TRUE;
                }
        }
}


        void
CheckRunMacroAfterEachEvent()
{
        if (( gfRunMacro == TRUE ) && ( gwMacroNo != 0 ))
        {
                switch ( geButton )
                {
                        case PLAY_REV:
                        case PLAY_FWD:
                                if ( GetTicks() - glPlayFirstTicks > glPlayTime )
                                {
                                        if ( gwMacroNo == gwMacroTotalNo )
                                        {
                                                gfLoadMacro = FALSE;
                                                gfEndMacro = TRUE;
                                        }
                                        else
                                                gfLoadMacro = TRUE;
                                }
                                break;
                }

                /* Terminate the MACRO Run operation */
                if ( gfEndMacro == TRUE )
                {
                        UiDispStr( "               ", 1, MACRO_LINE );
                        UiSetLed( MACRO_LED, OFF );
                        gwMacroNo = 0;
                        gfRunMacro = FALSE;
                        gfEndMacro = FALSE;
                }
        }
}
```

```
        void
DeleteMacroStep()
{
}

        void
CopyMacroStep()
{
}

        void
InsertMacroStep()
{
}

        void
ScrollMacroLists( bScrollDir )
        UINT8 bScrollDir;
{
        switch ( bScrollDir )
        {
                case SCROLL_DOWN:
                        MoveListsDown();
                        break;

                case SCROLL_UP:
                        MoveListsUp();
                        break;
        }
        if ( grwTotalEvents[ bCurrMacroListNo-1 ] )
                gwMacroTotalNo = grwTotalEvents[ bCurrMacroListNo-1 ];
        else
                gwMacroTotalNo = 0;
}

        void
ShowMacroLists()
{
#if RTD
        UiDispHighLight( HIGH_LIGHT_ALL, 4 );
#endif
        DispLists();
}


        static void
MoveListsDown()
{
        if ( bCurrMacroListNo < TOTAL_MACROS )
                bCurrMacroListNo++;
        DispLists();
}

        static void
MoveListsUp()
{
        if ( bCurrMacroListNo > 1 )
                bCurrMacroListNo--;
        DispLists();
}

        static void
DispLists()
{
        DispEachList( bCurrMacroListNo, 4 );
        if ( bCurrMacroListNo - 1 >= 1 )
                DispEachList( (UINT8) (bCurrMacroListNo - 1), 3 );
        else
                UiClearSpecifiedLine( LINE_3 );
        if ( bCurrMacroListNo + 1 <= TOTAL_MACROS )
                DispEachList( (UINT8) (bCurrMacroListNo + 1), 5 );
        else
```

```
                UiClearSpecifiedLine( LINE_5 );
}

        static void
DispEachList( bListNo, bYPos )
        UINT8   bListNo;
        UINT8   bYPos;
{
        PrintDec( gStr1, bListNo, 1, 0, 9 );
        UiDispStr( gStr1, 2, bYPos );
        PrintDec( gStr1, grwTotalEvents[ bListNo-1 ], 3, 0, 200 );
        UiDispStr( gStr1, 14, bYPos );
}


/*
 *      Debug display routines
 */
        void
ShowDebugRunMacro()
{
        UINT16          wMacroNo = gwMacroNo;

        UiDispStr( "                ", 1, 6 );
        PrintDec( gStr1, wMacroNo, 3, 0, 32767 );;;;;
        UiDispStr( gStr1, 1, 6 );;;;;
#if 1
        if ( wMacroNo )
                wMacroNo -= 1;
#endif
        PrintDec( gStr1, rsMacro[ bCurrMacroListNo-1 ][ wMacroNo ].wSequenceNo, 3, 0, 32767 );;;;;
        UiDispStr( gStr1, 5, 6 );;;;;
        PrintDec( gStr1, rsMacro[ bCurrMacroListNo-1 ][ wMacroNo+1 ].wSequenceNo, 3, 0, 32767 );;;;;
        UiDispStr( gStr1, 5, 5 );;;;;
        disp[0] = rsMacro[ bCurrMacroListNo-1 ][ wMacroNo ].cPrefix;
        UiDispStr( disp, 9, 6 );;;;;
#if 1
        PrintDec(    gStr1,    (SINT16)rsMacro[    bCurrMacroListNo-1    ][    gwMacroNo
].uData.sEncoder.lTicksLapse, 5, 0, 32767 );;;;;
        UiDispStr( gStr1, 11, 6 );;;;;
        PrintDec(    gStr1,    (SINT16)rsMacro[    bCurrMacroListNo-1    ][    gwMacroNo+1
].uData.sEncoder.lTicksLapse, 5, 0, 32767 );;;;;
        UiDispStr( gStr1, 11, 5 );;;;;
#else
        PrintDec( gStr1, rsMacro[ bCurrMacroListNo-1 ][ wMacroNo ].uData.sButton.rbButtonID[0],
2, 0, 32767 );;;;;
        UiDispStr( gStr1, 11, 6 );;;;;
        PrintDec( gStr1, rsMacro[ bCurrMacroListNo-1 ][ wMacroNo ].uData.sButton.rbButtonID[1],
2, 0, 32767 );;;;;
        UiDispStr( gStr1, 14, 6 );;;;;
        PrintDec( gStr1, rsMacro[ bCurrMacroListNo-1 ][ wMacroNo ].uData.sButton.wMacroDelay, 4,
0, 32767 );;;;;
        UiDispStr( gStr1, 17, 6 );;;;;
#endif
}


        void
ShowDebugRecMacro()
{
        UINT16          wMacroNo = gwMacroNo;

        UiDispStr( "                ", 1, 6 );
        PrintDec( gStr1, wMacroNo, 3, 0, 32767 );;;;;
        UiDispStr( gStr1, 1, 6 );;;;;
#if 1
        if ( wMacroNo )

                wMacroNo -= 1;
#endif
        PrintDec( gStr1, rsMacro[ bCurrMacroListNo-1 ][ wMacroNo ].wSequenceNo, 3, 0, 32767 );;;;;
        UiDispStr( gStr1, 5, 6 );;;;;
        disp[0] = rsMacro[ bCurrMacroListNo-1 ][ wMacroNo ].cPrefix;
        UiDispStr( disp, 9, 6 );;;;;
```

```
#if 1
        PrintDec(    gStr1,    (SINT16)rsMacro[    bCurrMacroListNo-1    ][    gwMacroNo
].uData.sEncoder.lTicksLapse, 5, 0, 32767 );;;;;
        UiDispStr( gStr1, 11, 6 );;;;;
#else
        PrintDec( gStr1, rsMacro[ bCurrMacroListNo-1 ][ wMacroNo ].uData.sButton.rbButtonID[0],
2, 0, 32767 );;;;;
        UiDispStr( gStr1, 11, 6 );;;;;
        PrintDec( gStr1, rsMacro[ bCurrMacroListNo-1 ][ wMacroNo ].uData.sButton.rbButtonID[1],
2, 0, 32767 );;;;;
        UiDispStr( gStr1, 14, 6 );;;;;
        PrintDec( gStr1, rsMacro[ bCurrMacroListNo-1 ][ wMacroNo ].uData.sButton.wMacroDelay, 4,
0, 32767 );;;;;
        UiDispStr( gStr1, 17, 6 );;;;;
#endif
}


        void
ShowDebug1()
{
        UINT16  wMacroNo = 0;
        UINT32 iM = 0;


        PrintDec( gStr1, gwMacroTotalNo, 3, 0, 32767 );;;;;
        UiDispStr( gStr1, 17, 6 );;;;;
        while ( wMacroNo <= gwMacroNo )
        {
                PrintDec( gStr1, wMacroNo, 3, 0, 32767 );;;;;
                UiDispStr( gStr1, 21, 6 );;;;;
                PrintDec( gStr1, rsMacro[ bCurrMacroListNo-1 ][ wMacroNo ].wSequenceNo, 3, 0, 32767
);;;;;
                UiDispStr( gStr1, 25, 6 );;;;;
                disp[0] = rsMacro[ bCurrMacroListNo-1 ][ wMacroNo ].cPrefix;
                UiDispStr( disp, 29, 6 );;;;;
                PrintDec(    gStr1,    (SINT16)rsMacro[    bCurrMacroListNo-1    ][    wMacroNo
].uData.sEncoder.lTicksLapse, 5, 0, 32767 );;;;;
                UiDispStr( gStr1, 31, 6 );;;;;
                while ( iM++ < 1000000 );;;;;
                iM = 0;;;;;
                wMacroNo++;
        }
}


/*
 *-----------------------------------------------------------------------
 *  rmain.c     Copyright 1991 Accom Inc.
 *
 *      Responsible Person: Kevin Hsu
 *
 *      main() is the entry point of our code after the "LOCATE" pgm
 *                              does it system initialization.
 *-----------------------------------------------------------------------
 */
#include "rglobal.h"
#include "rui.h"
#include "rtime.h"
#include "rdisk.h"

/*
 * Please put local FUNCTION PROTOTYPE here.
 */
static void UiMain( void );

#if RTD         /* real hardware code */
#include "rhw.h"
#include "rcom.h"

        void
main()
{
        extern  HARD_KEY        sNorm;
```

```
        OpcodeCli();

        InitV53();
        InitTimer();
        InitIntr();
        InitHw();
        InitCom();

#if     1       /* jeff - For Temp testing, before UI is ready */
        SetupComAmpex( COM2 );
#endif  /* jeff */

        OpcodeSti();

                /* keep these in order */
        InitGlobalVar();
        InitEventQueue();
        InitCP();                                       /* initialize the control panel
*/
        TestSysConfig();                        /* test the system configuration */
        OpcodeCli();                            /* turn off interrupts; not sure if
necessary */
        InitFs();                                       /* Init the frame stores */
        OpcodeSti();                            /* turn on interrupts */
        WaitTopOfFrame();
        WaitTopOfFrame();
        BlankOutput(OFF, OFF);                  video */
#if     1       /* jeff !!! TEMP        */
#if !DEBUG
#if 0
        SetDiskCylLimits();                     /* set the disk cylinder limits */
#endif
        InitDisks();                            /* spin up the disks */

#endif

        HiReadMem();                            /* read segment lists from eeprom */
        gpsCurrHardKey = NIL;

        geButton = NORM;
        StartProcess( &sNorm );

        UiSetupNewLed( BYPASS_LED );    /* frame store is in bypass */
        UiSetLed( STOP_LED, ON );           /* disk is inactive, turn on STOP Led */

        UiMain();                                       /* now go to main operating loop
*/
#else   /* jeff !!! TEMP        */
#if !DEBUG
#if 0
        SetDiskCylLimits();                     /* set the disk cylinder limits */
#endif
        InitFrameStores();                      /* init the frame stores */

        if( Format() != TRUE )
                return;
#endif
#endif  /* jeff !!! TEMP        */
}

#else   /* do simulation */

#include <graph.h>
#include "hsimu.h"
#include "hcpevent.h"
#include "hdisplay.h"
#include "hdrawing.h"
#include "hbuttons.h"

extern void InitDisplay();

        void
main()
{
```

```
        extern  HARD_KEY        sNorm;

        InitDisplay();
        SetTextWidthHeightNDC( BUTTON_TEXT_WIDTH, BUTTON_TEXT_HEIGHT );
        DrawButtonArray();
        SetTextWidthHeightNDC( DISPLAY_CHAR_WIDTH, DISPLAY_CHAR_HEIGHT );
        DrawDisplay();

                /* keep these in order */
        InitGlobalVar();
        InitEventQueue();
        gpsCurrHardKey = NIL;
        geButton = NORM;
        StartProcess( &sNorm );

        while ( CPEventLoop() )
                UiMain();

        _setvideomode( _DEFAULTMODE );
}

#endif /* RTD */

/*
 *      UiMain
 *
 *      This routine is the entry point for user    erface.
 *      The data in the serial port queues wi       moved and events are put
 *      into an event queue. These events ar        removed from the event queue
 *      and the appropriate process is invo         sponse.
 *
 */
        static void
UiMain()
{
#if RTD         /* real hardware code */
        while ( TRUE )
        {
                DoPeriodicTasks();                      /* check the com port queue */
                CheckForEvents();                       /* check the event queue     */
        }
#else   /* simulator code */
        CheckForEvents();                               /* check the event queue     */
#endif /* RTD */
}

#if RTD

/*
 *      DoPeriodicTasks
 */
        void
DoPeriodicTasks()
{
        static UINT16   wcntLoop;
        TC                              tcRecStart;
        TC                              tcPlayStart;
        UINT16                  wfcRecDurReal;

        /*
         * Receive message from control panel.
         * !! Maybe we should put all receive and transmit in real-time
         */
        RxMsgCp();

        /*
         * To check upon the duration of successive pressing on key, once
         * the following is within the allowable duration, then to swap different
         * key mode.
         */
        CheckSecondPress();

        HiWriteMem();                                   /* update the EEPROM memory */

#if 0           /* not implemented yet */
```

```
        switch ( wcntLoop & 0xf )
        {
                case 0:
                        CheckWarnings();
                        break;

                case 8:
                        AutoStandard();
                        break;
        }
#endif

        /* toggle the LED on/off to signify li   */
        switch ( wcntLoop )
        {
                case 0x1000:
                        LedToggle(OFF);
                        break;

                case 0x2000:
                        LedToggle(ON);
                        wcntLoop = 0;
                        break;

                case 0x3000:
                        TestIfDisksAreLocked();
                        break;
        }
        ++wcntLoop;

        if( ( gfRecClosed == FALSE ) &&
                ( ( gwRt3State & RT3_DISK_STATE ) != RT3_RECORDING ) )
        {
                CloseRec( 0 );
                gfRecClosed             = TRUE;
                UiSetupNewLed( STOP_LED );
                /*
                 * !! I think we don't need to open up a default play info table
                 * in CloseRec() now. Since at end of RtRecord(), it freeze on Fs1 or
                 * Fs2, output monitor will show freeze automatically.
                 * Previous version flashes at end of record is a bug.
                 *  -- Jeff.
                 */

                /*
                 * MACRO operation.
                 */
                CheckMacroAfterPlayDone();

        }
        if( ( gfPlayClosed == FALSE ) &&
                ( ( gwRt3State & RT3_DISK_STATE ) != RT3_PLAYING ) )
        {
                if( !grfLedStatus[SHUTTLE_LED] )
                {
                        /*
                         * If it is normal play end and loop mode
                         * need to set up sPlayInfo and play again.
                         * PingPong mode won't get here because it won't get out of rt.
                         */
                        if ( !gfPlayAborted && !grfLedStatus[GOTO_LED] &&
                                gbtyPlayRepeat == TY_PLAY_REPEAT_LOOP )
                        {
                                if( OpenLoopPlay() == TRUE )
                                {
                                        gwPlayState                                     =
sPlayInfo.fPlayFwd?

PLAY_STATE_PLAYING_FWD :

PLAY_STATE_PLAYING_REV ;

                                        sPlayInfo.wUseFrameCnt                  =

DONT_USE_FRAME_CNT;
```

```
                                switch( gwRt3State )
                                {
                                        case RT3_FREEZE_FS1_NO_RECORD:
                                                while( gfEvenFrame || gfField2 );
                                                gwRt3State = RT3_TOGGLE_FS_PLAYING;
                                                break;

                                        case RT3_FREEZE_FS2_NO_RECORD:
                                                while( !gfEvenFrame || gfField2 );
                                                gwRt3State = RT3_TOGGLE_FS_PLAYING;
                                                break;
                                }
                        }
                }
                else
                {
                        UiSetupNewLed( STOP_LED );
                        gfPlayClosed = TRUE;
                        CheckMacroAfterPlayDone();
                }
        }
        else
        {
                InitKnob( SHUTTLE_RANGE );
                gwPlaySpd               = 0;
                UiDispRtSpd( gwPlaySpd, SPD_X_DISP, SPD_Y_DISP );
                RtPrepareToPong();
                gfPlayClosed    = TRUE;
                CheckMacroAfterPlayDone();
        }
}

if (    ( gfPlayClosed == FALSE ) &&
                ( ( gwRt3State & RT3_DISK_STATE ) == RT3_PLAYING )        )
        UiDispRtSpd( gwPlaySpd, SPD_X_DISP, SPD_Y_DISP );

if( ( gwRt3State == RT3_TOGGLE_FS_PLAYING ) &&
        ( gsUiState.eCurrMode == SEG ) )
        UpdateSegListDisp( gsUiState.bSequenceNoCurr );

#if     1       /* jeff!! Temp until find out why new code caused flash    */
        if ( gstrIntr[0] )
        {
                TxComMsg( COM1, gstrIntr);              /* send the intr string out now */
                gstrIntr[0] = 0;                                /* clear out the 1st char */
        }
#endif  /* jeff */

        if (! gwcntHiCmdCnt )                   /* if timed out since last cmd sent */
                UiSayHi();                                      /* send Hi cmd to control panel
*/

        /*
         * Only slave listens GPI line
         */
        if ( !gfMasterRtd )
        {
                if ( HiGetAuxBit(0) )
                {
                        if ( gfSlaveRecStarted )
                                gfRecAborted    = TRUE;

                        gfSlaveRecStarted = FALSE;
                }
                else if (! gfSlaveRecStarted )
                {
                        tcRecStart.lFieldNo     (SINT32) 0;/* !! Start from beginning   */
                        tcRecStart.fDropFra     ALSE;
                        tcRecStart.fUndef               = FALSE;
                        /* !! May not be ri                     */
                        gwRt3State                              = gfEvenFrame?

RT3_FREEZE_FS1_NO_RECORD :

RT3_FREEZE_FS2_NO_RECORD ;
```

```
                    if ( OpenRec( 0, tcRecStart, 1800, 55, "Test", 1, 27, 1, &wfcRecDurReal
) == TRUE )
                    {
                            gfRecClosed             = FALSE;
                            gfSlaveRecStarted       = TRUE;
                            gwRt3State                      = RT3_TOGGLE_FS_RECORDING;
                    }
            }

            if ( HiGetAuxBit(1) )
            {
                    if ( gfSlavePlayStarted )
                            gfPlayAborted   = TRUE;

                    gfSlavePlayStarted = FALSE;
            }
            else if (! gfSlavePlayStarted )
            {
                    tcPlayStart.lFieldNo    = 0;
                    tcPlayStart.fDropFrame  = FALSE;
                    tcPlayStart.fUndef              = FALSE;
                    if(OpenPlay( 0, tcPlayStart, N_CYL_AVAIL_PER_DISK* grnDiskOnLine[0],
                            0, N_CYL_AVAIL_PER_DISK * grnDiskOnLine[0], PLAY_DIR_FWD, 27,1)
                            == TRUE )

                    {
                            gfPlayClosed            = FALSE;
                            gfSlavePlayStarted      = TRUE;
                            gwPlayState                     = PLAY_STATE_PLAYING_FWD;
                            while( gfField2 );                      /* Jeff - we should
do this !! */
                            gwRt3State                      = RT3_TOGGLE_FS_PLAYING;
                    }
            }
        }
}
#endif


/*
 *---------------------------------------------------------------------------
 *  rmem.c      Copyright 1991 Accom Inc.
 *
 *      Responsible Person: Doug George
 *
 *  This file contains memory related routines
 *---------------------------------------------------------------------------
 */
#include "rglobal.h"
#include "V53.h"
#include "rhw.h"
#include "rui.h"

/*
 *      the RTD boards support 2 addressing modes, the first "Slot Based"
 *      is enabled after a reset occurs and is used during the initial
 *      interrogation of the System, each slot is assigned 1MB of address space.
 *      After this initial testing, the boards are "remapped" to use "Base
 *      Addressing" which allocates the proper amount of address space needed
 *      for each board type. The Base address is written to each board and then
 *      the expanded memory mapping table is modified to reflect the changes.
 *      The boards are then re-tested to verify that the Base Addressing is
 *      working properly, If it is not, the system must reset and try again.
 *
 *      Note: Rt2 is not remapped, it always uses based addressing ( Base = 0 )
 *
 */

#define OUT_REG0        0                                       /* all boards use Reg 0 for Base
*/

#define MAP_MEMORY(x)                   (UINT16) ( ( (UINT32) x ) >> 14)

        void
SetBaseAddr()
```

```
{
        CTRL_REG_RT1 &= ~B_BD_BASE_ADDR;                /* mask off old base addr        */
        CTRL_REG_RT1 |= BASE_RT1 + F_USE_BASE_ADDR;     /* set new base                  */
        WriteOneReg(RT1, SYS_CTRL_REG, CTRL_REG_RT1);

#if !RT9
        CTRL_REG_RT2 &= ~B_BD_BASE_ADDR;                /* mask off old base addr        */
        CTRL_REG_RT2 |= BASE_RT2 + F_USE_BASE_ADDR;     /* set new base                  */
        WriteOneReg(RT2, SYS_CTRL_REG, CTRL_REG_RT2);
#endif

        CTRL_REG_RT3 &= ~B_BD_BASE_ADDR;                /* mask off old base addr        */
        CTRL_REG_RT3 |= BASE_RT3 + F_USE_BASE_ADDR;     /* set new base                  */
        WriteOneReg(RT3, SYS_CTRL_REG, CTRL_REG_RT3);

        CTRL_REG_RT4 &= ~B_BD_BASE_ADDR;                /* mask off old base addr        */

        CTRL_REG_RT4 |= BASE_RT4 + F_USE_BASE_ADDR;     /* set new base                  */
        WriteOneReg(RT4, SYS_CTRL_REG, CTRL_REG_RT4);

        CTRL_REG_RT5 &= ~B_BD_BASE_ADDR;                /* mask off old base addr        */
        CTRL_REG_RT5 |= BASE_RT5 + F_USE_BASE_ADDR;     /* set new base                  */
        WriteOneReg(RT5, SYS_CTRL_REG, CTRL_REG_RT5);

        CTRL_REG_RT6 &= ~B_BD_BASE_ADDR;                /* mask off old base addr        */
        CTRL_REG_RT6 |= BASE_RT6 + F_USE_BASE_ADDR;     /* set new base                  */
        WriteOneReg(RT6, SYS_CTRL_REG, CTRL_REG_RT6);

        MapBdToBase();                                                          /* remap the
memory table    */
}
/*
**              Writes 1 byte to the EEPROM at the specified address.
**              returns TRUE if VALUE is correct or was written,
**              returns FALSE if still waiting for last write to finish.
*/

        FLAG
WriteEEPROM(wAddr, bData, fWait)
        UINT16  wAddr;
        UINT8   bData;
        FLAG    fWait;
{
#define WAITCNT  80
        static UINT8            bLastData;
        static SINT16           wWaitCnt;
        static UINT16   far     *pwLastPtr;
        SINT32                          wTimeout = 100000;

        if (! fWait)
        {
                /* check if last write has finished */
                if ( (UINT8) *pwLastPtr != bLastData )
                {
                        if (wWaitCnt < 0 || wWaitCnt > WAITCNT)
                                wWaitCnt = WAITCNT;
                        if (--wWaitCnt)
                                return (FALSE);         /* if still waiting, exit */
                }
        }
        else
        {
                /* wait for last write to finish */
                while ( (UINT8) *pwLastPtr != bLastData && --wTimeout );
                wTimeout = 100000;
        }

        pwLastPtr = WORD_PTR( EEPROM_PTR + wAddr);      /* set last ptr to this address */
        bLastData = bData;                                      /* set last data to this data
*/
        wWaitCnt = WAITCNT;                                     /* reset wait count */

        if ( (UINT8) *pwLastPtr != bLastData )          /* already agrees? */
        {
                *pwLastPtr = (UINT16) bLastData;        /* write the new value */
```

```
		if (fWait)
			while ( (UINT8) *pwLastPtr != bLastData && --wTimeout);	/* wait until
ready */
	}
	return (TRUE);
}

	void
HiWriteMem()
{
	static UINT16		wWriteAddr;
	static UINT8	far	*pbDataPtr;
	static UINT8		nWriteType;

	if ( !gfUpdateEEPROM )
		return;						/* don't start writing until
ready */

	switch ( nWriteType )
	{
		default:
		case 0:
			wWriteAddr = 0;			/* initialize the write address counter
*/
			pbDataPtr = BYTE_PTR( DATA_PTR + &gsSegList );	/* set ptr to gsSegList
*/
			nWriteType++;
		case 1:
			if ( WriteEEPROM(( wWriteAddr<<1 ), *pbDataPtr, FALSE )) /* if byte was
written */
			{
				++pbDataPtr;
				++wWriteAddr;
				if ( wWriteAddr >= MIN( sizeof( gsSegList ), 8192 ))
					nWriteType++;		/* gsSegList write loop complete
*/
			}
			break;

		case 2:
			pbDataPtr = BYTE_PTR( DATA_PTR + rsList );	/* set ptr to seg list
*/
			nWriteType++;
		case 3:
			if ( WriteEEPROM(( wWriteAddr<<1 ), *pbDataPtr, FALSE )) /* if byte was
written */
			{
				++pbDataPtr;
				++wWriteAddr;
				if ( wWriteAddr >= MIN(( sizeof( gsSegList ) + sizeof( rsList
)), 8192 ))
					nWriteType++;		/* seg list write loop complete
*/
			}
			break;

		case 4:
			pbDataPtr = BYTE_PTR( DATA_PTR + grwTotalEvents );	/* set ptr to
macro */
			nWriteType++;
		case 5:
			if ( WriteEEPROM(( wWriteAddr<<1 ), *pbDataPtr, FALSE )) /* if byte was
written */
			{
				++pbDataPtr;
				++wWriteAddr;
				if ( wWriteAddr >= MIN(( sizeof( gsSegList ) + sizeof( rsList
) + sizeof( grwTotalEvents )), 8192 ))
					nWriteType++;		/* macro write loop complete
*/
			}
			break;

		case 6:
```

```
                        pbDataPtr = BYTE_PTR( DATA_PTR + rsMacro );       /* set ptr to macro
*/
                        nWriteType++;
                case 7:
                        if ( WriteEEPROM(( wWriteAddr<<1 ), *pbDataPtr, FALSE )) /* if byte was
written */
                        {
                                ++pbDataPtr;
                                ++wWriteAddr;
                                if ( wWriteAddr >= MIN(( sizeof( gsSegList ) + sizeof( rsList
) + sizeof( grwTotalEvents ) + sizeof( rsMacro )), 8192 ))
                                        nWriteType = 0;         /* macro write loop complete
*/
                        }
                        break;
        }
}

        void
HiReadMem()
{
        static UINT16   far     *pwReadPtr;
        static UINT8    far     *pbWritePtr;
        UINT16                  i;
        UINT8                   bZeroCnt = 0;

        /* test the "initialized" byte to see if the eeprom has been initialized */
        pbWritePtr = BYTE_PTR( EEPROM_PTR + (EEPROM_TEST_ADDR<<1) );

        if ( *pbWritePtr != (UINT8) EEPROM_INIT_BYTE )          /* test eeprom init byte */
        {
                /* clear eeprom since it has not been initialized yet */
                UiClearDisp();
                UiDispStr( "Initializing EEPROM, Please Stand By ...", 2, 2);
                for ( i = 0 ; i <= S_EEPROM ; i++ )
                {
                        StrCpy( gStr1, "Addr: ");
                        PrintDec( gStr2, i, 5, 0, S_EEPROM+1 );
                        StrCat( gStr1, gStr2 );
                        UiDispStr( gStr1, 5, 4);

                        WriteEEPROM(i<<1, 0x0, TRUE);           /* set byte to 0 */
                }

                /* now set the eeprom init byte */
                WriteEEPROM(EEPROM_TEST_ADDR<<1, EEPROM_INIT_BYTE, TRUE);
                gfClearingEEPROM = YES;
        }

        pwReadPtr = WORD_PTR( EEPROM_PTR );
        pbWritePtr = BYTE_PTR( DATA_PTR + &gsSegList );

        for ( i = 0 ; i < sizeof( gsSegList ) ; i++ )
        {
                *pbWritePtr = (UINT8) *pwReadPtr;               /* read eeprom into ram */

#if 0   /* turn on to display eeprom read values */
                if ((UINT8) *pwReadPtr )
                        bZeroCnt = 0;                           /* data is non-zero */
                else if ( bZeroCnt < 20 )
                        bZeroCnt++;

                if ( bZeroCnt < 20 )
                {
                        StrCpy( gStr1, "L Addr: ");
                        PrintDec( gStr2, i, 4, 0, 8192 );
                        StrCat( gStr1, gStr2 );
                        StrCat( gStr1, " = " );
                        PrintDec( gStr2, (UINT8) *pwReadPtr, 3, 0, 255 );
                        StrCat( gStr1, gStr2 );
                        UiDispStr( gStr1, 1, 6);
                        WaitTimeMS(2000);
                }
#endif
                pbWritePtr++;
```

```
                pwReadPtr++;
        }

        pbWritePtr = BYTE_PTR( DATA_PTR + rsList );
        bZeroCnt = 0;

        for ( i = 0 ; i < sizeof( rsList ) ; i++ )
        {
                *pbWritePtr = (UINT8) *pwReadPtr;                       /* read eeprom into ram */

#if 0   /* turn on to display eeprom read values */
                if ((UINT8) *pwReadPtr )
                        bZeroCnt = 0;                                   /* data is non-zero */
                else if ( bZeroCnt < 20 )
                        bZeroCnt++;

                if ( bZeroCnt < 20 )
                {
                        StrCpy( gStr1, "L Addr: ");
                        PrintDec( gStr2, i, 4, 0, 8192 );
                        StrCat( gStr1, gStr2 );
                        StrCat( gStr1, " = " );
                        PrintDec( gStr2, (UINT8) *pwReadPtr, 3, 0, 255 );
                        StrCat( gStr1, gStr2 );
                        UiDispStr( gStr1, 1, 6);
                        WaitTimeMS(2000);
                }
#endif
                pbWritePtr++;
                pwReadPtr++;
        }

        pbWritePtr = BYTE_PTR( DATA_PTR + grwTotalEvents );
        bZeroCnt = 0;

        for ( i = 0 ; i < sizeof( grwTotalEvents ) ; i++ )
        {
                *pbWritePtr = (UINT8) *pwReadPtr;                       /* read eeprom into ram */

#if 0   /* turn on to display eeprom read values */
                if ((UINT8) *pwReadPtr )
                        bZeroCnt = 0;                                           /*  data  is
non-zero */
                else if ( bZeroCnt < 20 )
                        bZeroCnt++;

                if ( bZeroCnt < 20 )
                {
                        StrCpy( gStr1, "I Addr: ");
                        PrintDec( gStr2, i, 4, 0, 8192 );
                        StrCat( gStr1, gStr2 );
                        StrCat( gStr1, " = " );
                        PrintDec( gStr2, (UINT8) *pwReadPtr, 3, 0, 255 );
                        StrCat( gStr1, gStr2 );
                        UiDispStr( gStr1, 1, 6);
                        WaitTimeMS(2000);
                }
#endif
                pbWritePtr++;
                pwReadPtr++;
        }

        pbWritePtr = BYTE_PTR( DATA_PTR + rsMacro );
        bZeroCnt = 0;

        for ( i = 0 ; i < sizeof( rsMacro ) ; i++ )
        {
                *pbWritePtr = (UINT8) *pwReadPtr;                       /* read eeprom into ram */

#if 0   /* turn on to display eeprom read values */
                if ((UINT8) *pwReadPtr )
                        bZeroCnt = 0;                                           /*  data  is
non-zero */
                else if ( bZeroCnt < 20 )
                        bZeroCnt++;
```

```
                if ( bZeroCnt < 20 )
                {
                        StrCpy( gStr1, "M Addr: ");
                        PrintDec( gStr2, i, 4, 0, 8192 );
                        StrCat( gStr1, gStr2 );
                        StrCat( gStr1, " = " );
                        PrintDec( gStr2, (UINT8) *pwReadPtr, 3, 0, 255 );
                        StrCat( gStr1, gStr2 );
                        UiDispStr( gStr1, 1, 6);
                        WaitTimeMS(2000);
                }
#endif
                pbWritePtr++;
                pwReadPtr++;
        }

        InitSegLists();
        InitMacros();

        gfUpdateEEPROM = TRUE;                  /* EEPROM read complete, enable write */
}


        void
MapBdToBase()
{
        ExitExpanded();                                                 /* put into normal mode
*/
        /*
         * Now remap RT1, RT3, RT4, Rt5, & RT6 Pages using base addresses
         */
        outpw(V53_PGR18, RT1_REG_BASE);         /* RT1 REGISTER Page */
        outpw(V53_PGR19, RT3_REG_BASE);         /* RT3 REGISTER Page */
        outpw(V53_PGR20, RT4_REG_BASE);         /* RT4 REGISTER Page */
        outpw(V53_PGR22, RT5_REG_BASE);         /* RT5 REGISTER Page */
        outpw(V53_PGR24, RT6_REG_BASE);         /* RT6 REGISTER Page */
        outpw(V53_PGR26, RT3_DISK_BASE);                        /* RT3 DISK CONTROL Page */
        outpw(V53_PGR28, RT5_DISK_BASE);                        /* RT5 DISK CONTROL Page */

        outpw(V53_PGR33, 0x00c0);                               /* RT3 VRAM */
        outpw(V53_PGR34, 0x00c1);                               /* RT3 VRAM */
        outpw(V53_PGR35, 0x00c2);                               /* RT3 VRAM */
        outpw(V53_PGR36, 0x00c3);                               /* RT3 VRAM */
        outpw(V53_PGR37, 0x0280);                               /* RT5 VRAM */
        outpw(V53_PGR38, 0x0281);                               /* RT5 VRAM */
        outpw(V53_PGR39, 0x0282);                               /* RT5 VRAM */
        outpw(V53_PGR40, 0x0283);                               /* RT5 VRAM */

        gwRT3MemoryMap = 0x00c0;                        /* init the memory map value */
        gwRT5MemoryMap = 0x0280;                        /* init the memory map value */

        EnterExpanded();                                                /* now put into expanded
mode */
}


        UINT16
ReadFsRt3( bFsNo, lAddr )
        UINT8   bFsNo;
        UINT32  lAddr;
{
        if ( bFsNo == FS1 )
                lAddr += RT3_BD_BASE + FS1_Y1_OFFSET;
        else
                lAddr += RT3_BD_BASE + FS2_Y1_OFFSET;

        /* turn EDAC off if it's on */
        if (grwOutRegRt3[SYS_CTRL_REG] & F_ENABLE_FS_EDAC)
        {
                grwOutRegRt3[SYS_CTRL_REG] &= ~F_ENABLE_FS_EDAC;
                WriteOneReg(RT3, SYS_CTRL_REG, grwOutRegRt3[SYS_CTRL_REG]);
        }

        MapFsRt3( lAddr );
```

```
        return( * WORD_PTR( RT3_VRAM_PTR + ( ( lAddr & 0x3fff ) << 1 ) ) );
}


        void
WriteFsRt3( bFsNo, lAddr, wVal )
        UINT8   bFsNo;
        UINT32  lAddr;
        UINT16  wVal;
{
        if ( bFsNo == FS1 )
                lAddr += RT3_BD_BASE + FS1_Y1_OFFSET;
        else
                lAddr += RT3_BD_BASE + FS2_Y1_OFFSET;

        /* turn EDAC off if it's on */
        if (grwOutRegRt3[SYS_CTRL_REG] & F_ENABLE_FS_EDAC)
        {
                grwOutRegRt3[SYS_CTRL_REG] &= ~F_ENABLE_FS_EDAC;
                WriteOneReg(RT3, SYS_CTRL_REG, grwOutRegRt3[SYS_CTRL_REG]);
        }

        MapFsRt3( lAddr );
        * WORD_PTR( RT3_VRAM_PTR + ( ( lAddr & 0x3fff ) << 1 ) ) = wVal;
}

        UINT16
ReadFsRt5( bFsNo, lAddr )
        UINT8   bFsNo;
        UINT32  lAddr;
{
        if ( bFsNo == FS1 )
                lAddr += RT5_BD_BASE + FS1_Y1_OFFSET;
        else
                lAddr += RT5_BD_BASE + FS2_Y1_OFFSET;

        /* turn EDAC off if it's on */
        if (grwOutRegRt5[SYS_CTRL_REG] & F_ENABLE_FS_EDAC)
        {
                grwOutRegRt5[SYS_CTRL_REG] &= ~F_ENABLE_FS_EDAC;
                WriteOneReg(RT5, SYS_CTRL_REG, grwOutRegRt5[SYS_CTRL_REG]);
        }

        MapFsRt5( lAddr );

        return(* WORD_PTR( RT5_VRAM_PTR + ( ( lAddr & 0x3fff ) << 1 ) ) );
}
        void
WriteFsRt5( bFsNo, lAddr, wVal )
        UINT8   bFsNo;
        UINT32  lAddr;
        UINT16  wVal;
{
        if ( bFsNo == FS1 )
                lAddr += RT5_BD_BASE + FS1_Y1_OFFSET;
        else
                lAddr += RT5_BD_BASE + FS2_Y1_OFFSET;

        /* turn EDAC off if it's on */
        if (grwOutRegRt5[SYS_CTRL_REG] & F_ENABLE_FS_EDAC)
        {
                grwOutRegRt5[SYS_CTRL_REG] &= ~F_ENABLE_FS_EDAC;
                WriteOneReg(RT5, SYS_CTRL_REG, grwOutRegRt5[SYS_CTRL_REG]);
        }

        MapFsRt5( lAddr );
        * WORD_PTR( RT5_VRAM_PTR + ( ( lAddr & 0x3fff ) << 1 ) ) = wVal;
}

        void
MapFsRt3( lAddr )
        UINT32  lAddr;
{
        UINT16  wMapValue;
```

```
        wMapValue = MAP_MEMORY(lAddr);          /* Get map value for the addr    */
        /*
         * Test if memory mapping must change, 64K avaliable at a time
         */
        if ( (gwRT3MemoryMap < wMapValue) || (gwRT3MemoryMap > wMapValue+3))
        {
                ExitExpanded();                                 /* Put into normal mode
        */

                outpw(V53_PGR33, wMapValue            );       /* RT3 VRAM - Page 0     */
                outpw(V53_PGR34, wMapValue + 1   );       /* RT3 VRAM - Page 1             */
                outpw(V53_PGR35, wMapValue + 2   );       /* RT3 VRAM - Page 2             */
                outpw(V53_PGR36, wMapValue + 3   );       /* RT3 VRAM - Page 3             */
                gwRT3MemoryMap = wMapValue;                    /* Change memory map value */

                EnterExpanded();                                /* Put into expanded
mode    */
        }
}


        void
MapFsRt5( lAddr )
        UINT32  lAddr;
{
        UINT16  wMapValue;

        wMapValue = MAP_MEMORY(lAddr);          /* Get map value for the addr    */
        /*
         * Test if memory mapping must change, 64K avaliable at a time
         */
        if ( (gwRT5MemoryMap < wMapValue) || (gwRT5MemoryMap > wMapValue+3))
        {
                ExitExpanded();                                 /* Put into normal mode
        */

                outpw(V53_PGR37, wMapValue            );       /* RT5 VRAM - Page 0     */
                outpw(V53_PGR38, wMapValue + 1   );       /* RT5 VRAM - Page 1             */
                outpw(V53_PGR39, wMapValue + 2   );       /* RT5 VRAM - Page 2             */
                outpw(V53_PGR40, wMapValue + 3   );       /* RT5 VRAM - Page 3             */
                gwRT5MemoryMap = wMapValue;                    /* change memory map value */

                EnterExpanded();                                /* Put into expanded
mode    */
        }
}


/*
 *-----------------------------------------------------------------------
 *  rmenu.c     Copyright 1991 Accom Inc.
 *
 *      Responsible Person: Kevin Hsu
 *
 *      This file contains routines for Initialization, event Processing,
 *      Exit and Abort of menus.
 *-----------------------------------------------------------------------
 */
#include "rglobal.h"
#include "rui.h"
#include "rmenu.h"
#include "rmode.h"
#include "rtime.h"
#include "rdisk.h"
#include "rhw.h"

/*              "1234567890123456789012345678901234567890l2";;;;;
                "          |          |          |          |       "*/


/*
 * static variables declaration.
 */
static FLAG fKeypadEntry = FALSE;
static FLAG fKeypadEntryError = FALSE;
```

```
static UINT8 biCharTable = 0;
static SINT16 bFieldValue[4] = { 0, 0, 0, 0 };

/*
 * hard key menu structures
 */
static HARD_KEY sRecordSetup = { NIL, RecordSetupInit, RecordSetupProcess };
static HARD_KEY sInputSetup = { NIL, InputSetupInit, InputSetupProcess };
static HARD_KEY sAudioSetup = { NIL, AudioSetupInit, AudioSetupProcess };
static HARD_KEY sTCodeSetup = { NIL, TCodeSetupInit, TCodeSetupProcess };
static HARD_KEY sRmoteSetup = { NIL, RmoteSetupInit, RmoteSetupProcess };
static HARD_KEY sOutputSetup = { NIL, OutputSetupInit, OutputSetupProcess };
static HARD_KEY sCine = { NIL, CineInit, CineProcess };
HARD_KEY sNorm = { NIL, NormInit, NormProcess };
static HARD_KEY sRecordLock = { NIL, RecordLockInit, RecordLockProcess };
static HARD_KEY sGPISetup = { NIL, GPISetupInit, GPISetupProcess };
static HARD_KEY sBackup = { NIL, BackupInit, BackupProcess };
static HARD_KEY sDubDump = { NIL, DubDumpInit, DubDumpProcess };
static HARD_KEY sClip = { NIL, ClipInit, ClipProcess };
static HARD_KEY sSeg = { NIL, SegInit, SegProcess };
static HARD_KEY sDiagTest = { NIL, DiagTestInit, DiagTestProcess };
static HARD_KEY sMacro = { NIL, MacroInit, MacroProcess };

/*
 * hard key Sub-menu.
 */
static HARD_KEY sDisplaySetup = { NIL, DisplaySetupInit, DisplaySetupProcess };
static HARD_KEY sUserSetup = { NIL, UserSetupInit, UserSetupProcess };
static HARD_KEY sRemarkClip = { NIL, RemarkClipInit, RemarkClipProcess };
static HARD_KEY sSegEdit = { NIL, SegEditInit, SegEditProcess };
static HARD_KEY sMacroEdit = { NIL, MacroEditInit, MacroEditProcess };
static HARD_KEY sClipList = { NIL, ClipListInit, ClipListProcess };
static HARD_KEY sClipEdit = { NIL, ClipEditInit, ClipEditProcess };
static HARD_KEY sMacroList = { NIL, MacroListInit, MacroListProcess };
static HARD_KEY sSegList = { NIL, SegListInit, SegListProcess };

/*
 * momentary keys operation.
 */
static void Bypass( void );
static void Grab( void );
static void SmoothMotion( void );
static void Swap( void );
static void StepRev( void );
static void Record( void );
static void StepFwd( void );
static void PingPong( void );
static void InsertClip( void );
static void SegInsert( void );
static void PlayRev( void );
static void Stop( void );
static void PlayFwd( void );
static void Loop( void );
static void Shuttle( void );
static void MarkIn( void );
static void MarkOut( void );
static void Browse( void );
static void Goto( void );
static void VariSpeed( void );

/*
 * local FUNCTION PROTOTYPE declaration.
 */
static void AccessSubMenu( HARD_KEY * );
static void ChangeStrOnField( UINT8, MENU, UINT8, UINT8 **, UINT8, UINT8 );
static void ShowStr( UINT8, MENU, UINT8 **, UINT8, UINT8 );
static void ShowTimeCode( UINT8, UINT8 );
static void ShowInputSource( void );
static void ShowCommonDisp( void );
static void SelectBySoftKey( UINT16, UINT16 * );
static void ShowTheChoice( BUTTON_ID, UINT8 **, UINT16 );
static void ShowChoiceAsStatus( UINT8, UINT8, UINT8 **, UINT16 );

/*
```

```
 * Menu Initialization Routines
 */
        static void
ClipInit()
{
        ShowCommonDisp();
        UiDispStr( "CLIP PLAY", 1, 1 );
        UiDispStr( "Type=", 1, 3 );
        UiDispStr( "Out=", 26, 3 );
        gsUiState.pstrPlayMode = prstrPlayMode[ CLIP_PLAY ];
        UiDispStr( gsUiState.pstrPlayMode, 39, 3 );
        UiDispStr("IN ", 17, 5 );
        UiDispFieldCntAsTc( gwMarkIn, 20, 5, FALSE, TRUE );       /* display play start */
        UiDispFieldCntAsTc( gwMarkOut, 30, 5, FALSE, TRUE );      /* display play end */
        UiDispStr("OUT", 40, 5 );
        UiDispStr( "        Re-mark         Re-mark   CLIP  ", 1, 7 );
        UiDispStr( "         Clip           Browse    LIST  ", 1, 8 );
        UiSetupNewLed( CLIP_LED );                                /* change leds to New State */
        if( gwPlayMode != PLAY_MODE_CLIP )
        {
                gfRebuildPlay   = TRUE;
                gwPlayMode              = PLAY_MODE_CLIP;
        }

}


        static void
RemarkClipInit()
{
        ShowCommonDisp();
        UiDispStr( "MARK CLIP", 1, 1 );
        UiDispStr( "Clip=", 1, 3 );
        UiDispStr( "Out=", 26, 3 );
        UiDispStr( gsUiState.pstrPlayMode, 39, 3 );
/*              "123456789012345678901234567890123456789012";;;;;
                "       |       |       |       |         "*/
        UiDispStr( " Mode    Type    mark", 1, 7 );
        UiDispStr( " Film   24F 3:2  Master          Save", 1, 8 );
        UiSetupNewLed( CLIP_LED );                                /* change leds to New State */
}


        void
NormInit()
{
        ShowCommonDisp();
        UiDispStr( "NORMAL PLAY", 1, 1 );
        ShowInputSource();
        UiDispStr( "Out=", 26, 3 );
        gsUiState.pstrPlayMode = prstrPlayMode[ NORM_PLAY ];
        UiDispStr( gsUiState.pstrPlayMode, 39, 3 );
        UiDispStr("RecDur ", 1, 5 );
        UiDispFieldCntAsTc( gwRecDur, 8, 5, FALSE, FALSE );       /* display record duration */
        UiDispStr("IN ", 17, 5 );
        UiDispFieldCntAsTc( gwMarkIn, 20, 5, FALSE, TRUE );       /* display play start */
        UiDispFieldCntAsTc( gwMarkOut, 30, 5, FALSE, TRUE );      /* display play end */
        UiDispStr("OUT", 40, 5 );
        UiDispStr( " User   Disks  Display   Go To   Go To", 1, 7 );
        UiDispStr( " Setups  Config  Setups  InPoint OutPoint", 1, 8 );
        UiSetupNewLed( NORM_LED );                                /* change leds to New State */
        if( gwPlayMode != PLAY_MODE_NORM )
        {
                gfRebuildPlay   = TRUE;
                gwPlayMode              = PLAY_MODE_NORM;
        }
}


        void
UserSetupInit()
{
        ShowCommonDisp();
        UiDispStr( "USER SETUP", 1, 1 );
        UiDispStr( gsUiState.pstrPlayMode, 39, 3 );
```

```
        UiDispStr( "Counter  Counter Disk TL   List     Save  ", 1, 7 );
        UiDispStr( " Frames  Resets     On    Setups    Setup  ", 1, 8 );
        UiSetupNewLed( NORM_LED );                              /* change leds to New State */
}


        void
DisplaySetupInit()
{
        ShowCommonDisp();
        UiDispStr( "DISPLAY SETUP", 1, 1 );
        UiDispStr( "Out=", 26, 3 );
        UiDispStr( gsUiState.pstrPlayMode, 39, 3 );
        UiDispStr( "Disk TL   Count  Counter  Monitor Monitor ", 1, 7 );
        UiDispStr( "                 Reset                    ", 1, 8 );
}
        static void
CineInit()
{
        ShowCommonDisp();
        UiDispStr( "CINE PLAY", 1, 1 );
        UiDispStr( "Clip In=", 1, 3 );
        UiDispStr( "Out=", 26, 3 );
        ShowStr( 5, CINE_MENU, prstrCineOutput, 30, 3 );
        gsUiState.pstrPlayMode = prstrPlayMode[ CINE_PLAY ];
        UiDispStr( gsUiState.pstrPlayMode, 39, 3 );
        UiDispStr("IN ", 17, 5 );
        UiDispFieldCntAsTc( gwMarkIn, 20, 5, FALSE, TRUE );       /* display play start */
        UiDispFieldCntAsTc( gwMarkOut, 30, 5, FALSE, TRUE );      /* display play end */
        UiDispStr("OUT", 40, 5 );
        UiDispStr( "Re-mark  UseFlds                   Output ", 1, 7 );
        UiDispStr( "  Clip            Compress  Expand 24F 3:2 ", 1, 8 );
        ShowStr( 5, CINE_MENU, prstrCineOutput, 35, 8 );
        UiSetupNewLed( CINE_LED );                              /* change leds to New State */
        if( gwPlayMode != PLAY_MODE_CINE )
        {
                gfRebuildPlay   = TRUE;
                gwPlayMode              = PLAY_MODE_CINE;
        }
}


        static void
SegInit()
{
        ShowCommonDisp();
        ShowSegmentList();

        UiDispStr( "SEG PLAY", 1, 1 );
        UiDispStr( "ID    In       Out    Speed P Mode Length ", 1, 2 );
        UiDispStr( "  SEG                              SEG   ", 1, 7 );
        UiDispStr( " MODIFY                            LIST  ", 1, 8 );
        UiSetupNewLed( SEG_LED );                               /* change leds to New State */
        if( gwPlayMode != PLAY_MODE_SEG )
        {
                gfRebuildPlay   = TRUE;
                gwPlayMode              = PLAY_MODE_SEG;
        }
}


        static void
SegListInit()
{
        UiClearDisp();
        UiDispStr( "SEG LIST", 1, 1 );
        UiDispStr( "ID       Length                           ", 1, 2 );
        UiDispStr( "  SEG                                     ", 1, 7 );
        UiDispStr( " MODIFY  Delete                   Select ", 1, 8 );
        ShowSegLists();
        UiSetupNewLed( SEG_LED );                               /* change leds to New State */
        gbFieldStatus = FIELD1 | FIELD2 | FIELD3 | FIELD4 | FIELD5;
        UiDispField( gbFieldStatus, '9' );
}
```

```
        static void
ClipListInit()
{
        UiClearDisp();
        UiDispStr( "CLIP LIST", 1, 1 );
        UiDispStr( "ID      In         Out        Owner    ", 1, 2 );
        gbFieldStatus = FIELD1 | FIELD2 | FIELD3 | FIELD4 | FIELD5;
        UiDispField( gbFieldStatus, '9' );
        UiDispStr( "  CLIP                                 ", 1, 7 );
        UiDispStr( " MODIFY  Delete                  Select ", 1, 8 );
/*      ShowClipLists();*/
}


        static void
MacroListInit()
{
        UiClearDisp();
        UiDispStr( "MACRO LIST", 1, 1 );
        UiDispStr( "ID       Events                         ", 1, 2 );
        ShowMacroLists();
        UiSetupNewLed( MACRO_LED );                   /* change leds to New State */
        UiDispStr( "         Delete                  Select ", 1, 8 );
        gbFieldStatus = FIELD1 | FIELD2 | FIELD3 | FIELD4 | FIELD5;
        UiDispField( gbFieldStatus, '9' );
}


        static void
OutputSetupInit()
{
        ShowCommonDisp();
        UiDispStr( "OUTPUT SETUP", 1, 1 );
        ShowInputSource();
        UiDispStr( "Out=", 26, 3 );
        UiDispStr( gsUiState.pstrPlayMode, 39, 3 );
        UiDispStr( " Output  HTiming  Output  Interp   Mode  ", 1, 7 );
        ShowStr( 1, OUTPUT_STP_MENU, prstrOutputNum, 1, 8 );
        ShowStr( 2, OUTPUT_STP_MENU, prstrHtiming, 10, 8 );
        ShowStr( 3, OUTPUT_STP_MENU, prstrOutputBit, 18, 8 );
        ShowTheChoice( SOFT4, prstrToggle, geViEnabled );
        ShowTheChoice( SOFT5, rstrOutputMode, geOutputMode );
        UiSetupNewLed( OUTPUT_SETUP_LED );            /* change leds to New State */
}


        static void
InputSetupInit()
{
        ShowCommonDisp();
        UiDispStr( "INPUT SETUP", 1, 1 );
        ShowInputSource();
        UiDispStr( "Out=", 26, 3 );
        UiDispStr( gsUiState.pstrPlayMode, 39, 3 );
        UiDispStr( "RecDur ", 1, 5 );
        UiDispFieldCntAsTc( gwRecDur, 8, 5, FALSE, FALSE );     /* display record duration */
        UiDispStr( " Input   Source  Vid/Key   Type   RefSync ", 1, 7 );
        ShowStr( 1, INPUT_STP_MENU, prstrInput, 1, 8 );
        ShowStr( 2, INPUT_STP_MENU, prstrSource, 10, 8 );
        ShowStr( 3, INPUT_STP_MENU, prstrVidKey, 18, 8 );
        ShowStr( 4, INPUT_STP_MENU, prstrType, 27, 8 );
        ShowStr( 5, INPUT_STP_MENU, prstrRefSync, 35, 8 );
        UiSetupNewLed( INPUT_SETUP_LED );             /* change leds to New State */
}


        static void
RecordSetupInit()
{
        ShowCommonDisp();
        UiDispStr( "RECORD SETUP", 1, 1 );
        ShowInputSource();
        UiDispStr( "Out=", 26, 3 );
```

```
        UiDispStr( gsUiState.pstrPlayMode, 39, 3 );
        UiDispStr( "RecDur ", 1, 5 );
        UiDispFieldCntAsTc( gwRecDur, 8, 5, FALSE, FALSE );       /* display record duration
        UiDispStr("IN ", 17, 5 );
        UiDispFieldCntAsTc( 0, 20, 5, FALSE, TRUE );      /* display play start */
        UiDispFieldCntAsTc( gwRecDur, 30, 5, FALSE, TRUE );       /* display rec dur        */
        UiDispStr("OUT", 40, 5 );
        ShowTheChoice( SOFT2, prstrToggle, eVideo );
        ShowTheChoice( SOFT4, rstrAudio, eAudio );
        UiDispStr( "          Video   LTCode   Audio   Lapse  ", 1, 7 );
        UiSetupNewLed( RECORD_SETUP_LED );                /* change leds to New State */
}


        static void
AudioSetupInit()
{
        ShowCommonDisp();
        UiDispStr( "AUDIO SETUP", 1, 1 );
        UiDispStr( "Out=", 26, 3 );
        UiDispStr( gsUiState.pstrPlayMode, 39, 3 );
        UiDispStr( "RecDur ", 1, 5 );
        UiDispStr( " Audio    Audio    Lock    Ext.Aud Ext.Ctl ", 1, 7 );
        UiDispStr( " Record   Play     Sync    Play    Port2  ", 1, 8 );
        UiSetupNewLed( AUDIO_SETUP_LED );                 /* change leds to New State */
}


        static void
TCodeSetupInit()
{
        ShowCommonDisp();
        UiDispStr( "TCODE SETUP", 1, 1 );
        UiDispStr( "Out=", 26, 3 );
        UiDispStr( gsUiState.pstrPlayMode, 39, 3 );
        UiDispStr( "Out=", 26, 3 );
        UiDispStr( " Use                     TCode   Clip TC", 1, 7 );
        UiDispStr( " VITC   Offset  Trigger  Entry    ON   ", 1, 8 );
        ShowStr( 1, TCODE_STP_MENU, prstrTCodeFormat, 1, 8 );
        UiSetupNewLed( TCODE_SETUP_LED );                 /* change leds to New State */
}


        static void
RmoteSetupInit()
{
        ShowCommonDisp();
        UiDispStr( "REMOTE SETUP", 1, 1 );
        UiDispStr( gsUiState.pstrPlayMode, 39, 3 );
/*              "123456789012345678901234567890123456789012";;;;;
                "        |         |         |         |        "*/
        UiDispStr( "Port1            Cp1", 1, 3 );
        UiDispStr( "Port2", 1, 4 );
        UiDispStr( "Port3", 1, 5 );
/*      UiDispStr( "Port4", 1, 6 );*/
        UiDispStr( " Port    Enable  Protocol Fld.dom  Baud  ", 1, 7 );
        UiDispStr( "          Off                      38.4  ", 1, 8 );
        ShowTheChoice( SOFT1, rstrPortNo, gePortNo );
        ShowTheChoice( SOFT3, rstrProtocol, geProtocol );
        ShowTheChoice( SOFT4, rstrFldDom, geFldDom );
        UiSetupNewLed( RMOTE_SETUP_LED );                 /* change leds to New State */
}


        static void
RecordLockInit()
{
        ShowCommonDisp();
        UiDispStr( "RECORD LOCK", 1, 1 );
        UiDispStr( "ID      In         Out        Owner    ", 1, 2 );
        UiDispStr( "                  Lock    Browse  Unlock ", 1, 8 );
        UiSetupNewLed( RECORD_LOCK_LED );                 /* change leds to New State */
}
```

```
        static void
MacroInit()
{
        ShowCommonDisp();
        UiDispStr( "MACRO", 1, 1 );
        UiDispStr( "                                   MACRO ", 1, 7 );
        UiDispStr( " Capture                           LIST  ", 1, 8 );
        if (( gfRunMacro == TRUE ) && ( gfPauseMacro == TRUE ))
                UiDispStr( "Resume", 11, 8 );
        else
                UiDispStr( "Run", 12, 8 );
        UiSetupNewLed( MACRO_LED );                     /* change leds to New State */
}


        static void
SegEditInit()
{
        ShowCommonDisp();
        ShowSegmentList();
        UiDispStr( "SEG MODIFY", 1, 1 );
        UiDispStr( "ID    In       Out    Speed P Mode Length ", 1, 2 );
        UiDispStr( "                                   SEG   ", 1, 7 );
        UiDispStr( " Modify            Copy   Insert    LIST  ", 1, 8 );
}


        static void
ClipEditInit()
{
        ShowCommonDisp();
/*      ShowClip();*/
        UiDispStr( "CLIP EDIT", 1, 1 );
        UiDispStr( "ID     In       Out                       ", 1, 2 );
        UiDispStr( "  Char                                    ", 1, 7 );
        UiDispStr( " Entry   Delete                           ", 1, 8 );
}


        static void
MacroEditInit()
{
        ShowCommonDisp();
        UiDispStr( "MACRO MODIFY", 1, 1 );
/*              "1234567890123456789012345678901234567890123456789012";;;;;
                "       |          |          |          |          "*/
        UiDispStr( "ID    Command    Speed   Function    Mode ", 1, 2 );
        UiDispStr( " Modify  Delete    Copy   Insert    List  ", 1, 8 );
}


        static void
GPISetupInit()
{
        ShowCommonDisp();
        UiSetupNewLed( GPI_SETUP_LED );          /* change leds to New State */
}

        static void
DubDumpInit()
{
        ShowCommonDisp();
        UiDispStr( "DUB/DUMP", 1, 1 );
        UiDispStr( "Out=", 26, 3 );
        UiDispStr( gsUiState.pstrPlayMode, 39, 3 );
#if 0    /* kevin -keep this code */
        UiDispStr( "RecRTD          IN", 1, 5 );
        UiDispStr( "PlayRTD         IN", 1, 6 );
        UiDispStr( "  Dub                   Ext.VTR  Ext.ctl", 1, 7 );
        UiDispStr( "  In     Perform          Play    Port4 ", 1, 8 );
        UiSetupNewLed( DUB_DUMP_LED );                  /* change leds to New State */
#endif   /* kevin */

}
```

```
        static void
ShowCommonDisp()
{
#if 1   /* 0 for debug */
        UiClearDisp();
#else
        UiClearSpecifiedLine( LINE_1 );
        UiClearSpecifiedLine( LINE_2 );
        UiClearSpecifiedLine( LINE_3 );
        UiClearSpecifiedLine( LINE_4 );
        UiClearSpecifiedLine( LINE_5 );
        UiClearSpecifiedLine( LINE_7 );
        UiClearSpecifiedLine( LINE_8 );
#endif

        switch ( gsUiState.eCurrMode )
        {
#if 0
                case MARK_CLIP:
                case DISPLAY_SETUP:
#endif
                case DUB_DUMP:
                case AUDIO_SETUP:
                case TCODE_SETUP:
                case RECORD_SETUP:
                case OUTPUT_SETUP:
                case INPUT_SETUP:
                case CLIP:
                case NORM:
                        ShowChoiceAsStatus( 30, 3, rstrOutputMode, geOutputMode );
                        break;

                default:
                        break;
        }

        if ( gfFieldMode )
                UiDispStr( "Fld#", 21, 1 );
        else
                UiDispStr( "Frm#", 21, 1 );

        UiDispRtFieldAndTc( TRUE, TRUE );               /* display field # and Tc */

        gbFieldStatus = FIELD1 | FIELD2 | FIELD3 | FIELD4 | FIELD5;
        UiDispRtSpd( gwPlaySpd, SPD_X_DISP, SPD_Y_DISP );
        switch ( gsUiState.eCurrMode )  /* or eButton ? */
        {
                case NORM:
                case CLIP:
                case SEG:
                case SEG_EDIT:
                case INPUT_SETUP:
                case RECORD_SETUP:
                        if ( gfTcEntry == TRUE )
                                UiDispStr( "{}", 41, 6 );
                        else
                                UiDispStr( "[]", 41, 6 );
                        break;

                default:
                        break;
        }
        switch ( gsUiState.eCurrMode )  /* or eButton ? */
        {
                case SEG:
                case SEG_EDIT:
                        break;

                default:
                        ShowTimeCode( 28, 2 );
                        gsUiState.pstrTCode = prstrTCode[ grbiSoft[ TCODE_STP_MENU ][ 0 ]];
                        UiDispStr( gsUiState.pstrTCode, 39, 2 );
        }
        UiDispField( gbFieldStatus, '9' );
}
```

```
        static void
VariSpeed()
{
        gfVariSpeed = ON;

        if ( gfVariSpeedSession == OFF )
        {
                SpeedToVari();
                UiSetLed( VARI_SPEED_LED, ON );
                if ( grfLedStatus[SHUTTLE_LED] )        /* if shuttle is on */
                        UiSetLed( SHUTTLE_LED, OFF );           /* turn it off */
                gfVariSpeedSession = ON;
                InitKnob( VARI_SPD_RANGE );

                /* for checking on sign toggle on normal speed before mode on */
                gfFirstSpdEntry = TRUE;
        }
        else if (( gfVariSpeedSession == ON ) && ( gfEntryExist == NO ))
        {
                if ( grfLedStatus[SHUTTLE_LED] )        /* if shuttle is on */
                        UiSetLed( SHUTTLE_LED, OFF );           /* turn it off */
                else
                {
                        SpeedBackToNormal();
                        UiSetLed( VARI_SPEED_LED, OFF );
                        gfVariSpeedSession = OFF;
                        gfVariSpeed = OFF;
                }
        }

        if (( gfKeypadEntryFirst == YES ) || ( gfEntryExist == YES ))
                VariSpeedEntry();
        if ( gfKeypadError == FALSE )
                ResetKeypadEntry();
}

        static void
SmoothMotion()
{
        UiSetupNewLed( SMO_MO_LED );                    /* change leds to New State */
}


        static void
Swap()
{
        UiSetupNewLed( SWAP_LED );                              /* change leds to New State */
}

        static void
StepFwd()
{
        FLAG    fStepFwd        = TRUE;

#if RTD
                ZeroEncoders();
                RegisterE1( STEP_FWD_MIN, STEP_FWD_MAX, &StepFwdPercent, STEP_FWD_PPQ );
#endif
        HandleStep( fStepFwd );
        UiSetupNewLed( STEP_FWD_LED );                  /* change leds to New State */
        UiSetLed( STOP_LED, ON );
}


        static void
StepRev()
{
        FLAG    fStepFwd        = FALSE;

#if RTD
                ZeroEncoders();
                RegisterE1( STEP_FWD_MIN, STEP_FWD_MAX, &StepFwdPercent, STEP_FWD_PPQ );
#endif
        HandleStep( fStepFwd );
```

```
        UiSetupNewLed( STEP_REV_LED );                  /* change leds to New State */
        UiSetLed( STOP_LED, ON );
}


        static void
HandleStep( fStepFwd )
        FLAG    fStepFwd;
{
        if( gwPlaySpd < 0 )
                fStepFwd = (FLAG)( fStepFwd? FALSE : TRUE );

        if( gwMarkOut < gwMarkIn )
                fStepFwd = (FLAG)( fStepFwd? FALSE : TRUE );

#if RTD

        if( ( gwRt3State & RT3_DISK_STATE ) ==  RT3_DISK_IDLE )
        {
                /*
                 * If no disk action:
                 * if previous keystroke is not Play/Step/Stop, then open play first;
                 * else, step one.
                 */
#if 0
                switch( geLastButton )
                {
                default:
                        if( !grfLedStatus[SHUTTLE_LED] )
                        {
                                if( BuildPlay( fStepFwd ) != TRUE )
                                        return;
                        }
                        break;

                case PLAY_FWD:
                case PLAY_REV:
                case STEP_FWD:
                case STEP_REV:
                case STOP:
                case GOTO:
                case GRAB:
                        break;
                }
#endif
                if( sPlayInfo.fUndef || gfRebuildPlay )
                {
                        if( BuildPlay( fStepFwd ) != TRUE )
                                return;
                }
        }
        else
        {
                /*
                 * Issue stop and wait for disk action to finish first
                 */
                if ( grfLedStatus[SHUTTLE_LED] )        /* if shuttle is on */
                {
                        gwPlaySpd       = gwStorePlaySpd;
                        UiDispRtSpd( gwPlaySpd, SPD_X_DISP, SPD_Y_DISP );
                }
                gfPlayAborted   = TRUE;
                /*
                 * Wait until no disk action
                 * Abort should place disk at frame boundary if it is frame mode.
                 */
                while( ( gwRt3State & RT3_DISK_STATE ) != RT3_DISK_IDLE );
        }
        if( fStepFwd )
        {
                if( !gfFieldMode )
                {
                        /*
                         * Get it to f2 video to start with
                         */
```

```
                if( sPlayInfo.wfcCurr % 2 == 0 )
                {
                        gnStepFwd       = 1;
                        gnStepRev       = 0;
                        if( RtCylAdvForStep() != TRUE )
                                return;
                }
        }
        gnStepFwd               = gfFieldMode? 2 : 3 ;
        gnStepRev               = 0;
        gwPlayState             = PLAY_STATE_STEPPING_FWD;
}
else
{
        if( gfFieldMode )
        {
                gnStepRev       = 2;
                gnStepFwd       = 0;
                gwPlayState     = PLAY_STATE_STEPPING_REV;
        }
        else
        {
                /*
                 * Set up sPlayInfo to back up 4 fields to get ready to step fwd
                 */
                if( FakeFrameStepFwd() != TRUE )
                        return;
                gnStepFwd       = 3;    /* I knew you forgot the 1 field delay    */
                gnStepRev       = 0;
                gwPlayState     = PLAY_STATE_STEPPING_FWD;
        }
}
/*
 * To recover from previous possible TY_FIELD_REPEAT_NONE_REV, which
 * is to created to cure the bug that in special mode, hit stop on
 * playing rev, we got to freeze and f1 time reads f1 storage which is
 * really a f2 video. So we at f1 time, reads f2 storage.
 */
if( !gfFieldMode )
        gbtyFieldRepeat  = TY_FIELD_REPEAT_NONE_FWD;
/*
 * Now do non real-time pre-seek disk
 */
while( gfField2 );
if( TxDiskMsgWord( 0,(UINT8)(sPlayInfo.rsDa[sPlayInfo.iDaCurr].bDiskNo),
                I_DISK_CYL_NO, sPlayInfo.rsDa[sPlayInfo.iDaCurr].wCylNoStart )
                != TRUE )
        return;

if( TxDiskMsgByte( 0,(UINT8)(sPlayInfo.rsDa[sPlayInfo.iDaCurr].bDiskNo),
                I_DISK_CMD, CMD_DISK_SEEK) != TRUE )
        return;
while(  gfField2 );
while( !gfField2 );
while(  gfField2 );

sPlayInfo.wUseFrameCnt                  = DONT_USE_FRAME_CNT;
switch( gwRt3State )
{
case RT3_FREEZE_FS1_NO_RECORD:
        while( gfEvenFrame || gfField2 );
        gwRt3State = RT3_TOGGLE_FS_PLAYING;
        break;
case RT3_FREEZE_FS2_NO_RECORD:
        while( !gfEvenFrame || gfField2 );
        gwRt3State = RT3_TOGGLE_FS_PLAYING;
        break;
case RT3_TOGGLE_FS_BYPASSING:
        while( gfEvenFrame || gfField2 );
        if( OpenFs( FS_MODE_PLAY ) != TRUE )
                return;
        gwRt3State = RT3_TOGGLE_FS_PLAYING;
        break;
}
#endif
```

```
        return;
}


        static void
Record()
{
        gfRecord = ON;
        if ( gfKeypadEntryFirst == YES )
                RecordEntry();
        else if ( grfLedStatus[RECORD_LED] )      /* if the RECORD Led is On */
        {
                UiSetLed(RECORD_LED, OFF);                        /* turn it OFF */
                gfRecord = OFF;
                return;                                                   /* and toggle
out of record */
        }
        if ( gfKeypadError == FALSE )
                ResetKeypadEntry();

        switch ( eMenuWhenRecord )
        {
                case NORM:
                case CINE:
                case CLIP:
                        ShowChoiceAsStatus( 30, 3, rstrOutputMode, geOutputMode );
                        break;

                default:
                        break;
        }
#if RTD
        if ( gsUiState.eCurrMode == NORM )
        {
                UiDispStr("RecDur ", 1, 5 );
                UiDispFieldCntAsTc( gwRecDur, 8, 5, FALSE, FALSE );       /* display record duration
*/
        }

        UiSetupNewLed( RECORD_LED );              /* change leds to New State */

        /* record is now "armed" and waiting for a play btn to be pressed */
#endif
}


        static void
PingPong()
{
        UiSetupNewLed( PINGPONG_LED );                    /* change leds to New State */

        if ( gbtyPlayRepeat != TY_PLAY_REPEAT_PINGPONG )
                gbtyPlayRepeat          = TY_PLAY_REPEAT_PINGPONG;
        else
                gbtyPlayRepeat          = TY_PLAY_REPEAT_NONE;
}


        static void
PlayFwd()
{
#if RTD
        TC              tcRecStart;
#endif
        FLAG    fPlayFwd = TRUE;

        UiSetupNewLed( PLAY_FWD_LED );                    /* change leds to New State */

#if RTD
        /*
         * If record is armed and the swap led is off, record as master
         */
        if ( grfLedStatus[RECORD_LED] && !grfLedStatus[SWAP_LED] )
        {
                UINT16  wfcRecDurReal;
```

```
/*
 * !! Start from beginning for now,
 * Should start from current point, unless in record setup,
 * user sets both rec-in and rec-out & hit record.
 * In the latter case, once recorded, the rec-in rec-out pts
 * disappear and may not be used again. ( of course, unless
 * set again.
 */

/*
 *      if field1 editing, make sure record starts at even cylinder.
 *      if field2 editing, make sure record starts at odd  cylinder.
 */
if( !gfField2Editing && ( gwFieldNum % 2 == 1 ) )
                gwFieldNum--;
else
if(  gfField2Editing && ( gwFieldNum % 2 == 0 ) )
                gwFieldNum++;

tcRecStart.lFieldNo     = (SINT32) gwFieldNum;
tcRecStart.fDropFrame   = FALSE;
tcRecStart.fUndef               = FALSE;

/*
 * Double check, make sure record in frame units.
 */
if( gwRecDur % 2 == 1 )
        gwRecDur--;

if ( OpenRec( 0, tcRecStart, gwRecDur, 55, "Test", 1, 27, 1,
                &wfcRecDurReal ) != TRUE )
        return;

gfRecClosed                     = FALSE;
gfSlaveRTDShouldPlay    = TRUE;

/*
 * Make sure gwMarkIn & gwMarkOut gets even number, ie. f1 video
 * Take default case right after recording, ie gwMarkIn < gwMarkOut.
 * wfcRecDurReal must be even, check inside OpenRec().
 */
if( (UINT16)tcRecStart.lFieldNo % 2 == 1 )
        tcRecStart.lFieldNo--;
gwMarkIn                                = (UINT16)tcRecStart.lFieldNo;
gwMarkOut                               =    (UINT16)tcRecStart.lFieldNo    +
wfcRecDurReal;
gwPlayDur                               = wfcRecDurReal;

if ( gsUiState.eCurrMode == NORM )
{
        /* Display the new play start and end points */
        UiDispFieldCntAsTc( gwMarkIn, 20, 5, FALSE, TRUE );
        UiDispFieldCntAsTc( gwMarkOut, 30, 5, FALSE, TRUE );
}
gfRecAborted                    = FALSE;
if( gwRt3State == RT3_FREEZE_FS1_NO_RECORD )
        gwRt3State                      = RT3_FREEZE_FS1_RECORDING;
else
if( gwRt3State == RT3_FREEZE_FS2_NO_RECORD )
        gwRt3State                      = RT3_FREEZE_FS2_RECORDING;
else
{
        gbtyFieldRepeat                 = TY_FIELD_REPEAT_NONE_FWD;
        gwRt3State                              = RT3_TOGGLE_FS_RECORDING;
}
return;
}

if ( gwPlaySpd < 0 )
        fPlayFwd        = FALSE;
/*
 * Other than the speed sign factor,
 * If gwMarkOut < gwMarkIn, change play direction again.
 * !! Applies to which of the 3 play modes?
```

```
         * This does not apply to seg play for sure.
         */
        switch( gwPlayMode )
        {
        case    PLAY_MODE_CINE:  /* Cine Play           */
        case    PLAY_MODE_NORM:  /* Normal Play         */
        case    PLAY_MODE_CLIP:  /* Clip Play           */
                if( gwMarkOut < gwMarkIn )
                        fPlayFwd                = (FLAG)( fPlayFwd? FALSE : TRUE );
                break;
        }

        if( BuildPlay( fPlayFwd ) == TRUE )
        {
                gnStepFwd                               = 0;
                gnStepRev                               = 0;
                gwPlayState                             = fPlayFwd?
                                                                PLAY_STATE_PLAYING_FWD
:
                                                                PLAY_STATE_PLAYING_REV
;
                gbtyFieldRepeat                 = TY_FIELD_REPEAT_NONE_FWD;
                while( gfField2 );
                gwRt3State                              = RT3_TOGGLE_FS_PLAYING;
        }
#endif
}


        static void
PlayRev()
{
        FLAG    fPlayFwd = FALSE;

        UiSetupNewLed( PLAY_REV_LED );                  /* change leds to New State */

#if RTD
        if ( gwPlaySpd < 0 )
                fPlayFwd        = TRUE;
        /*
         * Other than the speed sign factor,
         * If gwMarkOut < gwMarkIn, change play direction again.
         * !! Applies to which of the 3 play modes?
         * This does not apply to seg play for sure.
         */
        switch( gwPlayMode )
        {
        case    PLAY_MODE_CINE:  /* Cine Play           */
        case    PLAY_MODE_NORM:  /* Normal Play         */
        case    PLAY_MODE_CLIP:  /* Clip Play           */
                if( gwMarkOut < gwMarkIn )
                        fPlayFwd                = (FLAG)( fPlayFwd? FALSE : TRUE );
                break;
        }
        if( BuildPlay( fPlayFwd ) == TRUE )
        {
                gnStepFwd                               = 0;
                gnStepRev                               = 0;
                gwPlayState                             = fPlayFwd?
                                                                PLAY_STATE_PLAYING_FWD
:
                                                                PLAY_STATE_PLAYING_REV
;
                gbtyFieldRepeat                 = TY_FIELD_REPEAT_NONE_FWD;
                while( gfField2 );
                gwRt3State                              = RT3_TOGGLE_FS_PLAYING;
        }
#endif
}

/*
 * This routine is called by PlayFwd() and PlayRev()
 */
/*
```

```
 * This rouinte is called by PlayFwd(), PlayRev(), StepFwd() and StepRev().
 * Return TRUE means successfully built play table, needs to enter real time.
 */
        FLAG
BuildPlay( fPlayFwd )
        FLAG    fPlayFwd;
{
        /*
         * Different action depending on diff play states, and play modes
         */
        switch( gwPlayState )
        {
        case PLAY_STATE_NULL:
#if 0
UiDispStr( "NU", 1, 2 );
#endif
                /*
                 * If not playing/stepping right now, it will do preprocessing,
                 * then enter real time.
                 */
                switch( gwPlayMode )
                {
                default:
                        return( FALSE );

                case    PLAY_MODE_CINE:  /* Cine Play              */
                case    PLAY_MODE_NORM:  /* Normal Play            */
                case    PLAY_MODE_CLIP:  /* Clip Play              */
                        /*
                         * For normal play and clip play:
                         *      !! Do this. if MarkIn or Out changed, then rebuild everything;
                         *  else if previous play hasn't finished, continue from curr pt.
                         *               else playing from the beginning.
                         */
#if 0
StrCpy( gStr1, "RE" );
PrintDec( gStr2, (UINT16)gfPlayAborted, 1, 0, 9 );
StrCat( gStr1, gStr2 );
StrCat( gStr1, ":" );
PrintDec( gStr2, (UINT16)gfRebuildPlay, 1, 0, 9 );
StrCat( gStr1, gStr2 );
StrCat( gStr1, ":" );
PrintDec( gStr2, (UINT16)gwFieldNum, 4, 0, 9999 );
StrCat( gStr1, gStr2 );
StrCat( gStr1, ":" );
PrintDec( gStr2, (UINT16)sPlayInfo.fUndef, 1, 0, 9 );
StrCat( gStr1, gStr2 );
StrCat( gStr1, ":" );
PrintDec( gStr2, (UINT16)gwMarkIn, 4, 0, 9999 );
StrCat( gStr1, gStr2 );
StrCat( gStr1, ":" );
PrintDec( gStr2, (UINT16)gwMarkOut, 4, 0, 9999 );
StrCat( gStr1, gStr2 );
StrCat( gStr1, ";" );
UiDispStr( gStr1, 1, 3 );
#endif
                        if( !gfPlayAborted || gfRebuildPlay || sPlayInfo.fUndef ||
                                ( ( gwMarkIn < gwMarkOut &&
                                ( gwFieldNum >= gwMarkOut || gwFieldNum< gwMarkIn ) )
||
                                ( gwMarkIn > gwMarkOut &&
                                ( gwFieldNum <= gwMarkOut || gwFieldNum> gwMarkIn ) ))
)
                        {
                                TC                      tcPlayTblStart;
                                UINT16          wPlayTblDur;
                                UINT16          wPlayStart;
                                UINT16          wPlayEnd;

                                tcPlayTblStart.lFieldNo         = 0;
                                tcPlayTblStart.fDropFrame       = FALSE;
                                tcPlayTblStart.fUndef           = FALSE;
                                wPlayTblDur                     =    grnDiskOnLine[0]    *
N_CYL_AVAIL_PER_DISK;
                                /*
```

```
             * wPlayStart will be the smaller one, wPlayEnd the bigger one.
             */
            if( gwMarkOut < gwMarkIn )
            {
                    wPlayStart                      = gwMarkOut + 1;/* @t
to even */
                    wPlayEnd                        = gwMarkIn  + 1;/* @t
to even */
            }
            else
            {
                    wPlayStart                                      =
;
                    wPlayEnd                                        =
gwMarkOut ;
            }
            /*
             * If frame mode, must be on frame boundary,
             * shift forward if needed.
             */
            if( !gfFieldMode )
            {
                    if( wPlayStart % 2 == 1 )
                            wPlayStart                      -= 1;
                    if( wPlayEnd   % 2 == 1 )
                            wPlayEnd                        -= 1;
            }
            if( OpenPlay( 0, tcPlayTblStart, wPlayTblDur,
                            wPlayStart, wPlayEnd, fPlayFwd, 27, 1 ) != TRUE
)
                    return( FALSE );
    }
    else
    {
            if( OpenContPlay( fPlayFwd ) != TRUE )
                    return( FALSE );
    }
    break;

case    PLAY_MODE_SEG:  /* Segment Play         */
    /*
     * For seg play:
     *      if list has been changed, need to start building then play.
     *  else, if previous play hasn't finished, continue from curr pt,
     *              else play from the beginning.
     * !! We may just reset wfcCurr etc, instead of building all again.
     * when list not changed and not aborted.
     * ( Abort means play hasn't finished. )
     */
    if( gfSegListChanged || gfRebuildPlay || !gfPlayAborted )
    {
            if ( OpenSegPlay( 0, fPlayFwd, 27, 1 ) != TRUE )

                    return( FALSE );
            gfSegListChanged                        = FALSE;
    }
    else
    {
            if( OpenContPlay( fPlayFwd ) != TRUE )
                    return( FALSE );
    }
    break;
}

gfRebuildPlay                           = FALSE;
gfPlayAborted                           = FALSE;
gfPlayClosed                            = FALSE;
if ( grfLedStatus[RECORD_LED] )
        gfSlaveRTDShouldRecord  = TRUE;
else
        gfSlaveRTDShouldPlay    = TRUE;
return( TRUE );

case PLAY_STATE_STEPPING_FWD:
case PLAY_STATE_STEPPING_REV:
```

```
                /*
                 * If stepping/jogging, pressing Play/Step has no effect
                 */
                return( FALSE );

        case PLAY_STATE_PLAYING_FWD:
        case PLAY_STATE_PLAYING_REV:
                /*
                 * If currently playing, and not in ping pong mode, and
                 * direction needs reverse, then mark it in gwPlayState,
                 * so RtPlaying() will take care of it in real time.
                 */
                if( gbtyPlayRepeat      != TY_PLAY_REPEAT_PINGPONG )
                {
                        if( fPlayFwd && gwPlayState == PLAY_STATE_PLAYING_REV )
                                gwPlayState             = PLAY_STATE_PLAYING_FWD;
                        else
                        if( !fPlayFwd && gwPlayState == PLAY_STATE_PLAYING_FWD )
                                gwPlayState             = PLAY_STATE_PLAYING_REV;
                        /*
                         * Ignore all other cases
                         */
                }
                return( FALSE );
        }
}


        static void
Stop()
{
#if RTD
        ZeroEncoders();
        RegisterE1( STEP_FWD_MIN, STEP_FWD_MAX, &StepFwdPercent, STEP_FWD_PPQ );
#endif
        UiSetupNewLed( STOP_LED );                              /* change leds to New State */

        if( ( gwRt3State & RT3_DISK_STATE ) ==  RT3_PLAYING )
        {
                gfPlayAborted = TRUE;
                /*
                 * Fake a Step fwd to get a clean video for play rev.
                 */
#if 0
                if( !sPlayInfo.fPlayFwd )

                {
                        while( ( gwRt3State & RT3_DISK_STATE ) == RT3_PLAYING );
                        gnStepFwd               = 3;
                        gnStepRev               = 0;
                        gwPlayState             = PLAY_STATE_STEPPING_FWD;
                        while( gfField2 );
                        gwRt3State              = RT3_TOGGLE_FS_PLAYING;
                }
#endif
        }
        if( ( gwRt3State & RT3_DISK_STATE ) ==  RT3_RECORDING )
                gfRecAborted    = TRUE;
}


        static void
Loop()
{
        UiSetupNewLed( LOOP_LED );                              /* change leds to New State */

        if ( gbtyPlayRepeat != TY_PLAY_REPEAT_LOOP )
                gbtyPlayRepeat          = TY_PLAY_REPEAT_LOOP;
        else
                gbtyPlayRepeat          = TY_PLAY_REPEAT_NONE;
}


        static void
Shuttle()
```

```
{
        UiSetupNewLed( SHUTTLE_LED );                               /* change leds to New State */
        if ( grfLedStatus[ SHUTTLE_LED ] == ON )
        {
                InitKnob( SHUTTLE_RANGE );
                gwStorePlaySpd                  = gwPlaySpd;
#if RTD
                if( ( gwRt3State & RT3_DISK_STATE ) ==  RT3_PLAYING )
                        gfPlayAborted           = TRUE;
                while( ( gwRt3State & RT3_DISK_STATE ) != RT3_DISK_IDLE );

                gwPlaySpd                               = 0;
                if( gwPlayMode != PLAY_MODE_SEG )
                {
                        /*
                         * Play whole disk, so need to reopen play
                         */
                        if( sPlayInfo.fUndef )
                        {
                                gfRebuildPlay   = TRUE;
                                if( BuildPlay( PLAY_DIR_FWD ) != TRUE )
                                        return;
                        }
                        else
                        {
                                gfPlayAborted           = FALSE;
                                if( OpenContPlay( PLAY_DIR_FWD ) != TRUE )
                                        return;
                        }
                }
                else
                {
                        /*
                        * Only case to remember play boundaries.
                        */
                        gfRebuildPlay   = TRUE;
                        if( BuildPlay( PLAY_DIR_FWD ) != TRUE )
                                return;
                }

                gwPlayState                                     = PLAY_STATE_PLAYING_FWD;
                gnStepFwd                                       = 0;
                gnStepRev                                       = 0;
                /*
                 * Leave gbtyFieldRepeat what it is.( Set by SetupForFreeze() ).
                 * So it can handle play_rev/Stop special mode.
                 */
                gfPlayClosed                            =   TRUE;/*   prevent   DoPerio..()
interfere       */
#endif
                gfShuttleInit                           = TRUE; /* Shuttle just pressed  */
        }
        else
        {
                gwPlaySpd = gwStorePlaySpd;

                if ( gfVariSpeedSession == ON )
                        UiSetLed( VARI_SPEED_LED, ON );

                gfPlayAborted = TRUE;
        }

        UiDispRtSpd( gwPlaySpd, SPD_X_DISP, SPD_Y_DISP );
}


        void
InitKnob( wKnobRange )
        UINT16  wKnobRange;
{
        gwKnobZeroPoint         = gwPulseCount;
        gwCountMax                      = gwKnobZeroPoint + wKnobRange;
        gwCountMin                      = gwKnobZeroPoint - wKnobRange;
        gwSpdTableIndex         = 0;
        gwLastPulseCount        = gwPulseCount;
```

```
        gwCountDifference       = 0;
}


        static void
Browse()
{
        UiSetupNewLed( BROWSE_LED );                    /* change leds to New State */
}


        static void
MarkIn()
{
        SINT32  lMarkIn;

        if ( gfKeypadEntryFirst == YES )
        {
                lMarkIn = MarkEntry();
                if ( lMarkIn >= 0 )
                {
                        gwMarkIn = ( UINT16 )lMarkIn;
                        if( gwMarkIn >= (UINT16) grnDiskOnLine[0] * N_CYL_AVAIL_PER_DISK )
                        {
                                UiSetAndDispStr( 1, ROW_NO_ERR_MSG,
                                        "Out Of Range, Take Disk End." );
                                gwMarkIn = (UINT16) grnDiskOnLine[0] * N_CYL_AVAIL_PER_DISK ;
                        }
                        if( gwMarkIn % 2 == 1 )
                                gwMarkIn    -= 1;
                }
        }
        else
        {
                /*
                 * Force to field 1 edit.
                 * Set new mark in and display it.
                 * Also recalculate gwPlayDur.
                 */
                if ( gwFieldNum % 2 == 0 )
                        gwMarkIn                = gwFieldNum;
                else
                        gwMarkIn                = gwFieldNum - 1;
        }

        /*
         * When In > Out, We display f2... f2.
         * So, In is still inclusive. Out is still exclusive.
         */
        if( gwMarkIn  > gwMarkOut )
        {
                gwMarkIn++;                                     /* Get to f2    */
                if( gwMarkOut % 2 == 0 )
                        gwMarkOut++;                    /* Get to f2    */
        }
        gwPlayDur                               = ABS( (SINT16)(gwMarkOut - gwMarkIn) );

        switch ( gsUiState.eCurrMode )
        {
                case NORM:
                case CLIP:
                case CINE:
                        UiDispFieldCntAsTc( gwMarkIn, 20, 5, FALSE, TRUE );
                        UiDispFieldCntAsTc( gwMarkOut, 30, 5, FALSE, TRUE );

                default:
                        break;
        }

        if ( gfKeypadError == FALSE )
                ResetKeypadEntry();

        UiSetupNewLed( MARK_IN_LED );                   /* change leds to New State */
        gfRebuildPlay           = TRUE;
}
```

```
        static void
MarkOut()
{
        SINT32  lMarkOut;

        if ( gfKeypadEntryFirst == YES )
        {
                lMarkOut = MarkEntry();
                if ( lMarkOut >= 0 )
                {
                        gwMarkOut = ( UINT16 )lMarkOut;
                        if( gwMarkOut >= (UINT16) grnDiskOnLine[0] * N_CYL_AVAIL_PER_DISK )
                        {
                                UiSetAndDispStr( 1, ROW_NO_ERR_MSG,
                                        "Out Of Range, Take Disk End." );
                                gwMarkOut = (UINT16)grnDiskOnLine[0] * N_CYL_AVAIL_PER_DISK;
                        }
                        if( gwMarkOut % 2 == 1 )
                                gwMarkOut   -= 1;
                }
        }
        else
        {
                /*
                 * Force to field 1 edit.
                 * Set new mark out and display it.
                 * Also recalculate gwPlayDur.
                 */
                if ( gwFieldNum % 2 == 0 )
                        gwMarkOut               = gwFieldNum;
                else
                        gwMarkOut               = gwFieldNum - 1;
        }

        /*
         * When In > Out, We display f2... f2.
         * In is still inclusive. Out is still exclusive.
         */
        if( gwMarkIn  > gwMarkOut )
        {
                if( gwMarkIn % 2 == 0 )
                        gwMarkIn++;                             /* Get to f2    */
                gwMarkOut++;                            /* Get to f2    */
        }

        gwPlayDur                               = ABS( (SINT16)(gwMarkOut - gwMarkIn) );
        switch ( gsUiState.eCurrMode )
        {
                case NORM:
                case CLIP:
                case CINE:
                        UiDispFieldCntAsTc( gwMarkIn, 20, 5, FALSE, TRUE );
                        UiDispFieldCntAsTc( gwMarkOut, 30, 5, FALSE, TRUE );

                default:
                        break;
        }

        if ( gfKeypadError == FALSE )
                ResetKeypadEntry();

        UiSetupNewLed( MARK_OUT_LED );                  /* change leds to New State */
        gfRebuildPlay           = TRUE;
}


        static void
SegInsert()
{
        UiSetupNewLed( SEG_INSERT_LED );                /* change leds to New State */
        switch ( gsUiState.eCurrMode )
        {
                case NORM:
                case CLIP:
```

```
		case CINE:
			AddNewMemberAfterListCurr();
			break;

		case SEG:
		case SEG_EDIT:
			AddNewMemberAfterListCurr();
			break;
	}
}


	static void
InsertClip()
{
	UiSetupNewLed( INSERT_CLIP_LED );		/* change leds to New State */
}


	static void
Bypass()
{
	/*
	 * Make sure the path is OK
	 */
	/*
	** all of the register-related code needs to
	** take place during the same vertical interrupt
	*/
	WaitTopOfFrame();
	grwOutRegRt3[IO_CTRL_REG] |= F_INPUT_TO_FS;
	grwOutRegRt3[IO_CTRL_REG] &= ~F_DISK_TO_FS;
	BlankOutput( OFF, OFF );
	gbtyFieldRepeat  = TY_FIELD_REPEAT_NONE_FWD;
	gwRt3State		= RT3_TOGGLE_FS_BYPASSING;

	UiSetupNewLed( BYPASS_LED );
	UiSetLed( STOP_LED, ON );
}


	static void
Grab()
{
	UiSetupNewLed( GRAB_LED );			/* change leds to New State */

	switch( gwRt3State )
	{
	case RT3_TOGGLE_FS_BYPASSING:	/* Becomes still input picture			*/
		if( gfEvenFrame )
		{
			while( gfEvenFrame );
			gwRt3State	= RT3_FREEZE_FS2_NO_RECORD;
		}
		else
		{
			while( !gfEvenFrame );
			gwRt3State	= RT3_FREEZE_FS1_NO_RECORD;
		}
		break;

	case RT3_TOGGLE_FS_RECORDING:	/* Becomes still picture, keep recording*/
		gbtyFieldRepeat  = TY_FIELD_REPEAT_NONE_FWD;
		if( gfEvenFrame )
		{
			while( gfEvenFrame );
			gwRt3State	= RT3_FREEZE_FS2_RECORDING;
		}
		else
		{
			while( !gfEvenFrame );
			gwRt3State	= RT3_FREEZE_FS1_RECORDING;
		}
		break;
```

```
        case RT3_TOGGLE_FS_PLAYING:            /* Same as STOP, still disk picture      */
                HandleStep( TRUE );
                UiSetupNewLed( STOP_LED );
                break;

        case RT3_FREEZE_FS1_NO_RECORD:
                /*
                 * If did bypass then grab, grab again means bypass one new frame
                 * If did play then grab, grab again means step(fwd/rev) one next frame.
                 * Make sure it writes to the right framestore so not to disturb output.
                 */
                if( grwOutRegRt3[IO_CTRL_REG] & F_INPUT_TO_FS )
                        gwRt3State                = RT3_BYPASS_ONE_FRAME_FS2;
                else
                if( grwOutRegRt3[IO_CTRL_REG] & F_DISK_TO_FS )
                        HandleStep( TRUE );
                break;

        case RT3_FREEZE_FS2_NO_RECORD:
                if( grwOutRegRt3[IO_CTRL_REG] & F_INPUT_TO_FS )
                        gwRt3State                = RT3_BYPASS_ONE_FRAME_FS1;
                else
                if( grwOutRegRt3[IO_CTRL_REG] & F_DISK_TO_FS )
                        HandleStep( TRUE );
                break;

        case RT3_FREEZE_FS1_RECORDING:
                /*
                 * If did record then grab, grab again means record one new frame
                 */
                glFrameCntCopy   = 0L;
                gwRt3State              = RT3_RECORD_ONE_FRAME_FS2;
                break;

        case RT3_FREEZE_FS2_RECORDING:
                glFrameCntCopy   = 0L;
                gwRt3State              = RT3_RECORD_ONE_FRAME_FS1;
                break;
        }
}


        static void
DiagTestInit()
{
        UiSetupNewLed( DIAG_TEST_LED );                     /* change leds to New State */
}


        static void
BackupInit()
{
        UiSetupNewLed( BACKUP_LED );                        /* change leds to New State */
}


        static void
Goto()
{
        if ( gfGoto == OFF )
        {
                UiSetLed( GOTO_LED, ON );
                gfGoto = ON;
        }
        else if ( gfEntryExist == NO )
        {
                UiSetLed( GOTO_LED, OFF );
                gfGoto = OFF;
        }
        if (( gfKeypadEntryFirst == YES ) || ( gfEntryExist == YES ))
                GotoEntry();
        if ( gfKeypadError == FALSE )
                ResetKeypadEntry();
}
```

```
/*
 * PROCESS
 */
        static void
ClipProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        gsUiState.eCurrMode = CLIP_EDIT;
                                        AccessSubMenu( &sClipEdit );
                                        break;

                                case SOFT2:
                                        gsUiState.eCurrMode = REMARK_CLIP;
                                        AccessSubMenu( &sRemarkClip );
                                        break;

                                case SOFT3:
                                        break;

                                case SOFT4:
                                        break;

                                case SOFT5:
                                        gsUiState.eCurrMode = CLIP_LIST;
                                        AccessSubMenu( &sClipList );
                                        break;

#if 0   /* kevin - new code ? */
                                case MARK_IN:
                                        MarkInSegTc();
                                        break;

                                case MARK_OUT:
                                        MarkOutSegTc();
                                        break;
#endif  /* kevin */

                                default:
                                        CheckMenuChange(  GetButtonID(
sEvent->uData.sButtonUp.rbButtonId ), CLIP );
                        }
                        break;
        }
}


        static void
NormProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        AccessSubMenu( &sUserSetup );
                                        break;

                                case SOFT2:
                                        ChangeStrOnField( 2, NORM_MENU, 1, prstrHtiming, 10, 8
);

                                        break;

                                case SOFT3:
                                        AccessSubMenu( &sDisplaySetup );
                                        break;

                                case SOFT4:
```

```
                                        gwGotoField = gwMarkIn;          /* set goto field to
mark in */
                                        if( HandleGoto() != TRUE )
                                                return;
                                        break;

                                case SOFT5:
                                        if( gwMarkOut >
                                                        (UINT16)   N_CYL_AVAIL_PER_DISK    *
grnDiskOnLine[0] )
                                                gwGotoField    =    N_CYL_AVAIL_PER_DISK    *
grnDiskOnLine[0];
                                        else
                                                gwGotoField = gwMarkOut;
                                        if( HandleGoto() != TRUE )
                                                return;
                                        break;

                                default:
                                        C h e c k M e n u C h a n g e (   G e t B u t t o n I D (
sEvent->uData.sButtonUp.rbButtonId ), NORM );
                        }
                        break;
        }
}


        static void
UserSetupProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButto
                        {
                                case SOFT1:
                                        ChangeStrOnField( 1, USER_STP_MENU, 2, prstrCounter, 1,
8 );
                                        break;

                                case SOFT2:
                                        ChangeStrOnField( 2, NORM_MENU, 1, prstrHtiming, 10, 8
);
                                        break;

                                case SOFT3:
                                        AccessSubMenu( &sDisplaySetup );
                                        break;

                                case SOFT4:
                                        ChangeStrOnField( 4, NORM_MENU, 1, prstrToggle, 27, 8
);
                                        break;
                                case SOFT5:
                                        break;

                                default:
                                        C h e c k M e n u C h a n g e (   G e t B u t t o n I D (
sEvent->uData.sButtonUp.rbButtonId ), ZERO );
                        }
                        break;
        }
}


        static void
CineProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
```

```
{
                case SOFT1:
                        AccessSubMenu( &sRemarkClip );
                        break;

                case SOFT2:
                        break;

                    SOFT3:
                        if ( StrCmp( prstrCineOutput[ grbiSoft[ CINE_MENU ][ 4
]],
                                                                "24F 3:2 " ))
                        {
                                ChangeStrOnField( 5, CINE_MENU, 1, prstrCineOutput,
35, 8 );

                                ShowStr( 5, CINE_MENU, prstrCineOutput, 30, 3
);
                        }
                        break;

                case SOFT4:
                        if ( StrCmp( prstrCineOutput[ grbiSoft[ CINE_MENU ][ 4
]],
                                                                "24F 2:2 "
                        {
                                ChangeStrOnField( 5, CINE_MENU, 1, prstrC
35, 8 );

                                ShowStr( 5, CINE_MENU, prstrCineOutput, 30, 3
);
                        }
                        break;

                case SOFT5:
                        ChangeStrOnField( 5, CINE_MENU, 1, prstrCineOutput, 35,
8 );

                        ShowStr( 5, CINE_MENU, prstrCineOutput, 30, 3 );
                        break;

#if 0   /* kevin - new code ? */
                case MARK_IN:
                        MarkInSegTc();
                        break;

                case MARK_OUT:
                        MarkOutSegTc();
                        break;
#endif  /* kevin */
                default:
                        C h e c k M e n u C h a n g e (   G e t B u t t o n I D (
sEvent->uData.sButtonUp.rbButtonId ), CINE );
            }
            break;
        }
}


        static void
DisplaySetupProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT3:
                                        fKeypadEntry = TRUE;
                                        UiDispStr( "
", 1, 6 );

                                        UiDispStr( "Enter:", 1, 6 );
                                        break;

                                default:
                                        gwKeypadEntryValue = 0;
```

```
                                CheckMenuChange(  GetButtonID(
sEvent->uData.sButtonUp.rbButtonId ), ZERO );
                        }
                        break;
        }
}


        static void
SegProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        gwLastPulseCount = 1;
                                        gsUiState.eCurrMode = SEG_EDIT;         /* set new current
state */
                                        if ( grfLedStatus[SHUTTLE_LED] )        /* if shuttle
is on */
                                        {
                                                gwPlaySpd = gwStorePlaySpd;
                                                UiDispRtSpd( gwPlaySpd, SPD_X_DISP, SPD_Y_DISP
);
                                        }
                                        AccessSubMenu( &sSegEdit );
                                        break;

                                case SOFT2:
                                        break;

                                case SOFT3:
                                        break;

                                case SOFT4:
                                        /* save list */
                                        break;
                                case SOFT5:
                                        gsUiState.eCurrMode = SEG_LIST;
                                        if ( grfLedStatus[SHUTTLE_LED] )        /* if shuttle
is on */
                                        {
                                                gwPlaySpd = gwStorePlaySpd;
                                                UiDispRtSpd( gwPlaySpd, SPD_X_DISP, SPD_Y_DISP
);
                                        }
                                        AccessSubMenu( &sSegList );
                                        break;

#if 0   /* kevin - new code ? */
                                case MARK_IN:
                                        MarkInSegTc();
                                        break;

                                case MARK_OUT:
                                        MarkOutSegTc();
                                        break;
#endif  /* kevin */

                                default:
                                        CheckMenuChange(  GetButtonID(
sEvent->uData.sButtonUp.rbButtonId ), SEG );
                        }
                        break;
        }
}

        static void
SegListProcess( sEvent )
        MAIN_EVENT *sEvent;
{
        switch( sEvent->eType )
```

```
	{
		case BUTTONDOWN_EVENT:
			switch( geButton = GetButtonID( sEvent->uData.sButtonUp.rbButtonId ))
			{
				case SOFT1:
					gwLastPulseCount = 1;
					gsUiState.eCurrMode = SEG_EDIT;		/* set new current
state */
					if ( grfLedStatus[SHUTTLE_LED] )	/* if shuttle
is on */
					{
						gwPlaySpd = gwStorePlaySpd;
						UiDispRtSpd( gwPlaySpd, SPD_X_DISP, SPD_Y_DISP
);
					}
					AccessSubMenu( &sSegEdit );
					break;

				case SOFT2:
					ClearSegList();   /* Clear the EEPROM */
					break;

				case SOFT3:
					break;

				case SOFT4:
					break;

				case SOFT5:
					geButton = SEG;
					CheckMenuChange( geButton, SEG_LIST );
					break;
				case PLAY_FWD:
				case PLAY_REV:
					gfCheckSecondPress = FALSE;
					CheckMenuChange( SEG, ZERO );
					gsUiState.eCurrMode = SEG;
					CheckMenuChange( geButton, ZERO );
					break;

				default:
					CheckMenuChange( GetButtonID(
sEvent->uData.sButtonUp.rbButtonId ), SEG_LIST );
			}
			break;
	}
}


	static void
ClipListProcess( sEvent )
	MAIN_EVENT *sEvent;
{
	switch( sEvent->eType )
	{
		case BUTTONDOWN_EVENT:
			switch( geButton = GetButtonID( sEvent->uData.sButtonUp.rbButtonId ))
			{
				case SOFT1:
					break;

				case SOFT2:
					break;

				case SOFT3:
					break;

				case SOFT4:
					break;

				case SOFT5:
					geButton = CLIP;
					CheckMenuChange( geButton, CLIP_LIST );
					break;
```

```
                        default:
                                C h e c k M e n u C h a n g e (   G e t B u t t o n I D (
sEvent->uData.sButtonUp.rbButtonId ), CLIP_LIST );
                        }
                        break;
        }
}


        static void
MacroListProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        break;

                                case SOFT2:
                                        ClearMacros();
                                        break;
                                case SOFT3:
                                        break;

                                case SOFT4:
                                        break;

                                case SOFT5:
                                        geButton = MACRO;
                                        CheckMenuChange( geButton, MACRO_LIST );
                                        break;

                                default:
                                        C h e c k M e n u C h a n g e (   G e t B u t t o n I D (
sEvent->uData.sButtonUp.rbButtonId ), MACRO_LIST );
                        }
                        break;
        }
}


        static void
RemarkClipProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        break;

                                case SOFT2:
                                        ChangeStrOnField( 2, CLIP_MENU, 1, prstrCineOutput, 10,
8 );

                                        ShowStr( 5, CLIP_MENU, prstrCineOutput, 30, 3 );
                                        break;

                                case SOFT3:
                                        CheckMenuChange( CINE, ZERO );
                                        break;

                                case SOFT4:
                                        break;

                                case SOFT5:
                                        if ( StrCmp( gsUiState.pstrPlayMode, "CINE" ))
                                                CheckMenuChange( CINE, ZERO );
                                        else if ( StrCmp( gsUiState.pstrPlayMode, "CLIP" ))
                                                CheckMenuChange( CLIP, ZERO );
                                        break;
```

```
                        default:
                                C h e c k M e n u C h a n g e (   G e t B u t t o n I D (
sEvent->uData.sButtonUp.rbButtonId ), ZERO );
                        }
                        break;
        }
}


        static void
Process( sEvent )
        MAIN_EVENT *sEvent;
{
        switch( sEvent->eType )
        {

                case BUTTONDOWN_EVENT:
                {
#if 0
                        CheckMenuChange( GetButtonID( sEvent->uData.sButtonUp.rbButtonId ), IDLE
);
#endif
                        break;
                }

                default:
                        break;
        }

}


        static void
OutputSetupProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        ChangeStrOnField( 1, OUTPUT_STP_MENU, 1, prstrOutputNum,
1, 8 );
                                        break;

                                case SOFT2:
                                        ChangeStrOnField( 2, OUTPUT_STP_MENU, 1, prstrHtiming,
10, 8 );
                                        break;

                                case SOFT3:
                                        ChangeStrOnField( 3, OUTPUT_STP_MENU, 1, prstrOutputBit,
18, 8 );
                                        break;

                                case SOFT4:
StrCpy( gStr1, "BA" );
PrintDec( gStr2, (UINT16)sizeof(prstrToggle), 1, 0, 9 );
StrCat( gStr1, gStr2 );
StrCat( gStr1, ":" );
UiDispStr( gStr1, 1, 2 );
                                        SelectBySoftKey( sizeof( prstrToggle ),
                                                                                        (UN6
*) &geViEnabled );
StrCpy( gStr1, "B" );
PrintDec( gStr2, (UINT16)geViEnabled, 1, 0, 9 );
StrCat( gStr1, gStr2 );
StrCat( gStr1, ":" );
UiDispStr( gStr1, 1, 4 );
                                        ShowTheChoice( geButton, prstrToggle, geViEnabled );
                                        UiDispStr("Sed", 1, 6 );
                                        break;

                                case SOFT5:
```

```
                                        SelectBySoftKey( sizeof( rstrOutputMode ), &geOutputMode
);
                                        ShowTheChoice( geButton, rstrOutputMode, geOutputMode
);
                                        ShowChoiceAsStatus( 30, 3, rstrOutputMode, geOutputMode
);
                                        switch ( geOutputMode )
                                        {
                                                case    OUT_MODE_FIELD:
                                                case    OUT_MODE_INTRP_FD:
                                                        gfFieldMode = TRUE;
                                                        break;

                                                case    OUT_MODE_AUTO_FR:
                                                case    OUT_MODE_FRAME:
                                                case    OUT_MODE_FILM22:
                                                case    OUT_MODE_FILM32:
                                                case    OUT_MODE_BYPASS:
                                                        gfFieldMode = FALSE;
                                                        break;
                                        }
                                        if ( gfFieldMode )
                                                UiDispStr( "Fld#", 21, 1 );
                                        else
                                                UiDispStr( "Frm#", 21, 1 );

                                        UiDispRtFieldAndTc( TRUE, TRUE );                /*
field # and Tc */
                                        break;

                                default:
                                        C h e c k M e n u C h a n g e (   G e t B u t t o n I D (
sEvent->uData.sButtonUp.rbButtonId ), OUTPUT_SETUP );
                        }
                        break;
        }
}


        static void
InputSetupProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        ChangeStrOnField( 1, INPUT_STP_MENU, 1, prstrInput, 1,
8 );
                                        ShowInputSource();
                                        break;

                                case SOFT2:
                                        ChangeStrOnField( 2, INPUT_STP_MENU, 2, prstrSource, 10,
8 );
                                        ShowInputSource();
                                        break;

                                case SOFT3:
                                        ChangeStrOnField( 3, INPUT_STP_MENU, 1, prstrVidKey, 18,
8 );
                                        ShowInputSource();
                                        break;

                                case SOFT4:
                                        ChangeStrOnField( 4, INPUT_STP_MENU, 3, prstrType, 27,
8 );
                                        ShowInputSource();
                                        break;

                                case SOFT5:
                                        ChangeStrOnField( 5, INPUT_STP_MENU, 4, prstrRefSync,
35, 8 );
```

```
                                default:
                                        CheckMenuChange(  GetButtonID(
sEvent->uData.sButtonUp.rbButtonId ), INPUT_SETUP );
                        }
                        break;
        }
}


        static void
RecordSetupProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        break;

                                case SOFT2:
                                        if (( gbChToRec & CH_VIDEO ) != CH_VIDEO )
                                        {
                                                gbChToRec |= CH_VIDEO;
                                                eVideo = TOGGLE_ON;
                                        }
                                        else
                                        {
                                                gbChToRec &= ~CH_VIDEO;
                                                eVideo = TOGGLE_OFF;
                                        }
                                        ShowTheChoice( geButton, prstrToggle, eVideo );
                                        break;

                                case SOFT3:
                                        break;

                                case SOFT4:
                                        switch ( eAudio )
                                        {
                                                case AUDIO_OFF:
                                                        gbChToRec |= CH_AUDIO1;
                                                        gbChToRec &= ~CH_AUDIO2;
                                                        eAudio = AUDIO_1;
                                                        break;

                                                case AUDIO_1:
                                                        gbChToRec |= CH_AUDIO2;
                                                        gbChToRec &= ~CH_AUDIO1;
                                                        eAudio = AUDIO_2;
                                                        break;

                                                case AUDIO_2:
                                                        gbChToRec |= CH_AUDIO1;
                                                        gbChToRec |= CH_AUDIO2;
                                                        eAudio = AUDIO_BOTH;
                                                        break;

                                                case AUDIO_BOTH:
                                                        gbChToRec &= ~CH_AUDIO1;
                                                        gbChToRec &= ~CH_AUDIO2;
                                                        eAudio = AUDIO_OFF;
                                                        break;
                                        }
                                        ShowTheChoice( geButton, rstrAudio, eAudio );
                                        break;

                                case SOFT5:
                                        break;

#if 0   /* kevin - leave here */
                                case MARK_IN:
                                        gwRecIn += ;
                                        break;
```

```
                                        case MARK_OUT:
                                                gwRecOut -= ;
                                                break;

#endif   /* kevin */
                                        default:
                                                CheckMenuChange(   GetButtonID(
sEvent->uData.sButtonUp.rbButtonId ), RECORD_SETUP );
                                }
                                break;
                }
}


                static void
AudioSetupProcess( sEvent )
                MAIN_EVENT *sEvent;
{
                switch( sEvent->eType )
                {
                        case BUTTONDOWN_EVENT:
                                switch( geButton = GetButtonID( sEvent->uData.sButtonUp.rbButtonId ))
                                {
                                        case SOFT1:
                                                break;

                                        case SOFT2:
                                                break;

                                        case SOFT3:
                                                break;

                                        case SOFT4:
                                                break;

                                        case SOFT5:
                                                break;

                                        default:
                                                CheckMenuChange(   GetButtonID(
sEvent->uData.sButtonUp.rbButtonId ), AUDIO_SETUP );
                                }
                                break;
                }
}


                static void
TCodeSetupProcess( sEvent )
                MAIN_EVENT *sEvent;
{
                switch( sEvent->eType )
                {
                        case BUTTONDOWN_EVENT:
                                switch( geButton = GetButtonID( sEvent->uData.sButtonUp.rbButtonId ))
                                {
                                        case SOFT1:
                                                ChangeStrOnField( 1, TCODE_STP_MENU, 1, prstrTCodeFormat,
1, 8 );

                                                gsUiState.pstrTCode = prstrTCode[ grbiSoft[ TCODE_STP_MENU
][ 0 ]];

                                                UiDispStr( gsUiState.pstrTCode, 39, 2 );
                                                break;

                                        case SOFT2:
                                                break;

                                        case SOFT3:
                                                break;

                                        case SOFT4:
                                                if ( gfTcEntry == FALSE )
                                                {
                                                        gfTcEntry = TRUE;
```

```
                                        UiDispStr( "{}", 41, 6 );
                                }
                                else
                                {
                                        gfTcEntry = FALSE;
                                        UiDispStr( "[]", 41, 6 );
                                }

                        case SOFT5:
                                break;

                        default:
                                C h e c k M e n u C h a n g e (   G e t B u t t o n I D (
sEvent->uData.sButtonUp.rbButtonId ), TCODE_SETUP );
                }
                break;
        }
}


        static void
RmoteSetupProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        SelectBySoftKey( sizeof( rstrPortNo ), &gePortNo );
                                        ShowTheChoice( geButton, rstrPortNo, gePortNo );
                                        break;

                                case SOFT2:
                                        break;

                                case SOFT3:
                                        SelectBySoftKey( sizeof( rstrProtocol ), &geProtocol );
                                        ShowTheChoice( geButton, rstrProtocol, geProtocol );
                                        switch ( geProtocol )
                                        {
                                                case AMPEX:
                                                        SetupComAmpex( (UINT8) gePortNo );
                                                        break;

                                                case SONY:
                                                        break;

                                                case SMPTE:
                                                        break;
                                                case CMX:
                                                        break;
                                        }
                                        break;

                                case SOFT4:
                                        SelectBySoftKey( sizeof( rstrFldDom ), &geFldDom );
                                        ShowTheChoice( geButton, rstrFldDom, geFldDom );
                                        break;

                                case SOFT5:
                                        break;

                                default:
                                        C h e c k M e n u C h a n g e (   G e t B u t t o n I D (
sEvent->uData.sButtonUp.rbButtonId ), RMOTE_SETUP );
                        }
                        break;
        }
}

        static void
GPISetupProcess( sEvent )
```

```
        MAIN_EVENT *sEvent;
{
        switch( sEvent->eType )
        {
                case BUTTONDOWN_EVENT:
                {
                        switch( geButton = GetButtonID( sEvent->uData.sButtonUp.rbButtonId ))
                        {
                                case SOFT1:
                                        break;

                                case SOFT2:
                                        break;

                                case SOFT3:
                                        break;

                                case SOFT4:
                                        break;

                                case SOFT5:
                                        break;

                                default:
                                        CheckMenuChange( GetButtonID(
sEvent->uData.sButtonUp.rbButtonId ), GPI_SETUP );
                        }
                        break;

                }
                default:
                        CheckMenuChange( GetButtonID( sEvent->uData.sButtonUp.rbButtonId ), GPI_SETUP
);
        }
}


        static void
DubDumpProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        break;

                                case SOFT2:
                                        break;

                                case SOFT3:
                                        break;

                                case SOFT4:
                                        break;

                                case SOFT5:
                                        break;

                                default:
                                        CheckMenuChange( GetButtonID(
sEvent->uData.sButtonUp.rbButtonId ), DUB_DUMP );
                        }
                        break;
        }
}


        static void
RecordLockProcess( sEvent )
        MAIN_EVENT *sEvent;
{
```

```
switch( sEvent->eType )
{
        case BUTTONDOWN_EVENT:
                switch( geButton = GetButtonID( sEvent->uData.sButtonUp.rbButtonId ))
                {
                        case SOFT1:
                                break;

                        case SOFT2:
                                break;

                        case SOFT3:
                                gfDataEntry = YES;
                                break;

                        case SOFT4:
                                break;

                        case SOFT5:
                                break;

                        case CLEAR_NUMERIC:
                                {
                                        UINT8 i;

                                        UiDispStr( "                ", 1, 6 );
                                        gbiCharStr = 0;
                                        for ( i = 0; i <= 8; i++ )
                                                gstrCharName[i] = '\0';
                                }
                                break;

                        case DO_IT:
                                if ( CharacterEntry() == '/' )
                                {
                                        UINT8 i;
                                        gfDataEntry = NO;
                                        UiDispStr( "                ", 1, 6 );
                                        UiDispStr( gstrCharName, 31, 3 );
                                        gbiCharStr = 0;
                                        for ( i = 0; i <= 8; i++ )
                                                gstrCharName[i] = '\0';
                                }
                                break;

                        default:
                                C h e c k M e n u C h a n g e (   G e t B u t t o n I D (
sEvent->uData.sButtonUp.rbButtonId ), RECORD_LOCK );
                }
                break;

        case ENCODER_EVENT:
                if ( gwPulseCount > gwLastPulseCount )
                {
                        gstrCharDisplay[0] = (UINT8) ('/' + biCharTable);
                        UiDispStr( gstrCharDisplay, 15, 6 );
                        if ( biCharTable == 43 )
                                biCharTable = 0;
                        else if ( biCharTable == 10 )
                                biCharTable = 18;
                        else
                                biCharTable += 1;
                }
                else if ( gwPulseCount < gwLastPulseCount )
                {
                        gstrCharDisplay[0] = (UINT8) ('/' + biCharTable);
                        UiDispStr( gstrCharDisplay, 15, 6 );
                        if ( biCharTable == 0 )
                                biCharTable = 43;
                        else if ( biCharTable == 18 )
                                biCharTable = 10;
                        else
                                biCharTable -= 1;
                }
                break;
```

```
        }
}

        static void
MacroProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        if ( gfRecMacro == FALSE )
                                        {
                                                geModeBeforeMacro = gsUiState.eLastMode;
                                                gfRecMacro = TRUE;
                                        }
                                        if ( gfRunMacro == TRUE )
                                                gfRunMacro = FALSE;
                                        gwMacroNo = 0;
                                        gwMacroTotalNo = 0;
                                        geButton = geModeBeforeMacro;
                                        CheckMenuChange( geButton, MACRO );
                                        break;

                                case SOFT2:
                                        if ( gwMacroTotalNo == 0 )
                                                UiDispError( grstrDispErrMsg, 6, WARNING );
                                        else if ( gfRunMacro == FALSE )
                                        {
                                                gwMacroNo = 0;
                                                gfRunMacro = TRUE;
                                                gfLoadMacro = TRUE;
                                                if ( gfNotMenuButton == TRUE )
                                                {
                                                        gfNotMenuButton = FALSE;
                                                        geButton = geModeBeforeMacro;
                                                        CheckMenuChange( geButton, MACRO );
                                                }
                                        }
                                        else if ( gfRunMacro == TRUE )
                                        {
                                                /* intend to resume */
                                                gfPauseMacro = FALSE;
                                                UiDispStr( " Run  ", 11, 8 );
                                                if ( gfMacroPlay == TRUE )
                                                {
                                                        gfResumeMacroPlay = TRUE;
                                                }
                                                else
                                                {
                                                        if ( gwMacroNo == gwMacroTotalNo )
                                                        {
                                                                gfLoadMacro = FALSE;
                                                                gfEndMacro = TRUE;
                                                        }
                                                        else
                                                                gfLoadMacro = TRUE;
                                                }
                                        }
                                        break;

                                case SOFT3:
                                        break;

                                case SOFT4:
                                        gwLastPulseCount = 1;
                                        gsUiState.eCurrMode = MACRO_EDIT;                 /*
new current state */

                                        if ( grfLedStatus[SHUTTLE_LED] )         /* if shuttle
is on */
                                        {
```

```
                        gwPlaySpd = gwStorePlaySpd;
                        UiDispRtSpd( gwPlaySpd, SPD_X_DISP, SPD_Y_DISP
);
                }
                AccessSubMenu( &sMacroEdit );
                break;

        case SOFT5:
                gsUiState.eCurrMode = MACRO_LIST;               /*
new current state */
                if ( grfLedStatus[SHUTTLE_LED] )        /* if shuttle
is on */
                {
                        gwPlaySpd = gwStorePlaySpd;
                        UiDispRtSpd( gwPlaySpd, SPD_X_DISP, SPD_Y_DISP
);
                }
                AccessSubMenu( &sMacroList );
                break;

        case CLEAR_NUMERIC:
                gfKeypadError = FALSE;
        case MACRO:
                break;

        default:
                C h e c k M e n u C h a n g e (   G e t B u t t o n I D (
sEvent->uData.sButtonUp.rbButtonId ), MACRO );
                        }
                        break;
        }
}


        static void
ClipEditProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        if ( gfCheckSecondPress == FALSE )
                                        {
                                                gfCheckSecondPress = TRUE;
                                                ChangeEnterField();
                                        }
                                        else
                                        {
                                                if ( gfCheckWaitTime == OFF )
                                                {
                                                        gliWaitTime = 0;
                                                        ChangeEnterField();
                                                }
                                                else
                                                {
                                                        UiClearSpecifiedLine( LINE_2 );
                                                        UiDispStr( "ID    In      Out
   Owner        ", 1, 2 );
                                                        gfCheckSecondPress = FALSE;
                                                        gliWaitTime = 0;
                                                        ChangeEnterField();
                                                        gbiField = 1;
                                                        gfCheckWaitTime = OFF;
                                                }
                                        }
                                        break;

                                case SOFT2:
/*                                      DeleteHighLightedClip();*/
                                        break;
```

```
                    case SOFT3:
                            break;

                    case SOFT4:
                            break;

                    case SOFT5:
                            break;

#if !RTD
                    case MARK_IN:
                            gwMarkIn += 20;;;;;
                            break;
                    case MARK_OUT:
                            gwMarkOut -= 20;;;;;
                            break;

                    case STEP_FWD:
                            if ( gfCheckSecondPress == TRUE )
                                    ChangeFieldValue( INCREASE );
                            else
                                    ScrollSegmentList( SCROLL_DOWN );
                            break;

                    case STEP_REV:
                            if ( gfCheckSecondPress == TRUE )
                                    ChangeFieldValue( DECREASE );
                            else
                                    ScrollSegmentList( SCROLL_UP );
                            break;
#endif

                    case PLAY_FWD:
                    case PLAY_REV:
                            gfCheckSecondPress = FALSE;
                            CheckMenuChange( SEG, ZERO );
                            CheckMenuChange( geButton, ZERO );
                            break;

                    case DO_IT:
                            if ( gfCheckSecondPress == TRUE )
                            {
                                    switch ( gbiField )
                                    {
                                            case 3:
                                                    MarkInSegTc();
                                                    break;

                                            case 4:
                                                    MarkOutSegTc();
                                                    break;

                                            case 5:
                                                    break;
                                    }

                                    if ( gfKeypadError == FALSE )
                                            ResetKeypadEntry();
                                    ShowSegmentList();
                            }
                            break;

                    default:
                            C h e c k M e n u C h a n g e (   G e t B u t t o n I D (
sEvent->uData.sButtonUp.rbButtonId ), ZERO );
                    }
                    break;
        }
}


        static void
SegEditProcess( sEvent )
        MAIN_EVENT *sEvent;
```

```
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        if ( gfCheckSecondPress == FALSE )
                                        {
                                                gfCheckSecondPress = TRUE;
                                                ChangeEnterField();
                                                gfSegModify = TRUE;
                                        }
                                        else
                                        {
                                                if ( gfCheckWaitTime == OFF )
                                                {
                                                        gliWaitTime = 0;
                                                        ChangeEnterField();
                                                }
                                                else
                                                {
                                                        UiClearSpecifiedLine( LINE_2 );
                                                        UiDispStr( "ID   In     Out   Speed
P Mode Length ", 1, 2 );

                                                        gfCheckSecondPress = FALSE;
                                                        gliWaitTime = 0;
                                                        ChangeEnterField();
                                                        gbiField = 1;
                                                        gfCheckWaitTime = OFF;
                                                        gfSegModify = FALSE;
                                                }
                                        }
                                        break;

                                case SOFT2:
                                        DeleteListSegment();
                                        break;

                                case SOFT3:
                                        CopyListSegment();
                                        break;

                                case SOFT4:
                                        InsertListSegment();
                                        break;

                                case SOFT5:
                                        gsUiState.eCurrMode = SEG_LIST;
                                        if ( grfLedStatus[SHUTTLE_LED] )        /* if shuttle
is on */
                                        {
                                                gwPlaySpd = gwStorePlaySpd;
                                                UiDispRtSpd( gwPlaySpd, SPD_X_DISP, SPD_Y_DISP
);
                                        }
                                        AccessSubMenu( &sSegList );
                                        break;

#if !RTD
                                case MARK_IN:
                                        gwMarkIn += 20;;;;;
                                        break;

                                case MARK_OUT:
                                        gwMarkOut -= 20;;;;;
                                        break;

                                case STEP_FWD:
                                        if ( gfCheckSecondPress == TRUE )
                                                ChangeFieldValue( INCREASE );
                                        else
                                                ScrollSegmentList( SCROLL_DOWN );
```

```
                                        break;

                                case STEP_REV:
                                        if ( gfCheckSecondPress == TRUE )
                                                ChangeFieldValue( DECREASE );
                                        else
                                                ScrollSegmentList( SCROLL_UP );
                                        break;
#endif
                                case PLAY_FWD:
                                case PLAY_REV:
                                        gfCheckSecondPress = FALSE;
                                        CheckMenuChange( SEG, ZERO );
                                        gsUiState.eCurrMode = SEG;
                                        CheckMenuChange( geButton, ZERO );
                                        break;

                                case DO_IT:
                                        if (( gfSegModify == TRUE ) && ( gfEntryExist == YES ))
                                        {
                                                switch ( gbiField )
                                                {
                                                        case ENTER_ID:
                                                                SegID();
                                                                break;

                                                        case ENTER_SEG_IN:
                                                                MarkInSegTc();
                                                                break;

                                                        case ENTER_SEG_OUT:
                                                                MarkOutSegTc();
                                                                break;

                                                        case ENTER_SEG_SPD:
                                                                SegSpd();
                                                                break;
                                                }

                                                ShowSegmentList();
                                                if ( gfKeypadError == FALSE )
                                                        ResetKeypadEntry();
                                        }
                                        break;

                                default:
                                        CheckMenuChange( GetButtonID(
sEvent->uData.sButtonUp.rbButtonId ), ZERO );
                        }
                        break;
        }
}


        static void
MacroEditProcess( sEvent )
        MAIN_EVENT *sEvent;
{
        switch( sEvent->eType )
        {
                case BUTTONDOWN_EVENT:
                        switch( geButton = GetButtonID( sEvent->uData.sButtonUp.rbButtonId ))
                        {
                                case SOFT1:
                                        if ( gfCheckSecondPress == FALSE )
                                                gfCheckSecondPress = TRUE;
                                        else
```

```
                {
                        if ( gfCheckWaitTime == OFF )
                                gliWaitTime = 0;
                        else
                        {
                                gfCheckSecondPress = FALSE;
                                gliWaitTime = 0;
                                gbiField = 1;
                                gfCheckWaitTime = OFF;
                        }
                }
                break;

        case SOFT2:
                DeleteMacroStep();
                break;

        case SOFT3:
                CopyMacroStep();
                break;

        case SOFT4:
                InsertMacroStep();
                break;

        case SOFT5:
                break;

#if !RTD
        case MARK_IN:
                gwMarkIn += 20;;;;;
                break;

        case MARK_OUT:
                gwMarkOut -= 20;;;;;
                break;

        case STEP_FWD:
                if ( gfCheckSecondPress == TRUE )
                        ChangeFieldValue( INCREASE );
                else
                        ScrollSegmentList( SCROLL_DOWN );
                break;

        case STEP_REV:
                if ( gfCheckSecondPress == TRUE )
                        ChangeFieldValue( DECREASE );
                else
                        ScrollSegmentList( SCROLL_UP );
                break;
#endif

        case PLAY_FWD:
        case PLAY_REV:
                gfCheckSecondPress = FALSE;
                break;

        case DO_IT:
                if ( gfCheckSecondPress == TRUE )
                {
                        switch ( gbiField )
                        {
                                case 3:
                                        MarkInSegTc();
                                        break;

                                case 4:

                                        MarkOutSegTc();
                                        break;

                                case 5:
                                        break;
                        }
```

```
                                        if ( gfKeypadError == FALSE )
                                                ResetKeypadEntry();
                                        ShowSegmentList();
                                }
                                break;

                        default:
                                C h e c k M e n u C h a n g e (   G e t B u t t o n I D (
sEvent->uData.sButtonUp.rbButtonId ), ZERO );
                        }
                        break;
        }
}


        static void
DiagTestProcess( sEvent )
        MAIN_EVENT *sEvent;
{
        switch( sEvent->eType )
        {
                case BUTTONDOWN_EVENT:
                {
                        switch( geButton = GetButtonID( sEvent->uData.sButtonUp.rbButtonId ))
                        {
                                case SOFT1:
                                                break;

                                case SOFT2:
                                                break;

                                case SOFT3:
                                                break;

                                case SOFT4:
                                                break;

                                case SOFT5:
                                                break;
                        }
                }
                default:
                {
                        CheckMenuChange( GetButtonID( sEvent->uData.sButtonUp.rbButtonId ), DIAG_TEST
);
                        break;
                }
        }
}


        static void
BackupProcess( sEvent )
        MAIN_EVENT *sEvent;
{
        switch( sEvent->eType )
        {
                case BUTTONDOWN_EVENT:
                {
                        switch( geButton = GetButtonID( sEvent->uData.sButtonUp.rbButtonId ))
                        {
                                case SOFT1:
                                                break;

                                case SOFT2:
                                                break;

                                case SOFT3:
                                                break;

                                case SOFT4:
                                                break;

                                case SOFT5:
                                                break;
```

```
				}
			}
			default:
			{
				CheckMenuChange( GetButtonID( sEvent->uData.sButtonUp.rbButtonId ), BACKUP
);
				break;
			}
		}
}


/*
 * Check any existing functions which are muturally exclusive with the
 * currently enabled function and disable them.
 */
	void
ChkExclFuncs( eButton )
	BUTTON_ID eButton;
{
	switch ( eButton )
	{
		case STOP:
		case PLAY_FWD:
		case RECORD:
		case PLAY_REV:
		case VARI_SPEED:
		case STEP_REV:
		case STEP_FWD:
		case BYPASS:
			if ( grfLedStatus[SHUTTLE_LED] )	/* if shuttle is on */
			{
				gwPlaySpd = gwStorePlaySpd;
				UiDispRtSpd( gwPlaySpd, SPD_X_DISP, SPD_Y_DISP );
				if ( gfVariSpeedSession == ON )
					UiSetLed( VARI_SPEED_LED, ON );
				if( eButton == STOP ||
					eButton == PLAY_FWD || eButton == PLAY_REV )
				{
					gwPlayState		= PLAY_STATE_NULL;
					gfPlayAborted	= FALSE;
				}
			}
			break;
	}
}

/*
**	routine handles immediate key entries
**	by switching menu handler in control
*/

	void
CheckMenuChange( eButton, eCurr )
	BUTTON_ID eButton, eCurr;
{
	switch ( gsUiState.eCurrMode )
	{
		case NORM:
		case CLIP:
		case SEG:
		case SEG_EDIT:
		case INPUT_SETUP:
		case RECORD_SETUP:
		case MACRO:
		case DUB_DUMP:	/* for debug only ;;;;; */
			if ( CheckKeypadEntry( eButton ) == TRUE )
				return;

		default:
			break;
	}
	gfCheckSecondPress = FALSE;
	gbiField = 1;

	ChkExclFuncs( eButton );
```

```
switch ( eButton )
{
        case STEP_FWD:
                if( ( gwRt3State & RT3_DISK_STATE ) == RT3_RECORDING )
                        UiBeep();
                else
                        StepFwd();
                break;

        case STEP_REV:
                if( ( gwRt3State & RT3_DISK_STATE ) == RT3_RECORDING )
                        UiBeep();
                else
                        StepRev();
                break;

        case PLAY_FWD:
                if(     ( ( gwRt3State & RT3_DISK_STATE ) == RT3_RECORDING ) ||
                        ( ( grfLedStatus[RECORD_LED] && !grfLedStatus[SWAP_LED] ) &&
                        ( ( gwRt3State & RT3_DISK_STATE ) == RT3_PLAYING ) ) )
                        UiBeep();
                else
                        PlayFwd();
                break;

        case PLAY_REV:
                if( ( gwRt3State & RT3_DISK_STATE ) == RT3_RECORDING )
                        UiBeep();
                else
                        PlayRev();
                break;

        case BYPASS:
                break;

        case SHUTTLE:
                if( ( gwRt3State & RT3_DISK_STATE ) == RT3_RECORDING )
                        UiBeep();
                else
                        Shuttle();
                break;

        default:
                break;
}

if( eButton == eCurr )
        return;

if ( gfDataEntry == YES )
{
        UINT8 i;

        gfDataEntry = NO;
        gbiCharStr = 0;
        for ( i = 0; i <= 8; i++ )
                gstrCharName[i] = '\0';
}

fKeypadEntry = FALSE;
gfFieldEntry = FALSE;

switch( eButton )
{
        case NORM:
                if( ( gwRt3State & RT3_DISK_STATE ) == RT3_DISK_IDLE )
                        StartProcess( &sNorm );
                break;

        case CINE:
                if( ( gwRt3State & RT3_DISK_STATE ) == RT3_DISK_IDLE )
                        StartProcess( &sCine );
                break;
```

```
case OUTPUT_SETUP:
        StartProcess( &sOutputSetup );
        break;

case INPUT_SETUP:
        StartProcess( &sInputSetup );
        break;

case CLIP:
        if( ( gwRt3State & RT3_DISK_STATE ) == RT3_DISK_IDLE )
                StartProcess( &sClip );
        break;

case SEG:
        if( ( gwRt3State & RT3_DISK_STATE ) == RT3_DISK_IDLE )
                StartProcess( &sSeg );
        break;

case BYPASS:
        if( ( gwRt3State & RT3_DISK_STATE ) != RT3_DISK_IDLE )
                UiBeep();
        else
                Bypass();
        break;

case RECORD_SETUP:
        StartProcess( &sRecordSetup );
        break;

case AUDIO_SETUP:
        StartProcess( &sAudioSetup );
        break;

case TCODE_SETUP:
        StartProcess( &sTCodeSetup );

        break;

case RMOTE_SETUP:
        StartProcess( &sRmoteSetup );
        break;

case GPI_SETUP:
        StartProcess( &sGPISetup );
        break;

case DUB_DUMP:
        StartProcess( &sDubDump );
        break;

case VARI_SPEED:
        VariSpeed();
        return;

case SWAP:
        Swap();
        break;

case RECORD_LOCK:
        StartProcess( &sRecordLock );
        break;

case SMO_MO:
        SmoothMotion();
        break;

case RECORD:
        if( ( gwRt3State & RT3_DISK_STATE ) == RT3_DISK_IDLE )
                Record();
        return;

case PINGPONG:
        PingPong();
        break;
```

```
            case MACRO:
                    if ( grfLedStatus[MACRO_LED] )
                            if ( gfRecMacro == TRUE )
                            {
                                    UiDispStr( "                ", 1, MACRO_LINE );
                                    gwMacroTotalNo = gwMacroNo;
                                    WriteMacroTotalNo();
                                    gwMacroNo = 0;
                                    gfRecMacro = FALSE;
                            }
                    StartProcess( &sMacro );
                    break;

            case STOP:
                    Stop();
                    break;

            case LOOP:
                    Loop();
                    break;

            case BROWSE:
                    Browse();
                    break;

            case MARK_IN:
                    MarkIn();
                    break;

            case MARK_OUT:
                    MarkOut();
                    break;

            case SEG_INSERT:
                    SegInsert();
                    break;

            case INSERT_CLIP:
                    InsertClip();
                    break;

            case GRAB:
                    Grab();
                    break;

            case DIAG_TEST:
                    StartProcess( &sDiagTest );
                    break;

            case BACKUP:
                    StartProcess( &sBackup );
                    break;

            case GOTO:
                    Goto();
                    return;

            default:
                    break;
    }

    /*
     * If the keys being pressed are not Goto, VariSpeed and Record,
     * the keypad entry buffers have to be clear as menu changes.
     */
    if (( gfRecord == ON ) || ( gfGoto == ON ) || ( gfVariSpeed == ON ) ||
            ( gfEntryExist == YES ))
    {
            ResetKeypadEntry();
            gfRecord = OFF;
            gfGoto = OFF;
            gfVariSpeed = OFF;
    }
}
```

```
/* The routines defined here are to be relocated */

        void
ChangeStrOnField( bnKey, eMenu, bTotalOfFunc, prstrFieldMode, bDispX, bDispLine )
        UINT8   bnKey;
        MENU    eMenu;
        UINT8   bTotalOfFunc;
        UINT8   *prstrFieldMode[];
        UINT8   bDispX;
        UINT8   bDispLine;
{
        UINT8   biModeType;

        biModeType = grbiSoft[ eMenu ][ --bnKey ];
        if ( ++biModeType > bTotalOfFunc )
                biModeType = 0;
        UiDispStr( prstrFieldMode[ biModeType ], bDispX, bDispLine );
        grbiSoft[ eMenu ][ bnKey ] = biModeType;
}

/*
 * This routine is implemented in each menu process, the followings are
 * template to put in each soft key processing; "PortNo" can be replaced
 * with the specified name which is defined in RMODE.H.
 *                      SelectBySoftKey( sizeof( rstrPortNo ), &gePortNo );
 *                      ShowTheChoice( geButton, rstrPortNo, gePortNo );
 *
 * In menu initialization, only use ShowTheChoice( ... ) to show the current
 * choice and should specify the soft key constant, e.g. SOFT1 for the first
 * parameter, geButton.
 * If the choice is required to be shown on somewhere, then use
 * ShowChoiceAsStatus( ... ).
 *
 */
        static void
SelectBySoftKey( wnTotalChoice, pwCurrChoice )
        UINT16  wnTotalChoice;
        UINT16  *pwCurrChoice;
{
        wnTotalChoice /= 2;

        if ( ++(*pwCurrChoice) >= wnTotalChoice )
                *pwCurrChoice = 0;
}

        static void
ShowTheChoice( eButtonID, rstrSoftKeyChoices, wCurrChoice )
        BUTTON_ID eButtonID;
        UINT8   *rstrSoftKeyChoices[];
        UINT16  wCurrChoice;
{
        UINT8   bDispX;

        switch ( eButtonID )
        {
                case SOFT1:
                        bDispX = 1;
                                break;

                case SOFT2:
                        bDispX = 10;
                                break;

                case SOFT3:
                        bDispX = 18;
                                break;

                case SOFT4:
                        bDispX = 27;
                                break;

                case SOFT5:
                        bDispX = 35;
                                break;
        }
```

```
        UiDispStr( rstrSoftKeyChoices[ wCurrChoice ], bDispX, 8 );
}


        static void
ShowChoiceAsStatus( bXPos, bYPos, rstrSoftKeyChoices, wCurrChoice )
        UINT8   bXPos;
        UINT8   bYPos;
        UINT8   *rstrSoftKeyChoices[];
        UINT16  wCurrChoice;
{
        UiDispStr( rstrSoftKeyChoices[ wCurrChoice ], bXPos, bYPos );
}


        void
ShowStr( bnKey, eMenu, prstrFieldMode, bDispX, bDispLine )
        UINT8   bnKey;
        MENU    eMenu;
        UINT8   *prstrFieldMode[];
        UINT8   bDispX;
        UINT8   bDispLine;
{
        UiDispStr( prstrFieldMode[ grbiSoft[ eMenu ][ --bnKey ]], bDispX, bDispLine );
}

/*
 * This routine has to be accompanied with the menu mode assignment:
 * gsUiState.eCurrMode = ;
 */
        void
AccessSubMenu( pfnHotKey )
        HARD_KEY *pfnHotKey;
{
        (*pfnHotKey->Init)();
        gpsCurrHardKey = pfnHotKey;
}


        void
ShowTimeCode( bXPos, bYPos )
        UINT8 bXPos, bYPos;
{
        UINT8   FieldStr[12];

        PrintTcField( gFieldStr, bFieldValue[0], 0, FRAME_LIMIT );
        StrCat( gFieldStr, ":" );
        PrintTcField( FieldStr, bFieldValue[1], 0, SECOND_LIMIT );
        StrCat( gFieldStr, FieldStr );
        StrCat( gFieldStr, ":" );
        PrintTcField( FieldStr, bFieldValue[2], 0, MINUTE_LIMIT );
        StrCat( gFieldStr, FieldStr );
        StrCat( gFieldStr, ":" );
        PrintTcField( FieldStr, bFieldValue[3], 0, HOUR_LIMIT );
        StrCat( gFieldStr, FieldStr );
        UiDispStr( gFieldStr, bXPos, bYPos );
}

        static void
ShowInputSource()
{
#if 0
        if ( grbiSoft[ INPUT_STP_MENU ][ 0 ] == 0 )
        {
                UiDispStr( "                              ", 1, 2 );
                UiDispStr( "In1=", 1, 3 );
                if ( grbiSoft[ INPUT_STP_MENU ][ 1 ] < 2)
                {
                        gsUiState.pstrInput1Mode[0] = prstrSource1[ grbiSoft[ INPUT_STP_MENU ][
1 ]];
                }
                UiDispStr( gsUiState.pstrInput1Mode[0], 5, 3 );
                gsUiState.pstrInput1Mode[1] = prstrVidKey1[ grbiSoft[ INPUT_STP_MENU ][ 2 ]];
                UiDispStr( gsUiState.pstrInput1Mode[1], 11, 3 );
```

```
                gsUiState.pstrInput1Mode[2] = prstrType1[ grbiSoft[ INPUT_STP_MENU ][ 3 ]];
                UiDispStr( gsUiState.pstrInput1Mode[2], 16, 3 );
        }
        else if ( grbiSoft[ INPUT_STP_MENU ][ 0 ] == 1 )
        {

                UiDispStr( "In1=", 1, 2 );
                UiDispStr( gsUiState.pstrInput1Mode[0], 5, 2 );
                UiDispStr( gsUiState.pstrInput1Mode[1], 11, 2 );
                UiDispStr( gsUiState.pstrInput1Mode[2], 16, 2 );
                UiDispStr( "In2=", 1, 3 );
                if ( grbiSoft[ INPUT_STP_MENU ][ 1 ] < 2)
                {
                        gsUiState.pstrInput2Mode[0] = prstrSource1[ grbiSoft[ INPUT_STP_MENU ][
1 ]];
                }
                UiDispStr( gsUiState.pstrInput2Mode[0], 5, 3 );
                gsUiState.pstrInput2Mode[1] = prstrVidKey1[ grbiSoft[ INPUT_STP_MENU ][ 2 ]];
                UiDispStr( gsUiState.pstrInput2Mode[1], 11, 3 );
                gsUiState.pstrInput2Mode[2] = prstrType1[ grbiSoft[ INPUT_STP_MENU ][ 3 ]];
                UiDispStr( gsUiState.pstrInput2Mode[2], 6, 3 );
        }
#endif
}


/*
 *-------------------------------------------------------------------------
 *  rsegment.c   Copyright 1991 Accom Inc.
 *
 *      Responsible Person: Kevin Hsu
 *
 *      This file contains routines for segment list management.
 *-------------------------------------------------------------------------
 */
#include "rglobal.h"
#include "rui.h"
#include "rsegment.h"
#include "rtime.h"
#include "rdisk.h"

#if 0
#define EEPROM_DEBUG                    TRUE
#else
#define EEPROM_DEBUG                    FALSE
#endif

/*
 * local FUNCTION PROTOTYPE declaration.
 */
static SEGMENT *CreateListMember( void );
static SEGMENT *MemoryAlloc( void );
static void AppendList( SEGMENT * );
static void InsertMemberToList( SEGMENT * );
static void RemoveMemberFromList( SEGMENT * );
static void DispSegmentList( SEGMENT * );
static void ShowListFrmTLTotalLen( UINT8 );
static void DispParameters( SEGMENT *, UINT8 );
static void MoveSegmentListDown( void );
static void MoveSegmentListUp( void );
static FLAG CreateListHead( SEGMENT * );
static void AppendListTail( SEGMENT * );
static void     MoveListsDown( void );
static void     MoveListsUp( void );
static void     DispLists( void );
static void     DispEachList( UINT8, UINT8 );

        void
ClearSegList()
{
        UINT8 i;

        for ( i = 0 ; i < TOTAL_SEGS ; i++ )
```

```
		{
			rsList[ bCurrListNo-1 ][i].bSegmentIDNo = NULL;
			rsList[ bCurrListNo-1 ][i].bSequenceNo = NULL;
			rsList[ bCurrListNo-1 ][i].lInPoint = 0L;
			rsList[ bCurrListNo-1 ][i].lOutPoint = 0L;
			rsList[ bCurrListNo-1 ][i].wSpeed = 0;
			rsList[ bCurrListNo-1 ][i].pstrProfile = NULL;
			rsList[ bCurrListNo-1 ][i].pstrMode = NULL;
			rsList[ bCurrListNo-1 ][i].psPrev = NULL;
			rsList[ bCurrListNo-1 ][i].psNext = NULL;
		}
		gsSegList.wTotalLens[ bCurrListNo-1 ] = 0;
		rsListInfo[ bCurrListNo-1 ].wLen = 0;
		rsListInfo[ bCurrListNo-1 ].psListHead = NULL;
		rsListInfo[ bCurrListNo-1 ].psListTail = NULL;
		rsListInfo[ bCurrListNo-1 ].psHighLight = NULL;
		psListHead = NULL;
		psListTail = NULL;
		psHighLight = NULL;
		DispLists();
}


		void
InitSegLists()
{
		UINT8 i;
		SINT16  wSegAddrDiff;
		UINT16  wTotalLength;
		SEGMENT *psSegment, *psTailSeg;

		if ( gfClearingEEPROM == YES )
		{
			wSegAddrDiff = 0;
			gfClearingEEPROM = NO;
		}
		else
			wSegAddrDiff = (SINT16)( &rsList[0][0] - gsSegList.psListsHead );

#if EEPROM_DEBUG
PrintDec( gStr1, (SINT16)&rsList[0][0], 6, -32767, 32767 );;;;;
UiDispStr( gStr1, 1, 4 );;;;;
PrintDec( gStr1, (SINT16)gsSegList.psListsHead, 6, -32767, 32767 );;;;;
UiDispStr( gStr1, 11, 4 );;;;;
PrintDec( gStr1, (SINT16)wSegAddrDiff, 6, -32767, 32767 );;;;;
UiDispStr( gStr1, 21, 4 );;;;;
#endif

		gsSegList.psListsHead = &rsList[0][0];
		for ( i = 0 ; i < TOTAL_LISTS ; i++ )
		{
			wTotalLength = 0;
#if EEPROM_DEBUG
PrintDec( gStr1, (SINT16)rsList[i], 5, -32767, 32767 );;;;;
UiDispStr( gStr1, 1+8*i, 6 );;;;;
#endif
			psSegment = rsList[i];
			do
			{
#if EEPROM_DEBUG
PrintDec( gStr1, (SINT16)psSegment, 5, -32767, 32767 );;;;;
UiDispStr( gStr1, 1+8*i, 5 );;;;;
WaitTimeMS(2000);;;;;
#endif
				if ( psSegment->lOutPoint >= psSegment->lInPoint )
					wTotalLength += psSegment->lOutPoint - psSegment->lInPoint;
				else
					wTotalLength += psSegment->lInPoint - psSegment->lOutPoint;
				if ( psSegment->psPrev != NULL  )
					psSegment->psPrev = psSegment->psPrev + wSegAddrDiff;
				if ( psSegment->psNext != NULL )
					psSegment->psNext = psSegment->psNext + wSegAddrDiff;
				if ( psSegment->psNext == NULL )
					psTailSeg = psSegment;
```

```
                        psSegment = psSegment->psNext;
                }
                while( psSegment != NULL );
                if (( gsSegList.wTotalLens[i] != 0 ) &&
                        ( gsSegList.wTotalLens[i] == wTotalLength ))
                {
                        rsListInfo[i].psListTail = psTailSeg;
                        rsListInfo[i].psHighLight = &rsList[i][0];
                        rsListInfo[i].psListHead = &rsList[i][0];
                        rsListInfo[i].wLen = wTotalLength;
                }
#if EEPROM_DEBUG
PrintDec( gStr1, (SINT16)gsSegList.wTotalLens[i], 6, -32767, 32767 );;;;;
UiDispStr( gStr1, 1+8*i, 7 );;;;;
PrintDec( gStr1, (SINT16)rsListInfo[i].psListTail, 6, -32767, 32767 );;;;;
UiDispStr( gStr1, 1+8*i, 8 );;;;;
WaitTimeMS(2000);;;;;
#endif
        }

        if ( gsSegList.wTotalLens[0] )
        {
                wTotalLen = rsListInfo[0].wLen;
                psListHead = rsListInfo[0].psListHead;
                psHighLight = rsListInfo[0].psHighLight;
                psListTail = rsListInfo[0].psListTail;
        }
}

        void
AddNewMemberAtListEnd()
{
        SEGMENT *psSegmentMember;

        psSegmentMember = CreateListMember();
        if ( psSegmentMember != NULL )
                AppendList( psSegmentMember );
}

        void
AddNewMemberAfterListCurr()
{
        SEGMENT *psSegmentMember;

        psSegmentMember = CreateListMember();
        if ( psSegmentMember != NULL )
        {
                InsertMemberToList( psSegmentMember );
                if ( gsUiState.eCurrMode == SEG || gsUiState.eCurrMode == SEG_EDIT )
                        DispSegmentList( psHighLight );
        }
}

        void
DeleteListSegment()
{
        if ( psHighLight != NULL )
        {
                CopyListSegment();
                RemoveMemberFromList( psHighLight );

                ShowSegmentList();
        }
#if KVN_DEBUG
                        PrintDec( gStr1, psHighLight->bSequenceNo, 2, 0, 99 );;;;;
                        UiDispStr( gStr1, 1, 6 );;;;;
#endif /* !RTD */
}

        void
CopyListSegment()
{
        if ( psHighLight != NULL )
        {
                sBuffer.bSegmentIDNo = psHighLight->bSegmentIDNo;
```

```
                sBuffer.lInPoint = psHighLight->lInPoint;
                sBuffer.lOutPoint = psHighLight->lOutPoint;
                sBuffer.wSpeed = psHighLight->wSpeed;
                sBuffer.pstrProfile = psHighLight->pstrProfile;
                sBuffer.pstrMode = psHighLight->pstrMode;
        }
}

        void
InsertListSegment()
{
        SEGMENT *psSegmentMember;

        if ( sBuffer.bSegmentIDNo != NULL )
        {
                psSegmentMember = CreateListMember();
                if ( psSegmentMember != NULL )
                {
                        psSegmentMember->bSegmentIDNo = sBuffer.bSegmentIDNo;
                        psSegmentMember->lInPoint = sBuffer.lInPoint;
                        psSegmentMember->lOutPoint = sBuffer.lOutPoint;
                        psSegmentMember->wSpeed = sBuffer.wSpeed;
                        psSegmentMember->pstrProfile = sBuffer.pstrProfile;
                        psSegmentMember->pstrMode = sBuffer.pstrMode;
                        InsertMemberToList( psSegmentMember );
                        ShowSegmentList();
                }
                sBuffer.bSegmentIDNo = NULL;
        }
}

        void
UpdateSegListDisp( bSequenceNoCurr )
        UINT8 bSequenceNoCurr;
{

        SEGMENT *psSegmentMember = psListHead;
        SEGMENT *psSegment;

        /*
         * If no list, don't update the list display.
         */
        if( psListHead == NULL )
                return;

        for( ; psSegmentMember != NULL; psSegmentMember = psSegmentMember->psNext )
                if( psSegmentMember->bSequenceNo == bSequenceNoCurr )
                        break;

        if ( psSegmentMember == NULL )
                return;
        /*
         * Found it.

         */

        DispParameters( psSegmentMember, 4 );
        UiDispHighLight( HIGH_LIGHT_SEG, 4 );

        psSegment = psSegmentMember->psPrev;
        if ( psSegment == NULL )
                UiClearSpecifiedLine( LINE_3 );
        else
                DispParameters( psSegment, 3 );

        psSegment = psSegmentMember->psNext;
        if ( psSegment == NULL )
                UiClearSpecifiedLine( LINE_5 );
        else
                DispParameters( psSegment, 5 );
}

        void
ShowSegmentList()
{
```

```
        DispSegmentList( psHighLight );
}

        void
ScrollSegmentList( bScrollDir )
        UINT8 bScrollDir;
{
        switch ( bScrollDir )
        {
                case SCROLL_DOWN:
                        MoveSegmentListDown();
                        break;

                case SCROLL_UP:
                        MoveSegmentListUp();
        }
}

        void
ScrollSegLists( bScrollDir )
        UINT8 bScrollDir;
{
        gfSegListChanged                                = TRUE;

        switch ( bScrollDir )
        {
                case SCROLL_DOWN:
                        MoveListsDown();
                        break;

                case SCROLL_UP:
                        MoveListsUp();
                        break;
        }
}

        void
ShowSegLists()
{
        UiDispHighLight( HIGH_LIGHT_ALL, 4 );
        DispLists();
}

/*
 *-------------------------------------------------------------------------
 * The followings are link list management functions.
 *-------------------------------------------------------------------------
 */
        static void
MoveSegmentListDown()
{
        if (( psListHead == NULL ) && ( psListTail == NULL ))
                return;

        if ( psHighLight->psNext != NULL )
        {
                psHighLight = psHighLight->psNext;
                DispSegmentList( psHighLight );
        }
#if KVN_DEBUG
                        PrintDec( gStr1, psHighLight->bSequenceNo, 2, 0, 99 );;;;;
                        UiDispStr( gStr1, 1, 6 );;;;;
#endif /* RTD */
}

        static void
MoveSegmentListUp()
{
        if (( psListHead == NULL ) && ( psListTail == NULL ))
                return;
```

```
        if ( psHighLight->psPrev != NULL )
        {
                psHighLight = psHighLight->psPrev;
                DispSegmentList( psHighLight );
        }
#if KVN_DEBUG
                        PrintDec( gStr1, psHighLight->bSequenceNo, 2, 0, 99 );;;;;
                        UiDispStr( gStr1, 1, 6 );;;;;
#endif /* RTD */
}

        static void
MoveListsDown()
{
        if ( bCurrListNo < TOTAL_LISTS )
        {
                rsListInfo[ bCurrListNo-1 ].psListHead = psListHead;
                rsListInfo[ bCurrListNo-1 ].psListTail = psListTail;
                rsListInfo[ bCurrListNo-1 ].psHighLight = psHighLight;
                bCurrListNo++;
                wTotalLen = rsListInfo[ bCurrListNo-1 ].wLen;
                psListHead = rsListInfo[ bCurrListNo-1 ].psListHead;
                psListTail = rsListInfo[ bCurrListNo-1 ].psListTail;
                psHighLight = rsListInfo[ bCurrListNo-1 ].psHighLight;
                DispLists();
        }
}

        static void
MoveListsUp()
{
        if ( bCurrListNo > 1 )
        {
                rsListInfo[ bCurrListNo-1 ].psListHead = psListHead;
                rsListInfo[ bCurrListNo-1 ].psListTail = psListTail;
                rsListInfo[ bCurrListNo-1 ].psHighLight = psHighLight;
                bCurrListNo--;
                wTotalLen = rsListInfo[ bCurrListNo-1 ].wLen;
                psListHead = rsListInfo[ bCurrListNo-1 ].psListHead;
                psListTail = rsListInfo[ bCurrListNo-1 ].psListTail;
                psHighLight = rsListInfo[ bCurrListNo-1 ].psHighLight;
                DispLists();
        }
}

        static void
DispLists()
{
        DispEachList( bCurrListNo, 4 );
        if ( bCurrListNo - 1 >= 1 )
                DispEachList( (UINT8) (bCurrListNo - 1), 3 );
        else
                UiClearSpecifiedLine( LINE_3 );
        if ( bCurrListNo + 1 <= TOTAL_LISTS )
                DispEachList( (UINT8) (bCurrListNo + 1), 5 );
        else
                UiClearSpecifiedLine( LINE_5 );
}

        static void
DispEachList( bListNo, bYPos )
        UINT8   bListNo;
        UINT8   bYPos;
{
        PrintDec( gStr1, bListNo, 2, 1, 99 );
        UiDispStr( gStr1, 1, bYPos );
        PrintDec( gStr1, rsListInfo[ bListNo-1 ].wLen, 6, -32767, 32767 );
        UiDispStr( gStr1, 11, bYPos );
}

        static void
DispSegmentList( psSegmentMember )
        SEGMENT *psSegmentMember;
```

```
{
        SEGMENT *psSegment = psListHead;
        UINT16  wTotalLength = 0;

        if ( psSegmentMember == NULL )
        {
                UiClearSpecifiedLine( LINE_3 );
                UiClearSpecifiedLine( LINE_4 );
                UiClearSpecifiedLine( LINE_5 );
                return;
        }

        do
        {
                if ( psSegment->lOutPoint >= psSegment->lInPoint )
                        wTotalLength += psSegment->lOutPoint - psSegment->lInPoint;
                else
                        wTotalLength += psSegment->lInPoint - psSegment->lOutPoint;
                psSegment = psSegment->psNext;
        }
        while( psSegment != NULL );
        wTotalLen = wTotalLength;
        rsListInfo[ bCurrListNo-1 ].wLen = wTotalLen;
        gsSegList.wTotalLens[ bCurrListNo-1 ] = wTotalLen;

        DispParameters( psSegmentMember, 4 );
        UiDispHighLight( HIGH_LIGHT_SEG, 4 );

        psSegmentMember = psHighLight->psPrev;
        if ( psSegmentMember == NULL )
                UiClearSpecifiedLine( LINE_3 );
        else
                DispParameters( psSegmentMember, 3 );

        psSegmentMember = psHighLight->psNext;
        if ( psSegmentMember == NULL )
        {
                switch ( gsUiState.eCurrMode )
                {
                        case SEG:
                                UiClearSpecifiedLine( LINE_5 );
                                break;

                        case SEG_EDIT:
                                ShowListFrmTLTotalLen( LINE_5 );
                }
        }
        else
        {
                if ( psSegmentMember->psNext == NULL )
                        UiClearSpecifiedLine( LINE_5 );
                DispParameters( psSegmentMember, 5 );
        }
}

        static void
ShowListFrmTLTotalLen( bYPos )
        UINT8 bYPos;
{
        UiDispStr( "Total:", 29, bYPos );
        UiDispFieldCntAsTc( wTotalLen, 36, bYPos, FALSE, FALSE );
}

        static void
DispParameters( psSegmentMember, bYPos )
        SEGMENT *psSegmentMember;
        UINT8   bYPos;
{
        UINT16 wLen = 0;

        PrintDec( gStr1, psSegmentMember->bSegmentIDNo, 2, 0, 99 );
        UiDispStr( gStr1, 1, bYPos );
        UiDispFieldCntAsTc(( UINT16 )psSegmentMember->lInPoint, 5, bYPos, FALSE, FALSE );
        UiDispFieldCntAsTc(( UINT16 )psSegmentMember->lOutPoint, 14, bYPos, FALSE, FALSE );
        UiDispRtSpd( psSegmentMember->wSpeed, 22, bYPos );
```

```
        UiDispStr( psSegmentMember->pstrProfile, 29, bYPos );
        UiDispStr( psSegmentMember->pstrMode, 31, bYPos );
        if ( psSegmentMember->lOutPoint >= psSegmentMember->lInPoint )
                wLen += psSegmentMember->lOutPoint - psSegmentMember->lInPoint;
        else
                wLen += psSegmentMember->lInPoint - psSegmentMember->lOutPoint;
        UiDispFieldCntAsTc( wLen, 36, bYPos, FALSE, FALSE );
}

        static SEGMENT *
CreateListMember()
{
        SEGMENT *psSegmentMember;

        psSegmentMember = MemoryAlloc();
        if ( psSegmentMember != NULL )
        {
                psSegmentMember->lInPoint = gwMarkIn;           /* use Mark In point */
                psSegmentMember->lOutPoint = gwMarkOut;         /* use Mark Out point */
                psSegmentMember->wSpeed = gwPlaySpd;            /* use the current speed */
                psSegmentMember->pstrProfile = "- ";
                psSegmentMember->pstrMode = "60f";
                psSegmentMember->psNext = psSegmentMember->psPrev = NULL;
        }
        gfSegListChanged                        = TRUE;
        return( psSegmentMember );
}

        static SEGMENT *
MemoryAlloc()
{
        UINT8 i;

        for ( i = 0 ; i < TOTAL_SEGS ; i++ )
                if ( rsList[ bCurrListNo-1 ][i].bSequenceNo == NULL )
                        return ( &rsList[ bCurrListNo-1 ][i] );
        UiDispError( grstrDispErrMsg, 5, ERROR );
        return ( NULL );
}

        static void
AppendList( psSegmentMember )
        SEGMENT *psSegmentMember;
{
        if ( CreateListHead( psSegmentMember ) == FALSE )
                AppendListTail( psSegmentMember );
}

        static FLAG
CreateListHead( psSegmentMember )
        SEGMENT *psSegmentMember;
{
        if ( psListHead == NULL )
        {
                psListHead = psSegmentMember;
                psListTail = psSegmentMember;
                psHighLight = psSegmentMember;
                psSegmentMember->bSegmentIDNo = AssignSegID();
                psSegmentMember->bSequenceNo = 1;
                return( TRUE );
        }
        else
                return( FALSE );
}

        static void
AppendListTail( psSegmentMember )
        SEGMENT *psSegmentMember;
{
        psSegmentMember->psPrev = psListTail;
        psListTail->psNext = psSegmentMember;
        psListTail = psSegmentMember;
        psSegmentMember->bSegmentIDNo = AssignSegID();
        psSegmentMember->bSequenceNo = (UINT8) (psSegmentMember->psPrev->bSequenceNo + 1);
```

```
}

        static void
InsertMemberToList( psSegmentMember )
        SEGMENT *psSegmentMember;
{
        SEGMENT *psSegment;

        if ( CreateListHead( psSegmentMember ) == TRUE )
                return;

        psSegment = psHighLight->psNext;
        if ( psSegment == NULL )
        {
                AppendListTail( psSegmentMember );
                psHighLight = psSegmentMember;
                return;
        }
        if ( psSegmentMember->bSegmentIDNo == NULL )
                psSegmentMember->bSegmentIDNo = AssignSegID();

        psSegmentMember->bSequenceNo = psSegment->bSequenceNo;
        do
        {
                psSegment->bSequenceNo += 1;
                psSegment = psSegment->psNext;
        }
        while ( psSegment != NULL );
        psSegmentMember->psPrev = psHighLight;
        psSegmentMember->psNext = psHighLight->psNext;
        psHighLight->psNext->psPrev = psSegmentMember;
        psHighLight->psNext = psSegmentMember;
        psHighLight = psSegmentMember;
        gfSegListChanged                        = TRUE;
}

        static void
RemoveMemberFromList( psSegmentMember )
        SEGMENT *psSegmentMember;
{
        SEGMENT *psSegment = psSegmentMember;

        psSegmentMember->bSegmentIDNo = NULL;
        psSegmentMember->bSequenceNo = NULL;
        while ( psSegment->psNext != NULL )
        {
                psSegment = psSegment->psNext;
                psSegment->bSequenceNo -= 1;
        }
        if ( psListTail == psSegmentMember )
                psHighLight = psSegmentMember->psPrev;
        else
                psHighLight = psSegmentMember->psNext;
        if ( NEXTSEG )
                NEXTSEG->psPrev = PREVSEG;
        if ( PREVSEG )
                PREVSEG->psNext = NEXTSEG;
        if ( psListHead == psSegmentMember )
                psListHead = NEXTSEG;
        if ( psListTail == psSegmentMember )
                psListTail = PREVSEG;
        NEXTSEG = PREVSEG = NULL;
        gfSegListChanged                        = TRUE;
}

        FLAG
GetSegData( bSequenceNo, bDataLabel, pwDataRet )
        UINT8 bSequenceNo;
        UINT8 bDataLabel;
        UINT16 *pwDataRet;
{
        SEGMENT *psSegment = psListHead;

        while ( psSegment != NULL )
```

```
        {
                if ( psSegment->bSequenceNo == bSequenceNo )
                        break;
                else
                        psSegment = psSegment->psNext;
        }

        if ( psSegment == NULL )
                return ( FALSE );

        switch ( bDataLabel )
        {
                case IN_POINT:
                        *pwDataRet = ( UINT16 )psSegment->lInPoint;
                        break;

                case OUT_POINT:
                        *pwDataRet = ( UINT16 )psSegment->lOutPoint;
                        break;

                case PLAY_SPD:
                        *pwDataRet = psSegment->wSpeed;
                        break;

                case ID_NO:
                        *pwDataRet = ( UINT16 )psSegment->bSegmentIDNo;
                        break;
        }
        return ( TRUE );
}


        void
ChangeEnterField()
{
        if ( gfCheckSecondPress == FALSE )
        {
                UiDispStr( "        ", 1, 7 );
                UiDispStr( " Modify ", 1, 8 );
                return;
        }

        if ( gbiField > 6 )
                gbiField = 1;

        switch ( gbiField )
        {
                case 1:
                        UiDispBlinkStr( 2, 1, 2 );
                        UiDispStr( " Modify ", 1, 7 );
                        UiDispStr( " ID No  ", 1, 8 );
                        break;

                case 2:
                        UiDispBlinkStr( 2, 7, 2 );
                        UiDispStr( " Modify ", 1, 7 );
                        UiDispStr( " InPoint", 1, 8 );
                        break;

                case 3:
                        UiDispBlinkStr( 3, 16, 2 );
                        UiDispStr( " Modify ", 1, 7 );
                        UiDispStr( "OutPoint", 1, 8 );
                        break;

                case 4:
                        UiDispBlinkStr( 5, 23, 2 );
                        UiDispStr( " Modify ", 1, 7 );
                        UiDispStr( " Speed  ", 1, 8 );
                        break;

                case 5:
                        UiDispBlinkStr( 1, 29, 2 );
                        UiDispStr( " Modify ", 1, 7 );
```

```
                UiDispStr( " Profile", 1, 8 );
                break;

        case 6:

                UiDispBlinkStr( 4, 31, 2 );
                UiDispStr( " Modify ", 1, 7 );
                UiDispStr( "  Mode  ", 1, 8 );
        }
        gbiField++;
}

        void
ChangeFieldValue( bValueDir )
        UINT8 bValueDir;
{
        if ( psHighLight == NULL )
                return;

        switch ( gbiField )
        {
                case 2:
                        switch ( bValueDir )
                        {
                                case INCREASE:
                                        psHighLight->bSegmentIDNo++;
                                        if ( psHighLight->bSegmentIDNo > 99 )
                                                psHighLight->bSegmentIDNo = 1;
                                        break;

                                case DECREASE:
                                        psHighLight->bSegmentIDNo--;
                                        if ( psHighLight->bSegmentIDNo < 1 )
                                                psHighLight->bSegmentIDNo = 99;
                        }
                        break;

                case 3:
                        switch ( bValueDir )
                        {
                                case INCREASE:
                                        psHighLight->lInPoint += 2;
                                        if ( psHighLight->lInPoint >=
                                                 N_DISK_PER_CTRL_MAX * N_CYL_AVAIL_PER_DISK )
                                                psHighLight->lInPoint = 0;
                                        break;

                                case DECREASE:
                                        if (( psHighLight->lInPoint == 0 ) ||
                                                ( psHighLight->lInPoint == 1 ))
                                                psHighLight->lInPoint =
                                                        N_DISK_PER_CTRL_MAX * N_CYL_AVAIL_PER_DISK;
                                        psHighLight->lInPoint -= 2;
                        }
                        break;

                case 4:
                        switch ( bValueDir )
                        {
                                case INCREASE:
                                        psHighLight->lOutPoint += 2;
                                        if ( psHighLight->lOutPoint >=
                                                 N_DISK_PER_CTRL_MAX * N_CYL_AVAIL_PER_DISK )
                                                psHighLight->lOutPoint = 0;
                                        break;

                                case DECREASE:
                                        if (( psHighLight->lOutPoint == 0 ) ||
                                                ( psHighLight->lOutPoint == 1 ))
                                                psHighLight->lOutPoint =
                                                        N_DISK_PER_CTRL_MAX * N_CYL_AVAIL_PER_DISK;
                                        psHighLight->lOutPoint -= 2;
```

```
                        }
                        break;

                case 5:
                        switch ( bValueDir )
                        {
                                case INCREASE:
                                        psHighLight->wSpeed += 1;
                                        if ( psHighLight->wSpeed > PLAY_SPD_MAX )
                                                psHighLight->wSpeed = -PLAY_SPD_MAX;
                                        break;

                                case DECREASE:
                                        psHighLight->wSpeed -= 1;
                                        if ( psHighLight->wSpeed < -PLAY_SPD_MAX )
                                                psHighLight->wSpeed = PLAY_SPD_MAX;
                        }
                        break;

                case 6:
                        switch ( bValueDir )
                        {
                                case INCREASE:
                                        psHighLight->pstrProfile = prstrProfile[ biProfile - 1
];

                                        biProfile++;
                                        if ( biProfile > 3 )
                                                biProfile = 1;
                                        break;

                                case DECREASE:
                                        psHighLight->pstrProfile = prstrProfile[ biProfile - 1
];

                                        biProfile--;
                                        if ( biProfile < 1 )
                                                biProfile = 3;
                        }
                        break;

                case 7:
                        switch ( bValueDir )
                        {
                                case INCREASE:
                                        psHighLight->pstrMode = prstrMode[ biMode - 1 ];
                                        biMode++;
                                        if ( biMode > 4 )
                                                biMode = 1;
                                        break;

                                case DECREASE:
                                        psHighLight->pstrMode = prstrMode[ biMode - 1 ];
                                        biMode--;
                                        if ( biMode < 1 )
                                                biMode = 4;
                        }
                        break;
        }
        DispSegmentList( psHighLight );
}


        void
MarkInSegTc()
{
        SINT32  lInPoint;

        if ( psListHead == NULL )

                return;
        lInPoint = EntryToValue();

        if( lInPoint % 2 == 1 )
                lInPoint--;

        if ( lInPoint >= 0 )
```

```
                psHighLight->lInPoint = ( UINT32 )lInPoint;                     /* set new mark in */
}

        void
MarkOutSegTc()
{
        SINT32  lOutPoint;

        if ( psListHead == NULL )
                return;
        lOutPoint = EntryToValue();

        if( lOutPoint % 2 == 1 )
                lOutPoint--;

        if ( lOutPoint >= 0 )
                psHighLight->lOutPoint = ( UINT32 )lOutPoint;                   /* set new mark in */
}


        void
SegSpd()
{
        EnterSegSpd( &psHighLight->wSpeed );
        UiDispRtSpd( psHighLight->wSpeed, 22, 4 );
}


        void
SegID()
{
        EnterSegID( &psHighLight->bSegmentIDNo );
        PrintDec( gStr1, psHighLight->bSegmentIDNo, 2, 1, 99 );
        UiDispStr( gStr1, 1, 4 );
}


        UINT8
AssignSegID()
{
        UINT8   biSegmentID = 1;
        SEGMENT *psSegMember = psListHead;

        if ( psSegMember == NULL )
                return( NULL );

        while ( biSegmentID < TOTAL_SEGS + 1 )
        {
                while ( psSegMember != NULL )
                {
                        if ( psSegMember->bSegmentIDNo == biSegmentID )
                                break;
                        else
                                psSegMember = psSegMember->psNext;
                }
                if ( psSegMember == NULL )
                        return( biSegmentID );
                psSegMember = psListHead;
                biSegmentID++;
        }
}


/*
 *-----------------------------------------------------------------------------
 * rtime.c      Copyright right 1991 Accom Inc.
 *
 *
 * Responsible Person: Jeffrey Wu
 *
 * This file contains the following timecode arithmetics utilities:
 *
 *              TcAddFc()               : A timecode adds a field count.
 *              TcSubFc()               : A timecode subtracts a field count.
```

```
 *              TcSubTc()             : A timecode subtracts another timecode.
 *              TcInc()               : Increment timecode.
 *              TcDec()               : Decrement timecode.
 *              TcToTcStr()           : Convert a timecode to timecode string.
 *              TcStrToTc()           : Convert a timecode string to timecode.
 *              TcCmp()               : Compare two timecodes.
 *              TcValidate()    : Validate a timecode.
 *              NormalizeFc()   : Normalize the field count to within 24 hour range.
 *-----------------------------------------------------------------------
 */
#include "rglobal.h"
#include "rtime.h"
/*
 * Look-up tables for digits to fields
 */
/*
 * Sixty Hz
 */
SINT32 lTensOfFr60Hz[3] = { 0, 20, 40 };

SINT32 lTensOfSec60Hz[6] =
{
        00 * N_FD_FOR_1SEC_60HZ,
        10 * N_FD_FOR_1SEC_60HZ,
        20 * N_FD_FOR_1SEC_60HZ,
        30 * N_FD_FOR_1SEC_60HZ,
        40 * N_FD_FOR_1SEC_60HZ,
        50 * N_FD_FOR_1SEC_60HZ
};

SINT32 lSec60Hz[10] =
{
        0 * N_FD_FOR_1SEC_60HZ,
        1 * N_FD_FOR_1SEC_60HZ,
        2 * N_FD_FOR_1SEC_60HZ,
        3 * N_FD_FOR_1SEC_60HZ,
        4 * N_FD_FOR_1SEC_60HZ,
        5 * N_FD_FOR_1SEC_60HZ,
        6 * N_FD_FOR_1SEC_60HZ,
        7 * N_FD_FOR_1SEC_60HZ,
        8 * N_FD_FOR_1SEC_60HZ,
        9 * N_FD_FOR_1SEC_60HZ
};

/*
 * Non drop frame
 */
SINT32 lTensOfMin60HzFF[6] =
{
        0,
        10 * N_FD_FOR_1MIN_60HZ_FF,
        20 * N_FD_FOR_1MIN_60HZ_FF,
        30 * N_FD_FOR_1MIN_60HZ_FF,
        40 * N_FD_FOR_1MIN_60HZ_FF,
        50 * N_FD_FOR_1MIN_60HZ_FF
};

SINT32 lMin60HzFF[10] =
{
        0 * N_FD_FOR_1MIN_60HZ_FF,
        1 * N_FD_FOR_1MIN_60HZ_FF,
        2 * N_FD_FOR_1MIN_60HZ_FF,
        3 * N_FD_FOR_1MIN_60HZ_FF,
        4 * N_FD_FOR_1MIN_60HZ_FF,
        5 * N_FD_FOR_1MIN_60HZ_FF,
        6 * N_FD_FOR_1MIN_60HZ_FF,
        7 * N_FD_FOR_1MIN_60HZ_FF,
        8 * N_FD_FOR_1MIN_60HZ_FF,
        9 * N_FD_FOR_1MIN_60HZ_FF
};

SINT32 lTensOfHr60HzFF[3] =
{
        00 * N_FD_FOR_1HR_60HZ_FF,
```

```
        10 * N_FD_FOR_1HR_60HZ_FF,
        20 * N_FD_FOR_1HR_60HZ_FF
};

SINT32 lHr60HzFF[10] =
{
        0 * N_FD_FOR_1HR_60HZ_FF,
        1 * N_FD_FOR_1HR_60HZ_FF,
        2 * N_FD_FOR_1HR_60HZ_FF,
        3 * N_FD_FOR_1HR_60HZ_FF,
        4 * N_FD_FOR_1HR_60HZ_FF,
        5 * N_FD_FOR_1HR_60HZ_FF,
        6 * N_FD_FOR_1HR_60HZ_FF,
        7 * N_FD_FOR_1HR_60HZ_FF,
        8 * N_FD_FOR_1HR_60HZ_FF,
        9 * N_FD_FOR_1HR_60HZ_FF
};

/*
 * Drop frame
 */
SINT32 lTensOfMin60HzDF[6] =
{
        0 * N_FD_FOR_10MIN_60HZ_DF,
        1 * N_FD_FOR_10MIN_60HZ_DF,
        2 * N_FD_FOR_10MIN_60HZ_DF,
        3 * N_FD_FOR_10MIN_60HZ_DF,
        4 * N_FD_FOR_10MIN_60HZ_DF,
        5 * N_FD_FOR_10MIN_60HZ_DF
};

SINT32 lMin60HzDF[10] =
{
        0 * N_FD_FOR_1MIN_60HZ_DF,
        1 * N_FD_FOR_1MIN_60HZ_DF,
        2 * N_FD_FOR_1MIN_60HZ_DF,
        3 * N_FD_FOR_1MIN_60HZ_DF,
        4 * N_FD_FOR_1MIN_60HZ_DF,
        5 * N_FD_FOR_1MIN_60HZ_DF,
        6 * N_FD_FOR_1MIN_60HZ_DF,
        7 * N_FD_FOR_1MIN_60HZ_DF,
        8 * N_FD_FOR_1MIN_60HZ_DF,
        9 * N_FD_FOR_1MIN_60HZ_DF
};

SINT32 lTensOfHr60HzDF[3] =

{
        00 * N_FD_FOR_1HR_60HZ_DF,
        10 * N_FD_FOR_1HR_60HZ_DF,
        20 * N_FD_FOR_1HR_60HZ_DF
};

SINT32 lHr60HzDF[10] =
{
        0 * N_FD_FOR_1HR_60HZ_DF,
        1 * N_FD_FOR_1HR_60HZ_DF,
        2 * N_FD_FOR_1HR_60HZ_DF,
        3 * N_FD_FOR_1HR_60HZ_DF,
        4 * N_FD_FOR_1HR_60HZ_DF,
        5 * N_FD_FOR_1HR_60HZ_DF,
        6 * N_FD_FOR_1HR_60HZ_DF,
        7 * N_FD_FOR_1HR_60HZ_DF,
        8 * N_FD_FOR_1HR_60HZ_DF,
        9 * N_FD_FOR_1HR_60HZ_DF
};

/*
 * Fifty Hz
 */
SINT32 lTensOfSec50Hz[6] =
{
        00 * N_FD_FOR_1SEC_50HZ,
        10 * N_FD_FOR_1SEC_50HZ,
        20 * N_FD_FOR_1SEC_50HZ,
```

```
        30 * N_FD_FOR_1SEC_50HZ,
        40 * N_FD_FOR_1SEC_50HZ,
        50 * N_FD_FOR_1SEC_50HZ
};

SINT32 lSec50Hz[10] =
{
        0 * N_FD_FOR_1SEC_50HZ,
        1 * N_FD_FOR_1SEC_50HZ,
        2 * N_FD_FOR_1SEC_50HZ,
        3 * N_FD_FOR_1SEC_50HZ,
        4 * N_FD_FOR_1SEC_50HZ,
        5 * N_FD_FOR_1SEC_50HZ,
        6 * N_FD_FOR_1SEC_50HZ,
        7 * N_FD_FOR_1SEC_50HZ,
        8 * N_FD_FOR_1SEC_50HZ,
        9 * N_FD_FOR_1SEC_50HZ
};

SINT32 lTensOfMin50Hz[6] =
{
        00 * N_FD_FOR_1MIN_50HZ,
        10 * N_FD_FOR_1MIN_50HZ,
        20 * N_FD_FOR_1MIN_50HZ,
        30 * N_FD_FOR_1MIN_50HZ,
        40 * N_FD_FOR_1MIN_50HZ,
        50 * N_FD_FOR_1MIN_50HZ
};

SINT32 lMin50Hz[10] =
{
        0 * N_FD_FOR_1MIN_50HZ,
        1 * N_FD_FOR_1MIN_50HZ,
        2 * N_FD_FOR_1MIN_50HZ,
        3 * N_FD_FOR_1MIN_50HZ,
        4 * N_FD_FOR_1MIN_50HZ,
        5 * N_FD_FOR_1MIN_50HZ,
        6 * N_FD_FOR_1MIN_50HZ,
        7 * N_FD_FOR_1MIN_50HZ,
        8 * N_FD_FOR_1MIN_50HZ,
        9 * N_FD_FOR_1MIN_50HZ
};

SINT32 lTensOfHr50Hz[3] =
{
        00 * N_FD_FOR_1HR_50HZ,
        10 * N_FD_FOR_1HR_50HZ,
        20 * N_FD_FOR_1HR_50HZ
};

SINT32 lHr50Hz[10] =
{
        0 * N_FD_FOR_1HR_50HZ,
        1 * N_FD_FOR_1HR_50HZ,
        2 * N_FD_FOR_1HR_50HZ,
        3 * N_FD_FOR_1HR_50HZ,
        4 * N_FD_FOR_1HR_50HZ,
        5 * N_FD_FOR_1HR_50HZ,
        6 * N_FD_FOR_1HR_50HZ,
        7 * N_FD_FOR_1HR_50HZ,
        8 * N_FD_FOR_1HR_50HZ,
        9 * N_FD_FOR_1HR_50HZ
};

/*
 * TcAddFc()
 *
 * This routine adds timecode "tc" with field count "lFc" and
 * place the result in timecode form in "*pTcRet".
 * Possible errors: " Drop frame on PAL "
 *                                          " Bad TV Standards"
 */
        FLAG
TcAddFc( tc, lFc, pTcRet )
```

```
        TC                      tc;
        SINT32          lFc;
        TC                      *pTcRet;
{
        pTcRet->lFieldNo                = tc.lFieldNo + lFc;
        pTcRet->fDropFrame              = tc.fDropFrame;
        pTcRet->fUndef                  = tc.fUndef;
        return( TRUE );
}

/*
 * TcSubTc()
 *
 * This routine subtract tc2 from tc1, and place the result
 * in field count form in "*plFcRet".
 * possible errors:
 * "Bad Tv Standards"
 * "tc1 and tc2 DF/FF mixed."
 * "tc1 undefined"
 * "tc2 undefined"
 */
        FLAG
TcSubTc( tc1, tc2, plFcRet )
        TC              tc1;
        TC              tc2;
        SINT32  *plFcRet;
{

        *plFcRet        = tc1.lFieldNo - tc2.lFieldNo;
        return( TRUE );
}
/*
 * NormalizeFc()
 *
 * This routine normalize the field count "lcntField" to be within
 * "wHighHour" and "wHighHour - 24 Hours", and place the result
 * in field count form in *plcntFieldRet.
 * Possible errors:
 * "Bad Tv Standards"
 */
        void
NormalizeFc( lcntField, fDropFrame, wHighHour, plcntFieldRet )
        SINT32          lcntField;
        FLAG            fDropFrame;
        SINT16          wHighHour;
        SINT32          *plcntFieldRet;
{
}
/*
 * TcToTcStr()
 *
 * This routine converts the timecode "tc" to a tc string of the
 * specified type.
 */
        void
TcToTcStr( tc, tyTcStr, pTcStrRet )
        TC                      tc;
        UINT16          tyTcStr;
        UINT8           *pTcStrRet;
{
        SINT32          lFieldNo;
        SINT32          lFrameNo;
        char            cSeparator;
        UINT8           bBcdFrame, bBcdSecond, bBcdMinute, bBcdHour;
        UINT16          fField2;

        lFieldNo        = tc.lFieldNo;
        fField2         = ( lFieldNo & 1 ) ? 0x80 : 0;
        bBcdFrame       = bBcdSecond    = bBcdMinute    = bBcdHour      = 0;
        /*
         * The following code convert the frame number to BCD form.
         * It processes from the most significant order ( ie. tens of hour ),
         * and on.
         * For example, If lFrameNo is larger than 20 hours, deduct 20 hours from
         * lFrameNo and add the BCD value earned ( ie. 0x20 ) to bBcdHour.
```

```
 */
if( ( gbVideoStd & STD_TV_STD ) == STD_PAL )
{
        /*
         * 50 Hz code ( ie. PAL which has no drop frame )
         */
        if ( lFieldNo < 0 ) /* Negative times are 24 hours - time                    */
                lFieldNo        = N_FR_FOR_1DAY_50HZ * 2 + lFieldNo;

        lFrameNo                = lFieldNo >> 1;
        /*
         * Tens of hours and hours
         */
        DO_20HR_50HZ( lFrameNo, bBcdHour )
        else DO_10HR_50HZ( lFrameNo, bBcdHour )

        DO_8HR_50HZ( lFrameNo, bBcdHour )
        else
                {
                DO_4HR_50HZ( lFrameNo, bBcdHour )
                DO_2HR_50HZ( lFrameNo, bBcdHour )
                }
        DO_1HR_50HZ( lFrameNo, bBcdHour )
        /*
         * Tens of minutes and minutes
         */
        DO_40MIN_50HZ( lFrameNo, bBcdMinute )
        else DO_20MIN_50HZ( lFrameNo, bBcdMinute )
        DO_10MIN_50HZ( lFrameNo, bBcdMinute )

        DO_8MIN_50HZ( lFrameNo, bBcdMinute )
        else
                {
                DO_4MIN_50HZ( lFrameNo, bBcdMinute )
                DO_2MIN_50HZ( lFrameNo, bBcdMinute )
                }
        DO_1MIN_50HZ( lFrameNo, bBcdMinute )
        /*
         * Tens of seconds and seconds
         */
        DO_40SEC_50HZ( lFrameNo, bBcdSecond )
        else DO_20SEC_50HZ( lFrameNo, bBcdSecond )
        DO_10SEC_50HZ( lFrameNo, bBcdSecond )

        DO_8SEC_50HZ( lFrameNo, bBcdSecond )
        else
                {
                DO_4SEC_50HZ( lFrameNo, bBcdSecond )
                DO_2SEC_50HZ( lFrameNo, bBcdSecond )
                }
        DO_1SEC_50HZ( lFrameNo, bBcdSecond )
        /*
         * Tens of frames and frames
         */
        DO_20FR_50HZ( lFrameNo, bBcdFrame )
        else DO_10FR_50HZ( lFrameNo, bBcdFrame )

        bBcdFrame += (UINT8)lFrameNo;
}
else
{
        /*
         * 60 Hz code ( ie. NTSC which has Drop Frame and Non Drop Frame )
         */
        if ( tc.fDropFrame )
        {
                /*
                 * Drop Frame
                 */
                if (lFieldNo < 0)               /* Negative times are 24 hrs - time
*/
                        lFieldNo = N_FR_FOR_1DAY_60HZ_DF * 2 + lFieldNo;

                lFrameNo        = lFieldNo >> 1;
                /*
```

```
         * Tens of hours and hours
         */
        DO_20HR_60HZ_DF( lFrameNo, bBcdHour )
        else DO_10HR_60HZ_DF( lFrameNo, bBcdHour )

        DO_8HR_60HZ_DF( lFrameNo, bBcdHour )
        else
                {
                DO_4HR_60HZ_DF( lFrameNo, bBcdHour )
                DO_2HR_60HZ_DF( lFrameNo, bBcdHour )
                }
        DO_1HR_60HZ_DF( lFrameNo, bBcdHour )
        /*
         * Tens of minutes and minutes
         */
        DO_40MIN_60HZ_DF( lFrameNo, bBcdMinute )
        else DO_20MIN_60HZ_DF( lFrameNo, bBcdMinute )
        DO_10MIN_60HZ_DF( lFrameNo, bBcdMinute )

        DO_1MIN_60HZ_FF( lFrameNo, bBcdMinute )

        DO_8MIN_60HZ_DF( lFrameNo, bBcdMinute )
        else
                {
                DO_4MIN_60HZ_DF( lFrameNo, bBcdMinute )
                DO_2MIN_60HZ_DF( lFrameNo, bBcdMinute )
                }
        if (    ( (bBcdMinute & 0x0f) != 0 ) &&
                        ( lFrameNo      >= N_FR_FOR_1MIN_60HZ_DF ) )
        {
                lFrameNo                -= N_FR_FOR_1MIN_60HZ_DF;
                bBcdMinute              += 0x01;
        }
        if (bBcdMinute & 0x0f)   lFrameNo += 2;
}
else
{
        /*
         * Non Drop Frame
         */
        if (lFieldNo < 0)               /* Negative times are 24 hrs - time
*/
                lFieldNo = N_FR_FOR_1DAY_60HZ_FF * 2 + lFieldNo;

        lFrameNo        = lFieldNo >> 1;
        /*
         * Tens of hours and hours
         */
        DO_20HR_60HZ_FF( lFrameNo, bBcdHour )
        else DO_10HR_60HZ_FF( lFrameNo, bBcdHour );

        DO_8HR_60HZ_FF( lFrameNo, bBcdHour )
        else
                {
                DO_4HR_60HZ_FF( lFrameNo, bBcdHour )
                DO_2HR_60HZ_FF( lFrameNo, bBcdHour )
                }
        DO_1HR_60HZ_FF( lFrameNo, bBcdHour )
        /*
         * Tens of minutes and minutes
         */
        DO_40MIN_60HZ_FF( lFrameNo, bBcdMinute )
        else DO_20MIN_60HZ_FF( lFrameNo, bBcdMinute )
        DO_10MIN_60HZ_FF( lFrameNo, bBcdMinute )

        DO_8MIN_60HZ_FF( lFrameNo, bBcdMinute )
        else
                {
                DO_4MIN_60HZ_FF( lFrameNo, bBcdMinute )
                DO_2MIN_60HZ_FF( lFrameNo, bBcdMinute )
                }
        DO_1MIN_60HZ_FF( lFrameNo, bBcdMinute )
}
/*
```

```
         * Tens of seconds and seconds
         */
        DO_40SEC_60HZ( lFrameNo, bBcdSecond )
        else DO_20SEC_60HZ( lFrameNo, bBcdSecond )
        DO_10SEC_60HZ( lFrameNo, bBcdSecond )

        DO_8SEC_60HZ( lFrameNo, bBcdSecond )
        else
                {
                DO_4SEC_60HZ( lFrameNo, bBcdSecond )
                DO_2SEC_60HZ( lFrameNo, bBcdSecond )
                }
        DO_1SEC_60HZ( lFrameNo, bBcdSecond )
        /*
         * Tens of frames and frames
         */
        DO_20FR_60HZ( lFrameNo, bBcdFrame )
        else DO_10FR_60HZ( lFrameNo, bBcdFrame )

        bBcdFrame                += (UINT8)lFrameNo;
}

if (tyTcStr == TC_STR_AMPEX )
{
        /*
         * Set field bit
         */
        bBcdSecond               |= fField2;

        /*
         * Set drop frame bit
         */
        if (tc.fDropFrame)
                bBcdFrame        |= 0x40;

        *pTcStrRet++     = bBcdHour;
        *pTcStrRet++     = bBcdMinute;
        *pTcStrRet++     = bBcdSecond;
        *pTcStrRet++     = bBcdFrame;
}
else
if (tyTcStr == TC_STR_SONY )
{
        /*
         * Set field in sony standard
         */
        if ( gf60Hz )
                bBcdSecond       |= fField2;
        else
                bBcdHour         |= fField2;
        /*
         * Set drop frame bit
         */
        if (tc.fDropFrame)
                bBcdFrame        |= 0x40;
        /*
         * Reverse order
         */
        *pTcStrRet++     = bBcdFrame;
        *pTcStrRet++     = bBcdSecond;
        *pTcStrRet++     = bBcdMinute;
        *pTcStrRet++     = bBcdHour;
}
else
if (tyTcStr == TC_STR_DISPLAY )
{
        /*
         * !! TO DO
         * Set field indicator
         */
        if (tc.fDropFrame)
                cSeparator       = (char)( fField2 ? ';' : ',');
        else
                cSeparator       = (char)( fField2 ? ':' : '.');

}
```

```
        return;
}

/*
 * TcStrToTc()
 *
 * This routine converts the field count "lcntField" to a timecode and
 * place the result in "*pTcRet".
 * Possible errors:
 * "Bad Tv Standards"
 * "DF on PAL"
 */
        void
TcStrToTc( pTcStr, tyTcStr, pTcRet )
        UINT8                   *pTcStr;
        UINT16                  tyTcStr;
        TC                              *pTcRet;
{
        UINT16                  fField2;
        UINT16                  fDropFrame;
        UINT8                   bBcdFrame, bBcdSecond, bBcdMinute, bBcdHour;
        SINT32                  lTotal;

        if ( tyTcStr == TC_STR_SONY )
        {
                bBcdFrame               = *pTcStr++;
                bBcdSecond              = *pTcStr++;
                bBcdMinute              = *pTcStr++;
                bBcdHour                = *pTcStr;
                if (gf60Hz)
                        fField2         = (bBcdSecond & 0x80 ? 1 : 0);
                else
                        fField2         = (bBcdHour & 0x80 ? 1 : 0);
                fDropFrame              = (bBcdFrame & 0x40 ? 1 : 0);
                bBcdFrame               &= 0x3f;
                bBcdSecond              &= 0x7f;
                bBcdMinute              &= 0x7f;
                bBcdHour                &= 0x3f;
        }
        else /* (tyTcStr == TC_STR_AMPEX) */
        {
                bBcdHour                = *pTcStr++;
                bBcdMinute              = *pTcStr++;
                bBcdSecond              = *pTcStr++;
                bBcdFrame               = *pTcStr;
                fField2                 = (bBcdSecond & 0x80 ? 1 : 0);
                fDropFrame              = (bBcdFrame & 0x40 ? 1 : 0);
                bBcdSecond              &= 0x7f;
                bBcdFrame               &= 0x3f;
        }

                                        /* frames and fields */
        lTotal = 2*(bBcdFrame & 0x0f) + lTensOfFr60Hz[bBcdFrame >> 4] + fField2;

        if ( !gf60Hz )
        {
                lTotal  +=      lSec50Hz                [       bBcdSecond & 0x0f       ]
                                +       lTensOfSec50Hz  [       bBcdSecond >> 4         ]
                                +       lMin50Hz                [       bBcdMinute & 0x0f]
                                +       lTensOfMin50Hz  [       bBcdMinute >> 4         ]
                                +       lHr50Hz                 [       bBcdHour & 0x0f ]
                                +       lTensOfHr50Hz   [       bBcdHour >> 4           ];
        }
        else
        {
                /*
                 * Seconds
                 */
                lTotal += lSec60Hz[bBcdSecond & 0x0f] + lTensOfSec60Hz[bBcdSecond >> 4];

                if (fDropFrame)
                        lTotal  +=      lMin60HzDF              [       bBcdMinute & 0x0f]
                                        +       lTensOfMin60HzDF[       bBcdMinute >> 4 ]
                                        +       lHr60HzDF               [       bBcdHour   &
```

```
0x0f            ]
                                  +      lTensOfHr60HzDF  [       bBcdHour >> 4    ];

            else
                    lTotal  +=    lMin60HzFF          [       bBcdMinute & 0x0f]
                                  +      lTensOfMin60HzFF[       bBcdMinute >> 4 ]
                                  +      lHr60HzFF               [       bBcdHour   &
0x0f            ]
                                  +      lTensOfHr60HzFF  [       bBcdHour >> 4    ];
        }

        pTcRet->lFieldNo        = lTotal;
        pTcRet->fDropFrame      = ( FLAG )fDropFrame;
        pTcRet->fUndef          = FALSE;
        return;
}

/*
 * TcCmp()
 *
 * This routine compares two timecodes.
 * Possible returns for "*pbTcCmpRet" are:
 *
 *              TC_CMP_1ST_ST_2ND
 *              TC_CMP_1ST_EQ_2ND
 *              TC_CMP_1ST_GT_2ND
 */
        FLAG
TcCmp( tc1, tc2, pbTcCmpRet )
        TC              tc1;
        TC              tc2;
        UINT8   *pbTcCmpRet;
{
        SINT32  lFcDiff;

        if( ( tc1.fUndef ) || ( tc2.fUndef ) )
                return( FALSE );

        lFcDiff         = tc1.lFieldNo - tc2.lFieldNo;
        if ( lFcDiff == 0 )
                *pbTcCmpRet             = TC_CMP_1ST_EQ_2ND;
        else
        {
                if ( lFcDiff < 0 )
                        *pbTcCmpRet     = TC_CMP_1ST_ST_2ND;
                else
                        *pbTcCmpRet     = TC_CMP_1ST_GT_2ND;
        }
        return( TRUE );
}
/*
 * TcValiadte()
 *
 * This routine validates a timecode "tc"
 * Possible errors:
 * "Bad Tv Standards"
 * "DF on PAL"
 * "Invalid BCD ( A~F )
 * "Invalid Number ( 7 for bMinuteHigh, 4 for bFrameHigh etc )
 * "Tc undefined"
 * "DF error"
 */
        void
TcValidate( tc )
        TC              tc;
{
}


/*
 *-------------------------------------------------------------------
 *  ruievent.c  Copyright 1991 Accom Inc.
 *
 *      Responsible Person: Kevin Hsu
 *
 *  This file handles all events of control panel for the RTD.
 *-------------------------------------------------------------------
```

```
 */
#include "rglobal.h"
#include "rui.h"
#include "ruievent.h"

#if RTD
#include "rhw.h"
#include "rtime.h"
#include "rdisk.h"
#include "rdiskctl.h"
#endif


SINT32  volatile                  lcntTime;
static UINT8 DispStr[7];;;;;

/*
 * Please put local FUNCTION PROTOTYPE here.
 */
static void                       GetNextEvent( MAIN_EVENT *, UINT8 );
static QUEUE_MEMBER       *GetNextInTheQueue( void );
static void                       HandleButtonEvent( SINT8 * );
static void                       HandleTrackballEvent( SINT8 *, SINT8 * );
static void                       HandleEncodeEvent();
static void                       MainGetNextEvent( MAIN_EVENT * );
static void                               HandleKeyEvent(SINT8     *);
static void                               HandleTrackballEvent(SINT8 *, SINT8 *);
static void                               HandleVersionEvent(UINT8);

static EVENT_QUEUE                sCPEventQueue;
static SINT8                      rbLEDStatus[8];
static UINT8                      rbButtonStatus[8];
static FLAG fFwdFirst = TRUE;
static FLAG fRevFirst = TRUE;
static FLAG fFowardBeyondTheRange = FALSE;
static FLAG fReverseBeyondTheRange = FALSE;
static rwSpdValue[128] =
{
        0, 0, 0, 0, 0, 0, 0, 0,
        1, 1, 1, 1, 2, 2, 2, 2,
        3, 3, 4, 4, 5, 5, 6, 6,
        7, 8, 9, 10, 11, 12, 13, 14,                                  /* +  1 */

        15, 17, 19, 21, 23, 25, 27, 29,                               /* +  2 */
        31, 34, 37, 40, 43, 46, 49, 52,                               /* +  3 */
        55, 59, 63, 67, 71, 75, 79, 83,                               /* +  4 */
        87, 92, 97, 102, 107, 112, 117,  122,                   /* +  5 */

        127, 133, 139, 145, 151, 157, 163, 169,                 /* +  6 */
        175, 190, 205, 220, 235, 250, 265, 280,                 /* + 15 */
        295, 320, 345, 370, 395, 420, 445, 470,                 /* + 25 */
        495, 530, 565, 600, 635, 670, 705, 740,                 /* + 35 */

        775, 820, 865, 910, 955, 1000, 1045, 1090,              /* + 45 */
        1135, 1190, 1245, 1300, 1355, 1410, 1465, 1520,   /* + 55 */
        1575, 1650, 1725, 1800, 1875, 1950, 2025, 2100,   /* + 75 */
        2175, 2280, 2385, 2490, 2615, 2740, 2865, 3000    /* + 105, 125, 135 */
};

/*
 *      InitEventQueue
 *
 *      Initialize the event queue
 *      set the control panel event queue to be circular
 *
 */
        void
InitEventQueue()
{
        register UINT16  i;
        register QUEUE_MEMBER     *psCPEvent;

        for ( i = 0, psCPEvent = FIRST_MEMBER(sCPEventQueue); i < QUEUE_SIZE;
                        i++, psCPEvent++ )
        {
```

```
                psCPEvent->psNext = psCPEvent + 1;
                psCPEvent->psPrev = psCPEvent - 1;
        }
        LAST_MEMBER(sCPEventQueue)->psNext = FIRST_MEMBER(sCPEventQueue);
        FIRST_MEMBER(sCPEventQueue)->psPrev = LAST_MEMBER(sCPEventQueue);
        READ(sCPEventQueue) = WRITE(sCPEventQueue) = FIRST_MEMBER(sCPEventQueue);
}

/*
 *      CheckForEvents
 *
 *      This routine initially checks the control panel queue, then takes all
 *      the info of the event currently fetched to process the event by type.
 *
 */
        void
CheckForEvents()
{
        MAIN_EVENT      sEvent;
        FLAG            fJogFwd;
        SINT16          wLastPulseCount = 1;
        SINT16          wDeltaSpd;

#if !RTD
        /*
         * To check upon the duration of successive pressing on soft key, once
         * the following is within the allowable duration, then to close Segment
         * Edit field entry.
         * This Time checking has a true version in RMAIN.C for RTD.
         */
        CheckSecondPress();
#endif

        MainGetNextEvent( &sEvent );
#if 0
        if (sEvent.eType == ENCODER_EVENT)
        {
                DispStr[0] = sEvent.uData.sEncoder.rbData[0];;;;;
                DispStr[1] = sEvent.uData.sEncoder.rbData[1];;;;;
                DispStr[2] = sEvent.uData.sEncoder.rbData[2];;;;;
                DispStr[3] = sEvent.uData.sEncoder.rbData[3];;;;;
                DispStr[4] = '\0';
                UiDispStr( DispStr, 26, 6 );;;;;
        }
#endif

        switch( sEvent.eType )
        {
                case NULL_EVENT:
                        /*
                         * MACRO operation.
                         */
                        if ( gfRecMacro == TRUE )
                        {
                                if ( gfEncoderEntry == TRUE )
                                {
                                        if ( gfShortIdle == FALSE )
                                        {
                                                if ( GetTicks() - glIdleTicks > STOP_TIME )
                                                        gfShortIdle = TRUE;
                                        }
                                        else
                                        {
                                                glLastTicks = glCurrTicks;
                                                glCurrTicks = GetTicks();
                                                glTicksLapse = glCurrTicks - glLastTicks -
STOP_TIME;

                                                RecUserInput( &sEvent );
                                                glLastTicks = 0L;
                                                gfEncoderEntry = FALSE;
                                                gfShortIdle = FALSE;
                                        }
                                }
                        }
                        gfEncoderPos = FALSE:
```

```
                        gfEncoderNeg = FALSE;
                        break;

                case BUTTONUP_EVENT:
                        switch( geButton = GetButtonID( sEvent.uData.sButtonUp.rbButtonId ))
                        {
                                case STEP_FWD:
                                        UiSetLed( STEP_FWD_LED, OFF );
                                        break;

                                case STEP_REV:
                                        UiSetLed( STEP_REV_LED, OFF );
                                        break;

                                case GRAB:
                                        UiSetLed( GRAB_LED, OFF );
                                        break;

                                case GOTO:
                                        if ( gfGoto == OFF )
                                                UiSetLed( GOTO_LED, OFF );
                                        break;

                                case SEG_INSERT:
                                        UiSetLed( SEG_INSERT_LED, OFF );
                                        break;

                                case MARK_IN:
                                        UiSetLed( MARK_IN_LED, OFF );
                                        break;

                                case MARK_OUT:
                                        UiSetLed( MARK_OUT_LED, OFF );

                                        break;
                        }
                        break;

#if RTD
                case VERSION_EVENT:
                        HandleVersionEvent( sEvent.uData.sVersion.cVersion );
                        break;

                case ENCODER_EVENT:
                        /*
                         * MACRO operation.
                         */
                        if (( gfRunMacro == TRUE ) && ( gfLoadMacro == TRUE ) &&
                                        ( gfLoadMacroForEncoder == TRUE ))
                                gwPulseCount += gwDeltaPulse;
                        else
                                gwPulseCount = GetEncoderVal( sEvent.uData.sEncoder.rbData );

#if 0
        PrintDec( gStr1, gwPulseCount, 4, -32767, 32767 );;;;;
        UiDispStr( gStr1, 2, 6 );;;;;
#endif

                        if (( gwPulseCount >= 32767 ) || ( gwPulseCount <= -32767 ))
                        {
                                ZeroEncoders();
                                gwPulseCount            = 0;
                                gwLastPulseCount        = 0;
                        }
                        /*
                        * Ignore the first time.
                        */
                        if( gwLastPulseCount == 0 )
                        {
                                gwLastPulseCount = gwPulseCount;
                                break;
                        }

                        /*
                         * MACRO operation.
```

```
*/
if ( gfRecMacro == TRUE )
{
        CountEventsForKnobMacro( &sEvent );
        if (( gwPulseCount > gwCurrPulseCnt ) && ( gfFwdFirst == TRUE
))
        {
                gfFwdFirst = FALSE;
                gfRevFirst = TRUE;
                gfDirChanged = TRUE;
                gfShortIdle = FALSE;
        }
        if (( gwPulseCount < gwCurrPulseCnt ) && ( gfRevFirst == TRUE
))
        {
                gfFwdFirst = TRUE;
                gfRevFirst = FALSE;
                gfDirChanged = TRUE;
                gfShortIdle = FALSE;
        }
        if (( gfEncoderEntry == FALSE )  || ( gfDirChanged == TRUE ) ||
                        ( gfShortIdle == TRUE ))
        {
                glLastTicks = glCurrTicks;
                glCurrTicks = GetTicks();
                if ( glLastTicks != 0 )
                        glTicksLapse = glCurrTicks - glLastTicks;
                RecUserInput( &sEvent );
                gfEncoderEntry = TRUE;
                gfDirChanged = FALSE;
                gfShortIdle = FALSE;
        }
        gwCurrPulseCnt = gwPulseCount;
}

if ( grfLedStatus[SHUTTLE_LED] )
{
        if( !gfShuttleInit )
        {
                if ( gwPulseCount > gwLastPulseCount )
                {
                        if( ( ( gwRt3State &RT3_DISK_STATE ) != RT3_PLAYING
) &&
                                ( gwPlaySpd == 0 ) &&
                                ( gwPlayState == PLAY_STATE_PLAYING_REV
) )
                        {
                                gwLastPulseCount = gwPulseCount;
                                return;
                        }
                }
                else
                {
                        if( ( ( gwRt3State &RT3_DISK_STATE ) != RT3_PLAYING
) &&
                                ( gwPlaySpd == 0 ) &&
                                ( gwPlayState == PLAY_STATE_PLAYING_FWD
) )
                        {
                                gwLastPulseCount = gwPulseCount;
                                return;
                        }
                }
        }

        gwCountDifference = gwPulseCount - gwLastPulseCount;

        if ( gwCountDifference > 0 )
        {
                if( ( ABS( gwSpdTableIndex ) < 127 ) && ( gwPlaySpd >
0 ) )
                {
                        if( gwPlayState == PLAY_STATE_PLAYING_REV )
                                RtPrepareToTurn();
```

```
                        if( gwPlayState == PLAY_STATE_PLAYING_FWD )
                        {
                                gfPlayClosed    = FALSE;
                                switch( gwRt3State )
                                {
                                case RT3_FREEZE_FS1_NO_RECORD:
                                        while( gfEvenFrame || gfField2 );

                                        gwRt3State = RT3_TOGGLE_FS_PLAYING;

                                        break;
                                case RT3_FREEZE_FS2_NO_RECORD:
                                        while( !gfEvenFrame || gfField2 );

                                        gwRt3State = RT3_TOGGLE_FS_PLAYING;

                                        break;
                                case RT3_TOGGLE_FS_BYPASSING:

                                        while( gfEvenFrame || gfField2 );

                                        if( OpenFs( FS_MODE_PLAY ) != TRUE )

                                                return;
                                        gwRt3State = RT3_TOGGLE_FS_PLAYING;

                                        break;
                                }
                                gfShuttleInit    = FALSE;
                        }
                }

                if ( gwSpdTableIndex < 127 )
                        gwSpdTableIndex += gwCountDifference;
                if ( gwSpdTableIndex > 127 )
                        gwSpdTableIndex = 127;
        }
        if ( gwCountDifference < 0 )
        {
                if( ( ABS( gwSpdTableIndex ) < 127 ) && ( gwPlaySpd < 0 ) )

                {
                        if( gwPlayState == PLAY_STATE_PLAYING_FWD )
                                RtPrepareToTurn();
                        if( gwPlayState == PLAY_STATE_PLAYING_REV )
                        {
                                gfPlayClosed    = FALSE;
                                switch( gwRt3State )
                                {
                                case RT3_FREEZE_FS1_NO_RECORD:
                                        while( gfEvenFrame || gfField2 );

                                        gwRt3State = RT3_TOGGLE_FS_PLAYING;

                                        break;
                                case RT3_FREEZE_FS2_NO_RECORD:
                                        while( !gfEvenFrame || gfField2 );

                                        gwRt3State = RT3_TOGGLE_FS_PLAYING;

                                        break;
                                case RT3_TOGGLE_FS_BYPASSING:
                                        while( gfEvenFrame || gfField2 );

                                        if( OpenFs( FS_MODE_PLAY ) != TRUE )

                                                return;
                                        gwRt3State = RT3_TOGGLE_FS_PLAYING;

                                        break;
                                }
                                gfShuttleInit    = FALSE;
                        }
                }
```

```
                if ( gwSpdTableIndex > -127 )
                        gwSpdTableIndex += gwCountDifference;
                if ( gwSpdTableIndex < -127 )
                        gwSpdTableIndex = -127;
        }
        gwPlaySpd = rwSpdValue[ ABS( gwSpdTableIndex ) ];
        if ( gwSpdTableIndex < 0 )
                gwPlaySpd = -gwPlaySpd;
        gwLastPulseCount = gwPulseCount;
        UiDispRtSpd( gwPlaySpd, SPD_X_DISP, SPD_Y_DISP );
}
else
if (( gfVariSpeedSession == ON ) &&
        ( gwPlayState != PLAY_STATE_STEPPING_FWD ) &&
        ( gwPlayState != PLAY_STATE_STEPPING_REV ) &&
        ( gwRt3State == RT3_TOGGLE_FS_PLAYING ))
{
        gwCountDifference = gwPulseCount - gwLastPulseCount;
        wDeltaSpd = gwCountDifference;
        if ( ABS( gwCountDifference ) > 40 )
                wDeltaSpd *= 16;
        else
        if ( ABS( gwCountDifference ) > 30 )
                wDeltaSpd *= 8;
        else
        if ( ABS( gwCountDifference ) > 20 )
                wDeltaSpd *= 4;
        else
        if ( ABS( gwCountDifference ) > 10 )
                wDeltaSpd *= 2;
        if ( gwCountDifference > 0 )
        {
                if ( gwPlaySpd < 10000 )
                        gwPlaySpd += wDeltaSpd;
                if ( gwPlaySpd >= 10000 )
                        gwPlaySpd = 9999;
        }
        if ( gwCountDifference < 0 )
        {
                if ( gwPlaySpd > -10000 )
                        gwPlaySpd += wDeltaSpd;
                if ( gwPlaySpd <= -10000 )
                        gwPlaySpd = -9999;
        }
        gwCurrVariSpd = gwPlaySpd;
        UiDispRtSpd( gwPlaySpd, SPD_X_DISP, SPD_Y_DISP );
        gwLastPulseCount = gwPulseCount;
}
else if ( gsUiState.eCurrMode == SEG_EDIT )
{
        if ( gwPulseCount > gwLastPulseCount )
        {
                wLastPulseCount = gwLastPulseCount;
                gwLastPulseCount +=
                        (( gwPulseCount - gwLastPulseCount ) / 16 ) *
16;
                if ( wLastPulseCount != gwLastPulseCount )
                        if ( gfCheckSecondPress == TRUE )
                                ChangeFieldValue( INCREASE );
                        else
                                ScrollSegmentList( SCROLL_DOWN );
        }
        else if ( gwPulseCount < gwLastPulseCount )
        {
                wLastPulseCount = gwLastPulseCount;
                gwLastPulseCount -=
                        (( gwLastPulseCount - gwPulseCount ) / 16 ) *
16;
                if ( wLastPulseCount != gwLastPulseCount )
                        if ( gfCheckSecondPress == TRUE )
                                ChangeFieldValue( DECREASE );
                        else
                                ScrollSegmentList( SCROLL_UP );
        }
}
```

```
else if ( gsUiState.eCurrMode == MACRO_LIST )
{
        if ( gwPulseCount > gwLastPulseCount )

        {
                wLastPulseCount = gwLastPulseCount;
                gwLastPulseCount +=
                        (( gwPulseCount - gwLastPulseCount ) / 16 ) *
16;
                if ( wLastPulseCount != gwLastPulseCount )
                        ScrollMacroLists( SCROLL_DOWN );
        }
        else if ( gwPulseCount < gwLastPulseCount )
        {
                wLastPulseCount = gwLastPulseCount;
                gwLastPulseCount -=
                        (( gwLastPulseCount - gwPulseCount ) / 16 ) *
16;
                if ( wLastPulseCount != gwLastPulseCount )
                        ScrollMacroLists( SCROLL_UP );
        }
}
else if ( gsUiState.eCurrMode == SEG_LIST )
{
        if ( gwPulseCount > gwLastPulseCount )
        {
                wLastPulseCount = gwLastPulseCount;
                gwLastPulseCount +=
                        (( gwPulseCount - gwLastPulseCount ) / 16 ) *
16;
                if ( wLastPulseCount != gwLastPulseCount )
                        ScrollSegLists( SCROLL_DOWN );
        }
        else if ( gwPulseCount < gwLastPulseCount )
        {
                wLastPulseCount = gwLastPulseCount;
                gwLastPulseCount -=
                        (( gwLastPulseCount - gwPulseCount ) / 16 ) *
16;
                if ( wLastPulseCount != gwLastPulseCount )
                        ScrollSegLists( SCROLL_UP );
        }
}
else if ( gsUiState.eCurrMode == CLIP_EDIT )
{
        if ( gwPulseCount > gwLastPulseCount )
        {
                wLastPulseCount = gwLastPulseCount;
                gwLastPulseCount +=
                        (( gwPulseCount - gwLastPulseCount ) / 16 ) *
16;
                if ( wLastPulseCount != gwLastPulseCount )
                        if ( gfCheckSecondPress == TRUE )
                                ChangeFieldValue( INCREASE );/* to be
changed */
                        else
                                ScrollClipTable( SCROLL_DOWN );
        }
        else if ( gwPulseCount < gwLastPulseCount )
        {
                wLastPulseCount = gwLastPulseCount;
                gwLastPulseCount -=
                        (( gwLastPulseCount - gwPulseCount ) / 16 ) *
16;
                if ( wLastPulseCount != gwLastPulseCount )
                        if ( gfCheckSecondPress == TRUE )
                                ChangeFieldValue( DECREASE );/* to be
changed */
                        else
                                ScrollClipTable( SCROLL_UP );
        }
```

```
            }
            else
            if( gwPulseCount > gwLastPulseCount )
            {
                    fJogFwd         = TRUE;
                    gfEncoderPos = TRUE;
                    gfEncoderNeg = FALSE;
                    if ( gfDataEntry == YES )
                {
                        if ((( gwPulseCount - gwLastPulseCount ) / 16 ) * 16 !=
0 )
                                (*gpsCurrHardKey->Process)( &sEvent );
                }
                else
                {
                        if( HandleJog( fJogFwd ) != TRUE )
                                return;
                }
                gwLastPulseCount        +=
                        ( ( gwPulseCount - gwLastPulseCount ) / 40 ) * 40;
        }
        else
        if( gwPulseCount < gwLastPulseCount )
        {
                fJogFwd         = FALSE;
                gfEncoderPos = FALSE;
                gfEncoderNeg = TRUE;
                if ( gfDataEntry == YES )
                {
                        if ((( gwPulseCount - gwLastPulseCount ) / 16 ) * 16 !=
0 )
                        {
                                (*gpsCurrHardKey->Process)( &sEvent );
                        }
                }
                else
                {
                        if( HandleJog( fJogFwd ) != TRUE )
                                return;
                }
                gwLastPulseCount        -=
                        ( ( gwLastPulseCount - gwPulseCount ) / 40 ) * 40;
        }

        /*
         * MACRO operation.
         */
        CheckMacroForEncoder();
        break;
#endif

    case BUTTONDOWN_EVENT:
        /*
         * MACRO operation.
         */
        CheckMacrobeforeKeyDownProcess( &sEvent );

        if ( geButton != GetButtonID( sEvent.uData.sButtonUp.rbButtonId ))
        {
                geButtonBeforeLast = geLastButton;
                geLastButton = geButton;
        }
        (*gpsCurrHardKey->Process)( &sEvent );

        /*

         */
        CheckRunMacroAfterKeyDnProcess();
        break;

    default:
        break;
}
/*
```

```
 * MACRO operation.
 */
        CheckRunMacroAfterEachEvent();
}

/*
*
*       MainGetNextEvent
*
*       OVERVIEW:
*       event handler which looks in the Control Panel Queue for events
*
*/
        static void
MainGetNextEvent( psEvent )
        MAIN_EVENT      *psEvent;
{
        QUEUE_MEMBER *psNextMember;

        psNextMember = GetNextInTheQueue();

        if ( psNextMember )
                *psEvent = psNextMember->sEvent;
        else
                psEvent->eType = NULL_EVENT;
}

/*
*-
*       GetNextInTheQueue
*
*       OVERVIEW:
*       returns 0 if no items are in the Queue
*
*/
        static QUEUE_MEMBER *
GetNextInTheQueue()
{
        QUEUE_MEMBER *psRead;

        if( ISEMPTY( sCPEventQueue ))
                return( (QUEUE_MEMBER *) 0 );

        psRead = READ(sCPEventQueue);

                /* move the read pointer */
        READ( sCPEventQueue ) = READ( sCPEventQueue )->psNext;
        return( psRead );
}

/*
*
*       PostEventCp
*
*       posts a new event into the event Queue
*
*/

        void
PostEventCp( eType, pTheData )
        EVENT   eType;                  /* the type of event */
        void    *pTheData;              /* data that goes with event */
{
        /* see if we have run out of queue space */
        if ( ISFULL( sCPEventQueue ))
                /* throw away the oldest event */
                READ( sCPEventQueue ) = READ( sCPEventQueue )->psNext;

        /*
        ** if an encoder event, and the previous one was one too, throw away
        ** the previous event
        */
        if (eType == ENCODER_EVENT && ! ISEMPTY( sCPEventQueue ) &&
```

```
                WRITE( sCPEventQueue )->psPrev->sEvent.eType == ENCODER_EVENT )
            WRITE( sCPEventQueue ) = WRITE( sCPEventQueue )->psPrev;   /* move the write pointer
*/

        /* initialize the Queue member */
        WRITE( sCPEventQueue )->sEvent.eType = eType;
        WRITE( sCPEventQueue )->sEvent.uData = ** (( EVENT_DATA **) &pTheData );

#if 0
        if (eType == ENCODER_EVENT)
        {
                DispStr[0] = WRITE( sCPEventQueue )->sEvent.uData.sEncoder.rbData[0];;;;;
                DispStr[1] = WRITE( sCPEventQueue )->sEvent.uData.sEncoder.rbData[1];;;;;
                DispStr[2] = WRITE( sCPEventQueue )->sEvent.uData.sEncoder.rbData[2];;;;;
                DispStr[3] = WRITE( sCPEventQueue )->sEvent.uData.sEncoder.rbData[3];;;;;
                DispStr[4] = '\0';
                UiDispStr( DispStr, 6, 6 );;;;;
        }
#endif

        WRITE( sCPEventQueue ) = WRITE( sCPEventQueue )->psNext;   /* move the write pointer */
}


/*
*
*       UiGetNumEvents
*
*       OVERVIEW:
*       Returns the number of events in the event queue
*
*       RETURNED VALUE:
*       Number of events pending
*
*/
        SINT16
UiGetNumEvents()
{
        if (WRITE(sCPEventQueue) >= READ(sCPEventQueue))
                return (WRITE(sCPEventQueue) - READ(sCPEventQueue));
        else
                return ((LAST_MEMBER(sCPEventQueue) - READ(sCPEventQueue)) + (WRITE(sCPEventQueue)
                                - FIRST_MEMBER(sCPEventQueue) + 1));
}


/*
*
*       HandleTrackballEvent
*
*       OVERVIEW:
*
*
*       RETURNED VALUE:
*       NONE
*
*       PARAMETER LIST:
*       the x,y coordinates in ASCII String Vbls
*/
        static void
HandleTrackballEvent( pbXPos, pbYPos )
        SINT8   *pbXPos, *pbYPos;
{
        SINT8   bLoByte, bHiByte;
        PIXEL   xPos;

        GetHexBits(&bHiByte, pbXPos, 2);
        GetHexBits(&bLoByte, pbXPos + 2, 2);
        xPos.wX = bHiByte & 0xff;
        xPos.wX <<= 8;
        xPos.wX |= bLoByte & 0xff;
        xPos.wX <<= 1;   /* to match vertical resolution (overflow problem?) */

        GetHexBits(&bHiByte, pbYPos, 2);
        GetHexBits(&bLoByte, pbYPos + 2, 2);
```

```
        xPos.wY = bHiByte & 0xff;
        xPos.wY <<= 8;
        xPos.wY |= bLoByte & 0xff;

        if (gsUiState.xTrackball.wX != xPos.wX || gsUiState.xTrackball.wY != xPos.wY)
        {
                gsUiState.xTrackball = xPos;
                gsUiState.lTrackballTime = GetTicks();
        }
}


/*
*
*       HandleVersionEvent
*
*       OVERVIEW:
*       Sets the Control Panel Version Code in Main State data
*
*       PARAMETER LIST:
*       the Control Panel Version Code
*
*/
  static void
HandleVersionEvent( bVersion)
        UINT8   bVersion;
{
        /*
         * Once we got CP version back, we know it is a master
         */
        gfMasterRtd                             = TRUE;
        gsUiState.bCPVersion     = bVersion;
}


#if 0           /* not implemented in RTD */
        void
HandleRegRead( request )
        RegReadMessage *request;
{
        UINT16  theData;
        UINT8   reg;
        GetHexBits( &reg, request->reg, 2 );

        theData = ReadRTDReg(request->board, reg);        /* read register */

        UiSendRegValue( request->board, request->reg, theData );
}

        void
HandleRegWrite( request )
        RegWriteMessage *request;
{
        UINT16  theData;
        UINT8   reg, hiByte, loByte;

        GetHexBits( &reg, request->reg, 2 );

        GetHexBits( &hiByte, request->data, 2 );
        GetHexBits( &loByte, &(request->data[2]), 2 );
        theData = hiByte & 0xff;
        theData <<= 8;
        theData |= loByte & 0xff;

        WriteRTDReg(request->board, reg, theData);              /* write register */
}
#endif          /* not implemented in RTD */


/*
 *----------------------------------------------------------------------------
 *  ruifunc.c    Copyright 1991 Accom Inc.
 *
```

```
 *      Responsible Person: Kevin Hsu
 *
 *------------------------------------------          ------------------------
 */
#include "rglobal.h"
#include "rui.h"
#include "ruievent.h"
#include "rcom.h"
#include "rtime.h"
#include "rdisk.h"

#if RTD         /* RTD */

#include "rhw.h"

#else  /* do simulation */

#include "hsimu.h"
#include "hcpevent.h"
#include "hbuttons.h"

extern  SINT16  CPEventLoop();
extern  void    CPRxStr( SINT8  * );
extern  SINT32  TickCount();
extern  void    SysBeep();
extern  void    DrawDisplay();

#endif  /* RTD */

static SINT8    LedStatus[8];
static UINT8    ButtonStatus[8];


static PIXEL    xTrackballOffset        = {0, 0};
static PIXEL    xLastTrackball          = {0, 0};
/*
**      the button array
*/

BUTTON  grsButton[] =
{
        {1152, 2944, 1, 1, 1, 1, 0,  M11 },      /* 00 */
        {1920, 2944, 1, 0, 1, 0, 0,  M12 },      /* 01 */
        {2688, 2944, 1, 1, 1, 0, 0,  M13 },      /* 02 */
        {3456, 2944, 1, 1, 1, 0, 0,  M14 },      /* 03 */
        {4224, 2944, 1, 1, 1, 0, 0,  M15 },      /* 04 */
        {4992, 2944, 1, 1, 1, 0, 0,  M16 },      /* 05 */
        {5760, 2944, 1, 1, 1, 0, 0,  M17 },      /* 06 */
        {6528, 2944, 1, 1, 1, 0, 0,  M18 },      /* 07 */
        {7296, 2944, 1, 1, 1, 0, 0,  M19 },      /* 08 */
        {8064, 2944, 1, 1, 1, 0, 0,  M1A },      /* 09 */

        {1152, 2176, 1, 1, 1, 1, 0,  M21 },      /* 10 */
        {1920, 2176, 1, 0, 1, 0, 0,  M22 },      /* 11 */
        {2688, 2176, 1, 1, 1, 0, 0,  M23 },      /* 12 */
        {3456, 2176, 1, 1, 1, 0, 0,  M24 },      /* 13 */
        {4224, 2176, 1, 1, 1, 0, 0,  M25 },      /* 14 */
        {4992, 2176, 1, 1, 1, 0, 0,  M26 },      /* 15 */
        {5760, 2176, 1, 1, 1, 0, 0,  M27 },      /* 16 */
        {6528, 2176, 1, 1, 1, 0, 0,  M28 },      /* 17 */
        {7296, 2176, 1, 1, 1, 0, 0,  M29 },      /* 18 */
        {8064, 2176, 1, 1, 1, 0, 0,  M2A },      /* 19 */


        {1152, 1408, 1, 1, 1, 1, 0,  M31 },      /* 20 */
        {1920, 1408, 1, 1, 1, 0, 0,  M32 },      /* 21 */
        {2688, 1408, 1, 1, 1, 0, 0,  M33 },      /* 22 */
        {3456, 1408, 1, 1, 1, 0, 0,  M34 },      /* 23 */
        {4224, 1408, 1, 1, 1, 0, 0,  M35 },      /* 24 */
        {4992, 1408, 1, 1, 1, 0, 0,  M36 },      /* 25 */
        {5760, 1408, 1, 1, 1, 0, 0,  M37 },      /* 26 */
        {6528, 1408, 1, 1, 1, 0, 0,  M38 },      /* 27 */
        {7296, 1408, 1, 1, 1, 0, 0,  M39 },      /* 28 */
        {8064, 1408, 1, 1, 1, 0, 0,  M3A },      /* 29 */
```

```
	{1152, 640,  1, 1, 1, 1, 0,  M41 },      /* 30 */
	{1920, 640,  1, 1, 1, 1, 0,  M42 },      /* 31 */
	{2688, 640,  1, 1, 1, 0, 0,  M43 },      /* 32 */
	{3456, 640,  1, 1, 1, 0, 0,  M44 },      /* 33 */
	{4224, 640,  1, 1, 1, 0, 0,  M45 },      /* 34 */
	{4992, 640,  1, 1, 1, 0, 0,  M46 },      /* 35 */
	{5760, 640,  1, 1, 1, 0, 0,  M47 },      /* 36 */
	{6528, 640,  1, 1, 1, 0, 0,  M48 },      /* 37 */
	{7296, 640,  1, 1, 1, 0, 0,  M49 },      /* 38 */
	{8064, 640,  1, 1, 1, 0, 0,  M4A },      /* 39 */


/* the numeric keypad, 12 buttons */
	{ 9344, 4736,    1, 1, 0, 0, 0,  N11 },  /* 40,  7  */
	{10112, 4736,    1, 1, 0, 0, 0,  N12 },  /* 41,  8  */
	{10880, 4736,    1, 1, 0, 0, 0,  N13 },  /* 42,  9  */
	{11648, 4736,    1, 1, 0, 0, 0,  N14 },  /* 43, CLR */
	{ 9344, 3968,    1, 1, 0, 0, 0,  N21 },  /* 44,  4  */
	{10112, 3968,    1, 1, 0, 0, 0,  N22 },  /* 45,  5  */
	{10880, 3968,    1, 1, 0, 0, 0,  N23 },  /* 46,  6  */
#if RTD
	{11648, 3968,    1, 1, 0, 0, 0,  N24 },  /* 47, FLD */
#else
	{11648, 3968,    1, 1, 0, 0, 0,  N24 },  /* 47      */
#endif
	{ 9344, 3200,    1, 1, 0, 0, 0,  N31 },  /* 48,  1  */
	{10112, 3200,    1, 1, 0, 0, 0,  N32 },  /* 49,  2  */
	{10880, 3200,    1, 1, 0, 0, 0,  N33 },  /* 50,  3  */
	{11648, 3200,    1, 1, 0, 0, 0,  N34 },  /* 51      */
	{ 9344, 2432,    1, 1, 0, 0, 0,  N41 },  /* 52, +-  */
	{10112, 2432,    1, 1, 0, 0, 0,  N42 },  /* 53,  0  */
	{10880, 2432,    1, 1, 0, 0, 0,  N43 },  /* 54,  .  */
	{11648, 2432,    1, 1, 0, 0, 0,  N44 },  /* 55      */

/* softkeys */
	{1920, 4224,     1, 1, 0, 1, 0,  SK1 },  /* 56 */
	{3264, 4224,     1, 1, 0, 1, 0,  SK2 },  /* 57 */
	{4608, 4224,     1, 1, 0, 1, 0,  SK3 },  /* 58 */
	{5952, 4224,     1, 1, 0, 1, 0,  SK4 },  /* 59 */
	{7296, 4224,     1, 1, 0, 1, 0,  SK5 },  /* 60 */

/* the ENTER key */
	{10496, 1024,    1, 1, 0, 0, 0,  ENTR }, /* 61 */

#if !RTD        /* additional simulation  keys */

/* encoder simulation */
	{11264, 6776,    1, 1, 0, 1, 0,  "EC", F6,        ENCODER_BUTTON },

/* no key */
	{-1000, -1000,   1, 1, 0, 0, 0, "", '\x01',       NOBUTTON },

/* arrow keys */
	{-1000, -1000,   1, 1, 0, 0, 0, "", LeftArrow,    LEFT_BUTTON },
	{-1000, -1000,   1, 1, 0, 0, 0, "", RightArrow,   RIGHT_BUTTON },
	{-1000, -1000,   1, 1, 0, 0, 0, "", UpArrow,          UP_BUTTON },
	{-1000, -1000,   1, 1, 0, 0, 0, "", DownArrow,    DOWN_BUTTON },
#endif
};
SINT16          wNumButtons = NumEntries( grsButton );

/*
**      Keycode remap table (ensures numeric codes are 0..9 etc.)
*/
BUTTON_ID remap[] = {

#if 0           /* old control panels (pre Rev C pcb) */
                                        BYPASS,                 /* m11 */
                                        GRAB,                   /* m12 */
                                        RECORD_SETUP,   /* m13 */
                                        INPUT_SETUP,    /* m14 */
                                        AUDIO_SETUP,    /* m15 */
                                        TCODE_SETUP,    /* m16 */
                                        RMOTE_SETUP,    /* m17 */
                                        OUTPUT_SETUP,   /* m18 */
```

```
	CINE,			/* m19 */
	NORM,			/* m1a */

	VARI_SPEED,		/* m21 */
	SWAP,			/* m22 */
	RECORD_LOCK,	/* m23 */
	SMO_MO,			/* m24 */
	DIAG_TEST,		/* m25 */
	GPI_SETUP,		/* m26 */
	BACKUP,			/* m27 */
	DUB_DUMP,		/* m28 */
	CLIP,			/* m29 */
	SEG,			/* m2a */

	STEP_REV,		/* m31 */
	RECORD,			/* m32 */
	STEP_FWD,		/* m33 */
	PINGPONG,		/* m34 */
#if RTD
	NOT_USED,		/* m35 */
	MACRO,			/* m36 */
	NOT_USED,		/* m37 */
#else
	FIELD,			/* m35 */
	MACRO,			/* m36 */
	CLEAR_NUMERIC,	/* m37 */
#endif
	INSERT_CLIP,	/* m38 */
	NOT_USED,		/* m39 */
	SEG_INSERT,		/* m3a */

	PLAY_REV,		/* m41 */
	STOP,			/* m42 */
	PLAY_FWD,		/* m43 */
	LOOP,			/* m44 */
	NOT_USED,		/* m45 */
	NOT_USED,		/* m46 */
	NOT_USED,		/* m47 */
	BROWSE,			/* m48 */
	MARK_IN,		/* m49 */
	MARK_OUT,		/* m4a */

	SEVEN,			/* n11 */
	EIGHT,			/* n12 */
	NINE,			/* n13 */
#if RTD
	CLEAR_NUMERIC,	/* n14 */
#else
	NOT_USED,		/* n14 */
#endif

	FOUR,			/* n21 */
	FIVE,			/* n22 */
	SIX,			/* n23 */
#if RTD
	FIELD,			/* n24 */
#else
	NOT_USED,		/* n24 */
#endif
	ONE,			/* n31 */
	TWO,			/* n32 */
	THREE,			/* n33 */
	NOT_USED,		/* n34 */

	SIGN_TOGGLE,	/* n41 */
	ZERO,			/* n42 */
	DECIMAL_POINT,	/* n43 */
	NOT_USED,		/* n44 */

	SOFT1,			/* sf1 */
	SOFT2,			/* sf2 */
	SOFT3,			/* sf3 */
	SOFT4,			/* sf4 */
	SOFT5,			/* sf5 */
```

```
                                        DO_IT                       /* ent */
#else          /* new control panels (Rev C pcb) */

                                        BYPASS,                     /* m11 */
                                        GRAB,                       /* m12 */
                                        RECORD_SETUP,      /* m13 */
                                        INPUT_SETUP,       /* m14 */
                                        AUDIO_SETUP,       /* m15 */
                                        TCODE_SETUP,       /* m16 */
                                        RMOTE_SETUP,       /* m17 */
                                        OUTPUT_SETUP,      /* m18 */
                                        CINE,                       /* m19 */
                                        NORM,                       /* m1a */

                                        VARI_SPEED,                 /* m21 */
                                        RECORD_LOCK,       /* m22 */
                                        SMO_MO,                     /* m23 */
                                        SWAP,                       /* m24 */
                                        NOT_USED,                   /* m25 */

                                        GPI_SETUP,                  /* m26 */
                                        BACKUP,                     /* m27 */
                                        DUB_DUMP,                   /* m28 */
                                        CLIP,                       /* m29 */
                                        SEG,                        /* m2a */

                                        STEP_REV,                   /* m31 */
                                        RECORD,                     /* m32 */
                                        STEP_FWD,                   /* m33 */
                                        PINGPONG,                   /* m34 */
                                        NOT_USED,                   /* m35 */
                                        NOT_USED,                   /* m36 */
                                        DIAG_TEST,                  /* m37 */
                                        INSERT_CLIP,       /* m38 */
                                        NOT_USED,                   /* m39 */
                                        SEG_INSERT,                 /* m3a */

                                        PLAY_REV,                   /* m41 */
                                        STOP,                       /* m42 */
                                        PLAY_FWD,                   /* m43 */
                                        LOOP,                       /* m44 */
                                        SHUTTLE,                    /* m45 */
                                        MACRO,                      /* m46 */
                                        MARK_IN,                    /* m47 */
                                        MARK_OUT,                   /* m48 */
                                        BROWSE,                     /* m49 */
                                        GOTO,                       /* m4a */

                                        SEVEN,                      /* n11 */
                                        EIGHT,                      /* n12 */
                                        NINE,                       /* n13 */
                                        CLEAR_NUMERIC,     /* n14 */

                                        FOUR,                       /* n21 */
                                        FIVE,                       /* n22 */
                                        SIX,                        /* n23 */
                                        FIELD,                      /* n24 */

                                        ONE,                        /* n31 */
                                        TWO,                        /* n32 */
                                        THREE,                      /* n33 */
                                        SIGN_TOGGLE,       /* n34 */

                                        ZERO,                       /* n41 */
                                        DECIMAL_POINT,     /* n42 */
                                        NOT_USED,                   /* n43 */
                                        NOT_USED,                   /* n44 */

                                        SOFT1,                      /* sf1 */
                                        SOFT2,                      /* sf2 */
                                        SOFT3,                      /* sf3 */
                                        SOFT4,                      /* sf4 */
                                        SOFT5,                      /* sf5 */

                                        DO_IT                       /* ent */
#endif         /* old control panels (pre Rev C pcb) */
```

```
};

/*
** returns Button ID
*/
        BUTTON_ID
GetButtonID( rbId )
        SINT8 rbId[2];
{
        SINT16 index = 0;

        GetHexBits( (char*)&index, rbId, sizeof( rbId ) );
        if( index >= MAX_BUTTON_CODE )
                return( NOT_USED );

        return( remap[ index ] );
}


/*
** determine which button goes with the given Button ID
*/

        BUTTON *
IDToButton( theID )
        BUTTON_ID theID;
{
        if( theID >= 0 && theID < NumEntries(grsButton) )
                return( &grsButton[ theID ]  );
        else
                return( (BUTTON *) 0 );
}


/*
** set hex bits.
**
*/
        void
SetHexBits( pbTo, pbFrom, wNumHexChars )
        UINT8   *pbTo, *pbFrom;
        UINT16  wNumHexChars;
{
        UINT8   bHex;
        FLAG    fFirst;

        for ( fFirst = TRUE; wNumHexChars > 0; wNumHexChars-- )
        {
                if ( fFirst )
                        bHex = (UINT8) ((*pbFrom & 0xf0) >> 4);
                else
                        bHex = (UINT8) (*pbFrom++ & 0x0f);

                if ( bHex >= 10 )
                        *pbTo++ = (UINT8) ('A' + (bHex - 10));
                else
                        *pbTo++ = (UINT8) ('0' + bHex);

                fFirst = (FLAG) (!fFirst);
        }
}

/*
** get hex bits.
*/
        void
GetHexBits(pbTo, pbFrom, wNumHexChars)
        SINT8   *pbTo, *pbFrom;
        SINT16  wNumHexChars;
{
        UINT8   bHex;
        FLAG    fFirst;
```

```
        for ( fFirst = TRUE; wNumHexChars > 0; wNumHexChars--)
        {
                bHex = (UINT8) (*pbFrom - '0');
                if (bHex >= 10)
                        bHex = (UINT8) (*pbFrom - 'A' + 10);
                if (bHex >= 16)
                        bHex = (UINT8) (*pbFrom - 'a' + 10);

                bHex &= 0xf;
                ++pbFrom;

                if ( fFirst )
                        *pbTo = (UINT8) (bHex << 4);
                else
                        *pbTo++ |= bHex;

                fFirst = (FLAG) (!fFirst);
        }
}


#if     0       /* jeff!! Temp, Until find out why new code caused varspd flash */
        void
MainTxStr( port, theStr )
        UINT8   port;
        UINT8   *theStr;
{
        register SINT16  i;
        static  FLAG    fTxInProgress;

        /* put originator at first character */
        theStr[0] = ORIGINATOR;

        /* put a null at the end of the string */
        for (i = 1; theStr[i] != TERMINATOR; i++);
        theStr[++i] = '\0';

#if RTD
        if( !fTxInProgress )
        {
                fTxInProgress = TRUE;
                TxComMsg( port, theStr);        /* send the string out */
        }
        else
        {
                StrCpy(gstrIntr, theStr);               /* buffer the string */
                return;
        }
        if( gstrIntr[0] )
                TxComMsg( port, gstrIntr );
        gstrIntr[0]             = NULL;
        fTxInProgress   = FALSE;

        gwcntHiCmdCnt = HI_DELAY_TIME;          /* reset the Hi Count */
#else
        if (port == COM1)
                CPRxStr(theStr);
#endif
}
#else   /* jeff */

        void
MainTxStr( port, theStr )
        UINT8   port;
        UINT8   *theStr;
{
        register SINT16  i;

        /* put originator at first character */
        theStr[0] = ORIGINATOR;

        /* put a null at the end of the string */
        for (i = 1; theStr[i] != TERMINATOR; i++);
        theStr[++i] = '\0';
```

```
#if RTD
        if ( !gfInVertical )
                TxComMsg( port, theStr);        /* send the string out */
        else
                StrCpy(gstrIntr, theStr);               /* buffer the string */

        gwcntHiCmdCnt = HI_DELAY_TIME;          /* reset the Hi Count */
#else
        if (port == COM1)
                CPRxStr(theStr);
#endif
}
#endif  /* jeff */

/*
**      Swap current Menu Processes
*/


/*
**      Swap current Menu Processes
*/
#if 0
void ( * gpsCurrHardKey->Init )( void );
void ( * gpsCurrHardKey->Process )( MAIN_EVENT * );;;;
#endif


/*
**      Start new Menu Process
*/
        void
StartProcess( L )
        HARD_KEY *L;
{
        gsUiState.eLastMode = gsUiState.eCurrMode;
        gsUiState.eCurrMode = geButton;
        L->psLast = gpsCurrHardKey;
        gpsCurrHardKey = L;
        (*gpsCurrHardKey->Init)();
}


/*
** send a button Led event
*/
        void
UiSetLed( buttonID, light )
        LED_ID  buttonID;
        FLAG            light;
{
        LED_SET_MSG     theMsg;
        if( light )
                grfLedStatus[buttonID] = ON;            /* set led's status to ON */
        else
                grfLedStatus[buttonID] = OFF;           /* set led's status to OFF */

        theMsg.cPrefix                  = LED_CHAR;
        theMsg.cOpcode                  = LED_SET;
        SetHexBits( theMsg.rbId, (SINT8 *) &buttonID, sizeof(theMsg.rbId) );
        theMsg.bState = (SINT8) (light + '0');
        theMsg.cTerminator              = TERMINATOR;

        MainTxStr(COM1, (SINT8 *) &theMsg);
}


/*
** return Led status
*/
#define UiLedStatus(led)                grfLedStatus[led]


/*
```

```
**      send a display at location message
*/
        void
UiDispStr( pcStr, cXPos, cYPos )
        UINT8   *pcStr;
        UINT8   cXPos, cYPos;
{
        SINT16                  wLength;
        DISPLAY_STR_MSG  theMsg;

        theMsg.cPrefix   = DISPLAY_CHAR;
        theMsg.cOpcode   = DISPLAY_LOC;
        SetHexBits( theMsg.rcXPos, (SINT8 *) &cXPos, sizeof(theMsg.rcXPos) );
        theMsg.cYPos = (SINT8) (cYPos + '0');
        wLength = StrNCpy( theMsg.rstrData, pcStr, MAXSTRING );
        SetHexBits( theMsg.rbStrLength, (SINT8 *) &wLength, sizeof(theMsg.rbStrLength) );
        StrCat(theMsg.rstrData, TERMINATOR_STR);
        MainTxStr(COM1, (SINT8 *) &theMsg);
}


/*
**      blink an existing string at a given location
*/
        void
UiDispBlinkStr( bnChar, bXPos, bYPos )
        UINT8   bnChar;
        UINT8   bXPos, bYPos;
{
        DISPLAY_BLINK_MSG theMsg;

        theMsg.cPrefix   = DISPLAY_CHAR;
        theMsg.cOpcode   = DISPLAY_BLINK;
        SetHexBits( theMsg.rcXPos, &bXPos, sizeof( theMsg.rcXPos ));
        theMsg.cYPos = (SINT8) (bYPos + '0');
        SetHexBits( theMsg.rbnCharBlink, &bnChar, sizeof( theMsg.rbnCharBlink ));
        theMsg.cTerminator       = TERMINATOR;
        MainTxStr( COM1, ( SINT8 * ) &theMsg );
}

/*
**      send a display at location message
*/
        void
UiDispHighLight( cHighLightMode, cYPos )
        UINT8   cHighLightMode, cYPos;
{
        SINT16                              wLength;
        DISPLAY_HIGHLIGHT_MSG    theMsg;

        theMsg.cPrefix   = DISPLAY_CHAR;
        theMsg.cOpcode   = DISPLAY_HIGHLIGHT;
        theMsg.cHighLightMode = cHighLightMode;
        theMsg.cYPos = (SINT8) (cYPos + '0');
        theMsg.cTerminator       = TERMINATOR;
        MainTxStr(COM1, (SINT8 *) &theMsg);
}


        void
UiClearSpecifiedLine( bLineNo )
        UINT8 bLineNo;
{
        RESET_LINE_MSG   theMsg;

        theMsg.cPrefix           = RESET_CHAR;
        theMsg.cOpcode           = RESET_DISPLAY;
        theMsg.bClearMode        = CLR_SPECIFIED_LINE;
        theMsg.cLineNo           = ( UINT8 )( bLineNo + '0' );
        theMsg.cTerminator       = TERMINATOR;

        MainTxStr(COM1, (SINT8 *) &theMsg);
}


/*
```

```
**      set field to reverse video
*/
        void
UiDispField( bFields, cLine )
        SINT8   bFields;
        SINT8   cLine;
{
        SINT8                           i;
        DISPLAY_FIELD_MSG       theMsg;

        theMsg.cPrefix          = DISPLAY_CHAR;
        theMsg.cOpcode          = DISPLAY_REVERSE_VIDEO;
        theMsg.cYPos            = cLine;

        for( i = 0; i < 5; i++ )
                if ( bFields & ( 1<<i ))
                        theMsg.rbReverseVideo[i] = FIELD_ON;
                else
                        theMsg.rbReverseVideo[i] = FIELD_OFF;

        theMsg.cTerminator      = TERMINATOR;

        MainTxStr(COM1, (SINT8 *) &theMsg);
}


/*
**      print in decimal form to avoid 'sprintf' inclusion
*/
        void
PrintPaddedDec(string, number, nDigits)
        UINT8   *string;
        UINT16  number, nDigits;
{
        UINT16  i;
        UINT8   *ptr;

        ptr = string + nDigits;
        *ptr-- = '\0';

        for (i = nDigits; i; i--, number /= 10 )
                if (number || (i == nDigits))
                        *ptr-- = (SINT8) (number % 10 + '0');
                else
                        *ptr-- = '0';
}


        void
UiDispTc( pTc, cXPos, cYPos, fDispHours, fShowFields )
        UINT8   *pTc;
        UINT8   cXPos, cYPos;
        FLAG    fDispHours;
        FLAG    fShowFields;
{
        UINT8   cStr1[30], cStr2[3];

        if ( fDispHours )
        {
                PrintTcField( cStr1, pTc[3], 0, 23 );     /* hours */
                StrCat( cStr1, ":" );
                PrintTcField( cStr2, pTc[2], 0, 59 );
                StrCat( cStr1, cStr2 );
        }
        else
        {
                cStr1[0] =  (UINT8) (pTc[2] + '0');       /* only 1 minutes digit is allowed */
                cStr1[1] =  '\0';
        }

        StrCat( cStr1, ":" );
        PrintTcField( cStr2, pTc[1], 0, 59 );
        StrCat( cStr1, cStr2 );
        StrCat( cStr1, ":" );
```

```
        /* convert fields to frames */
        PrintTcField( cStr2, pTc[0] / 2, 0, 29 );
        StrCat( cStr1, cStr2 );

        if ( fShowFields )
        {
                if ( pTc[0] % 2 )
                        StrCat( cStr1, "f2" );
                else
                        StrCat( cStr1, "f1" );
        }

        UiDispStr( cStr1, cXPos, cYPos);
}


/*
 * !! DOUG: This is wrong for Drop frame or PAL. Use rtime.c routine( To Do ).
 *
 *    JEFF - Go ahead and make changes as needed
 */
        void
UiDispFieldCntAsTc( wFields, cXPos, cYPos, fDispHours, fShowFields )
        UINT16  wFields;
        UINT8   cXPos, cYPos;
        FLAG    fDispHours;
        FLAG    fShowFields;
{
        UINT8   rTc[5] = {0, 0, 0, 0, 0};
        UINT16  wTemp;

        /* assume hours is 0 for now */
        rTc[2]  = (UINT8) (wFields / 3600);                     /* set minutes */
        wTemp   = wFields - 3600 * rTc[2];
        rTc[1]  = (UINT8) (wTemp / 60);                         /* set seconds */
        rTc[0]  = (UINT8) (wTemp - 60 * rTc[1]); /* set fields */
        UiDispTc( rTc, cXPos, cYPos, fDispHours, fShowFields );
}


/*
 * !! DOUG: This is wrong for Drop frame or PAL. Use rtime.c routine( To Do ).
 *
 *    JEFF - Go ahead and make changes as needed
 */
/*
 * !! Wrong. this routine doesn't consider NTSC/PAL and DF/FF difference.
 * Should use TcToTcStr() and pass TC_STR_DISPLAY as tyTcStr.
 * TcToTcStr() was written with the speed in mind and take into consideration
 * of TV stds and DF/FF factor.
 */
        void
UiDispRtFieldAndTc( fDispField, fDispTc )
        FLAG    fDispField;
        FLAG    fDispTc;
{
        UINT8   cStr1[40], cStr2[5];
        UINT8   rbTc[4] = {0, 0, 0, 0};
        UINT16  wTemp;

        if ( fDispField )
                if( gfFieldMode )
                        PrintPaddedDec( cStr1, gwFieldNum, 4 );
                else
                        PrintPaddedDec( cStr1, gwFieldNum/2, 4 );
        else
                StrCpy( cStr1, "    ");

        StrCat( cStr1, "  ");

        if ( fDispTc )
        {
                /* assume hours is 0 */
```

```
        rbTc[2] = (UINT8) (gwFieldNum / 3600);                  /* set minutes */
        wTemp   = gwFieldNum - 3600 * rbTc[2];
        rbTc[1] = (UINT8) (wTemp / 60);                          /* set seconds */
        rbTc[0] = (UINT8) (wTemp - 60 * rbTc[1]);          /* set fields */

        cStr2[0] =  (UINT8) (rbTc[2] + '0');      /* only 1 minutes digit is allowed */
        cStr2[1] =  '\0';

        StrCat( cStr1, cStr2 );

        StrCat( cStr1, ":" );
        PrintTcField( cStr2, rbTc[1], 0, 59 );
        StrCat( cStr1, cStr2 );
        StrCat( cStr1, ":" );

        PrintTcField( cStr2, rbTc[0] / 2, 0, 29 );        /* convert fields to frames */
        StrCat( cStr1, cStr2 );

                if ( rbTc[0] % 2 )
                        StrCat( cStr1, "f2" );
                else
                        StrCat( cStr1, "f1" );
        }
        else
                StrCat( cStr1, "          " );

        UiDispStr( cStr1, 26, 1 );
}


/*
**      make control panel beep
*/
        void
UiBeep()
{
#if  RTD
        AUDIO_BEEP_MSG   theMsg;

        theMsg.cPrefix          = AUDIO_CHAR;
        theMsg.cOpcode          = AUDIO_BEEP;
        theMsg.cTerminator      = TERMINATOR;

        MainTxStr(COM1, (SINT8 *) &theMsg);
#else
        SysBeep();
#endif
}


/*
**      generic clear display at location message
*/
        void
UiResetDisp( bMode )
        UINT8 bMode;
{
        RESET_DISPLAY_MSG       theMsg;

        theMsg.cPrefix          = RESET_CHAR;
        theMsg.cOpcode          = RESET_DISPLAY;
        theMsg.bClearMode       = bMode;
        theMsg.cTerminator      = TERMINATOR;

        MainTxStr(COM1, (SINT8 *) &theMsg);
}


/*
**      dim the display
*/
        void
UiDimDisp( bDimVal )
        UINT8   bDimVal;
{
        DISPLAY_DIM_MSG         theMsg;
```

```
        theMsg.cPrefix          = DISPLAY_CHAR;
        theMsg.cOpcode          = DISPLAY_DIM;
        theMsg.bDimLevel        = (SINT8) (bDimVal + '0');
        theMsg.cTerminator      = TERMINATOR;

        MainTxStr(COM1, (SINT8 *) &theMsg);
}

/*
**      put up a banner on the display
*/
        void
UiBanner( pcStr, bSpd, cYPos )
        SINT8   *pcStr;
        UINT8   bSpd, cYPos;
{
        SINT16                          wLength;
        DISPLAY_BANNER_MSG      theMsg;

        theMsg.cPrefix   = DISPLAY_CHAR;
        theMsg.cOpcode   = DISPLAY_BANNER;
        SetHexBits( theMsg.rbSpd, (SINT8 *) &bSpd, sizeof(theMsg.rbSpd) );
        theMsg.cYPos     = (SINT8) (cYPos + '0');
        wLength = StrNCpy( theMsg.rstrData, pcStr, MAXSTRING );
        SetHexBits( theMsg.rbStrLength, (SINT8 *) &wLength, sizeof(theMsg.rbStrLength) );
        StrCat( theMsg.rstrData, TERMINATOR_STR );

        MainTxStr(COM1, (SINT8 *) &theMsg);
}

/*
**      put the display cursor at (x, y)
*/
        void
UiDispCursorPos( cXPos, cYPos )
        UINT8   cXPos, cYPos;
{
        DISPLAY_CURSOR_MSG      theMsg;

        theMsg.cPrefix                  = DISPLAY_CHAR;
        theMsg.cOpcode                  = DISPLAY_CURSOR;
        SetHexBits( theMsg.rcXPos, (SINT8 *) &cXPos, sizeof(theMsg.rcXPos) );
        theMsg.cYPos                    = (SINT8) (cYPos + '0');
        theMsg.cTerminator              = TERMINATOR;

        MainTxStr(COM1, (SINT8 *) &theMsg);
}

/*
**      enable/disable the display cursor
*/
        void
UiDispCursorEnable(enable)
        STNT16  enable;
{
        DISPLAY_ENCURSOR_MSG    theMsg;

        theMsg.cPrefix                  = DISPLAY_CHAR;
        theMsg.cOpcode                  = (SINT8) (enable ? DISPLAY_ENCURSOR: DISPLAY_DISCURSOR);
        theMsg.cTerminator              = TERMINATOR;

        MainTxStr(COM1, (SINT8 *) &theMsg);
}


/*
**      send Hi message
*/
        void
UiSayHi()
{
        HI_MSG                          theMsg;

        theMsg.cPrefix          = HI_CHAR;
        theMsg.cTerminator      = TERMINATOR;
```

```
        MainTxStr(COM1, (SINT8 *) &theMsg);
}

/*
** clear all Leds
*/
        void
UiClearLed()
{
        RESET_LED_MSG            theMsg;
        UINT16                       i;

        for ( i = 0 ; i < NUM_OF_LEDS ; i++ )
                grfLedStatus[i] = OFF;                  /* turn off all Status Flags
*/

        theMsg.cPrefix              = RESET_CHAR;
        theMsg.cOpcode              = RESET_LED;
        theMsg.cTerminator          = TERMINATOR;

        MainTxStr(COM1, (SINT8 *) &theMsg);
}

/*
** dim Leds
*/
        void
UiDimLed( bDimVal )
        UINT8   bDimVal;
{
        LED_DIM_MSG                 theMsg;

        theMsg.cPrefix              = LED_CHAR;
        theMsg.cOpcode              = LED_DIM;
        theMsg.bDimLevel            = (SINT8) (bDimVal + '0');
        theMsg.cTerminator          = TERMINATOR;

        MainTxStr(COM1, (SINT8 *) &theMsg);
}


        void
UiSetupNewLed( wLed )
        UINT16  wLed;
{
        switch ( wLed )
        {
                /*
                        Bypass, Step <-, Play <-, Record, Step ->, and Play ->
                        are all mutually exclusive with a few exceptions:

                        BYPASS_LED & STOP_LED
                        STOP_LED & STEP_FWD_LED or STEP_REV_LED
                        RECORD_LED & PLAY_FWD_LED or PLAY_REV_LED

                        Note:
                        Play LEDs don't turn off Record LED but Record turns off Play
                        Updating VARI_SPEED_LED and GOTO_LED don't go by this routine.
                */

                case BYPASS_LED:
                        if ( grfLedStatus[GRAB_LED] )           /* if the Led is On
*/
                                UiSetLed(GRAB_LED, OFF);        /* turn it OFF */

                        if ( grfLedStatus[SHUTTLE_LED] )        /* if shuttle is on */
                                UiSetLed( SHUTTLE_LED, OFF );   /* turn it off */
                        if ( ( gwRt3State & RT3_DISK_STATE ) != RT3_RECORDING )
                        {
                                if ( grfLedStatus[RECORD_LED] )         /* if the Led is On
*/
                                        UiSetLed(RECORD_LED, OFF);      /* turn it OFF
*/

                                if ( grfLedStatus[PLAY_FWD_LED] )       /* if the Led is On
```

```
*/
                        UiSetLed(PLAY_FWD_LED, OFF);     /* turn it OFF */
        }

        if ( grfLedStatus[PLAY_REV_LED] )                /* if the Led is On */
                UiSetLed(PLAY_REV_LED, OFF);             /* turn it OFF */
        if ( grfLedStatus[STEP_FWD_LED] )                /* if the Led is On */
                UiSetLed(STEP_FWD_LED, OFF);             /* turn it OFF */
        if ( grfLedStatus[STEP_REV_LED] )                /* if the Led is On */
                UiSetLed(STEP_REV_LED, OFF);             /* turn it OFF */
        break;

case GRAB_LED:
{
        if ( grfLedStatus[BYPASS_LED] )                  /* if the Led is On */
                UiSetLed(BYPASS_LED, OFF);               /* turn it OFF */

        if ( grfLedStatus[SHUTTLE_LED] )         /* if shuttle is on */
                UiSetLed( SHUTTLE_LED, OFF );            /* turn it off */

        if ( ( gwRt3State & [illegible]ATE ) != RT3_RECORDING )
        {
                if ( grfL[illegible]RD_LED] )            /* if the Led is On */
                        UiSetLed(RECORD_LED, OFF);       /* turn it OFF */

                if ( grfLedStatus[PLAY_FWD_LED] )        /* if the Led is On */
                        UiSetLed(PLAY_FWD_LED, OFF);     /* turn it OFF */
        }

        if ( grfLedStatus[PLAY_REV_LED] )                /* if the Led is On */
                UiSetLed(PLAY_REV_LED, OFF);             /* turn it OFF */
        if ( grfLedStatus[STEP_FWD_LED] )                /* if the Led is On */
                UiSetLed(STEP_FWD_LED, OFF);             /* turn it OFF */
        if ( grfLedStatus[STEP_REV_LED] )                /* if the Led is On */
                UiSetLed(STEP_REV_LED, OFF);             /* turn it OFF */
        break;
}

case PLAY_FWD_LED:
        if ( !grfLedStatus[RECORD_LED] || grfLedStatus[SWAP_LED] )
        {
                if ( grfLedStatus[BYPASS_LED] )  /* if the Led is On */
                        UiSetLed(BYPASS_LED, OFF);       /* turn it OFF */
        }
        goto LHandleRecordLed;

case PLAY_REV_LED:
        if ( grfLedStatus[RECORD_LED] )          /* if the Led is On */
                UiSetLed(RECORD_LED, OFF);               /* turn it OFF */

        if ( grfLedStatus[BYPASS_LED] )          /* if the Led is On */
                UiSetLed(BYPASS_LED, OFF);               /* turn it OFF */
        goto LHandleRecordLed;

case RECORD_LED:

LHandleRecordLed:
        if ( grfLedStatus[PLAY_FWD_LED] )                /* if the Led is On
```

```
*/
                UiSetLed(PLAY_FWD_LED, OFF);                /* turn it OFF */
        if ( grfLedStatus[PLAY_REV_LED] )                   /* if the Led is On
*/
                UiSetLed(PLAY_REV_LED, OFF);                /* turn it OFF */
        if ( grfLedStatus[STEP_FWD_LED] )                   /* if the Led is On
*/
                UiSetLed(STEP_FWD_LED, OFF);                /* turn it OFF */
        if ( grfLedStatus[STEP_REV_LED] )                   /* if the Led is On
*/
                UiSetLed(STEP_REV_LED, OFF);                /* turn it OFF */
        if ( grfLedStatus[STOP_LED] )                       /* if the Led is On
*/
                UiSetLed(STOP_LED, OFF);                    /* turn it OFF */
        if ( grfLedStatus[SHUTTLE_LED] )                    /* if the Led is On
*/
                UiSetLed(SHUTTLE_LED, OFF);                      /* turn it OFF
*/

        break;

case STEP_FWD_LED:
case STEP_REV_LED:
        if ( grfLedStatus[BYPASS_LED] )                     /* if the Led is On
*/
                UiSetLed(BYPASS_LED, OFF);                       /* turn it OFF
*/

case STOP_LED:
{
        if( ( gwRt3State & RT3_DISK_STATE ) !=   RT3_DISK_IDLE )
        {
                if ( grfLedStatus[BYPASS_LED] )             /* if the Led is On
*/
                        UiSetLed(BYPASS_LED, OFF);               /* turn it OFF
*/
        }

        if ( grfLedStatus[RECORD_LED] )                     /* if the Led is On
*/
                UiSetLed(RECORD_LED, OFF);                       /* turn it OFF
*/

        if ( grfLedStatus[PLAY_FWD_LED] )                   /* if the Led is On
*/
                UiSetLed(PLAY_FWD_LED, OFF);                /* turn it OFF */
        if ( grfLedStatus[PLAY_REV_LED] )                   /* if the Led is On
*/
                UiSetLed(PLAY_REV_LED, OFF);                /* turn it OFF */
        if ( grfLedStatus[STEP_FWD_LED] )                   /* if the Led is On
*/
                UiSetLed(STEP_FWD_LED, OFF);                /* turn it OFF */
        if ( grfLedStatus[STEP_REV_LED] )                   /* if the Led is On
*/
                UiSetLed(STEP_REV_LED, OFF);                /* turn it OFF */
        if ( grfLedStatus[SHUTTLE_LED] )                    /* if the Led is On
*/
                UiSetLed(SHUTTLE_LED, OFF);                 /* turn it OFF */
        break;
}

/* Loop and PingPong are mutually exclusive */

case LOOP_LED:
{
        if ( grfLedStatus[PINGPONG_LED] )                   /* if the Led is On
```

```
*/
                UiSetLed(PINGPONG_LED, OFF);                /* turn it OFF */

        /* toggle the loop led */
        if ( grfLedStatus[LOOP_LED] )                       /* if loop is on */
                UiSetLed( LOOP_LED, OFF );                          /* turn it off */

        else
                UiSetLed( LOOP_LED, ON );                           /* turn it on */

        return;
}

case PINGPONG_LED:
{
        if ( grfLedStatus[LOOP_LED] )                       /* if the Led is On */

                UiSetLed(LOOP_LED, OFF);                    /* turn it OFF */

        /* toggle the ping pong led */
        if ( grfLedStatus[PINGPONG_LED] )                   /* if pingpong is on */

                UiSetLed( PINGPONG_LED, OFF );              /* turn it off */
        else
                UiSetLed( PINGPONG_LED, ON );               /* turn it on */

        return;
}

case SHUTTLE_LED:
        if ( grfLedStatus[GRAB_LED] )                       /* if the Led is On */

                UiSetLed(GRAB_LED, OFF);                    /* turn it OFF */

        if ( grfLedStatus[BYPASS_LED] )                     /* if the Led is On */

                UiSetLed( BYPASS_LED, OFF );

        if ( grfLedStatus[VARI_SPEED_LED] )                 /* if the Led is On */

                UiSetLed( VARI_SPEED_LED, OFF );
        if ( grfLedStatus[STEP_FWD_LED] )                   /* if the Led is On */

                UiSetLed(STEP_FWD_LED, OFF);                /* turn it OFF */

        if ( grfLedStatus[STEP_REV_LED] )                   /* if the Led is On */

                UiSetLed(STEP_REV_LED, OFF);                /* turn it OFF */

        if ( grfLedStatus[RECORD_LED] )                     /* if the Led is On */

                UiSetLed(RECORD_LED, OFF);                          /* turn it OFF */


        if ( grfLedStatus[PLAY_FWD_LED] )                   /* if the Led is On */

                UiSetLed(PLAY_FWD_LED, OFF);                /* turn it OFF */

        if ( grfLedStatus[PLAY_REV_LED] )                   /* if the Led is On */

                UiSetLed(PLAY_REV_LED, OFF);                /* turn it OFF */

        if ( grfLedStatus[STOP_LED] )                       /* if the Led is On */

                UiSetLed(STOP_LED, OFF);                    /* turn it OFF */

        if ( grfLedStatus[SHUTTLE_LED] )            /* if shuttle is on */
                UiSetLed( SHUTTLE_LED, OFF );               /* turn it off */
        else
                UiSetLed( SHUTTLE_LED, ON );                /* turn it on */
        return;

/* these don't change others */
```

```
case SWAP_LED:
{
        /* toggle the swap led */
        if ( grfLedStatus[SWAP_LED] )               /* if swap is on */
                UiSetLed( SWAP_LED, OFF );                  /* turn it off */
        else
                UiSetLed( SWAP_LED, ON );                   /* turn it on */

        return;
}

/* The 4 Playback modes are mutually exclusive */

case CINE_LED:
case NORM_LED:
case CLIP_LED:
case SEG_LED:
{
        if ( grfLedStatus[CINE_LED] )                       /* if the Led is On
*/
                UiSetLed(CINE_LED, OFF);                    /* turn it OFF */
        if ( grfLedStatus[NORM_LED] )                       /* if the Led is On
*/
                UiSetLed(NORM_LED, OFF);                    /* turn it OFF */
        if ( grfLedStatus[CLIP_LED] )                       /* if the Led is On
*/
                UiSetLed(CLIP_LED, OFF);                    /* turn it OFF */
        if ( grfLedStatus[SEG_LED] )                        /* if the Led is On
*/
                UiSetLed(SEG_LED, OFF);                     /* turn it OFF
*/
                /* fall thru */
}

/* all the rest are menu command which are all mutually exclusive */

default:
{
        if ( grfLedStatus[RECORD_SETUP_LED] )       /* if the Led is On */
                UiSetLed(RECORD_SETUP_LED, OFF);    /* turn it OFF */

        if ( grfLedStatus[INPUT_SETUP_LED] )        /* if the Led is On */
                UiSetLed(INPUT_SETUP_LED, OFF);             /* turn it OFF */

        if ( grfLedStatus[AUDIO_SETUP_LED] )        /* if the Led is On */
                UiSetLed(AUDIO_SETUP_LED, OFF);             /* turn it OFF */

        if ( grfLedStatus[TCODE_SETUP_LED] )        /* if the Led is On */
                UiSetLed(TCODE_SETUP_LED, OFF);             /* turn it OFF */

        if ( grfLedStatus[RMOTE_SETUP_LED] )        /* if the Led is On */
                UiSetLed(RMOTE_SETUP_LED, OFF);     /* turn it OFF */

        if ( grfLedStatus[OUTPUT_SETUP_LED] )       /* if the Led is On */
                UiSetLed(OUTPUT_SETUP_LED, OFF);    /* turn it OFF */

        if ( grfLedStatus[GPI_SETUP_LED] )          /* if the Led is On */
                UiSetLed(GPI_SETUP_LED, OFF);               /* turn it OFF */

        if ( grfLedStatus[RECORD_LOCK_LED] )        /* if the Led is On */
                UiSetLed(RECORD_LOCK_LED, OFF);             /* turn it OFF */

        if ( grfLedStatus[SMO_MO_LED] )                     /* if the Led is On
*/
                UiSetLed(SMO_MO_LED, OFF);                  /* turn it OFF
*/

        if ( grfLedStatus[DIAG_TEST_LED] )          /* if the Led is On */
                UiSetLed(DIAG_TEST_LED, OFF);               /* turn it OFF */

        if ( grfLedStatus[BACKUP_LED] )                     /* if the Led is On
*/
```

```
                        UiSetLed(BACKUP_LED, OFF);                         /* turn it OFF
*/

                if ( grfLedStatus[DUB_DUMP_LED] )                   /* if the Led is On
*/
                        UiSetLed(DUB_DUMP_LED, OFF);                /* turn it OFF */

                if ( grfLedStatus[INSERT_CLIP_LED] )          /* if the Led is On */
                        UiSetLed(INSERT_CLIP_LED, OFF);             /* turn it OFF */

                if ( grfLedStatus[BROWSE_LED] )                     /* if the Led is On
*/
                        UiSetLed(BROWSE_LED, OFF);                         /* turn it OFF
*/

                if ( grfLedStatus[MACRO_LED] )                /* if the Led is On */
                {
                        if (( gfRecMacro == FALSE ) && ( gfRunMacro == FALSE ))
                                UiSetLed(MACRO_LED, OFF);                      /* turn
it OFF */
                }
                break;
        }

    }
    UiSetLed( wLed, ON );                               /* now turn on the selected led */
}


/*
** return key status
*/
        SINT16
UiKeyStatus(key)
        BUTTON_ID       key;
{
        register SINT16  theBit, theByte;

        theByte = key >> 3;
        theBit = key - (theByte << 3);

        return ( (ButtonStatus[theByte] >> (7 - theBit)) & 0x1 );
}
/*
** reset all control panel functions
*/
        void
UiResetCP()
{
        RESET_ALL_MSG           theMsg;
        UINT16                          i;

        for ( i = 0 ; i < NUM_OF_LEDS ; i++ )
                grfLedStatus[i] = OFF;                          /* turn off all Status Flags
*/

        gfEncoderPos = FALSE;                   /* clear the direction flags */
        gfEncoderNeg = FALSE;
        gwLastPulseCount = 0;                   /* reset the last count too */

        theMsg.cPrefix                  = RESET_CHAR;
        theMsg.cOpcode                  = RESET_ALL;
        theMsg.cTerminator              = TERMINATOR;

        MainTxStr(COM1, (SINT8 *) &theMsg);
        WaitTimeMS(100);
        MainTxStr(COM1, (SINT8 *) &theMsg);             /* send it again */
}


/*
** get version number
*/
        void
UiGetVersion()
```

```
{
        OPCODE_MSG              theMsg;

        theMsg.cPrefix                  = SEND_CHAR;
        theMsg.cOpcode                  = SEND_VERSION;
        theMsg.cTerminator              = TERMINATOR;

        MainTxStr(COM1, (SINT8 *) &theMsg);
        WaitTimeMS(100);                                /* wait for version # to be rcvd */
}


/*
** set control panel send mode
*/
        void
UiSetCPSend( bOpcode, bTime)
        UINT8   bOpcode, bTime;
{
        switch ( bOpcode )
        {
                case SEND_NOW:
                case SEND_REQ:
                case SEND_CHANGE:
                {
                        OPCODE_MSG              theMsg;

                        theMsg.cPrefix          = SEND_CHAR;
                        theMsg.cOpcode          = bOpcode;
                        theMsg.cTerminator      = TERMINATOR;

                        MainTxStr(COM1, (SINT8 *) &theMsg);
                        break;
                }

                case SEND_TIMED:
                {
                        SEND_TIME_MSG   theMsg;

                        theMsg.cPrefix          = SEND_CHAR;
                        theMsg.cOpcode          = SEND_TIMED;
                        SetHexBits(theMsg.rbMilliSec, (SINT8 *) &bTime, sizeof(theMsg.rbMilliSec));
                        theMsg.cTerminator      = TERMINATOR;

                        MainTxStr(COM1, (SINT8 *) &theMsg);
                        break;
                }

                default:
                        return;
        }

        gsUiState.bCPSendMode = bOpcode;
}

/*
** get control panel send mode
*/
        SINT16
UiGetCPSend()
{
        return (gsUiState.bCPSendMode);
}


        void
StrCpy( pbTo, pbFrom )
        register SINT8  *pbTo, *pbFrom;
{
        while (*pbFrom)
                *pbTo++ = *pbFrom++;
        *pbTo = '\0';
}
```

```
        void
StrCat( pbBase, pbAdded )
        register SINT8  *pbBase, *pbAdded;
{
        while (*pbBase++);
        --pbBase;
        while (*pbAdded)
                *pbBase++ = *pbAdded++;
        *pbBase = '\0';
}


        SINT16
StrNCpy( pbTo, pbFrom, wMaxchars )
        register SINT8  *pbTo, *pbFrom;
        SINT16  wMaxchars;
{
        SINT16  wNumchars;

        for (wNumchars = 0; *pbFrom && wNumchars < wMaxchars; ++wNumchars)
                *pbTo++ = *pbFrom++;
        *pbTo = '\0';

        return (wNumchars);
}


        SINT16
StrLen( pbStr )
        register SINT8  *pbStr;
{
        register SINT16 i;

        for (i = 0; *pbStr != '\0'; i++, ++pbStr);

        return (i);
}


/*
**      Routine converts a SINT16 into an ascii string
**      and inserts it into caller string starting at 'p'.
**      Caller MUST ENSURE that string is long enough for number.
**      returns next position.
*/
        SINT8 *
BinToAscii( pPtr, wBin )
        SINT8   *pPtr;
        SINT16  wBin;
{
        SINT8   bStack[6], *pS = bStack;
        SINT16  wN = 0;

        if( wBin < 0 )
        {
                *pPtr++ = '-';
                wBin = -wBin;
        }

        do
        {
                ++wN;
                *pS++ = (SINT8) ((wBin % 10) + '0');
        }
        while( wBin /= 10 );

        while( wN-- )
                *pPtr++ = *--pS;

        return( pPtr );
}

/*
**      Routine converts a SINT16 into an ascii string
**      and inserts it into caller string starting at 'p'.
**      Caller MUST ENSURE that string is long enough for number.
```

```
**      Pointer advanced by field width.
*/
        SINT8 *
AddNumber( pPtr, wBin, wWidth )
        SINT8   *pPtr;
        SINT16  wBin, wWidth;
{
        SINT8   bStack[6], *pS = bStack, *pQ = pPtr;
        SINT16  wN = 0;

        if( wBin < 0 )
        {
                *pPtr++ = '-';
                wBin = -wBin;
        }

        do
        {
                ++wN;
                *pS++ = (SINT8) ((wBin % 10) + '0');
        }
        while( wBin /= 10 );

        while( wN-- )
                *pPtr++ = *--pS;

        return( pQ + wWidth );
}


/*
**      print in decimal form to avoid 'sprintf' inclusion
*/
        void
PrintDec(string, number, nDigits, low, hi)
        SINT8   *string;
        SINT16  number, nDigits, low, hi;

{
        register SINT16  i;
        register SINT8   *ptr;
        SINT16           sign = 0;

        /* if out of limit, fill with '-' */
        if (number < low || number > hi)
        {
                ptr = string;

                for (i = nDigits; i; i--)
                        *ptr++ = '-';

                *ptr = '\0';
                return;
        }

        if (number < 0)
        {
                number = -number;
                sign = 1;
        }

        ptr = string + nDigits;
        *ptr-- = '\0';

        for (i = nDigits; i; i--, number /= 10 )
                if (number || (i == nDigits))
                        *ptr-- = (SINT8) (number % 10 + '0');
                else
                        *ptr-- = ' ';

        if (sign)
        {
                ++ptr;
                if (*ptr == ' ')
                        *ptr = '-';
```

```
                else for (i = nDigits; i; i--)
                        *ptr++ = '-';
        }
}

StrToNumber( pcStr, wDigitCnt )
        SINT8   *pcStr;
        SINT16  wDigitCnt;
{
        UINT16  wOutNumber = 0;

        switch ( wDigitCnt )
        {
                case 5: wOutNumber += (pcStr[0] - '0') * 10000;  /* fall through */
                case 4: wOutNumber += (pcStr[1] - '0') * 1000;   /* fall through */
                case 3: wOutNumber += (pcStr[2] - '0') * 100;    /* fall through */
                case 2: wOutNumber += (pcStr[3] - '0') * 10;             /* fall through */
                case 1: wOutNumber += (pcStr[4] - '0');
        }
        return(wOutNumber);
}


/*
** return time in ticks since turn-on
** note that there are 30 ticks per second in NTSC, 25 in PAL
*/
        TICK
GetTicks()
{
#if RTD
        return (GetTime());
#else
        return (TickCount());
#endif
}

  SINT16
TicksPassed(tCount, nTicks)
        TICK    *tCount;
        SINT16  nTicks;
{
        TICK    theTick;

        if (*tCount > (theTick = GetTicks()))
                return (FALSE);

        *tCount = theTick + (TICK) nTicks;
        return (TRUE);
}

/*
**      wait for the given time in ms
*/
        void
WaitTimeMS(time)
        UINT16  time;
{
        TICK    startTime;

        startTime = GetTicks();
#if RTD

#if 0           /* for now - until we are running dual standard */
        startTime += (TICK) time / (TICK) (gsUiState.CurrSetup.videoStd == NTSC ? 33: 40);
#else
        startTime += ((TICK) time / (TICK) 33);           /* use ntsc for now */
#endif

        while (startTime > GetTicks())
                DoPeriodicTasks();

#else
        startTime += (TICK) time / (TICK) 16;
```

```
	{
			/* run the CP event loop so that messages can show up */
#define NUMLOOPS	10
			register SINT16  i;

			for (i = 0; i < NUMLOOPS; i++)
				CPEventLoop();
	}
	while (startTime > GetTicks());

#endif
}


/*
** pad out a string to the full display length with spaces
**
*/
	void
PadStr(theStr)
	register SINT8   *theStr;
{
	register SINT8   *theEnd;

	theEnd = theStr + MAXSTRING;

	/* find end of string */
	for (;  *theStr != '\0' && theStr < theEnd; ++theStr);
	if (theStr >= theEnd)
		return;

	/* pad it */
	for (; theStr < theEnd; ++theStr)
		*theStr = ' ';
	*theStr = '\0';
}


	void
UiSetAndDispStr( bXPos, bYPos, pStr )
	UINT8		*pStr;
	UINT8		bXPos;
	UINT8		bYPos;
{
	StrCpy( gStr1, pStr );
	PadStr(gStr1);
	UiDispStr( gStr1, bXPos, bYPos );
}

	UINT8
StrCmp( str1, str2 )
	UINT8 *str1, *str2;
{
	while ( *str1 != '\0' && *str2 != '\0' )
	{
		str1++;
		str2++;
		if ( *str1 != *str2 )
			return ( FALSE );
	}
	return ( TRUE );
}


	UINT8
SearchStrForChar( str, ch )
	UINT8 *str;
	UINT8 ch;
{
	UINT8	i = 0;

	while ( *str != '\0' )
	{
		str++;
		if ( *str == ch )
			i += 1;
```

```
        }
        return ( i );
}


/*
 * Error handling routine
 * The error table should be devised for the particular application.
 */
        void
UiDispError( rpstrErrorTable, bnErrorMsg, bnSeverityLevel )
        UINT8 *rpstrErrorTable[];
        UINT8 bnErrorMsg;
        UINT8 bnSeverityLevel;
{
        UINT8 *pstrErrorMsg;

        if ( gfEntryExist == YES )
                gfKeypadError = TRUE;
        UiDispStr( "                                        ", 1, 6 );
        pstrErrorMsg = rpstrErrorTable[ bnErrorMsg ];
        switch ( bnSeverityLevel )
        {
                case ERROR:
                        UiDispStr( "Error: ", 1, 6 );
                        UiDispStr( pstrErrorMsg, 8, 6 );
                        break;

                case WARNING:
                        UiDispStr( "Warning: ", 1, 6 );
                        UiDispStr( pstrErrorMsg, 10, 6 );
        }
        UiBeep();
}


/*
 * To check upon the duration of successive pressing on key, once
 * the following is within the allowable duration, then to swap different
 * key mode.
 * This Time checking is effective in RMAIN.C for RTD.
 */
        void
CheckSecondPress()
{
        if ( gfCheckSecondPress == TRUE )
        {
                if ( gliWaitTime < CHECK_WAIT_TIME )
                {
                        gliWaitTime++;
                        gfCheckWaitTime = ON;
                }
                else
                        gfCheckWaitTime = OFF;
        }
}




/*
 *-------------------------------------------------------------------------
 * rampex.h     Copyright 1991 Accom Inc.
 *
 *
 * Responsible Person: Jeffrey Wu
 *
 * This file conatins definitions of Ampex implementation of SMPTE serial
 * protocol which supports the editor remote control of the RTD system.
 * This cmd listing is according to Ampex Video Tape Recorder Serial Interface
 * Revision H.
 *
 *-------------------------------------------------------------------------
 */
```

```
/*
 * Protocol Supervisory Characters
 */
#define SC_GRP                  0x01
#define SC_STX                  0x02
#define SC_ESC                  0x03
#define SC_ACK                  0x04
#define SC_NAK                  0x05
#define SC_BSY                  0x06
#define SC_RST                  0x07
#define SC_SVC                  0x08
/*
 * Status Request
 */
#define S_STATUS                0x01        /* Status request                      */
/*
 *  Response to the status request is 6 bytes:
 * Byte 0..3: curr tc without field info
 * Byte 4: defined as follow:
 */
#define F_STD_NTSC              0x01        /*      bit 0: 1- NTSC;           0- PAL   */
#define F_DF                    0x02        /*      bit 1: 1- DF;             0- Non DF*/
#define F_TL_RUNNING     0x04         /*    bit 2: 1- Tl running; 0- Tl stopped      */
#define F_TLB_FULL              0x08        /*  bit 3: 1- Tlb full   0- Tlb not full  */
                                                                  /*      bit 4: 1- Curr
event executing         */
                                                                  /*              0-
Curr event not executing */
                                                                  /*      bit 5: 1- Local
event executing;        */
                                                                  /*              0-
Remote event executing.  */
                                                                  /*      bit  6:  1-
Downloading required.            */
                                                                  /*              0-
Downloading not required */
                                                                  /*      ( bit 4..6 not
supported by Ampex )     */
#define F_EDIT_ERR              0x80        /*      bit 7: 1- Error( edit errors )   */
                                                                  /*              0-
no error.                           */

/*
 * Byte 5: defined as follow:
 */
#define TR_STOPPED                      0x00    /*        [00]: Stopped              */
#define TR_STOPPING             0x01    /*    [01]: Stopping                         */
#define TR_PLAYING                      0x02    /*        [02]: Play                 */
#define TR_TSO                          0x03    /*        [03]: TSO                  */
#define TR_SHUTTLING            0x04    /*    [04]: Shuttle                          */
#define TR_FAST_FWD                     0x05    /*        [05]: Fast Forward         */
#define TR_REWIND                       0x06    /*        [06]: Rewind               */
#define TR_SYNCING                      0x07    /*        [07]: Syncing              */
#define TR_SOURCE_SYNC_ROLL     0x08    /*    [08]: Source Sync Roll                 */
#define TR_MASTER_SYNC_ROLL     0x09    /*    [09]: Master Sync Roll                 */
#define TR_MASTER_IN_EDIT       0x0A    /*    [0A]: Master Edit Period               */
                                                                  /*              - In
edit period and recording       */
                                                                  /*              Note:
A several frame delay   */
                                                                  /*              occurs
from the time when the  */
                                                                  /*              VTR
enters record and the           */
                                                                  /*              master
edit status is reported  */
#define TR_RECORDING            0x0B    /*    [0B]: Record                           */
#define TR_CUEING                       0x0C    /*        [0C]: Cueing               */
#define TR_CUED                         0x0D    /*        [0D]: Cued( Park )         */
#define TR_SEARCHING            0x0E    /*    [0E]: Searching                        */
#define TR_SEARCHED                     0x0F    /*        [0F]: Searched( Stop )     */
#define TR_EXECUTING            0x10    /*    [10]: Executing An Event               */
                                                                  /*              ( Not
Supported By Ampex VTR ) */
#define TR_CHASING                      0x11    /*        [11]: Chasing              */
```

```
                                                      /*                 ( Not
Supported By Ampex VTR ) */
#define TR_CHASING_ACCURATE      0x12    /*           [12]: Chasing Accurately      */
                                                      /*                 ( Not
Supported By Ampex VTR ) */
#define TR_SLOW                          0x13    /*           [13]: Slow            */
#define TR_POWER_OFF             0x14    /*           [14]: Power Off On Device     */
                                                      /*                 ( Not
Supported By Ampex VTR ) */
#define TR_LOCAL                         0x15    /*           [15]: Local           */
#define TR_UNTHREADED            0x16    /*           [16]: Unthreaded              */

/*
 * Extended Status Request
 */
#define S_XSTATUS                0x02           /* Extended status request          */
/*
 * Response to the extended status request is 4 bytes
 * Byte 0: Machine type; 0x03 means transports
 * Byte 1: MSB of Machine ID;     ( Machine ID is different from Machine Addr ).
 * Byte 2: LSB of Machine ID;
 * Byte 3: Error Description;
 */
#define TY_MACHINE_TR            0x03    /* Machine type is transport               */
/*
 * Timeline Commands
 */
#define S_DFER                   0x03           /* Defer msg                        */
#define S_TCUE                   0x04           /* Cue for the earliest sync pt on tl */
#define S_TSTOP                  0x05           /* Stop timeline                    */
#define S_TCLEAR                 0x06           /* Clear timeline                   */
#define S_TRUN                   0x07           /* Start timeline                   */
#define S_SW                     0x22           /* Switcher msg                     */
#define S_TRAN                   0x26           /* Transport msg                    */
/*
 * Transport Commands
 */
#define ST_READY                 0x01           /* Turn scanner on/off              */
#define ST_EE                    0x02           /* Control Tape/EE                  */
#define ST_CF                    0x03           /* Set color framer mode            */
#define ST_LTC                   0x04           /* Retired, no longer used by Ampex */
#define ST_VITC                  0x05           /* Retired, no longer used by Ampex */
#define ST_EDMODE                0x06           /* Set edit mode                    */
#define ST_ENABLE                0x07           /* Control channel enable           */
#define ST_TCMODE                0x08           /* Control timecode generator       */
#define ST_SPEED                 0x09           /* Control transport speed          */
#define ST_TCG                   0x0A           /* Load timecode generator          */
#define ST_LDUBG                 0x0B           /* Load user bit generator          */
#define ST_STOP                  0x0C           /* Stop the transport               */
#define ST_PLAY                  0x0D           /* Enter play mode                  */
#define ST_ROLL                  0x0E           /* Play and synchronize to external ref */
#define ST_TSO                   0x0F           /* Play tape speed overwrite        */
#define ST_VARPLAY               0x10           /* Variable play mode               */
#define ST_SHUTTLE               0x11           /* Shuttle, also used for fast fwd/rev */
#define ST_PREROLL               0x12           /* Transport preroll duration       */
#define ST_SYNC                  0x13           /* Sync point. Mark a sync pt for cue */
#define ST_CONTROL               0x14           /* Ctrl pt. Mark sync pt 4 non-std play */
#define ST_CUE                   0x15           /* Cue cmd. Cue to a "park" position
 */
#define ST_SEARCH                0x16           /* Search to an exact position      */
#define ST_ENTRY                 0x17           /* Channel record entry             */
#define ST_EXIT                  0x18           /* Channel record exit              */
#define ST_CHASE                 0x19           /* Chase a moving target,ampx vtr don't */
#define ST_RDREADY               0x1A           /* Read ready status                */
#define ST_RDEE                  0x1B           /* Read Tape/EE status              */
#define ST_RDCF                  0x1C           /* Read color framer status         */
#define ST_RDLTC                 0x1D           /* Retired. Read LTC on/off         */
#define ST_RDVITC                0x1E           /* Retired. Read VITC on/off        */
#define ST_RDEDMODE              0x1F           /* Read edit mode status            */
#define ST_RDENABLE              0x20           /* Read Channel enables             */
#define ST_RDTCMODE              0x21           /* Read TC generator mode           */
#define ST_RDSPEED               0x22           /* Read speed                       */
#define ST_RDTCG                 0x23           /* Read TC generator                */
#define ST_RDUB                  0x24           /* Read the TC user bits off tape   */
#define ST_FJOG                  0x25           /* Jog fwd one frame                */
#define ST_RJOG                  0x26           /* Jog rev one frame                */
```

```
#define ST_ACCURACY             0x27            /* Syncronism frame accuracy window     */
#define ST_TMLOAD               0x28            /* Load current time src                */
#define ST_NBASE                0x29            /* Read machine standard                */
#define ST_CFSEL                0x2A            /* Color framer source selection        */
#define ST_RDCFSRC              0x2B            /* Read color framer source selection   */
#define ST_TMSEL                0x2C            /* Select current time source           */
#define ST_RDTMSEL              0x2D            /* Read curr time source                */
#define ST_REELSEL              0x2E            /* Reel Select, Ampex VTR don't support */
#define ST_RDREEL               0x2F            /* Read reel select. Ampex VTR don't    */
#define ST_HSMUTE               0x30            /* High spd mute, Ampex VTR don't       */
#define ST_RDHSMUTE             0x31            /* Read hs mute, Ampex VTR don't        */
#define ST_EDFIELD              0x32            /* Select edit field                    */
#define ST_RDEDFIEL             0x33            /* Read the selected edit field         */
#define ST_TLSRC                0x34            /* Timeline source select               */
#define ST_SLEW                 0x35            /* Slew fwd or rev a number of frames   */
#define ST_STILL                0x36            /* AST play type when stopped( fr/fd )  */
#define ST_RDUBG                0x37            /* Read curr active usr bit generator   */
#define ST_AUXDSEL              0x38            /* Aux data select. Ampex VTR don't     */
#define ST_RDAUXDSE             0x39            /* Read aux data select.Ampex VTR don't */
#define ST_AUXDLOAD             0x3A            /* Aux data load. Ampex VTR don't       */
#define ST_AUXDREAD             0x3B            /* Aux data read. Ampex VTR don't       */
#define ST_CHARGEN              0x3C            /* Ctrl char generator display          */
#define ST_RDCHARGE             0x3D            /* Read char generator mode             */
#define ST_RDTLSEL              0x3E            /* Read timeline source                 */
#define ST_RDVLINE              0x3F            /* Read VITC record lines               */
#define ST_RDEDONE              0x40            /* Read last ch to go in rec while in ed*/
#define ST_RDSTILL              0x41            /* Read AST playback mode when stopped  */
#define ST_FFDJOG               0x42            /* Jog fwd one field                    */
#define ST_RFDJOG               0x43            /* Jog rev one field                    */
#define ST_RDCFFLD              0x44            /* Read off tape color frame field      */
#define ST_REHMODE              0x45            /* Rehearse mode                        */
#define ST_MAX                  0x45            /* Max transport cmd #                  */

#define N_TLB_ENTRY_MAX         11              /* 10 tl buffer entries, one stores EOT */
#define N_B_TLB_MSG_MAX         25              /* Each can contain max. 25 bytes msg   */
/*
 * Timeline buffer struct
 * End of Table is marked by tcExec.fUndef TRUE.
 */
struct  tlb
{
        TC              tcExec;                                 /* Time to exec the
cmd in rbMsg[]   */
        UINT8   rbMsg[N_B_TLB_MSG_MAX];         /* The message in timeline buffer       */
};
/*
 * Internal Timeline struct
 */
struct  int_tl
{
        TC              tcCurr;                                 /* Keep running if fRunning
TRUE    */
        FLAG    fRunning;                               /* Set TRUE if want to run
tcCurr  */
};


/*
 *----------------------------------------------------------------------
 *  rclip.h     Copyright 1991 Accom Inc.
 *
 *      Responsible Person: Kevin Hsu
 *
 *      This file contains routines for clip list management.
 *----------------------------------------------------------------------
 */
#ifndef _RCLIP
#define _RCLIP


UINT8   bCurrClipNo;
UINT8   bHighLightedClipNo;
FLAG    fDontDispClip = FALSE;
```

```
#endif  /* End of header file */


/*
 *-----------------------------------------------------------------------
 *  rcom.h      Copyright right 1991 Accom Inc.
 *
 *      Responsible Person: Jeffrey Wu
 *
 *  This file contains RS-422 serial com port related definitions.
 *-----------------------------------------------------------------------
 */
#ifndef _RCOM
#define _RCOM


/*
 * To Increase to 8 ports
 */
#define COM1                                    0
#define COM2                                    1
#define COM3                                    2
#define N_COM_PORT                              3

#define S_COM_PORT_OUT_BUF              0x100

#define COM_SEG                                 (0x5000)
#define COM0_OFF                                (0x0000)            /* Com0 @ 0x5000 */
#define COM1_OFF                                (0x8000)            /* Com1 @ 0x5800 */

#define  COM0_PTR                               (long) (0x50000000)     /* Ptr addr format */
#define  COM1_PTR                               (long) (0x50008000)     /* Ptr addr format */

/*
 * Serial Comm Port DP RAM Communications Interface Buffer Addresses
 */
#define BASE_SHARED                     0x000
#define BASE_TX_COM1            0x200
#define BASE_RX_COM1            0x300
#define BASE_TX_COM2            0x400
#define BASE_RX_COM2            0x500
#define BASE_TX_COM3            0x600
#define BASE_RX_COM3            0x700

/*
 * Index into the DP RAM block for each com port
 */
#define I_COM_MODE                              0
#define I_RX_READY                              1
#define I_MSG_CNT_COM1                  0x02
#define I_MSG_CNT_COM2                  0x03
#define I_MSG_CNT_COM3                  0x04
#define I_CONFIG_COM1                   0x05
#define I_CONFIG_COM2                   0x06
#define I_CONFIG_COM3                   0x07
#define I_MAIN_READY_4COM               0x08
#define I_COM_READY                             0x09
#define I_I_TX_BUF_COM1                 0x0a    /* Index to Tx Buf Index for Com1         */
#define I_I_RX_BUF_COM1                 0x0b
#define I_I_TX_BUF_COM2                 0x0c
#define I_I_RX_BUF_COM2                 0x0d
#define I_I_TX_BUF_COM3                 0x0e
#define I_I_RX_BUF_COM3                 0x0f
#define I_OUR_ADDR_HI_COM2              0x10
#define I_OUR_ADDR_LO_COM2              0x11
#define I_OUR_ADDR_HI_COM3              0x12
#define I_OUR_ADDR_LO_COM3              0x13
#define I_THEIR_ADDR_HI_COM2    0x14
#define I_THEIR_ADDR_LO_COM2    0x15
#define I_THEIR_ADDR_HI_COM3    0x16
#define I_THEIR_ADDR_LO_COM3    0x17
#define I_SELECTED_COM2                 0x18
#define I_SELECTED_COM3                 0x19
```

```
/*
 * When in Ampex/Smpte mode, main processor sets this 2-byte address.
 * at DPRAM index I_OUR_ADDR_COMx
 */
#define SMPTE_ADDR_HI_RTD              0x80    /* !! Temporary                         */
#define SMPTE_ADDR_LO_RTD              0xA2    /* !! Temporary                         */

/*
 * Status flags in I_RX_READY Buffer
 */
#define RX_READY_COM1                  0x1
#define RX_READY_COM2                  0x2
#define RX_READY_COM3                  0x4

/*
 * Configuration Flags in I_COM_MODE
 */
#define COM_MODE_CHAR                  0
#define COM_MODE_CMD                   1
#define COM_MODE_GVG                   2
#define COM_MODE_AMPEX                 3
#define COM_MODE_SONY                  4

#define COM_MODE_CHAR_COM1             0
#define COM_MODE_CMD_COM1              1
#define COM_MODE_MASK_COM1             0x03                  /* Bit 0..1          */

#define COM_MODE_CHAR_COM2             0x00                  /* 0 << 2            */
#define COM_MODE_CMD_COM2              0x04                  /* 1 << 2            */
#define COM_MODE_GVG_COM2              0x08                  /* 2 << 2            */
#define COM_MODE_AMPEX_COM2            0x0C                  /* 3 << 2            */
#define COM_MODE_SONY_COM2             0x10                  /* 4 << 2            */
#define COM_MODE_MASK_COM2             0x1C                  /* Bit 2..4          */

#define COM_MODE_CHAR_COM3             0x00                  /* 0 << 5            */
#define COM_MODE_CMD_COM3              0x20                  /* 1 << 5            */
#define COM_MODE_GVG_COM3              0x40                  /* 2 << 5            */
#define COM_MODE_AMPEX_COM3            0x60                  /* 3 << 5            */
#define COM_MODE_SONY_COM3             0x80                  /* 4 << 5            */
#define COM_MODE_MASK_COM3             0xE0                  /* Bit 5..7          */

/*
 * Communication parameters in I_CONFIG_COMx
 * Baud rate, character length, parity and number of stop bits
 */
#define BAUD_9600               0
#define BAUD_19200              1
#define BAUD_38400              2

#define S_CHAR_8_BITS           ( 0 << 2 )
#define S_CHAR_7_BITS           ( 1 << 2 )
#define S_CHAR_6_BITS           ( 2 << 2 )
#define S_CHAR_5_BITS           ( 3 << 2 )

#define PARITY_NONE                     ( 0 << 4 )
#define PARITY_ODD                      ( 1 << 4 )
#define PARITY_EVEN                     ( 2 << 4 )

#define N_STOP_BIT_1            ( 0 << 6 )
#define N_STOP_BIT_1_5          ( 1 << 6 )
#define N_STOP_BIT_2            ( 2 << 6 )

struct  out_buf
{
        UINT8   iOutBufCurr;
        UINT8   rbOutBuf[S_COM_PORT_OUT_BUF];
};
#endif


/*
 *---------------------------------------------------------------------------
 * rdisk.h       Copyright 1991 Accom Inc.
 *
 *
```

```
 * Responsible Person: Jeffrey Wu
 *
 * This file defines various structures related to the high level
 * disk management functions.
 *-------------------------------------------------------------------------
 */
#ifndef _RDISK
#define _RDISK

#include "rtime.h"
#include "rdiskctl.h"

#define DISK1           0
#define DISK2           1
#define DISK3           2
#define DISK4           3
#define DISK5           4
#define DISK6           5
#define DISK7           6

#define N_DISK_PER_CTRL_MAX             2       /* !! To be 7   */
#define N_CYL_PER_DISK                  1923    [illegible] cylinders per disk          */
#define N_CYL_AVAIL_PER_DISK    1800    /* [illegible] linders                  */
#define N_CLIP_MAX                              256             /* Clip Table Size      */
#define N_DISK_CTRL_MAX                 1               /* !! to be 2                   */
#define N_LOCK_MAX                              256

#define I_CACHE_BUF_START               N_CYL_AVAIL_PER_DISK

#define FS_MODE_REC                             TRUE
#define FS_MODE_PLAY                    FALSE

#define PLAY_DIR_FWD                    TRUE
#define PLAY_DIR_REV                    FALSE
/*
 * This three FS states are mutually exclusive.
 * Use bit 0..2 to represent them.
 */
#define RT3_TOGGLE_FS                           0x0000
#define RT3_R_FS1_W_FS2                         0x0001
#define RT3_R_FS2_W_FS1                         0x0002
#define RT3_FREEZE_FS1                          0x0003
#define RT3_FREEZE_FS2                          0x0004
#define RT3_FS_STATE                            0x0007  /* Mask for testing             */
/*
 * This three disk states are mutually exclusive.
 * Use bit 4 and bit 5 to represent them.
 */
#define RT3_DISK_IDLE                           0x0000
#define RT3_RECORDING                           0x0010
#define RT3_PLAYING                                     0x0020
#define RT3_DISK_STATE                          0x0030  /* Mask for testing             */

#define CLIP_NO         1
#define CLIP_NAME       2
#define REC_START       3
#define REC_END         4
#define VIDEO_STD       5
#define SRC_TC          6
#define EOT                     0xFF

/*
 * Valid values for gwRt3State
 */
/* Toggling Fs 1/2, not recording                       */
#define RT3_TOGGLE_FS_BYPASSING                 (RT3_TOGGLE_FS | RT3_DISK_IDLE)

/* Bypass one new frame via FS1. For GRAB       */
#define RT3_BYPASS_ONE_FRAME_FS1        (RT3_R_FS2_W_FS1 | RT3_DISK_IDLE)

/* Bypass one new frame via FS2. For GRAB       */
#define RT3_BYPASS_ONE_FRAME_FS2        (RT3_R_FS1_W_FS2 | RT3_DISK_IDLE)


/* Toggling Fs 1/2, and recording                       */
```

```
#define RT3_TOGGLE_FS_RECORDING                  (RT3_TOGGLE_FS | RT3_RECORDING)

/* Record one new frame via FS1. For GRAB        */
#define RT3_RECORD_ONE_FRAME_FS1          (RT3_R_FS2_W_FS1 | RT3_RECORDING)

/* Record one new frame via FS2. For GRAB        */
#define RT3_RECORD_ONE_FRAME_FS2          (RT3_R_FS1_W_FS2 | RT3_RECORDING)


/* Toggling Fs 1/2, and playing                          */
#define RT3_TOGGLE_FS_PLAYING                    (RT3_TOGGLE_FS | RT3_PLAYING)

/* Play one next frame via FS1, For GRAB */
#define RT3_PLAY_ONE_FRAME_FS1                   (RT3_R_FS2_W_FS1 | RT3_PLAYING)

/* Play one next frame via FS2, For GRAB */
#define RT3_PLAY_ONE_FRAME_FS2                   (RT3_R_FS1_W_FS2 | RT3_PLAYING)


/* Freezing on Fs1, not recording                        */
#define RT3_FREEZE_FS1_NO_RECORD          (RT3_FREEZE_FS1 | RT3_DISK_IDLE)

/* Freezing on Fs1, recording                            */
#define RT3_FREEZE_FS1_RECORDING          (RT3_FREEZE_FS1 | RT3_RECORDING)

/* Freezing on Fs2, not recording                        */
#define RT3_FREEZE_FS2_NO_RECORD          (RT3_FREEZE_FS2 | RT3_DISK_IDLE)

/* Freezing on Fs2, recording                            */
#define RT3_FREEZE_FS2_RECORDING          (RT3_FREEZE_FS2 | RT3_RECORDING)

/*
 * Valid values for gwPlayState, which is a substate of gwRt3State.
 */
#define PLAY_STATE_NULL                         0
#define PLAY_STATE_PLAYING_FWD          1
#define PLAY_STATE_PLAYING_REV          2
#define PLAY_STATE_STEPPING_FWD         3
#define PLAY_STATE_STEPPING_REV         4

/*
 * Valid values for gwCrossDaPlay
 * For single disk, disk cacheing not available, still play the best we can
 * by freezing a frame while waiting for the disk seek.
 */
#define NORMAL_PLAYING                          0
#define TO_FREEZE_A_FRAME                       1
#define FREEZE_A_FRAME_NOW                      2
/*
 * End of Table Marker. ( For byte field only )
 */
#define EOT                                           UxFF

#define N_DA_ENTRY_MAX                  64
/*
 * Cylinder Header ( picture header ).
 * One cylinder will hold one field of picture,
 */
struct cyl_head
{
        UINT16          wCylNo;                 /* Cylinder number                      */
        UINT8           bVideoStd;              /* Video standards. See below for values */
        TC                      tcSrc;                  /* Timecode which comes with source
video   */
        UINT8           btySrcTc;               /* Timecode type for the source video    */
        UINT8           bClipNo;                /* User-selected record clip number      */
        char            rcClipName[20]; /* User-selected record clip name        */
        UINT16          wccForClip;             /* Cyl cnt, only 1st cyl in clip contains */

        FLAG            fLocked;                /* TRUE if locked by someone             */
        UINT16          wccForLock;             /* Cyl cnt, only 1st cyl in lock contains*/
        UINT8           bVers;                  /* Software version when recording       */
        UINT8           bUnused;                /* For future expansion                  */
        UINT8           bBadSurface;    /* 0 if all good, 1-11 for the bad surface       */
};
```

```
/*
 * The Clip Struct, sorted by "tcRecStart" in ascending order.
 * A EOT ( 0xFF ) in "bClipNo" indicates end of table
 */
struct clip
{
        UINT8   bClipNo;                        /* User-selectable record clip #         */
        char    rcClipName[20];         /* User-selectable clip name                     */
        TC              tcRecStart;                     /* Timecode for record start point*/
        TC              tcRecEnd;                       /* Timecode for record end point */
        UINT8   bVideoStd;                      /* Video standards.                      */
        UINT8   btySrcTc;                       /* Timecode type                         */
};

/*
 * For each disk controller, maintain a array of locked record timeline,
 * each showing a chunk of locked record timeline.
 *
 * The end of table is marked by a tcStart being undefined.
 *
 * This table does not need to be sorted by the "tcStart", so when
 * we need to add one entry, we can just append it to the end of the table.
 * However, when deleting one entry, we do need to shift forward
 * all entries behind it to close the gap.
 *
 * The table can have nested or overlapped locked timeline.
 *
 * !! We might use doubly linked list
 */
struct  lock
{
        TC              tcStart;                        /* Start tc of locked record timeline    */
        UINT16  wfcDur;                 /* Locked duration in fields                     */
        TC              tcEnd;                          /* End tc of locked record timeline      */
        char    rcOwner[8];             /* User-chosen owner name                        */

};

/*
 * Disk Allocation Structure ( For both recording and playing )
 *
 * It specifies one chunk of Disk Space allocated.
 * Represented by a Start Cylinder # and a Cylinder Count.
 *
 * "wCylNoStart" and "wcc" are for real-time function to use and
 * will be incremented/decremented on a field basis.
 *
 * wSegPlaySpd and bSegSeqNo are meaningful for segment play only.
 * One play segment( across disk ) can contain more than one DA;
 * Two play segments ( each being one field ) can also be fixed up to
 * merge into one DA.
 */
struct  da
{
        UINT8   bDiskNo;                /* Disk number on which the space is found       */
        UINT16  wCylNoStart;    /* For real-time function to increment           */
        UINT16  wcc;                    /* For real-time function to decrement           */
        UINT16  wCylNoStartSave;/* Start Cyl No for this chunk of cylinders */
        UINT16  wccSave;                /* Number of cylinders in this chunk             */
        FLAG    fStartPlayOnField2;
        SINT16  wSegPlaySpd;    /* Play Spd for the segment represented          */
        UINT8   bSegSeqNo;              /* Seq No. for the segment represented           */
};

/*
 * Record Info Structure
 *
 * HandleRec() sets up this struct which tells us all the necessary info
 * about how to record the clip .
 *
 * bDiskCtrlNo:         Disk controller channel ( 0 or 1 ).
 * bClipNo:                     Stores the Clip # chosen by the user.
 * rcClipName[]:        Stores the Clip Name chosen by the user.
 * btySrcTc:            Stores Source Timecode Type.
 * nDaTotal     : Total # of Disk Allocation Table Entries.
```

```
 * iDaCurr          : Current index into Disk Allocation Table.
 * rsDa[]                   : Disk Allocation Table.
 *                                  Each entry specifies a chunk to record continuously,
 *                                  The table entries are created in the same order as it
 *                                  should be recorded.
 *
 */
struct  rec_info
{
        UINT8           bDiskCtrlNo;                    /* Disk Controller #, 0..1        */
        UINT8           bClipNo;                                /* User-chosen clip number*/
        char            rcClipName[20];                 /* User-chosen clip name          */
        UINT8           btySrcTc;                               /* Source timecode type  */
        UINT8           bVideoStd;                              /* Video std for the clip to
record  */
        UINT8           nDaTotal;                               /* # total Dr entries     */
        UINT8           iDaCurr;                                /* Current Dr entry       */
        DA                      rsDa[N_DA_ENTRY_MAX];   /* disk spaces to record          */
        TC                      tcStart;
        UINT16          wfcCurr;                                /* Current field count   */
        UINT16          wfcTotal;                               /* Total field count to be
played  */
        UINT8           bnRowFcDisp;                    /* Row number to display field cnt*/
        UINT8           bnColFcDisp;                    /* Col number to display field cnt*/
        UINT8           bnDiskWrDelay;                  /* Delay 2 fields to write to disk*/
        UINT8           bnCheatTemp1;                   /* !! Temp cheating number        */
        UINT8           bnCheatTemp2;                   /* !! Temp cheating number        */
};

/*
 *  For variable speed only
 */
struct  cyl_adv
{
        FLAG    fSignGlobalSpd;         /* TRUE if gwPlaySpd is positive                  */
        UINT16  wValueSpdCurr;          /* Magnitude of current combined spd              */
        UINT16  wFrameNoCurr;           /* Current frame #, under curr spd                */
        UINT32  lfcAdvCurr;                     /* # fds adved at curr fr, under curr spd*/
};
/*
 * Play Info Table
 *
 * HandleRec() sets up this struct which tells us all the necessary info
 * about how to play.
 *
 * bDiskCtrlNo      :     Disk controller channel ( 0 or 1 ).
 * nDaTotal                 : Total # of Disk Allocation Table Entries.
 * iDaCurr          : Current index into Disk Allocation Table.
 * rsDa[]                   : Disk Allocation Table.
 *                                  Each entry specifies a chunk to play continuously,
 *                                  When current entry is almost played to the end, need
 *                                  to start seeking early for next disk in the next table
 *                                  entry, so as to play in real time.
 *                                  The table entries are created in the same order as it
 *                                  should be played.
 */
struct  play_info
{
        FLAG            fUndef;                                 /* TRUE if undefined      */
        UINT8           bDiskCtrlNo;                    /* Disk Controller #, 0..1        */
        UINT8           nDaTotal;                               /* # total da  entries    */
        UINT8           iDaCurr;                                /* Current da entry       */
        DA                      rsDa[N_DA_ENTRY_MAX];   /* Disk to play table             */
        UINT16          wPlayStart;                             /* MarkIn/Out smaller one*/
        UINT16          wPlayEnd;                               /* MarkIn/Out Larger one */
        FLAG            fPlayFwd;                               /* TRUE if play fwd; FALSE if
rev     */
        FLAG            fDontReadDisk;                  /* TRUE if not to read disk       */
        FLAG            fDoneCylAdvForStep;             /* TRUE if done cyl adv for step */
        UINT16          wUseFrameCnt;                   /* If to use wFrameCntToPlay or not*/
        UINT16          wFrameCntToPlay;                /* Play this many frames if flag T*/
        UINT32          lFrameCntCopy;                  /* Gets a copy of glFrameCntTimer*/
        CYL_ADV         sCylAdv;                                /*   Cylinder   advance
structure       */
        UINT16          wfcCurr;                                /* Current field count   */
```

```
        UINT16          wfcTotal;                         /* Total field count to be
played  */
        UINT8           bnRowFcDisp;                  /* Row number to display fd cnt  */
        UINT8           bnColFcDisp;                  /* Column number to display fd cnt*/
};

/*
 * Valid values for wUseFrameCnt in sPlayInfo
 */
#define         DONT_USE_FRAME_CNT              0       /* Playing don't use fr cnt method*/
#define         TO_USE_FRAME_CNT                1       /* Playing is to use fr cnt method*/
#define         USING_FRAME_CNT                 2       /* Playing is using  fr cnt method*/
#endif


/*
 *---------------------------------------------------------------------
 *  rdiskctl.h   Copyright 1991 Accom Inc.
 *
 *      Responsible Person: Jeffrey Wu
 *
 * This file defines Dual Port RAM addresses, disk command byte and parameter
 * bytes for the low-level disk controller communication protocol.
 *---------------------------------------------------------------------
 */
#ifndef _RDISKCTL
#define _RDISKCTL

/*
 *
 * The following Disk Control macros deal with the General Data section,
 * so, x should be 0 for the main disk channel (RT3) or
 *                               8 for the optional disk channel (RT5).
 *
 */
#define N_DISK_PR_CTRL_MAX              7               /* !! to be 7               */

#define RX_DISK_CTRL_READY(bDiskCtrlNo, pbDataRet )                             \
                RxDiskMsgByte( bDiskCtrlNo, N_DISK_PR_CTRL_MAX, I_DISK_CTRL_READY, pbDataRet )

#define RX_DISK_CTRL_VERS(bDiskCtrlNo, pbDataRet )                              \
                RxDiskMsgByte( bDiskCtrlNo, N_DISK_PR_CTRL_MAX, I_DISK_CTRL_VERS, pbDataRet )

#define TX_MAIN_READY_ON(bDiskCtrlNo)                                           \
                TxDiskMsgByte(bDiskCtrlNo, N_DISK_PR_CTRL_MAX, I_MAIN_READY_4DISK, F_READY )

#define TX_MAIN_READY_OFF(bDiskCtrlNo)                                          \
                TxDiskMsgByte(bDiskCtrlNo,   N_DISK_PR_CTRL_MAX,   I_MAIN_READY_4DISK,
F_NOT_READY)

#define TX_MAIN_VERS(bDiskCtrlNo)                                               \
                TxDiskMsgByte(bDiskCtrlNo, N_DISK_PR_CTRL_MAX, I_MAIN_VERS, VERSION)

#define TX_MAIN_STD(bDiskCtrlNo)                                                \
                TxDiskMsgByte(bDiskCtrlNo, N_DISK_PR_CTRL_MAX, I_MAIN_STD, gsUiState.VideoStd)

/*
 *
 *      The following Disk Control macros deal with the Disk Control Blocks so:
 *
 *      disk should be 0-6 for the main disk channel (RT3) or
 *                               8-14 for the optional disk channel (RT5).
 *
 */

#define RX_DISK_PRESENT(bDiskCtrlNo, bDiskNo, pbDataRet)                        \
                RxDiskMsgByte(bDiskCtrlNo, bDiskNo, I_DISK_PRESENT, pbDataRet )

#define RX_DISK_BUSY(bDiskCtrlNo, bDiskNo, pbDataRet )                          \
                RxDiskMsgByte(bDiskCtrlNo, bDiskNo, I_DISK_BUSY, pbDataRet )

#define RX_DISK_STS(bDiskCtrlNo, bDiskNo, pbDataRet )                           \
                RxDiskMsgWord(bDiskCtrlNo, bDiskNo, I_DISK_STS, pbDataRet )

#define RX_DISK_LOCKED(bDiskCtrlNo, bDiskNo, pbDataRet )                        \
                RxDiskMsgByte(bDiskCtrlNo, bDiskNo, I_DISK_LOCKED, pbDataRet )
```

```
#define TX_DISK_CMD(bDiskCtrlNo, bDiskNo, bCmd)                                          \
            TxDiskMsgByte(bDiskCtrlNo, bDiskNo, I_DISK_CMD, bCmd )

#define RX_DISK_CMD( bDiskCtrlNo, bDiskNo, pbDataRet )                                    \
            RxDiskMsgByte(bDiskCtrlNo, bDiskNo, I_DISK_CMD, pbDataRet )

#define TX_DISK_CYL_NO(bDiskCtrlNo, bDiskNo, wCylNo )                                     \
            TxDiskMsgWord(bDiskCtrlNo, bDiskNo, I_DISK_CYL_NO, wCylNo )

#define RX_DISK_CYL_NO( bDiskCtrlNo, bDiskNo, pwDataRet )                                 \
            RxDiskMsgWord(bDiskCtrlNo, bDiskNo, I_DISK_CYL_NO, pwDataRet )

#define TX_DISK_DIRECTION(bDiskCtrlNo, bDiskNo, bDirection )                              \
            TxDiskMsgByte(bDiskCtrlNo, bDiskNo, I_DISK_DIRECTION, bDirection)

#define TX_DISK_STEP_SIZE(bDiskCtrlNo, bDiskNo, bsStep )                                  \
            TxDiskMsgByte(bDiskCtrlNo, bDiskNo, I_DISK_STEP_SIZE, bsStep )

#define TX_DISK_CYL_CNT(bDiskCtrlNo, bDiskNo, wcntCyl )                                   \
            TxDiskMsgWord(bDiskCtrlNo, bDiskNo, I_DISK_CYL_CNT, wcntCyl )

#define RX_DISK_CYL_CNT(bDiskCtrlNo, bDiskNo, pwDataRet )                                 \
            RxDiskMsgWord(bDiskCtrlNo, bDiskNo, I_DISK_CYL_CNT, pwDataRet )

#define TX_DISK_N_CYL_MAX(bDiskCtrlNo, bDiskNo, wnCylMax )                                \
             TxDiskMsgWord(bDiskCtrlNo, bDiskNo, I_DISK_N_CYL_MAX, wnCylMax )
/*
 * Disk random access seek time needed in fields
 */
#define FC_DISK_SEEK_ALLOWANCE   2
/*
 * Base address for each of the two disk channel
 */
#define ABS_BASE_DPRAM_RT3              ABS_ADDR( RT3_DISK_SEG, RT3_DISK_OFF )
#define ABS_BASE_DPRAM_RT5              ABS_ADDR( RT5_DISK_SEG, RT5_DISK_OFF )
/*
 * DP RAM for each disk channel is 2K bytes. it will divide into seven
 * 256 bytes block. One for each disk.
 */
#define S_DPRAM_EACH_DISK               0x100          /* 256 bytes for each disk       */

/*
 * Disk command byte definition
 */
#define CMD_DISK_NULL                   0x00
#define CMD_DISK_SEEK                   0x01
#define CMD_DISK_READ                   0x02
#define CMD_DISK_SEEK_N_READ      0x03
#define CMD_DISK_WRITE                  0x04
#define CMD_DISK_SEEK_N_WRITE     0x05
#define CMD_DISK_ABORT                  0x10
#define CMD_DISK_SPIN_UP          0x40
#define CMD_DISK_SPINDLE_SYNC     0x50
#define CMD_DISK_RESET_ATTN       0x60
#define CMD_DISK_STS_REQ          0x80
#define CMD_DISK_SET_CYL_LIMIT    0xe0
#define CMD_DISK_TEMP_COMP_OFF    0xf0
/*
 * Index into General Data
 */
#define I_DISK_CTRL_READY               0x00
#define I_DISK_CTRL_VERS          0x01


#define I_MAIN_READY_4DISK              0x10
#define I_MAIN_VERS                     0x11
#define I_MAIN_STD                            0x12

/*
 * Index into DPRAM for each disk block
 */
#define I_DISK_PRESENT                  0x00
#define I_DISK_BUSY                           0x01
#define I_DISK_STS                            0x02
#define I_DISK_LOCKED                   0x04
```

```
#define I_DISK_CMD                                  0x10
#define I_DISK_CYL_NO                       0x11
#define I_DISK_DIRECTION            0x20
#define I_DISK_STEP_SIZE            0x21
#define I_DISK_CYL_CNT                      0x22
#define I_DISK_N_CYL_MAX            0x24
#define I_DISK_READ_EQ                      0x70
#define I_DISK_WRITE_COMP                   0x78

#define I_DISK_WRITE_CURRENT        0x80

extern  UINT16   far *grpwAbsBaseDpRam[];
extern  UINT32   grlAbsBaseDpRam[];

/*
 * The following four macros that directly put data in the addr in Dp Ram
 * or directly get data from the addr in Dp Ram.
 */


/*
 *      these don't work yet
 */

#define RX_DISK_MSG_BYTE( bDiskCtrlNo, bDiskNo, biDpRam, bDataRead )            \
                bDataRead       = (UINT8) *BYTE_PTR((grlAbsBaseDpRam[bDiskCtrlNo] +       \
                                        ((bDiskNo * S_DPRAM_EACH_DISK + biDpRam) << 1 )));

#define RX_DISK_MSG_WORD(Addr, bDiskCtrlNo, bDiskNo, biDpRam, wDataRead)    \
                Addr = grlAbsBaseDpRam[bDiskCtrlNo] +
                                ( ( bDiskNo * S_DPRAM_EACH_DISK + biDpRam ) << 1 );       \
                wDataRead       = ((UINT8) *BYTE_PTR(Addr)) <<8;                          \
                wDataRead       |= (UINT8) *BYTE_PTR(Addr+2);                              \

#define TX_DISK_MSG_BYTE( bDiskCtrlNo, bDiskNo, biDpRam, bDataToSend )          \
                *BYTE_PTR((grlAbsBaseDpRam[bDiskCtrlNo] +
                                ((bDiskNo * S_DPRAM_EACH_DISK + biDpRam) << 1 ))) =       \
bDataToSend;

#define TX_DISK_MSG_WORD(Addr,bDiskCtrlNo, bDiskNo, biDpRam, wDataToSend)  \
                Addr = grlAbsBaseDpRam[bDiskCtrlNo] +
                        ( ( bDiskNo * S_DPRAM_EACH_DISK + biDpRam ) << 1 );               \
                *BYTE_PTR(Addr)         = (UINT8) ( wDataToSend >> 8 );                   \
                *BYTE_PTR(Addr+2)       = (UINT8) ( wDataToSend & 0xff );                 \
#endif


/*
 *---------------------------------------------------------------------------
 * rglobal.h     Copyright 1991 Accom Inc.
 *
 * Responsible Person: Jeffrey Wu
 *
 * NOTE : This is the file to put FUNCTION PROTOTYPE
 *---------------------------------------------------------------------------
 */
#ifndef _RGLOBAL
#define _RGLOBAL

/*
 * User-defined types
 */
typedef unsigned long           UINT32;
typedef unsigned int            UINT16;
typedef unsigned short          UINT16;
typedef unsigned char           UINT8;

typedef signed long                     SINT32;
typedef signed int                      SINT16;
typedef signed short            SINT16;
typedef signed char                     SINT8;

typedef unsigned char           FLAG;
/*
 * struct, union, enum
 */
```

```
#define TC                                  struct  tc
#define CYL_HEAD                     struct  cyl_head

#define LOCK                         struct  lock
#define DA                                  struct  da      /* rdisk.h  disk allocation
struct  */
#define CYL_ADV                      struct  cyl_adv
#define TLB                                 struct  tlb
#define INT_TL                       struct  int_tl
#define OUT_BUF                      struct  out_buf

#define REC_INFO                     struct  rec_info
#define PLAY_INFO                    struct  play_info

#define HARD_KEY                     struct  hard_key
#define MAIN_STATE                   struct  main_state
#define BUTTON                       struct  button
#define MAIN_EVENT                   struct  main_event
#define BUTTON_ID                    enum    button_id
#define LED_ID                       enum    led_id
#define EVENT                        enum    event
#define SEGMENT                      struct segment

/*
 * Constant Defines
 */
#define NULL                         '\0'
#define TRUE                         1
#define FALSE                        0

#define ON                                  TRUE
#define OFF                                 FALSE

#define SET                                 TRUE
#define RESET                        FALSE

#define YES                                 TRUE
#define NO                                  FALSE

#define POSITIVE                     TRUE
#define NEGATIVE                     FALSE

#define HIGH_LIGHT_OFF            '0'
#define HIGH_LIGHT_ALL            '1'
#define HIGH_LIGHT_SEG            '2'
#define HIGH_LIGHT_REC_LOC        '3'
#define HIGH_LIGHT_CLIP           '2'       /* to be changed to '4' */

#define FORWARD                      1
#define REVERSE                      0
/*
 * In rsegment.c
 */
#define SCROLL_UP                    1
#define SCROLL_DOWN               0
#define ENTER_ID                     2
#define ENTER_SEG_IN              3
#define ENTER_SEG_OUT             4
#define ENTER_SEG_SPD             5
#define TOTAL_LISTS               3
#define TOTAL_SEGS                   99
/* used in SEG_LIST and MACRO_LIST */
#define UNSAVED                      0
#define SAVED                        1
/*
 * These define's are used for GetSegment() and SetSegment().
 */
#define IN_POINT                     0
#define OUT_POINT                    1
#define PLAY_SPD                     2
#define ID_NO                        3
#define LIST_HEAD                    4
#define LIST_TAIL                    5
#define PREV_SEG                     6
#define NEXT_SEG                     7
```

```
#define SEQUENCE_NO                     8
/*
 * Channel bit flag definition
 */
#define CH_VIDEO                        0x01
#define CH_AUDIO1                       0x02
#define CH_AUDIO2                       0x04
#define CH_ALL_CH                       0x07

#define FRAME_LIMIT                     29
#define SECOND_LIMIT            59
#define MINUTE_LIMIT            59
#define HOUR_LIMIT                      23

/* Compiling condition */
#if 1
#define RTD                                     TRUE    /* FALSE if compiling for simulation*
#else
#define RTD                                     FALSE   /* FALSE if compiling for simulation*
#endif

#if 0
#define DEBUG                           TRUE    /* TRUE if Compiling for 0-Disk System    */
#else
#define DEBUG                           FALSE   /* FALSE if Compiling for 1+ Disk System */
#endif

#define NOT_TEST                        TRUE
#define RT9                                     TRUE    /* FALSE for real RT2              */

#define CONFIGURE_DISKS         TRUE    /* TRUE TO SET DISK EEPROM PARAMETERS */

/*
 * Ready or not ready flag for both com port and disks
 */
#define F_NOT_READY                     0x0
#define F_READY                         0x5a

/*
 * All system error message defines reside here.
 */
#define ROW_NO_ERR_MSG          6
#define TOTAL_OF_MSG            7

/*
 * Screen message severity level
 */
#define ERROR                           0
#define WARNING                         1
#define NOTE                            2

/*
 * Defines related to UiDispRtSpd( ... ) in RENTRY.C
 */
#define SPD_X_DISP                      14
#define SPD_Y_DISP                      1

/*
 * mostly related to RMENU.C
 */
#define TOTALS_OF_MENU          20
#define TOTALS_OF_SOFTKEY       5

/*
 * mostly related to RUIEVENT.C
 */
#define SHUTTLE_RANGE           128
#define VARI_SPD_RANGE          PLAY_SPD_MAX

/*
 * mostly related to RMACRO.C
 */
#define MACRO_LINE                      2
#define MACRO_DELAY                     45
#define STOP_TIME                       150
```

```
#define CURRENT                         0
#define NEXT                            1

#define MACROS    struct macro
#define DATA      union data
#define BTN               struct btn
#define KNOB      struct knob
#define TOTAL_MACROS      2
#define TOTAL_EVENTS      100

/*
 * mostly related to RUIFUNC.C for these routines
 * UiClearSpecifiedLine( bLineNo ) and UiDispStr( ..., bYPos )
 */
#define LINE_1                          1
#define LINE_2                          2
#define LINE_3                          3
#define LINE_4                          4
#define LINE_5                          5
#define LINE_6                          6
#define LINE_7                          7
#define LINE_8                          8

typedef struct
{
        SINT16                          wX;
        SINT16                          wY;
}       PIXEL;

typedef struct
{
        SINT16                          wR;
        SINT16                          wG;
        SINT16                          wB;
}       COLOR;

typedef UINT32                          TICK;

#define N_ENTRY(array)          (sizeof(array) / sizeof(array[0]))
#define MAX(a, b)                       ((a) > (b) ? (a) : (b))
#define MIN(a, b)                       ((a) < (b) ? (a) : (b))
#define ABS(x)                          ((x) < 0 ?  -(x) : (x))
#define XBOUND(x, lo, hi)       ((x) = MIN(MAX(x, lo), hi))

/*
 * Casts
 */
#define LOWORD(l)                       ( * ( ( (UINT16 *)      &(l) ) + 0 ) )
#define HIWORD(l)                       ( * ( ( (UINT16 *)      &(l) ) + 1 ) )
#define LOBYTE(w)                       ( * ( ( (UINT8  *)      &(w) ) + 0 ) )
#define HIBYTE(w)                       ( * ( ( (UINT8  *)      &(w) ) + 1 ) )
/*
 * Legal values for Input Video Type ( gbtyVideoInput )
 */
#define VIT_AD                          0       /* A/D signal           */
#define VIT_D1_SERIAL           1               /* D1 Serial            */
#define VIT_D1_PARALLEL         2               /* D1 Parallel          */


/*
 * Legal values for Play Repeat Type ( gbtyPlayRepeat )
 */
#define TY_PLAY_REPEAT_NONE                     0
#define TY_PLAY_REPEAT_LOOP                     1
#define TY_PLAY_REPEAT_PINGPONG         2
/*
 * Legal values for Field Repeat Type ( gbtyFieldRepeat )
 */
#define TY_FIELD_REPEAT_NONE_FWD 0      /* f1 play f1 storage, f2 play f2       */
#define TY_FIELD_REPEAT_NONE_REV 1      /* f1 play f2 storage, f2 play f1       */
#define TY_FIELD_REPEAT_F1_FS1          2       /* Both f1/f2 play f1 for FS1   */
#define TY_FIELD_REPEAT_F2_FS1          3       /* Both f1/f2 play f2 for FS1   */
#define TY_FIELD_REPEAT_F1_FS2          4       /* Both f1/f2 play f1 for FS2   */
#define TY_FIELD_REPEAT_F2_FS2          5       /* Both f1/f2 play f2 for FS2   */
```

```
/*
 * Use bit 0, 1 to indicate TV Stds in bVideoStd
 */
#define         STD_NTSC                        0x00            /* NTSC TV Standard     */
#define         STD_PAL                         0x01            /* PAL  TV Standard     */
#define         STD_TV_STD                      0x03            /* Mask for testing     */
/*
 * Use bit 4, 5 to indicate video usage in bVideoStd
 */
#define         STD_VIDEO                       0x00            /* Main Video Channel   */
#define         STD_KEY                         0x10            /* Key Channel          */
#define         STD_FILM                        0x20            /* Film                 */
#define         STD_FILMKEY                     0x30            /* Film Key             */
#define         STD_TY_VIDEO            0x30            /* Mask for testing             */
/*
 * Legal values for bVideoStd in cyl_head
 */
#define         STD_NTSC_VIDEO          STD_NTSC | STD_VIDEO
#define         STD_NTSC_KEY            STD_NTSC | STD_KEY
#define         STD_NTSC_FILM           STD_NTSC | STD_FILM
#define         STD_NTSC_FILMKEY        STD_NTSC | STD_FILMKEY
#define         STD_PAL_VIDEO           STD_PAL  | STD_VIDEO
#define         STD_PAL_KEY                     STD_PAL  | STD_KEY
/*
 * Legal values for btySrcTc in cyl_head
 */
#define         TCT_NONE                        0
#define         TCT_DVITC                       1
#define         TCT_LTC                         2
/*
 * Legal values for gwPlayMode
 */
#define PLAY_MODE_NORM          0
#define PLAY_MODE_SEG           1
#define PLAY_MODE_CLIP          2
#define PLAY_MODE_CINE          3
/*
 * Default play speed
 */
#define PLAY_SPD_NORMAL         100
#define PLAY_SPD_MAX            9999
#define SHUTTLE_SPD_MAX         3000
#define V53                                     1               /* 1 if compiling for V53 */

/*
 * External Declarations of global variables.
 * Global variables are declared and defined in RGLOBAL.C.
 */

/*
 * RMODE.H
 */
extern  enum toggle             geViEnabled;
extern  enum port_no            /* SOFT1 */
{
        PORT1,
        PORT2,
        PORT3,
        PORT4
};
extern  enum port_no            gePortNo;
extern  enum protocol           /* SOFT3 */
{
        AMPEX,
        SONY,
        SMPTE,
        CMX
};
extern  enum protocol           geProtocol;
extern  enum fld_dom            /* SOFT4 */
{
        FIELD_1,
        FIELD_2,
        NONE
};
```

```
extern   enum fld_dom            geFldDom;
extern   enum output_mode        /* SOFT5 */
{
        OUT_MODE_AUTO_FR,
        OUT_MODE_FRAME,
        OUT_MODE_FIELD,
        OUT_MODE_INTRP_FD,
        OUT_MODE_FILM22,
        OUT_MODE_FILM32,
        OUT_MODE_BYPASS
};
extern   enum output_mode        geOutputMode;

extern   SINT8          grbiSoft[ TOTALS_OF_MENU ][ TOTALS_OF_SOFTKEY ];
extern   SINT8          gStr1[], gStr2[];              /* for general use */
extern   SINT8          gFieldStr[];                   /* for field entry */
extern   UINT8          gstrIntr[];
extern   UINT8          gbFieldStatus;
extern   UINT8          bButtonStatus[];
extern   UINT8          gbtyVideoInput;
extern   UINT8          gbVideoStd;
extern   SINT16         gwKeypadEntryValue;
extern   UINT8          *grstrDispErrMsg[ TOTAL_OF_MSG ];
/*
 * rsegment.c
 */
extern struct segment
{
        UINT8   bSequenceNo;            /* used by system for sequencing */
        UINT8   bSegmentIDNo;           /* shown on the screen */
        UINT32  lInPoint;
        UINT32  lOutPoint;
        SINT16  wSpeed;
        UINT8   *pstrProfile;
        UINT8   *pstrMode;
        SEGMENT *psPrev;
        SEGMENT *psNext;
};
extern   SEGMENT        rsList[ TOTAL_LISTS ][ TOTAL_SEGS ];

extern struct seg_list
{
        SEGMENT *psListsHead;
        UINT16  wTotalLens[ TOTAL_LISTS ];
} gsSegList;
extern   UINT8          *prstrMode[4];
extern   UINT8          *prstrProfile[3];

/*
 * rmacro.c
 */
extern struct knob
{
        UINT16  wcntEvents;
        UINT8   rbCount[4];             /* four ASCII decimal numbers */
        UINT32  lTicksLapse;
};

extern struct btn
{
        UINT8   rbButtonID[2];          /* two ASCII decimal numbers */
        UINT16  wMacroDelay;
};

extern union data
{
        BTN             sButton;
        KNOB    sEncoder;
};

extern struct macro
{
        UINT16  wSequenceNo;
        UINT8   cPrefix;
        DATA    uData;
```

```
};

extern  MAIN_EVENT      gsMacroKnobMsgPacket;
extern  UINT16          grwTotalEvents[ TOTAL_MACROS ];
extern  MACROS          rsMacro[ TOTAL_MACROS ][ TOTAL_EVENTS ];
extern  UINT8           gbiCharStr;
extern  UINT8           gstrCharName[9];
extern  UINT8           gstrCharDisplay[2];
extern  UINT8           gbiStr;
extern  UINT32          glFrameCntTimer;
extern  UINT32          glFrameCntCopy;

extern  FLAG            gfRecEnabled;
extern  UINT16          gwCrossDaPlay;

extern  SINT16          gbFieldValue[4];
extern  SINT16          gwLastPulseCount;
extern  SINT16          gwPulseCount;
extern  SINT16          gwKnobZeroPoint;
extern  SINT16          gwSpdTableIndex;
extern  SINT16          gwCountDifference;
extern  SINT16          gwCountMax;
extern  SINT16          gwCountMin;
extern  SINT16          gwSignPlaySpd;
extern  SINT16          gwStorePlaySpd;
extern  UINT32          gliWaitTime;
extern  UINT8           gbiField;
extern  UINT16          gwMacroNo;
extern  UINT16          gwMacroTotalNo;
extern  UINT32          glPlayFirstTicks;
extern  UINT32          glPlayTime;

/* Encoder capture related */
extern  UINT32          glLastTicks;
extern  UINT32          glCurrTicks;
extern  UINT32          glIdleTicks;
extern  UINT32          glTicksLapse;
extern  SINT16          gwCurrPulseCnt;
extern  SINT16          gwDeltaPulse;   /* switch between 1 and -1 */
extern  BUTTON_ID       geModeBeforeMacro;                      /* the last operating mode */

/*
 *      Flags for RENTRY.C.
 */
extern  SINT16          gwCurrVariSpd;
extern  FLAG            gfKeypadEntryFirst;
extern  FLAG            gfClipNoEntry;
extern  FLAG            gfFirstSpdEntry;
extern  FLAG            gfEntryExist;

/* Encoder run related */
extern  UINT16          gwRT3MemoryMap;
extern  UINT16          gwRT5MemoryMap;
extern  UINT16          gwcntHiCmdCnt;
extern  UINT16          gwFieldNum;
extern  SINT16          gwPlaySpd;
extern  UINT16          gwGotoField;
extern  UINT16          gnStepFwd;
extern  UINT16          gnStepRev;
extern  UINT16          gnJogFwd;
extern  UINT16          gnJogRev;
extern  UINT16          gwRecIn;
extern  UINT16          gwRecOut;
extern  UINT16          gwMarkIn;
extern  UINT16          gwMarkOut;
extern  UINT16          gwPlayDur;
extern  UINT16          gwRecDur;
extern  FLAG            grfDiskPresent[];
extern  UINT8           grnDiskOnLine[];
extern  UINT8           grbDiskMap[];
extern  UINT16          gwPlayMode;
extern  FLAG            gfFwdAtEnd;
extern  FLAG            gfRevAtEnd;
extern  UINT16          gwRt3State;
extern  INT_TL          gsIntTl;
```

```
extern  TLB             grsTlb[];
extern  FLAG            gfKeyChanMode;
extern  FLAG            gfField2Editing;
extern  UINT8           gbtyPlayRepeat;
extern  UINT8           gbtyFieldRepeat;
extern  FLAG            gfRecClosed;
extern  FLAG            gfPlayClosed;
extern  FLAG            gfRecAborted;
extern  FLAG            gfPlayAborted;
extern  FLAG            gfRebuildPlay;
extern  FLAG            gfShuttleInit;
extern  FLAG            gfSegListChanged;

extern  FLAG            grfLedStatus[];
extern  FLAG            gfSlaveRTDShouldPlay;
extern  FLAG            gfSlaveRTDShouldRecord;
extern  FLAG            gfSlaveRecStarted;
extern  FLAG            gfSlavePlayStarted;
extern  FLAG            gfMasterRtd;

extern  UINT16          gwPlayState;
extern  OUT_BUF         grsOutBuf[];
extern  UINT8           gbChToRec;
extern  FLAG            gfFieldEntry;
extern  FLAG            gfFieldMode;
extern  PLAY_INFO       sPlayInfo;
extern  FLAG            gfEncoderPos;
extern  FLAG            gfEncoderNeg;
extern  FLAG            gfDecimalPoint;
extern  FLAG            gfKeypadError;
extern  FLAG            gfDataEntry;
extern  FLAG            gfRecord;
extern  FLAG            gfGoto;
extern  FLAG            gfVariSpeed;
extern  FLAG            gfDataEntryFirst;
extern  FLAG            gfVariSpeedSession;
extern  FLAG            gfTcEntry;
extern  FLAG            gfShuttle;
extern  FLAG            gfCheckSecondPress;
extern  FLAG            gfCheckWaitTime;
extern  FLAG            gfNewSegmentMarkIn;
extern  FLAG            gfNewSegmentMarkOut;
extern  FLAG            gfLoadMacro;
extern  FLAG            gfRunMacro;
extern  FLAG            gfRecMacro;
extern  FLAG            gfRecMacroTimeLapse;
extern  FLAG            gfPauseMacro;
extern  FLAG            gfEndMacro;
extern  FLAG            gfMacroPlay;
extern  FLAG            gfResumeMacroPlay;
extern  FLAG            gfMacroRec;
extern  FLAG            gfNotMenuButton;

/* Encoder capture related */
extern  FLAG            gfEncoderEntry;
extern  FLAG            gfFwdFirst;
extern  FLAG            gfRevFirst;
extern  FLAG            gfDirChanged;
extern  FLAG            gfShortIdle;

/* Encoder run related */
extern  FLAG            gfLoadMacroForEncoder;

extern  FLAG            gfUpdateEEPROM;
extern  FLAG            gfClearingEEPROM;

extern  FLAG            volatile        gfEvenFrame;
extern  FLAG            volatile        gfField2;
extern  FLAG            volatile        gfInVertical;
extern  FLAG            gfSegModify;

extern  BUTTON          grButton[];
extern  BUTTON_ID       eMenuWhenRecord;
extern  HARD_KEY        *gpsCurrHardKey;
extern  BUTTON_ID       geButtonBeforeLast;
```

```
extern  BUTTON_ID       geLastButton;
extern  BUTTON_ID       geButton;
extern  FLAG            gfSomethingThere;
extern  MAIN_STATE      gsUiState;
extern  PLAY_INFO       gsPlayInfo;
extern  REC_INFO        gsRecInfo;

/*
 * Assembly-language function calls
 */
UINT8   inp(UINT16);
UINT16  inpw(UINT16);
void    outp(UINT16, UINT8);
void    outpw(UINT16, UINT16);

/*
 * Assembly-language functions
 * In msc60.asm
 */
void    start(void);

/*
 *      FUNCTION PROTOTYPES.
 */

/*
 * In rclip.c
 */
void    ShowClip( void );
void    ScrollClipTable( UINT8 );

/*
 * In rmacro.c
 */
void            CountEventsForKnobMacro( MAIN_EVENT * );
void            ClearMacros( void );
void            InitMacros( void );
void            MacroDelay( UINT8 );
void            CopyMacroStep( void );
void            InsertMacroStep( void );
void            DeleteMacroStep( void );
void            RecUserInput( MAIN_EVENT * );
void            LoadMacroInMsgPacket( void );
void            LoadStopMacro( void );
void            ShowDebugRunMacro( void );
void            LoadMacroInMsgPacketForEncoder( void );
void            RecMacroResetEncoder( void );
void            ResumeMacroPlay( void );
void            CheckMacroAfterPlayDone( void );
void            CheckMacrobeforeKeyDownProcess( MAIN_EVENT * );
void            CheckRunMacroAfterKeyDnProcess( void );
void            CheckRunMacroAfterEachEvent( void );
void            CheckMacroForEncoder( void );
void            ScrollMacroLists( UINT8 );
void            ShowMacroLists( void );
void            WriteMacroTotalNo( void );

/*
 * In rsegment.c
 */
FLAG            GetSegData( UINT8, UINT8, UINT16 * );
UINT8           SetSegment( UINT8 );
void            InitSegLists( void );
void            ClearSegList( void );
void            AddNewMemberAtListEnd( void );
void            AddNewMemberAfterListCurr( void );
void            DeleteListSegment( void );
void            CopyListSegment( void );
void            InsertListSegment( void );
void            SegSpd( void );
UINT8           AssignSegID( void );
void            SegID( void );
void            UpdateSegListDisp( UINT8 );
void            ShowSegmentList( void );
void            ScrollSegmentList( UINT8 );
```

```
void            ChangeEnterField( void );
void            ChangeFieldValue( UINT8 );
void            MarkInSegTc( void );
void            MarkOutSegTc( void );
void            ScrollSegLists( UINT8 );
void            ShowSegLists( void );

/*
 * In rmain.c
 */

/*
 * In rmenu.c
 */
void            InitKnob(UINT16);
void            ChkExclFuncs( BUTTON_ID );
void            ShowTimeCode( UINT8, UINT8 );
void            CheckMenuChange( BUTTON_ID, BUTTON_ID );
FLAG            BuildPlay(FLAG);
void            HandleStep(FLAG);

/*
 * In rentry.c
 */
UINT8           CharacterEntry( void );
void            KeypadEntry( BUTTON_ID );
void            PrintTcField( SINT8 *, SINT16, SINT16, SINT16 );
void            EnterSegSpd( SINT16      * );
void            EnterSegID( UINT8 * );
SINT32          MarkEntry( void );
FLAG            CheckKeypadEntry( BUTTON_ID );
SINT32          EntryToValue( void );
void            GotoEntry( void );
void            RecordEntry( void );
void            VariSpeedEntry( void );
void            ResetKeypadEntry( void );
void            UiDispRtSpd( SINT16, UINT8, UINT8 );
UINT8           CharacterEntry( void );
void            SpeedBackToNormal( void );
void            SpeedToVari( void );

/*
 * In rampex.c
 */
void            RtRxMsgAmpex(UINT8);
void            RtTxMsgAmpex(UINT8);
FLAG            SetupComAmpex(UINT8);
void            RtSetupStatus(void);
void            RtSetupXStatus(void);
FLAG            RtInsertOneTlMsg( UINT8, UINT8 *, UINT8 * );
FLAG            RtAmpexCtrlRtd( UINT8, UINT8 * );
FLAG            RtLoadMsgCom( UINT8, UINT8 *, UINT8 );

/*
 * Assembly-language functions
 * In raux.asm
 */
void            AuxNmi(void);
void            AuxTimer0(void);
void            AuxTimer1(void);
void            AuxFrame(void);
void            AuxField(void);
void            MvStrV53(SINT8 far *, SINT8 far *, UINT16);
void            OpcodeCli(void);
void            OpcodeSti(void);
void            EnterExpanded(void);
void            ExitExpanded(void);
void            XaRet(void);
/*
 * rglobal.c
 */
void            InitGlobalVar(void);


void            IspNmi(void);
```

```
void            IspTimer(void);
void            IspFrame(void);
void            IspVert(void);
void            TxComMsg(UINT8, UINT8 *);
void            TxComMsgByte(UINT8, UINT8);
UINT8           RxComMsgByte(UINT8);
void            QueueComByte(UINT16, UINT8);
void            WriteComByte(UINT16, UINT8);
UINT8           ReadComByte(UINT16);
void            InitCom(void);
void            InitIntr(void);
void            SetIntr(UINT8);
UINT8           GetIntr(void);
void            InstallVector(UINT16, UINT32 far *);
void            InitTimer(void);
void            InitV53(void);
void            MapBdToBase( void );
void            MapFsRt3( UINT32 );
void            MapFsRt5( UINT32 );
UINT16          ReadFsRt3( UINT8, UINT32 );
void            WriteFsRt3( UINT8, UINT32,       UINT16 );
UINT16          ReadFsRt5( UINT8, UINT32 );
void            WriteFsRt5( UINT8, UINT32,       UINT16 );

/*
 * In rhw.c
 */
void            HiReset(void);
void            HiLoadPlanes(UINT8 *, UINT16);
SINT16          HiField(void);
void            HiSetAuxOutData(UINT16);
void            HiSetAuxBit(UINT8, FLAG);
UINT16          HiGetAuxBit(UINT8);
UINT16          HiReadStatus(void);
void            DebugToggle(UINT16);
void            LedToggle(FLAG);
void            WaitTopOfFrame(void);
void            RtVertIntr(void);
void            InitHw(void);
UINT32          GetTime(void);
void            SetBaudRates(void) ;
void            CheckWarnings(void);
SINT16          HiGetInputPresent(void);
UINT16          ReadOneReg( UINT8, UINT8 );
void            WriteOneReg( UINT8, UINT8, UINT16 );
void            WriteRt1Regs(void);
void            WriteRt2Regs(void);
void            WriteRt3Regs(void);
void            WriteRt4Regs(void);
void            WriteRt5Regs(void);
void            WriteRt6Regs(void);
FLAG            TxDiskMsgByte( UINT8, UINT8, UINT8, UINT8 );
FLAG            TxDiskMsgWord( UINT8, UINT8, UINT8, UINT16 );
FLAG            RxDiskMsgByte( UINT8, UINT8, UINT8, UINT8 * );
FLAG            RxDiskMsgWord( UINT8, UINT8, UINT8, UINT16 * );
#if 1   /* JOHN BLANK */
void            BlankOutput(FLAG, FLAG);
        FLAG YBlank, CBlank;
#endif  /* JOHN BLANK */
/*
 * In rmem.c
*/
void            SetBaseAddr( void );
void            HiWriteMem(void);
void            HiReadMem(void);
FLAG            WriteEEPROM(UINT16, UINT8, FLAG);

/*
 * In rtest.c
 */
void            CpDispTest(void);
void            CpLedTest(void);
SINT16          CpBtnTest(SINT16);
UINT8           DoRS422Test(void);
UINT8           DoAuxiliaryTest(void);
```

```
SINT16          TestMemory(SINT16);
SINT16          TestLoopback(SINT16);
UINT8           TestForLoopBk(UINT8);

/*
 * In rdisk.c
 */
FLAG            InsertOneClip(UINT8, UINT8, UINT16, CYL_HEAD );
FLAG            InsertOneLock(UINT8, CYL_HEAD );
FLAG            PrepareClipTable(TC, UINT16 *);
FLAG            OpenFs(FLAG);
FLAG            SetVideoInputType(UINT8);
void            SetDiskXover(FLAG);
FLAG            RtSetOutRegRt3(UINT8, FLAG);
FLAG            RtSetFsForWrite(UINT8, FLAG);
FLAG            RtSetFsForRead(UINT8);
FLAG            Format(void);
FLAG            FindBadSurface(UINT8, UINT8, UINT16, UINT8 *);
void            SetCylHead(void);
void            RtSetCylHead(DA);
FLAG            DiskCache( UINT8, UINT8, UINT16, UINT16, FLAG, UINT8, UINT8,UINT8 *,UINT16 *);
FLAG            DiskCopy( UINT8, UINT8, UINT16, FLAG, UINT8, UINT16, UINT16 );
FLAG            ReadOneCyl( UINT8, UINT8, UINT16, UINT8, FLAG, FLAG );
FLAG            WriteOneCyl( UINT8, UINT8, UINT16 );
FLAG            FixupDaForPlay( UINT8, FLAG );
FLAG            UpdateClipTable(void);

FLAG            OpenRec( UINT8, TC, UINT16, UINT8, char *, UINT8, UINT8, UINT8, UINT16 * );
FLAG            FakeFrameStepFwd(void);
FLAG            ValidateRecTl( UINT8, TC, UINT16, UINT16 *);
FLAG            CloseRec( UINT8);
FLAG            OpenSegPlay( UINT8, FLAG, UINT8, UINT8 );
FLAG            OpenPlay(UINT8, TC, UINT16, UINT16, FLAG, UINT8, UINT8);
FLAG            CompletePlayInfo( UINT8, FLAG, UINT16, UINT16, FLAG, UINT8, UINT8 );
FLAG            BuildDaTable( UINT8, TC, UINT16, SINT16, UINT8, DA *, UINT8 *);
FLAG            MakeTwoClips( TC, TC, UINT16);
void            TcToDiskPosition( UINT8, TC, UINT8 *, UINT16 *);
FLAG            DiskPositionToTc( UINT8, UINT8, UINT16, FLAG, TC *);
FLAG            HandleGoto(void);
FLAG            HandleJog(FLAG);
FLAG            RtCylAdvForPlay(void);
FLAG            RtCylAdvForStep(void);
FLAG            RtSeekNextDisk(void);

FLAG            OpenContPlay(FLAG);

void            RtPrepareToTurn(void);
void            RtPrepareToPong(void);
void            RtPrepareToLoop(void);
FLAG            OpenLoopPlay(void);
FLAG            RtRecording(void);
FLAG            RtPlaying(void);
void            SetupForFreeze(void);
void            TestIfDisksAreLocked(void);
FLAG            InitDisks(void);
UINT32          GetClipData( UINT8, UINT8 );


/*
 * In rtime.c
 */
void            TcToFc(TC, SINT32 *);
void            FcToTc(SINT32, FLAG, TC *);
FLAG            TcCmp(TC, TC, UINT8 *);
FLAG            TcSubTc(TC, TC, SINT32 *);
FLAG            TcAddFc(TC, SINT32, TC *);
void            TcStrToTc( UINT8 *, UINT16, TC * );
void            TcToTcStr( TC, UINT16, UINT8 * );

/*
 * In rinit.c
 */
void            InitCP(void);
void            InitUiStates(void);
void            TestSysConfig(void);
```

```
FLAG            InitDisks(void);
void            InitFs(void);
FLAG            SetDiskCylLimits(void);

/*
 * In rintr.c
 */
void            DoPeriodicTasks(void);

/*
 * In ruievent.c
 */
void            InitEventQueue( void );
void            CheckForEvents( void );
void            PostEventCp( EVENT, void * );

/*
 * In rcom.c
 */
FLAG            RxMsgCp(void);
FLAG            RxOneMsgCp( UINT8 * );

/*
 * In ruifunc.c
 */
void            ExchangeProcess( HARD_KEY * );
void            StartProcess( HARD_KEY * );
void            EndProcess( void );
void            AbortProcess( void );
void            RestartProcess( void );
void            UiSetLed( LED_ID, FLAG );
BUTTON          *IDToButton( BUTTON_ID );
BUTTON_ID       GetButtonID( SINT8 * );
void            UiDispStr( UINT8 *, UINT8, UINT8 );
void            UiDispBlinkStr( UINT8, UINT8, UINT8 );
void            UiDispBlinkStr( UINT8, UINT8, UINT8 );
void            UiClearSpecifiedLine( UINT8 );
void            UiDispHighLight( UINT8, UINT8 );
void            UiBeep(void);
void            StrCat( SINT8 *, SINT8 * );
void            StrCpy( SINT8 *, SINT8 * );
SINT16          StrNCpy(SINT8 *, SINT8 *, SINT16);
void            PadStr(SINT8 *);
void            PrintDec( SINT8 *, SINT16, SINT16, SINT16, SINT16 );
void            WaitTimeMS( UINT16 );
void            SetHexBits( UINT8 *, UINT8 *, UINT16 );
void            GetHexBits( SINT8 *, SINT8 *, SINT16 );
void            MainRxStr( SINT8 * );
void            MainTxStr( UINT8, UINT8 * );
void            UiResetDisp( UINT8 );
void            UiDispField( SINT8, SINT8 );
void            UiDispCursorPos( UINT8, UINT8 );
TICK            GetTicks( void );
void            UiSetCPSend( UINT8, UINT8 );
void            UiGetVersion( void );
void            UiResetCP( void );
void            UiSetAndDispStr( UINT8, UINT8, UINT8 * );
void            UiSetupNewLed( UINT16 );
void            UiSayHi( void );
void            UiDispTc( UINT8 *, UINT8, UINT8, FLAG, FLAG );
void            UiDispFieldCntAsTc( UINT16, UINT8, UINT8, FLAG, FLAG );
void            UiDispRtFieldAndTc( FLAG, FLAG );
void            PrintPaddedDec( UINT8 *, UINT16, UINT16 );
void            UiDimLED( UINT8 );
void            UiDimDisp( UINT8 );
UINT8           StrCmp( UINT8 *, UINT8 * );
UINT8           SearchStrForChar( UINT8 *, UINT8 );
void            UiDispError( UINT8 **, UINT8, UINT8 );
void            UiBeep( void );
void            CheckSecondPress( void );


/*
 * In rencoder.c
 */
```

```
void            ZeroEncoders( void );
void            RegisterE1( SINT16, SINT16, SINT16 *, SINT16 );
void            UpdateE1( SINT16 );
UINT8           ResetE1( SINT16 );
void            UIResetEncoder( void );
SINT16          GetEncoderVal( SINT8    * );


/*
 *      User Interface function prototypes
 */
#if 0           /* keep these codes while they are not used */

SINT8           ReadCOMChar( SINT16 );
void            WriteCOMChar( SINT16, SINT8 );
void            QueueCOMChar( SINT16, SINT8 );
void            UiClearLED( void );
SINT16          UiKeyStatus( BUTTON_ID);
void            UiSetTrackball( SINT16, SINT16 );
void            UiResetTrackball( void );
void            UiResetEncoder( void );
void            UiMoveCursor( void );
SINT16          UiTrackballX( SINT16 );
SINT16          UiTrackballY( SINT16 );
SINT16          UiHasTrackMoved( void );
void            UiDispCursorEnable( SINT16 );
void            UiResetCursor( void );
void            UiResetBorder( void );
void            UiBanner( SINT8 *, UINT8, UINT8 );
void            UiSetEcho( SINT16 );
SINT16          UiGetCPSend( void );
void            SendButtonUp( BUTTON_ID );
void            SendButtonDown( BUTTON_ID );
void            SendTrackballInfo( PIXEL * );
void            HandleButtonMsg( BUTTON_ID );
void            SwitchToCurrentMode( BUTTON_ID );
SINT8           *AddNumber( SINT8 *, SINT16, SINT16 );
SINT8           *BinToAscii( SINT8 *, SINT16 );
SINT8           *InitField( SINT16, SINT8 * );
SINT8           *AddTxt( SINT8 *, SINT8 * );
void            DispField( UINT8, UINT8 );
SINT16          StrLen(SINT8 *);
SINT16          TicksPassed(TICK *, SINT16);
SINT16          ScanNumericEntry(BUTTON_ID, SINT16, SINT16, SINT16);
void            InitializeSetups( void );
BUTTON_ID       GetBUTTON_ID( SINT8 * );
SINT16          GetEncoderVal( SINT8 * );
SINT16          UiGetNumEvents( void );
void            ChangeSetup( SINT16, SINT16 );
void            AutoStandard(void);


void            HandleRegRead( REG_VALUE_MSG * );
void            UiSendRegValue( SINT8, SINT8 *, SINT16 );
void            HandleRegWrite( RegWriteMessage * );
#endif          /* keep these codes while they are not used */

#endif


/*
 *------------------------------------------------------------------------
 *  rhw.h       Copyright right 1991 Accom Inc.
 *
 *      Responsible Person: Doug George
 *
 * This file contains hardware interface definitions
 *------------------------------------------------------------------------
 */
#ifndef _RHW
#define _RHW

#define N_REG_RT1                       1               /* 1 output register on
RT1         */
#define N_REG_RT2                       1               /* 1 output register on
```

```
RT2          */
#define N_REG_RT3                        12            /* 12 output registers on RT3
             */
#define N_REG_RT4                        1             /*  1  output . register  on
RT4          */

#define STS_REG                          0             /*  Input  Reg  0  is  status
request */
#define SYS_CTRL_REG               0              /* Output Reg 0 is always Ctrl Reg */

/*
 * Macros to access Control Register in the register array
 */
#define CTRL_REG_RT1             grwOutRegRt1[SYS_CTRL_REG]
#define CTRL_REG_RT2             grwOutRegRt2[SYS_CTRL_REG]
#define CTRL_REG_RT3             grwOutRegRt3[SYS_CTRL_REG]
#define CTRL_REG_RT4             grwOutRegRt4[SYS_CTRL_REG]
#define CTRL_REG_RT5             grwOutRegRt5[SYS_CTRL_REG]
#define CTRL_REG_RT6             grwOutRegRt6[SYS_CTRL_REG]

/*
 *      NOTES:  Since some of the different Memory areas now start on Page (16K)
 *                      boundaries instead of Segment (64K) boundaries, we must define a
 *                      an Base OFFSET as well as the SEGMENT. We may be able to combine
 *                      these into a long for far ptr assignment.
 *
 *                      Because the memory mapping is done through a table, the memory
 *                      addresses will remain constant even though we change from the
 *                      slot defined addressing scheme to the board defined scheme.
 *
 */
/*
 *      RT1 Memory Mapping
 */
#define RT1_REG_SEG                           (0x4000)
#define RT1_REG_OFF                           (0x4000)                /* RT1 Registers @ 0x4400
        */

#define RT1_REG_PTR                           (long) (0x40004000)     /* Ptr addr format */
/*
 *      RT2 Memory Mapping
 */
#define DATA_SEG                              (0x0000)
#define DATA_PTR                              (long) (0x00000000)     /* Ptr addr format */

#define RT2_REG_SEG                           (0x4000)
#define RT2_REG_OFF                           (0x0000)                /* RT2 Registers @ 0x4000
        */

#define RT2_REG_PTR                           (long) (0x40000000)     /* Ptr addr format */

#define COM_SEG                               (0x5000)
#define COM0_OFF                              (0x0000)                /* Com0 @ 0x5000 */
#define COM1_OFF                              (0x8000)                /* Com1 @ 0x5800 */

#define COM0_PTR                              (long) (0x50000000)     /* Ptr addr format */
#define COM1_PTR                              (long) (0x50008000)     /* Ptr addr format */

#define EEPROM_SEG                            (0x6000)
#define EEPROM_OFF                            (0x0000)                /* eeprom @ 0x6000 */
#define EEPROM_PTR                            (long) (0x60000000)     /* Ptr addr format */

#define ETHERNET_SEG                   (0x6000)
#define ETHERNET_OFF                   (0x8000)              /* ethernet @ 0x6800      */

/*
 *      RT3 (RT3 #1) Memory Mapping
 */
#define RT3_REG_SEG                           (0x4000)
#define RT3_REG_OFF                           (0x8000)                /* RT3 Registers @ 0x4800
        */

#define RT3_REG_PTR                           (long) (0x40008000)     /* Ptr addr format */

#define RT3_DISK_SEG                   (0x6000)
```

```
#define RT3_DISK_OFF          (0x4000)                /* RT3 Disk Ctrl @ 0x6400 */

#define RT3_DISK_PTR          (long) (0x60004000)     /* Ptr addr format        */

#define RT3_VRAM_SEG          (0x8000)

#define RT3_VRAM_PTR          (UINT32) (0x80000000)   /* ptr addr format */
#define RT3_BD_BASE                   (UINT32) (0x00200000)
/*
 *      RT4 (RT4 #1) Memory Mapping
 */
#define RT4_REG_SEG                   (0x4000)
#define RT4_REG_OFF                   (0xc000)                /* RT4 Registers @ 0x4c00
        */

#define RT4_REG_PTR                   (long) (0x4000c000)     /* Ptr addr format */

/*
 *      RT5 (RT3 #2) Memory Mapping
 */
#define RT5_REG_SEG                   (0x5000)
#define RT5_REG_OFF                   (0x4000)                /* RT5 Registers @ 0x5400
        */

#define RT5_REG_PTR                   (long) (0x50004000)     /* Ptr addr format */

#define RT5_DISK_SEG          (0x6000)
#define RT5_DISK_OFF          (0xc000)                /* RT5 Disk Ctrl @ 0x6c00 */

#define RT5_DISK_PTR          (long) (0x6000c000)     /* Ptr addr format        */

#define RT5_VRAM_SEG          (0x9000)

#define RT5_VRAM_PTR          (UINT32) (0x90000000)   /* ptr addr format */
#define RT5_BD_BASE                   (UINT32) (0x00900000)

/*
 *      RT6 (RT4 #2) Memory Mapping
 */
#define RT6_REG_SEG                   (0x5000)
#define RT6_REG_OFF                   (0xc000)                /* RT6 Registers @ 0x5c00
        */

#define RT6_REG_PTR                   (long) (0x5000c000)     /* Ptr addr format */

/*
 * Base address for all boards
 */
#define BASE_RT1                      0x0001
#define BASE_RT2                      0x0000
#define BASE_RT3                      0x0002
#define BASE_RT4                      0x0007
#define BASE_RT5                      0x0009
#define BASE_RT6                      0x000e

/*
 * These might work to read and write the registers
 */
#define BYTE_PTR(addr)        ( (SINT8  far *) ( (long) addr) )
#define WORD_PTR(addr)        ( (SINT16 far *) ( (long) addr) )


#define ABS_ADDR(seg, off)    ((UINT16 far *)((((long) (seg)) << 16) | (long) (off)))

/*
 *      RT1 Register Definitions
 */
#define RT1_CTRL_REG_DFT      0x0000          /* Uses slot addressing        */

/*
 *      RT2 Register Definitions
 */

/* RT2 Status Register Masks          */
```

```
#define R2_BUSY_COM0                    0x0001
#define R2_FIELD_TYPE                   0x0002
#define R2_BUSY_COM1                    0x0004

#define R2_AUX0                                 (0x10)
#define R2_AUX1                                 (0x20)
#define R2_AUX2                                 (0x40)
#define R2_AUX3                                 (0x80)

/* RT2 Control Register Masks           */
#define R2_TESTPASS                             0x0001
#define R2_RESET                                0x0002

#define R2_GPI0                                 (0x10)
#define R2_GPI1                                 (0x20)
#define R2_GPI2                                 (0x40)
#define R2_GPI3                                 (0x80)

#define R2_TP1                                  (0x1000)
#define R2_TP2                                  (0x2000)
#define R2_TP3                                  (0x4000)
#define R2_TP4                                  (0x8000)

#define RT2_CTRL_REG_DFT                R2_TESTPASS


/*
 *      RT3 Register Definitions
 */

#define R3_DISK_CTRL_BUSY               0x0400
#define R_LOOPBACK                              0x00e0


#if 0   /* JOHN VRAM */
                        #define RT3_CTRL_REG_DFT                0x4400          /* Uses slot
addressing              */
                        #define RT5_CTRL_REG_DFT                0x4400          /* Uses slot
addressing              */
#else   /* JOHN VRAM */
#define RT3_CTRL_REG_DFT                0x4C00          /* Uses slot addressing         */
#define RT5_CTRL_REG_DFT                0x4C00          /* Uses slot addressing         */
#endif  /* JOHN VRAM */

/*
 *      RT4 Register Definitions
 */
#define RT4_CTRL_REG_DFT                0x0000          /* Uses slot addressing         */
#define RT6_CTRL_REG_DFT                0x0000          /* Uses slot addressing         */

#define RT1                                             0
#define RT2                                             1
#define RT3                                             2
#define RT4                                             3
#define RT5                                             4
#define RT6                                             5

#define N_BD_MAX                                6

#define SLOT1                                   0
#define SLOT2                                   1
#define SLOT3                                   2
#define SLOT4                                   3
#define SLOT5                                   4
#define SLOT6                                   5

#define N_SLOT_MAX                              6

#define S_EEPROM                                0x1fff                  /* 8K - 1 */
#define EEPROM_TEST_ADDR                0x1fff          /* last addr in eeprom */
#define EEPROM_INIT_BYTE                0x42            /* just a random number */


/*
```

```
 * Interrupt enable masks
 */
#define INTR_ENA_TIMER0             (1 << 0)
#define INTR_ENA_TIMER1             (1 << 2)
#define INTR_ENA_VERT               (1 << 4)
#define INTR_ENA_FD                         (1 << 5)

#define INTR_ENA_RTD            (~(INTR_ENA_FD + INTR_ENA_VERT + INTR_ENA_TIMER0) )
/*
 * Base address and all offsets for the Video Board hardware registers
 */
#define BASE_VRAM_RT3               0xD00000

/* !! To verify BASE_VRAM_RT3, RT3_VRAM_PTR, RT3_BD_PTR   */
#define S_VRAM_Y_EACH_FIELD         0x80000
#define S_VRAM_C_EACH_FIELD         0x80000
#define S_VRAM_EACH_FIELD           0x100000        /* 2 * 256K words (1Y & 1C)      */
#define S_VRAM_EACH_FRAME           0x200000        /* ie. size of a framestore      */
#define FS1_Y1_OFFSET               (UINT32) (0x00100000)
#define FS1_C1_OFFSET               (UINT32) (0x00180000)
#define FS1_Y2_OFFSET               (UINT32) (0x00200000)
#define FS1_C2_OFFSET               (UINT32) (0x00280000)
#define FS2_Y1_OFFSET               (UINT32) (0x00300000)
#define FS2_C1_OFFSET               (UINT32) (0x00380000)
#define FS2_Y2_OFFSET               (UINT32) (0x00400000)
#define FS2_C2_OFFSET               (UINT32) (0x00480000)
/*
 * Frame store 1 & 2
 */
#define FS1                                 0
#define FS2                                 1
/*
 * Mneumonic register names to replace register numbers
 */
#define STS_REG                         0
#define SYS_CTRL_REG                0
#define TIMING_REG                      1
#define IO_CTRL_REG                     2
#define FS_CTRL_REG                     3

#define VI_Y_LINE1_REG              4               /* Y vertical interpolator, line 1*/
#define VI_Y_LINE2_REG              5               /* Y vertical interpolator, line 2*/
#define VI_Y_LINE3_REG              6               /* Y vertical interpolator, line 3*/
#define VI_Y_LINE4_REG              7               /* Y vertical interpolator, line 4*/

#define VI_C_LINE1_REG              8               /* C vertical interpolator, line 1*/
#define VI_C_LINE2_REG              9               /* C vertical interpolator, line 2*/
#define VI_C_LINE3_REG              10              /* C vertical interpolator, line 3*/
#define VI_C_LINE4_REG              11              /* C vertical interpolator, line 4*/

/*
 * VIDEO BOARD WRITE REGISTERS BIT FLAG DEFINITIONS
 *
 * System Control Register
 */
#define B_BD_BASE_ADDR                  0x000F  /* Bits 0..3                  */
#define F_USE_BASE_ADDR                 0x0010
#define B_LOOPBACK_TEST                 0x00E0  /* Bits 5..7                  */
#define F_10_TO_8_BITS                  0x0100
#define F_D1_SERIAL_IN                  0x0200
#define F_D1_VS_AD_IN                   0x0400
#define F_3_LINE_DELAY_VI               0x0800  /* 3-line delay vertical interp  */
#define F_ENABLE_VERT_INTERP        0x1000
#define F_REPLACE_C_WITH_Y              0x2000
#define F_NTSC                                  0x4000
#define F_ENABLE_FS_EDAC                0x8000
/*
 * Timing Register
 */
#define B_SYSTEM_DELAY                  0x00FF  /* Bits 0..7                  */
#define B_FS1_TIMING                    0x0700  /* Bits 8..10                 */
#define V_FS1_NO_ACTIVITY               0x0000  /* FS1 no sequential activity */
#define V_FS1_INPUT_TO_FS               0x0100  /* Write FS1 from input       */
#define V_FS1_DISK_TO_FS_NORM       0x0200  /* Write FS1 from disk, normal   */
#define V_FS1_DISK_TO_FS_BROWSE     0x0300  /* Write FS1 from disk, browse   */
```

```
#define V_FS1_READ_FROM_FS_NORM         0x0400  /* Read From FS1, normal       */
#define V_FS1_READ_FROM_FS_DELAY        0x0500  /* Read with one-line delay    */
#define B_FS2_TIMING                            0x3800  /* Bits 11..13                  */
#define V_FS2_NO_ACTIVITY                       0x0000  /* FS2 no sequential activity   */
#define V_FS2_INPUT_TO_FS                       0x0800  /* Write FS2 from input         */
#define V_FS2_DISK_TO_FS_NORM           0x1000  /* Write FS2 from disk, normal  */
#define V_FS2_DISK_TO_FS_BROWSE         0x1800  /* Write FS2 from disk, browse  */
#define V_FS2_READ_FROM_FS_NORM         0x2000  /* Read From FS2, normal        */
#define V_FS2_READ_FROM_FS_DELAY        0x2800  /* Read with one-line delay     */
#if 1   /* JOHN VRAM */
#define V_RESET_FS1                                     0x4000  /*  Used  to  reset/load  FS1
controller */
#define V_RESET_FS2                                     0x8000  /*  Used  to  reset/load  FS1
controller */
#endif  /* JOHN VRAM */
/*
 * I/O Control Register
 */
#define F_TBC_OUT_TO_FS                         0x0001
#define F_TBC_OUT_XOVR_TO_FS            0x0002
#define F_TBC_IN_FROM_FS                0x0004
#define F_TBC_IN_XOVR_FROM_FS           0x0008
#define F_DISK_TO_FS                            0x0010
#define F_INPUT_TO_FS                           0x0020
#define F_PASS_Y_TO_OUT                         0x0040
#define F_PASS_C_TO_OUT                         0x0080
#define B_HEAD_SWAP                                     0x0F00  /* Bits 8..11           */
#define B_DISK_XOVR_DIR                         0x3000  /* Bits 12..13                  */
#define F_KEY_MUX                                       0x4000
#define F_TBC_TEST                                      0x8000
/*
 * FS Control Register
 */
#define F_FS1_C9                                        0x0001
#define F_FS1_R9                                        0x0002
#define F_FS1_LOAD                                      0x0004
#define F_FS1_SPECIAL_CHR                       0x0008  /* Special Chroma addr mode     */
#define F_FS1_SEQ_WRITE                         0x0010
#define F_FS1_SEQ_READ                          0x0020
#define F_FS1_SEQ_BYPASS                0x0040
#define F_FS1_FIELD_2                           0x0080
#define F_FS2_C9                                        0x0100
#define F_FS2_R9                                        0x0200
#define F_FS2_LOAD                                      0x0400
#define F_FS2_SPECIAL_CHR                       0x0800  /* Special Chroma addr mode     */
#define F_FS2_SEQ_WRITE                         0x1000
#define F_FS2_SEQ_READ                          0x2000
#define F_FS2_SEQ_BYPASS                0x4000
#define F_FS2_FIELD_2                           0x8000

/*
 * 10 bit expanded memory mapping definitions
 */
#define RT2_RAM_BASE            0x0000
#define RT2_REG                         0x0010
#define RT2_COM0                        0x0014
#define RT2_COM1                        0x0016
#define RT2_EEPROM                      0x0018
#define RT2_ETHERNET            0x001A
#define RT2_EPROM_BASE          0x0030

/*

 * Addresses for slot addressing
 */
#define RT1_REG_SLOT            0x0200
#define RT3_REG_SLOT            0x0280
#define RT4_REG_SLOT            0x02c0
#define RT5_REG_SLOT            0x0300
#define RT6_REG_SLOT            0x0340

#define RT3_DISK_SLOT           0x02a0
#define RT5_DISK_SLOT           0x0320
```

```
/*
 * Addresses for base addressing
 */
#define RT1_REG_BASE            0x0040
#define RT3_REG_BASE            0x0080
#define RT4_REG_BASE            0x01c0
#define RT5_REG_BASE            0x0240
#define RT6_REG_BASE            0x0380

#define RT3_DISK_BASE           0x00a0
#define RT5_DISK_BASE           0x0260

#define CNT_TIMER0                      2000        /*  1 ms timer delay (16MHz /8)   */

#if 0          /* for testing only */
#define CNT_TIMER1                      1000        /*  500uS timer delay (16MHz /8) */
#else          /* for testing only */
#define CNT_TIMER1                      33333       /*  16.66mS timer delay (16MHz /8) */
#define CNT_TIMER2                      66666       /*  33.33mS timer delay (16MHz /8) */
#endif         /* for testing only */

#define BASE_VECTOR_ICU         32
#define S_INTR_VECTOR           1
#define register                                        /* !! What for          */

#define INTR_VECTOR_NMI         (0                      + S_INTR_VECTOR * 2)
#define INTR_VECTOR_TIMER0      (BASE_VECTOR_ICU + S_INTR_VECTOR * 0)
#define INTR_VECTOR_TIMER1      (BASE_VECTOR_ICU + S_INTR_VECTOR * 2)
#define INTR_VECTOR_FIELD       (BASE_VECTOR_ICU + S_INTR_VECTOR * 4)
#define INTR_VECTOR_FRAME       (BASE_VECTOR_ICU + S_INTR_VECTOR * 5)
#define INTR_VECTOR_MEMORY      50

#define END_OF_CMD(x)           ((x)=='\r')
#define WHITE_SPACE(x)          ((x==' ')||(x=='\n')||(x=='\t')||(x=='\r'))
#define PRINTABLE(x)            ((x<='~')&&(x>=' '))
#define NUMBER(x)                       ((x>='0')&&(x<='9'))
#define HEX_DIGIT(x)            (NUMBER(x) || ((x>='A')&&(x<='F')))

extern  UINT8 volatile   gbFieldType;

extern  UINT16           grwOutRegRt1[];
extern  UINT16           grwOutRegRt2[];
extern  UINT16           grwOutRegRt3[];
extern  UINT16           grwOutRegRt4[];
extern  UINT16           grwOutRegRt5[];
extern  UINT16           grwOutRegRt6[];

extern  UINT32           grlRegAddr[];
extern  FLAG             grfBdPresent[];

#endif


/*
 *-----------------------------------------------------------------------
 *  rlock.h      Copyright 1991 Accom Inc.
 *
 *      Responsible Person: Kevin Hsu
 *
 *      This file contains routines for lock list management.
 *-----------------------------------------------------------------------
 */
#ifndef _RLOCK
#define _RLOCK


UINT8   bCurrLockNo;
UINT8   bHighLightedLockNo;
FLAG    fDontDispLock = FALSE;


#endif  /* End of header file */


/*
```

```
 *----------------------------------------------------------------------
 *  rmacro.h    Copyright 1991 Accom Inc.
 *
 *      Responsible Person: Kevin Hsu
 *
 *      This file contains defines for macro management.
 *----------------------------------------------------------------------
 */
#ifndef _RMACRO
#define _RMACRO

static  TICK    lMacroTimeLapse;

/* Encoder rerun related */
static  UINT32          lFirstTick = 0L;
static  UINT16          wDeltaTick;
static  UINT16          wRemainEvent;
static  SINT16          wRemainPulse;
static  UINT16          wcntEvents = 0;

static  UINT8           rcMacroBtnMsgPacket[6] =
{
        ORIGINATOR,
        '0',
        '0',
        '0',
        TERMINATOR,
        NULL
};

static  UINT8           rcMacroKnobMsgPacket[9] =
{
        ORIGINATOR,
        '0',
        '0',
        '0',
        '0',
        '0',
        '0',
        TERMINATOR,
        NULL
};

static  UINT8           disp[2] =
{
        '\0',
        '\0'
};                      /* debug display, to be removed */
static UINT8            bCurrMacroListNo = 1;

#endif  /* End of header file */


/*
 *----------------------------------------------------------------------
 *  rmenu.h             Copyright 1991 Accom Inc.
 *
 *      Responsible Person: Kevin Hsu
 *----------------------------------------------------------------------
 */

#ifndef _RMENU
#define _RMENU

/*
 *      externals
 */
extern void ExchangeProcess( HARD_KEY * );
extern void StartProcess( HARD_KEY * );
/*
**      menu handlers
*/
static void NormInit( void );
static void NormProcess( MAIN_EVENT * );
```

```
static void UserSetupInit( void );
static void UserSetupProcess( MAIN_EVENT * );

static void DisplaySetupInit( void );
static void DisplaySetupProcess( MAIN_EVENT * );

static void SegInit( void );
static void SegProcess( MAIN_EVENT * );

static void OutputSetupInit( void );
static void OutputSetupProcess( MAIN_EVENT * );

static void InputSetupInit( void );
static void InputSetupProcess( MAIN_EVENT * );

static void CineInit( void );
static void CineProcess( MAIN_EVENT * );

static void ClipInit( void );
static void ClipProcess( MAIN_EVENT * );

static void RemarkClipInit( void );
static void RemarkClipProcess( MAIN_EVENT * );

static void DiagTestInit( void );
static void DiagTestProcess( MAIN_EVENT * );

static void BackupInit( void );
static void BackupProcess( MAIN_EVENT * );

static void RecordSetupInit( void );
static void RecordSetupProcess( MAIN_EVENT * );

static void AudioSetupInit( void );
static void AudioSetupProcess( MAIN_EVENT * );

static void TCodeSetupInit( void );
static void TCodeSetupProcess( MAIN_EVENT * );

static void RmoteSetupInit( void );

static void RmoteSetupProcess( MAIN_EVENT * );

static void GPISetupInit( void );
static void GPISetupProcess( MAIN_EVENT * );

static void DubDumpInit( void );
static void DubDumpProcess( MAIN_EVENT * );

static void RecordLockInit( void );
static void RecordLockProcess( MAIN_EVENT * );

static void MacroInit( void );
static void MacroProcess( MAIN_EVENT * );

static void MacroListInit( void );
static void MacroListProcess( MAIN_EVENT * );

static void SegEditInit( void );
static void SegEditProcess( MAIN_EVENT * );

static void SegListInit( void );
static void SegListProcess( MAIN_EVENT * );

static void MacroEditInit( void );
static void MacroEditProcess( MAIN_EVENT * );

static void ClipEditInit( void );
static void ClipEditProcess( MAIN_EVENT * );

static void ClipListInit( void );
static void ClipListProcess( MAIN_EVENT * );

UINT8 *rpstrDispErrorMsg[] =
{
```

```
        "    Out of Limit !!!             ",  /*  1  */
        "    Illegal entry !!!            "   /*  2  */
};

#endif


/*
 *---------------------------------------------------------------------------
 *  rmode.h     Copyright 1991 Accom Inc.
 *
 *  Responsible Person: Kevin Hsu
 *
 *      This file includes the ENUM definitions of modes or types of function
 *      selected through menus or submenus.
 *
 *---------------------------------------------------------------------------
 */
#ifndef _RMODE
#define _RMODE

typedef enum
{
        RECORD_STP_MENU,
        INPUT_STP_MENU,
        AUDIO_STP_MENU,
        TCODE_STP_MENU,
        RMOTE_STP_MENU,
        OUTPUT_STP_MENU,
        USER_STP_MENU,
        CINE_MENU,
        NORM_MENU,
        RECORD_LOK_MENU,
        DUB_DUMP_MENU,
        MARK_CLIP_MENU,
        CLIP_MENU,
        SEG_MENU,
        MACRO_MENU,
        SEG_EDIT_MENU,

        END_MENU

}       MENU;

enum
{
        SOFT_1,
        SOFT_2,
        SOFT_3,
        SOFT_4,
        SOFT_5
};

/*
 * Output Setup Menu Field String Arrays
 */
UINT8 *prstrOutputNum[2] =
{
        "   #1   ",
        "   #2   "
};

UINT8 *prstrHtiming[2] =
{
        " +1000 ",
        " -1000 "
};

UINT8 *prstrOutputBit[2] =
{
        "  8-bit ",
        " 10-bit "
};
```

```
UINT8 *prstrToggle[2] =
{
        "  ON   ",
        "  OFF  "
};

/*
 * input Setup Menu Field String Arrays
 */
UINT8 *prstrInput[2] =
{
        "   #1   ",
        "   #2   "
};

UINT8 *prstrSource[3] =
{
        "Digital",
        "Analog ",
        "Disk # "
};

UINT8 *prstrVidKey[2] =
{
        " Video  ",
        "  key   "
};

UINT8 *prstrType[4] =
{
        "60 Fld ",
        "30 Frm ",
        "24F 3:2",
        "24F 2:2"
};

UINT8 *prstrRefSync[5] =
{
        " RefIN  ",
        "AnaKey 1",
        "AnaKey 2",
        "DigVid 1",
        "DigVid 2"
};

/*
 * Play mode
 */
UINT8 *prstrPlayMode[4] =
{
        "NORM",
        "CLIP",
        "SEGS",
        "CINE"
};

enum
{
        NORM_PLAY,
        CLIP_PLAY,
        SEGS_PLAY,
        CINE_PLAY
};

/*
 * TCode Setup Menu Field String Arrays
 */
UINT8 *prstrTCodeFormat[2] =
{
        "  VITC  ",
        "  LTC   "
};

UINT8 *prstrTCode[2] =
{
```

```
        "VITC",
        " LTC"
};

UINT8 *prstrSource1[2] =
{
        "Digit ",
        "Analg "
};

UINT8 *prstrVidKey1[2] =
{
        "Video",
        "key  "
};

UINT8 *prstrType1[4] =
{
        "-60 Field",
        "-30 Frame",
        "-24F 3:2 ",
        "-24F 2:2 "
};


/*
 * Clip play Menu Field String Arrays
 */




/*
 * Cine play Menu Field String Arrays
 */
UINT8 *prstrCineOutput[2] =
{
        "24F 3:2 ",
        "24F 2:2 "
};

/*
 * User setup sub menu Field String Arrays
 */
UINT8 *prstrCounter[3] =
{
        " Fields ",
        " Frames ",
        " Off    "
};

enum
{
        COUNTER_FIELD,
        COUNTER_FRAME,
        COUNTER_OFF
};


/*
 * REMOTE SETUP
 */

enum port_no gePortNo = PORT1;
UINT8 *rstrPortNo[] =
{
        "   1   ",
        "   2   ",
        "   3   ",
        "   4   "
};
```

```
enum protocol geProtocol = AMPEX;
UINT8 *rstrProtocol[] =
{
        "  AMPEX ",
        "  SONY  ",
        "  SMPTE ",
        "  CMX   "
};

enum fld_dom geFldDom = FIELD_1;
UINT8 *rstrFldDom[] =
{
        " Field1 ",
        " Field2 ",
        "  None  "
};

enum output_mode geOutputMode = OUT_MODE_AUTO_FR;
UINT8 *rstrOutputMode[] =
{
        "AutoFrm ",
        " Frame  ",
        " Field  ",
        "IntrpFld",
        "Film2:2 ",
        "Film3:2 ",
        " Bypass "
};

enum toggle              /* for general selection */
{
        TOGGLE_ON,
        TOGGLE_OFF
};

enum toggle eVideo;
enum toggle geViEnabled = TOGGLE_OFF;

#if 0           /* duplicate definition */
UINT8 *rstrToggle[] =
{
        "  On   ",
        "  Off  "
};
#endif

enum audio               /* SOFT3 */
{
        AUDIO_OFF,
        AUDIO_1,
        AUDIO_2,
        AUDIO_BOTH
} eAudio;
UINT8 *rstrAudio[] =
{
        "  Off   ",
        " Chan1  ",
        " Chan2  ",
        "  Both  "
};

/*
 * The template to define a new soft key choice.
 *              enum name                * SOFT *
 *              {
 *                      ,
 *              };
 *              enum name geName = ;
 *              UINT8 *rstrName[] =
 *              {
 *                      "       ",
 *              };
 *
 */

#endif
```

```
/*
 *------------------------------------------------------------------------
 *  rsegment.h  Copyright 1991 Accom Inc.
 *
 *      Responsible Person: Kevin Hsu
 *
 *      This file contains defines and definitions of variables and functions for
 *      segment management.
 *------------------------------------------------------------------------
 */
#ifndef _RSEGMENT
#define _RSEGMENT

/*
 * MACRO for link list management.
 */
#define PREVSEG                 ( psSegmentMember->psPrev )
#define NEXTSEG                 ( psSegmentMember->psNext )

static SEGMENT sBuffer =
{
        NULL,
        NULL,
        0,
        0,
        0,
        "- ",
        "60f",
        NULL,
        NULL
};

static UINT8    biMode = 1;
static UINT8    biProfile = 1;
static UINT8    bCurrListNo = 1;
static UINT16   wTotalLen = 0;

static SEGMENT  *psListHead = NULL;
static SEGMENT  *psListTail = NULL;
static SEGMENT  *psHighLight = NULL;

static struct   list
{
        UINT16  wLen;
        SEGMENT *psListHead;
        SEGMENT *psListTail;
        SEGMENT *psHighLight;

} rsListInfo[ TOTAL_LISTS ];

#endif  /* End of file */


/*
 *------------------------------------------------------------------------
 *  rtime.h     Copyright right 1991 Accom Inc.
 *
 *      Responsible Person: Jeffrey Wu
 *
 *  This file defines the time code related structures.
 *
 *------------------------------------------------------------------------
 */
#ifndef _RTIME
#define _RTIME

struct  tc
{
        SINT32  lFieldNo;
        FLAG    fDropFrame;
        FLAG    fUndef;
};

/*
 * Legal values returned by TcCmp()
```

```
 */
#define TC_CMP_1ST_ST_2ND          0
#define TC_CMP_1ST_EQ_2ND          1
#define TC_CMP_1ST_GT_2ND          2
#define TC_CMP_1ST_UNDEFINED    3
#define TC_CMP_2ND_UNDEFINED    4

#define TC_UNDEF_VALUE                                                    \
                                   {                                      \
                                   0x0F,   0x03,   0x01,   0x01,          \
                                   0x0F,   0x07,   0x01,                  \
                                   0x0F,   0x07,   0x00,                  \
                                   0x0F,   0x03,   0x00                   \
                                   }
#define TC_ASSIGN( tc, bHour, bMinute, bSecond, bFrame )                  \
                                   {                                      \
                                   LOWORD(tc)    = (bFrame)    |    (bSecond) <<
8);                      \
                                   HIWORD(tc)    = (bMinute)   |    (bHour)  <<
8);                         \
                                   }

#define TcSubFc( tc, lcntField, pTcRet )                                  \
                                                              TcAddFc(   (tc),
-(lcntField), (pTcRet) )
#define TcDec( tc )      TcAddFc( (tc), -1L, &(tc) )
#define TcInc( tc )      TcAddFc( (tc), 1L, &(tc) )

/*
-* PAL/SECAM defines ( NO Drop Frame )
 */
#define N_FR_FOR_1SEC_50HZ                  25L
#define N_FR_FOR_2SEC_50HZ                  (2  * N_FR_FOR_1SEC_50HZ )
#define N_FR_FOR_4SEC_50HZ                  (4  * N_FR_FOR_1SEC_50HZ )
#define N_FR_FOR_8SEC_50HZ                  (8  * N_FR_FOR_1SEC_50HZ )
#define N_FR_FOR_10SEC_50HZ                 (10 * N_FR_FOR_1SEC_50HZ )
#define N_FR_FOR_20SEC_50HZ                 (20 * N_FR_FOR_1SEC_50HZ )
#define N_FR_FOR_40SEC_50HZ                 (40 * N_FR_FOR_1SEC_50HZ )

#define N_FR_FOR_1MIN_50HZ                  (60 * N_FR_FOR_1SEC_50HZ )
#define N_FR_FOR_2MIN_50HZ                  (2  * N_FR_FOR_1MIN_50HZ )
#define N_FR_FOR_4MIN_50HZ                  (4  * N_FR_FOR_1MIN_50HZ )
#define N_FR_FOR_8MIN_50HZ                  (8  * N_FR_FOR_1MIN_50HZ )
#define N_FR_FOR_10MIN_50HZ                 (10 * N_FR_FOR_1MIN_50HZ )
#define N_FR_FOR_20MIN_50HZ                 (20 * N_FR_FOR_1MIN_50HZ )
#define N_FR_FOR_40MIN_50HZ                 (40 * N_FR_FOR_1MIN_50HZ )

#define N_FR_FOR_1HR_50HZ                   (60 * N_FR_FOR_1MIN_50HZ )
#define N_FR_FOR_2HR_50HZ                   (2  * N_FR_FOR_1HR_50HZ  )
#define N_FR_FOR_4HR_50HZ                   (4  * N_FR_FOR_1HR_50HZ  )
#define N_FR_FOR_8HR_50HZ                   (8  * N_FR_FOR_1HR_50HZ  )
#define N_FR_FOR_10HR_50HZ                  (10 * N_FR_FOR_1HR_50HZ  )
#define N_FR_FOR_20HR_50HZ                  (20 * N_FR_FOR_1HR_50HZ  )

#define N_FR_FOR_1DAY_50HZ                  (24 * N_FR_FOR_1HR_50HZ  )

/*
 * NTSC full frame
 */
#define N_FR_FOR_1SEC_60HZ                  30L
#define N_FR_FOR_1MIN_60HZ_FF          (60 * N_FR_FOR_1SEC_60HZ    )
#define N_FR_FOR_2MIN_60HZ_FF          (2  * N_FR_FOR_1MIN_60HZ_FF )
#define N_FR_FOR_4MIN_60HZ_FF          (4  * N_FR_FOR_1MIN_60HZ_FF )
#define N_FR_FOR_8MIN_60HZ_FF          (8  * N_FR_FOR_1MIN_60HZ_FF )
#define N_FR_FOR_10MIN_60HZ_FF         (10 * N_FR_FOR_1MIN_60HZ_FF )
#define N_FR_FOR_20MIN_60HZ_FF         (20 * N_FR_FOR_1MIN_60HZ_FF )
#define N_FR_FOR_40MIN_60HZ_FF         (40 * N_FR_FOR_1MIN_60HZ_FF )
#define N_FR_FOR_1HR_60HZ_FF           (60 * N_FR_FOR_1MIN_60HZ_FF )
#define N_FR_FOR_2HR_60HZ_FF           (2  * N_FR_FOR_1HR_60HZ_FF  )
#define N_FR_FOR_4HR_60HZ_FF           (4  * N_FR_FOR_1HR_60HZ_FF  )
#define N_FR_FOR_8HR_60HZ_FF           (8  * N_FR_FOR_1HR_60HZ_FF  )
#define N_FR_FOR_10HR_60HZ_FF          (10 * N_FR_FOR_1HR_60HZ_FF  )
#define N_FR_FOR_20HR_60HZ_FF          (20 * N_FR_FOR_1HR_60HZ_FF  )
#define N_FR_FOR_1DAY_60HZ_FF          (24 * N_FR_FOR_1HR_60HZ_FF  )
```

```
/*
 * NTSC drop frame
 * drop 2 frames per minute, except every 10 minutes
 */
#define N_FR_FOR_1SEC_60HZ              30L
#define N_FR_FOR_1MIN_60HZ_DF        ( (60 * N_FR_FOR_1SEC_60HZ ) - 2 )
#define N_FR_FOR_2MIN_60HZ_DF        (2  * N_FR_FOR_1MIN_60HZ_DF)
#define N_FR_FOR_4MIN_60HZ_DF        (4  * N_FR_FOR_1MIN_60HZ_DF)
#define N_FR_FOR_8MIN_60HZ_DF        (8  * N_FR_FOR_1MIN_60HZ_DF)
#define N_FR_FOR_10MIN_60HZ_DF       ( (10 * N_FR_FOR_1MIN_60HZ_DF) + 2 )
#define N_FR_FOR_20MIN_60HZ_DF       (2  * N_FR_FOR_10MIN_60HZ_DF)
#define N_FR_FOR_40MIN_60HZ_DF       (4  * N_FR_FOR_10MIN_60HZ_DF)
#define N_FR_FOR_1HR_60HZ_DF         (6  * N_FR_FOR_10MIN_60HZ_DF)
#define N_FR_FOR_2HR_60HZ_DF         (2  * N_FR_FOR_1HR_60HZ_DF)
#define N_FR_FOR_4HR_60HZ_DF         (4  * N_FR_FOR_1HR_60HZ_DF)
#define N_FR_FOR_8HR_60HZ_DF         (8  * N_FR_FOR_1HR_60HZ_DF)
#define N_FR_FOR_10HR_60HZ_DF        (10 * N_FR_FOR_1HR_60HZ_DF)
#define N_FR_FOR_20HR_60HZ_DF        (20 * N_FR_FOR_1HR_60HZ_DF)
#define N_FR_FOR_1DAY_60HZ_DF        (24 * N_FR_FOR_1HR_60HZ_DF)

/*
 * Seconds is independent of DF/FF issue. Frames is unnecessary to define.
 */
#define N_FR_FOR_2SEC_60HZ              (2  * N_FR_FOR_1SEC_60HZ )
#define N_FR_FOR_4SEC_60HZ              (4  * N_FR_FOR_1SEC_60HZ )
#define N_FR_FOR_8SEC_60HZ              (8  * N_FR_FOR_1SEC_60HZ )
#define N_FR_FOR_10SEC_60HZ             (10 * N_FR_FOR_1SEC_60HZ )
#define N_FR_FOR_20SEC_60HZ             (20 * N_FR_FOR_1SEC_60HZ )
#define N_FR_FOR_40SEC_60HZ             (40 * N_FR_FOR_1SEC_60HZ )

/*
 * Fields macro
 */
#define N_FD_FOR_1SEC_50HZ              (2  * N_FR_FOR_1SEC_50HZ )
#define N_FD_FOR_1MIN_50HZ              (2  * N_FR_FOR_1MIN_50HZ )
#define N_FD_FOR_1HR_50HZ               (2  * N_FR_FOR_1HR_50HZ        )

#define N_FD_FOR_1MIN_60HZ_FF        (2  * N_FR_FOR_1MIN_60HZ_FF )
#define N_FD_FOR_1HR_60HZ_FF         (2  * N_FR_FOR_1HR_60HZ_FF       )

#define N_FD_FOR_1MIN_60HZ_DF        (2  * N_FR_FOR_1MIN_60HZ_DF )
#define N_FD_FOR_10MIN_60HZ_DF       (2  * N_FR_FOR_10MIN_60HZ_DF)
#define N_FD_FOR_1HR_60HZ_DF         (2  * N_FR_FOR_1HR_60HZ_DF  )

#define N_FD_FOR_1SEC_60HZ              (2  * N_FR_FOR_1SEC_60HZ       )
/*
 * Macro definitions
 * 50 Hz ( No DF/FF issue )
 */
#define DO_20HR_50HZ(l,ch)                                                    \
if (l >= N_FR_FOR_20HR_50HZ)     { l -= N_FR_FOR_20HR_50HZ;      ch += 0x20; }

#define DO_10HR_50HZ(l,ch)                                                    \
if (l >= N_FR_FOR_10HR_50HZ)     { l -= N_FR_FOR_10HR_50HZ;      ch += 0x10; }

#define DO_8HR_50HZ(l,ch)                                                     \
if (l >= N_FR_FOR_8HR_50HZ)            { l -= N_FR_FOR_8HR_50HZ;       ch += 0x08; }

#define DO_4HR_50HZ(l,ch)                                                     \
if (l >= N_FR_FOR_4HR_50HZ)            { l -= N_FR_FOR_4HR_50HZ;       ch += 0x04; }

#define DO_2HR_50HZ(l,ch)                                                     \
if (l >= N_FR_FOR_2HR_50HZ)            { l -= N_FR_FOR_2HR_50HZ;       ch += 0x02; }

#define DO_1HR_50HZ(l,ch)                                                     \
if (l >= N_FR_FOR_1HR_50HZ)            { l -= N_FR_FOR_1HR_50HZ;       ch += 0x01; }



#define DO_40MIN_50HZ(l,ch)                                                   \
if (l >= N_FR_FOR_40MIN_50HZ) { l -= N_FR_FOR_40MIN_50HZ; ch += 0x40; }

#define DO_20MIN_50HZ(l,ch)                                                   \
if (l >= N_FR_FOR_20MIN_50HZ)    { l -= N_FR_FOR_20MIN_50HZ;     ch += 0x20; }
```

```
#define DO_10MIN_50HZ(l,ch)                                                    \
if (l >= N_FR_FOR_10MIN_50HZ)    { l -= N_FR_FOR_10MIN_50HZ;      ch += 0x10; }

#define DO_8MIN_50HZ(l,ch)                                                     \
if (l >= N_FR_FOR_8MIN_50HZ)     { l -= N_FR_FOR_8MIN_50HZ;       ch += 0x08; }

#define DO_4MIN_50HZ(l,ch)                                                     \
if (l >= N_FR_FOR_4MIN_50HZ)     { l -= N_FR_FOR_4MIN_50HZ;       ch += 0x04; }

#define DO_2MIN_50HZ(l,ch)                                                     \
if (l >= N_FR_FOR_2MIN_50HZ)     { l -= N_FR_FOR_2MIN_50HZ;       ch += 0x02; }

#define DO_1MIN_50HZ(l,ch)                                                     \
if (l >= N_FR_FOR_1MIN_50HZ)     { l -= N_FR_FOR_1MIN_50HZ;       ch += 0x01; }


#define DO_40SEC_50HZ(l,ch)                                                    \
if (l >= N_FR_FOR_40SEC_50HZ)    { l -= N_FR_FOR_40SEC_50HZ;      ch += 0x40; }

#define DO_20SEC_50HZ(l,ch)                                                    \
if (l >= N_FR_FOR_20SEC_50HZ)    { l -= N_FR_FOR_20SEC_50HZ;      ch += 0x20; }

#define DO_10SEC_50HZ(l,ch)                                                    \
if (l >= N_FR_FOR_10SEC_50HZ)    { l -= N_FR_FOR_10SEC_50HZ;      ch += 0x10; }

#define DO_8SEC_50HZ(l,ch)                                                     \
if (l >= N_FR_FOR_8SEC_50HZ)     { l -= N_FR_FOR_8SEC_50HZ;       ch += 0x08; }

#define DO_4SEC_50HZ(l,ch)                                                     \
if (l >= N_FR_FOR_4SEC_50HZ)     { l -= N_FR_FOR_4SEC_50HZ;       ch += 0x04; }

#define DO_2SEC_50HZ(l,ch)                                                     \
if (l >= N_FR_FOR_2SEC_50HZ)     { l -= N_FR_FOR_2SEC_50HZ;       ch += 0x02; }

#define DO_1SEC_50HZ(l,ch)                                                     \
if (l >= N_FR_FOR_1SEC_50HZ)     { l -= N_FR_FOR_1SEC_50HZ;       ch += 0x01; }


#define DO_20FR_50HZ(l,ch)                                                     \
if (l >= 20)                                     { l -= 20;       ch += 0x20; }

#define DO_10FR_50HZ(l,ch)                                                     \
if (l >= 10)                                     { l -= 10;       ch += 0x10; }

/*
 * 60 Hz, Drop Frame.
 */
#define DO_20HR_60HZ_DF(l,ch)                                                  \
if (l >= N_FR_FOR_20HR_60HZ_DF)  { l -= N_FR_FOR_20HR_60HZ_DF;    ch += 0x20; }

#define DO_10HR_60HZ_DF(l,ch)                                                  \
if (l >= N_FR_FOR_10HR_60HZ_DF)  { l -= N_FR_FOR_10HR_60HZ_DF;    ch += 0x10; }

#define DO_8HR_60HZ_DF(l,ch)                                                   \
if (l >= N_FR_FOR_8HR_60HZ_DF)   { l -= N_FR_FOR_8HR_60HZ_DF;     ch += 0x08; }

#define DO_4HR_60HZ_DF(l,ch)                                                   \
if (l >= N_FR_FOR_4HR_60HZ_DF)   { l -= N_FR_FOR_4HR_60HZ_DF;     ch += 0x04; }

#define DO_2HR_60HZ_DF(l,ch)                                                   \
if (l >= N_FR_FOR_2HR_60HZ_DF)   { l -= N_FR_FOR_2HR_60HZ_DF;     ch += 0x02; }

#define DO_1HR_60HZ_DF(l,ch)                                                   \
if (l >= N_FR_FOR_1HR_60HZ_DF)   { l -= N_FR_FOR_1HR_60HZ_DF;     ch += 0x01; }


#define DO_40MIN_60HZ_DF(l,ch)                                                 \
if (l >= N_FR_FOR_40MIN_60HZ_DF){ l -= N_FR_FOR_40MIN_60HZ_DF;    ch += 0x40; }
```

```
#define DO_20MIN_60HZ_DF(l,ch)                                                          \
if (l >= N_FR_FOR_20MIN_60HZ_DF){ l -= N_FR_FOR_20MIN_60HZ_DF;    ch += 0x20; }

#define DO_10MIN_60HZ_DF(l,ch)                                                          \
if (l >= N_FR_FOR_10MIN_60HZ_DF){ l -= N_FR_FOR_10MIN_60HZ_DF;    ch += 0x10; }

#define DO_8MIN_60HZ_DF(l,ch)                                                           \
if (l >= N_FR_FOR_8MIN_60HZ_DF){ l -= N_FR_FOR_8MIN_60HZ_DF;      ch += 0x08; }

#define DO_4MIN_60HZ_DF(l,ch)                                                           \
if (l >= N_FR_FOR_4MIN_60HZ_DF){ l -= N_FR_FOR_4MIN_60HZ_DF;      ch += 0x04; }

#define DO_2MIN_60HZ_DF(l,ch)                                                           \
if (l >= N_FR_FOR_2MIN_60HZ_DF){ l -= N_FR_FOR_2MIN_60HZ_DF;      ch += 0x02; }

/*
 * 60 Hz, Full Frame.
 */
#define DO_20HR_60HZ_FF(l,ch)                                                           \
if (l >= N_FR_FOR_20HR_60HZ_FF)  { l -= N_FR_FOR_20HR_60HZ_FF;    ch += 0x20; }

#define DO_10HR_60HZ_FF(l,ch)                                                           \
if (l >= N_FR_FOR_10HR_60HZ_FF)  { l -= N_FR_FOR_10HR_60HZ_FF;    ch += 0x10; }

#define DO_8HR_60HZ_FF(l,ch)                                                            \
if (l >= N_FR_FOR_8HR_60HZ_FF)   { l -= N_FR_FOR_8HR_60HZ_FF;     ch += 0x08; }

#define DO_4HR_60HZ_FF(l,ch)                                                            \
if (l >= N_FR_FOR_4HR_60HZ_FF)   { l -= N_FR_FOR_4HR_60HZ_FF;     ch += 0x04; }

#define DO_2HR_60HZ_FF(l,ch)                                                            \
if (l >= N_FR_FOR_2HR_60HZ_FF)   { l -= N_FR_FOR_2HR_60HZ_FF;     ch += 0x02; }

#define DO_1HR_60HZ_FF(l,ch)                                                            \
if (l >= N_FR_FOR_1HR_60HZ_FF)   { l -= N_FR_FOR_1HR_60HZ_FF;     ch += 0x01; }

#define DO_40MIN_60HZ_FF(l,ch)                                                          \
if (l >= N_FR_FOR_40MIN_60HZ_FF){ l -= N_FR_FOR_40MIN_60HZ_FF;    ch += 0x40; }

#define DO_20MIN_60HZ_FF(l,ch)                                                          \
if (l >= N_FR_FOR_20MIN_60HZ_FF){ l -= N_FR_FOR_20MIN_60HZ_FF;    ch += 0x20; }

#define DO_10MIN_60HZ_FF(l,ch)                                                          \
if (l >= N_FR_FOR_10MIN_60HZ_FF){ l -= N_FR_FOR_10MIN_60HZ_FF;    ch += 0x10; }

#define DO_8MIN_60HZ_FF(l,ch)                                                           \
if (l >= N_FR_FOR_8MIN_60HZ_FF)  { l -= N_FR_FOR_8MIN_60HZ_FF;    ch += 0x08; }

#define DO_4MIN_60HZ_FF(l,ch)                                                           \
if (l >= N_FR_FOR_4MIN_60HZ_FF)  { l -= N_FR_FOR_4MIN_60HZ_FF;    ch += 0x04; }

#define DO_2MIN_60HZ_FF(l,ch)                                                           \
if (l >= N_FR_FOR_2MIN_60HZ_FF)  { l -= N_FR_FOR_2MIN_60HZ_FF;    ch += 0x02; }

#define DO_1MIN_60HZ_FF(l,ch)                                                           \
if (l >= N_FR_FOR_1MIN_60HZ_FF)  { l -= N_FR_FOR_1MIN_60HZ_FF;    ch += 0x01; }

/*
 * 60 Hz, DF/FF common parts. ( ie. Seconds and frames )
 */
#define DO_40SEC_60HZ(l,ch)                                                             \
if (l >= N_FR_FOR_40SEC_60HZ)    { l -= N_FR_FOR_40SEC_60HZ;      ch += 0x40; }

#define DO_20SEC_60HZ(l,ch)                                                             \
if (l >= N_FR_FOR_20SEC_60HZ)    { l -= N_FR_FOR_20SEC_60HZ;      ch += 0x20; }

#define DO_10SEC_60HZ(l,ch)                                                             \
if (l >= N_FR_FOR_10SEC_60HZ)    { l -= N_FR_FOR_10SEC_60HZ;      ch += 0x10; }

#define DO_8SEC_60HZ(l,ch)                                                              \
if (l >= N_FR_FOR_8SEC_60HZ)     { l -= N_FR_FOR_8SEC_60HZ;       ch += 0x08; }

#define DO_4SEC_60HZ(l,ch)                                                              \
if (l >= N_FR_FOR_4SEC_60HZ)     { l -= N_FR_FOR_4SEC_60HZ;       ch += 0x04; }
```

```
#define DO_2SEC_60HZ(l,ch)                                                          \
if (l >= N_FR_FOR_2SEC_60HZ)      { l -= N_FR_FOR_2SEC_60HZ;       ch += 0x02; }

#define DO_1SEC_60HZ(l,ch)                                                          \
if (l >= N_FR_FOR_1SEC_60HZ)      { l -= N_FR_FOR_1SEC_60HZ;       ch += 0x01; }


#define DO_20FR_60HZ(l,ch)                                                          \
if (l >= 20)                                        { l -= 20;      ch += 0x20; }

#define DO_10FR_60HZ(l,ch)                                                          \
if (l >= 10)                                        { l -= 10;      ch += 0x10; }

/*
 * Timecode string type
 */
#define TC_STR_AMPEX     0
#define TC_STR_SONY             1
#define TC_STR_DISPLAY   2

extern  FLAG    gf60Hz;

#if     0       /* !! Save it for a while       */
/*
 * This struct occupies only a long word and is reversed, so that in the Intel
 * world, we will see a timecode like HH:MM:SS:FF( exactly what we want )
 * when we display a long word.
 */
struct tc

{
        UINT16  bFrameLow       :       4;      /* BCD Frame [0 ~ 29]                   */
        UINT16  bFrameHigh      :       2;
        UINT16  fDropFrame      :       1;      /* TRUE if df; FALSE if ff              */
        UINT16  fField2         :       1;      /* TRUE if field 2, FALSE if Field 1    */

        UINT16  bSecondLow      :       4;      /* BCD Second [0 ~ 59]                  */
        UINT16  bSecondHigh     :       3;
        UINT16  fUndef          :       1;      /* TRUE if undefined                    */

        UINT16  bMinuteLow      :       4;      /* BCD Minute [0 ~ 59]                  */
        UINT16  bMinuteHigh     :       3;
        UINT16  bUnusedMM       :       1;

        UINT16  bHourLow        :       4;      /* BCD Hour [0 ~ 23]                    */
        UINT16  bHourHigh       :       2;
        UINT16  bUnusedHH       :       2;
};

#endif

#endif


/*
 *-------------------------------------------------------------------------
 *  rui.h               Copyright 1991 Accom Inc.
 *
 *  Responsible Person: Kevin Hsu
 *
 *  This is a global header file.
 *  declarations of all RTD user interface functions
 *
 *-------------------------------------------------------------------------
 */
#ifndef _RUI
#define _RUI

#define NumEntries(array)               (sizeof(array) / sizeof(array[0]))

#if RTD
#define CHECK_WAIT_TIME  1200     /* SegEdit */
#else
#define CHECK_WAIT_TIME           100     /* SegEdit */
#endif
```

```
#define INCREASE                        0
#define DECREASE                        1
#define STEP_FWD_MIN            0
#define STEP_FWD_MAX            50
#define  STEP_FWD_PPQ           5               /* pulses per quantum */
#define STEP_REV_MIN            0
#define STEP_REV_MAX            50
#define  STEP_REV_PPQ           5               /* pulses per quantum */
#define PLAY_FWD_MIN            0
#define PLAY_FWD_MAX            50
#define  PLAY_FWD_PPQ           5               /* pulses per quantum */
#define PLAY_REV_MIN            0
#define PLAY_REV_MAX            50
#define  PLAY_REV_PPQ           5               /* pulses per quantum */

#define ENCODER                         '0'
static SINT16 StepFwdPercent = 0;
static SINT16 StepRevPercent = 0;

/*
**      Softkey field highlights

*/
#define NO_FIELDS               0x00
#define FIELD1                  0x01
#define FIELD2                  0x02
#define FIELD3                  0x04
#define FIELD4                  0x08
#define FIELD5                  0x10
#define FIELD_ON                '1'
#define FIELD_OFF               '0'

#define NUM_OF_LEDS             40
#define HI_DELAY_TIME    150            /* 5 seconds = 150 frames */

#define VERSION                 1               /* main unit software version  */
#define MAXSTRING               42              /* # characters in display */
#define BANNERSPEED             200             /* banner speed */
#define DISPTIMEOUT             5               /* # minutes of unuse until display will time
out */
#define CP_TIMEOUT              300             /* CP timeout in frame ticks */

/*
** linkage logic
*/
typedef void ( * HANDLER )();

struct  hard_key
{
        struct hard_key *psLast;
        HANDLER Init, Process;
};

#define NIL     (HARD_KEY *) 0


/*****************************************************************************
*       BUTTON DATA STRUCTURES
*
*       OVERVIEW:
*       enum    BUTTON_ID - The enum type to present Button definitions.
*       struct  BUTTON - The struct type to
*
*****************************************************************************/

enum button_id
{
        NOBUTTON = -1,  /* no Button has been pressed */

        m11, m12, m13, m14, m15, m16, m17, m18, m19, m1a,
        m21, m22, m23, m24, m25, m26, m27, m28, m29, m2a,
        m31, m32, m33, m34, m35, m36, m37, m38, m39, m3a,
        m41, m42, m43, m44, m45, m46, m47, m48, m49, m4a,

        n11, n12, n13, n14,
```

```
        n21, n22, n23, n24,
        n31, n32, n33, n34,
        n41, n42, n43, n44,

        sf1, sf2, sf3, sf4, sf5,

        ent,

#if !RTD
        LEFT_BUTTON,     /* these for arrow key simulation of trackball */
        RIGHT_BUTTON,
        UP_BUTTON,
        DOWN_BUTTON,
        ENCODER_BUTTON,  /* simulate encoder */
#endif

        MAX_BUTTON_CODE

};


#define M11     "By\nPas",          'q',        m11     /*      */
#define M12     "Grab",             'w',        m12     /*      */
#define M13     "Rec\nStp",         'e',        m13     /*      */
#define M14     "Ipt\nStp",         'r',        m14     /*      */
#define M15     "Aud\nStp",         't',        m15     /*      */
#define M16     "Tcd\nStp",         'y',        m16     /*      */
#define M17     "Rmt\nStp",         'u',        m17     /*      */
#define M18     "Opt\nStp",         'i',        m18     /*      */
#define M19     "Cin\nPly",         'o',        m19     /*      */
#define M1A     "Nor\nPly",         'p',        m1a     /*      */

#define M21     "Var\nSpd",         'a',        m21     /*      */
#define M22     "Rec\nLoc",         's',        m22     /*      */
#define M23     "Smo\nMo",          'd',        m23     /*      */
#define M24     "Swap",             'f',        m24     /*      */
#define M25     "g",                'g',        m25     /*      */
#define M26     "GPI\nStp",         'h',        m26     /*      */
#define M27     "Bak\nUp",          'j',        m27     /*      */
#define M28     "Dub\nDmp",         'k',        m28     /*      */
#define M29     "Clp\nPly",         'l',        m29     /*      */
#define M2A     "Seg\nPly",         ';',        m2a     /*      */

#define M31 "Stp\n<-",          'z',        m31     /*      */
#define M32     "Rec",              'x',        m32     /*      */
#define M33     "Stp\n->",          'c',        m33     /*      */
#define M34     "Pin\nPon",         'v',        m34     /*      */

#define M35     "b",                'b',        m35     /*      */
#define M36     "n",                'n',        m36     /*      */
#define M37     "Dia\nTst",         'm',        m37     /*      */

#define M38     "Ins\nClp",         ',',        m38     /*      */
#define M39     "",                         '>',        m39     /*      */
#define M3A     "Seg\nIns",         '/',        m3a     /*      */

#define M41     "Ply\n<-",          'Z',        m41     /*      */
#define M42     "Stp",              'X',        m42     /*      */
#define M43     "Ply\n->",          'C',        m43     /*      */
#define M44     "Loop",             'V',        m44     /*      */
#define M45     "Shut\tle",         'B',        m45     /*      */
#define M46     "Mac",              'N',        m46     /*      */
#define M47     "Mrk\nIn",          'M',        m47     /*      */
#define M48     "Mrk\nOut",         '<',        m48     /*      */
#define M49     "Brs",              '>',        m49     /*      */
#define M4A     "Go\nTo",           '?',        m4a     /*      */

#define N11     "7",                '7',        n11     /*      */
#define N12     "8",                '8',        n12     /*      */
#define N13     "9",                '9',        n13     /*      */
#define N14     "CLR",              '\xD3',     n14     /*      */

#define N21     "4",                '4',        n21     /*      */
#define N22     "5",                '5',        n22     /*      */
#define N23     "6",                '6',        n23     /*      */
```

```
#define N24     ":",        ',',        n24     /*      */

#define N31     "1",        '1',        n31     /*      */
#define N32     "2",        '2',        n32     /*      */
#define N33     "3",        '3',        n33     /*      */
#define N34     "+\n-",     '\x2D',     n34     /*      */

#define N41     "0",        '0',        n41     /*      */
#define N42     ".",        '.',        n42     /*      */
#define N43     "",         0,                  n43     /*      */
#define N44     "",                 0,                  n44     /*      */

#define ENTR "Ent",         '\x0d',     ent     /*      */

#if RTD
#define SK1     "SFT\nA",   '1',        sf1     /*      */
#define SK2     "SFT\nB",   '2',        sf2     /*      */
#define SK3     "SFT\nC",   '3',        sf3     /*      */
#define SK4     "SFT\nD",   '4',        sf4     /*      */
#define SK5     "SFT\nE",   '5',        sf5     /*      */
#else
#define SK1     "SFT\nA",   F1,                 sf1     /*      */
#define SK2     "SFT\nB",   F2,                 sf2     /*      */
#define SK3     "SFT\nC",   F3,                 sf3     /*      */
#define SK4     "SFT\nD",   F4,                 sf4     /*      */
#define SK5     "SFT\nE",   F5,                 sf5     /*      */
#define SK6     "EC",       F6,                 sf5     /* ENCODER */
#endif

enum
{
        ZERO = 0,
        ONE,
        TWO,
        THREE,
        FOUR,
        FIVE,
        SIX,
        SEVEN,
        EIGHT,
        NINE,
        FIELD,
        DECIMAL_POINT,
        CLEAR_NUMERIC,
        SIGN_TOGGLE,
        DO_IT,

        SOFT1,
        SOFT2,
        SOFT3,
        SOFT4,
        SOFT5,

/*      USER_SETUP,*/
        OUTPUT_SETUP,
        INPUT_SETUP,
        BYPASS,
        GRAB,
        RECORD_SETUP,
        AUDIO_SETUP,
        TCODE_SETUP,
        RMOTE_SETUP,
        GPI_SETUP,
        DUB_DUMP,
        DIAG_TEST,
        BACKUP,
        VARI_SPEED,
        SWAP,
        RECORD_LOCK,
        SMO_MO,
        STEP_FWD,
        STEP_REV,
```

```
        PLAY_FWD,
        PLAY_REV,
        BROWSE,
        GOTO,
        RECORD,
        STOP,
        PINGPONG,
        LOOP,
        SHUTTLE,
        MACRO,
        INSERT_CLIP,
        MACRO_EDIT,
        SEG_EDIT,
        SEG_INSERT,
        MARK_IN,
        MARK_OUT,
        NORM,
        CINE,
        CLIP,
        REMARK_CLIP,
        CLIP_LIST,
        CLIP_EDIT,
        SEG,
        SEG_LIST,
        MACRO_LIST,
        NOT_USED
};


enum led_id
{
#if 0           /* old pcb mapping */
        BYPASS_LED = 0,
        GRAB_LED,
        RECORD_SETUP_LED,
        INPUT_SETUP_LED,
        AUDIO_SETUP_LED,
        TCODE_SETUP_LED,
        RMOTE_SETUP_LED,
        OUTPUT_SETUP_LED,
        CINE_LED,
        NORM_LED,
        VARI_SPEED_LED,
        SWAP_LED,
        RECORD_LOCK_LED,
        SMO_MO_LED,
        DIAG_TEST_LED,
        GPI_SETUP_LED,
        BACKUP_LED,
        DUB_DUMP_LED,
        CLIP_LED,
        SEG_LED,
        STEP_REV_LED,
        RECORD_LED,
        STEP_FWD_LED,
        PINGPONG_LED,
        SPARE2_LED,
        MACRO_LED,
        GOTO_LED,
        INSERT_CLIP_LED,
        SPARE7_LED,
        SEG_INSERT_LED,
        PLAY_REV_LED,
        STOP_LED,
        PLAY_FWD_LED,
        LOOP_LED,
        SHUTTLE_LED,
        SPARE4_LED,
        SPARE5_LED,
        SPARE6_LED,
        BROWSE_LED,
        MARK_IN_LED,
        MARK_OUT_LED
```

```
#else          /* new pcb mapping */
        BYPASS_LED = 0,
        GRAB_LED,
        RECORD_SETUP_LED,
        INPUT_SETUP_LED,
        AUDIO_SETUP_LED,
        TCODE_SETUP_LED,
        RMOTE_SETUP_LED,
        OUTPUT_SETUP_LED,
        CINE_LED,
        NORM_LED,
        VARI_SPEED_LED,
        RECORD_LOCK_LED,
        SMO_MO_LED,
        SWAP_LED,
        SPARE1_LED,
        GPI_SETUP_LED,
        BACKUP_LED,
        DUB_DUMP_LED,
        CLIP_LED,
        SEG_LED,
        STEP_REV_LED,
        RECORD_LED,
        STEP_FWD_LED,
        PINGPONG_LED,
        SPARE2_LED,
        SPARE3_LED,
        DIAG_TEST_LED,
        INSERT_CLIP_LED,
        SPARE7_LED,
        SEG_INSERT_LED,
        PLAY_REV_LED,
        STOP_LED,
        PLAY_FWD_LED,
        LOOP_LED,
        SHUTTLE_LED,
        MACRO_LED,
        MARK_IN_LED,
        MARK_OUT_LED,
        BROWSE_LED,
        GOTO_LED
#endif         /* old pcb mapping */

};


struct  button
{
        struct
        {
                SINT16 wX, wY;
        }       sCenter;        /* location of button's center in NDC coordinates */

        FLAG            fSupported;             /* TRUE if supported */
        FLAG            fRecognized;    /* TRUE if not spare */
        FLAG            fHasLED;                /* TRUE if button has an LED */
        FLAG            fMomentary;             /* TRUE if momentary */
        FLAG            fLit;                   /* TRUE if button's LED is lit */
        SINT8           *pcKeycap;              /* string displayed on button, if any */
        SINT8           cKey;                   /* the keyboard character to use */
        SINT16          bId;                    /* the button identifier */
};


/*******************************************************************************
*       MESSAGE PROTOCOL DATA STRUCTURES
*
*       OVERVIEW:
*       SINGLE_MSG;
*       OPCODE_MSG;
*
*       Control panel to main unit:
```

```
*               BUTTONUP_MSG;
*               BUTTONDOWN_MSG;
*               TRACKBALL_MSG;
*               VERSION_MSG;
*               POWERUP_MSG;
*               TEST_RESULT_MSG;
*               RX_COM2_MSG;
*               READ_REG_MSG;
*               WRITE_REG_MSG;
*
*       Main unit to control panel:
*               LED_SET_MSG;
*               LED_DIM_MSG;
*               DISPLAY_STR_MSG;
*               DISPLAY_BLINK_MSG;
*               DISPLAY_BANNER_MSG;
*               DISPLAY_DIM_MSG;
*               DISPLAY_ENCURSOR_MSG;
*               DISPLAY_DISCURSOR_MSG;
*               DISPLAY_CURSOR_MSG;
*               DISPLAY_GRAPHIC_MSG;
*               DISPLAY_FIELD_MSG;
*               SEND_NOW_MSG;
*               SEND_REQ_MSG;
*               SEND_CHANGE_MSG;
*               SEND_VERS_MSG;
*               SEND_TIME_MSG;
*               RESET_LED_MSG;
*               RESET_TRACKBALL_MSG;
*               RESET_ALL_MSG;
*               RESET_DISPLAY_MSG;
*               RESET_LINE_MSG;
*               ACCELERATE_MSG;
*               TEST_MSG;
*               SLEEP_MSG;
*               AUDIO_TONE_MSG;
*               AUDIO_BEEP_MSG;
*               HI_MSG;
*               CONFIG_MODE_MSG;
*               TX_COM2_MSG;
*               REG_VALUE_MSG;
*
******************************************************************************/
typedef struct
{
        SINT8   cOriginator;
        SINT8   cPrefix;
        SINT8   cTerminator;
        SINT8   cNull;

}       SINGLE_MSG;

typedef struct

{
        SINT8   cOriginator;
        SINT8   cPrefix;
        SINT8   cOpcode;
        SINT8   cTerminator;
        SINT8   cNull;

}       OPCODE_MSG;

typedef struct
{
        SINT8   cOriginator;
        SINT8   cPrefix;
        SINT8   rbButtonId[2];
        SINT8   cTerminator;
        SINT8   cNull;

}       BUTTON_MSG;

#define BUTTONUP_MSG                    BUTTON_MSG
#define BUTTONDOWN_MSG                  BUTTON_MSG
```

```
typedef struct
{
        SINT8   cOriginator;
        SINT8   cPrefix;
        SINT8   rbXPos[4];
        SINT8   rbYPos[4];
        SINT8   cTerminator;
        SINT8   cNull;

}       TRACKBALL_MSG;

typedef struct
{
        SINT8   cOriginator;
        SINT8   cPrefix;
        SINT8   rbId;
        SINT8   rbData[4];
        SINT8   cTerminator;
        SINT8   cNull;

}       ENCODER_MSG;

typedef struct
{
        SINT8   cOriginator;
        SINT8   cPrefix;
        SINT8   cVersion;
        SINT8   cTerminator;
        SINT8   cNull;

}       VERSION_MSG;

#define POWERUP_MSG                                     SINGLE_MSG

typedef struct
{
        SINT8   cOriginator;
        SINT8   cPrefix;
        SINT8   rbTestResult[2];
        SINT8   cTerminator;
        SINT8   cNull;

}       TEST_RESULT_MSG;

typedef struct
{
        SINT8   cOriginator;
        SINT8   cPrefix;
        SINT8   rbcntChar[2];
        SINT8   var;
        SINT8   cTerminator;
        SINT8   cNull;

}       RX_COM2_MSG;

typedef struct
{
        SINT8   cOriginator;
        SINT8   cPrefix;
        SINT8   bBoardAddr;
        SINT8   rbRegAddr[2];
        SINT8   cTerminator;
        SINT8   cNull;

}       READ_REG_MSG;

typedef struct
{
        SINT8   cOriginator;
        SINT8   cPrefix;
        SINT8   bBoardAddr;
        SINT8   rbRegAddr[2];
        SINT8   cEqualSign;
        SINT8   bData[4];
```

```
        SINT8   cTerminator;
        SINT8   cNull;

}       WRITE_REG_MSG;

typedef struct
{
        SINT8   cOriginator;
        SINT8   cPrefix;
        SINT8   cOpcode;
        SINT8   rbId[2];
        UINT8   bState;
        SINT8   cTerminator;
        SINT8   cNull;

}       LED_SET_MSG;

typedef struct
{
        SINT8   cOriginator;
        SINT8   cPrefix;
        SINT8   cOpcode;
        SINT8   bDimLevel;
        SINT8   cTerminator;
        SINT8   cNull;

}       LED_DIM_MSG;


typedef struct
{
        SINT8   cOriginator;
        SINT8   cPrefix;
        SINT8   cOpcode;
        UINT8   rcXPos[2];
        UINT8   cYPos;
        SINT8   rbStrLength[2];
        SINT8   rstrData[MAXSTRING];
        SINT8   cTerminator;
        SINT8   cNull;

}       DISPLAY_STR_MSG;

typedef struct
{
        SINT8   cOriginator;
        SINT8   cPrefix;
        SINT8   cOpcode;
        SINT8   rcXPos[2];
        SINT8   cYPos;
        SINT8   rbnCharBlink[2];
        SINT8   cTerminator;
        SINT8   cNull;

}       DISPLAY_BLINK_MSG;

typedef struct
{
        SINT8   cOriginator;
        SINT8   cPrefix;
        SINT8   cOpcode;
        SINT8   cYPos;
        SINT8   rbSpd[2];
        SINT8   rbStrLength[2];
        SINT8   rstrData[MAXSTRING];
        SINT8   cTerminator;
        SINT8   cNull;

}       DISPLAY_BANNER_MSG;

typedef struct
{
        SINT8   cOriginator;
        SINT8   cPrefix;
        SINT8   cOpcode;
```

```
        SINT8   bDimLevel;
        SINT8   cTerminator;
        SINT8   cNull;

}       DISPLAY_DIM_MSG;

#define DISPLAY_ENCURSOR_MSG      OPCODE_MSG
#define DISPLAY_DISCURSOR_MSG     OPCODE_MSG

typedef struct
{
        SINT8   cOriginator;
        SINT8   cPrefix;
        SINT8   cOpcode;
        SINT8   rcXPos[2];
        SINT8   cYPos;
        SINT8   cTerminator;
        SINT8   cNull;

}       DISPLAY_CURSOR_MSG;

typedef struct
{
        SINT8   cOriginator;
        SINT8   cPrefix;
        SINT8   cOpcode;
        SINT8   rcXPos[2];
        SINT8   cYPos;
        SINT8   rbnGraphics[2];
        SINT8   cTerminator;
        SINT8   cNull;

}       DISPLAY_GRAPHIC_MSG;

typedef struct
{
        SINT8   cOriginator;
        SINT8   cPrefix;
        SINT8   cOpcode;
        SINT8   cYPos;
        SINT8   rbReverseVideo[5];
        SINT8   cTerminator;
        SINT8   cNull;

}       DISPLAY_FIELD_MSG;

typedef struct
{
        SINT8   cOriginator;
        SINT8   cPrefix;
        SINT8   cOpcode;
        SINT8   cYPos;
        SINT8   cHighLightMode;
        SINT8   cTerminator;
        SINT8   cNull;

}       DISPLAY_HIGHLIGHT_MSG;

#define SEND_NOW_MSG                    OPCODE_MSG
#define SEND_REQ_MSG                    OPCODE_MSG
#define SEND_CHANGE_MSG                 OPCODE_MSG
#define SEND_VERS_MSG                   OPCODE_MSG

typedef struct
{
        SINT8   cOriginator;
        SINT8   cPrefix;
        SINT8   cOpcode;
        SINT8   rbMilliSec[2];
        SINT8   cTerminator;
        SINT8   cNull;

}       SEND_TIME_MSG;
```

```
#define RESET_LED_MSG                        OPCODE_MSG
#define RESET_TRACKBALL_MSG                  OPCODE_MSG
#define RESET_ENCODER_MSG                    OPCODE_MSG
#define RESET_ALL_MSG                        OPCODE_MSG

typedef struct
{
        SINT8   cOriginator;
        SINT8   cPrefix;
        SINT8   cOpcode;
        SINT8   bClearMode;
        SINT8   cTerminator;
        SINT8   cNull;

}       RESET_DISPLAY_MSG;

typedef struct
{
        SINT8   cOriginator;
        SINT8   cPrefix;
        SINT8   cOpcode;
        SINT8   bClearMode;
        UINT8   cLineNo;
        SINT8   cTerminator;
        SINT8   cNull;

}       RESET_LINE_MSG;

typedef struct
{
        SINT8   cOriginator;
        SINT8   cPrefix;
        SINT8   cOpcode;
        SINT8   var;
        SINT8   cTerminator;
        SINT8   cNull;

}       ACCELERATE_MSG;

#define TEST_MSG                                     OPCODE_MSG

#define SLEEP_MSG                                    SINGLE_MSG

typedef struct
{
        SINT8   cOriginator;
        SINT8   cPrefix;
        SINT8   cOpcode;
        SINT8   rbDuration[2];
        SINT8   bVolume;
        SINT8   cTerminator;
        SINT8   cNull;

}       AUDIO_TONE_MSG;

#define AUDIO_BEEP_MSG                       OPCODE_MSG

#define HI_MSG                                       SINGLE_MSG

typedef struct
{
        SINT8   cOriginator;
        SINT8   cPrefix;
        SINT8   bPort;
        SINT8   bBaudRate;
        SINT8   bParity;
        SINT8   bStopBits;
        SINT8   bCmdMode;
        SINT8   cTerminator;
        SINT8   cNull;

}       CONFIG_MODE_MSG;

typedef struct
{
```

```
        SINT8   cOriginator;
        SINT8   cPrefix;
        SINT8   rbcntChar[2];
        SINT8   var;
        SINT8   cTerminator;
        SINT8   cNull;

}       TX_COM2_MSG;

typedef struct
{
        SINT8   cOriginator;
        SINT8   cPrefix;
        SINT8   bBoardAddr;
        SINT8   rbRegAddr[2];
        SINT8   rcEqualSigns[2];
        SINT8   rbData[4];
        SINT8   cTerminator;
        SINT8   cNull;

}       REG_VALUE_MSG;

/* Communication protocol definitions */

#define ORIGINATOR                      '\x1B'  /* ESC */
#define BUTTONDOWN_CHAR         'K'
#define BUTTONUP_CHAR           'U'
#define TRACKBALL_CHAR          'B'
#define ENCODER_CHAR            'E'
#define VERSION_CHAR            'V'
#define POWERUP_CHAR            'P'
#define TEST_RESULTS_CHAR       'R'
#define LED_CHAR                        'L'
#define DISPLAY_CHAR            'D'
#define SEND_CHAR                       'S'
#define RESET_CHAR                      'C'
#define ACCELRATE_CHAR          'A'
#define TEST_CHAR                       'T'
#define SLEEP_CHAR                      'Z'
#define AUDIO_CHAR                      'N'
#define HI_CHAR                         'H'
#define REGVALUE_CHAR           'v'
#define REGREAD_CHAR            'r'
#define REGWRITE_CHAR           'w'
#define TERMINATOR                      '\r'
#define TERMINATOR_STR          "\r"

/*
** opcodes follow
*/

enum
{
        LED_SET = '0',
        LED_DIM
};

enum
{
        DISPLAY_LOC = '0',
        DISPLAY_BLINK,
        DISPLAY_BANNER,
        DISPLAY_DIM,
        DISPLAY_ENCURSOR,
        DISPLAY_DISCURSOR,
        DISPLAY_CURSOR,
        DISPLAY_GRAPHICS,
        DISPLAY_REVERSE_VIDEO,
        DISPLAY_HIGHLIGHT
};

enum
{
        SEND_NOW = '0',
```

```
        SEND_REQ,
        SEND_CHANGE,
        SEND_TIMED,
        SEND_VERSION
};

enum

        RESET_LED = '0',
        RESET_DISPLAY,
        RESET_TRACKBALL,
        RESET_ENCODER,
        RESET_ALL
};

enum
{
        CLR_DISPLAY = '0',
        CLR_TEXT,
        CLR_GFX,
        CLR_LINE,
        CLR_LEFT,
        CLR_RIGHT,
        CLR_BEFORE,
        CLR_AFTER,
        CLR_SPECIFIED_LINE
};

enum
{
        AUDIO_SET = '0',
        AUDIO_BEEP
};


/*
 *      EVENT TYPE DEFINITIONS
 *
 *      OVERVIEW:
 *      enum    EVENT
 *      union   EVENT_DATA
 *      struct  MAIN_EVENT
 *
 */
enum event
{
        NULL_EVENT,
        BUTTONUP_EVENT,
        BUTTONDOWN_EVENT,
        ENCODER_EVENT,
        LED_SET_EVENT,
        LED_DIM_EVENT,
        NORMAL_DISPLAY_EVENT,
        RESET_ALL_EVENT,
        ACCELRATE_EVENT,
        TEST_EVENT,
        SLEEP_EVENT,
        HI_EVENT,
        REG_READ_EVENT,
        REG_VALUE_EVENT,
        REG_WRITE_EVENT,
        AUDIO_EVENT,
        POWERUP_EVENT,
        VERSION_EVENT,
        DispLocEvent,
        DispBlinkEvent,
        DispBannerEvent,
        DispDimEvent,
        DispCursEnableEvent,
        DispCursDisableEvent,
        DispCursLocEvent,
        DisplayGFXEvent,
        DisplayFieldEvent,
        SendNowEvent,
        SendReqEvent,
```

```
        SendChangeEvent,
        SendTimeEvent,
        SendVersionEvent,
        ResetLEDEvent,
        ResetDispEvent,
        ResetTrackballEvent,
        END_OF_EVENTS

};

typedef union
{
        BUTTONUP_MSG    sButtonUp;
        BUTTONDOWN_MSG  sButtonDown;
        ENCODER_MSG     sEncoder;
        VERSION_MSG             sVersion;

}       EVENT_DATA;

struct main_event
{
        EVENT                   eType;
        EVENT_DATA              uData;
};

/*
 *      MAINSTATE
 *
 *      the current state, mode or status of the Main Unit
 */
struct main_state
{
        UINT8           *pstrPlayMode;
        UINT8           *pstrTCode;
        SINT8           *pstrInput1Mode[3];
        SINT8           *pstrInput2Mode[3];
        UINT8           bSequenceNoCurr;        /* in segment playback */
        SINT16          wNextPlayPic;           /* the next picture to play */
        SINT16          wLastPlayPic;           /* the last played picture number */
        SINT16          wPlayDir;                       /* play direction */
        SINT16          wNextBrowsePic;         /* the next picture to browse */
        SINT16          wLastBrowsePic;         /* the last browseed picture number */
        SINT16          wNextRecPic;            /* the next picture to record */
        SINT16          wLastRecPic;            /* the last recorded picture number */
        SINT16          wNextDelPic;            /* the next picture to delete */
        SINT16          wLastDelPic;            /* the last deleted picture number */
        SINT16          wCurrentPic;            /* the current picture number */
        SINT16          wNextPic;                       /* the next picture number */
        SINT16          wEntry;                         /* the entered number */
        PIXEL           xTrackball;                     /* location of the Trackball */
        BUTTON_ID       eNextMode;                      /* the next operating mode */
        BUTTON_ID       eLastMode;                      /* the last operating mode */
        BUTTON_ID       eCurrMode;                      /* the current operating mode */
        BUTTON_ID       eSubMode;                       /* the current sub-operating mode */
        FLAG            fCursorOn;                      /* cursor is enabled */
        FLAG            fCPConnect;                     /* TRUE if the control panel is connected
*/
        UINT8           bCPVersion;                     /* control panel version number */
        UINT8           bCPSendMode;            /* corresponds to SENDNOW, etc, above */
        TICK            lKeyTime;                       /* time that a key was last pressed */
        TICK            lTrackballTime;         /* time that the trackball was last moved */

};


/* macros to simplify display reset types */
#define UiClearDisp()           UiResetDisp( CLR_DISPLAY )
#define UiClearText()           UiResetDisp( CLR_TEXT )
#define UiClearGFX()            UiResetDisp( CLR_GFX )
#define UiClearLine()           UiResetDisp( CLR_LINE )
#define UiClearLeft()           UiResetDisp( CLR_LEFT )
#define UiClearRight()          UiResetDisp( CLR_RIGHT )
#define UiClearBefore()         UiResetDisp( CLR_BEFORE )
#define UiClearAfter()          UiResetDisp( CLR_AFTER )

#endif
```

```
/*
 *------------------------------------------------------------------------
 *  uievent.h    Copyright 1991 Accom Inc.
 *
 *      Responsible Person: Kevin Hsu
 *
 *------------------------------------------------------------------------
 */
#ifndef _UIEVENT
#define _UIEVENT

/*
 *      EVENT QUEUE DEFINITIONS
 *
 *      OVERVIEW:
 *      struct  QUEUE_MEMBER
 *      struct  EVENT_QUEUE
 *
 */
        /*
        ** the Queue to hold events until processed
        */
typedef struct  queue_member
{
        struct queue_member     *psNext;        /* points to the next item in Queue */
        struct queue_member     *psPrev;        /* points to the previous item in Queue */
        MAIN_EVENT                              sEvent; /* the event record */

}       QUEUE_MEMBER;

#define QUEUE_SIZE      8

typedef struct
{
        QUEUE_MEMBER    *psRead;                /* read pointer in Queue */
        QUEUE_MEMBER    *psWrite;               /* write pointer in Queue */
        QUEUE_MEMBER    rsMember[QUEUE_SIZE];

}       EVENT_QUEUE;

/*
 *      MACRO LIBRARY
 *      event queue macros
 */
#define READ(q)                 ((q).psRead)
#define WRITE(q)                ((q).psWrite)
#define ISEMPTY(q)              (READ(q) == WRITE(q))
#define ISFULL(q)               (READ(q)->psPrev == WRITE(q))
#define FIRST_MEMBER(q)  ((q).rsMember)
#define LAST_MEMBER(q)   (&(q).rsMember[QUEUE_SIZE-1])


#endif
/*
 *------------------------------------------------------------------------
 *  V53.h       Copyright right 1991 Accom Inc.
 *
 *      Responsible Person: Doug George
 *
 *      This file contains NEC uPD70236 (V53) System Definitions
 *      NOTE:   All page references are for the NEC uPD70236 Manual 1/90
 *
 *------------------------------------------------------------------------
 */
/*
 * I/O Address, 1 = Byte, 2 = Word
 * All registers are on byte boundaries
 */
#define IOAG                            1

/*
 * V53 System I/O - Register definitions
 */
/*
 * System I/O Area, page 57
```

```
*/
#define V53_SCTL        (0xfffe)
#define V53_OPSEL       (0xfffd)
#define V53_OPHA        (0xfffc)
#define V53_DULA        (0xfffb)
#define V53_IULA        (0xfffa)
#define V53_TULA        (0xfff9)
#define V53_SULA        (0xfff8)
#define V53_WCY4        (0xfff6)
#define V53_WCY3        (0xfff5)
#define V53_WCY2        (0xfff4)
#define V53_WMB1        (0xfff3)
#define V53_RFC         (0xfff2)
#define V53_SBCR        (0xfff1)
#define V53_TCKS        (0xfff0)

#define V53_WAC         (0xffed)
#define V53_WCY0        (0xffec)
#define V53_WCY1        (0xffeb)
#define V53_WMB0        (0xffea)
#define V53_BRC         (0xffe9)
#define V53_BADR        (0xffe1)
#define V53_BSEL        (0xffe0)
#define V53_XAM         (0xff80)

#define V53_PGR1        (0xff00)
#define V53_PGR2        (0xff02)
#define V53_PGR3        (0xff04)
#define V53_PGR4        (0xff06)
#define V53_PGR5        (0xff08)
#define V53_PGR6        (0xff0a)
#define V53_PGR7        (0xff0c)
#define V53_PGR8        (0xff0e)
#define V53_PGR9        (0xff10)
#define V53_PGR10       (0xff12)
#define V53_PGR11       (0xff14)
#define V53_PGR12       (0xff16)
#define V53_PGR13       (0xff18)
#define V53_PGR14       (0xff1a)
#define V53_PGR15       (0xff1c)
#define V53_PGR16       (0xff1e)
#define V53_PGR17       (0xff20)
#define V53_PGR18       (0xff22)
#define V53_PGR19       (0xff24)
#define V53_PGR20       (0xff26)
#define V53_PGR21       (0xff28)
#define V53_PGR22       (0xff2a)
#define V53_PGR23       (0xff2c)
#define V53_PGR24       (0xff2e)
#define V53_PGR25       (0xff30)
#define V53_PGR26       (0xff32)
#define V53_PGR27       (0xff34)
#define V53_PGR28       (0xff36)
#define V53_PGR29       (0xff38)
#define V53_PGR30       (0xff3a)
#define V53_PGR31       (0xff3c)
#define V53_PGR32       (0xff3e)
#define V53_PGR33       (0xff40)
#define V53_PGR34       (0xff42)
#define V53_PGR35       (0xff44)
#define V53_PGR36       (0xff46)
#define V53_PGR37       (0xff48)
#define V53_PGR38       (0xff4a)
#define V53_PGR39       (0xff4c)
#define V53_PGR40       (0xff4e)
#define V53_PGR41       (0xff50)
#define V53_PGR42       (0xff52)
#define V53_PGR43       (0xff54)
#define V53_PGR44       (0xff56)
#define V53_PGR45       (0xff58)
#define V53_PGR46       (0xff5a)
#define V53_PGR47       (0xff5c)
#define V53_PGR48       (0xff5e)
#define V53_PGR49       (0xff60)
#define V53_PGR50       (0xff62)
```

```
#define V53_PGR51                           (0xff64)
#define V53_PGR52                           (0xff66)
#define V53_PGR53                           (0xff68)
#define V53_PGR54                           (0xff6a)
#define V53_PGR55                           (0xff6c)
#define V53_PGR56                           (0xff6e)
#define V53_PGR57                           (0xff70)
#define V53_PGR58                           (0xff72)
#define V53_PGR59                           (0xff74)
#define V53_PGR60                           (0xff76)
#define V53_PGR61                           (0xff78)
#define V53_PGR62                           (0xff7a)
#define V53_PGR63                           (0xff7c)
#define V53_PGR64                           (0xff7e)

/*
 * SCTL - System Control Register, Page 58
 */
#define V_SCTL_IOAG_BYTE         0x1
#define V_SCTL_DMAM_71037                0x2
#define V_SCTL_CE0_PROPAGATE     0x4
#define V_SCTL_CE1_PROPAGATE     0x8
#define V_SCTL_SC_BRG                    0x10

/*
 * OPSEL - On Chip Peripheral Selection Register, Page 58
 */
#define V_OPSEL_ALLENABLE                0xf
#define V_OPSEL_ALLDISABLE               0x0
#define V_OPSEL_DMA                             0x1
#define V_OPSEL_ICU                             0x2
#define V_OPSEL_TCU                             0x4
#define V_OPSEL_SCU                             0x8

/*
 * On Chip Relocation Registers:
 *
 *   OPHA - On chip High Address
 *   DULA - DMA Low Address
 *   IULA - Interrupt Low Address
 *   TULA - Timer Low Address
 *   SULA - Serial Port Low Address
 *              Page 59
 */
#define V_OPHA_BASE                             0xf0
#define V_DULA_BASE                             0x10
#define V_IULA_BASE                             0x20
#define V_TULA_BASE                             0x30
#define V_SULA_BASE                             0x40

/*
 * TCKS - Timer Clock Selection Register, Page 59
 */
#define V_TCKS_DIVIDE4                   0x0
#define V_TCKS_DIVIDE8                   0x1
#define V_TCKS_DIVIDE16                  0x2
#define V_TCKS_DIVIDE32                  0x3
#define V_TCKS_CS0_TCLK                  0x4
#define V_TCKS_CS1_TCLK                  0x8
#define V_TCKS_CS2_TCLK                  0x10

/*
 * BRC - Baud Rate Counter, Page 60
 */
#define V_BRC(x)                                (x)

/*
 * WMB0 - Wait State Memory Boundary Register 0  , Page 60-61
 */
#define V_WMB0_EUMB_1MB          0<<0
#define V_WMB0_EUMB_2MB          1<<0
#define V_WMB0_EUMB_3MB          2<<0
#define V_WMB0_EUMB_4MB          3<<0
#define V_WMB0_EUMB_5MB          4<<0
#define V_WMB0_EUMB_6MB          5<<0
```

```
#define V_WMB0_EUMB_7MB          6<<0
#define V_WMB0_EUMB_8MB          7<<0

#define V_WMB0_ELMB_1MB          0<<4
#define V_WMB0_ELMB_2MB          1<<4
#define V_WMB0_ELMB_3MB          2<<4
#define V_WMB0_ELMB_4MB          3<<4
#define V_WMB0_ELMB_5MB          4<<4
#define V_WMB0_ELMB_6MB          5<<4
#define V_WMB0_ELMB_7MB          6<<4
#define V_WMB0_ELMB_8MB          7<<4

/*
 * WMB1 - Wait State Memory Boundary Register 1, Page 60-61
 */
#define V_WMB1_UMB_32K                   0 << 0
#define V_WMB1_UMB_64K                   1 << 0
#define V_WMB1_UMB_96K                   2 << 0
#define V_WMB1_UMB_128K          3 << 0
#define V_WMB1_UMB_192K          4 << 0
#define V_WMB1_UMB_256K          5 << 0
#define V_WMB1_UMB_384K          6 << 0
#define V_WMB1_UMB_512K          7 << 0

#define V_WMB1_LMB_32K                   0 << 4
#define V_WMB1_LMB_64K                   1 << 4
#define V_WMB1_LMB_96K                   2 << 4
#define V_WMB1_LMB_128K          3 << 4
#define V_WMB1_LMB_192K          4 << 4
#define V_WMB1_LMB_256K          5 << 4
#define V_WMB1_LMB_384K          6 << 4
#define V_WMB1_LMB_512K          7 << 4

/*
 * WAC - Wait State Memory Boundary Register 1, Page 60-61
 *            Bits 0..3 specify the upper 4 bits of expanded address
 */
#define V_WAC_UWA(x)                (x & 0x0f)          /* Select 1MB out of 16MB */

/*
 * WCY0 - Wait Cycle 0 Register (16MB Upper) , Page 61
 */
#define V_WCY0_EUMW(x)              (x & 0x7)           /* 0 - 7 wait states     */


/*
 * WCY1 - Wait Cycle 1 Register (16MB Lower & Middle), Page 61
 */
#define V_WCY1_ELMW(x)              (x & 0x7)           /* 0 - 7 wait states     */
#define V_WCY1_EMMW(x)              (x & 0x7) << 4  /* 0 - 7 wait states         */

/*
 * WCY2 - Wait Cycle 2 Register (1MB Lower & Middle), Page 61
 */
#define V_WCY2_LMW(x)               (x & 0x7)           /* 0 - 7 wait states     */
#define V_WCY2_MMW(x)               (x & 0x7) << 4  /* 0 - 7 wait states         */

/*
 * WCY3 - Wait Cycle 3 Register (1MB Upper & I/O), Page 62.
 */
#define V_WCY3_UMW(x)               (x & 0x7)
#define V_WCY3_IOW(x)               (x & 0x7) << 4

/*
 * WCY4 - Wait Cycle 4 Register (Refresh & DMA), Page 62
 */
#define V_WCY4_RFW(x)               (x & 0x7)
#define V_WCY4_DMAW(x)              (x & 0x7) << 4

/*
 * RFC - Refresh Control Register, Page 62
 */
#define V_RFC_RTM(x)                (x & 0x1f)
```

```
#define V_RFC_INC_BY_1                1 << 6
#define V_RFC_ENABLE                  1 << 7

/*
 * Timer/Counter Unit Register Defines, Page 65
 */
#define V53_TCT0                      (V_OPHA_BASE << 8) + V_TULA_BASE + (0 * IOAG)
#define V53_TST0                      (V_OPHA_BASE << 8) + V_TULA_BASE + (0 * IOAG)
#define V53_TCT1                      (V_OPHA_BASE << 8) + V_TULA_BASE + (1 * IOAG)
#define V53_TST1                      (V_OPHA_BASE << 8) + V_TULA_BASE + (1 * IOAG)
#define V53_TCT2                      (V_OPHA_BASE << 8) + V_TULA_BASE + (2 * IOAG)
#define V53_TST2                      (V_OPHA_BASE << 8) + V_TULA_BASE + (2 * IOAG)
#define V53_TMD                       (V_OPHA_BASE << 8) + V_TULA_BASE + (3 * IOAG)

/*
 * Timer/Counter Register Defines, Page 64-65
 */
#define V_TCT_BINARY                  0
#define V_TCT_BCD                     1

#define V_TCT_INTATEOC                0
#define V_TCT_ONESHOT                 1
#define V_TCT_RATEGEN                 2
#define V_TCT_SQUAREWAVE              3
#define V_TCT_SWSTROBE                4
#define V_TCT_HWSTROBE                5

#define V_TCT_COUNTERLATCH            0<<4
#define V_TCT_LOWBYTEONLY             1<<4
#define V_TCT_HIGHBYTEONLY            2<<4
#define V_TCT_LOWHIGHLOAD             3<<4
#define V_TCT_INIT(id,mode)           ((id<<6)|(mode<<1)|V_TCT_LOWHIGHLOAD|V_TCT_BINARY)

#define V_TST_BINARY                  0
#define V_TST_BCD                     1

#define V_TST_NC_VALID                0<<1
#define V_TST_NC_INVALID              1<<1

#define V_TST_COUNTERLATCH            0<<4
#define V_TST_LOWBYTEONLY             1<<4
#define V_TST_HIGHBYTEONLY            2<<4
#define V_TST_LOWHIGHLOAD             3<<4

#define V_TST_INTATEOC                0<<6
#define V_TST_ONESHOT                 1<<6
#define V_TST_RATEGEN                 2<<6
#define V_TST_SQUAREWAVE              3<<6
#define V_TST_SWSTROBE                4<<6
#define V_TST_HWSTROBE                5<<6

/*
 * Serial Control Unit Register Defines, Page 71-72
 */
#define V53_SRB                       (V_OPHA_BASE << 8) + V_SULA_BASE + (0 * IOAG)
#define V53_STB                       (V_OPHA_BASE << 8) + V_SULA_BASE + (0 * IOAG)
#define V53_SST                       (V_OPHA_BASE << 8) + V_SULA_BASE + (1 * IOAG)
#define V53_SCM                       (V_OPHA_BASE << 8) + V_SULA_BASE + (1 * IOAG)
#define V53_SMD                       (V_OPHA_BASE << 8) + V_SULA_BASE + (2 * IOAG)
#define V53_SIMK                      (V_OPHA_BASE << 8) + V_SULA_BASE + (3 * IOAG)

#define V_SCM_TE                      1
#define V_SCM_DTR_LOW                 2
#define V_SCM_RE                      4
#define V_SCM_SEND_BREAK 8
#define V_SCM_CLEAR_ERRORS            0x10
#define V_SCM_RTS_LOW                 0x20

#define V_SST_TXEMPTY                 1
#define V_SST_RXFULL                  2
#define V_SST_PARITY_ERROR            8
#define V_SST_OVERRUN_ERROR           0x10
#define V_SST_FRAME_ERROR             0x20
#define V_SST_BREAK_DETECT            0x40
#define V_SST_DSR_LOW                 0x80
```

```
#define V_SMD_BF16                      2
#define V_SMD_BF64                      3
#define V_SMD_8BIT                      3 << 2
#define V_SMD_7BIT                      2 << 2
#define V_SMD_NOPARITY          0 << 4
#define V_SMD_ODDPARITY         1 << 4
#define V_SMD_EVENPARITY 3 << 4
#define V_SMD_ONESTOP           1 << 6
#define V_SMD_TWOSTOP           3 << 6

#define V_SIMK_RXMASK           1
#define V_SIMK_TXMASK           2
/*
 * Interupt Control Unit Register Defines, Page 73-74
 */
#define V53_IIWEVEN                     (V_OPHA_BASE << 8) + V_IULA_BASE + (0 * IOAG)
#define V53_IIWODD                      (V_OPHA_BASE << 8) + V_IULA_BASE + (1 * IOAG)

#define V_IIW_SINGLE            2
#define V_IIW_EXTEND            0
#define V_IIW_EDGE                      0
#define V_IIW_LEVEL                     8
#define V_IIW_COMMAND           0x10

#define V_IMKW_MASK(x)          1 << x


/*
 * DMA Control Registers, Page 3-146
 */
#define V53_DICM                        (V_OPHA_BASE<<8) + V_DULA_BASE + 0
#define V53_DCH                         (V_OPHA_BASE<<8) + V_DULA_BASE + 1
#define V53_DBC_LOW                     (V_OPHA_BASE<<8) + V_DULA_BASE + 2
#define V53_DCC_LOW                     (V_OPHA_BASE<<8) + V_DULA_BASE + 2
#define V53_DBC_HIGH            (V_OPHA_BASE<<8) + V_DULA_BASE + 3
#define V53_DCC_HIGH            (V_OPHA_BASE<<8) + V_DULA_BASE + 3
#define V53_DBA_LOW                     (V_OPHA_BASE<<8) + V_DULA_BASE + 4
#define V53_DCA_LOW                     (V_OPHA_BASE<<8) + V_DULA_BASE + 4
#define V53_DBA_HIGH            (V_OPHA_BASE<<8) + V_DULA_BASE + 5
#define V53_DCA_HIGH            (V_OPHA_BASE<<8) + V_DULA_BASE + 5
#define V53_DBA_UPPER           (V_OPHA_BASE<<8) + V_DULA_BASE + 6
#define V53_DCA_UPPER           (V_OPHA_BASE<<8) + V_DULA_BASE + 6
#define V53_DDC_LOW                     (V_OPHA_BASE<<8) + V_DULA_BASE + 8
#define V53_DDC_HIGH            (V_OPHA_BASE<<8) + V_DULA_BASE + 9
#define V53_DMD                 (V_OPHA_BASE<<8) + V_DULA_BASE + 10
#define V53_DST                 (V_OPHA_BASE<<8) + V_DULA_BASE + 11
#define V53_DMK                 (V_OPHA_BASE<<8) + V_DULA_BASE + 15

/*
 * DMA Initialization Command Register
 */
#define V_DICM_NORMAL           0
#define V_DICM_RESET            1

/*
 * DMA Channel Select Register
 */
#define V_DCH_SEL(x)            (x)
#define V_DCH_BASEONLY          4
#define V_DCH_BASECURRENT       0

/*
 * DMA Device Control Register
 */
#define V_DDC_LO_ENABLE                 0
#define V_DDC_LO_DISABLE        4
#define V_DDC_LO_FIXED                  0
#define V_DDC_LO_ROTATIONAL             0x10
#define V_DDC_LO_NORMALWRITE    0
#define V_DDC_LO_EXTENDWRITE    0x20
#define V_DDC_HI_BUSRELEASE             0
#define V_DDC_HI_BUSHOLD        1
#define V_DDC_HI_NOWAIT         0
#define V_DDC_HI_WAIT                   2
```

```
/*
 * DMA Status Register
 */
#define V_DST_TC(x)                     (inp(V53_DST)&(1<<x))
#define V_DST_REQUEST(x)        (inp(V53_DST)&(0x10<<x))

/*
 * DMA Mode Register
 */
#define V_DMD_VERIFY            0
#define V_DMD_IO2MEMORY         1<<2
#define V_DMD_MEMORY2IO         2<<2
#define V_DMD_NOAUTOINIT        0
#define V_DMD_AUTOINIT          0x10
#define V_DMD_INCREMENT         0
#define V_DMD_DECREMENT         0x20
#define V_DMD_DEMAND            0<<6
#define V_DMD_SINGLE            1<<6
#define V_DMD_BLOCK                     2<<6
#define V_DMD_CASCADE           3<<6

/*
 * DMA Mask Register
 */
#define V_DMK_MASK(x)           (1<<x)



;---------------------------------------------------------------------------
;
;       raux.asm        Copyright 1991 Accom Inc.
;
;       Responsible Person: Doug George
;---------------------------------------------------------------------------


        TITLE   raux

        .286p
        .8087

RAUX_TXT        SEGMENT  BYTE PUBLIC 'CODE'
RAUX_TXT        ENDS
_DATA   SEGMENT  WORD PUBLIC 'DATA'
_DATA   ENDS
CONST   SEGMENT  WORD PUBLIC 'CONST'
CONST   ENDS
_BSS    SEGMENT  WORD PUBLIC 'BSS'
_BSS    ENDS
DGROUP  GROUP   CONST,  _BSS,   _DATA
ASSUME  CS: RAUX_TXT, DS: DGROUP, SS: DGROUP, ES: DGROUP

EXTRN   _IspTimer0:FAR
EXTRN   _IspTimer1:FAR
EXTRN   _IspNmi:FAR
EXTRN   _IspFrame:FAR
EXTRN   _IspField:FAR

RAUX_TXT SEGMENT

        PUBLIC  _AuxTimer0
        PUBLIC  _AuxTimer1
        PUBLIC  _AuxNmi
        PUBLIC  _AuxFrame
        PUBLIC  _AuxField
        PUBLIC  _OpcodeSti
        PUBLIC  _OpcodeCli
        PUBLIC  _MvStrV53
        PUBLIC  _EnterExpanded
        PUBLIC  _ExitExpanded
        PUBLIC  _XaRet
```

```
; ======================================================================
; ======================================================================

_OpcodeSti PROC FAR ; enable interrupts
        sti
        ret

_OpcodeSti ENDP

; ======================================================================

_OpcodeCli PROC FAR ; disable interrupts
        cli
        ret

_OpcodeCli ENDP

; ======================================================================

_AuxTimer0 PROC FAR  ; software interrupt
        pusha
        push    es
        push    ds
        sti                                     ; re-enable interrupts

        mov     bp, DGROUP
        mov     ds, bp
        call    FAR PTR _IspTimer0

        pop     ds
        pop     es
        popa
        iret

_AuxTimer0 ENDP

_AuxTimer1 PROC FAR  ; software interrupt
        pusha
        push    es
        push    ds
        sti                             ; re-enable interrupts

        mov     bp, DGROUP
        mov     ds, bp
        call    FAR PTR _IspTimer1

        pop     ds
        pop     es
        popa
        iret

_AuxTimer1 ENDP

; ======================================================================
; ======================================================================
;
; The NMI handling in the V53 differs from previous V-Series uPs. The V53
; will not service an new NMI request until a return from the previous call
; has occurred. The AuxNmi for the V40 & V50 simply called the IspNmi
; and never finished the interrupt with an iret. On the V53 this works the
; first time but subsequent NMIs are ignored.
;
; This version takes the old interrupt return address off the stack and
; replaces it with the address of the IspNmi routine. This allows a
; normal return from interrupt to occur while still using the NMI as a
; system RESET.


_AuxNmi PROC FAR
        sti
        mov     bp, DGROUP
        mov     ds, bp
;  DOUG 10/19  - let the old return address stay on the stack in case needed
;       pop     ax              ;remove the old return offset
```

```
;       pop     ax              ;remove the old return segment
        mov     ax, SEG _IspNmi
        push    ax              ;push new return segment
        mov     ax, OFFSET _IspNmi
        push    ax              ;push new return offset
        iret                    ;now return from interrupt
_AuxNmi ENDP

; ======================================================================
; ======================================================================

_AuxField PROC FAR
        pusha
        push    es
        push    ds
        sti

        mov     bp, DGROUP
        mov     ds, bp
        call    FAR PTR _IspField

        pop     ds
        pop     es
        popa
        iret

_AuxField ENDP

; ======================================================================
; ======================================================================

_AuxFrame PROC FAR
        pusha
        push    es
        push    ds
        sti

        mov     bp, DGROUP
        mov     ds, bp
        call    FAR PTR _IspFrame

        pop     ds
        pop     es
        popa
        iret

_AuxFrame ENDP

; ======================================================================
; ======================================================================

_MvStrV53 PROC FAR
        push    bp
        mov     bp, sp
        push    cx
        push    es
        push    ds
        push    di
        push    si

        cld                     ; set direction
        lds     si, DWORD PTR [bp+10]   ; "from" address
        les     di, DWORD PTR [bp+6]    ; "to" address
        mov     cx, WORD PTR [bp+14]    ; count value
        rep     movsw           ; transfer 16 bits at a time

        pop     si
        pop     di
        pop     ds
        pop     es
        pop     cx
        leave
        ret

_MvStrV53 ENDP
```

```
; ======================================================================
; ======================================================================
;
; V53 expanded memory mode instructions

; new instruction definition macros

brkxa   MACRO   arg1
        ifnb    <arg1>
                db      0fh, 0e0h
                db      arg1
        else
                .errb   <arg1>
                db      90h, 90h
        endif
        ENDM

retxa   MACRO   arg1
        ifnb    <arg1>
                db      0fh, 0f0h
                db      arg1
        else
                .errb   <arg1>
                db      90h, 90h
        endif
        ENDM


        IF      0

        ; ======================================================================

        _EnterExpanded  PROC FAR
                call    SetVec0
                brkxa   0
        _EnterExpanded  ENDP

        ; ======================================================================

        _ExitExpanded   PROC FAR
                call    SetVec0
                retxa   0
        _ExitExpanded   ENDP

        ; ----------------------------------------------------------------------

        SetVec0 PROC NEAR
                mov     AX,0
                mov     ES,AX           ;set vector 0 to return
                mov     CX, WORD PTR ES:[0]
                mov     BX, WORD PTR ES:[2]
                mov     WORD PTR ES:[0], OFFSET _XaRet
                mov     WORD PTR ES:[2], SEG _XaRet
                ret
        SetVec0 ENDP


        ; ----------------------------------------------------------------------
        ; | We return here after executing the BRKXA and RETXA instructions. We  |
        ; | must return to the calling routine after restoring vector 0 values   |
        ; ----------------------------------------------------------------------

        _XaRet  PROC FAR
                mov     WORD PTR ES:[0], CX
                mov     WORD PTR ES:[2], BX
                ret
        _XaRet  ENDP

        ELSE
_EnterExpanded  PROC FAR
        brkxa   50
_EnterExpanded  ENDP

; ======================================================================
```

```
_ExitExpanded   PROC FAR
        retxa   50
_ExitExpanded   ENDP

; ------------------------------------------------------------------------

; ------------------------------------------------------------------------
; | We return here after executing the BRKXA and RETXA instructions.     |
; ------------------------------------------------------------------------

_XaRet  PROC FAR
        ret
_XaRet  ENDP

        ENDIF

RAUX_TXT        ENDS
END


/*
**      RT2 Master Horizontal Control PROM, Rev. A
**
**      2 PROMs, 2K x 8
**
**      John Stern, Accom Inc, 10/91
*/

/* some macro "functions" follow */
#define NumEntries(array)               (sizeof(array) / sizeof(array[0]))
#define GetBit(x, n)                    (((x) & (1L << n)) != 0)
#define SetBit(x, n, val)               ((val) ? ((x) |= (1L << (n))) : ((x) &= ~(1L << (n)))
)
#define TwoPower(n)                             (1L << (n))
#define Mask(x, n)                              ((x) & ~(~0L << (n)))
#define Max(a, b)                               (((a) > (b)) ? (a) : (b))
#define Min(a, b)                               (((a) < (b)) ? (a) : (b))
#define TRUE                                    1
#define FALSE                                   0

#define VIRGIN          0x0             /* the virgin (unblown) PROM state */
#define ADDSIZE         11              /* # address bits */
#define DATASIZE        8               /* # data bits */
#define NUMPROMS        2               /* # PROMS */
#define REVLEVEL        'A'             /* Revision level */

/* input bit fields */
#define HCNTSTART       0               /* pixel count */
#define HCNTBITS        10              /* # pixel count bits */
#define STAND525        10              /* 525 / 625- */

/* output bit fields */
#define HTC                     0               /* H to time-code overlay circuit */
#define SPARE1          1
#define VCNT            2               /* vertical count */
#define FLATCH          3               /* latch F reset */
#define SPARE2          4
#define SPARE3          5
#define SPARE4          6
#define LTC_CLK         7               /* clock to long. time-code circuit */
#define CS0                     8               /* composite sync shape  __------------ */
#define CS1                     9               /* composite sync shape  _------_------ */
#define CS2                     10              /* composite sync shape  _____--_____-- */
#define CS3                     11              /* composite sync shape  _-----_------ */
#define CS4                     12              /* composite sync shape  _------_____-- */
#define CS5                     13              /* composite sync shape  _____--_------ */
#define CS6                     14              /* composite sync shape  _------------ */
#define RESET           15              /* counter reset */

/* TV-related parameter definitions follow */
#define CLK_TO_USEC(x)  ((double) (x) / 13.5)
#define USEC                    CLK_TO_USEC(count)
#define USEC1                   (CLK_TO_USEC(count) + ((count < NCOUNTS / 2) ? 0 : 10000))
```

```
#define USEC2                  CLK_TO_USEC(count - NCOUNTS / 2)
#define NCOUNTS                (stand525 ? 858 : 864)   /* # clocks per line */
#define LINELEN                CLK_TO_USEC(NCOUNTS)     /* 1 TV line [us] */
#define STARTCNT               (stand525 ? 0 : 0)       /* TUNE THIS!!!!!!!!!!! */
#define CSOFFSET               (stand525 ? 0 : 0)       /* TUNE THIS!!!!!!!!!!! */

main()
{
        register short  add, data, count;
        short           hcnt, stand525;
        short           htc, href, vcnt, flatch, ltc_clk, reset;
        short           cs0, cs1, cs2, cs3, cs4, cs5, cs6;

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                hcnt = Mask(add >> HCNTSTART, HCNTBITS);
                stand525 = GetBit(add, STAND525);

                count = (hcnt - STARTCNT + NCOUNTS) % NCOUNTS;

                /* set intermediate values */
                htc     = (0.0 <= USEC && USEC < 1.0);    /* just a guess! */
                href    = (0.0 <= USEC && USEC < 4.7);
                vcnt    = (0.5 <= USEC && USEC < (0.5 + CLK_TO_USEC(1)));
                flatch  = ((NCOUNTS / 2) < count);
                ltc_clk = VIRGIN;         /* ask Jose what he wants */
                reset   = (hcnt == (NCOUNTS - 1));
                /* set composite sync values */
                count = (hcnt - (STARTCNT + CSOFFSET) + NCOUNTS) % NCOUNTS;
                cs0 = ! (0.0 <= USEC1 && USEC1 < 4.7);
                cs1 = ! ((0.0 <= USEC1 && USEC1 < 2.3) || (0.0 <= USEC2 && USEC2 < 2.3));
                cs2 = ((CLK_TO_USEC(NCOUNTS / 2) - 4.7) <= USEC1 && USEC1 < CLK_TO_USEC(NCOUNTS
/ 2)) ||
                        ((CLK_TO_USEC(NCOUNTS / 2) - 4.7) <= USEC2 && USEC2 < CLK_TO_USEC(NCOUNTS
/ 2));
                cs3 = ! ((0.0 <= USEC1 && USEC1 < 4.7) || (0.0 <= USEC2 && USEC2 < 2.3));
                cs4 = ! (0.0 <= USEC1 && USEC1 < 2.3) ||
                        ((CLK_TO_USEC(NCOUNTS / 2) - 4.7) <= USEC2 && USEC2 < CLK_TO_USEC(NCOUNTS
/ 2));
                cs5 = ((CLK_TO_USEC(NCOUNTS / 2) - 4.7) <= USEC1 && USEC1 < CLK_TO_USEC(NCOUNTS
/ 2)) ||
                        (0.0 <= USEC2 && USEC2 < 2.3);
                cs6 = ! (0.0 <= USEC1 && USEC1 < 2.3);

                /* set output values */
                data = VIRGIN;
                SetBit(data, HTC, htc);
                SetBit(data, SPARE1, href);      /* just for test purposes */
                SetBit(data, VCNT, vcnt);
                SetBit(data, FLATCH, flatch);
                SetBit(data, LTC_CLK, ltc_clk);
                SetBit(data, CS0, cs0);
                SetBit(data, CS1, cs1);
                SetBit(data, CS2, cs2);
                SetBit(data, CS3, cs3);
                SetBit(data, CS4, cs4);
                SetBit(data, CS5, cs5);
                SetBit(data, CS6, cs6);
                SetBit(data, RESET, reset);

                printf("%04x\n", data);
        }
}

/*
**      RT2 Master Vertical Control PROMs, Rev. A
**
**      2 PROM, 2K x 8
**
**      John Stern, Accom Inc, 10/91
**
*/
```

```
/* some macro "functions" follow */
#define NumEntries(array)               (sizeof(array) / sizeof(array[0]))
#define GetBit(x, n)                    (((x) & (1L << n)) != 0)
#define SetBit(x, n, val)               ((val) ? ((x) |= (1L << (n))) : ((x) &= ~(1L << (n)))
)
#define TwoPower(n)                           (1L << (n))
#define Mask(x, n)                            ((x) & ~(~0L << (n)))
#define Max(a, b)                             (((a) > (b)) ? (a) : (b))
#define Min(a, b)                             (((a) < (b)) ? (a) : (b))
#define TRUE                                  1
#define FALSE                                 0

#define VIRGIN          0x0             /* the virgin (unblown) PROM state */
#define ADDSIZE         11              /* # address bits */
#define DATASIZE        8               /* # data bits */
#define NUMPROMS        2               /* # PROMS */
#define REVLEVEL        'A'             /* Revision level */

/* input bit fields */
#define LINESTART       0               /* line count within field */
#define LINEBITS        10              /* # line count bits */
#define STAND525        10              /* 525 / 625- */

/* output bit fields */
#define FOUTA           0               /* F reset to channel A */
#define FOUTB           1               /* F reset to channel B */
#define VINT            2               /* CPU vertical interrupt */
#define V_TC            3               /* vertical sync to time-code overlay circuit */
#define FIELDTYPE       4               /* field 1 / field 2 to CPU */
#define V_DSP1          5               /* vertical sync #1 to DSP */
#define V_DSP2          6               /* vertical sync #2 to DSP */
#define SPARE1          7
#define CSSTART         8               /* composite sync bits */
#define CSBITS          3               /* # line count bits */
#define RESET           15              /* counter reset */

/* composite sync definitions below */
#define CS0                     0               /* composite sync shape  __------------- */
#define CS1                     1               /* composite sync shape  _-------_------ */
#define CS2                     2               /* composite sync shape  _____--_____-- */
#define CS3                     3               /* composite sync shape  __------_------ */
#define CS4                     4               /* composite sync shape  _-------_____-- */
#define CS5                     5               /* composite sync shape  _____--_------ */
#define CS6                     6               /* composite sync shape  _-------------- */

#define LSTART  (stand525 ? 9 : 11)     /* TUNE THIS!!!!!!!!!!! */
#define NLINES  (stand525 ? 525 : 625)


main()
{
        register short  add, data, stand525;
        short   lcnt, frameline, fieldline;
        short   fouta, foutb, vint, v_tc, fieldtype, v_dsp1, v_dsp2, fref, cs, reset;

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                lcnt = Mask(add >> LINESTART, LINEBITS);
                stand525 = GetBit(add, STAND525);

                /* define frame and field lines with correct start points */
                frameline = (lcnt + LSTART + NLINES) % NLINES;
                frameline++;    /* so starts at 1 */
                fieldline = ((frameline > (NLINES / 2 + stand525)) ? (frameline - (NLINES / 2 +
stand525)) : frameline);

                /* set intermediate values */
                /*
                **      Note: PAL line numbering here not in accordance with PAL standard,
                **      but as though similar to NTSC.
                */
```

```
if (stand525)
        fouta = foutb   = (frameline <= 3 || 266 <= frameline);
else
        fouta = foutb   = (frameline <= 2 || 315 <= frameline);
vint            = (fieldline == 1);
v_tc            = (fieldline == 1);
fieldtype       = (fieldline != frameline);
v_dsp1          = VIRGIN;       /* see what Jose whats */
v_dsp2          = VIRGIN;       /* see what Jose whats */
fref            = (frameline == 1);
reset           = ! (lcnt == (NLINES - 1));

/* set composite sync values */
frameline = (lcnt + LSTART + (stand525 ? 0: 2) + NLINES) % NLINES;
frameline++;    /* so starts at 1 */
fieldline = ((frameline > (NLINES / 2 + stand525)) ? (frameline - (NLINES / 2 +
stand525)) : frameline);
/*
**      Note: PAL line numbering here is in accordance with PAL standard
*/
if (stand525)
        switch (frameline)
        {
                default:
                        cs = CS0;
                        break;

                case 1:
                case 2:
                case 3:
                case 7:
                case 8:
                case 9:
                case 264:
                case 265:
                case 270:
                case 271:
                        cs = CS1;
                        break;

                case 4:
                case 5:
                case 6:
                case 267:
                case 268:
                        cs = CS2;
                        break;

                case 263:
                        cs = CS3;
                        break;

                case 266:
                        cs = CS4;
                        break;

                case 269:
                        cs = CS5;
                        break;

                case 272:
                        cs = CS6;
                        break;
        }
else    /* 625 */
        switch (frameline)
        {
                default:
                        cs = CS0;
                        break;

                case 4:
                case 5:
                case 311:
```

```
                case 312:
                case 316:
                case 317:
                case 624:
                case 625:
                        cs = CS1;
                        break;

                case 1:
                case 2:
                case 314:
                case 315:
                        cs = CS2;
                        break;

                case 623:
                        cs = CS3;
                        break;

                case 313:
                        cs = CS4;
                        break;

                case 3:
                        cs = CS5;
                        break;

                case 318:
                        cs = CS6;
                        break;
        }

        /* set output values */
        data = VIRGIN;
        SetBit(data, FOUTA, fouta);
        SetBit(data, FOUTB, foutb);
        SetBit(data, VINT, vint);
        SetBit(data, V_TC, v_tc);
        SetBit(data, FIELDTYPE, fieldtype);
        SetBit(data, V_DSP1, v_dsp1);
        SetBit(data, V_DSP2, v_dsp2);
        SetBit(data, SPARE1, fref);
        data |= Mask(cs, CSBITS) << CSSTART;
        SetBit(data, RESET, reset);

        printf("%04x\n", data);
    }
}/*
**      RT2 V Detect PROM, Rev. A
**      (same as used in FS1 and EC1 and KY1)
**
**      1 PROM, 256 x 8
**
**      John Stern, Accom Inc, 10/91
**
**      this PROM detect 625 sync about 3 lines late, but won't confuse 525
**      sync with 625 or vice-versa
*/

/* some macro "functions" follow */
#define NumEntries(array)           (sizeof(array) / sizeof(array[0]))
#define GetBit(x, n)                (((x) & (1L << n)) != 0)
#define SetBit(x, n, val)           ((val) ? ((x) |= (1L << (n))) : ((x) &= ~(1L << (n)))
)
#define TwoPower(n)                         (1L << (n))
#define Mask(x, n)                          ((x) & ~(~0L << (n)))
#define Max(a, b)                           (((a) > (b)) ? (a) : (b))
#define Min(a, b)                           (((a) < (b)) ? (a) : (b))
#define TRUE                                1
#define FALSE                               0

#define VIRGIN          0x0         /* the virgin (unblown) PROM state */
#define ADDSIZE         8           /* # address bits */
```

```
#define DATASIZE        4               /* # data bits */
#define NUMPROMS        1               /* # PROMS */
#define REVLEVEL        'A'             /* Revision level */

/* input bit fields */
#define LINESTART       0
#define LINEBITS        7
#define LF525           7       /* 525 / ~625 lines/frame address bit */

int             sync_525[] = {1, 1, 1, 1, 1, 1, 0,};
int             sync_625[] = {1, 0, 0, 0, 0, 0, 1,};

/* output bit fields */
#define VDETECT         0       /* ~V detect output bit */

main()
{
        register short  add, data;
        short   line, lf525, delay, vdetect, *syncPattern;

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                line = Mask(add >> LINESTART, LINEBITS);
                lf525 = GetBit(add, LF525);

                if (lf525)
                        syncPattern = sync_525;
                else
                        syncPattern = sync_625;

                for (vdetect = 1, delay = 0; delay < LINEBITS; delay++)
                        if (GetBit(line, delay) != syncPattern[delay])
                                vdetect = 0;

                /* set output values */
                data = VIRGIN;
                SetBit(data, VDETECT, ! vdetect);

                printf("%01x\n", data);
        }
}
/*
**      RT2 Communication uP Address Decoding PROM, Rev. A
**
**      1 PROM (27S29) , 512 x 8
**
**      Jose R. Alvarez, Accom Inc, 10/91
*/

/**********************/
/* Macro Definitions */
/**********************/
#define NumEntries(array)               (sizeof(array) / sizeof(array[0]))
#define GetBit(x, n)                    (((x) & (1L << n)) != 0)
#define SetBit(x, n, val)               ((val) ? ((x) |= (1L << (n))) : ((x) &= ~(1L << (n)))
)
#define TwoPower(n)                             (1L << (n))
#define Mask(x, n)                              ((x) & ~(~0L << (n)))
#define Max(a, b)                               (((a) > (b)) ? (a) : (b))
#define Min(a, b)                               (((a) < (b)) ? (a) : (b))
#define TRUE                                    1
#define FALSE                                   0

#define VIRGIN          0x0             /* the virgin (unblown) PROM state */
#define ADDSIZE         9                       /* # address bits */
#define DATASIZE        8                       /* # data bits */
#define NUMPROMS        1                       /* # PROMS */
#define REVLEVEL        'A'                     /* Revision level */

/*********************/
/* input bit fields */
/*********************/
```

```
#define A14_0           0               /* From 1st Comm uP */
#define A15_0           1               /* From 1st Comm uP */
#define BootSel0        2               /* From Main uP Output Register */
#define A14_1           3               /* From 2nd Comm uP */
#define A15_1           4               /* From 2nd Comm uP */
#define BootSel1        5               /* From Main uP Output Register */
#define Gnd                     6


/**********************/
/* output bit fields */
/**********************/
#define SRAM0_          0
#define DUART0_         1
#define DPRAM0_         2
#define NC0                     3
#define SRAM1_          4
#define DUART1_         5
#define DPRAM1_         6
#define NC1                     7               /* Not Connected */


/* TV-related parameter definitions follow */
#define ACTIVEPIXELS    720
#define CLK_TO_USEC(x)  ((double) (x) / 13.5)
#define USEC_TO_CLK(x)  ((short) ((x) * 13.5 + 0.5))
#define USEC                    CLK_TO_USEC(count)
#define NCOUNTS                 (stand525 ? 858 : 864)          /* # clocks per line */
#define LINELEN                 CLK_TO_USEC(NCOUNTS)            /* 1 TV line [us] */
#define STARTCNT                (stand525 ? -134 : -134) /* tune this */

main(argc, argv)
int  argc;
char **argv;
{
        register long   data;
        register short  add, count, hcnt, stand525;

        short   b14_0, b14_1, b15_0, b15_1, boot0, boot1;
        short   Q0, Q1, Q2, Q3, Q4, Q5, Q6, Q7;

        int             BFLAG = FALSE, DFLAG = FALSE;

        char    datastr[32], b0[10], b1[10];


        /* String for 'bit-high' should be "   |." */
        b1[0] = 32;
        b1[1] = 32;
        b1[2] = 32;
        b1[3] = 179;
        b1[4] = 46;
        b1[5] = 0;

        /* String for 'bit-low' should be " |  ." */
        b0[0] = 32;
        b0[1] = 179;
        b0[2] = 32;
        b0[3] = 32;
        b0[4] = 46;
        b0[5] = 0;

        /*********************************/
        /* Simple parsing for BIT  FLAG */
        /*              and DISPLAY FLAG */
        /*                               */
        /* "comdec t" sets BFLAG to      */
        /*    displays individual bits   */
        /*    in binary form             */
        /*                               */
        /* "comdec d" sets DFLAG to      */
        /*    displays individual bits   */
        /*    in rudimentary character   */
        /*    graphical representation   */
        /*********************************/
```

```
if  (argc > 1) {
        if (*argv[1] == 'b')
                BFLAG = TRUE;
        if (*argv[1] == 'd')
                DFLAG = TRUE;
        if (*argv[1] == 'a') {
                BFLAG = TRUE;
                DFLAG = TRUE;
}
}


printf("%d\t%d\t%d\t%c\n", ADDSIZE, DATASIZE, NUMPROMS, REVLEVEL);

for (add = 0; add < TwoPower(ADDSIZE); add++)
{
        /* get input values */
        b14_0 = GetBit(add,A14_0);
        b14_1 = GetBit(add,A14_0);
        b15_0 = GetBit(add,A15_0);
        b15_1 = GetBit(add,A14_1);
        boot0   = GetBit(add,BootSel0);
        boot1   = GetBit(add,BootSel1);


        /* set intermediate values */
        Q0  = !((!b14_0 & !b15_0 & boot0) | (!b14_0 & b15_0 & !boot0));
        Q1  = !(b14_0 & b15_0);
        Q2  = !((!b14_0 & !b15_0 & !boot0) | (!b14_0 & b15_0 & boot0));
        Q3  = 0 ;
        Q4  = !((!b14_1 & !b15_1 & boot1) | (!b14_1 & b15_1 & !boot1));
        Q5  = !(b14_1 & b15_1);
        Q6  = !((!b14_1 & !b15_1 & !boot1) | (!b14_1 & b15_1 & boot1));
        Q7  = 0 ;

        if (DFLAG) {
                printf("%s", Q7 ? b1 : b0 );
                printf("%s", Q6 ? b1 : b0 );
                printf("%s", Q5 ? b1 : b0 );
                printf("%s", Q4 ? b1 : b0 );
                printf("%s", Q3 ? b1 : b0 );
                printf("%s", Q2 ? b1 : b0 );
                printf("%s", Q1 ? b1 : b0 );
                printf("%s", Q0 ? b1 : b0 );
                printf("    ");
        }

        /* set output values */
        data = VIRGIN;
        SetBit(data, SRAM0_, Q0);
         SetBit(data, DUART0_, Q1);
         SetBit(data, DPRAM0_, Q2);
         SetBit(data, NC0, Q3);
         SetBit(data, SRAM1_, Q4);
         SetBit(data, DUART1_, Q5);
         SetBit(data, DPRAM1_, Q6);
         SetBit(data, NC1, Q7);

         if (BFLAG || DFLAG)
                 printf("Addr:%4d  ",add);

         sprintf(datastr,"%%0%dX",NUMPROMS * 2);
         printf(datastr,data);

         if (BFLAG)
                 printf("  %1d%1d%1d%1d%1d%1d%1d%1d\n",
                         Q7,Q6,Q5,Q4,Q3,Q2,Q1,Q0);
         else
                 printf("\n");
 }
}

MODULE  RT2_HDelay0
flag    '-r3'
TITLE   'RT2 - H Delay Timing PAL 0
```

```
John Stern, Accom Inc.
9/91
Version A
'

HDelay0 device 'P22V10';
        CLK                        pin 1;
        X7, X6, X5, X4, X3, X2, X1, X0          pin 10, 9, 8, 7, 6, 5, 4, 3;
        FDET            pin 11;
        FDETREG         pin 13;

        CRESET          pin 14;
        CENA            pin 15;
        C7, C6, C5, C4, C3, C2, C1, C0          pin 19, 18, 17, 20, 21, 16, 22, 23;

        True, False     = 1,0;
        High, Low       = 1,0;
        H,L,Q,X,Z       = 1,0,.C.,.X.,.Z.;

        XIn                        = [X7, X6, X5, X4, X3, X2, X1, X0];
        Count           = [C7, C6, C5, C4, C3, C2, C1, C0];
        CReset          = CRESET;
        MaxCount        = 254;


equations
        C0                         := (CReset & X0) # (! CReset & ! C0);
        C1                         := (CReset & X1) # (! CReset &
                                        ((! C1 & (C0)) #
                                         (C1 & ! (C0))));
        C2                         := (CReset & X2) # (! CReset &
                                        ((! C2 & (C1 & C0)) #
                                         (C2 & ! (C1 & C0))));
        C3                         := (CReset & X3) # (! CReset &
                                        ((! C3 & (C2 & C1 & C0)) #
                                         (C3 & ! (C2 & C1 & C0))));
        C4                         := (CReset & X4) # (! CReset &
                                        ((! C4 & (C3 & C2 & C1 & C0)) #
                                         (C4 & ! (C3 & C2 & C1 & C0))));
        C5                         := (CReset & X5) # (! CReset &
                                        ((! C5 & (C4 & C3 & C2 & C1 & C0)) #
                                         (C5 & ! (C4 & C3 & C2 & C1 & C0))));
        C6                         := (CReset & X6) # (! CReset &
                                        ((! C6 & (C5 & C4 & C3 & C2 & C1 & C0)) #
                                         (C6 & ! (C5 & C4 & C3 & C2 & C1 & C0))));
        C7                         := (CReset & X7) # (! CReset &
                                        ((! C7 & (C6 & C5 & C4 & C3 & C2 & C1 & C0)) #
                                         (C7 & ! (C6 & C5 & C4 & C3 & C2 & C1 & C0))));
        CRESET          := ! FDET & FDETREG;    "falling edge of FDET"
        CENA            := (Count == MaxCount);


test_vectors
        ([CLK,  XIn,    FDET,   FDETREG]        ->      [Count, CENA,   CRESET])
          [Q,   X,              H,              X]                      ->      [X,     X,X
          [Q,   X,              X,              L]                      ->      [X,     X,X
          [Q,   X,              L,              H]                      ->      [X,     X,
H];     "reset"
          [Q,   249,    L,              L]                      ->      [249,   L,
L];     "load"
          [Q,   X,              L,              L]                      ->      [250,   L,
L];     "count"
          [Q,   X,              L,              L]                      ->      [251,   L,
L];     "count"
          [Q,   X,              L,              L]                      ->      [252,   L,
L];     "count"
          [Q,   X,              L,              L]                      ->      [253,   L,
L];     "count"
          [Q,   X,              L,              L]                      ->      [254,   L,
L];     "count"
          [Q,   X,              H,              L]                      ->      [255,   H,
L];     "count"
          [Q,   X,              H,              H]                      ->      [0,     L,
L];     "count"
          [Q,   X,              H,              H]                      ->      [1,     L,
```

```
L];     "count"
         [Q,     X,           H,           H]              ->    [2,    L,
L];     "count"
         [Q,     X,           H,           H]              ->    [3,    L,
L];     "count"
         [Q,     X,           H,           H]              ->    [4,    L,
L];     "count"


end     RT2_HDelay0


MODULE  RT2_HDelay1
flag    '-r3'
TITLE   'RT2 - H Delay Timing PAL 1
               John Stern, Accom Inc.
               9/91
               Version A
'

HDelay1 device 'P22V10';
        CLK                      pin 1;
        X4, X3, X2, X1, X0              pin 7, 6, 5, 4, 3;
        CENABLE         pin 10;
        FDET            pin 11;
        FLATCH          pin 13;

        FLOAD           pin 15;
        HLOAD           pin 14;
        C4, C3, C2, C1, C0              pin 19, 18, 17, 20, 21;
        FREG1           pin 22;
        FREG2           pin 16;
        FDETREG         pin 23;
        True, False     = 1,0;
        High, Low       = 1,0;
        H,L,Q,X,Z       = 1,0,.C.,.X.,.Z.;

        XIn                     = [X4, X3, X2, X1, X0];
        Count           = [C4, C3, C2, C1, C0];
        CReset          = ! FDET & FDETREG;      "falling edge of FDET"
        MaxCount        = 31;
        AtMax           = (Count == MaxCount);
        DoCount         = CENABLE & ! CReset & ! AtMax;


equations
        C0                      := (CReset & X0) # (! CReset & ((! DoCount & C0) # (DoCount &
                                        ((! C0 & (1)) #
                                         (C0 & ! (1))))));
        C1                      := (CReset & X1) # (! CReset & ((! DoCount & C1) # (DoCount &
                                        ((! C1 & (C0)) #
                                         (C1 & ! (C0))))));
        C2                      := (CReset & X2) # (! CReset & ((! DoCount & C2) # (DoCount &
                                        ((! C2 & (C1 & C0)) #
                                         (C2 & ! (C1 & C0))))));
        C3                      := (CReset & X3) # (! CReset & ((! DoCount & C3) # (DoCount &
                                        ((! C3 & (C2 & C1 & C0)) #
                                         (C3 & ! (C2 & C1 & C0))))));
        C4                      := (CReset & X4) # (! CReset & ((! DoCount & C4) # (DoCount &
                                        ((! C4 & (C3 & C2 & C1 & C0)) #
                                         (C4 & ! (C3 & C2 & C1 & C0))))));
        FDETREG         := FDET;
        HLOAD           := ! (DoCount & (Count == (MaxCount - 1)));
        FREG1           := ! CReset & ((FLATCH & AtMax) # (! FLATCH & FREG1));
        FREG2           := ! CReset & ((FLATCH & FREG1) # (! FLATCH & FREG2));
        FLOAD           := ! (FREG1 & ! FREG2);


test_vectors
        ([CLK, XIn, CENABLE, FDET,      FLATCH] ->
                                                        [Count, HLOAD, FLOAD, FREG1,
FREG2, FDETREG])
         [Q, X,        X, H, X]        ->     [X,           X, X, X, X, H];
```

```
        [Q, 27,        X, L, X]      ->      [27,    H, H, L, L, L];  "reset"
        [Q, X,         L, L, X]      ->      [27,    H, H, L, L, L];  "hold"
        [Q, X,         H, L, X]      ->      [28,    H, H, L, L, L];  "count"
        [Q, X,         L, L, X]      ->      [28,    H, H, L, L, L];  "hold"
        [Q, X,         H, L, X]      ->      [29,    H, H, L, L, L];  "count"
        [Q, X,         L, L, X]      ->      [29,    H, H, L, L, L];  "hold"
        [Q, X,         H, L, X]      ->      [30,    H, H, L, L, L];  "count"
        [Q, X,         L, H, X]      ->      [30,    H, H, L, L, H];  "hold"
        [Q, X,         H, H, X]      ->      [31,    L, H, L, L, H];  "count"
        [Q, X,         X, H, L]      ->      [31,    H, H, L, L, H];  "stop count"
        [Q, X,         X, H, H]      ->      [31,    H, H, H, L, H];  "stop count"
        [Q, X,         X, H, L]      ->      [31,    H, L, H, L, H];  "stop count"
        [Q, X,         X, H, H]      ->      [31,    H, L, H, H, H];  "stop count"
        [Q, X,         X, H, X]      ->      [31,    H, H, H, H, H];  "stop count"

end     RT2_HDelay1
MODULE  RT2_VStand
flag    '-r2'
TITLE   'RT2 - 525/625 Video Standard Detector PAL
                note - the same as that used in EC1 and KY1
                John Stern, Accom Inc.
                10/91
                Version A
'
VStand  device  'P22V10';
        CLK                     pin 1;
        VERT            pin 2;

        VREG            pin 14;
        LREG            pin 15;
        L4, L3, L2, L1, L0      pin 19, 20, 21, 22, 23;
        F2, F1, F0      pin 18, 17, 16;

        True, False     = 1,0;
        High, Low       = 1,0;
        H,L,Q,X         = 1,0,.C.,.X.;

        LCount          = [L4, L3, L2, L1, L0];
        FCount          = [F2, F1, F0];
        VReset          = VREG $ VERT;   "once per field"

"       State Machine State Assignments
        S0      = ^b00000;      S1      = ^b00001;      S2      = ^b00010;      S3      =
        S4      = ^b00100;      S5      = ^b00101;      S6      = ^b00110;      S7      =
        S8      = ^b01000;      S9      = ^b01001;      S10     = ^b01010;      S11     =
        S12     = ^b01100;      S13     = ^b01101;      S14     = ^b01110;      S15     =
        S16     = ^b10000;      S17     = ^b10001;      S18     = ^b10010;      S19     =
        S20     = ^b10100;      S21     = ^b10101;      S22     = ^b10110;      S23     =
        S24     = ^b11000;      S25     = ^b11001;      S26     = ^b11010;      S27     =
        S28     = ^b11100;      S29     = ^b11101;      S30     = ^b11110;      S31     =

        C0      = ^b000;        C1      = ^b001;        C2      = ^b010;        C3      =
        C4      = ^b100;        C5      = ^b101;        C6      = ^b110;        C7      =

equations
        VREG            := VERT;
        LREG            := ((VReset & ! L4) # (! VReset & LREG));        "sample MSB at VReset
time"

state_diagram LCount
        "5-bit line counter"
        State S0:       case (VReset)   :S0;    (! VReset)      :S1;    endcase;        "cnt
up"
        State S1:       case (VReset)   :S0;    (! VReset)      :S2;    endcase;        "cnt
up"
        State S2:       case (VReset)   :S0;    (! VReset)      :S3;    endcase;        "cnt
up"
        State S3:       case (VReset)   :S0;    (! VReset)      :S4;    endcase;        "cnt
up"
        State S4:       case (VReset)   :S0;    (! VReset)      :S5;    endcase;        "cnt
up"
        State S5:       case (VReset)   :S0;    (! VReset)      :S6;    endcase;        "cnt
```

```
up"
        State S6:     case (VReset)   :S0;   (! VReset)   :S7;   endcase;   "count
up"
        State S7:     case (VReset)   :S0;   (! VReset)   :S8;   endcase;   "count
up"
        State S8:     case (VReset)   :S0;   (! VReset)   :S9;   endcase;   "count
up"
        State S9:     case (VReset)   :S0;   (! VReset)   :S10;  endcase;   "count
up"
        State S10:    case (VReset)   :S0;   (! VReset)   :S11;  endcase;   "count
up"
        State S11:    case (VReset)   :S0;   (! VReset)   :S12;  endcase;   "count
up"
        State S12:    case (VReset)   :S0;   (! VReset)   :S13;  endcase;   "count
up"
        State S13:    case (VReset)   :S0;   (! VReset)   :S14;  endcase;   "count
up"
        State S14:    case (VReset)   :S0;   (! VReset)   :S15;  endcase;   "count
up"
        State S15:    case (VReset)   :S0;   (! VReset)   :S16;  endcase;   "count
up"
        State S16:    case (VReset)   :S0;   (! VReset)   :S17;  endcase;   "count
up"
        State S17:    case (VReset)   :S0;   (! VReset)   :S18;  endcase;   "count
up"
        State S18:    case (VReset)   :S0;   (! VReset)   :S19;  endcase;   "count
up"
        State S19:    case (VReset)   :S0;   (! VReset)   :S20;  endcase;   "count
up"
        State S20:    case (VReset)   :S0;   (! VReset)   :S21;  endcase;   "count
up"
        State S21:    case (VReset)   :S0;   (! VReset)   :S22;  endcase;   "count
up"
        State S22:    case (VReset)   :S0;   (! VReset)   :S23;  endcase;   "count
up"
        State S23:    case (VReset)   :S0;   (! VReset)   :S24;  endcase;   "count
up"
        State S24:    case (VReset)   :S0;   (! VReset)   :S25;  endcase;   "count
up"
        State S25:    case (VReset)   :S0;   (! VReset)   :S26;  endcase;   "count
up"
        State S26:    case (VReset)   :S0;   (! VReset)   :S27;  endcase;   "count
up"
        State S27:    case (VReset)   :S0;   (! VReset)   :S28;  endcase;   "count
up"
        State S28:    case (VReset)   :S0;   (! VReset)   :S29;  endcase;   "count
up"
        State S29:    case (VReset)   :S0;   (! VReset)   :S30;  endcase;   "count
up"
        State S30:    case (VReset)   :S0;   (! VReset)   :S31;  endcase;   "count
up"
        State S31:    case (VReset)   :S0;   (! VReset)   :S0;   endcase;   "wrap
around"

state_diagram FCount
        "3-bit up/down field counter"
        State C0:     case    (VReset & LREG)          :C1;   "count up"
                              (VReset & ! LREG)        :C0;   "hold"
                              (! VReset)                      :C0;   "stay
put"
                      endcase;

        State C1:     case    (VReset & LREG)          :C2;   "count up"
                              (VReset & ! LREG)        :C0;   "count down"
                              (! VReset)                      :C1;   "stay
put"
                      endcase;

        State C2:     case    (VReset & LREG)          :C3;   "count up"
                              (VReset & ! LREG)        :C1;   "count down"
                              (! VReset)                      :C2;   "stay
put"
                      endcase;
```

```
State C3:        case    (VReset & LREG)          :C4;    "count up"
                                (VReset & ! LREG)        :C2;     "count down"
                                (! VReset)                        :C3;     "stay
put"
                        endcase;

State C4:        case    (VReset & LREG)          :C5;    "count up"
                                (VReset & ! LREG)        :C3;     "count down"
                                (! VReset)                        :C4;     "stay
put"
                        endcase;
State C5:        case    (VReset & LREG)          :C6;    "count up"
                                (VReset & ! LREG)        :C4;     "count down"
                                (! VReset)                        :C5;     "stay
put"
                        endcase;

State C6:        case    (VReset & LREG)          :C7;    "count up"
                                (VReset & ! LREG)        :C5;     "count down"
                                (! VReset)                        :C6;     "stay
put"
                        endcase;

State C7:        case    (VReset & LREG)          :C7;    "hold"
                                (VReset & ! LREG)        :C6;     "count down"
                                (! VReset)                        :C7;     "stay
put"
                        endcase;

test_vectors
        ([CLK,   VERT]   ->      [VREG,  LCount, LREG,   FCount])
         [Q,     H]              ->      [H,             S0,             L,              C0];
         [Q,     L]              ->      [L,             S0,             H,              C5];
         [Q,     L]              ->      [L,             S1,             H,              C5];
         [Q,     L]              ->      [L,             S2,             H,              C5];
         [Q,     L]              ->      [L,             S3,             H,              C5];
         [Q,     L]              ->      [L,             S4,             H,              C5];
         [Q,     L]              ->      [L,             S5,             H,              C5];
         [Q,     L]              ->      [L,             S6,             H,              C5];
         [Q,     L]              ->      [L,             S7,             H,              C5];
         [Q,     L]              ->      [L,             S8,             H,              C5];
         [Q,     L]              ->      [L,             S9,             H,              C5];
         [Q,     L]              ->      [L,             S10,    H,              C5];
         [Q,     L]              ->      [L,             S11,    H,              C5];
         [Q,     L]              ->      [L,             S12,    H,              C5];
         [Q,     L]              ->      [L,             S13,    H,              C5];
         [Q,     L]              ->      [L,             S14,    H,              C5];
         [Q,     L]              ->      [L,             S15,    H,              C5];
         [Q,     L]              ->      [L,             S16,    H,              C5];
         [Q,     L]              ->      [L,             S17,    H,              C5];
         [Q,     L]              ->      [L,             S18,    H,              C5];
         [Q,     L]              ->      [L,             S19,    H,              C5];
         [Q,     H]              ->      [H,             S0,             L,              C6];
         [Q,     H]              ->      [H,             S1,             L,              C6];
         [Q,     H]              ->      [H,             S2,             L,              C6];
         [Q,     L]              ->      [L,             S0,             H,              C5];
         [Q,     L]              ->      [L,             S1,             H,              C5];
         [Q,     H]              ->      [H,             S0,             H,              C6];
         [Q,     H]              ->      [H,             S1,             H,              C6];
         [Q,     L]              ->      [L,             S0,             H,              C7];
         [Q,     L]              ->      [L,             S1,             H,              C7];
         [Q,     H]              ->      [H,             S0,             H,              C7];
         [Q,     H]              ->      [H,             S1,             H,              C7];

end     RT2_VStand

MODULE  UP_MEMDEC1
flag    '-r3'
TITLE   'RT2 - Microprocessor Memory Decoder
                Jose R. Alvarez, Accom Inc.
                10/91
                Version A
'
```

```
MemDec1 device 'P22V10';
"Input signals
        A24, A23, A22, A21, A20, A19, A18       pin 11, 10, 9, 8, 7, 6, 5;
        FC2                                     pin 4;
        SIZ1                                    pin 3;
        SIZ0                                    pin 2;
        A0                                      pin 1;

"Output signals
        ~EEPROM_O                               pin 23;
        ~EEPROM_E                               pin 22;
        ~LANCE_O                                pin 21;
        ~LANCE_E                                pin 20;
        ~LANCE_RAM                              pin 19;
        ~LANCE                                  pin 18;
        ~DSP_O                                  pin 17;
        ~DSP_E                                  pin 16;
        ~DSP_RAM                                pin 15;
        ~DSP                                    pin 14;

"Definitions
        True, False       = 1,0;
        High, Low         = 1,0;
        H,L,Q,X,Z         = 1,0,.C.,.X.,.Z.;


        ADDRESS    = [A24, A23,A22,A21,A20, A19,A0];

"EEPROM Base Address ... Range: 00900000h - 009FFFFFh
        EEPROM_B   = !A24 & A23 & !A22 & !A21 & A20;

"LANCE Base Address  ... Range: 00B00000h - 00BFFFFFh
        LANCE_B    = !A24 & A23 & !A22 & A21 & A20 & A19;
        LANCE_SEL = !A24 & A23 & !A22 & A21 & A20 & !A19;

"DSP Base Address    ... Range: 00C00000h - 00CFFFFFh
        DSP_B      = !A24 & A23 & A22 & !A21 & !A20 & A19;
        DSP_SEL    = !A24 & A23 & A22 & !A21 & !A20 & !A19;

EQUATIONS

        !~EEPROM_O  = !FC2 & EEPROM_B & (!SIZ0 # A0);
        !~EEPROM_E  = !FC2 & EEPROM_B & (!SIZ0 # !A0);
        !~LANCE_O   = !FC2 & LANCE_B & (!SIZ0 # A0);
        !~LANCE_E   = !FC2 & LANCE_B & (!SIZ0 # !A0);
        !~LANCE_RAM = !FC2 & LANCE_B;
        !~LANCE     = !FC2 & LANCE_SEL;
        !~DSP_O     = !FC2 & DSP_B & (!SIZ0 # A0);
        !~DSP_E     = !FC2 & DSP_B & (!SIZ0 # !A0);
        !~DSP_RAM   = !FC2 & DSP_B;
        !~DSP       = !FC2 & DSP_SEL;

"TEST_VECTORS
"       ([ADDRESS,       !FC2,    !SIZ0]  ->      [~EEPROM_E])
"
"        [X,             H,       H]      ->      [H];
"        [X,             H,       L]      ->      [H];
"        [X,             L,       H]      ->      [H];
"        [^H0900,        H,       L]      ->      [L];
"        [^H0901,        H,       L]      ->      [H];
"        [^H1900,        H,       L]      ->      [H];
"
end     UP_MEMDEC1


"*******************************************************************
"*******************************************************************
"*******************************************************************
MODULE  UP_MEMDEC2
flag    '-r3'
TITLE   'RT2 - Microprocessor Memory Decoder
                Jose R. Alvarez, Accom Inc.
                10/91
                Version A
'
```

```
MemDec2 device 'P22V10';

"Input signals
        A24, A23, A22, A21, A20, A19, A18       pin 11, 10, 9, 8, 7, 6, 5;
        FC2                                     pin 4;
        SIZ1                                    pin 3;
        SIZ0                                    pin 2;
        A0                                      pin 1;

"Output signals
        ~COMCS0                                 pin 23;
        ~COMCS1                                 pin 22;
        ~COMCS2                                 pin 21;
        ~COMCS3                                 pin 20;
        DEVICE8                                 pin 19;
        DEVICE16                                pin 18;
        ~SCSI                                   pin 17;
        ~TCA_ENA                                pin 16;
        ~TCB_ENA                                pin 15;
        ~EXT_IO                                 pin 14;

"Definitions
        True, False     = 1,0;
        High, Low       = 1,0;
        H,L,Q,X,Z       = 1,0,.C.,.X.,.Z.;


        ADDRESS   = [X,X,X,A24, A23,A22,A21,A20, A19,A18,X,X, X,X,X,A0];

        COM0      = !A24 & A23 & !A22 & A21 & !A20 & !A19 & !A18;
        COM1      = !A24 & A23 & !A22 & A21 & !A20 & !A19 & A18;
        COM2      = !A24 & A23 & !A22 & A21 & !A20 & A19 & !A18;
        COM3      = !A24 & A23 & !A22 & A21 & !A20 & A19 & A18;

        COMUP     = !A24 & A23 & !A22 & A21 & !A20;
        SCSIEN    = !A24 & A23 & A22 & !A21 & A20;
        TCAB      = !A24 & A23 & A22 & A21 & !A20;
        RT3DSK    =  A24 & !A23 & A22 & !A21 & A20 & A19;
        RT5DSK    =  A24 & A23 & !A22 & A21 & A20 & A19;

        TCA       = !A24 & A23 & A22 & A21 & !A20 & !A19;
        TCB       = !A24 & A23 & A22 & A21 & !A20 & A19;


EQUATIONS

        !~COMCS0  = !FC2 & COM0;
        !~COMCS1  = !FC2 & COM1;
        !~COMCS2  = !FC2 & COM2;
        !~COMCS3  = !FC2 & COM3;
        DEVICE8   = !FC2 & (COMUP # SCSIEN # TCAB # RT3DSK # RT5DSK);
        DEVICE16  = !DEVICE8;
        !~SCSI    = !FC2 & SCSIEN;
        !~TCA_ENA = !FC2 & TCA;
        !~TCB_ENA = !FC2 & TCB;
        !~EXT_IO  = !FC2 & A24;


"TEST_VECTORS
"       ([ADDRESS,      !FC2,   !SIZ0]  ->      [~EEPROM_E])
"
"        [X,            H,      H]      ->      [H];
"        [X,            H,      L]      ->      [H];
"        [X,            L,      H]      ->      [H];
"        [^H0900,       H,      L]      ->      [L];
"        [^H0901,       H,      L]      ->      [H];
"        [^H1900,       H,      L]      ->      [H];

end     UP_MEMDEC2
MODULE  BUSCTL
flag    '-r3'
TITLE   'RT2 - Microprocessor Bus Control PAL
                Jose R. Alvarez, Accom Inc.
                10/91
                Version A
```

```
'
" IMPLEMENTATION NOTES:
" --------------------
"
" Previous microprocessor control board RT3 was built for an Intel
" uP bus. It has EVEN byte-wide addresses attached to the low order
" 8-bits of the data bus. The new design RT2 uses a Motorola processor
" MC68340, which uses EVEN byte-wide addresses on the HIGH 8-bits.
"
" To accommodate this difference, A0 to all external boards is Inverted
" before it is sent out. Therefore, the upper bank is accessed by EVEN
" addresses. EVEN addresses become ODD addresses on other boards and
" vice versa. RT1 may need to re-invert since it is designed for a
" Motorola Bus.

BusCtl device 'P22V10';

"Input signals

        ~MWAIT          pin 1;
        ~DDSACK1        pin 2;
        DEVICE8         pin 3;
        DEVICE16        pin 4;
        R~W             pin 5;
        ~AS             pin 6;
        ~DS             pin 7;
        SIZ0            pin 8;
        SIZ1            pin 9;
        A0              pin 10;
        FC2             pin 11;
        A24             pin 13;
        ~DPBUSY         pin 23;
        ~LANCE_BUSY     pin 22;
        ~EPROM          pin 21;

"Output signals

        DSACK0~         pin 20;
        DSACK1~         pin 19;
        MRD~            pin 18;
        MWR~            pin 17;
        XRD~            pin 16;
        XWR~            pin 15;
        UBE~            pin 14;

"Definitions

        True, False     = 1,0;
        High, Low       = 1,0;
        H,L,Q,X,Z       = 1,0,.C.,.X.,.Z.;


EQUATIONS

" Microprocessor Dynamic Bus Sizing inputs
        DSACK0~ = !(~MWAIT & ~DPBUSY & ~LANCE_BUSY & DEVICE8) ;
        DSACK1~ = (!(~MWAIT & ~DPBUSY & ~LANCE_BUSY & DEVICE16) # ~DDSACK1)
                  # !~EPROM ;

" ... Intel lives! ... here is proof:
" Preservation of Intel backward compatibility
        MRD~    = !R~W # ~DS ;
        MWR~    =  R~W # ~DS ;

" Non-RT2 Intel compatible signals
        XRD~    = !( R~W & !~DS & !FC2 & A24) ;
        XWR~    = !(!R~W & !~DS & !FC2 & A24) ;
        UBE~    = !FC2 & A24 & (SIZ0 # !A0) ;


"TEST_VECTORS
"
```

```
end     BUSCTL
MODULE  LANCECTL
flag    '-r3'
TITLE   'RT2 - LANCE Control PAL
                Jose R. Alvarez, Accom Inc.
                10/91
                Version A
'

LANCECtl device 'P22V10';

"Input signals

        MCLK            pin 1;
        ~READY          pin 5;
        ~EBUSY          pin 6;
        R~W             pin 10;
        ~DS             pin 11;
        ~LANCE          pin 13;

"Output signals

        ~RDY            pin 20;
        ~LANCE_BUSY     pin 19;
        LANCE_R~W       pin 15;
        ~LANCE_DAS      pin 14;


"Definitions

        True, False     = 1,0;
        High, Low       = 1,0;
        H,L,Q,X,Z       = 1,0,.C.,.X.,.Z.;


EQUATIONS

ENABLE  ~RDY        = ~LANCE;
        ~RDY        = !~EBUSY;
        ~LANCE_BUSY = !(!~LANCE & ~READY);

ENABLE  LANCE_R~W   = !~LANCE;
        LANCE_R~W   = R~W;

ENABLE  ~LANCE_DAS  = !~LANCE;
        ~LANCE_DAS  = ~DS;


"TEST_VECTORS
"       ([ADDRESS,      !FC2,   !SIZ0]  ->      [~EEPROM_E])
"
"        [X,            H,      H]      ->      [H];
"        [X,            H,      L]      ->      [H];
"        [X,            L,      H]      ->      [H];
"        [^H0900,       H,      L]      ->      [L];
"        [^H0901,       H,      L]      ->      [H];
"        [^H1900,       H,      L]      ->      [H];

end     LANCECTL
MODULE  INTCTL
flag    '-r3'
TITLE   'RT2 - Interrupt Control PAL
                Jose R. Alvarez, Accom Inc.
                10/91
                Version A
'

IntCtl device 'P22V10';

"Input signals

        MCLK            pin 1;
        ~LANCE_INT      pin 2;
```

```
        SCSI_INT        pin 3;
        XFER_ENA        pin 4;
        XFER_ACK        pin 5;
        V_INT           pin 6;
        V_ENA           pin 7;
        V_ACK           pin 8;
        INTFRAME        pin 9;
        F_ENA           pin 10;
        F_ACK           pin 11;

"Output signals

        MCLKhalf        pin 23;
        ~E_XFER_INT     pin 20;
        ~E_V_INT        pin 19;
        ~E_FR_INT       pin 18;

"Definitions

        True, False     = 1,0;
        High, Low       = 1,0;
        H,L,Q,X,Z       = 1,0,.C.,.X.,.Z.;


EQUATIONS

        MCLKhalf         := !MCLKhalf ;

" Since the 22V10 has 'global' preset (PR) and reset (AR) signals,
" the implementation of a pin_preset and pin_reset must be done
" with an SR Latch.
" Remember that the feedback path of the SR flip-flop must always
" be anabled for proper operation.
"
" In ABEL, an SR flip-flop can be implemented as:
"
"               Q = S # (!R & Q)
"
"                                           SR  Q
"                                           --  -
"                                           00  Q
"                                           01  0  reset
"                                           10  1  preset
"                                           11  1  undetermined
"
"
ENABLE  ~E_XFER_INT     = 1 ;
        ~E_XFER_INT     = XFER_ACK # (~LANCE_INT & !SCSI_INT & ~E_XFER_INT);

ENABLE  ~E_V_INT        = 1 ;
        ~E_V_INT        = V_ACK # (!V_INT & ~E_V_INT);

ENABLE  ~E_FR_INT       = 1 ;
        ~E_FR_INT       = F_ACK # (!INTFRAME & ~E_FR_INT);



TEST_VECTORS
        ([XFER_ACK, ~LANCE_INT, SCSI_INT] -> [~E_XFER_INT])
         [  X     ,     L     ,    X    ] -> [     L     ];
         [  X     ,     H     ,    H    ] -> [     L     ];
         [  H     ,     H     ,    H    ] -> [     H     ];
         [  H     ,     X     ,    X    ] -> [     H     ];


TEST_VECTORS
        ([V_ACK, V_INT]                 -> [~E_V_INT])
         [ X,      L ]                  -> [   L   ];
         [ H,      H ]                  -> [   H   ];
         [ H,      X ]                  -> [   H   ];


TEST_VECTORS
        ([F_ACK, INTFRAME]              -> [~E_FR_INT])
```

```
        [ X ,    L ]          -> [   L   ];
        [ H ,    H ]          -> [   H   ];
        [ H ,    X ]          -> [   H   ];


end     INTCTL
MODULE  DRAMCTL1
flag    '-r3'
TITLE   'RT2 - Microprocessor DRAM Control PAL
                Jose R. Alvarez, Accom Inc.
                10/91
                Version A
'


DRAM_Ctl1 device 'P16R4';

"Input signals

        MCLK~           pin 1;  "CLKB
        MCLK            pin 2;  "CLK
        MCLK2~          pin 3;  "CLKB2
        DRAM~           pin 4;  "~DRAMSEL
        REFRESH         pin 5;  "TOUT
        RESET~          pin 6;  "~RESET

"Output signals

        B2, B1, B0      pin 15, 16, 17;
        MUXSEL          pin 14;
        RAS             pin 19;
        CAS             pin 18;
        RFQ             pin 12;
        DSACK1~         pin 13;
        OE~             pin 11;


"Definitions

        True, False     = 1,0;
        High, Low       = 1,0;
        H,L,Q,X,Z       = 1,0,.C.,.X.,.Z.;


"Set Assignments
        state_bits      = [B2, B1, B0];


"Master State Values
        T0              = (state_bits == ^b000); t0=^b000 ;
        T1              = (state_bits == ^b001); t1=^b001 ;
        T2              = (state_bits == ^b011); t2=^b011 ;
        T3              = (state_bits == ^b010); t3=^b010 ;
        T4              = (state_bits == ^b100); t4=^b100 ;
        T5              = (state_bits == ^b101); t5=^b101 ;
        T6              = (state_bits == ^b111); t6=^b111 ;
        T7              = (state_bits == ^b110); t7=^b110 ;

state_diagram state_bits

        State t0:
                if (!RESET~) then t0
                        with MUXSEL := 1;
                        endwith
                else if (RFQ) then t4
                        with MUXSEL := 1;
                        endwith
                else if (RAS) then t1
                        with MUXSEL := 0;
                        endwith
                else t0
                        with MUXSEL := 1;
                        endwith;
```

```
State t1:
        if (!RESET~) then t0
                with MUXSEL := 1;
                endwith
        else t2
                with MUXSEL := 0;
                endwith;

State t2:
        if (!RESET~) then t0
                with MUXSEL := 1;
                endwith
        else t3
                with MUXSEL := 1;
                endwith;

State t3:
        goto t0
                with MUXSEL := 1;
                endwith;

State t4:
        if (!RESET~) then t0
                with MUXSEL := 1;
                endwith
        else t5
                with MUXSEL := 1;
                endwith;

State t5:
        if (!RESET~) then t0
                with MUXSEL := 1;
                endwith
        else t6
                with MUXSEL := 1;
                endwith;

State t6:
        if (!RESET~) then t0
                with MUXSEL := 1;
                endwith
        else t7
                with MUXSEL := 1;
                endwith;

State t7:
        goto t0
                with MUXSEL := 1;
                endwith;


EQUATIONS

        RAS     = (T0 & !DRAM~ & MCLK & !RFQ
                # T0 & RAS              "Prevents glitch between T0,T1
                # T1
                # T2 & !MCLK & RAS "Prevents glitch between T2,T3
                # T4
                # T5
                # T6 & !MCLK & RAS) "Prevents glitch between T6,T0
                & RESET~ ;

        CAS     = (T0 & RFQ
                # T4
                # T1 & MCLK
                # T1 & CAS              "Prevents glitch between T1,T2
                # T2
                # T3 & !MCLK & CAS) "Prevents glitch between T3,T0
                & RESET~ ;

        RFQ     = (REFRESH & MCLK2~ & !MCLK "RFQ no asserted until MCLK2 low
                                         "and inverted caused MCLK~ high
                # RFQ & !T6)            "RFQ goes off in state T6
                & RESET~ ;
```

```
        !DSACK1~ = (T1 & MCLK
                        # T1 & !DSACK1~      "Prevents glitch between T1,T2
                        # T2
                        # T3 & !MCLK & !DSACK1~ "Avoids glitch betw  T3,T0
                        # !DRAM~)             "If DRAM not selected
                                              "DSACK1~ should be asserted
                        & RESET~ ;


end     DRAMCTL1

"***************************************************************************
"***************************************************************************
"***************************************************************************


MODULE  DRAMCTL2
flag    '-r3'
TITLE   'RT2 - Microprocessor DRAM Control PAL 2
                Jose R. Alvarez, Accom Inc.
                10/91
                Version A
'


DRAM_Ctl2 device 'P22V10';

"Input signals

        B2, B1, B0      pin 3, 4, 5;
        RFQ             pin 6;
        RW~             pin 7;          " ~W in AN1063
        A22, A21        pin 8, 9;
        A0              pin 10;
        SIZ0            pin 11;

"Output signals

        WE0~            pin 21;
        WE1~            pin 20;
        SEL0            pin 19;
        SEL1            pin 18;
        SEL2            pin 17;
        SEL3            pin 16;

"Definitions

        True, False     = 1,0;
        High, Low       = 1,0;
        H,L,Q,X,Z       = 1,0,.C.,.X.,.Z.;


"Set Assignments
        state_bits      = [B2, B1, B0];
        chip_select     = [A22, A21];
        SEL_n           = [SEL3, SEL2, SEL1, SEL0];


"Master State Values
        T0              = (state_bits  == ^b000); t0=^b000 ;
        T1              = (state_bits  == ^b001); t1=^b001 ;
        T2              = (state_bits  == ^b011); t2=^b011 ;
        T3              = (state_bits  == ^b010); t3=^b010 ;
        T4              = (state_bits  == ^b100); t4=^b100 ;
        T5              = (state_bits  == ^b101); t5=^b101 ;
        T6              = (state_bits  == ^b111); t6=^b111 ;
        T7              = (state_bits  == ^b110); t7=^b110 ;

        CS0             = (chip_select == 0); cs0 = 0;
        CS1             = (chip_select == 1); cs1 = 1;
        CS2             = (chip_select == 2); cs2 = 2;
        CS3             = (chip_select == 3); cs3 = 3;
```

```
        sel4            = ^b1111;
        sel3            = ^b1000;
        sel2            = ^b0100;
        sel1            = ^b0010;
        sel0            = ^b0001;

        RFSH            = (RFQ & T0) # T4 # T5 # T6 # T7;


EQUATIONS

        SEL0            = CS0 # RFSH;
        SEL1            = CS1 # RFSH;
        SEL2            = CS2 # RFSH;
        SEL3            = CS3 # RFSH;

        !WE0~           = (!RFSH & !RW~)  "~WE0 not asserted during refresh
                         & (!SIZ0 # !A0); "~WE0 asserted only if word,
                                           " long word, or EVEN byte

        !WE1~           = (!RFSH & !RW~)  "~WE1 not asserted during refresh
                         & (!SIZ0 # A0);  "~WE1 asserted only if word,
                                           " long word, or ODD byte


end     DRAMCTL2
MODULE  DSP_DEC
flag    '-r3'
TITLE   'RT2 - DSP56001 Memory Decoder
                Jose R. Alvarez, Accom Inc.
                10/91
                Version A
'

DSP_Dec device 'P22V10';

"Input signals
        A15, A14, A13, A12, A11         pin 13,11,10,9,8;
        DSP~                            pin 7;
        DS~                             pin 6;
        DSP_PS~                         pin 5;
        DSP_DS~                         pin 4;
        X_Y~                            pin 3;
        BG~                             pin 2;
        RESET~                          pin 1;


"Output signals
        HEN~                            pin 14;
        SELHI~                          pin 15;
        SELMD~                          pin 16;
        SELLO~                          pin 17;
        BANK1                           pin 18;
        BANK0                           pin 19;


"Definitions
        True, False     = 1,0;
        High, Low       = 1,0;
        H,L,Q,X,Z       = 1,0,.C.,.X.,.Z.;


        ADDRESS = [A15, A14, A13, A12, A11];

        "First 2K block for DSP programs
        "-----------------------
        "Program map: 0000 - 07FF
        "-----------------------
        PROG    = !DSP_PS~ & (ADDRESS == ^H00) ;


        "Second 2K block for Xbus Data.
        "-----------------------
        "Data X map : 8800 - 8FFF
        "-----------------------
```

```
        DATAX    = !DSP_DS~ & (ADDRESS == ^H11) &  X_Y~ ;


        "Third 2K block for Ybus Data
        "------------------------
        "Data Y map : 9000 - 9800
        "------------------------
        DATAY    = !DSP_DS~ & (ADDRESS == ^H12) & !X_Y~ ;


        "Fourth 2K block for I/O Devices
        "Can be extended for Y address space
        "if required by adding !X_Y~
        "------------------------
        "I/O DEVICES: FFC0 - FFFF
        "------------------------
        DEVS     = !DSP_DS~ & (ADDRESS == ^H1F) ;


        "Busses are accessed externally when
        "either the DSP has granted the bus to
        "an external interrupt, or when the main
        "CPU has selected the DSP.
        "------------------------
        INTACC  = BG~ & DSP~ ;

EQUATIONS

        HEN~     =  DS~ # DSP~ ;

ENABLE  SELHI~  = INTACC & RESET~;
        SELHI~  = DSP_PS~ & DSP_DS~;

ENABLE  SELMD~  = INTACC & RESET~;
        SELMD~  = DSP_PS~ & DSP_DS~;

ENABLE  SELLO~  = INTACC & RESET~;
        SELLO~  = DSP_PS~ & DSP_DS~;

ENABLE  BANK1   = INTACC & RESET~;
        BANK1   = DATAY # DEVS;

ENABLE  BANK0   = INTACC & RESET~;
        BANK0   = DATAX # DEVS;


TEST_VECTORS
        ([BG~, DSP~, RESET~, ADDRESS, DSP_PS~, DSP_DS~] -> [SELLO~])
         [H  ,  H  ,   H   ,    X   ,    L    ,      H  ] -> [  L  ];
         [H  ,  H  ,   H   ,    X   ,    H    ,      L  ] -> [  L  ];
         [H  ,  H  ,   H   ,    X   ,    H    ,      H  ] -> [  H  ];

end     DSP_DEC


MODULE  LTC_DEC
flag    '-r3'
TITLE   'RT2 - Longitudinal Time Code Decoder
                Jose R. Alvarez, Accom Inc.
                10/91
                Version A
'

LTC_Dec device 'P22V10';

"Input signals
        LTC_CLK         pin 1;
        LTC_CLR~        pin 9;
        V_DSP2~         pin 10;
        LTC_IN          pin 13;

"Output signals
        LTC_BIT         pin 18; "Indicates the occurrence of LTC bit
        LTC_DATA        pin 15;
```

```
        LTC_INT~        pin 14; "Edge-triggered interrupt
        Q0,Q1,Q2        pin 23,22,21;

"Definitions
        True, False     = 1,0;
        High, Low       = 1,0;
        H,L,Q,X,Z       = 1,0,.C.,.X.,.Z.;

        EDGE            = LTC_IN $ Q2;

EQUATIONS

        LTC_BIT          =  EDGE ;
        !LTC_INT~        =  EDGE # (LTC_CLR~ & LTC_INT~);
        LTC_DATA         = !EDGE ;

        Q0              := LTC_IN;
        Q1              := Q0;
        Q2              := Q1;

TEST_VECTORS
        ([ LTC_CLK, LTC_IN, Q2, LTC_CLR~ ] -> [LTC_INT~])
         [    Q    ,    H  , L ,   H      ] -> [   H   ];
         [    Q    ,    L  , H ,   L      ] -> [   H   ];
         [    Q    ,    L  , L ,   H      ] -> [   L   ];
         [    Q    ,    H  , H ,   L      ] -> [LTC_INT~];


end     LTC_DEC


MODULE  DRAMREFR
flag    '-r3'
TITLE   'RT2 - DRAM Refresh Control PAL
                Jose R. Alvarez, Accom Inc.
                10/91
                Version A
'

DRAM_Refresh device 'P22V10';

"Input signals

        MCLK            pin 1;

"Output signals

        REFRESH         pin 20;
        Q7              pin 19;
        Q6              pin 18;
        Q5              pin 17;
        Q4              pin 21;
        Q3              pin 16;
        Q2              pin 22;
        Q1              pin 15;
        Q0              pin 14;

"Definitions

        True, False     = 1,0;
        High, Low       = 1,0;
        H,L,C,X,Z       = 1,0,.C.,.X.,.Z.;


        Q         = [Q7, Q6, Q5, Q4, Q3, Q2, Q1, Q0];

EQUATIONS

        Q0      := Q0 $  1;
        Q1      := Q1 $  Q0;
```

```
        Q2      := Q2 $ (Q1 & Q0);
        Q3      := Q3 $ (Q2 & Q1 & Q0);
        Q4      := Q4 $ (Q3 & Q2 & Q1 & Q0);
        Q5      := Q5 $ (Q4 & Q3 & Q2 & Q1 & Q0);
        Q6      := Q6 $ (Q5 & Q4 & Q3 & Q2 & Q1 & Q0);
        Q7      := Q7 $ (Q6 & Q5 & Q4 & Q3 & Q2 & Q1 & Q0);

        REFRESH := (Q == ^h0) # (Q == ^hFF);


TEST_VECTORS
        ([ MCLK] -> [  Q  ])
         [   C ] -> [  2  ];
         [   C ] -> [  3  ];
         [   C ] -> [  4  ];
         [   C ] -> [  5  ];
         [   C ] -> [  6  ];
         [   C ] -> [  7  ];


end     DRAMREFR


MODULE  DRAMCTL1
TITLE   'RT2 - Microprocessor DRAM Control PAL
                Jose R. Alvarez, Accom Inc.
                10/91
                Version A
'

" flag    '-r0'

DRAMCtl1 device 'P16R4';

"Input signals

        MCLK~           pin 1;  "CLKB
        MCLK            pin 2;  "CLK
        MCLK2~          pin 3;  "CLKB2
        DRAM~           pin 4;  "~DRAMSEL
        REFRESH         pin 5;  "TOUT
        RESET~          pin 6;  "~RESET
"Output signals

        B2, B1, B0      pin 15, 16, 17;
        MUXSEL          pin 14;
        RAS             pin 19;
        CAS             pin 18;
        RFQ             pin 12;
        DSACK1~         pin 13;
        OE~             pin 11;


"Definitions

        True, False     = 1,0;
        High, Low       = 1,0;
        H,L,Q,X,Z       = 1,0,.C.,.X.,.Z.;


"Set Assignments
        state_bits      = [B2, B1, B0];


"Master State Values
        T0              = (state_bits == ^b000); t0=^b000 ;
        T1              = (state_bits == ^b001); t1=^b001 ;
        T2              = (state_bits == ^b011); t2=^b011 ;
        T3              = (state_bits == ^b010); t3=^b010 ;
        T4              = (state_bits == ^b100); t4=^b100 ;
        T5              = (state_bits == ^b101); t5=^b101 ;
        T6              = (state_bits == ^b111); t6=^b111 ;
        T7              = (state_bits == ^b110); t7=^b110 ;
```

```
"state_diagram state_bits
"
"       State t0:
"               if (!RESET~) then t0
"                       with MUXSEL := 1;
"                       endwith
"               else if (RFQ) then t4
"                       with MUXSEL := 1;
"                       endwith
"               else if (RAS) then t1
"                       with MUXSEL := 0;
"                       endwith
"               else t0
"                       with MUXSEL := 1;
"                       endwith;
"
"       State t1:
"               if (!RESET~) then t0
"                       with MUXSEL := 1;
"                       endwith
"               else t2
"                       with MUXSEL := 0;
"                       endwith;
"
"       State t2:
"               if (!RESET~) then t0
"                       with MUXSEL := 1;
"                       endwith
"               else t3
"                       with MUXSEL := 1;
"                       endwith;
"
"       State t3:
"               goto t0
"                       with MUXSEL := 1;
"                       endwith;
"
"       State t4:
"               if (!RESET~) then t0
"                       with MUXSEL := 1;
"                       endwith
"               else t5
"                       with MUXSEL := 1;
"                       endwith;
"
"       State t5:
"               if (!RESET~) then t0
"                       with MUXSEL := 1;
"                       endwith
"               else t6
"                       with MUXSEL := 1;
"                       endwith;
"
"       State t6:
"               if (!RESET~) then t0
"                       with MUXSEL := 1;
"                       endwith
"               else t7
"                       with MUXSEL := 1;
"                       endwith;
"
"       State t7:
"               goto t0
"                       with MUXSEL := 1;
"                       endwith;
"
"
"
"
EQUATIONS

"       RAS     = (T0 & !DRAM~ & MCLK & !RFQ
"                       # T0 & RAS          Prevents glitch between T0,T1
"                       # T1
```

```
"                        # T2 & !MCLK & RAS Prevents glitch between T2,T3
"                        # T4
"                        # T5
"                        # T6 & !MCLK & RAS) Prevents glitch between T6,T0
"                        & RESET~ ;
"
"     CAS     = (T0 & RFQ
"                        # T4
"                        # T1 & MCLK
"                        # T1 & CAS          Prevents glitch between T1,T2
"                        # T2
"                        # T3 & !MCLK & CAS) Prevents glitch between T3,T0
"                        & RESET~ ;
"
"     RFQ     = (REFRESH & MCLK2~ & !MCLK RFQ no asserted until MCLK2 low
"                                            and inverted caused MCLK~ high
"                        # RFQ & !T6)        RFQ goes off in state T6
"                        & RESET~ ;
"
"     !DSACK1~ = (T1 & MCLK
"                        # T1 & !DSACK1~     Prevents glitch between T1,T2
"                        # T2
"                        # T3 & !MCLK & !DSACK1~ Avoids glitch betw  T3,T0
"                        # !DRAM~)           If DRAM not selected
"                                             DSACK1~ should be asserted
"                        & RESET~ ;
"
"

   !MUXSEL := (B0 & !B1 & !B2 & RESET~ # !B1 & !B2 & RAS & RESET~ & !RFQ);

   !B2 := (!B0 & B1 # B0 & !B2 # !B2 & !RFQ # !RESET~);

   !B1 := (!RESET~ # !B0);

   !B0 := (!RESET~ # B1 # !B0 & !B2 & !RAS # !B0 & !B2 & RFQ);

   !RAS = (!RESET~
        # !B0 & !B2 & !RAS & RFQ
        # !B0 & !B2 & !MCLK & !RAS
        # !B0 & !B2 & DRAM~ & !RAS
        # B1 & !RAS
        # B1 & MCLK
        # !B0 & B1);


   !CAS = (!RESET~
        # !B0 & B1 & !CAS
        # B0 & !B1 & !CAS & !MCLK
        # !B0 & B1 & MCLK
        # B0 & B2
        # !B0 & !B1 & !B2 & !RFQ
        # B1 & B2);


   !RFQ = (!RESET~
        # B0 & B1 & B2 & MCLK
        # B0 & B1 & B2 & !MCLK2~
        # B0 & B1 & B2 & !REFRESH
        # MCLK & !RFQ
        # !MCLK2~ & !RFQ
        # !REFRESH & !RFQ);

   !DSACK1~ = (!DRAM~ & RESET~
            # B1 & !B2 & !DSACK1~ & !MCLK & RESET~
            # B0 & B1 & !B2 & RESET~
            # B0 & !B2 & !DSACK1~ & RESET~
            # B0 & !B2 & MCLK & RESET~);


end     DRAMCTL1

MODULE  DRAMCTL2
flag    '-r3'
```

```
TITLE   'RT2 - Microprocessor DRAM Control PAL 2
                Jose R. Alvarez, Accom Inc.
                10/91
                Version A
'

DRAMCtl2 device 'P22V10';

"Input signals

        B2, B1, B0      pin 3, 4, 5;
        RFQ             pin 6;
        RW~             pin 7;          " ~W in AN1063
        A22, A21        pin 8, 9;
        A0              pin 10;
        SIZ0            pin 11;

"Output signals'

        WE0~            pin 21;
        WE1~            pin 20;
        SEL0            pin 19;
        SEL1            pin 18;
        SEL2            pin 17;
        SEL3            pin 16;

"Definitions

        True, False     = 1,0;
        High, Low       = 1,0;
        H,L,Q,X,Z       = 1,0,.C.,.X.,.Z.;


"Set Assignments
        state_bits      = [B2, B1, B0];
        chip_select     = [A22, A21];
        SEL_n           = [SEL3, SEL2, SEL1, SEL0];


"Master State Values
"       T0              = (state_bits  == ^b000); t0=^b000 ;
"       T1              = (state_bits  == ^b001); t1=^b001 ;
"       T2              = (state_bits  == ^b011); t2=^b011 ;
"       T3              = (state_bits  == ^b010); t3=^b010 ;
"       T4              = (state_bits  == ^b100); t4=^b100 ;
"       T5              = (state_bits  == ^b101); t5=^b101 ;
"       T6              = (state_bits  == ^b111); t6=^b111 ;
"       T7              = (state_bits  == ^b110); t7=^b110 ;
"
"       CS0             = (chip_select == 0); cs0 = 0;
"       CS1             = (chip_select == 1); cs1 = 1;
"       CS2             = (chip_select == 2); cs2 = 2;
"       CS3             = (chip_select == 3); cs3 = 3;
"
"       sel4            = ^b1111;
"       sel3            = ^b1000;
"       sel2            = ^b0100;
"       sel1            = ^b0010;
"       sel0            = ^b0001;
"
"       RFSH            = (RFQ & T0) # T4 # T5 # T6 # T7;
"

EQUATIONS

"       SEL0            = CS0 # RFSH;
"       SEL1            = CS1 # RFSH;
"       SEL2            = CS2 # RFSH;
"       SEL3            = CS3 # RFSH;
"
"       !WE0~           = (!RFSH & !RW~)  ~WE0 not asserted during refresh
"                         & (!SIZ0 # !A0); ~WE0 asserted only if word,
"                                  long word, or EVEN byte
"       !WE1~           = (!RFSH & !RW~)  ~WE1 not asserted during refresh
```

```
"                           & (!SIZO # A0);  ~WE1 asserted only if word,
"                                             long word, or ODD byte
"

" Reduced Equations:

    SEL0 = (B2 # !B0 & !B1 & RFQ # !A21 & !A22);

    SEL1 = (B2 # !B0 & !B1 & RFQ # A21 & !A22);

    SEL2 = (B2 # !B0 & !B1 & RFQ # !A21 & A22);

    SEL3 = (B2 # !B0 & !B1 & RFQ # A21 & A22);
    !WE0~ = (!A0 & B0 & !B2 & !RW~
            # !A0 & !B2 & !RFQ & !RW~
            # !A0 & B1 & !B2 & !RW~
            # B0 & !B2 & !RW~ & !SIZO
            # !B2 & !RFQ & !RW~ & !SIZO
            # B1 & !B2 & !RW~ & !SIZO);


    !WE1~ = (A0 & B0 & !B2 & !RW~
            # A0 & !B2 & !RFQ & !RW~
            # A0 & B1 & !B2 & !RW~
            # B0 & !B2 & !RW~ & !SIZO
            # !B2 & !RFQ & !RW~ & !SIZO
            # B1 & !B2 & !RW~ & !SIZO);

end     DRAMCTL2
MODULE  RT3_AddDec
flag    '-r3'
TITLE   'RT3 - CPU Bus Address Decode PAL
                John Stern, Accom Inc.
                4/91
                Version A
'

AddDec device 'P22V10';
        MRESET                          pin 1;
        MUBE                            pin 2;
        MRD                                     pin 3;
        MWR                                     pin 4;
        MASTB                           pin 5;
        VALIDADD                        pin 6;
        uPA0, uPA19, uPA20, uPA21, uPA22, uPA23         pin 7, 8, 9, 10, 11, 13;
        RESET                           pin 23;
        DATRD                           pin 22;
        BUSDIR                          pin 21;
        ADCLK                           pin 20;
        CSB2                            pin 19;
        CSB1                            pin 18;
        COMCS                           pin 17;
        DATWR                           pin 16;
        REG0                            pin 15;
        REG1                            pin 14;

        True, False     = 1,0;
        High, Low       = 1,0;
        H,L,Q,X,Z       = 1,0,.C.,.X.,.Z.;

        AddIn           = [uPA23, uPA22, uPA21, uPA20, uPA19];
        RegOut          = [REG1, REG0];
        RegStart        = 0;    "0 MB"
        DPStart         = 1;    "0.5 MB"
        FSB1Start       = 2;    "1 MB"
        FSB2Start       = 6;    "3 MB"
        MemSpan         = 10;   "5 MB"
        GoodAddress     = ! MRESET & ! MASTB & VALIDADD;
        RESET           istype 'neg';   "see if eliminates glitches"
        Read            = (! MRD & MWR);
        Write           = (! MWR & MRD);

equations
        REG0            = (GoodAddress & (RegStart <= AddIn) & (AddIn < DPStart));
        ! REG1          = (GoodAddress & (RegStart <= AddIn) & (AddIn < DPStart));
```

```
! COMCS          = (GoodAddress & (DPStart <= AddIn) & (AddIn < FSB1Start));
! CSB1           = (GoodAddress & (FSB1Start <= AddIn) & (AddIn < FSB2Start));
! CSB2           = (GoodAddress & (FSB2Start <= AddIn) & (AddIn < MemSpan));
ADCLK            = (GoodAddress & Read & (RegStart <= AddIn) & (AddIn < DPStart));
! BUSDIR         = (GoodAddress & Read & (AddIn < MemSpan));
! DATRD          = (GoodAddress & Read & (FSB1Start <= AddIn) & (AddIn < MemSpan));
DATWR            = (GoodAddress & Write & (FSB1Start <= AddIn) & (AddIn < MemSpan));
! RESET          = MRESET;

test_vectors
    ([AddIn, MRESET, MASTB, VALIDADD, MRD, MWR]        ->
                 [RegOut, COMCS, CSB1, CSB2, ADCLK, BUSDIR, DATWR, DATRD, RESET])
    [X,          H, X, X, X, X]  ->    [2, H, H, H, L, H, L, H, L];    "reset"
    [X,          X, H, X, X, X]  ->    [2, H, H, H, L, H, L, H, H];    "no strobe"
    [X,          X, X, L, X, X]  ->    [2, H, H, H, L, H, L, H, H];    "invalid"
    [0,          L, L, H, H, H]  ->    [1, H, H, H, L, H, L, H, H];    "address"
    [1,          L, L, H, H, H]  ->    [2, L, H, H, L, H, L, H, H];    "address"
    [2,          L, L, H, H, H]  ->    [2, H, L, H, L, H, L, H, H];    "address"
    [3,          L, L, H, H, H]  ->    [2, H, L, H, L, H, L, H, H];    "address"
    [4,          L, L, H, H, H]  ->    [2, H, L, H, L, H, L, H, H];    "address"
    [5,          L, L, H, H, H]  ->    [2, H, L, H, L, H, L, H, H];    "address"
    [6,          L, L, H, H, H]  ->    [2, H, H, L, L, H, L, H, H];    "address"
    [7,          L, L, H, H, H]  ->    [2, H, H, L, L, H, L, H, H];    "address"
    [8,          L, L, H, H, H]  ->    [2, H, H, L, L, H, L, H, H];    "address"
    [9,          L, L, H, H, H]  ->    [2, H, H, L, L, H, L, H, H];    "address"
    [10,   L, L, H, H, H]  ->    [2, H, H, H, L, H, L, H, H];    "address"
    [11,   L, L, H, H, H]  ->    [2, H, H, H, L, H, L, H, H];    "address"
    [12,   L, L, H, H, H]  ->    [2, H, H, H, L, H, L, H, H];    "address"
    [13,   L, L, H, H, H]  ->    [2, H, H, H, L, H, L, H, H];    "address"
    [14,   L, L, H, H, H]  ->    [2, H, H, H, L, H, L, H, H];    "address"
    [15,   L, L, H, H, H]  ->    [2, H, H, H, L, H, L, H, H];    "address"
    [0,          L, L, H, L, H]  ->    [1, H, H, H, H, L, L, H, H];    "A/D Clk, BUSDIR"
    [9,          L, L, H, L, H]  ->    [2, H, H, L, L, L, L, L, H];    "DATWR"
    [9,          L, L, H, H, L]  ->    [2, H, H, L, L, H, H, H, H];    "DATRD"

end     RT3_AddDec
MODULE  RT3_blank
flag    '-r2'
TITLE   'RT3 - Blank Generator PAL
            John Stern, Accom Inc.
            4/91
            Version A
'

blank device 'P22V10';
    CLK                 pin 1;
    HBLANK          pin 2;
    VBLANK          pin 3;
    YBLK            pin 4;
    CBLK            pin 5;

    YBLANK          pin 15;
    CBLANK          pin 14;

    True, False     = 1,0;
    High, Low       = 1,0;
    H,L,Q,X,Z       = 1,0,.C.,.X.,.Z.;


equations
    YBLANK          := (HBLANK # VBLANK # YBLK);     "pretty simple!"
    CBLANK          := (HBLANK # VBLANK # CBLK);     "pretty simple!"


test_vectors
    ([CLK, HBLANK, VBLANK, YBLK, CBLK]       ->      [YBLANK, CBLANK])
    [Q, X, X, H, X]  ->    [H, X]; "Y blanking"
    [Q, X, X, X, H]  ->    [X, H]; "C blanking"
    [Q, H, X, L, L]  ->    [H, H]; "H blanking"
    [Q, X, H, L, L]  ->    [H, H]; "V blanking"
    [Q, L, L, L, L]  ->    [L, L]; "normal"
end     RT3_blank
MODULE  RT3_COut
flag    '-r2'
```

```
TITLE   'RT3 - C Output PAL
                John Stern, Accom Inc.
                4/91
                Version A
'

COut device 'P22V10';
        X9, X8, X7, X6, X5, X4, X3, X2, X1, X0          pin 10, 9, 8, 7, 6, 5, 4, 3, 2, 1;
        ROUND                           pin 11;
        BLANK                           pin 13;
        Y9, Y8, Y7, Y6, Y5, Y4, Y3, Y2, Y1, Y0          pin 14, 15, 16, 17, 18, 19, 20, 21, 22,
23;

        True, False     = 1,0;
        High, Low       = 1,0;
        H,L,Q,X,Z       = 1,0,.C.,.X.,.Z.;

"       X is in 2's complement form"
        XInput          = [! X9, X8, X7, X6, X5, X4, X3, X2, X1, X0];
        YOutput         = [Y9, Y8, Y7, Y6, Y5, Y4, Y3, Y2, Y1, Y0];


"       These are the right equations, but they don't fit!
        round0          = 0;
        carry0          = 1;
        round1          = 0;
        carry1          = X1 & carry0;
        round2          = X2 $ carry1;
        carry2          = X2 & carry1;
        round3          = X3 $ carry2;
        carry3          = X3 & carry2;
        round4          = X4 $ carry3;
        carry4          = X4 & carry3;
        round5          = X5 $ carry4;
        carry5          = X5 & carry4;
        round6          = X6 $ carry5;
        carry6          = X6 & carry5;
        round7          = X7 $ carry6;
        carry7          = X7 & carry6;
        round8          = X8 $ carry7;
        carry8          = X8 & carry7;
        round9          = ! X9 $ carry8;
        carry9          = ! X9 & carry8;
"       Q0                      = ((ROUND & round0) # (! ROUND & X0));
"       Q1                      = ((ROUND & round1) # (! ROUND & X1));
"       Q2                      = ((ROUND & (round2 & ! carry9)) # (! ROUND & X2));
"       Q3                      = ((ROUND & (round3 & ! carry9)) # (! ROUND & X3));
"       Q4                      = ((ROUND & (round4 # carry9)) # (! ROUND & X4));
"       Q5                      = ((ROUND & (round5 # carry9)) # (! ROUND & X5));
"       Q6                      = ((ROUND & (round6 # carry9)) # (! ROUND & X6));
"       Q7                      = ((ROUND & (round7 # carry9)) # (! ROUND & X7));
"       Q8                      = ((ROUND & (round8 # carry9)) # (! ROUND & X8));
"       Q9                      = ((ROUND & (round9 # carry9)) # (! ROUND & ! X9));


"       These equations just truncate
        Q0                      = X0 & ! ROUND;
        Q1                      = X1 & ! ROUND;
        Q2                      = X2;
        Q3                      = X3;
        Q4                      = X4;
        Q5                      = X5;
        Q6                      = X6;
        Q7                      = X7;
        Q8                      = X8;
        Q9                      = ! X9;
        UpperQ          = [Q9, Q8, Q7, Q6, Q5, Q4, Q3, Q2];

equations
        Y0                      = ((BLANK & 0) # (! BLANK & Q0 & ! (UpperQ == ^h00)));
        Y1                      = ((BLANK & 0) # (! BLANK & ((Q1 & ! (UpperQ == ^h00)) # (UpperQ
== ^hFF))));
        Y2                      = ((BLANK & 0) # (! BLANK & ((Q2 & ! (UpperQ == ^hFF)) # (UpperQ
== ^h00))));
        Y3                      = ((BLANK & 0) # (! BLANK & Q3));
```

```
        Y4                      = ((BLANK & 0) # (! BLANK & Q4));
        Y5                      = ((BLANK & 0) # (! BLANK & Q5));
        Y6                      = ((BLANK & 0) # (! BLANK & Q6));
        Y7                      = ((BLANK & 0) # (! BLANK & Q7));
        Y8                      = ((BLANK & 0) # (! BLANK & Q8));
        Y9                      = ((BLANK & 1) # (! BLANK & Q9));


test_vectors
        ([XInput,       ROUND,  BLANK]  ->      [YOutput])
         [X,            X,              H]      ->      [^h200];        "blank"
         [^h120,        H,              L]      ->      [^h120];        " r o u n d
(truncation)"
         [^h121,        H,              L]      ->      [^h120];        " r o u n d
(truncation)"
         [^h122,        H,              L]      ->      [^h120];        " r o u n d
(truncation)"
         [^h123,        H,              L]      ->      [^h120];        " r o u n d
(truncation)"
         [^h000,        L,              L]      ->      [^h004];        "low limit"
         [^h001,        L,              L]      ->      [^h004];        "low limit"
         [^h002,        L,              L]      ->      [^h004];        "low limit"
         [^h003,        L,              L]      ->      [^h004];        "low limit"
         [^h004,        L,              L]      ->      [^h004];        "low limit"
         [^h005,        L,              L]      ->      [^h005];        "normal"
         [^h006,        L,              L]      ->      [^h006];        "normal"
         [^h3F9,        L,              L]      ->      [^h3F9];        "normal"
         [^h3FA,        L,              L]      ->      [^h3FA];        "normal"
         [^h3FB,        L,              L]      ->      [^h3FB];        "high limit"
         [^h3FC,        L,              L]      ->      [^h3FA];        "high limit"
         [^h3FD,        L,              L]      ->      [^h3FB];        "high limit"
         [^h3FE,        L,              L]      ->      [^h3FA];        "high limit"
         [^h3FF,        L,              L]      ->      [^h3FB];        "high limit"


end     RT3_COut
MODULE  RT3_DiskRCtl
flag    '-r2'
TITLE   'RT3 - Disk Read Control PAL
                John Stern, Accom Inc.
                4/91
                Version A
'

DiskRCtl device 'P22V10';
        CLK                     pin 1;  "RRC"
        AMD                     pin 2;  "~AMD"
        NRZ                     pin 3;  "NRZ data"
        READ            pin 11; "read"
        GO                      pin 13; "Go signal"

        COUT            pin 14; "C output"
        YOUT            pin 15; "Y output"
        WRST            pin 16; "write reset"
        STATE2          pin 17; "also WE and status output"
        STATE1          pin 18;
        GODEL           pin 19;
        STATE0          pin 20; "also CLK/2 clock output"
        NRZDELAY        pin 21; "NRZ Delayed"
        AMENB           pin 22; "address mark enable"
        RG                      pin 23; "read gate"

"       take feedback outputs from internal nodes"
        STATE2, STATE1, STATE0                  istype 'neg, reg, feed_reg';

"State Machine State Assignments
        RState          = [STATE2, STATE1, STATE0];
        S0 = 0;  S1 = 1;        S2 = 2;  S3 = 3;  S4 = 4;  S5 = 5;  S6 = 6;  S7 = 7;

        EnableOutputs   = [RState, COUT, YOUT, WRST, NRZDELAY, AMENB];

        NewGo           = GODEL & ! WRST;
        Corr            = [NRZ, NRZDELAY, COUT, YOUT];   "for correlation of sync pattern"
        DoCorr          = (Corr == 11) # (Corr == 10) # (Corr == 9) # (Corr == 15) # (Corr ==
3);
```

```
True, False     = 1,0;
High, Low       = 1,0;
H,L,Q,X,Z       = 1,0,.C.,.X.,.Z.;


state_diagram RState
    State S0:       "reset"
                    RG                  := 0;
                    WRST        := 0;
                    YOUT        := 0;
                    COUT        := 0;
                    NRZDELAY    := 0;
                    AMENB       := 0;

                    case    (! (READ & GODEL))          : S0;
                            (READ & GODEL)                      : S1;
                    endcase;

    State S1:       "wait for AMD"
                    RG                  := READ & GODEL & NRZDELAY;
                    WRST        := 0;
                    YOUT        := 0;
                    COUT        := 0;
                    NRZDELAY    := ! AMD;
                    AMENB       := 1;

                    case    (! (READ & GODEL))                  : S0;
                            (READ & GODEL & ! NRZDELAY) : S1;
                            (READ & GODEL & NRZDELAY)           : S2;
                    endcase;

    State S2:
                    RG                  := 1;
                    WRST        := 0;
                    YOUT        := 0;
                    COUT        := 0;
                    NRZDELAY    := 0;
                    AMENB       := 0;

                    case    (! (READ & GODEL))          : S0;
                            (READ & GODEL)                      : S3;
                    endcase;

    State S3:       "wait for correlation pattern"
                    RG                  := 1;
                    WRST        := READ & GODEL & DoCorr;
                    YOUT        := COUT;
                    COUT        := NRZDELAY;
                    NRZDELAY    := NRZ;
                    AMENB       := 0;

                    case    (! (READ & GODEL))                  : S0;
                    (READ & GODEL & ! DoCorr)           : S3;
                    (READ & GODEL & DoCorr)             : S4;
                    endcase;

    State S4:       "reset TBC"
                    RG                  := 1;
                    WRST        := 1;
                    YOUT        := 0;
                    COUT        := 0;
                    NRZDELAY    := 0;
                    AMENB       := 0;

                    case    (! READ)                            : S0;
                            (READ)                                      : S5;
                    endcase;

    State S5:       "reset TBC"
                    RG                  := 1;
                    WRST        := 1;
                    YOUT        := 0;
                    COUT        := 0;
                    NRZDELAY    := NRZ;
                    AMENB       := 0;
```

```
                case    (! READ)                                    : S0;
                        (READ)                                      : S6;
                endcase;

State S6:       "deinterleave Y, C"
                RG                      := ! NewGo;
                WRST            := GODEL & ! NewGo;
                YOUT            := YOUT & ! NewGo;
                COUT            := COUT & ! NewGo;
                NRZDELAY        := NRZ & ! NewGo;
                AMENB           := 0;

                case    (! READ)                                    : S0;
                                (NewGo)                                     : S0;
                        (READ & ! NewGo)                    : S7;
                endcase;

State S7:       "deinterleave Y, C"
                RG                      := ! NewGo;
                WRST            := GODEL & ! NewGo;
                YOUT            := NRZ & ! NewGo;
                COUT            := NRZDELAY & ! NewGo;
                NRZDELAY        := NRZ & ! NewGo;
                AMENB           := 0;

                case    (! READ)                                    : S0;
                        (NewGo)                                     : S0;
                        (READ & ! NewGo)                    : S6;
                endcase;


equations
        GODEL                                   := GO;
        enable EnableOutputs    = READ; "HI Z"
test_vectors
        ([CLK, AMD, NRZ, READ, GO]
                                        ->      [RState, COUT, YOUT, WRST, NRZDELAY,
AMENB, RG, GODEL])
         [X, X, X, L, X]       ->      [Z,             Z, Z, Z, Z, Z, X, X];    "HI Z"
         [Q, X, X, L, X]       ->      [Z,             Z, Z, Z, Z, Z, X, X];    "HI Z"
         [Q, X, X, H, L]       ->      [S0,    L, L, L, L, L, L, L];    "S0"
         [Q, X, X, H, H]       ->      [S0,    L, L, L, L, L, L, H];    "S0"
         [Q, X, X, H, H]       ->      [S1,    L, L, L, L, L, L, H];    "S1"
         [Q, H, X, H, H]       ->      [S1,    L, L, L, L, H, L, H];    "S1"
         [Q, L, X, H, H]       ->      [S1,    L, L, L, H, H, L, H];    "S1"
         [Q, H, X, H, H]       ->      [S2,    L, L, L, L, H, H, H];    "S2"
         [Q, X, X, H, H]       ->      [S3,    L, L, L, L, L, H, H];    "S3"
         [Q, X, L, H, H]       ->      [S3,    L, L, L, L, L, H, H];    "S3"
         [Q, X, L, H, H]       ->      [S3,    L, L, L, L, L, H, H];    "S3"
         [Q, X, H, H, H]       ->      [S3,    L, L, L, H, L, H, H];    "S3"
         [Q, X, H, H, H]       ->      [S3,    H, L, L, H, L, H, H];    "S3"
         [Q, X, L, H, H]       ->      [S3,    H, H, L, L, L, H, H];    "S3"
         [Q, X, H, H, H]       ->      [S4,    L, H, H, H, L, H, H];    "S4"
         [Q, X, H, H, H]       ->      [S5,    L, L, H, L, L, H, H];    "S5"
         [Q, X, L, H, H]       ->      [S6,    L, L, H, L, L, H, H];    "S6"
         [Q, X, H, H, L]       ->      [S7,    L, L, H, H, L, H, L];    "S7"
         [Q, X, L, H, L]       ->      [S6,    H, L, L, L, L, H, L];    "S6"
         [Q, X, H, H, L]       ->      [S7,    H, L, L, H, L, H, L];    "S7"
         [Q, X, L, H, L]       ->      [S6,    H, L, L, L, L, H, L];    "S6"
         [Q, X, H, H, H]       ->      [S7,    H, L, L, H, L, H, H];    "S7"
         [Q, X, H, H, H]       ->      [S0,    L, L, L, L, L, L, H];    "S0"
         [Q, X, X, L, X]       ->      [Z,             Z, Z, Z, Z, Z, L, X];    "HI Z"
         [Q, X, X, H, L]       ->      [S0,    L, L, L, L, L, L, L];    "S0"


end     RT3_DiskRCtl
MODULE  RT3_DiskSync
flag    '-r2'
TITLE   'RT3 - Disk Control uP Sync PAL
                John Stern, Accom Inc.
                4/91
                Version A
'

DiskSync device 'P22V10';
```

```
CLK                          pin 1;
uPSYNC3, uPSYNC2, uPSYNC1, uPSYNC0            pin 7, 6, 5, 4;
uP_B2, uP_B1, uP_B0                                          pin 11, 10,9;
INDEX               pin 13;

INDEX_INT           pin 19;
FIELD_INT           pin 18;
SPIN_SYNC           pin 17;
INDEX_REF           pin 15;
STATE0              pin 16;
STATE1              pin 20;
STATE2              pin 21;
STATE3              pin 22;
STATE4              pin 23;
STATE5              pin 14;

True, False     = 1,0;
High, Low       = 1,0;
H,L,Q,X,Z       = 1,0,.C.,.X.,.Z.;

uPSync          = [uPSYNC3, uPSYNC2, uPSYNC1, uPSYNC0];
NoSync          = 0;
SpinSync        = ^h1;
FieldSync       = ^h2;
IndexSync       = ^h4;
IndexWindow     = ^h8;
SyncType        macro (x) {((uPSync & ?x) != 0)}

uPB                     = [uP_B2, uP_B1, uP_B0];
SyncSel         macro (x) {(uPB == ?x)}

"State Machine State Assignments
    IndexCount      = [STATE5, STATE4, STATE3];
    C0 = 0;  C1 = 1;      C2 = 2; C3 = 3; CGOOD = 4;      C5 = 5; C6 = 6; C7 = 7;
    IndexSearch     = [STATE2, STATE1, STATE0];
    I0 = 0; I1 = 1; I2 = 2; IBAD = 3;       IGOOD = 4;      I3 = 5; I4 = 6; I5 = 7;


equations
    ! INDEX_INT     :=      ((IndexCount == CGOOD) & INDEX & SyncType(IndexWindow))
                                    #((IndexCount != CGOOD) & ! SyncType(IndexSync));
    FIELD_INT       :=      SyncType(FieldSync);
    SPIN_SYNC       :=      SyncType(SpinSync);
    INDEX_REF       :=      INDEX;


test_vectors
    ([CLK,  uPSync,         uPB,    INDEX]  ->      [FIELD_INT, SPIN_SYNC, INDEX_REF])
     [Q,    NoSync,         X,              L]      ->      [L, L, L];
"INDEX_REF"
     [Q,    NoSync,         X,              H]      ->      [L, L, H];
"INDEX_REF"
     [Q,    FieldSync,      X,              X]      ->      [H, L, X];      [illegible]
     [Q,    SpinSync,       X,              X]      ->      [L, H, X];      [illegible]

state_diagram IndexSearch
    State I0:       "wait for window"
                    case    (! SyncType(IndexWindow))       : I0;
                                    (SyncType(IndexWindow))         : I1;
                    endcase;

    State I1:       "look for index"
                    case    (! INDEX & SyncType(IndexWindow))       : I1;
                                    (INDEX & SyncType(IndexWindow))         : IGOOD;
                                    (! SyncType(IndexWindow))                       : [illegible]
                    endcase;

    State I2:       "wait for end of window"
                    case    (SyncType(IndexWindow))         : I2;
                                    (! SyncType(IndexWindow))       : I0;
                    endcase;

    State IGOOD:
```

```
                    case    (1)                                             : I0;
                    endcase;

        State IBAD:
                    case    (1)                                             : I0;
                    endcase;

        State I3:   "shouldn't get here"
                    case    (1)                                             : I0;
                    endcase;

        State I4:   "shouldn't get here"
                    case    (1)                                             : I0;
                    endcase;

        State I5:   "shouldn't get here"
                    case    (1)                                             : I0;
                    endcase;
test_vectors
        ([CLK,  uPSync,             INDEX]  ->      [IndexSearch])
         [Q,    0,                  X]      ->      [I0];
         [Q,    IndexWindow,  X]            ->      [I1];
         [Q,    IndexWindow,  L]            ->      [I1];
         [Q,    IndexWindow,  H]            ->      [IGOOD];
         [Q,    X,                  X]      ->      [I2];
         [Q,    IndexWindow,  X]            ->      [I2];
         [Q,    0,                  X]      ->      [I0];
         [Q,    IndexWindow,  X]            ->      [I1];
         [Q,    0,                  X]      ->      [IBAD];
         [Q,    X,                  X]      ->      [I0];
         [Q,    0,                  X]      ->      [I0];

state_diagram IndexCount
        State C0:
                    case    (IndexSearch == IGOOD)    : C1;
                            (IndexSearch == IBAD)     : C0;
                            ((IndexSearch != IGOOD) & (IndexSearch != IBAD))  : C0;
                    endcase;

        State C1:
                    case    (IndexSearch == IGOOD)    : C2;
                            (IndexSearch == IBAD)     : C0;
                            ((IndexSearch != IGOOD) & (IndexSearch != IBAD))  : C0;
                    endcase;

        State C2:
                    case    (IndexSearch == IGOOD)    : C3;
                            (IndexSearch == IBAD)     : C0;
                            ((IndexSearch != IGOOD) & (IndexSearch != IBAD))  : C0;
                    endcase;

        State C3:
                    case    (IndexSearch == IGOOD)    : CGOOD;
                            (IndexSearch == IBAD)     : C0;
                            ((IndexSearch != IGOOD) & (IndexSearch != IBAD))  : C0;
                    endcase;

        State CGOOD:
                    case    (IndexSearch == IGOOD)    : CGOOD;
                            (IndexSearch == IBAD)     : C0;
                            ((IndexSearch != IGOOD) & (IndexSearch != IBAD))  : C0;
                    endcase;

        State C5:   "shouldn't get here"
                    case    (1)                                   : C0;
                    endcase;

        State C6:   "shouldn't get here"
                    case    (1)                                   : C0;
                    endcase;

        State C7:   "shouldn't get here"
                    case    (1)                                   : C0;
                    endcase;
```

```
test_vectors
        ([CLK,   uPSync,              INDEX]  ->    [IndexSearch, IndexCount, INDEX_INT])
         [Q,     IndexSync,           X]            ->    [I0,     C0,        H];
         [Q,     IndexWindow,   X]            ->    [I1,     C0,              L];
         [Q,     IndexWindow,   H]            ->    [IGOOD, C0,              L];    "bmt
up"
         [Q,     X,                           X]          ->    [I2,   C1,    X];
         [Q,     IndexSync,           X]            ->    [I0,     C1,        H];
         [Q,     IndexWindow,   X]            ->    [I1,     C1,              L];
         [Q,     IndexWindow,   H]            ->    [IGOOD, C1,              L];    "bmt
up"
         [Q,     X,                           X]          ->    [I2,   C2,    X];
         [Q,     IndexSync,           X]            ->    [I0,     C2,        H];
         [Q,     IndexWindow,   X]            ->    [I1,     C2,              L];
         [Q,     IndexWindow,   H]            ->    [IGOOD, C2,              L];    "bmt
up"
         [Q,     X,                           X]          ->    [I2,   C3,    X];
         [Q,     IndexSync,           X]            ->    [I0,     C3,        H];
         [Q,     IndexWindow,   X]            ->    [I1,     C3,              L];
         [Q,     IndexWindow,   H]            ->    [IGOOD, C3,              L];    "bmt
up"
         [Q,     X,                           X]          ->    [I2,   CGOOD, X];
         [Q,     IndexSync,           X]            ->    [I0,     CGOOD, H];
         [Q,     IndexWindow,   L]            ->    [I1,     CGOOD, H];
         [Q,     IndexWindow,   H]            ->    [IGOOD, CGOOD, L];    "hold count"
         [Q,     X,                           X]          ->    [I2,   CGOOD, X];
         [Q,     IndexSync,           X]            ->    [I0,     CGOOD, H];
         [Q,     IndexWindow,   H]            ->    [I1,     CGOOD, L];
         [Q,     IndexWindow,   L]            ->    [I1,     CGOOD, H];
         [Q,     IndexSync,           L]            ->    [IBAD,   CGOOD, H];    "lest
count"
         [Q,     X,                           X]          ->    [I0,   C0,    H];

end     RT3_DiskSync
MODULE  RT3_DiskWCtl
flag    '-r2'
TITLE   'RT3 - Disk Write Control PAL
                John Stern, Accom Inc.
                4/91
                Version A
'

DiskWCtl device 'P22V10';
        CLK                     pin 1;  "RRC"
        WRITE           pin 8;  "write"
        GO                      pin 9;  "Go signal"
        MARK            pin 10; "mark"
        CIN                     pin 11; "C input"
        YIN                     pin 13; "Y input"

        RRST            pin 14; "read reset"
        YDEL            pin 15; "Y delayed"
        STATE2          pin 16; "also RE"
        GODEL           pin 17; "GO delayed"
        STATE3          pin 18;
        STATE1          pin 19;
        STATE0          pin 20; "also CLK/2 clock output"
        WG                      pin 21; "write gate"
        AMENB           pin 22; "address mark enable"
        WDNRZ           pin 23; "NRZ data out"

"       take feedback outputs from internal nodes"
        STATE3, STATE2, STATE1, STATE0          istype 'neg, reg, feed_reg';

"State Machine State Assignments
        WState          = [STATE3, STATE2, STATE1, STATE0];
        S0 = 0;  S1 = 1;        S2 = 2;         S3 = 3;         S4 = 4;         S5 = 5; S6 =
6;              S7 = 7;
        S8 = 8;  S9 = 9;        S10 = 10;       S11 = 11;       S12 = 12;       S13 = 13;S14
= 14;   S15 = 15;

        EnableOutputs   = [WState, RRST, AMENB];
        NewGo           = GODEL & ! RRST;
```

```
True, False      = 1,0;
High, Low        = 1,0;
H,L,Q,X,Z        = 1,0,.C.,.X.,.Z.;

state_diagram WState
        State S0:
                        RRST            := 0;
                        YDEL            := 0;
                        WG                      := 0;
                        AMENB           := 0;
                        WDNRZ           := 0;

                        case    (! (WRITE & GODEL))     : S0;
                                (WRITE & GODEL)         : S1;
                        endcase;

        State S1:
                        RRST            := 0;
                        YDEL            := 0;
                        WG                      := 1;
                        AMENB           := 0;
                        WDNRZ           := 0;

                        case    (! (WRITE & GODEL))     : S0;
                                (WRITE & GODEL)         : S2;
                        endcase;

        State S2:
                        RRST            := 0;
                        YDEL            := 0;
                        WG                      := 1;
                        AMENB           := 1;
                        WDNRZ           := 0;

                        case    (! (WRITE & GODEL))     : S0;
                                (WRITE & GODEL)         : S3;
                        endcase;

        State S3:
                        RRST            := 1;
                        YDEL            := 0;
                        WG                      := 1;
                        AMENB           := 1;
                        WDNRZ           := 0;

                        case    (! (WRITE & GODEL))     : S0;
                                (WRITE & GODEL)         : S4;
                        endcase;

        State S4:
                        RRST            := 1;
                        YDEL            := 0;
                        WG                      := 1;
                        AMENB           := 0;
                        WDNRZ           := 0;

                        case    (! (WRITE & GODEL))     : S0;
                                (WRITE & GODEL)         : S5;
                        endcase;

        State S5:
                        RRST            := 1;
                        YDEL            := 0;
                        WG                      := 1;
                        AMENB           := 0;
                        WDNRZ           := 0;
                        case    (! (WRITE & GODEL))     : S0;
                                (WRITE & GODEL)         : S6;
                        endcase;

        State S6:       "wait for mark"
                        RRST            := 1;
                        YDEL            := 0;
                        WG                      := 1;
```

```
                AMENB           := 0;
                WDNRZ           := 0;

                case    (! (WRITE & GODEL))                             : S0;
                        (! (WRITE & GODEL & MARK))              : S7;
                        (WRITE & GODEL & MARK)                  : S8;
                endcase;

State S7:       "wait for mark"
                RRST            := 1;
                YDEL            := 0;
                WG                      := 1;
                AMENB           := 0;
                WDNRZ           := 0;

                case    (! (WRITE & GODEL))         : S0;
                        (WRITE & GODEL)             : S6;
                endcase;

State S8:       "sync pattern bit"
                RRST            := 1;
                YDEL            := 0;
                WG                      := 1;
                AMENB           := 0;
                WDNRZ           := 1;

                case    (! WRITE)                               : S0;
                        (WRITE)                                 : S9;
                endcase;

State S9:       "sync pattern bit"
                RRST            := 1;
                YDEL            := 0;
                WG                      := 1;
                AMENB           := 0;
                WDNRZ           := 1;

                case    (! WRITE)                               : S0;
                        (WRITE)                                 : S10;
                endcase;

State S10:      "sync pattern bit"
                RRST            := 1;
                YDEL            := 0;
                WG                      := 1;
                AMENB           := 0;
                WDNRZ           := 0;

                case    (! WRITE)                               : S0;
                        (WRITE)                                 : S11;
                endcase;

State S11:      "sync pattern bit"
                RRST            := 1;
                YDEL            := 0;
                WG                      := 1;
                AMENB           := 0;
                WDNRZ           := 1;
                case    (! WRITE)                               : S0;
                        (WRITE)                                 : S12;
                endcase;

State S12:      "sync pattern bit"
                RRST            := 1;
                YDEL            := 0;
                WG                      := 1;
                AMENB           := 0;
                WDNRZ           := 0;

                case    (! WRITE)                               : S0;
                        (WRITE)                                 : S13;
                endcase;

State S13:      "sync pattern bit"
```

```
                    RRST            := 1;
                    YDEL            := 0;
                    WG                      := 1;
                    AMENB           := 0;
                    WDNRZ           := 0;

                    case    (! WRITE)                       : S0;
                            (WRITE)                         : S14;
                    endcase;

        State S14:  "interleave Y, C"
                    RRST            := GODEL & ! NewGo;
                    YDEL            := YIN & ! NewGo;
                    WG                      := ! NewGo;
                    AMENB           := 0;
                    WDNRZ           := CIN & ! NewGo;

                    case    (! WRITE)                       : S0;
                                    (NewGo)                         : S0;
                            (WRITE & ! NewGo)       : S15;
                    endcase;

        State S15:  "interleave Y, C"
                    RRST            := GODEL & ! NewGo;
                    YDEL            := YDEL & ! NewGo;
                    WG                      := ! NewGo;
                    AMENB           := 0;
                    WDNRZ           := YDEL & ! NewGo;

                    case    (! WRITE)                       : S0;
                                    (NewGo)                         : S0;
                            (WRITE & ! NewGo)       : S14;
                    endcase;


equations
        GODEL                                   := GO;
        enable EnableOutputs    = WRITE;        "HI Z"


test_vectors
        ([CLK, WRITE, GO, MARK, CIN, YIN]
                                        ->      [WState, RRST, YDEL, AMENB, WDNRZ, WG,
GODEL])
          [X, L, X, X, X, X]    ->      [Z,             Z, X, Z, X, X, X];      "HI Z"
          [Q, L, X, X, X, X]    ->      [Z,             Z, X, Z, X, X, X];      "HI Z"
          [Q, L, X, X, X, X]    ->      [Z,             Z, L, Z, L, L, X];      "HI Z"
          [Q, H, L, X, X, X]    ->      [S0,    L, L, L, L, L, L];      "S0"
          [Q, H, H, X, X, X]    ->      [S0,    L, L, L, L, L, H];      "S0"
          [Q, H, H, X, X, X]    ->      [S1,    L, L, L, L, L, H];      "S1"
          [Q, H, H, X, X, X]    ->      [S2,    L, L, L, L, H, H];      "S2"
          [Q, H, H, X, X, X]    ->      [S3,    L, L, H, L, H, H];      "S3"
          [Q, H, H, X, X, X]    ->      [S4,    H, L, H, L, H, H];      "S4"
          [Q, H, H, X, X, X]    ->      [S5,    H, L, L, L, H, H];      "S5"
          [Q, H, H, X, X, X]    ->      [S6,    H, L, L, L, H, H];      "S6"
          [Q, H, H, L, X, X]    ->      [S7,    H, L, L, L, H, H];      "S7"
          [Q, H, H, X, X, X]    ->      [S6,    H, L, L, L, H, H];      "S6"
          [Q, H, H, H, X, X]    ->      [S8,    H, L, L, L, H, H];      "S8"
          [Q, H, H, H, X, X]    ->      [S9,    H, L, L, H, H, H];      "S9"
          [Q, H, H, X, X, X]    ->      [S10,   H, L, L, H, H, H];      "S10"
          [Q, H, H, X, X, X]    ->      [S11,   H, L, L, L, H, H];      "S11"
          [Q, H, H, X, X, X]    ->      [S12,   H, L, L, H, H, H];      "S12"
          [Q, H, H, X, X, X]    ->      [S13,   H, L, L, L, H, H];      "S13"
          [Q, H, H, X, X, X]    ->      [S14,   H, L, L, L, H, H];      "S14"
          [Q, H, H, X, H, L]    ->      [S15,   H, L, L, H, H, H];      "S15"
          [Q, H, H, X, X, X]    ->      [S14,   H, L, L, L, H, H];      "S14"
          [Q, H, H, X, L, H]    ->      [S15,   H, H, L, L, H, H];      "S15"
          [Q, H, L, X, X, X]    ->      [S14,   H, H, L, H, H, L];      "S14"
          [Q, H, L, X, H, H]    ->      [S15,   L, H, L, H, H, L];      "S15"
          [Q, H, L, X, X, X]    ->      [S14,   L, H, L, H, H, L];      "S14"
          [Q, H, L, X, L, L]    ->      [S15,   L, L, L, L, H, L];      "S15"
          [Q, H, H, X, X, X]    ->      [S14,   L, L, L, L, H, H];      "S14"
          [Q, H, H, X, X, X]    ->      [S0,    L, L, L, L, L, H];      "S0"
```

```
end     RT3_DiskWCtl
MODULE  RT3_edac0
flag    '-r2'
TITLE   'RT3 - EDAC encode PAL
                John Stern, Accom Inc.
                4/91
                Version A
'

edac0 device 'P22V10';
        X9, X8, X7, X6, X5, X4, X3, X2, X1, X0          pin 10, 9, 8, 7, 6, 5, 4, 3,
2, 1;
        Y9, Y8, Y7, Y6, Y5, Y4, Y3, Y2, Y1, Y0          pin 14, 15, 16, 17, 18, 19, 20,
21, 22, 23;
        EDAC                            pin 11;
        DATDIR                          pin 13;

        True, False     = 1,0;
        High, Low       = 1,0;
        H,L,Q,X,Z       = 1,0,.C.,.X.,.Z.;

        XIn                     = [X9, X8, X7, X6, X5, X4, X3, X2, X1, X0];
        YOut            = [Y9, Y8, Y7, Y6, Y5, Y4, Y3, Y2, Y1, Y0];


equations
        Y0                      = ((EDAC & X6) # (! EDAC & X0));
        Y1                      = ((EDAC & X7) # (! EDAC & X1));
        Y2                      = ((EDAC & X6) # (! EDAC & X2));
        Y3                      = ((EDAC & X7) # (! EDAC & X3));
        Y4                      = ((EDAC & X6) # (! EDAC & X4));
        Y5                      = ((EDAC & X7) # (! EDAC & X5));
        Y6                      = ((EDAC & X6) # (! EDAC & X6));
        Y7                      = ((EDAC & X7) # (! EDAC & X7));
        Y8                      = ((EDAC & X6) # (! EDAC & X8));
        Y9                      = ((EDAC & X7) # (! EDAC & X9));
        Enable YOut     = DATDIR;


test_vectors
        ([XIn,          EDAC,   DATDIR] ->      [YOut])
         [X,            X,              L]              ->      [Z];            "Hi Z";
         [^h000,        L,              H]              ->      [^h000];        "Normal
Pass-through";
         [^h001,        L,              H]              ->      [^h001];        "Normal
Pass-through";
         [^h002,        L,              H]              ->      [^h002];        "Normal
Pass-through";
         [^h3FE,        L,              H]              ->      [^h3FE];        "Normal
Pass-through";
         [^h3FF,        L,              H]              ->      [^h3FF];        "Normal
Pass-through";
         [^h000,        H,              H]              ->      [^h000];        "EDAC";
         [^h040,        H,              H]              ->      [^h155];        "EDAC";
         [^h080,        H,              H]              ->      [^h2AA];        "EDAC";
         [^h0C0,        H,              H]              ->      [^h3FF];        "EDAC";
         [^h33F,        H,              H]              ->      [^h000];        "EDAC";
         [^h37F,        H,              H]              ->      [^h155];        "EDAC";
         [^h3BF,        H,              H]              ->      [^h2AA];        "EDAC";
         [^h3FF,        H,              H]              ->      [^h3FF];        "EDAC";

end     RT3_edac0


MODULE  RT3_edac1
flag    '-r2'
TITLE   'RT3 - EDAC encode PAL
                John Stern, Accom Inc.
                4/91
                Version A
'

edac1 device 'P22V10';
```

```
        X9, X8, X7, X6, X5, X4, X3, X2, X1, X0                    pin 10, 9, 8, 7, 6, 5, 4, 3,
2, 1;
        Y9, Y8, Y7, Y6, Y5, Y4, Y3, Y2, Y1, Y0                    pin 14, 15, 16, 17, 18, 19, 20,
21, 22, 23;
        EDAC                        pin 11;
        DATDIR                      pin 13;

        True, False     = 1,0;
        High, Low       = 1,0;
        H,L,Q,X,Z       = 1,0,.C.,.X.,.Z.;

        XIn                   = [X9, X8, X7, X6, X5, X4, X3, X2, X1, X0];
        YOut            = [Y9, Y8, Y7, Y6, Y5, Y4, Y3, Y2, Y1, Y0];
        Majority0       = (X0 & X2 & X4) # (X0 & X2 & X6) # (X0 & X2 & X8) # (X0 & X4 & X6) #
(X0 & X4 & X8) #
                                    (X0 & X6 & X8) # (X2 & X4 & X6) # (X2 & X4 & X8) # (X2
& X6 & X8) # (X4 & X6 & X8);
        Majority1       = (X1 & X3 & X5) # (X1 & X3 & X7) # (X1 & X3 & X9) # (X1 & X5 & X7) #
(X1 & X5 & X9) #
                                    (X1 & X7 & X9) # (X3 & X5 & X7) # (X3 & X5 & X9) # (X3
& X7 & X9) # (X5 & X7 & X9);

equations
        Y0                    = ((EDAC & 0) # (! EDAC & X0));
        Y1                    = ((EDAC & 0) # (! EDAC & X1));
        Y2                    = ((EDAC & 0) # (! EDAC & X2));
        Y3                    = ((EDAC & 0) # (! EDAC & X3));
        Y4                    = ((EDAC & 0) # (! EDAC & X4));
        Y5                    = ((EDAC & 0) # (! EDAC & X5));
        Y6                    = ((EDAC & Majority0) # (! EDAC & X6));
        Y7                    = ((EDAC & Majority1) # (! EDAC & X7));
        Y8                    = ((EDAC & 0) # (! EDAC & X8));
        Y9                    = ((EDAC & 0) # (! EDAC & X9));
        Enable YOut     = ! DATDIR;
test_vectors
        ([XIn,          EDAC,   DATDIR] ->      [YOut])
         [X,            X,            H]          ->    [Z];        "Hi Z";
         [^h000,        L,            L]          ->    [^h000];    "Normal
Pass-through";
         [^h001,        L,            L]          ->    [^h001];    "Normal
Pass-through";
         [^h002,        L,            L]          ->    [^h002];    "Normal
Pass-through";
         [^h3FE,        L,            L]          ->    [^h3FE];    "Normal
Pass-through";
         [^h3FF,        L,            L]          ->    [^h3FF];    "Normal
Pass-through";
         [^h000,        H,            L]          ->    [^h000];    "EDAC";
         [^h3FF,        H,            L]          ->    [^h0C0];    "EDAC";
         [^h280,        H,            L]          ->    [^h000];    "EDAC";
         [^h2A0,        H,            L]          ->    [^h080];    "EDAC";
         [^h140,        H,            L]          ->    [^h000];    "EDAC";
         [^h150,        H,            L]          ->    [^h040];    "EDAC";


end     RT3_edac1
MODULE  RT3_FSSer
flag    '-r3'
TITLE   'RT3 - FS Serial Control PAL
                John Stern, Accom Inc.
                4/91
                Version A
'

FSSer device 'P22V10';
        CLK                               pin 1;
        HACT3, HACT2, HACT1               pin 4, 3, 2;
        VACT4, VACT3, VACT2, VACT1  pin 10, 9, 8, 7;
        YCLK                        pin 5;
        CCLK                        pin 6;
        FS22, FS21, FS20      pin 14, 13, 11;
        FS12, FS11, FS10      pin 15, 16, 17;

        FS1YH                       pin 23;
        FS1CH                       pin 22;
```

```
        FS1V                            pin 21;
        FS2YH                           pin 20;
        FS2CH                           pin 19;
        FS2V                            pin 18;

        True, False     = 1,0;
        High, Low       = 1,0;
        H,L,Q,X,Z       = 1,0,.C.,.X.,.Z.;

        FSCtl1          = [FS12, FS11, FS10];
        FSCtl2          = [FS22, FS21, FS20];

"       control definitions"
        NoAction        = 0;
        WriteInput      = 1;
        WriteDisk       = 2;
        WriteBrowse     = 3;
        ReadNormal      = 4;
        ReadDelay       = 5;
        Unused1         = 6;
        Unused2         = 7;

equations
        FS1V            :=  ((FSCtl1 == NoAction) & 0)
                                # ((FSCtl1 == WriteInput) & ((VACT1 & (HACT1 # FS1V)) # VACT2))
                                # ((FSCtl1 == WriteDisk) & ((VACT1 & (HACT1 # FS1V)) # VACT2))
                                # ((FSCtl1 == WriteBrowse) & ((VACT1 & (HACT1 # FS1V)) # VACT2))
                                # ((FSCtl1 == ReadNormal) & VACT3 & (HACT3 # FS1V))
                                # ((FSCtl1 == ReadDelay) & VACT4 & (HACT3 # FS1V))
                                # ((FSCtl1 == Unused1) & 0)
                                # ((FSCtl1 == Unused2) & 0);

        FS1YH           :=      ((FSCtl1 == NoAction) & 0)
                                # ((FSCtl1 == WriteInput) & ((VACT1 & HACT1) # (VACT2 & HACT2)))
                                # ((FSCtl1 == WriteDisk) & ((VACT1 & HACT1) # (VACT2 & HACT2)))
                                # ((FSCtl1 == WriteBrowse) & YCLK & ((VACT1 & HACT1) # (VACT2
& HACT2)))
                                # ((FSCtl1 == ReadNormal) & VACT3 & HACT3)
                                # ((FSCtl1 == ReadDelay) & VACT4 & HACT3)
                                # ((FSCtl1 == Unused1) & 0)
                                # ((FSCtl1 == Unused2) & 0);

        FS1CH           :=  ((FSCtl1 == NoAction) & 0)
                                # ((FSCtl1 == WriteInput) & ((VACT1 & HACT1) # (VACT2 & HACT2)))
                                # ((FSCtl1 == WriteDisk) & ((VACT1 & HACT1) # (VACT2 & HACT2)))
                                # ((FSCtl1 == WriteBrowse) & CCLK & ((VACT1 & HACT1) # (VACT2
& HACT2)))
                                # ((FSCtl1 == ReadNormal) & VACT3 & HACT3)
                                # ((FSCtl1 == ReadDelay) & VACT4 & HACT3)
                                # ((FSCtl1 == Unused1) & 0)
                                # ((FSCtl1 == Unused2) & 0);

        FS2V            :=  ((FSCtl2 == NoAction) & 0)
                                # ((FSCtl2 == WriteInput) & ((VACT1 & (HACT1 # FS2V)) # VACT2))
                                # ((FSCtl2 == WriteDisk) & ((VACT1 & (HACT1 # FS2V)) # VACT2))
                                # ((FSCtl2 == WriteBrowse) & ((VACT1 & (HACT1 # FS2V)) # VACT2))
                                # ((FSCtl2 == ReadNormal) & VACT3 & (HACT3 # FS2V))
                                # ((FSCtl2 == ReadDelay) & VACT4 & (HACT3 # FS2V))
                                # ((FSCtl2 == Unused1) & 0)
                                # ((FSCtl2 == Unused2) & 0);

        FS2YH           :=      ((FSCtl2 == NoAction) & 0)
                                # ((FSCtl2 == WriteInput) & ((VACT1 & HACT1) # (VACT2 & HACT2)))
                                # ((FSCtl2 == WriteDisk) & ((VACT1 & HACT1) # (VACT2 & HACT2)))
                                # ((FSCtl2 == WriteBrowse) & YCLK & ((VACT1 & HACT1) # (VACT2
& HACT2)))
                                # ((FSCtl2 == ReadNormal) & VACT3 & HACT3)
                                # ((FSCtl2 == ReadDelay) & VACT4 & HACT3)
                                # ((FSCtl2 == Unused1) & 0)
                                # ((FSCtl2 == Unused2) & 0);

        FS2CH           :=  ((FSCtl2 == NoAction) & 0)
                                # ((FSCtl2 == WriteInput) & ((VACT1 & HACT1) # (VACT2 & HACT2)))
                                # ((FSCtl2 == WriteDisk) & ((VACT1 & HACT1) # (VACT2 & HACT2)))
```

```
                                # ((FSCtl2 == WriteBrowse) & CCLK & ((VACT1 & HACT1) # (VACT2
& HACT2)))

                                # ((FSCtl2 == ReadNormal) & VACT3 & HACT3)
                                # ((FSCtl2 == ReadDelay) & VACT4 & HACT3)
                                # ((FSCtl2 == Unused1) & 0)
                                # ((FSCtl2 == Unused2) & 0);


test_vectors
      ([CLK, FSCtl1, FSCtl2, HACT3, HACT2, HACT1, VACT4, VACT3, VACT2, VACT1, YCLK, CCLK]->
                              [FS1YH, FS1CH, FS1V, FS2YH, FS2CH, FS2V])
        [Q, NoAction,         NoAction,         X, X, X, X, X, X, X, X, X]     ->[0
0, 0, 0, 0, 0];
        [Q, WriteInput,       NoAction,         X, X, X, X, X, 0, 0, X, X]     ->[0
0, 0, 0, 0, 0];
        [Q, WriteInput,       NoAction,         X, X, 0, X, X, 0, 1, X, X]     ->[0
0, 0, 0, 0, 0];
        [Q, WriteInput,       NoAction,         X, X, 1, X, X, 0, 1, X, X]     ->[1
1, 1, 0, 0, 0];
        [Q, WriteInput,       NoAction,         X, X, 0, X, X, 0, 1, X, X]     ->[0
0, 1, 0, 0, 0];
        [Q, WriteInput,       NoAction,         X, 0, 1, X, X, 1, 0, X, X]     ->[0
0, 1, 0, 0, 0];
        [Q, WriteInput,       NoAction,         X, 1, 0, X, X, 1, X, X, X]     ->[1
1, 1, 0, 0, 0];
        [Q, WriteInput,       NoAction,         X, 0, 1, X, X, 1, X, X, X]     ->[0
0, 1, 0, 0, 0];
        [Q, WriteDisk,        NoAction,         X, X, X, X, X, 0, 0, X, X]     ->[0
0, 0, 0, 0, 0];
        [Q, WriteDisk,        NoAction,         X, X, 1, X, X, 0, 1, X, X]     ->[1
1, 1, 0, 0, 0];
        [Q, WriteBrowse,      NoAction,         X, X, X, X, X, 0, 0, X, X]     ->[0
0, 0, 0, 0, 0];
        [Q, WriteBrowse,      NoAction,         X, X, 1, X, X, 0, 1, 0, 0]     ->[0
0, 1, 0, 0, 0];
        [Q, WriteBrowse,      NoAction,         X, X, 1, X, X, 0, 1, 1, 1]     ->[1
1, 1, 0, 0, 0];
        [Q, ReadNormal,       NoAction,         0, X, X, X, 0, X, X, X, X]     ->[0
0, 0, 0, 0, 0];
        [Q, ReadNormal,       NoAction,         1, X, X, X, 0, X, X, X, X]     ->[0
0, 0, 0, 0, 0];
        [Q, ReadNormal,       NoAction,         0, X, X, X, 1, X, X, X, X]     ->[0
0, 0, 0, 0, 0];
        [Q, ReadNormal,       NoAction,         1, X, X, X, 1, X, X, X, X]     ->[1
1, 1, 0, 0, 0];
        [Q, ReadNormal,       NoAction,         0, X, X, X, 1, X, X, X, X]     ->[0
0, 1, 0, 0, 0];
        [Q, ReadDelay,        NoAction,         0, X, X, 0, X, X, X, X, X]     ->[0
0, 0, 0, 0, 0];
        [Q, ReadDelay,        NoAction,         1, X, X, 0, X, X, X, X, X]     ->[0
0, 0, 0, 0, 0];
        [Q, ReadDelay,        NoAction,         0, X, X, 1, X, X, X, X, X]     ->[0
0, 0, 0, 0, 0];
        [Q, ReadDelay,        NoAction,         1, X, X, 1, X, X, X, X, X]     ->[1
1, 1, 0, 0, 0];
        [Q, ReadDelay,        NoAction,         0, X, X, 1, X, X, X, X, X]     ->[0
0, 1, 0, 0, 0];
        [Q, Unused1,          NoAction,         X, X, X, X, X, X, X, X, X]     ->[0
0, 0, 0, 0, 0];
        [Q, Unused2,          NoAction,         X, X, X, X, X, X, X, X, X]     ->[0
0, 0, 0, 0, 0];
        [Q, NoAction,         WriteInput,       X, X, X, X, X, 0, 0, X, X]     ->[0
0, 0, 0, 0, 0];
        [Q, NoAction,         WriteInput,       X, X, 0, X, X, 0, 1, X, X]     ->[0
0, 0, 0, 0, 0];
        [Q, NoAction,         WriteInput,       X, X, 1, X, X, 0, 1, X, X]     ->[0
0, 0, 1, 1, 1];
        [Q, NoAction,         WriteInput,       X, X, 0, X, X, 0, 1, X, X]     ->[0
0, 0, 0, 0, 1];
        [Q, NoAction,         WriteInput,       X, 0, 1, X, X, 1, 0, X, X]     ->[0
0, 0, 0, 0, 1];
        [Q, NoAction,         WriteInput,       X, 1, 0, X, X, 1, X, X, X]     ->[0
0, 0, 1, 1, 1];
        [Q, NoAction,         WriteInput,       X, 0, 1, X, X, 1, X, X, X]     ->[0
0, 0, 0, 0, 1];
```

```
        [Q, NoAction,         WriteDisk,          X, X, X, X, X, 0, 0, X, X]      ->[0,
0, 0, 0, 0, 0];
        [Q, NoAction,         WriteDisk,          X, X, 1, X, X, 0, 1, X, X]      ->[0,
0, 0, 1, 1, 1];
        [Q, NoAction,         WriteBrowse,    X, X, X, X, X, 0, 0, X, X]      ->      [0,
0, 0, 0, 0, 0];
        [Q, NoAction,         WriteBrowse,    X, X, 1, X, X, 0, 1, 0, 0]      ->      [0,
0, 0, 0, 0, 1];
        [Q, NoAction,         WriteBrowse,    X, X, 1, X, X, 0, 1, 1, 1]      ->      [0,
0, 0, 1, 1, 1];
        [Q, NoAction,         ReadNormal,         0, X, X, X, 0, X, X, X, X]      ->[0,
0, 0, 0, 0, 0];
        [Q, NoAction,         ReadNormal,         1, X, X, X, 0, X, X, X, X]      ->[0,
0, 0, 0, 0, 0];
        [Q, NoAction,         ReadNormal,         0, X, X, X, 1, X, X, X, X]      ->[0,
0, 0, 0, 0, 0];
        [Q, NoAction,         ReadNormal,         1, X, X, X, 1, X, X, X, X]      ->[0,
0, 0, 1, 1, 1];
        [Q, NoAction,         ReadNormal,         0, X, X, X, 1, X, X, X, X]      ->[0,
0, 0, 0, 0, 1];
        [Q, NoAction,         ReadDelay,          0, X, X, 0, X, X, X, X, X]      ->[0,
0, 0, 0, 0, 0];
        [Q, NoAction,         ReadDelay,          1, X, X, 0, X, X, X, X, X]      ->[0,
0, 0, 0, 0, 0];
        [Q, NoAction,         ReadDelay,          0, X, X, 1, X, X, X, X, X]      ->[0,
0, 0, 0, 0, 0];
        [Q, NoAction,         ReadDelay,          1, X, X, 1, X, X, X, X, X]      ->[0,
0, 0, 1, 1, 1];
        [Q, NoAction,         ReadDelay,          0, X, X, 1, X, X, X, X, X]      ->[0,
0, 0, 0, 0, 1];
        [Q, NoAction,         Unused1,            X, X, X, X, X, X, X, X, X]      ->[0,
0, 0, 0, 0, 0];
        [Q, NoAction,         Unused2,            X, X, X, X, X, X, X, X, X]      ->[0,
0, 0, 0, 0, 0];


end     RT3_FSSer
MODULE  RT3_RandAcc
flag    '-r3'
TITLE   'RT3 - Framestore Random Access PAL
                John Stern, Accom Inc.
                4/91
                Version A
'

RandAcc device 'P22V10';
        CLK                             pin 1;
        AREQ                    pin 2;
        GRANTB                  pin 3;
        CHROMA                  pin 4;
        LOAD                    pin 5;
        RFIP                    pin 6;
        MWR                             pin 7;
        DTACK                   pin 8;
        MUBE                    pin 9;
        CS                              pin 10;
        uPA19                   pin 11;
        uPA0                    pin 13;

        WAIT                    pin 14;
        ENB                             pin 15;
        ENA                             pin 16;
        AREQB                   pin 17;
        WE1                             pin 18;
        WE0                             pin 19;
        LOADREQ                 pin 20;
        WIN                             pin 21;
        ECAS1                   pin 22;
        ECAS0                   pin 23;

        True, False             = 1,0;
        High, Low               = 1,0;
        H,L,Q,X,Z               = 1,0,.C.,.X.,.Z.;

        SharedOut               = [WIN, WE0, WE1];
```

```
        Selected        = ! CS;
        DoLoad          = ! LOAD;


equations
        ! enable SharedOut          = ENB;
        ! WAIT                      = (! DoLoad & Selected & (! AREQ # ! RFIP # DTACK));
        ! ENB                       = (DoLoad # GRANTB);
        ! ENA                       = ! (DoLoad # GRANTB);
        ! AREQB                     := (Selected & ! DoLoad);
        ! WE1                       = (Selected & ! DoLoad & ! MWR & ! DTACK & ((CHROMA & uPA19) #
(! CHROMA & ! MUBE)));
        ! WE0                       = (Selected & ! DoLoad & ! MWR & ! DTACK & ((CHROMA & ! uPA19)
# (! CHROMA & ! uPA0)));
        LOADREQ                     = (DoLoad & Selected & ! MWR);
        ! WIN                       = (Selected & ! DoLoad & ! MWR & ! DTACK);
        ! ECAS1                     = ((! ENB & ((CHROMA & ! MUBE) # (! CHROMA & uPA19))) # ! ENA
# DoLoad);
        ! ECAS0                     = ((! ENB & ((CHROMA & ! uPA0) # (! CHROMA & ! uPA19))) # ! ENA
# DoLoad);


test_vectors
        ([CLK, AREQ, GRANTB, CHROMA, LOAD, RFIP, MWR, DTACK, MUBE, CS, uPA19, uPA0]          ->
                        [WAIT, ENB, ENA, AREQB, WE1, WE0, LOADREQ, WIN, ECAS1, ECAS0])
         [X, X, L, X, H, X, X, X, X, X, X, X]    ->      [X, H, L, X, Z, Z, X, X, L, L];  'BR'
         [X, X, H, X, X, X, X, X, X, X, X, X]    ->      [X, L, H, X, X, X, X, X, X, X];  'BB'
         [Q, X, H, X, H, X, X, X, X, H, X, X]    ->      [H, L, H, X, H, H, L, H, X, X];  "hot
selected"
         [Q, X, H, L, H, X, H, X, H, L, X, X]    ->      [X, L, H, L, H, H, L, H, X, X];  [illegible]
         [Q, X, H, L, H, X, H, X, H, L, X, X]    ->      [X, L, H, X, H, H, L, H, X, X];  [illegible]
         [Q, X, H, L, H, X, H, L, H, L, X, X]    ->      [X, L, H, X, H, H, L, H, X, X];  [illegible]
         [Q, X, H, L, H, X, L, L, H, L, X, X]    ->      [X, L, H, X, X, X, L, L, X, X];  [illegible]
         [Q, X, X, X, L, X, L, X, X, L, X, X]    ->      [H, L, H, H, H, H, H, H, L, L];  [illegible]
         [X, L, X, X, H, L, X, H, X, L, X, X]    ->      [L, X, X, X, X, X, X, X, X, X];  [illegible]


end     RT3_RandAcc
MODULE  RT3_RHead0
flag    '-r2'
TITLE   'RT3 - Read Head PAL 0
                John Stern, Accom INc.
                4/91
                Version A
'

RHead0 device 'P22V10';
        CLK                                 pin 1;
        KEYMUX                  pin 13;
        INSWAP                  pin 7;
        IN4, IN3, IN2, IN1, IN0                     pin 6, 5, 4, 3, 2;
        HEAD3, HEAD2, HEAD1, HEAD0                  pin 11, 10, 9, 8;
        UP4, UP3, UP2, UP1, UP0                     pin 14, 15, 16, 17, 18;
        LO4, LO3, LO2, LO1, LO0                     pin 19, 20, 21, 22, 23;

        True, False     = 1,0;
        High, Low       = 1,0;
        H,L,Q,X,Z       = 1,0,.C.,.X.,.Z.;

        Head            = [HEAD3, HEAD2, HEAD1, HEAD0];
        Input           = [IN4, IN3, IN2, IN1, IN0];
        UpperOut        = [UP4, UP3, UP2, UP1, UP0];
        LowerOut        = [LO4, LO3, LO2, LO1, LO0];
        Swap0           = 0;
        Swap1           = 1;
        Swap2           = 2;
        Swap3           = 3;
        Swap4           = 4;
        Swap5           = 10;

equations
        LO0                     := (((Head == Swap0) & INSWAP) # ((Head != Swap0) & IN0));
        LO1                     := (((Head == Swap1) & INSWAP) # ((Head != Swap1) & IN1));
        LO2                     := (((Head == Swap2) & INSWAP) # ((Head != Swap2) & IN2));
```

```
        LO3                    := (((Head == Swap3) & INSWAP) # ((Head != Swap3) & IN3));
        LO4                    := (((Head == Swap4) & INSWAP) # ((Head != Swap4) & IN4));
        Enable LowerOut  = ! KEYMUX;
        UP0                    := (((Head == Swap0) & INSWAP) # ((Head != Swap0) & IN0));
        UP1                    := (((Head == Swap1) & INSWAP) # ((Head != Swap1) & IN1));
        UP2                    := (((Head == Swap2) & INSWAP) # ((Head != Swap2) & IN2));
        UP3                    := (((Head == Swap3) & INSWAP) # ((Head != Swap3) & IN3));
        UP4                    := (((Head == Swap4) & INSWAP) # ((Head != Swap4) & IN4));
        Enable UpperOut  = KEYMUX;

test_vectors
        ([CLK,  KEYMUX, Head,   INSWAP, Input]  ->      [UpperOut,      LowerOut])
         [Q,    L,              Swap5,  X,              ^h00]   ->      [Z,
^h00];  "test lower"
         [Q,    L,              Swap5,  X,              ^h1F]   ->      [Z,
^h1F];  "test lower"
         [Q,    L,              Swap0,  H,              ^h00]   ->      [Z,
^h01];  "test lower"
         [Q,    L,              Swap1,  H,              ^h00]   ->      [Z,
^h02];  "test lower"
         [Q,    L,              Swap2,  H,              ^h00]   ->      [Z,
^h04];  "test lower"
         [Q,    L,              Swap3,  H,              ^h00]   ->      [Z,
^h08];  "test lower"
         [Q,    L,              Swap4,  H,              ^h00]   ->      [Z,
^h10];  "test lower"
         [Q,    L,              Swap0,  L,              ^h1F]   ->      [Z,
^h1E];  "test lower"
         [Q,    L,              Swap1,  L,              ^h1F]   ->      [Z,
^h1D];  "test lower"
         [Q,    L,              Swap2,  L,              ^h1F]   ->      [Z,
^h1B];  "test lower"
         [Q,    L,              Swap3,  L,              ^h1F]   ->      [Z,
^h17];  "test lower"
         [Q,    L,              Swap4,  L,              ^h1F]   ->      [Z,
^h0F];  "test lower"
         [Q,    H,              Swap5,  X,              ^h00]   ->      [^h00,
Z];             "test upper"
         [Q,    H,              Swap5,  X,              ^h1F]   ->      [^h1F,
Z];             "test upper"
         [Q,    H,              Swap0,  H,              ^h00]   ->      [^h01,
Z];             "test upper"
         [Q,    H,              Swap1,  H,              ^h00]   ->      [^h02,
Z];             "test upper"
         [Q,    H,              Swap2,  H,              ^h00]   ->      [^h04,
Z];             "test upper"
         [Q,    H,              Swap3,  H,              ^h00]   ->      [^h08,
Z];             "test upper"
         [Q,    H,              Swap4,  H,              ^h00]   ->      [^h10,
Z];             "test upper"
         [Q,    H,              Swap0,  L,              ^h1F]   ->      [^h1E,
Z];             "test upper"
         [Q,    H,              Swap1,  L,              ^h1F]   ->      [^h1D,
Z];             "test upper"
         [Q,    H,              Swap2,  L,              ^h1F]   ->      [^h1B,
Z];             "test upper"
         [Q,    H,              Swap3,  L,              ^h1F]   ->      [^h17,
Z];             "test upper"
         [Q,    H,              Swap4,  L,              ^h1F]   ->      [^h0F,
Z];             "test upper"
end     RT3_RHead0


MODULE  RT3_RHead1
flag    '-r2'
TITLE   'RT3 - Read Head PAL 1
                John Stern, Accom INc.
                4/91
                Version A
'

RHead1 device 'P22V10';
        CLK                             pin 1;
```

```
        KEYMUX                  pin 13;
        INSWAP                  pin 7;
        IN4, IN3, IN2, IN1, IN0                  pin 6, 5, 4, 3, 2;
        HEAD3, HEAD2, HEAD1, HEAD0               pin 11, 10, 9, 8;
        UP4, UP3, UP2, UP1, UP0                  pin 14, 15, 16, 17, 18;
        LO4, LO3, LO2, LO1, LO0                  pin 19, 20, 21, 22, 23;

        True, False      = 1,0;
        High, Low        = 1,0;
        H,L,Q,X,Z        = 1,0,.C.,.X.,.Z.;

        Head             = [HEAD3, HEAD2, HEAD1, HEAD0];
        Input            = [IN4, IN3, IN2, IN1, IN0];
        UpperOut         = [UP4, UP3, UP2, UP1, UP0];
        LowerOut         = [LO4, LO3, LO2, LO1, LO0];
        Swap0            = 5;
        Swap1            = 6;
        Swap2            = 7;
        Swap3            = 8;
        Swap4            = 9;
        Swap5            = 10;

equations
        LO0                     := (((Head == Swap0) & INSWAP) # ((Head != Swap0) & IN0));
        LO1                     := (((Head == Swap1) & INSWAP) # ((Head != Swap1) & IN1));
        LO2                     := (((Head == Swap2) & INSWAP) # ((Head != Swap2) & IN2));
        LO3                     := (((Head == Swap3) & INSWAP) # ((Head != Swap3) & IN3));
        LO4                     := (((Head == Swap4) & INSWAP) # ((Head != Swap4) & IN4));
        Enable LowerOut  = KEYMUX;
        UP0                     := (((Head == Swap0) & INSWAP) # ((Head != Swap0) & IN0));
        UP1                     := (((Head == Swap1) & INSWAP) # ((Head != Swap1) & IN1));
        UP2                     := (((Head == Swap2) & INSWAP) # ((Head != Swap2) & IN2));
        UP3                     := (((Head == Swap3) & INSWAP) # ((Head != Swap3) & IN3));
        UP4                     := (((Head == Swap4) & INSWAP) # ((Head != Swap4) & IN4));
        Enable UpperOut  = ! KEYMUX;


test_vectors
        ([CLK,  KEYMUX, Head,   INSWAP, Input]  ->      [UpperOut,      LowerOut])
         [Q,    H,              Swap5,  X,              ^h00]   ->      [Z,
^h00];  "test lower"
         [Q,    H,              Swap5,  X,              ^h1F]   ->      [Z,
^h1F];  "test lower"
         [Q,    H,              Swap0,  H,              ^h00]   ->      [Z,
^h01];  "test lower"
         [Q,    H,              Swap1,  H,              ^h00]   ->      [Z,
^h02];  "test lower"
         [Q,    H,              Swap2,  H,              ^h00]   ->      [Z,
^h04];  "test lower"
         [Q,    H,              Swap3,  H,              ^h00]   ->      [Z,
^h08];  "test lower"
         [Q,    H,              Swap4,  H,              ^h00]   ->      [Z,
^h10];  "test lower"
         [Q,    H,              Swap0,  L,              ^h1F]   ->      [Z,
^h1E];  "test lower"
         [Q,    H,              Swap1,  L,              ^h1F]   ->      [Z,
^h1D];  "test lower"
         [Q,    H,              Swap2,  L,              ^h1F]   ->      [Z,
^h1B];  "test lower"
         [Q,    H,              Swap3,  L,              ^h1F]   ->      [Z,
^h17];  "test lower"
         [Q,    H,              Swap4,  L,              ^h1F]   ->      [Z,
^h0F];  "test lower"
         [Q,    L,              Swap5,  X,              ^h00]   ->      [^h00,
Z];             "test upper"
         [Q,    L,              Swap5,  X,              ^h1F]   ->      [^h1F,
Z];             "test upper"
         [Q,    L,              Swap0,  H,              ^h00]   ->      [^h01,
Z];             "test upper"
         [Q,    L,              Swap1,  H,              ^h00]   ->      [^h02,
Z];             "test upper"
         [Q,    L,              Swap2,  H,              ^h00]   ->      [^h04,
Z];             "test upper"
         [Q,    L,              Swap3,  H,              ^h00]   ->      [^h08,
Z];             "test upper"
```

```
        [Q,     L,              Swap4,  H,              ^h00]   ->      [^h10,
Z];             "test upper"
        [Q,     L,              Swap0,  L,              ^h1F]   ->      [^h1E,
Z];             "test upper"
        [Q,     L,              Swap1,  L,              ^h1F]   ->      [^h1D,
Z];             "test upper"
        [Q,     L,              Swap2,  L,              ^h1F]   ->      [^h1B,
Z];             "test upper"
        [Q,     L,              Swap3,  L,              ^h1F]   ->      [^h17,
Z];             "test upper"
        [Q,     L,              Swap4,  L,              ^h1F]   ->      [^h0F,
Z];             "test upper"

end     RT3_RHead1
MODULE  RT3_round
flag    '-r2'
TITLE   'RT3 - Vertical Interpolator Round PAL
                John Stern, Accom Inc.
                4/91
                Version A
'
"       Limits the interpolated (two's complement) signal, which may
"       span the range +-4.0 to (unsigned) +-1.0, wherein 1.0
"       corresponds to hex 200 (actually 1FF maximum).

round device 'P22V10';
        X11, X10, X9, X8, X7, X6 pin 13, 11, 10, 9, 8, 7;
        X5, X4, X3, X2, X1, X0          pin 6, 5, 4, 3, 2, 1;
        Y9, Y8, Y7, Y6, Y5                      pin 14, 15, 16, 17, 18;
        Y4, Y3, Y2, Y1, Y0                      pin 19, 20, 21, 22, 23;

        True, False     = 1,0;
        High, Low       = 1,0;
        H,L,Q,X,Z       = 1,0,.C.,.X.,.Z.;

        XIn                     = [X11, X10, X9, X8, X7, X6, X5, X4, X3, X2, X1, X0];
        YOut            = [Y9, Y8, Y7, Y6, Y5, Y4, Y3, Y2, Y1, Y0];


" Limits:
"       Input                   Output
"       000 - 1FF               000 - 1FF       (positive upper half)
"       200 - 7FF               1FF                     (positive overflow, limit)
"       800 - DFF               200                     (negative overflow)
"       E00 - FFF               200 - 3FF       (negative lower half)
        PosMaxIn        = ^h7FF;
        PosMaxOut       = ^h1FF;
        OverLim         = ^h200;
        Over            = (OverLim <= XIn) & (XIn <= PosMaxIn);

        NegMaxIn        = ^h800;
        NegMaxOut       = ^h200;
        UnderLim        = ^hE00;
        Under           = (NegMaxIn <= XIn) & (XIn < UnderLim);


equations
        Y0              = (X0 # Over) & ! Under;
        Y1              = (X1 # Over) & ! Under;
        Y2              = (X2 # Over) & ! Under;
        Y3              = (X3 # Over) & ! Under;
        Y4              = (X4 # Over) & ! Under;
        Y5              = (X5 # Over) & ! Under;
        Y6              = (X6 # Over) & ! Under;
        Y7              = (X7 # Over) & ! Under;
        Y8              = (X8 # Over) & ! Under;
        Y9              = (X9 # Under) & ! Over;

test_vectors
        (XIn            ->      YOut)
        ^h000           -> ^h000;               "0
        PosMaxOut       -> PosMaxOut;   "+ max
        OverLim         -> PosMaxOut;   "+ overflow
```

```
        PosMaxIn        -> PosMaxOut;   "+ overflow
        NegMaxIn        -> NegMaxOut;   "- overflow
        UnderLim        -> NegMaxOut;   "- max
        ^hFFF           -> ^h3FF;            "-1

end     RT3_round
MODULE  RT3_SerAcc0
flag    '-r3'
TITLE   'RTD 4224 - VRAM Serial Access Control PAL 0
                John Stern, Accom Inc.
                4/91
                Version A
'

SerAcc0 device 'P22V10';
        CLK                             pin 1;
        VACT                    pin 11;
        HACT                    pin 13;
        RESET                   pin 14;
        Q8, Q7, Q6, Q5  pin 15, 16, 17, 18;
        Q4, Q3, Q2, Q1  pin 19, 20, 21, 22;
        Q0                              pin 23;

        True, False     = 1,0;
        High, Low       = 1,0;
        H,L,Q,X,Z       = 1,0,.C.,.X.,.Z.;

        QOut            = [Q8, Q7, Q6, Q5, Q4, Q3, Q2, Q1, Q0];
        DoReset         = ! VACT;
        ResetState      = ^h000;
        State1          = ResetState + 1;
        State2          = State1 + 1;
        State3          = State2 + 1;
        State4          = State3 + 1;
        State5          = State4 + 1;
        State6          = State5 + 1;
        State7          = State6 + 1;
        State8          = State7 + 1;
        State9          = State8 + 1;
        State10         = State9 + 1;
        State11         = State10 + 1;
        State12         = State11 + 1;
        State13         = State12 + 1;
        State14         = State13 + 1;
        State15         = State14 + 1;
        State16         = State15 + 1;


equations
        " count to 512 and roll over, starting from 'ResetState' "
        RESET    := DoReset;
        Q0              := ((DoReset & ((ResetState & ^h001) != 0)) # (! DoReset & ((! HACT &
Q0) #
                                (HACT & (! Q0)))));
        Q1              := ((DoReset & ((ResetState & ^h002) != 0)) # (! DoReset & ((! HACT &
Q1) #
                                (HACT & ((! Q1 & Q0) # (Q1 & ! (Q0)))))));
        Q2              := ((DoReset & ((ResetState & ^h004) != 0)) # (! DoReset & ((! HACT &
Q2) #
                                (HACT & ((! Q2 & Q1 & Q0) # (Q2 & ! (Q1 & Q0)))))));
        Q3              := ((DoReset & ((ResetState & ^h008) != 0)) # (! DoReset & ((! HACT &
Q3) #
                                (HACT & ((! Q3 & Q2 & Q1 & Q0) # (Q3 & ! (Q2 & Q1 & Q0)))))));
        Q4              := ((DoReset & ((ResetState & ^h010) != 0)) # (! DoReset & ((! HACT &
Q4) #
                                (HACT & ((! Q4 & Q3 & Q2 & Q1 & Q0) # (Q4 & ! (Q3 & Q2 & Q1 &
Q0)))))));
        Q5              := ((DoReset & ((ResetState & ^h020) != 0)) # (! DoReset & ((! HACT &
Q5) #
                                (HACT & ((! Q5 & Q4 & Q3 & Q2 & Q1 & Q0) #
                                        (Q5 & ! (Q4 & Q3 & Q2 & Q1 & Q0)))))));
        Q6              := ((DoReset & ((ResetState & ^h040) != 0)) # (! DoReset & ((! HACT &
Q6) #
                                (HACT & ((! Q6 & Q5 & Q4 & Q3 & Q2 & Q1 & Q0) #
```

```
                                        (Q6 & ! (Q5 & Q4 & Q3 & Q2 & Q1 &
Q0)))))));
        Q7              := ((DoReset & ((ResetState & ^h080) != 0)) # (! DoReset & ((! HACT &
Q7) #
                                (HACT & ((! Q7 & Q6 & Q5 & Q4 & Q3 & Q2 & Q1 & Q0) #
                                        (Q7 & ! (Q6 & Q5 & Q4 & Q3 & Q2 & Q1
& Q0)))))));
        Q8              := ((DoReset & ((ResetState & ^h100) != 0)) # (! DoReset & ((! HACT &
Q8) #
                                (HACT & ((! Q8 & Q7 & Q6 & Q5 & Q4 & Q3 & Q2 & Q1 & Q0) #
                                        (Q8 & ! (Q7 & Q6 & Q5 & Q4 & Q3 & Q2
& Q1 & Q0)))))));


test_vectors
"       Note that for test vector simulation, the previous state left by
"       the last test vector affects the next one.
        ([CLK,  HACT,   VACT]   ->      [RESET, QOut])
         [Q,    X,              L]      ->      [H,     ResetState];    Rst'
         [Q,    L,              H]      ->      [L,     ResetState];    H M
         [Q,    H,              H]      ->      [L,     State1];        'Cnt
up"
         [Q,    H,              H]      ->      [L,     State2];        'Cnt
up"
         [Q,    H,              H]      ->      [L,     State3];        'Cnt
up"
         [Q,    H,              H]      ->      [L,     State4];        'Cnt
up"
         [Q,    H,              H]      ->      [L,     State5];        'Cnt
up"
         [Q,    H,              H]      ->      [L,     State6];        'Cnt
up"
         [Q,    H,              H]      ->      [L,     State7];        'Cnt
up"
         [Q,    H,              H]      ->      [L,     State8];        'Cnt
up"
         [Q,    H,              H]      ->      [L,     State9];        'Cnt
up"
         [Q,    H,              H]      ->      [L,     State10];       'Cnt
up"
         [Q,    L,              H]      ->      [L,     State10];       H M
         [Q,    H,              H]      ->      [L,     State11];       'Cnt
up"
         [Q,    H,              H]      ->      [L,     State12];       'Cnt
up"
         [Q,    H,              H]      ->      [L,     State13];       'Cnt
up"
         [Q,    H,              H]      ->      [L,     State14];       'Cnt
up"
         [Q,    H,              H]      ->      [L,     State15];       'Cnt
up"
         [Q,    H,              H]      ->      [L,     State16];       'Cnt
up"
         [Q,    X,              L]      ->      [H,     ResetState];    Rst'

end     RT3_SerAcc0


MODULE  RT3_SerAcc1
flag    '-r3'
TITLE   'RTD 4224 - VRAM Serial Access Control PAL1
                John Stern, Accom Inc.
                4/91
                Version A
'

SerAcc1 device 'P22V10';
        CLK                             pin 1;
        YCLKI                   pin 13;
        CCLKI                   pin 14;
        RESETCNT                pin 11;
        Q8, Q7, Q6, Q5  pin 10, 9, 8, 7;
```

```
        Q4, Q3, Q2, Q1  pin 6, 5, 4, 3;
        Q0                      pin 2;
        LOADREQ                 pin 15;
        DOSPLIT                 pin 22;

        YCLKO                   pin 16;
        CCLKO                   pin 17;
        AVSRLRQ                 pin 18;
        VSRL                    pin 19;
        AREQ                    pin 20;
        ADS                             pin 21;
        INCCNT                  pin 23;

        True, False             = 1,0;
        High, Low               = 1,0;
        H,L,Q,X,Z               = 1,0,.C.,.X.,.Z.;

        Count                   = [Q8, Q7, Q6, Q5, Q4, Q3, Q2, Q1, Q0];
        IncCnt                  = 511;
        Offset1                 = 256;
        StartCycle              = 492;
        StrtAVSRLRQ2    = StartCycle;
        StrtAVSRLRQ1    = StrtAVSRLRQ2 - Offset1;
        WidAVSRLRQ              = 15;
        StrtVSRL2               = StartCycle + 12;
        StrtVSRL1               = StrtVSRL2 - Offset1;
        WidVSRL                 = 3;
        StrtADS2                = StartCycle + 12;
        StrtADS1                = StrtADS2 - Offset1;
        WidADS                  = 1;
        StrtAREQ2               = StartCycle + 14;
        StrtAREQ1               = StrtAREQ2 - Offset1;
        WidAREQ                 = 1;

equations
        INCCNT                  := (! RESETCNT & ! LOADREQ & (Count == IncCnt));
        YCLKO                   = (! RESETCNT & ! LOADREQ & YCLKI & ! CLK & ! (DOSPLIT & ! VSRL));
        CCLKO                   = (! RESETCNT & ! LOADREQ & CCLKI & ! CLK & ! (DOSPLIT & ! VSRL));
        ! AVSRLRQ               := (! RESETCNT & ! LOADREQ &
                                        ((StrtAVSRLRQ1 <= Count) & (Count < (StrtAVSRLRQ1
+ WidAVSRLRQ))) #
                                        ((StrtAVSRLRQ2 <= Count) & (Count < (StrtAVSRLRQ2
+ WidAVSRLRQ)))  );
        ! VSRL                  := (! RESETCNT & ! LOADREQ &
                                        ((StrtVSRL1 <= Count) & (Count < (StrtVSRL1 +
WidVSRL))) #
                                        ((StrtVSRL2 <= Count) & (Count < (StrtVSRL2 +
WidVSRL)))      );
        ADS                             := (! RESETCNT & ! LOADREQ &
                                        ((StrtADS1 <= Count) & (Count < (StrtADS1 +
WidADS))) #
                                        ((StrtADS2 <= Count) & (Count < (StrtADS2 +
WidADS)))       );
        ! AREQ                  := (LOADREQ) # (! RESETCNT & ! LOADREQ &
                                        ((StrtAREQ1 <= Count) & (Count < (StrtAREQ1 +
WidAREQ))) #
                                        ((StrtAREQ2 <= Count) & (Count < (StrtAREQ2 +
WidAREQ)))      );


test_vectors
        ([CLK, YCLKI, CCLKI, RESETCNT, LOADREQ, DOSPLIT, Count]   ->
                                                                [INCCNT, YCLKO,
CCLKO, AVSRLRQ, VSRL, AREQ, ADS])
        [Q, X, X, H, L, X, X]                                           > [
L, L, H, H, H, L];      "Reset"
        [Q, X, X, X, H, X, X]                                           > [
L, L, H, H, L, L];      "Load"
        [Q, L, L, L, L, X, 0]                                           > [
L, L, H, H, H, L];      "Nothing"
        [Q, L, L, L, L, X, IncCnt]                                      > [
L, L, X, X, X, X];      "INCCNT"
        [Q, L, L, L, L, X, StrtAVSRLRQ1]                  -> [X, L, L, L, X, X,
X];     "AVSRLRQ"
```

```
        [Q, L, L, L, L, X, StrtAVSRLRQ1 + WidAVSRLRQ - 1] -> [X, L, L, L, X, X, X];
        [Q, L, L, L, L, X, StrtAVSRLRQ1 + WidAVSRLRQ]          -> [X, L, L, H, X, X, X];
        [Q, L, L, L, L, X, StrtAVSRLRQ2]                           -> [X, L, L, L, X, X,
X];     "AVSRLRQ"
        [Q, L, L, L, L, X, StrtAVSRLRQ2 + WidAVSRLRQ - 1] -> [X, L, L, L, X, X, X];
        [Q, L, L, L, L, X, StrtAVSRLRQ2 + WidAVSRLRQ]          -> [X, L, L, H, X, X, X];
        [Q, L, L, L, L, X, StrtVSRL1]                                  -> [X, L, L,
X, L, X, X];    "VSRL"
        [L, H, L, L, L, X, X]                                              > X
H, L, X, L, X, X];       "Y Clock"
        [Q, L, L, L, L, X, StrtVSRL1 + WidVSRL - 1]                -> [X, L, L, X, L, X,
X];     "VSRL"
        [Q, L, L, L, L, H, StrtVSRL1 + WidVSRL]                    -> [X, L, L, X, H, X,
X];     "VSRL"
        [Q, L, L, L, L, X, StrtVSRL2]                                  -> [X, L, L,
X, L, X, X];    "VSRL"
        [L, L, H, L, L, X, X]                                              > X
L, H, X, L, X, X];       "C Clock"
        [Q, L, L, L, L, X, StrtVSRL2 + WidVSRL - 1]                -> [X, L, L, X, L, X,
X];     "VSRL"
        [Q, L, L, L, L, X, StrtVSRL2 + WidVSRL]                    -> [X, L, L, X, H, X,
X];     "VSRL"
        [Q, L, L, L, L, X, StrtADS1]                                   -> [X, L, L,
X, X, X, H];    "ADS"
        [Q, L, L, L, L, X, StrtADS1 + WidADS - 1]                  -> [X, L, L, X, X, X,
H];     "ADS"
        [Q, L, L, L, L, X, StrtADS1 + WidADS]                      -> [X, L, L, X, X, X,
L];     "ADS"
        [Q, L, L, L, L, X, StrtADS2]                                   -> [X, L, L,
X, X, X, H];    "ADS"
        [Q, L, L, L, L, X, StrtADS2 + WidADS - 1]                  -> [X, L, L, X, X, X,
H];     "ADS"
        [Q, L, L, L, L, X, StrtADS2 + WidADS]                      -> [X, L, L, X, X, X,
L];     "ADS"
        [Q, L, L, L, L, X, StrtAREQ1]                                  -> [X, L, L,
X, X, L, X];    "AREQ"
        [Q, L, L, L, L, X, StrtAREQ1 + WidAREQ - 1]                -> [X, L, L, X, X, L,
X];     "AREQ"
        [Q, L, L, L, L, X, StrtAREQ1 + WidAREQ]                    -> [X, L, L, X, X, H,
X];     "AREQ"
        [Q, L, L, L, L, X, StrtAREQ2]                                  -> [X, L, L,
X, X, L, X];    "AREQ"
        [Q, L, L, L, L, X, StrtAREQ2 + WidAREQ - 1]                -> [X, L, L, X, X, L,
X];     "AREQ"
        [Q, L, L, L, L, X, StrtAREQ2 + WidAREQ]                    -> [X, L, L, X, X, H,
X];     "AREQ"

end     RT3_SerAcc1


MODULE  RT3_SerAcc2
flag    '-r3'
TITLE   'RTD 4224 - VRAM Serial Access Control PAL 2
                John Stern, Accom Inc.
                4/91
                Version A
'

SerAcc2 device 'P22V10';
        CLK                     pin 1;
        OE                      pin 2;
        FIELD           pin 3;
        RD                      pin 4;
        WR                      pin 5;
        BYPASS          pin 6;
        VSRL            pin 7;
        INCCNT          pin 13;
        RESETCNT        pin 11;

        DSF0            pin 23;
        DSF1            pin 22;
        WIN                     pin 21;
```

```
        DOSPLIT         pin 20;
        WE0                     pin 19;
        WE1                     pin 18;
        SE0                     pin 17;
        SE1                     pin 16;
        VRIE            pin 15;
        VROE            pin 14;

        True, False     = 1,0;
        High, Low       = 1,0;
        H,L,Q,X,Z       = 1,0,.C.,.X.,.Z.;

        SharedOut       = [WIN, WE0, WE1];
        Read            = (RD & ! WR & ! BYPASS);
        Write           = (WR & ! RD & ! BYPASS);
        Bypass          = (BYPASS & ! RD & ! WR);
        Transfer        = ! VSRL;

equations
        ! enable SharedOut      = OE;
        DSF0            = Transfer & ! DOSPLIT & ! FIELD;
        DSF1            = Transfer & ! DOSPLIT & FIELD;
        DOSPLIT         := ((RESETCNT & 1) # (! RESETCNT & ((INCCNT & 0) # (! INCCNT & DOSPLIT))));
        ! WE0           = Transfer & Write;
        ! WE1           = Transfer & Write;
        ! WIN           = Transfer & Write;
        ! SE0           := (Read # (Write & ! DOSPLIT)) & ! FIELD;
        ! SE1           := (Read # (Write & ! DOSPLIT)) & FIELD;
        ! VRIE          := Write # Bypass;
        ! VROE          := Read # Bypass;

test_vectors
        ([CLK, OE, FIELD, RD, WR, BYPASS, VSRL, INCCNT, RESETCNT] ->
                                        [DSF0, DSF1, WIN, DOSPLIT, WE0, WE1, SE0, SE1, VRIE, VROE])
         [X, H, X, X, X, X, X, X, X]    ->      [X, X, Z, X, Z, Z, X, X, X, X];  "HI Z"
         [Q, H, X, L, L, L, X, X, X]    ->      [X, X, Z, X, Z, Z, H, H, H, H];  "HI Z"
         [Q, L, L, H, L, L, H, X, X]    ->      [X, X, H, X, H, H, L, H, H, L];  "read"
         [Q, L, H, H, L, L, H, X, X]    ->      [X, X, H, X, H, H, H, L, H, L];  "read"
         [Q, L, L, L, H, L, L, X, X]    ->      [X, X, L, X, L, L, X, X, L, H];  "write"
         [Q, L, H, L, H, L, L, X, X]    ->      [X, X, L, X, L, L, X, X, L, H];  "write"
         [Q, L, X, X, X, H, H, X, X]    ->      [X, X, H, X, H, H, H, H, L, L];  "bypass"
         [Q, X, X, X, X, X, H, X, H]    ->      [X, X, X, H, X, X, X, X, X, X];  "reset count"
         [Q, X, X, X, X, X, H, L, L]    ->      [L, L, X, H, X, X, X, X, X, X];  "count"
         [Q, H, X, X, X, X, H, H, L]    ->      [L, L, X, L, X, X, X, X, X, X];  "inc count"
         [Q, L, L, X, X, X, L, L, L]    ->      [H, L, X, L, X, X, X, X, X, X];  "DSF"
         [Q, L, H, X, X, X, L, L, L]    ->      [L, H, X, L, X, X, X, X, X, X];  "DSF"

end     RT3_SerAcc2


MODULE  RT3_SerAcc3
flag    '-r3'
TITLE   'RTD 4224 - VRAM Serial Access Control PAL 3
                John Stern, Accom Inc.
                4/91
                Version A
'

SerAcc3 device 'P22V10';
        CLK                             pin 1;
        INCCNT                  pin 13;
        RESETCNT                pin 11;
        FIELD                   pin 3;
        OE                              pin 2;
        Q8, Q7, Q6, Q5  pin 15, 16, 17, 18;
        Q4, Q3, Q2, Q1  pin 19, 20, 21, 22;
        Q0                              pin 23;
        B1                              pin 14;
```

```
        True, False      = 1,0;
        High, Low        = 1,0;
        H,L,Q,X,Z        = 1,0,.C.,.X.,.Z.;

        QOut             = [Q8, Q7, Q6, Q5, Q4, Q3, Q2, Q1, Q0];
        ResetState       = ^h000;
        State1           = ResetState + 1;
        State2           = State1 + 1;
        State3           = State2 + 1;
        State4           = State3 + 1;
        State5           = State4 + 1;
        State6           = State5 + 1;
        State7           = State6 + 1;
        State8           = State7 + 1;
        State9           = State8 + 1;
        State10          = State9 + 1;
        State11          = State10 + 1;
        State12          = State11 + 1;
        State13          = State12 + 1;
        State14          = State13 + 1;
        State15          = State14 + 1;
        State16          = State15 + 1;


equations
        " count to 512 and roll over, starting from 'ResetState' "
        Q0                      := ((RESETCNT & ((ResetState & ^h001) != 0)) # (! RESETCNT & ((!
INCCNT & Q0) #
                                        (INCCNT & (! Q0)))));
        Q1                      := ((RESETCNT & ((ResetState & ^h002) != 0)) # (! RESETCNT & ((!
INCCNT & Q1) #
                                        (INCCNT & ((! Q1 & Q0) # (Q1 & ! (Q0)))))));
        Q2                      := ((RESETCNT & ((ResetState & ^h004) != 0)) # (! RESETCNT & ((!
INCCNT & Q2) #
                                        (INCCNT & ((! Q2 & Q1 & Q0) # (Q2 & ! (Q1 & Q0)))))));
        Q3                      := ((RESETCNT & ((ResetState & ^h008) != 0)) # (! RESETCNT & ((!
INCCNT & Q3) #
                                        (INCCNT & ((! Q3 & Q2 & Q1 & Q0) # (Q3 & ! (Q2 & Q1 &
Q0)))))));
        Q4                      := ((RESETCNT & ((ResetState & ^h010) != 0)) # (! RESETCNT & ((!
INCCNT & Q4) #
                                        (INCCNT & ((! Q4 & Q3 & Q2 & Q1 & Q0) # (Q4 & ! (Q3 &
Q2 & Q1 & Q0)))))));
        Q5                      := ((RESETCNT & ((ResetState & ^h020) != 0)) # (! RESETCNT & ((!
INCCNT & Q5) #
                                        (INCCNT & ((! Q5 & Q4 & Q3 & Q2 & Q1 & Q0) #
                                                        (Q5 & ! (Q4 & Q3 & Q2 & Q1 &
Q0)))))));
        Q6                      := ((RESETCNT & ((ResetState & ^h040) != 0)) # (! RESETCNT & ((!
INCCNT & Q6) #
                                        (INCCNT & ((! Q6 & Q5 & Q4 & Q3 & Q2 & Q1 & Q0) #
                                                        (Q6 & ! (Q5 & Q4 & Q3 & Q2 &
Q1 & Q0)))))));
        Q7                      := ((RESETCNT & ((ResetState & ^h080) != 0)) # (! RESETCNT & ((!
INCCNT & Q7) #
                                        (INCCNT & ((! Q7 & Q6 & Q5 & Q4 & Q3 & Q2 & Q1 & Q0) #
                                                        (Q7 & ! (Q6 & Q5 & Q4 & Q3 &
Q2 & Q1 & Q0)))))));
        Q8                      := ((RESETCNT & ((ResetState & ^h100) != 0)) # (! RESETCNT & ((!
INCCNT & Q8) #
                                        (INCCNT & ((! Q8 & Q7 & Q6 & Q5 & Q4 & Q3 & Q2 & Q1 &
Q0) #
                                                        (Q8 & ! (Q7 & Q6 & Q5 & Q4 &
Q3 & Q2 & Q1 & Q0)))))));
        B1                      := FIELD;
        ! enable QOut    = OE;
        ! enable B1      = OE;


test_vectors
"       Note that for test vector simulation, the previous state left by
"       the last test vector affects the next one.
        ([CLK, RESETCNT, INCCNT, FIELD, OE]          ->      [B1, QOut])
         [Q, X, X, X, H]        ->      [Z, Z];                 "HI Z"
         [Q, H, X, X, L]        ->      [L, ResetState];        "Reset"
```

```
[Q, L, L, X, L]      ->      [X, ResetState];      "H hold"
[Q, L, H, X, L]      ->      [X, State1];          "Count up"
[Q, L, H, X, L]      ->      [X, State2];          "Count up"
[Q, L, H, X, L]      ->      [X, State3];          "Count up"
[Q, L, H, X, L]      ->      [X, State4];          "Count up"
[Q, L, L, X, L]      ->      [X, State4];          "H hold"
[Q, L, H, X, L]      ->      [X, State5];          "Count up"
[Q, L, H, X, L]      ->      [X, State6];          "Count up"
[Q, L, H, X, L]      ->      [X, State7];          "Count up"
[Q, L, H, X, L]      ->      [X, State8];          "Count up"
[Q, L, H, X, L]      ->      [X, State9];          "Count up"
[Q, L, H, X, L]      ->      [X, State10];         "Count up"
[Q, L, L, X, L]      ->      [X, State10];         "H hold"
[Q, L, H, X, L]      ->      [X, State11];         "Count up"
[Q, L, H, X, L]      ->      [X, State12];         "Count up"
[Q, L, H, X, L]      ->      [X, State13];         "Count up"
[Q, L, H, X, L]      ->      [X, State14];         "Count up"
[Q, L, H, X, L]      ->      [X, State15];         "Count up"
[Q, L, H, X, L]      ->      [X, State16];         "Count up"
[Q, L, X, L, L]      ->      [L, X];                      "Field"
[Q, L, X, H, L]      ->      [H, X];                      "Field"
[Q, H, X, X, L]      ->      [X, ResetState];      "Reset"

end     RT3_SerAcc3
MODULE  RT3_TBCCtl
flag    '-r2'
TITLE   'RT3 - TBC Control PAL
                John Stern, Accom Inc.
                4/91
                Version A
'

TBCCtl device 'P22V10';
        CLK                     pin 1;
        V1                      pin 2;
        V2                      pin 3;
        V3                      pin 4;
        H1                      pin 5;
        H2                      pin 6;
        H3                      pin 7;
        H4                      pin 8;
        H5                      pin 9;
        H6                      pin 10;
        H7                      pin 11;
        TEST            pin 13;

        RRST            pin 23;
        RRE                     pin 22;
        WRST            pin 21;
        WWE                     pin 20;
        WMK                     pin 19;
        VR0                     pin 18;
        VR1                     pin 17;
        VW0                     pin 16;
        VW1                     pin 15;

        SpareH          = [H7, H6];
        VRMode          = [VR1, VR0];
        VWMode          = [VW1, VW0];

        True, False     = 1,0;
        High, Low       = 1,0;
        H,L,Q,X,Z       = 1,0,.C.,.X.,.Z.;

" Counter States constants for V states
        SV0                     = 0;    "remaining V interval"
        SV1                     = 1;    "first active line"
        SV2                     = 2;    "remaining active lines"
        SV3                     = 3;    "first inactive line"


state_diagram VRMode
        State SV0:      case (H4 & V2)          : SV1;
                             (! (H4 & V2))      : SV0;
```

```
                        endcase;

    State SV1:      case (H4)                       : SV2;
                            (! H4)                          : SV1;
                        endcase;

    State SV2:      case (H4 & ! V2)        : SV3;
                            (!(H4 & ! V2))          : SV2;
                        endcase;

    State SV3:      case (H4)                       : SV0;
                            (! H4)                          : SV3;
                        endcase;


state_diagram VWMode
    State SV0:      case (H4 & V1)          : SV1;
                            (! (H4 & V1))           : SV0;
                        endcase;

    State SV1:      case (H4)                       : SV2;
                            (! H4)                          : SV1;
                        endcase;

    State SV2:      case (H4 & ! V1)        : SV3;
                            (!(H4 & ! V1))          : SV2;
                        endcase;

    State SV3:      case (H4)                       : SV0;
                            (! H4)                          : SV3;
                        endcase;


equations
    ! RRST  := ((VRMode == SV3) & H3);
    ! RRE   := (((VRMode == SV1) # (VRMode == SV2)) & H3);
    ! WRST  := ((VWMode == SV3) & H1);
    ! WWE   := (((VWMode == SV1) & ((TEST & H1) # (! TEST & H2))) # ((VWMode == SV2) & H1));
    WMK             := ((VWMode == SV1) & H5);


test_vectors
    ([CLK, V1, V2, V3, H1, H2, H3, H4, H5, SpareH, TEST]      ->
            [RRST, RRE, WRST, WWE, WMK, VRMode, VWMode])
     [Q, L, L, L, L, L, L, H, X,  X, X]      ->      [H, H, H, H, L, X,
X];         "set start state"
     [Q, L, L, L, L, L, L, L, X,  X, X]      ->      [H, H, H, H, L, SV0,     SV0];   [illegible]
     [Q, L, H, X, X, X, L, H, X,  X, X]      ->      [H, H, H, H, L, SV1,     SV0];   "rd"
     [Q, L, X, X, X, X, H, L, X,  X, X]      ->      [H, L, H, H, L, SV1,     SV0];   "rd"
     [Q, L, H, X, X, X, L, H, X,  X, X]      ->      [H, H, H, H, L, SV2,     SV0];   "rd"
     [Q, L, X, X, X, X, H, L, X,  X, X]      ->      [H, L, H, H, L, SV2,     SV0];   "rd"
     [Q, L, H, X, X, X, L, H, X,  X, X]      ->      [H, H, H, H, L, SV2,     SV0];   "rd"
     [Q, L, X, X, X, X, H, L, X,  X, X]      ->      [H, L, H, H, L, SV2,     SV0];   "rd"
     [Q, L, L, X, X, X, L, H, X,  X, X]      ->      [H, H, H, H, L, SV3,     SV0];   "rd"
     [Q, L, X, X, X, X, H, L, X,  X, X]      ->      [L, H, H, H, L, SV3,     SV0];   "rd"
     [Q, L, L, X, X, X, L, H, X,  X, X]      ->      [H, H, H, H, L, SV0,     SV0];   "rd"
     [Q, L, X, X, X, X, L, L, X,  X, X]      ->      [H, H, H, H, L, SV0,     SV0];   "rd"
     [Q, H, X, X, L, L, X, H, X,  X, X]      ->      [H, H, H, H, L, SV0,     SV1];   "wr"
     [Q, X, X, X, H, L, X, L, H,  X, H]      ->      [H, H, H, L, H, SV0,     SV1];   "wr"
     [Q, H, X, X, L, L, X, H, L,  X, X]      ->      [H, H, H, H, L, SV0,     SV2];   "wr"
     [Q, X, X, X, H, L, X, L, X,  X, X]      ->      [H, H, H, L, L, SV0,     SV2];   "wr"
     [Q, H, X, X, L, L, X, H, X,  X, X]      ->      [H, H, H, H, L, SV0,     SV2];   "wr"
     [Q, X, X, X, L, L, X, L, X,  X, X]      ->      [H, H, H, H, L, SV0,     SV2];   "wr"
     [Q, L, X, X, L, L, X, H, X,  X, X]      ->      [H, H, H, H, L, SV0,     SV3];   "wr"
     [Q, X, X, X, H, L, X, L, X,  X, X]      ->      [H, H, L, H, L, SV0,     SV3];   "wr"
     [Q, L, X, X, L, L, X, H, X,  X, X]      ->      [H, H, H, H, L, SV0,     SV0];   "wr"
     [Q, X, X, X, L, L, X, L, X,  X, X]      ->      [H, H, H, H, L, SV0,     SV0];   "wr"


end     RT3_TBCCtl
MODULE  RT3_YWHead0
flag    '-r3'
TITLE   'RT3 - Y Write Head PAL 0
            John Stern, Accom INc.
            4/91
            Version A
```

```
YWHead0 device 'P22V10';
        CLK                             pin 1;
        KEYMUX                  pin 11;
        OE                              pin 13;
        IN4, IN3, IN2, IN1, IN0                 pin 6, 5, 4, 3, 2;
        HD3, HD2, HD1, HD0                              pin 10, 9, 8, 7;
        OUT4, OUT3, OUT2, OUT1, OUT0    pin 19, 20, 21, 22, 23;
        SWAP2, SWAP1                                    pin 17, 18;
        INRANGE                 pin 16;

        True, False     = 1,0;
        High, Low       = 1,0;
        H,L,Q,X,Z       = 1,0,.C.,.X.,.Z.;

        Head            = [HD3, HD2, HD1, HD0];
        Input           = [IN4, IN3, IN2, IN1, IN0];
        Output          = [OUT4, OUT3, OUT2, OUT1, OUT0];
        Swap0           = 0;
        Swap1           = 1;
        Swap2           = 2;
        Swap3           = 3;
        Swap4           = 4;
        Swap5           = 10;
        InRange         = (Swap0 <= Head) & (Head <= Swap4);
        OverRange       = (Swap5 <= Head);


equations
        OUT0                    := IN0;
        OUT1                    := IN1;
        OUT2                    := IN2;
        OUT3                    := IN3;
        OUT4                    := IN4;
        SWAP1                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4));
        SWAP2                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4));
        INRANGE                 = InRange;
        Enable Output   = (KEYMUX & ! OE);
        Enable SWAP1    = (INRANGE & KEYMUX & ! OE);
        Enable SWAP2    = (INRANGE & ! OE);


test_vectors
        ([CLK,  OE,     KEYMUX, Head, Input]    -> [Output,     SWAP1,  SWAP2,  INRANGE])
         [X,    H,      X,              X,              X]              -> [Z,          Z,
Z,              X]; "OE"
         [X,    X,      L,              X,              X]              -> [Z,          Z,
X,              X]; "key"
         [Q,    L,      H,              Swap5,  ^h00]   -> [^h00,       Z,              Z,]
"no swap"
         [Q,    L,      H,              Swap5,  ^h1F]   -> [^h1F,       Z,              Z,]
"no swap"
         [Q,    L,      H,              Swap0,  ^h01]   -> [^h01,       H,              H,]
"swap"
         [Q,    L,      H,              Swap1,  ^h02]   -> [^h02,       H,              H,]
"swap"
         [Q,    L,      H,              Swap2,  ^h04]   -> [^h04,       H,              H,]
"swap"
         [Q,    L,      H,              Swap3,  ^h08]   -> [^h08,       H,              H,]
"swap"
         [Q,    L,      H,              Swap4,  ^h10]   -> [^h10,       H,              H,]
"swap"
         [Q,    L,      H,              Swap4,  ^h0A]   -> [^h0A,       L,              L,]
"swap"

end     RT3_YWHead0
```

```
MODULE  RT3_YWHead1
flag    '-r3'
TITLE   'RT3 - Y Write Head PAL 1
                John Stern, Accom INc.
                4/91
                Version A
'

YWHead1 device 'P22V10';
        CLK                             pin 1;
        KEYMUX                  pin 11;
        OE                              pin 13;
        IN4, IN3, IN2, IN1, IN0                 pin 6, 5, 4, 3, 2;
        HD3, HD2, HD1, HD0                              pin 10, 9, 8, 7;
        OUT4, OUT3, OUT2, OUT1, OUT0    pin 19, 20, 21, 22, 23;
        SWAP2, SWAP1                                    pin 17, 18;
        INRANGE                 pin 16;

        True, False     = 1,0;
        High, Low       = 1,0;
        H,L,Q,X,Z       = 1,0,.C.,.X.,.Z.;

        Head            = [HD3, HD2, HD1, HD0];
        Input           = [IN4, IN3, IN2, IN1, IN0];
        Output          = [OUT4, OUT3, OUT2, OUT1, OUT0];
        Swap0           = 5;
        Swap1           = 6;
        Swap2           = 7;
        Swap3           = 8;
        Swap4           = 9;
        Swap5           = 10;
        InRange         = (Swap0 <= Head) & (Head <= Swap4);
        OverRange       = (Swap5 <= Head);


equations
        OUT0                    := IN0;
        OUT1                    := IN1;
        OUT2                    := IN2;
        OUT3                    := IN3;
        OUT4                    := IN4;
        SWAP1                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4) # (OverRange & IN4));
        SWAP2                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4) # (OverRange & IN4));
        INRANGE                 = (InRange # OverRange);
        Enable Output   = (KEYMUX & ! OE);
        Enable SWAP1    = (INRANGE & KEYMUX & ! OE);
        Enable SWAP2    = (INRANGE & ! OE);


test_vectors
        ([CLK,  OE,     KEYMUX, Head, Input]    -> [Output,     SWAP1,  SWAP2,  INRANGE])
         [X,    H,      X,              X,              X]              -> [Z,          Z,
Z,              X]; "OE"
         [X,    X,      L,              X,              X]              -> [Z,          Z,
X,              X]; "key"
         [Q,    L,      H,              Swap0-1,^h00]   -> [^h00,       Z,              Z,L
"no swap"
         [Q,    L,      H,              Swap0-1,^h1F]   -> [^h1F,       Z,              Z,L
"no swap"
         [Q,    L,      H,              Swap0,  ^h01]   -> [^h01,       H,              H,H
"swap"
         [Q,    L,      H,              Swap1,  ^h02]   -> [^h02,       H,              H,H
"swap"
         [Q,    L,      H,              Swap2,  ^h04]   -> [^h04,       H,              H,H
"swap"
         [Q,    L,      H,              Swap3,  ^h08]   -> [^h08,       H,              H,H
"swap"
         [Q,    L,      H,              Swap4,  ^h10]   -> [^h10,       H,              H,H
```

```
"swap"
        [Q,     L,      H,              Swap4,   ^h0A]    -> [^h0A,       L,            L,]
"swap"
        [Q,     L,      H,              Swap5,   ^h05]    -> [^h05,       L,            L,]
"swap"


end     RT3_YWHead1


MODULE  RT3_CWHead0
flag    '-r3'
TITLE   'RT3 - C Write Head PAL 0
                John Stern, Accom INc.
                4/91
                Version A
'

CWHead0 device 'P22V10';
        CLK                             pin 1;
        KEYMUX                  pin 11;
        OE                              pin 13;
        IN4, IN3, IN2, IN1, IN0                 pin 6, 5, 4, 3, 2;
        HD3, HD2, HD1, HD0                              pin 10, 9, 8, 7;
        OUT4, OUT3, OUT2, OUT1, OUT0    pin 19, 20, 21, 22, 23;
        SWAP2, SWAP1                                    pin 17, 18;
        INRANGE                 pin 16;

        True, False     = 1,0;
        High, Low       = 1,0;
        H,L,Q,X,Z       = 1,0,.C.,.X.,.Z.;

        Head            = [HD3, HD2, HD1, HD0];
        Input           = [IN4, IN3, IN2, IN1, IN0];
        Output          = [OUT4, OUT3, OUT2, OUT1, OUT0];
        Swap0           = 0;
        Swap1           = 1;
        Swap2           = 2;
        Swap3           = 3;
        Swap4           = 4;
        Swap5           = 10;
        InRange         = (Swap0 <= Head) & (Head <= Swap4);
        OverRange       = (Swap5 <= Head);


equations
        OUT0                    := IN0;
        OUT1                    := IN1;
        OUT2                    := IN2;
        OUT3                    := IN3;
        OUT4                    := IN4;
        SWAP1                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4));
        SWAP2                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4));
        INRANGE                 = InRange;
        Enable Output   = (! KEYMUX & ! OE);
        Enable SWAP1    = (INRANGE & ! KEYMUX & ! OE);
        Enable SWAP2    = (INRANGE & ! OE);


test_vectors
        ([CLK,  OE,     KEYMUX, Head, Input]    -> [Output,     SWAP1,  SWAP2,  INRANGE])
         [X,    H,      X,              X,              X]      -> [Z,          Z,
Z,              X]; "OE"
         [X,    X,      H,              X,              X]      -> [Z,          Z,
X,              X]; "key"
         [Q,    L,      L,              Swap5,   ^h00]  -> [^h00,       Z,              Z,]
"no swap"
         [Q,    L,      L,              Swap5,   ^h1F]  -> [^h1F,       Z,              Z,]
```

```
"no swap"
        [Q,     L,      L,              Swap0,  ^h01]   -> [^h01,       H,              H,]
"swap"
        [Q,     L,      L,              Swap1,  ^h02]   -> [^h02,       H,              H,]
"swap"
        [Q,     L,      L,              Swap2,  ^h04]   -> [^h04,       H,              H,]
"swap"
        [Q,     L,      L,              Swap3,  ^h08]   -> [^h08,       H,              H,]
"swap"
        [Q,     L,      L,              Swap4,  ^h10]   -> [^h10,       H,              H,]
"swap"
        [Q,     L,      L,              Swap4,  ^h0A]   -> [^h0A,       L,              L,]
"swap"
end     RT3_CWHead0


MODULE  RT3_CWHead1
flag    '-r3'
TITLE   'RT3 - C Write Head PAL 1
                John Stern, Accom INc.
                4/91
                Version A
'

CWHead1 device 'P22V10';
        CLK                             pin 1;
        KEYMUX                  pin 11;
        OE                              pin 13;
        IN4, IN3, IN2, IN1, IN0                 pin 6, 5, 4, 3, 2;
        HD3, HD2, HD1, HD0                              pin 10, 9, 8, 7;
        OUT4, OUT3, OUT2, OUT1, OUT0    pin 19, 20, 21, 22, 23;
        SWAP2, SWAP1                                    pin 17, 18;
        INRANGE                 pin 16;

        True, False     = 1,0;
        High, Low       = 1,0;
        H,L,Q,X,Z       = 1,0,.C.,.X.,.Z.;

        Head            = [HD3, HD2, HD1, HD0];
        Input           = [IN4, IN3, IN2, IN1, IN0];
        Output          = [OUT4, OUT3, OUT2, OUT1, OUT0];
        Swap0           = 5;
        Swap1           = 6;
        Swap2           = 7;
        Swap3           = 8;
        Swap4           = 9;
        Swap5           = 10;
        InRange         = (Swap0 <= Head) & (Head <= Swap4);
        OverRange       = (Swap5 <= Head);

equations
        OUT0                    := IN0;
        OUT1                    := IN1;
        OUT2                    := IN2;
        OUT3                    := IN3;
        OUT4                    := IN4;
        SWAP1                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4) # (OverRange & IN4));
        SWAP2                   := (((Head == Swap0) & IN0) # ((Head == Swap1) & IN1) #
                                        ((Head == Swap2) & IN2) # ((Head == Swap3) &
IN3) #
                                        ((Head == Swap4) & IN4) # (OverRange & IN4));
        INRANGE                 = (InRange # OverRange);
        Enable Output   = (! KEYMUX & ! OE);
        Enable SWAP1    = (INRANGE & ! KEYMUX & ! OE);
        Enable SWAP2    = (INRANGE & ! OE);


test_vectors
        ([CLK,  OE,     KEYMUX, Head, Input]    -> [Output,     SWAP1,  SWAP2,  INRANGE])
         [X,    H,      X,              X,              X]      -> [Z,          Z,
```

```
Z,              X]; "OE"
        [X,     X,      H,              X,              X]              -> [Z,          Z,
X,              X]; "key"
        [Q,     L,      L,              Swap0-1,^h00]   -> [^h00,       Z,              Z,]
"no swap"
        [Q,     L,      L,              Swap0-1,^h1F]   -> [^h1F,       Z,              Z,]
"no swap"
        [Q,     L,      L,              Swap0,  ^h01]   -> [^h01,       H,              H,]
"swap"
        [Q,     L,      L,              Swap1,  ^h02]   -> [^h02,       H,              H,]
"swap"
        [Q,     L,      L,              Swap2,  ^h04]   -> [^h04,       H,              H,]
"swap"
        [Q,     L,      L,              Swap3,  ^h08]   -> [^h08,       H,              H,]
"swap"
        [Q,     L,      L,              Swap4,  ^h10]   -> [^h10,       H,              H,]
"swap"
        [Q,     L,      L,              Swap4,  ^h0A]   -> [^h0A,       L,              L,]
"swap"
        [Q,     L,      L,              Swap5,  ^h05]   -> [^h05,       L,              L,]
"swap"


end     RT3_CWHead1
MODULE  RT3_YOut
flag    '-r2'
TITLE   'RT3 - Y Output PAL
                John Stern, Accom Inc.
                4/91
                Version A
'

YOut device 'P22V10';
        X9, X8, X7, X6, X5, X4, X3, X2, X1, X0          pin 10, 9, 8, 7, 6, 5, 4, 3, 2, 1;
        ROUND                   pin 11;
        BLANK                   pin 13;
        Y9, Y8, Y7, Y6, Y5, Y4, Y3, Y2, Y1, Y0          pin 14, 15, 16, 17, 18, 19, 20, 21, 22,
23;

        True, False     = 1,0;
        High, Low       = 1,0;
        H,L,Q,X,Z       = 1,0,.C.,.X.,.Z.;

"       X is in 2's complement form"
        XInput          = [! X9, X8, X7, X6, X5, X4, X3, X2, X1, X0];
        YOutput         = [Y9, Y8, Y7, Y6, Y5, Y4, Y3, Y2, Y1, Y0];


"       These are the right equations, but they don't fit!
        round0          = 0;
        carry0          = 1;
        round1          = 0;
        carry1          = X1 & carry0;
        round2          = X2 $ carry1;
        carry2          = X2 & carry1;
        round3          = X3 $ carry2;
        carry3          = X3 & carry2;
        round4          = X4 $ carry3;
        carry4          = X4 & carry3;
        round5          = X5 $ carry4;
        carry5          = X5 & carry4;
        round6          = X6 $ carry5;
        carry6          = X6 & carry5;
        round7          = X7 $ carry6;
        carry7          = X7 & carry6;
        round8          = X8 $ carry7;
        carry8          = X8 & carry7;
        round9          = ! X9 $ carry8;
        carry9          = ! X9 & carry8;
"       Q0                      = ((ROUND & round0) # (! ROUND & X0));
"       Q1                      = ((ROUND & round1) # (! ROUND & X1));
"       Q2                      = ((ROUND & (round2 & ! carry9)) # (! ROUND & X2));
"       Q3                      = ((ROUND & (round3 & ! carry9)) # (! ROUND & X3));
"       Q4                      = ((ROUND & (round4 # carry9)) # (! ROUND & X4));
"       Q5                      = ((ROUND & (round5 # carry9)) # (! ROUND & X5));
```

```
"       Q6                  = ((ROUND & (round6 # carry9)) # (! ROUND & X6));
"       Q7                  = ((ROUND & (round7 # carry9)) # (! ROUND & X7));
"       Q8                  = ((ROUND & (round8 # carry9)) # (! ROUND & X8));
"       Q9                  = ((ROUND & (round9 # carry9)) # (! ROUND & ! X9));


"       These equations just truncate
        Q0                  = X0 & ! ROUND;
        Q1                  = X1 & ! ROUND;
        Q2                  = X2;
        Q3                  = X3;
        Q4                  = X4;
        Q5                  = X5;
        Q6                  = X6;
        Q7                  = X7;
        Q8                  = X8;
        Q9                  = ! X9;
        UpperQ          = [Q9, Q8, Q7, Q6, Q5, Q4, Q3, Q2];

equations
        Y0                  = ((BLANK & 0) # (! BLANK & Q0 & ! (UpperQ == ^h00)));
        Y1                  = ((BLANK & 0) # (! BLANK & ((Q1 & ! (UpperQ == ^h00)) # (UpperQ
== ^hFF))));
        Y2                  = ((BLANK & 0) # (! BLANK & ((Q2 & ! (UpperQ == ^hFF)) # (UpperQ
== ^h00))));
        Y3                  = ((BLANK & 0) # (! BLANK & Q3));
        Y4                  = ((BLANK & 0) # (! BLANK & Q4));
        Y5                  = ((BLANK & 0) # (! BLANK & Q5));
        Y6                  = ((BLANK & 1) # (! BLANK & Q6));
        Y7                  = ((BLANK & 0) # (! BLANK & Q7));
        Y8                  = ((BLANK & 0) # (! BLANK & Q8));
        Y9                  = ((BLANK & 0) # (! BLANK & Q9));


test_vectors
        ([XInput,       ROUND,  BLANK]  ->      [YOutput])
         [X,            X,              H]          ->      [^h040];        "blank"
         [^h120,        H,              L]          ->      [^h120];        " r o u n d
(truncation)"
         [^h121,        H,              L]          ->      [^h120];        " r o u n d
(truncation)"
         [^h122,        H,              L]          ->      [^h120];        " r o u n d
(truncation)"
         [^h123,        H,              L]          ->      [^h120];        " r o u n d
(truncation)"
         [^h000,        L,              L]          ->      [^h004];        "low limit"
         [^h001,        L,              L]          ->      [^h004];        "low limit"
         [^h002,        L,              L]          ->      [^h004];        "low limit"
         [^h003,        L,              L]          ->      [^h004];        "low limit"
         [^h004,        L,              L]          ->      [^h004];        "low limit"
         [^h005,        L,              L]          ->      [^h005];        "normal"
         [^h006,        L,              L]          ->      [^h006];        "normal"
         [^h3F9,        L,              L]          ->      [^h3F9];        "normal"
         [^h3FA,        L,              L]          ->      [^h3FA];        "normal"
         [^h3FB,        L,              L]          ->      [^h3FB];        "high limit"
         [^h3FC,        L,              L]          ->      [^h3FA];        "high limit"
         [^h3FD,        L,              L]          ->      [^h3FB];        "high limit"
         [^h3FE,        L,              L]          ->      [^h3FA];        "high limit"
         [^h3FF,        L,              L]          ->      [^h3FB];        "high limit"

end     RT3_YOut
MODULE  RT3_DiskRCt2    "this version is already reduced"
flag    '-r0'
TITLE   'RT3 - Disk Read Control PAL
                John Stern, Accom Inc.
                4/91
                Version A
'

DiskRCtl device 'P22V10';
        CLK                     pin 1;  "RRC"
        AMD                     pin 2;  "~AMD"
        NRZ                     pin 3;  "NRZ data"
        READ            pin 11; "read"
```

```
        GO                      pin 13; "Go signal"

        COUT            pin 14; "C output"
        YOUT            pin 15; "Y output"
        WRST            pin 16; "write reset"
        STATE2          pin 17; "also WE and status output"
        STATE1          pin 18;
        GODEL           pin 19;
        STATE0          pin 20; "also CLK/2 clock output"
        NRZDELAY        pin 21; "NRZ Delayed"
        AMENB           pin 22; "address mark enable"
        RG                      pin 23; "read gate"

"       take feedback outputs from internal nodes"
        STATE2, STATE1, STATE0                  istype 'neg, reg, feed_reg';

"State Machine State Assignments
        RState          = [STATE2, STATE1, STATE0];
        S0 = 0;  S1 = 1;        S2 = 2; S3 = 3; S4 = 4; S5 = 5; S6 = 6; S7 = 7;

        EnableOutputs   = [RState, COUT, YOUT, WRST, NRZDELAY, AMENB];

        NewGo           = GODEL & ! WRST;
        Corr            = [NRZ, NRZDELAY, COUT, YOUT];   "for correlation of sync pattern"
        DoCorr          = (Corr == 11) # (Corr == 10) # (Corr == 9) # (Corr == 15) # (Corr ==
3);

        True, False     = 1,0;
        High, Low       = 1,0;
        H,L,Q,X,Z       = 1,0,.C.,.X.,.Z.;


equations
        GODEL                                   := GO;
        enable EnableOutputs    = READ; "HI Z"

"these equations have already been reduced"
    !RG := (GODEL & STATE1 & STATE2 & !WRST
          # !NRZDELAY & !STATE1 & !STATE2
          # !GODEL & !STATE1 & !STATE2
          # !READ & !STATE1 & !STATE2
          # !STATE0 & !STATE1 & !STATE2);


    !WRST := (STATE1 & STATE2 & !WRST
           # !GODEL & STATE1
           # !COUT & !STATE2 & !YOUT
           # NRZDELAY & !STATE2 & !YOUT
           # !NRZ & !STATE2 & !YOUT
           # !COUT & NRZDELAY & !STATE2
           # !COUT & !NRZ & !STATE2
           # !NRZ & NRZDELAY & !STATE2
           # !READ & !STATE2
           # !STATE0 & !STATE2
           # !STATE1 & !STATE2);
    !YOUT := (!STATE0 & !STATE2
           # GODEL & STATE2 & !WRST
           # !NRZ & STATE0 & STATE2
           # !STATE0 & !YOUT
           # !COUT & !STATE2
           # !STATE1);


    !COUT := (!STATE0 & !STATE2
           # GODEL & STATE2 & !WRST
           # !STATE1
           # !NRZDELAY & STATE0
           # !COUT & !STATE0);


    !NRZDELAY := (GODEL & STATE1 & STATE2 & !WRST
               # !STATE0 & !STATE2
               # !NRZ & STATE2
               # !STATE0 & !STATE1
```

```
                # !NRZ & STATE1
                # AMD & !STATE1 & !STATE2);

   !AMENB := (STATE2 # STATE1 # !STATE0);

   !STATE2 := (GODEL & STATE1 & STATE2 & !WRST
              # !COUT & !STATE2 & !YOUT
              # NRZDELAY & !STATE2 & !YOUT
              # !NRZ & !STATE2 & !YOUT
              # !COUT & NRZDELAY & !STATE2
              # !COUT & !NRZ & !STATE2
              # !NRZ & NRZDELAY & !STATE2
              # !GODEL & !STATE2
              # !STATE0 & !STATE2
              # !STATE1 & !STATE2
              # !READ);

   !STATE1 := (GODEL & STATE1 & STATE2 & !WRST
              # !NRZDELAY & !STATE1 & !STATE2
              # !GODEL & !STATE2
              # !STATE0 & !STATE1
              # !READ
              # COUT & !NRZDELAY & STATE0 & !STATE2 & YOUT
              # COUT & NRZ & STATE0 & STATE1 & !STATE2 & YOUT
              # NRZ & !NRZDELAY & STATE0 & !STATE2 & YOUT
              # COUT & NRZ & !NRZDELAY & STATE0 & !STATE2);


   !STATE0 := (GODEL & STATE1 & STATE2 & !WRST
              # !GODEL & !STATE2
              # !READ
              # COUT & NRZ & STATE0 & STATE1 & !STATE2 & YOUT
              # STATE0 & STATE2
              # COUT & !NRZDELAY & STATE0 & STATE1 & YOUT
              # NRZ & !NRZDELAY & STATE0 & STATE1 & YOUT
              # COUT & NRZ & !NRZDELAY & STATE0 & STATE1
              # NRZDELAY & STATE0 & !STATE1);


test_vectors
        ([CLK, AMD, NRZ, READ, GO]
                                              ->      [RState, COUT, YOUT, WRST, NRZDELAY,
AMENB, RG, GODEL])
         [X, X, X, L, X]      ->     [Z,           Z, Z, Z, Z, Z, X, X];    "HI Z"
         [Q, X, X, L, X]      ->     [Z,           Z, Z, Z, Z, Z, X, X];    "HI Z"
         [Q, X, X, H, L]      ->     [S0,    L, L, L, L, L, L, L];    "S0"
         [Q, X, X, H, H]      ->     [S0,    L, L, L, L, L, L, H];    "S0"
         [Q, X, X, H, H]      ->     [S1,    L, L, L, L, L, L, H];    "S1"
         [Q, H, X, H, H]      ->     [S1,    L, L, L, L, H, L, H];    "S1"
         [Q, L, X, H, H]      ->     [S1,    L, L, L, H, H, L, H];    "S1"
         [Q, H, X, H, H]      ->     [S2,    L, L, L, L, H, H, H];    "S2"
         [Q, X, X, H, H]      ->     [S3,    L, L, L, L, L, H, H];    "S3"
         [Q, X, L, H, H]      ->     [S3,    L, L, L, L, L, H, H];    "S3"
         [Q, X, L, H, H]      ->     [S3,    L, L, L, L, L, H, H];    "S3"
         [Q, X, H, H, H]      ->     [S3,    L, L, L, H, L, H, H];    "S3"
         [Q, X, H, H, H]      ->     [S3,    H, L, L, H, L, H, H];    "S3"
         [Q, X, L, H, H]      ->     [S3,    H, H, L, L, L, H, H];    "S3"
         [Q, X, H, H, H]      ->     [S4,    L, H, H, H, L, H, H];    "S4"
         [Q, X, H, H, H]      ->     [S5,    L, L, H, L, L, H, H];    "S5"
         [Q, X, L, H, H]      ->     [S6,    L, L, H, L, L, H, H];    "S6"
         [Q, X, H, H, L]      ->     [S7,    L, L, H, H, L, H, L];    "S7"
         [Q, X, L, H, L]      ->     [S6,    H, L, L, L, L, H, L];    "S6"
         [Q, X, H, H, L]      ->     [S7,    H, L, L, H, L, H, L];    "S7"
         [Q, X, L, H, L]      ->     [S6,    H, L, L, L, L, H, L];    "S6"
         [Q, X, H, H, H]      ->     [S7,    H, L, L, H, L, H, H];    "S7"
         [Q, X, H, H, H]      ->     [S0,    L, L, L, L, L, L, H];    "S0"
         [Q, X, X, L, X]      ->     [Z,           Z, Z, Z, Z, Z, L, X];    "HI Z"
         [Q, X, X, H, L]      ->     [S0,    L, L, L, L, L, L, L];    "S0"


end     RT3_DiskRCt2
/*
**      RT3 Address-Modification PROM, Rev. A
**
**      1 PROM, 8K x 8
```

```
**
**      John Stern, Accom Inc, 4/91
*/

/* some macro "functions" follow */
#define NumEntries(array)               (sizeof(array) / sizeof(array[0]))
#define GetBit(x, n)                    (((x) & (1L << n)) != 0)
#define SetBit(x, n, val)               ((val) ? ((x) |= (1L << (n))) : ((x) &= ~(1L << (n)))
)
#define TwoPower(n)                             (1L << (n))
#define Mask(x, n)                              ((x) & ~(~0L << (n)))
#define Max(a, b)                               (((a) > (b)) ? (a) : (b))
#define Min(a, b)                               (((a) < (b)) ? (a) : (b))
#define TRUE                                    1
#define FALSE                                   0

#define VIRGIN          0x0             /* the virgin (unblown) PROM state */
#define ADDSIZE         13              /* # address bits */
#define DATASIZE        8               /* # data bits */
#define NUMPROMS        1               /* # PROMS */
#define REVLEVEL        'A'             /* Revision level */

/* input bit fields */
#define ADDIN0          12
#define ADDIN1          11
#define ADDIN2          10
#define ADDIN3          9
#define BASESTART       4               /* base address */
#define BASEBITS        4
#define USEBASE         8
#define SLOTSTART       1               /* slot address */
#define SLOTBITS        3
#define RESET           0               /* bus reset */

/* output bit fields */
#define IDSTART         0               /* board ID */
#define IDBITS          3
#define VALIDADD        3               /* valid address */
#define ADDOUT0         7
#define ADDOUT1         6
#define ADDOUT2         5
#define ADDOUT3         4

#define IDVAL           3               /* for "RT3"; later, might use more bits to
                                                ** denote board revision levels
                                                */

main()
{
        register short  add, data;
        short   addIn, addOut, base, useBase, slot, reset, validAdd, id;

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                reset = GetBit(add, RESET);
                slot = Mask(add >> SLOTSTART, SLOTBITS);
                base = Mask(add >> BASESTART, BASEBITS);
                useBase = GetBit(add, USEBASE);
                addIn = (GetBit(add, ADDIN0) << 0);
                addIn |= (GetBit(add, ADDIN1) << 1);
                addIn |= (GetBit(add, ADDIN2) << 2);
                addIn |= (GetBit(add, ADDIN3) << 3);

                /* set intermediate variables */
                id = IDVAL;

                if (reset)
                {
                        addOut = 0;
                        validAdd = 0;
                }
                else if (useBase)
```

```
		{
			addOut = addIn - base;
			validAdd = (0 <= addOut && addOut < 5);   /* 5 MB span */
		}
		else
		{
			addOut = addIn - (slot + 0x8);
			validAdd = (0 <= addOut && addOut < 1);   /* 1 MB span */
		}


		/* set output values */
		data = VIRGIN;
		data |= (Mask(id, IDBITS) << IDSTART);
		SetBit(data, VALIDADD, validAdd);
		SetBit(data, ADDOUT0, GetBit(addOut, 0));
		SetBit(data, ADDOUT1, GetBit(addOut, 1));
		SetBit(data, ADDOUT2, GetBit(addOut, 2));
		SetBit(data, ADDOUT3, GetBit(addOut, 3));

		printf("%02x\n", data);
	}
}

/*
**	RT3 Horizontal Control PROMs, Rev. A
**
**	3 PROMs, 2K x 8
**
**	John Stern, Accom Inc, 4/91
*/

/* some macro "functions" follow */
#define NumEntries(array)		(sizeof(array) / sizeof(array[0]))
#define GetBit(x, n)			(((x) & (1L << n)) != 0)
#define SetBit(x, n, val)		((val) ? ((x) |= (1L << (n))) : ((x) &= ~(1L << (n)))
)
#define TwoPower(n)				(1L << (n))
#define Mask(x, n)				((x) & ~(~0L << (n)))
#define Max(a, b)				(((a) > (b)) ? (a) : (b))
#define Min(a, b)				(((a) < (b)) ? (a) : (b))
#define TRUE					1
#define FALSE					0

#define VIRGIN		0x0		/* the virgin (unblown) PROM state */
#define ADDSIZE		11		/* # address bits */
#define DATASIZE	8		/* # data bits */
#define NUMPROMS	3		/* # PROMS */
#define REVLEVEL	'A'		/* Revision level */

/* input bit fields */
#define HCNTSTART	0		/* pixel count */
#define HCNTBITS	10		/* # pixel count bits */
#define STAND525	10		/* 525 / 625- */

/* output bit fields */
#define D1CLKOUT	0		/* D1 6.75 MHz clock out */
#define D1HOUT		1		/* D1 H out */
#define YOUTCTL1	2		/* for 1-line delay */
#define YOUTCTL2	3		/* for delay-by-6 relative to YOUTCTL1 */
#define COUTCTL1	4		/* same as YOUTCTL1 */
#define YCLK		5		/* Y write clock during browse */
#define CCLK		6		/* C write clock during browse */
#define LINECLK		7		/* line counter clock */
#define HBLANK		8		/* output horizontal blanking */
#define HACT1		9		/* active H from input, first line */
#define HACT2		10		/* active H from input, remaining lines */
#define HACT3		11		/* active H for output */
#define HRST2		12		/* FIFO 1/2-line reset */
#define HRST3		13		/* FIFO full-line reset */
#define SPARE1		14		/* spare */
#define EOL				15		/* end-of-line reset */
#define TBC1		16		/* TBC H control #1, W active */
#define TBC2		17		/* TBC H control #2, W active for first line */
#define TBC3		18		/* TBC H control #3, R active */
```

```
#define TBC4            19              /* TBC H control #4, SOL */
#define TBC5            20              /* TBC H control #5, W mark */
#define TBC6            21              /* TBC H control #6, TBD */
#define TBC7            22              /* TBC H control #7, TBD */
#define HREF            23              /* H reference test point */

/* TV-related parameter definitions follow */
#define ACTIVEPIXELS    720
#define CLK_TO_USEC(x)  ((double) (x) / 13.5)
#define USEC_TO_CLK(x)  ((short) ((x) * 13.5 + 0.5))
#define USEC                    CLK_TO_USEC(count)
#define NCOUNTS                 (stand525 ? 858 : 864)          /* # clocks per line */
#define LINELEN                 CLK_TO_USEC(NCOUNTS)            /* 1 TV line [us] */
#define STARTCNT                (stand525 ? -134 : -134) /* tune this */

#define ACT1            45.88
#define ACT2            7.95
#define ACT3            7.92
#define ACT4            8.08
#define ACT6            7.78
#define ACT7            8.38
main()
{
        register long   data;
        register short  add, count, hcnt, stand525;
        short   d1ClkOut, d1HOut, yOutCtl1, yOutCtl2, cOutCtl1, yClk, cClk, lineClk;
        short   hBlank, hAct1, hAct2, hAct3, hRst2, hRst3, eol;
        short   tbc1, tbc2, tbc3, tbc4, tbc5, tbc6, tbc7, hRef, clkCnt;

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                hcnt = Mask(add >> HCNTSTART, HCNTBITS);
                stand525 = GetBit(add, STAND525);
                count = (hcnt + STARTCNT + NCOUNTS) % NCOUNTS;

                /* set intermediate values */
                d1ClkOut        = ((count % 2) == 0);
                d1HOut          = ! (4.14 <= USEC && USEC < (4.14 + 1.0));
                yOutCtl1        = ! (count == 6);
                yOutCtl2        = ! (count == 0);
                cOutCtl1        = yOutCtl1;
                lineClk         = (0.0 <= USEC && USEC < (0.0 + 4.7));
                hBlank          = ! (ACT7 <= USEC && USEC < (ACT7 + CLK_TO_USEC(ACTIVEPIXELS)));
                hAct1           =    (ACT1    <=    USEC    &&    USEC    <    (ACT2    +
CLK_TO_USEC(ACTIVEPIXELS)));    /* not a typo! */
                hAct2           = (ACT2 <= USEC && USEC < (ACT2 + CLK_TO_USEC(ACTIVEPIXELS)));
                hAct3           = (ACT3 <= USEC && USEC < (ACT3 + CLK_TO_USEC(ACTIVEPIXELS)));
                clkCnt          = ((count - USEC_TO_CLK(ACT2)) % 8);
                yClk            = (clkCnt == 0 || clkCnt == 4);
                cClk            = (clkCnt == 0 || clkCnt == 1);
                hRst2           = ! (count == (NCOUNTS / 2));
                hRst3           = ! (count == (NCOUNTS - 31));
                eol                     = ! (hcnt == (NCOUNTS - 1));
                tbc1            = (ACT4 <= USEC && USEC < (ACT4 + CLK_TO_USEC(ACTIVEPIXELS)));
                tbc2            =  ((ACT4  -  CLK_TO_USEC(39))  <=  USEC  &&  USEC  <  (ACT4  +
CLK_TO_USEC(ACTIVEPIXELS)));
                tbc3            = (ACT6 <= USEC && USEC < (ACT6 + CLK_TO_USEC(ACTIVEPIXELS)));
                tbc4            = (0.0 <= USEC && USEC < (0.0 + CLK_TO_USEC(1)));
                tbc5            =  ((ACT4  +  CLK_TO_USEC(2))  <=  USEC  &&  USEC  <  (ACT4  +
CLK_TO_USEC(128)));
                tbc6            = VIRGIN;       /* for now */
                tbc7            = VIRGIN;       /* for now */
                hRef            = (0.0 <= USEC && USEC < (0.0 + 4.7));

                /* set output values */
                data = VIRGIN;
                SetBit(data, D1CLKOUT, d1ClkOut);
                SetBit(data, D1HOUT, d1HOut);
                SetBit(data, YOUTCTL1, yOutCtl1);
                SetBit(data, YOUTCTL2, yOutCtl2);
                SetBit(data, COUTCTL1, cOutCtl1 );
```

```
                SetBit(data, YCLK, yClk);
                SetBit(data, CCLK, cClk);
                SetBit(data, LINECLK, lineClk);
                SetBit(data, HBLANK, hBlank);
                SetBit(data, HACT1, hAct1);
                SetBit(data, HACT2, hAct2);
                SetBit(data, HACT3, hAct3);
                SetBit(data, HRST2, hRst2);
                SetBit(data, HRST3, hRst3);
                SetBit(data, EOL, eol);
                SetBit(data, TBC1, tbc1);
                SetBit(data, TBC2, tbc2);
                SetBit(data, TBC3, tbc3);
                SetBit(data, TBC4, tbc4);
                SetBit(data, TBC5, tbc5);
                SetBit(data, TBC6, tbc6);
                SetBit(data, TBC7, tbc7);
                SetBit(data, HREF, hRef);

                printf("%06X\n", data);
        }
}

/*
**      RT3 Vertical Control PROMs, Rev. A
**
**      2 PROMs, 2K x 8
**
**      John Stern, Accom Inc, 4/91
*/

/* some macro "functions" follow */
#define NumEntries(array)               (sizeof(array) / sizeof(array[0]))
#define GetBit(x, n)                    (((x) & (1L << n)) != 0)
#define SetBit(x, n, val)               ((val) ? ((x) |= (1L << (n))) : ((x) &= ~(1L << (n)))
)
#define TwoPower(n)                             (1L << (n))
#define Mask(x, n)                              ((x) & ~(~0L << (n)))
#define Max(a, b)                               (((a) > (b)) ? (a) : (b))
#define Min(a, b)                               (((a) < (b)) ? (a) : (b))
#define TRUE                                    1
#define FALSE                                   0

#define VIRGIN          0x0             /* the virgin (unblown) PROM state */
#define ADDSIZE         11              /* # address bits */
#define DATASIZE        8               /* # data bits */
#define NUMPROMS        2               /* # PROMS */
#define REVLEVEL        'A'             /* Revision level */

/* input bit fields */
#define LINESTART       0               /* line count within field */
#define LINEBITS        10              /* # line count bits */
#define STAND525        10              /* 525 / 625- */

/* output bit fields */
#define D1FOUT          0               /* D1 FID out */
#define VACTIVE         1               /* V active for interpolation */
#define VBLANK          2               /* V blanking */
#define VACT1           3               /* V active from input, first line */
#define VACT2           4               /* V active from input, remaining lines */
#define VACT3           5               /* V active for output */
#define VACT4           6               /* V active for output, 1 line delayed */
#define EOL                     7               /* counter reset */
#define UPSYNC0         8               /* uP sync #0, spindle sync */
#define UPSYNC1         9               /* uP sync #1, interrupt */
#define UPSYNC2         10              /* uP sync #2, fake index */
#define UPSYNC3         11              /* uP sync #3, index window */
#define TBC1            12              /* TBC control #1, W active */
#define TBC2            13              /* TBC control #2, R active*/
#define TBC3            14              /* TBC control #3, spare */
#define FREF            15              /* frame reference (line 1) */

/* 625 lines not measured from PAL line 1, but rel. NTSC definition (first serrate) */
#define NLINES          (stand525 ? 525 : 625)
```

```
#define LSTART          (stand525 ? 268 : 323)              /* tune this */
#define FIRSTACT        (stand525 ? 13 : (17 + field2))  /* tune this */
#define ACTVID          (stand525 ? 22 : (26 + field2))  /* tune this */
#define LASTACT1        (NLINES / 2 + stand525)

main()
{
        register short  add, data, stand525, field2;
        short   lcnt, frameLine, fieldLine, lastLine;
        short   d1FOut, vActive, vBlank, vAct1, vAct2, vAct3, vAct4, eol;
        short   uPSync0, uPSync1, uPSync2, uPSync3, tbc1, tbc2, tbc3, fRef;

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                lcnt = Mask(add >> LINESTART, LINEBITS);
                stand525 = GetBit(add, STAND525);

                /* define frame and field lines with correct start points */
                frameLine = (lcnt + LSTART + NLINES) % NLINES;
                frameLine++;     /* so starts at 1 */
                fieldLine = (frameLine > LASTACT1 ? (frameLine - LASTACT1) : frameLine);
                field2 = (frameLine != fieldLine);

                /* set intermediate values */
                d1FOut          = ! (frameLine == (9 + stand525));
                vActive         = (ACTVID <= fieldLine && fieldLine < (LASTACT1 - 1));
                vBlank          = ! (FIRSTACT < fieldLine);
                vAct1           = (fieldLine == (FIRSTACT - 1));
                vAct2           = (FIRSTACT <= fieldLine || fieldLine < 3);
                vAct3           = ((FIRSTACT - 4) <= fieldLine);
                vAct4           = ((FIRSTACT - 3) <= fieldLine);
                eol                     = ! (lcnt == (NLINES - 1));

                /*
                ** the values below carry 1 line less delay!!!!!!!!!!
                */

                /* define frame and field lines with correct start points */
                frameLine = (lcnt + LSTART - 1 + NLINES) % NLINES;
                frameLine++;     /* so starts at 1 */
                fieldLine = (frameLine > LASTACT1 ? (frameLine - LASTACT1) : frameLine);
                field2 = (frameLine != fieldLine);

                uPSync0         = ! (fieldLine > (NLINES / 4));
                uPSync1         = ! ((NLINES / 8) <= fieldLine && fieldLine < ((3 * NLINES / 8)));
                uPSync2         = ! ((NLINES / 4 + 2) < fieldLine && fieldLine <= (NLINES / 4
+ 3));

                uPSync3         = ((NLINES / 4 - 1) < fieldLine && fieldLine <= (NLINES / 4 +

2));
                tbc1            = ((FIRSTACT - 3) <= fieldLine);
                tbc2            = (FIRSTACT <= fieldLine || fieldLine < 3);
                tbc3            = VIRGIN;       /* for now */
                fRef            = field2;

                /* set output values */
                data = VIRGIN;
                SetBit(data, D1FOUT, d1FOut);
                SetBit(data, VACTIVE, vActive);
                SetBit(data, VBLANK, vBlank);
                SetBit(data, VACT1, vAct1);
                SetBit(data, VACT2, vAct2);
                SetBit(data, VACT3, vAct3);
                SetBit(data, VACT4, vAct4);
                SetBit(data, EOL, eol);
                SetBit(data, UPSYNC0, uPSync0);
                SetBit(data, UPSYNC1, uPSync1);
                SetBit(data, UPSYNC2, uPSync2);
                SetBit(data, UPSYNC3, uPSync3);
                SetBit(data, TBC1, tbc1);
                SetBit(data, TBC2, tbc2);
                SetBit(data, TBC3, tbc3);
```

```
            SetBit(data, FREF, fRef);

            printf("%04x\n", data);
        }
}
/*
**      RT4 Address-Modification PROM, Rev. A
**
**      1 PROM, 8K x 8
**
**      Jose Alvarez, Accom Inc, 10/91
*/

/**********************/
/* Macro definitions */
/**********************/
#define NumEntries(array)       (sizeof(array) / sizeof(array[0]))
#define GetBit(x, n)            (((x) & (1L << n)) != 0)
#define SetBit(x, n, val)       ((val) ? ((x) |= (1L << (n))) : ((x) &= ~(1L << (n))) )
#define TwoPower(n)             (1L << (n))
#define Mask(x, n)              ((x) & ~(~0L << (n)))
#define Max(a, b)               (((a) > (b)) ? (a) : (b))
#define Min(a, b)               (((a) < (b)) ? (a) : (b))
#define TRUE                    1
#define FALSE                   0

#define VIRGIN          0x0             /* the virgin (unblown) PROM state */
#define ADDSIZE         13              /* # address bits */
#define DATASIZE        8               /* # data bits */
#define NUMPROMS        1               /* # PROMS */
#define REVLEVEL        'A'             /* Revision level */

/*********************/
/* Input bit fields */
/*********************/
#define ADDIN0          12
#define ADDIN1          11
#define ADDIN2          10
#define ADDIN3          9
#define BASESTART       4               /* base address */
#define BASEBITS        4
#define USEBASE         8
#define SLOTSTART       1               /* slot address */
#define SLOTBITS        3
#define RESET           0               /* bus reset */

/**********************/
/* Output bit fields */
/**********************/
#define IDSTART         0               /* board ID */
#define IDBITS          3                               /* hardware can support 5 bits */
#define VALIDADD        6               /* valid address */
#define VALIDADD_       7               /* valid address */

#define IDVAL           4                               /* This value can be 4 or 6, depending

                                                                         * on whether
RT4 or RT6. IDVAL can
                                                                         * also be used
to denote revision
                                                                         * level
                                                                         */

main(argc, argv)
int  argc;
char **argv;
{
        register short  add, data;
        short   addIn, addOut, base, useBase, slot, reset, validAdd, id;

        int AFLAG = FALSE;

        if (argc > 1) {
                if (*argv[1] == 'a'){
                        AFLAG = TRUE;
```

```
            }
        }

    printf("%d\t%d\t%d\t%c\n", ADDSIZE, DATASIZE, NUMPROMS, REVLEVEL);

    for (add = 0; add < TwoPower(ADDSIZE); add++)
    {
        /* get input values */
        reset = GetBit(add, RESET);
        slot = Mask(add >> SLOTSTART, SLOTBITS);
        base = Mask(add >> BASESTART, BASEBITS);
        useBase = GetBit(add, USEBASE);
        addIn = (GetBit(add, ADDIN0) << 0);
        addIn |= (GetBit(add, ADDIN1) << 1);
        addIn |= (GetBit(add, ADDIN2) << 2);
        addIn |= (GetBit(add, ADDIN3) << 3);

        /* set intermediate variables */
        id = IDVAL;

        if (reset)
        {
            validAdd = 0;
        }
        else if (useBase)
        {
            validAdd = ( base == addIn );
        }
        else /* Slot Addressing */
        {
            validAdd = ((slot + 8) == addIn);
        }


        /* set output values */
        data = VIRGIN;
        data |= (Mask(id, IDBITS) << IDSTART);
        SetBit(data, VALIDADD, validAdd);
        SetBit(data, VALIDADD_, !validAdd);

        if (AFLAG) printf("%d[%x] base+8=%d AddIn=%d: ",add,add,base+8,addIn);

        printf("%02x\n", data);
    }
}


/*
**      RT4 Horizontal Filter Coefficients, Rev. A
**
**      1 PROM (29S19) , 32 x 8
**
**      Jose R. Alvarez, Accom Inc, 10/91
*/

#include <math.h>
#include <stdio.h>

/**********************/
/* Macro Definitions */
/**********************/
#define NumEntries(array)           (sizeof(array) / sizeof(array[0]))
#define GetBit(x, n)                (((x) & (1L << n)) != 0)
#define SetBit(x, n, val)           ((val) ? ((x) |= (1L << (n))) : ((x) &= ~(1L << (n)))
)
#define TwoPower(n)                         (1L << (n))
#define Mask(x, n)                          ((x) & ~(~0L << (n)))
#define Max(a, b)                           (((a) > (b)) ? (a) : (b))
#define Min(a, b)                           (((a) < (b)) ? (a) : (b))
#define TRUE                                1
#define FALSE                               0
#define UP                                          1
#define DOWN                                0
```

```
#define VIRGIN          0x0             /* the virgin (unblown) PROM state */
#define ADDSIZE         5                       /* # address bits */
#define DATASIZE        8                       /* # data bits */
#define NUMPROMS        1                       /* # PROMS */
#define REVLEVEL        'A'                     /* Revision level */

/********************/
/* input bit fields */
/********************/
#define KSELSTART       0
#define KSEL            3
#define TABLESTART      3
#define TABLE           2

#define ZORANOFFSET 2
#define TAPS            8


/*********************/
/* output bit fields */
/*********************/
#define K                       8


/* TV-related parameter definitions follow */
#define ACTIVEPIXELS    720
#define CLK_TO_USEC(x)  ((double) (x) / 13.5)
#define USEC_TO_CLK(x)  ((short) ((x) * 13.5 + 0.5))
#define USEC                    CLK_TO_USEC(count)
#define NCOUNTS                 (stand525 ? 858 : 864)          /* # clocks per line */
#define LINELEN                 CLK_TO_USEC(NCOUNTS)            /* 1 TV line [us] */
#define STARTCNT                (stand525 ? -134 : -134) /* tune this */

main(argc, argv)
int  argc;
char **argv;
{
        register long   data, ksel, ktable;
        register short  add, sign, count, hcnt, stand525;
        int             AFLAG = DOWN, GFLAG = DOWN ;
        char     datastr[32], b0[10], b1[10];
        short    k0[8], k1[8], k2[8], k3[8];


        if  (argc > 1) {
                if (*argv[1] == 'a') {
                        AFLAG = UP;
        }
                if (*argv[1] == 'g') {
                        GFLAG = UP;
        }
        }

        k0[0] =  0;
        k0[1] =  0;
        k0[2] =  0;
        k0[3] =  0;
        k0[4] = 64;
        k0[5] =  0;
        k0[6] =  0;
        k0[7] =  0;

        k1[0] =  0;
        k1[1] =  4; /* 0.0625 */
        k1[2] =  8; /* 0.1250 */
        k1[3] = 12; /* 0.1875 */
        k1[4] = 16; /* 0.2500 */
        k1[5] = 12; /* 0.1875 */
        k1[6] =  8; /* 0.1250 */
        k1[7] =  4; /* 0.0625 */

        k2[0] =  8;
        k2[1] =  8;
        k2[2] =  8;
```

```
        k2[3] =  8;
        k2[4] =  8;
        k2[5] =  8;
        k2[6] =  8;
        k2[7] =  8;

        k3[0] =  0;
        k3[1] =  6; /* 0.09375 */
        k3[2] =  8;      /* 0.12500 */
        k3[3] = 10;      /* 0.15625 */
        k3[4] = 16;      /* 0.25000 */
        k3[5] = 10;      /* 0.15625 */
        k3[6] =  8;      /* 0.12500 */
        k3[7] =  6;      /* 0.09375 */

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                data      = VIRGIN;
                ksel      = VIRGIN;
                ktable    = VIRGIN;

                ksel      = Mask(add >> KSELSTART, KSEL);
                ktable    = Mask(add >> TABLESTART, TABLE);


                ksel      = (ksel + ZORANOFFSET) % TAPS ;

                switch (ktable){
                        case 0:
                                        data = k0[ksel];
                                        break;
                        case 1:
                                        data = k1[ksel];
                                        break;
                        case 2:
                                        data = k2[ksel];
                                        break;
                        case 3:
                                        data = k3[ksel];
                                        break;
                        }
                if (AFLAG){
                        printf("Addr:%4d *** Table:%1d *** ", add, ktable);
                        printf("Coeff#:%1d *** ", ksel);
                        printf("Coefficient:%3d *** ", data);
                        }

                data = Mask(data, K);


                sprintf(datastr,"%%0%dX",NUMPROMS * 2);
                printf(datastr,data);

                if (AFLAG)
                        printf("\n");
                else
                        printf("\n");
        }
}

/*
 *      RT4 Vertical Control PROMs, Rev. A
 *
 *      2 PROMs, 2K x 8 *
 *
 *      Jose Alvarez, Accom Inc, 4/91
 */

/**********************/
/* Macro Definitions */
/**********************/
#define NumEntries(array)               (sizeof(array) / sizeof(array[0]))
```

```
#define GetBit(x, n)                    (((x) & (1L << n)) != 0)
#define SetBit(x, n, val)               ((val) ? ((x) |= (1L << (n))) : ((x) &= ~(1L << (n)))
)
#define TwoPower(n)                             (1L << (n))
#define Mask(x, n)                              ((x) & ~(~0L << (n)))
#define Max(a, b)                               (((a) > (b)) ? (a) : (b))
#define Min(a, b)                               (((a) < (b)) ? (a) : (b))
#define TRUE                                    1
#define FALSE                                   0

#define VIRGIN          0x0     /* the virgin (unblown) PROM state */
#define ADDSIZE         11      /* # address bits */
#define DATASIZE        8       /* # data bits */
#define NUMPROMS        2       /* # PROMS */
#define REVLEVEL        'A'     /* Revision level */

/********************/
/* Input bit fields */
/********************/
#define LINESTART       0       /* line count within field */
#define LINEBITS        10      /* # line count bits */
#define STAND525        10      /* 525 / 625- */

/*********************/
/* Output bit fields */
/*********************/
#define VSYNC           0       /* Vertical Sync */
#define VBLANK          1       /* Vertical blanking */
#define IFW                     2       /* Input Frame Store Write enable */
#define IFR                     3       /* Input Frame Store Read enable */
#define OFW                     4       /* Output Frame Store Write enable */
#define OFR                     5       /* Output Frame Store Read enable */
#define RDLY0           6       /* Read Delay */
#define RDLY1           7       /* Read Delay */
#define YBLANK          8       /* Luminance blanking */
#define CBLANK          9       /* Chrominance blanking */
#define D1FOUT          10      /* D1 FID out */
#define VACTIVE         11      /* V active for interpolation */
#define FREF            12      /* frame reference (line 1) */
#define VACT1           13      /* V active from input */
#define VACT3           14      /* V active for output */
#define EOL                     15      /* counter reset */


/*
 * 625 lines not measured from PAL line 1, but rel. NTSC definition (first
 * serrate)
 */
#define NLINES          (stand525 ? 525 : 625)
#define LSTART          (stand525 ? 267 : 322)  /* tune this */
#define FIRSTACT        (stand525 ? 13 : (17 + field2))  /* tune this */
#define ACTIVELINES     (stand525 ? 244 : 390)  /* tune this 250/395 */
#define LASTACT1        (NLINES / 2 + stand525)

main(argc, argv)
        int             argc;
        char          **argv;
{
        unsigned short  add, data, stand525, lastact, field2;
        short           lcnt, frameLine, fieldLine, lastLine;
        short           d1FOut, vActive, vBlank, vAct1, vAct2, vAct3, vAct4,
                        eol;
        short           uPSync0, uPSync1, uPSync2, uPSync3, tbc1, tbc2,
                        tbc3, fRef;
        short           vSync, ifwen, ifren, ofwen, ofren, rdelay0, rdelay1,
                        yBlank, cBlank;
        int             AFLAG = FALSE;


        if (argc > 1)
                if (*argv[1] == 'a')
                        AFLAG = TRUE;


        printf("%d\t%d\t%d\t%c\n", ADDSIZE, DATASIZE, NUMPROMS, REVLEVEL);
```

```
for (add = 0; add < TwoPower(ADDSIZE); add++) {
        /* get input values */
        lcnt = Mask(add >> LINESTART, LINEBITS);
        stand525 = GetBit(add, STAND525);


        if (AFLAG && !add) printf("firstact=%d * lastact1=%d * lstart=%d * \n",
                                        FIRSTACT, LASTACT1, LSTART);

        /* define frame and field lines with correct start points */
        frameLine = (lcnt + LSTART + NLINES) % NLINES;
        frameLine++;     /* so starts at 1 */
        fieldLine = (frameLine > LASTACT1 ? (frameLine - LASTACT1) : frameLine);
        lastact = (frameLine == LASTACT1 || frameLine == NLINES);
        field2 = (frameLine != fieldLine);


        /****************************/
        /* Set Intermediate values */
        /****************************/
        vSync = (frameLine > 0 && frameLine < 9);
        vBlank = !(FIRSTACT <= fieldLine && fieldLine < (FIRSTACT + ACTIVELINES));

        ifwen = ((FIRSTACT - 2) < fieldLine) && (fieldLine <  FIRSTACT );
        ifren = ((FIRSTACT - 2) < fieldLine) && (fieldLine <  FIRSTACT );

        ofwen = ((FIRSTACT - 1) < fieldLine) && (fieldLine < (FIRSTACT + 1));
        ofren = ((FIRSTACT - 1) < fieldLine) && (fieldLine < (FIRSTACT + 1));

        rdelay0 = (frameLine > FIRSTACT) && (frameLine < ACTIVELINES);
        rdelay1 = (frameLine > (FIRSTACT + ACTIVELINES)) && (frameLine < (FIRSTACT +
2*ACTIVELINES));

        /*-----------------------------------------------------------------*/

        yBlank = !(FIRSTACT <= fieldLine && fieldLine < (FIRSTACT + ACTIVELINES));
        cBlank = !(FIRSTACT <= fieldLine && fieldLine < (FIRSTACT + ACTIVELINES));

        d1FOut = !(frameLine == (9 + stand525));
        vActive = (FIRSTACT <= fieldLine && fieldLine < (FIRSTACT + ACTIVELINES));
        fRef = field2;
        vAct1 = ((FIRSTACT + 1) <= fieldLine && fieldLine < (FIRSTACT + 1 + ACTIVELINES));
        vAct2 = ((FIRSTACT + 1) <= fieldLine && fieldLine < (FIRSTACT + 1 + ACTIVELINES));
        vAct3 = ((FIRSTACT - 3) <= fieldLine && fieldLine < (FIRSTACT - 3 + ACTIVELINES));
        vAct4 = ((FIRSTACT - 2) <= fieldLine && fieldLine < (FIRSTACT - 2 + ACTIVELINES));
        eol = !(lcnt == (NLINES - 1));

        /* uPSync0              = ! (fieldLine > (NLINES / 4))
         */
        /*
         * uPSync1              = ! ((NLINES / 8) <= fieldLine &&
         * fieldLine < ((3 * NLINES / 8)));
         */
        /*
         * uPSync2              = ! ((NLINES / 4 + 2) < fieldLine &&
         * fieldLine <= (NLINES / 4 + 3));
         */
        /*
         * uPSync3              = ((NLINES / 4 - 1) < fieldLine &&
         * fieldLine <= (NLINES / 4 + 2));
         */
        /*
         * tbc1         = ((FIRSTACT - 3) <= fieldLine && fieldLine <
         * (FIRSTACT - 3 + ACTIVELINES));
         */
        /*
         * tbc2         = ((FIRSTACT + 1) <= fieldLine && fieldLine <
         * (FIRSTACT + 1 + ACTIVELINES));
         */
        /* tbc3         = VIRGIN;                                          */


        /*********************/
        /* Set Output values */
        /*********************/
```

```
            data = VIRGIN;
            SetBit(data, VSYNC, vSync);
            SetBit(data, VBLANK, vBlank);
            SetBit(data, IFW, ifwen);
            SetBit(data, IFR, ifren);
            SetBit(data, OFW, ofwen);
            SetBit(data, OFR, ofren);
            SetBit(data, RDLY0, rdelay0);
            SetBit(data, RDLY1, rdelay1);
            SetBit(data, YBLANK, yBlank);
            SetBit(data, CBLANK, cBlank);
            SetBit(data, D1FOUT, d1FOut);
            SetBit(data, VACTIVE, vActive);
            SetBit(data, FREF, fRef);
            SetBit(data, VACT1, vAct1);
            SetBit(data, VACT3, vAct3);
            SetBit(data, EOL, eol);
            /* SetBit(data, VACT2, vAct2);            */
            /* SetBit(data, VACT4, vAct4);            */
            /* SetBit(data, UPSYNC0, uPSync0);        */
            /* SetBit(data, UPSYNC1, uPSync1);        */
            /* SetBit(data, UPSYNC2, uPSync2);        */
            /* SetBit(data, UPSYNC3, uPSync3);  */
            /* SetBit(data, TBC1, tbc1);              */
            /* SetBit(data, TBC2, tbc2);              */
            /* SetBit(data, TBC3, tbc3);              */
            /* */


            if (AFLAG)
                    printf("Lcnt=%3d * FrmLn=%3d * FldLn=%3d * LastAct=%3d * Addr=%4d ***
",

                            lcnt, frameLine, fieldLine, lastact, add);


            printf("%04x\n", data);
        }
}
/*
**      RT4 Absolute Value Look-up Table, Rev. A
**
**      1 PROM (27S29) , 512 x 8
**
**      Jose R. Alvarez, Accom Inc, 10/91
*/

/**********************/
/* Macro Definitions */
/**********************/
#define NumEntries(array)           (sizeof(array) / sizeof(array[0]))
#define GetBit(x, n)                (((x) & (1L << n)) != 0)
#define SetBit(x, n, val)           ((val) ? ((x) |= (1L << (n))) : ((x) &= ~(1L << (n)))
)
#define TwoPower(n)                         (1L << (n))
#define Mask(x, n)                          ((x) & ~(~0L << (n)))
#define Max(a, b)                           (((a) > (b)) ? (a) : (b))
#define Min(a, b)                           (((a) < (b)) ? (a) : (b))
#define TRUE                                1
#define FALSE                               0

#define VIRGIN          0x0         /* the virgin (unblown) PROM state */
#define ADDSIZE         9                   /* # address bits */
#define DATASIZE        8                   /* # data bits */
#define NUMPROMS        1                   /* # PROMS */
#define REVLEVEL        'A'                 /* Revision level */

/********************/
/* input bit fields */
/********************/
#define FDiffStart  0
#define FDiff          9
#define DSIGN          9
```

```
/*********************/
/* output bit fields */
/*********************/
#define ABSStart        0
#define ABS                     8


/* TV-related parameter definitions follow */
#define ACTIVEPIXELS    720
#define CLK_TO_USEC(x)  ((double) (x) / 13.5)
#define USEC_TO_CLK(x)  ((short) ((x) * 13.5 + 0.5))
#define USEC                    CLK_TO_USEC(count)
#define NCOUNTS                 (stand525 ? 858 : 864)          /* # clocks per line */
#define LINELEN                 CLK_TO_USEC(NCOUNTS)            /* 1 TV line [us] */
#define STARTCNT                (stand525 ? -134 : -134) /* tune this */

main(argc, argv)
int  argc;
char **argv;
{
        register long   data;
        register short  add, sign, count, hcnt, stand525;

        short   b14_0, b14_1, b15_0, b15_1, boot0, boot1;
        short   Q0, Q1, Q2, Q3, Q4, Q5, Q6, Q7;

        int             AFLAG = FALSE;

        char    datastr[32], b0[10], b1[10];


        if  (argc > 1) {
                if (*argv[1] == 'a') {
                        AFLAG = TRUE;
        }
        }


        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                sign  = GetBit(add,DSIGN);
                data = VIRGIN;
                data  = Mask(add >> FDiffStart, FDiff);

                if (data > 255) {
                        data = ~data + (data != 256) ;
                        }

                data = Mask(data, ABS);

                if (AFLAG)
                        printf("Addr:%4d *** Data:%d *** ",add, data);

                sprintf(datastr,"%%0%dX",NUMPROMS * 2);
                printf(datastr,data);

                if (AFLAG)
                        printf("\n");
                else
                        printf("\n");
        }
}

/*
**      RT4 Absolute Value Look-up Table, Rev. A
**
**      1 PROM (27S291) , 2K x 8
**
**      Jose R. Alvarez, Accom Inc, 10/91
*/
```

```
#include <math.h>

/*********************/
/* Macro Definitions */
/*********************/
#define NumEntries(array)            (sizeof(array) / sizeof(array[0]))
#define GetBit(x, n)                 (((x) & (1L << n)) != 0)
#define SetBit(x, n, val)            ((val) ? ((x) |= (1L << (n))) : ((x) &= ~(1L << (n)))
)
#define TwoPower(n)                          (1L << (n))
#define Mask(x, n)                           ((x) & ~(~0L << (n)))
#define Max(a, b)                            (((a) > (b)) ? (a) : (b))
#define Min(a, b)                            (((a) < (b)) ? (a) : (b))
#define TRUE                                 1
#define FALSE                                0

#define VIRGIN          0x0          /* the virgin (unblown) PROM state */
#define ADDSIZE         11                   /* # address bits */
#define DATASIZE        8                    /* # data bits */
#define NUMPROMS        1                    /* # PROMS */
#define REVLEVEL        'A'                  /* Revision level */

/********************/
/* input bit fields */
/********************/
#define MOTSTART        0
#define MOTIONIN        8
#define GAINSTART       8
#define GAIN            3


/*********************/
/* output bit fields */
/*********************/
#define MOTIONOUT       8


/* TV-related parameter definitions follow */
#define ACTIVEPIXELS    720
#define CLK_TO_USEC(x)  ((double) (x) / 13.5)
#define USEC_TO_CLK(x)  ((short) ((x) * 13.5 + 0.5))
#define USEC                    CLK_TO_USEC(count)
#define NCOUNTS                 (stand525 ? 858 : 864)          /* # clocks per line */
#define LINELEN                 CLK_TO_USEC(NCOUNTS)            /* 1 TV line [us] */
#define STARTCNT                (stand525 ? -134 : -134) /* tune this */

main(argc, argv)
int  argc;
char **argv;
{
        register long   data;
        register short  add, sign, count, hcnt, stand525;

        short   b14_0, b14_1, b15_0, b15_1, boot0, boot1;
        short   Q0, Q1, Q2, Q3, Q4, Q5, Q6, Q7;

        int             gain, AFLAG = FALSE;

        char    datastr[32], b0[10], b1[10];


        if  (argc > 1) {
                if (*argv[1] == 'a') {
                        AFLAG = TRUE;
        }
        }


        printf("%d\t%d\t%d\t%c\n", ADDSIZE, DATASIZE, NUMPROMS, REVLEVEL);
        for (add = 0; add < TwoPower(ADDSIZE); add++)
        {
                /* get input values */
                data  = VIRGIN;
                data  = Mask(add >> MOTSTART, MOTIONIN);
                gain  = Mask(add >> GAINSTART, GAIN);
```

```
                switch (gain) {
                        case 0:         /*  Gain 1      */
                                break;
                        case 1:         /*  Gain 2      */
                                data *= 2 ;
                                break;
                        case 2:         /*  Gain 4          */
                                data *= 4 ;
                                break;
                        case 3:         /*  Gain 1/2    */
                                data /= 2 ;
                                break;
                        case 4:         /*  Gain 1/4    */
                                data /= 4 ;
                                break;
                        case 5:         /*  Gain Log    */
                                data = (int)(106.0 * log10(data + 1.0)) ;
                                break;
                        case 6:         /* Gain 1/2 Log */
                                data = (int)( 53.0 * log10(data + 1.0)) ;
                                break;
                        case 7:     /* Gain 1/4 Log */
                                data = (int)( 26.5 * log10(data + 1.0)) ;
                                break;
                        }

                data = Mask(data, MOTIONOUT);

                if (AFLAG)
                        printf("Addr:%4d *** Base:%d *** Gain:%d *** Data:%d *** ",
                                                        add, add % 256, gain, data);

                sprintf(datastr,"%%0%dX",NUMPROMS * 2);
                printf(datastr,data);

                if (AFLAG)
                        printf("\n");
                else
                        printf("\n");
        }
}

/*
**      RT4 Absolute Value Look-up Table, Rev. A
**
**      1 PROM (CY7C263) , 4K x 8
**
**      Jose R. Alvarez, Accom Inc, 10/91
*/

#include <math.h>

/**********************/
/* Macro Definitions */
/**********************/
#define NumEntries(array)               (sizeof(array) / sizeof(array[0]))
#define GetBit(x, n)                    (((x) & (1L << n)) != 0)
#define SetBit(x, n, val)               ((val) ? ((x) |= (1L << (n))) : ((x) &= ~(1L << (n)))
)
#define TwoPower(n)                             (1L << (n))
#define Mask(x, n)                              ((x) & ~(~0L << (n)))
#define Max(a, b)                               (((a) > (b)) ? (a) : (b))
#define Min(a, b)                               (((a) < (b)) ? (a) : (b))
#define TRUE                                    1
#define FALSE                                   0

#define VIRGIN          0x0             /* the virgin (unblown) PROM state */
#define ADDSIZE         13                      /* # address bits */
#define DATASIZE        8                       /* # data bits */
#define NUMPROMS        1                       /* # PROMS */
#define REVLEVEL        'A'                     /* Revision level */
```

```
/*********************/
/* input bit fields */
/*********************/
#define MOTSTART        0
#define MOTIONIN        6
#define GAINSTART       6                           /*  Gain address space is divided       */
#define GAIN            6                           /*  between Linear interpolation and */
#define DNR                     12                       /*  Noise Reduction, by DNR flag bit
*/

                                                                 /*                          */

/**********************/
/* output bit fields */
/**********************/
#define NLTF            8


/* TV-related parameter definitions follow */
#define ACTIVEPIXELS      720
#define CLK_TO_USEC(x)    ((double) (x) / 13.5)
#define USEC_TO_CLK(x)    ((short) ((x) * 13.5 + 0.5))
#define USEC                      CLK_TO_USEC(count)
#define NCOUNTS                   (stand525 ? 858 : 864)        /* # clocks per line */
#define LINELEN                   CLK_TO_USEC(NCOUNTS)          /* 1 TV line [us] */
#define STARTCNT                  (stand525 ? -134 : -134) /* tune this */

main(argc, argv)
int  argc;
char **argv;
{
        register long   data, motin;
        register short  add, sign, count, hcnt, stand525;

        short   b14_0, b14_1, b15_0, b15_1, boot0, boot1;
        short   Q0, Q1, Q2, Q3, Q4, Q5, Q6, Q7;

        int             gain, dnrflag, AFLAG = FALSE, GFLAG = FALSE ;

        char    datastr[32], b0[10], b1[10];


        if  (argc > 1) {
                if (*argv[1] == 'a') {
                        AFLAG = TRUE;
        }
                if (*argv[1] == 'g') {
                        GFLAG = TRUE;
        }
        }


        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                data    = VIRGIN;
                motin    = VIRGIN;
                dnrflag = GetBit(add, DNR);
                motin    = Mask(add >> MOTSTART, MOTIONIN);
                gain     = Mask(add >> GAINSTART, GAIN);

                if (!dnrflag) {  /*** Motion Adaptive  Interpolation  ***/
                        if (!gain){
                                data =  motin;
                                }
                        if (gain > 0 && gain <= 30 ){
                                data =  (int)((6.3*gain)/63.0*motin);
                                }
                        if (gain >30 && gain <= 50){
                                gain -= 30;
                                data =  (int)((0.63*gain)/63.0*motin*motin);
                                }
                        if (gain >50 && gain < 63) {
                                gain -= 50;
```

```
                        data = (int)((6.3*gain)/63.0*motin + 16);
                        }
                if (gain == 63) {
                        data = 63 ;
                        }
                }
        else {                          /*** Motion Adaptive Noise Reduction ***/
                }

        if (data > 63) data = 63;
        data = Mask(data, NLTF);

        if (AFLAG)
                printf("Addr:%4d *** Gain:%2d *** Input:%3d *** Output:%3d *** ",
                                                add, gain, motin, data);

        sprintf(datastr,"%%0%dX",NUMPROMS * 2);

        if (!GFLAG)
                printf(datastr,data);
        else
                printf("%d %d", motin, data);

        if (AFLAG)
                printf("\n");
        else
                printf("\n");
        }
}

/*
**      RT2 Communication uP Address Decoding PROM, Rev. A
**
**      1 PROM (27S29) , 512 x 8
**
**      Jose R. Alvarez, Accom Inc, 10/91
*/

/*********************/
/* Macro Definitions */
/*********************/
#define NumEntries(array)           (sizeof(array) / sizeof(array[0]))
#define GetBit(x, n)                (((x) & (1L << n)) != 0)
#define SetBit(x, n, val)           ((val) ? ((x) |= (1L << (n))) : ((x) &= ~(1L << (n)))
)
#define TwoPower(n)                         (1L << (n))
#define Mask(x, n)                          ((x) & ~(~0L << (n)))
#define Max(a, b)                           (((a) > (b)) ? (a) : (b))
#define Min(a, b)                           (((a) < (b)) ? (a) : (b))
#define TRUE                                1
#define FALSE                               0

#define VIRGIN          0x0         /* the virgin (unblown) PROM state */
#define ADDSIZE         9                   /* # address bits */
#define DATASIZE        8                   /* # data bits */
#define NUMPROMS        1                   /* # PROMS */
#define REVLEVEL        'A'                 /* Revision level */

/*********************/
/* input bit fields */
/*********************/
#define A14_0           0           /* From 1st Comm uP */
#define A15_0           1           /* From 1st Comm uP */
#define BootSel0        2           /* From Main uP Output Register */
#define A14_1           3           /* From 2nd Comm uP */
#define A15_1           4           /* From 2nd Comm uP */
#define BootSel1        5           /* From Main uP Output Register */
#define Gnd                     6


/*********************/
/* output bit fields */
/*********************/
#define SRAM0_          0
#define DUART0_         1
```

```
#define DPRAM0_         2
#define NC0                     3
#define SRAM1_          4
#define DUART1_         5
#define DPRAM1_         6
#define NC1                     7               /* Not Connected */


/* TV-related parameter definitions follow */
#define ACTIVEPIXELS    720
#define CLK_TO_USEC(x)  ((double) (x) / 13.5)
#define USEC_TO_CLK(x)  ((short) ((x) * 13.5 + 0.5))
#define USEC                    CLK_TO_USEC(count)
#define NCOUNTS                 (stand525 ? 858 : 864)          /* # clocks per line */
#define LINELEN                 CLK_TO_USEC(NCOUNTS)            /* 1 TV line [us] */
#define STARTCNT                (stand525 ? -134 : -134) /* tune this */

main(argc, argv)
int  argc;
char **argv;
{
        register long   data;
        register short  add, count, hcnt, stand525;

        short   b14_0, b14_1, b15_0, b15_1, boot0, boot1;
        short   Q0, Q1, Q2, Q3, Q4, Q5, Q6, Q7;

        int             BFLAG = FALSE, DFLAG = FALSE;

        char    datastr[32], b0[10], b1[10];


        /* String for 'bit-high' should be "   ¦." */
        b1[0] = 32;
        b1[1] = 32;
        b1[2] = 32;
        b1[3] = 179;
        b1[4] = 46;
        b1[5] = 0;

        /* String for 'bit-low' should be " ¦  ." */
        b0[0] = 32;
        b0[1] = 179;
        b0[2] = 32;
        b0[3] = 32;
        b0[4] = 46;
        b0[5] = 0;

        /**********************************/
        /* Simple parsing for BIT  FLAG */
        /*              and DISPLAY FLAG */
        /*                              */
        /* "comdec t" sets BFLAG to     */
        /*    displays individual bits  */
        /*    in binary form            */
        /*                              */
        /* "comdec d" sets DFLAG to     */
        /*    displays individual bits  */
        /*    in rudimentary character  */
        /*    graphical representation  */
        /**********************************/

        if  (argc > 1) {
                if (*argv[1] == 'b')
                        BFLAG = TRUE;
                if (*argv[1] == 'd')
                        DFLAG = TRUE;
                if (*argv[1] == 'a') {
                        BFLAG = TRUE;
                        DFLAG = TRUE;
        }
        }


        printf("%d\t%d\t%d\t%c\n", ADDSIZE, DATASIZE, NUMPROMS, REVLEVEL);
```

```
        for (add = 0; add < TwoPower(ADDSIZE); add++)
        {
                /* get input values */
                b14_0 = GetBit(add,A14_0);
                b14_1 = GetBit(add,A14_0);
                b15_0 = GetBit(add,A15_0);
                b15_1 = GetBit(add,A14_1);
                boot0   = GetBit(add,BootSel0);
                boot1   = GetBit(add,BootSel1);


                /* set intermediate values */
                Q0  = !((!b14_0 & !b15_0 & boot0) | (!b14_0 & b15_0 & !boot0));
                Q1  = !(b14_0 & b15_0);
                Q2  = !((!b14_0 & !b15_0 & !boot0) | (!b14_0 & b15_0 & boot0));
                Q3  = 0 ;
                Q4  = !((!b14_1 & !b15_1 & boot1) | (!b14_1 & b15_1 & !boot1));
                Q5  = !(b14_1 & b15_1);
                Q6  = !((!b14_1 & !b15_1 & !boot1) | (!b14_1 & b15_1 & boot1));
                Q7  = 0 ;

                if (DFLAG) {
                        printf("%s", Q7 ? b1 : b0 );
                        printf("%s", Q6 ? b1 : b0 );
                        printf("%s", Q5 ? b1 : b0 );
                        printf("%s", Q4 ? b1 : b0 );
                        printf("%s", Q3 ? b1 : b0 );
                        printf("%s", Q2 ? b1 : b0 );
                        printf("%s", Q1 ? b1 : b0 );
                        printf("%s", Q0 ? b1 : b0 );
                        printf("    ");
                }

                /* set output values */
                data = VIRGIN;
                SetBit(data, SRAM0_, Q0);
                SetBit(data, DUART0_, Q1);
                SetBit(data, DPRAM0_, Q2);
                SetBit(data, NC0, Q3);
                SetBit(data, SRAM1_, Q4);
                SetBit(data, DUART1_, Q5);
                SetBit(data, DPRAM1_, Q6);
                SetBit(data, NC1, Q7);

                if (BFLAG || DFLAG)
                        printf("Addr:%4d  ",add);

                sprintf(datastr,"%%0%dX",NUMPROMS * 2);
                printf(datastr,data);

                if (BFLAG)
                        printf("  %1d%1d%1d%1d%1d%1d%1d%1d\n",
                                Q7,Q6,Q5,Q4,Q3,Q2,Q1,Q0);
                else
                        printf("\n");
        }
}

/*
**      RT4 Horizontal Control PROMs, Rev. A
**
**      3 PROMs, 2K x 8
**
**      Jose Alvarez, Accom Inc, 10/91
*/

/**********************/
/* Macro definitions */
/**********************/
#define NumEntries(array)           (sizeof(array) / sizeof(array[0]))
#define GetBit(x, n)                (((x) & (1L << n)) != 0)
#define SetBit(x, n, val)          ((val) ? ((x) |= (1L << (n))) : ((x) &= ~(1L << (n))) )
#define TwoPower(n)                        (1L << (n))
#define Mask(x, n)                         ((x) & ~(~0L << (n)))
#define Max(a, b)                          (((a) > (b)) ? (a) : (b))
```

```
#define Min(a, b)                         (((a) < (b)) ? (a) : (b))
#define TRUE                              1
#define FALSE                             0

#define VIRGIN          0x0          /* the virgin (unblown) PROM state */
#define ADDSIZE         11           /* # address bits */
#define DATASIZE        8            /* # data bits */
#define NUMPROMS        3            /* # PROMS */
#define REVLEVEL        'A'          /* Revision level */

/********************/
/* Input bit fields */
/********************/
#define HCNTSTART       0            /* pixel count */
#define HCNTBITS        10           /* # pixel count bits */
#define STAND525        10           /* 525 / 625- */

/*********************/
/* Output bit fields */
/*********************/
#define HBLANK          0            /* Horizontal Blanking */

#define MDVctl          1            /* Motion Detection variable control */
#define OFSRW           2            /* Output Frame Store reset write */
#define OFSRR           3            /* Output Frame Store reset read */
#define D1_HOUT         4            /* D1 H signal output */
#define D1_6CLKOUT      5            /* D1 6.75 MHz clock output */
#define LINECLKVC       6            /* Line counter clock for vertical control */
#define EOL                     7            /* End-Of-Line reset */
#define ACT_H           8            /* Active Horizontal line */
#define ACT_H_          9            /* Inactive Horizontal line */
#define ACC_H           10           /* Horizontal statistics accumulator control */
#define ACCCLR_H        11           /* Horizontal statistics accumulator clear */
#define IFSRW0          12           /* Input Frame Store reset write */
#define IFSRR0          13           /* Input Frame Store reset read */
#define IFSRW1          14           /* Input Frame Store reset write */
#define IFSRR1          15           /* Input Frame Store reset read */
#define HCTL7           16           /* General purpose horizontal control */
#define HCTL6           17           /* General purpose horizontal control */
#define HCTL5           18           /* General purpose horizontal control */
#define HCTL4           19           /* General purpose horizontal control */
#define HCTL3           20           /* General purpose horizontal control */
#define HCTL2           21           /* General purpose horizontal control */
#define HCTL1           22           /* General purpose horizontal control */
#define HCTL0           23           /* General purpose horizontal control */


/* #define     D1CLKOUT        0            D1 6.75 MHz clock out */
/* #define     D1HOUT          1            D1 H out */
/* #define     YOUTCTL1        2            for 1-line delay */
/* #define     YOUTCTL2        3            for delay-by-6 relative to YOUTCTL1 */
/* #define     COUTCTL1        4            same as YOUTCTL1 */
/* #define     YCLK            5            Y write clock during browse */
/* #define     CCLK            6            C write clock during browse */
/* #define     LINECLK         7            line counter clock */
/* #define     HBLANK          8            output horizontal blanking */
/* #define     HACT1           9            active H from input */
/* #define     HACT2           10           active H from disk */
/* #define     HACT3           11           active H for output */
/* #define     HRST2           12           FIFO 1/2-line reset */
/* #define     HRST3           13           FIFO full-line reset */
/* #define     SPARE1          14           spare */
/* #define     EOL                     15           end-of-line reset */
/* #define     TBC1            16           TBC H control #1, W active */
/* #define     TBC2            17           TBC H control #2, W active for first line */
/* #define     TBC3            18           TBC H control #3, R active */
/* #define     TBC4            19           TBC H control #4, SOL */
/* #define     TBC5            20           TBC H control #5, W mark */
/* #define     TBC6            21           TBC H control #6, TBD */
/* #define     TBC7            22           TBC H control #7, TBD */
/* #define     HREF            23           H reference test point */

/***********************************/
/* TV-related parameter definitions */
/***********************************/
#define ACTIVEPIXELS    720
```

```
#define CLK_TO_USEC(x)  ((double) (x) / 13.5)
#define USEC_TO_CLK(x)  ((short) ((x) * 13.5 + 0.5))
#define USEC            CLK_TO_USEC(count)
#define NCOUNTS         (stand525 ? 858 : 864)      /* # clocks per line */
#define LINELEN         CLK_TO_USEC(NCOUNTS)        /* 1 TV line [us] */
#define STARTCNT        (stand525 ? 0 : 0)         /* tune this */
                                                      /* start -134 */
                                                      /* forward -290 */

#define ACT0            10.0   /* hRef is used initially */
#define ACT1            7.8
#define ACT2            7.8
#define ACT3            7.9
#define ACT4            8.08
#define ACT5            1.0
#define ACT6            8.00
#define ACT7            8.38

#define MDRST           7.0
#define OFWR            100     /* Equivalent to about 7.4 usecs */
#define OFRR            100
#define IFWR1            84             /* 11/18/91 ... start 85 */
#define IFRR1            84
#define IFWR2            95
#define IFRR2            95

main(argc, argv)
int  argc;
char **argv;
{
        register long   data;
        register short  add, count, hcnt, stand525;
        short   d1ClkOut, d1HOut, yOutCtl1, yOutCtl2, cOutCtl1, yClk, cClk, lineClk;
        short   hBlank, hActive, hAct0,hAct1, hAct2, hAct3, hAct4,hAct5, hAct6, hAct7;
        short   hRst2, hRst3, eol;
        short   MDreset, ofrstr,ofrstw, ifrstr1, ifrstr2, ifrstw1, ifrstw2;
        short   Acc, AccClr;
        short   tbc1, tbc2, tbc3, tbc4, tbc5, tbc6, tbc7, hRef, clkCnt;
        int             AFLAG=FALSE;


        if (argc > 1) {
                if (*argv[1] == 'a') AFLAG = TRUE;
                }

        printf("%d\t%d\t%d\t%c\n", ADDSIZE, DATASIZE, NUMPROMS, REVLEVEL);

        for (add = 0; add < TwoPower(ADDSIZE); add++)
        {
                /* get input values */
                hcnt = Mask(add >> HCNTSTART, HCNTBITS);
                stand525 = GetBit(add, STAND525);
                count = (hcnt + STARTCNT + NCOUNTS) % NCOUNTS;

                /* set intermediate values */

                hBlank      = ! (ACT7 <= USEC && USEC < (ACT7 + CLK_TO_USEC(ACTIVEPIXELS)));
                MDreset     = ! (0.0 <= USEC && USEC < MDRST );
                ofrstw      = ( count == OFWR  || count == (OFWR + 1) ); /* two clocks */
                ofrstr      = ( count == OFRR  || count == (OFRR + 1) ); /* two clocks */
                d1HOut      = ! (3.0 <= USEC && USEC < (3.0 + 1.0));
                d1ClkOut    = ((count % 2) == 0);
                lineClk     = (0.0 <= USEC && USEC < (0.0 + 4.7));
                eol                 = ! (hcnt == (NCOUNTS - 1));
                hActive     = (ACT0 <= USEC && USEC < (ACT0 + CLK_TO_USEC(ACTIVEPIXELS)));
                Acc                 = ( count == 138 );
                AccClr      = ( count == 720 );
                ifrstw1     = ( count == IFWR1 || count == (IFWR1 + 1) ); /* two clocks */
                ifrstr1     = ( count == IFRR1 || count == (IFRR1 + 1) ); /* two clocks */
                ifrstw2     = ( count == IFWR2 || count == (IFWR2 + 1) ); /* two clocks */
                ifrstr2     = ( count == IFRR2 || count == (IFRR2 + 1) ); /* two clocks */
                hAct7       = (ACT7 <= USEC && USEC < (ACT7 + CLK_TO_USEC(ACTIVEPIXELS)));
                hAct6       = (ACT6 <= USEC && USEC < (ACT6 + CLK_TO_USEC(ACTIVEPIXELS)));
                hAct5       = (ACT5 <= USEC && USEC < (ACT5 + CLK_TO_USEC(ACTIVEPIXELS)));
                hAct4       = (ACT4 <= USEC && USEC < (ACT4 + CLK_TO_USEC(ACTIVEPIXELS)));
```

```
		hAct3		= (ACT3 <= USEC && USEC < (ACT3 + CLK_TO_USEC(ACTIVEPIXELS)));
		hAct2		= (ACT2 <= USEC && USEC < (ACT2 + CLK_TO_USEC(ACTIVEPIXELS)));
		hAct1		= (ACT1 <= USEC && USEC < (ACT1 + CLK_TO_USEC(ACTIVEPIXELS)));
		hAct0		= (ACT0 <= USEC && USEC < (ACT0 + CLK_TO_USEC(ACTIVEPIXELS)));
		hRst2		= ! (count == (NCOUNTS / 2));
		hRst3		= ! (count == (NCOUNTS - 31));
		hRef		= (0.0 <= USEC && USEC < (0.0 + 4.7));


/****************************************************************/
/*	INTERMEDIATE VALUES FOR RT3 KEPT HERE FOR REFERENCE	*/
/****************************************************************/
/*		yOutCtl1	= ! (count == 6); */
/*		yOutCtl2	= ! (count == 0); */
/*		cOutCtl1	= yOutCtl1;		*/
/*		clkCnt		= ((count - USEC_TO_CLK(ACT2)) % 8);	*/
/*		yClk		= (hAct2 && (clkCnt == 0 || clkCnt == 4)); */
/*		cClk		= (hAct2 && (clkCnt == 0 || clkCnt == 1)); */
/*		tbc1		= (ACT4 <= USEC && USEC < (ACT4 + CLK_TO_USEC(ACTIVEPIXELS)));
				*/
/*		tbc2		= ((ACT4 - CLK_TO_USEC(39)) <= USEC && USEC < (ACT4 +
CLK_TO_USEC(ACTIVEPIXELS)));	*/
/*		tbc3		= (ACT6 <= USEC && USEC < (ACT6 + CLK_TO_USEC(ACTIVEPIXELS)));
				*/
/*		tbc4		= (0.0 <= USEC && USEC < (0.0 + CLK_TO_USEC(1)));
						*/
/*		tbc5		= ((ACT4 - CLK_TO_USEC(2)) <= USEC && USEC < (ACT4 +
CLK_TO_USEC(128)));	*/
/*		tbc6		= VIRGIN; */
/*		tbc7		= VIRGIN; */


		/**********************/
		/* Set Output values */
		/**********************/

		data = VIRGIN;

		SetBit(data, HBLANK, hBlank);
		SetBit(data, MDVctl, MDreset);
		SetBit(data, OFSRW, ofrstw);
		SetBit(data, OFSRR, ofrstr);
		SetBit(data, D1_HOUT, d1HOut);
		SetBit(data, D1_6CLKOUT, d1ClkOut);
		SetBit(data, LINECLKVC, lineClk);
		SetBit(data, EOL, eol);
		SetBit(data, ACT_H, hActive);
		SetBit(data, ACT_H_, !hActive);
		SetBit(data, ACC_H, Acc);
		SetBit(data, ACCCLR_H, AccClr);
		SetBit(data, IFSRW0, ifrstw1);
		SetBit(data, IFSRR0, ifrstr1);
		SetBit(data, IFSRW1, ifrstw2);
		SetBit(data, IFSRR1, ifrstr2);
		SetBit(data, HCTL7, hAct7);
		SetBit(data, HCTL6, hAct6);
		SetBit(data, HCTL5, hAct5);
		SetBit(data, HCTL4, hAct4);
		SetBit(data, HCTL3, hRst3);
		SetBit(data, HCTL2, hRst2);
		SetBit(data, HCTL1, hAct1);
		SetBit(data, HCTL0, hRef);

/********************************************/
/* OUTPUT VALUES FOR RT3 KEPT HERE FOR REF */
/********************************************/
/*		SetBit(data, YOUTCTL1, yOutCtl1);  */
/*		SetBit(data, YOUTCTL2, yOutCtl2);  */
/*		SetBit(data, COUTCTL1, cOutCtl1 ); */
/*		SetBit(data, YCLK, yClk);		*/
```

```
/*              SetBit(data, CCLK, cClk);                   */
/*              SetBit(data, LINECLK, lineClk);     */
/*              SetBit(data, HBLANK, hBlank);       */
/*              SetBit(data, HACT1, hAct1);                 */
/*              SetBit(data, HACT2, hAct2);                 */
/*              SetBit(data, HACT3, hAct3);                 */
/*              SetBit(data, HRST2, hRst2);                 */
/*              SetBit(data, HRST3, hRst3);                 */
/*              SetBit(data, TBC1, tbc1);                   */
/*              SetBit(data, TBC2, tbc2);                   */
/*              SetBit(data, TBC3, tbc3);                   */
/*              SetBit(data, TBC4, tbc4);                   */
/*              SetBit(data, TBC5, tbc5);                   */
/*              SetBit(data, TBC6, tbc6);                   */
/*              SetBit(data, TBC7, tbc7);                   */
/*              SetBit(data, HREF, hRef);                   */

                if (AFLAG){
                        printf("Addr:%4d * Cnt:%4d *** ", add, count);
                        }

                printf("%06lX\n", data);
        }
}

MODULE  RT4_AddCtl
flag    '-r3'
TITLE   'RT4  - Microprocessor Address Control PAL
                Jose Alvarez, Accom Inc.
                10/91
                Version A
'

AddCtl device 'P22V10';

"Input Signals
        MRESET                  pin 1;
        MUBE                    pin 2;
        MRD~                    pin 3;
        MWR~                    pin 4;
        MASTB~                  pin 5;
        BRDSEL                  pin 6;
        uPA0                    pin 7;
        uPA16                   pin 8;
        uPA17                   pin 9;
        uPA18                   pin 10;
        uPA19                   pin 11;
        FDBK_CTL~               pin 13;

"Output Signals
        RESET~                  pin 23;
        BUSDIR                  pin 22;
        RDCLK                   pin 21;
        RWctl0                  pin 19; "For READ-ONLY registers
        RWctl1                  pin 18; "For WRITE-ONLY registers
        RWctl2                  pin 17; "For WRITE-ONLY memory locations
        SEL_IN~                 pin 15;
        SEL_FBK~                pin 14;


"Definitions
        True, False     = 1,0;
        High, Low       = 1,0;
        H,L,Q,X,Z       = 1,0,.C.,.X.,.Z.;

        Addr            = [uPA19, uPA18, uPA17, uPA16];
        GoodAddress     = !MRESET & !MASTB~ & BRDSEL & (Addr < 8) ;

        RESET~          istype 'neg';   "see if eliminates glitches"


equations
        !RESET~          = MRESET;
        !BUSDIR         = GoodAddress & !MRD~ ;
```

```
        RDCLK           = GoodAddress & !MRD~ ;
        RWctl0          = GoodAddress & !MRD~ &  MWR~ ;
        RWctl1          = GoodAddress &  MRD~ & !MWR~ ;
        !RWctl2         = GoodAddress &  MRD~ & !MWR~ ;
        SEL_IN~         = FDBK_CTL~ ;
        SEL_FBK~        = !FDBK_CTL~;


test_vectors "Address Selection"
        ([Addr, MRESET, MASTB~, BRDSEL, MRD~, MWR~] -> [RWctl0, RWctl1, RWctl2])
          [ X  ,  H   ,   X   ,   X   ,  X  ,  X ] -> [  L  ,   L  ,   H ];
          [ 7  ,  L   ,   L   ,   H   ,  L  ,  H ] -> [  H  ,   L  ,   H ];
          [ 7  ,  L   ,   L   ,   H   ,  H  ,  L ] -> [  L  ,   H  ,   L ];
          [ 4  ,  L   ,   L   ,   H   ,  L  ,  H ] -> [  H  ,   L  ,   H ];
          [ 4  ,  L   ,   L   ,   H   ,  X  ,  X ] -> [  L  ,   L  ,   H ];
          [ 8  ,  L   ,   L   ,   H   ,  H  ,  L ] -> [  L  ,   L  ,   H ];



end     RT4_AddCtl

" This set of PALs perform multiplication of the 12-bit input value
"  by 1, -1, and 0. The table below illustrates this process:
" A 12-bit unsigned input number is therefore converted to a 13-bit
" signed 2's complement quantity, or zero, as the case may be

"INPUT   OUTPUT          CONTROL BITS
"                   ZERO   SELPLUS   SELMIN
"  A        A         0       1        0
"  A       -A         0       0        1
"  A        0         1      ---      ---

MODULE  RT4_plusminz0
flag    '-r3'
TITLE   'RT4 - Plus_Minus_Zero Coefficient
                        Jose R. Alvarez, Accom Inc.
                        7/91
                        Version A
'

pluminz0        device  'P22V10';
        CLOCK   pin 1;
        X8, X7, X6, X5, X4, X3, X2, X1, X0        pin 10, 9, 8, 7, 6, 5, 4, 3, 2;
        Y8, Y7, Y6, Y5, Y4, Y3, Y2, Y1, Y0        pin 15, 16, 17, 18, 19, 20, 21, 22, 23;
        SELPLUS pin 13;
        SELMIN  pin 14;
        ZERO    pin 11;

        True, False             = 1,0;
        High, Low               = 1,0;
        H,L,Q,X,Z               = 1,0,.C.,.X.,.Z.;

        XIn             = [X8, X7, X6, X5, X4, X3, X2, X1, X0];
        YOut    = [Y8, Y7, Y6, Y5, Y4, Y3, Y2, Y1, Y0];

equations
        Y0      = ! ZERO & X0;
        Y1      = ! ZERO & ((SELPLUS & X1) # (SELMIN & (! X0 $ ! X1)));
        Y2      = ! ZERO & ((SELPLUS & X2) # (SELMIN & ((! X0 & ! X1) $ ! X2)));
        Y3      = ! ZERO & ((SELPLUS & X3) # (SELMIN & ((! X0 & ! X1 & ! X2) $ ! X3)));
        Y4      = ! ZERO & ((SELPLUS & X4) # (SELMIN & ((! X0 & ! X1 & ! X2 & ! X3) $ ! X4)));
        Y5      = ! ZERO & ((SELPLUS & X5) # (SELMIN & ((! X0 & ! X1 & ! X2 & ! X3 & ! X4) $ !
X5)));
        Y6      = ! ZERO & ((SELPLUS & X6) # (SELMIN & ((! X0 & ! X1 & ! X2 & ! X3 & ! X4 & ! X5)
$ ! X6)));
        Y7      = ! ZERO & ((SELPLUS & X7) # (SELMIN & ((! X0 & ! X1 & ! X2 & ! X3 & ! X4 & ! X5
& ! X6) $ ! X7)));
        Y8      = ! ZERO & ((SELPLUS & X8) # (SELMIN & ((! X0 & ! X1 & ! X2 & ! X3 & ! X4 & ! X5
& ! X6 & ! X7) $ ! X8)));

test_vectors
        ([XIn, SELPLUS, SELMIN, ZERO]     ->      [YOut])
         [X,           X,               X,              H]      ->      [^h000];
         [^h000,       H,               L,              L]      ->      [^h000];
```

```
        [^h001,         H,              L,              L]      ->      [^h001];
        [^h100,         H,              L,              L]      ->      [^h100];
        [^h0FF,         H,              L,              L]      ->      [^h0FF];
        [^h1FF,         H,              L,              L]      ->      [^h1FF];
        [^h000,         L,              H,              L]      ->      [^h000];
        [^h001,         L,              H,              L]      ->      [^h1FF];
        [^h100,         L,              H,              L]      ->      [^h100];
        [^h0FF,         L,              H,              L]      ->      [^h101];
        [^h1FF,         L,              H,              L]      ->      [^h001];

end RT4_plusminz0


MODULE  RT4_plusminz1
flag    '-r2'
TITLE   'RT4 - Plus_Minus_Zero Coefficient
                        Jose R. Alvarez, Accom Inc.
                        7/91
                        Version A
'

pluminz1        device  'P22V10';
        CLOCK   pin 1;
        X8, X7, X6, X5, X4, X3, X2, X1, X0      pin 10, 9, 8, 7, 6, 5, 4, 3, 2;
        X11, X10, X9                                    pin 15, 16, 17;
        Y12, Y11, Y10, Y9                               pin 18, 19, 20, 21;
        SELPLUS pin 13;
        SELMIN  pin 14;
        ZERO    pin 11;

        True, False             = 1,0;
        High, Low               = 1,0;
        H,L,Q,X,Z               = 1,0,.C.,.X.,.Z.;

        XIn             = [X11, X10, X9, X8, X7, X6, X5, X4, X3, X2, X1, X0];
        YOut    = [Y12, Y11, Y10, Y9];

equations
        Y9 = ! ZERO & ((SELPLUS & X9) # (SELMIN & ((! X0 & ! X1 & ! X2 & ! X3 & ! X4 & ! X5 & !
X6 & ! X7 & ! X8) $ ! X9)));
        Y10=! ZERO &((SELPLUS & X10)#(SELMIN&((! X0 & ! X1 & ! X2 & ! X3 & ! X4 & ! X5 & ! X6 &
! X7 & ! X8 & ! X9) $ ! X10)));
        Y11=!ZERO &((SELPLUS & X11)#(SELMIN &((!X0 & !X1 & !X2 & !X3 & !X4 & !X5 & !X6 & !X7 &
!X8 & !X9 & !X10)$ !X11)));
        Y12=!ZERO &((SELPLUS & 0)#(SELMIN & !(!X0 & !X1 & !X2 & !X3 & !X4 & !X5 & !X6 & !X7 & !X8
& !X9 & !X10 & !X11)));

test_vectors
        ([XIn, SELPLUS, SELMIN, ZERO]   ->      [YOut])
        [X,             X,              X,              H]      ->      [^h0];
        [^h000,         H,              L,              L]      ->      [^h0];
        [^h001,         H,              L,              L]      ->      [^h0];
        [^h7FF,         H,              L,              L]      ->      [^h3];
        [^h800,         H,              L,              L]      ->      [^h4];
        [^hFFF,         H,              L,              L]      ->      [^h7];
        [^h000,         L,              H,              L]      ->      [^h0];
        [^h001,         L,              H,              L]      ->      [^hF];
        [^h0FF,         L,              H,              L]      ->      [^hF];
        [^h800,         L,              H,              L]      ->      [^hC];
        [^h7FF,         L,              H,              L]      ->      [^hC];
        [^hFFF,         L,              H,              L]      ->      [^h8];

end RT4_plusminz1


MODULE  RT4_YOut
flag    '-r3'
TITLE   'RT4 - Y Output PAL -> Performs 10 to 8 rounding and blanking
                Jose R. Alvarez, Accom Inc.
                8/91
                Version A
'

YOut device 'P22V10';
```

```
        X9, X8, X7, X6, X5, X4, X3, X2, X1, X0          pin 10, 9, 8, 7, 6, 5, 4, 3, 2, 1;
        R                         pin 11;
        B                         pin 13;
        Y9, Y8, Y7, Y6, Y5, Y4, Y3, Y2, Y1, Y0          pin 18, 19, 17, 20, 16, 21, 15, 22, 14,
23;

        True, False     = 1,0;
        High, Low       = 1,0;
        H,L,Q,X,Z       = 1,0,.C.,.X.,.Z.;

"       X is in positive binary form"
        XInput          = [X9, X8, X7, X6, X5, X4, X3, X2, X1, X0];
        YOutput         = [Y9, Y8, Y7, Y6, Y5, Y4, Y3, Y2, Y1, Y0];

"       ------------------------
"       Rounding to Upper 8 bits
"
"       R --> ROUND
"       B --> BLANK
"       ------------------------

        CB      = X1;

        Q0      = !R & X0;
        Q1      = !R & X1;
        Q2      = !R & X2 # R & (X2 $ CB);
        Q3      = !R & X3 # R & (X3 $ (X2 & CB));
        Q4      = !R & X4 # R & (X4 $ (X3 & X2 & CB));
        Q5      = !R & X5 # R & (X5 $ (X4 & X3 & X2 & CB));
        Q6      = !R & X6 # R & (X6 $ (X5 & X4 & X3 & X2 & CB));
        Q7      = !R & X7 # R & (X7 $ (X6 & X5 & X4 & X3 & X2 & CB));
        Q8      = !R & X8 # R & (X8 $ (X7 & X6 & X5 & X4 & X3 & X2 & CB));
        Q9      = !R & X9 # R & (X9 $ (X8 & X7 & X6 & X5 & X4 & X3 & X2 & CB));

EQUATIONS

"       D1 Clipping did not fit here, but the simplest
"       equations are listed below for future
"       reference:
"
"       Qup     = [Q9, Q8, Q7, Q6, Q5, Q4, Q3, Q2];
"       QH      = (Qup == ^hFF);
"       QL      = (Qup == ^h00);
"
"       Y0      = !B & Q0 & !QL ;
"       Y1      = !B & ((Q1 & !QL) # QH);
"       Y2      = !B & ((Q2 & !QH) # QL);


        Y0      = !B & Q0 ;
        Y1      = !B & Q1 ;
        Y2      = !B & Q2 ;
        Y3      = !B & Q3 ;
        Y4      = !B & Q4 ;
        Y5      = !B & Q5 ;
        Y6      = B # (!B & Q6) ; "Alright, the black level 16 or 64 stays"
        Y7      = !B & Q7 ;
        Y8      = !B & Q8 ;
        Y9      = !B & Q9 ;

test_vectors
        ([XInput,       R,      B]      ->      [YOutput])

         [X,            X,      H]      ->      [^h040];        "blank"
         [^h120,        H,      L]      ->      [^h120];        "round"
         [^h121,        H,      L]      ->      [^h120];        "round"
         [^h122,        H,      L]      ->      [^h124];        "round"
         [^h123,        H,      L]      ->      [^h124];        "round"
         [^h11C,        H,      L]      ->      [^h11C];
         [^h11D,        H,      L]      ->      [^h11C];
         [^h11E,        H,      L]      ->      [^h120];
         [^h11F,        H,      L]      ->      [^h120];
```

```
        [^h005,       L,      L]      ->      [^h005];        "normal"
        [^h006,       L,      L]      ->      [^h006];        "normal"
        [^h3F9,       L,      L]      ->      [^h3F9];        "normal"
        [^h3FA,       L,      L]      ->      [^h3FA];        "normal"

end     RT4_YOut
MODULE  FDRND1
flag    '-r3'
TITLE   'RT4 - Frame Difference Rounding 14 to 12 bits
               Jose R. Alvarez, Accom Inc.
               8/91
               Version A
'

FDRnd1 device 'P22V10';

"Input Signals
        CLK                             pin 1;
        b0, b1, b2, b3, b4 ,b5, b6, b7  pin 2, 3, 4, 5, 6, 7, 8, 10;
        OVFL                            pin 9;
        CTL0, CTL1                      pin 11, 13;

"Output Signals
        Cout                            pin 19;
        FD0, FD1, FD2, FD3, FD4, FD5    pin 23, 22, 21, 20, 18, 17;

        True, False     = 1,0;
        High, Low       = 1,0;
        H,L,Q,X,Z       = 1,0,.C.,.X.,.Z.;

"Two lower bits are below the binary point
        FPin     = [b7,  b6,  b5,  b4,  b3,  b2,  b1];
        FDout    = [FD5, FD4, FD3, FD2, FD1, FD0];
        CB       =  b1;

        Q0       = (b2  $ CB);
        Q1       = (b3  $ (b2 & CB));
        Q2       = (b4  $ (b3 & b2 & CB));
        Q3       = (b5  $ (b4 & b3 & b2 & CB));
        Q4       = (b6  $ (b5 & b4 & b3 & b2 & CB));
        Q5       = (b7  $ (b6 & b5 & b4 & b3 & b2 & CB));


EQUATIONS

        FD0      := Q0 ;
        FD1      := Q1 ;
        FD2      := Q2 ;
        FD3      := Q3 ;
        FD4      := Q4 ;
        FD5      := Q5 ;

        Cout     :=  b7 & b6 & b5 & b4 & b3 & b2 & CB;

test_vectors
        ([CLK, FPin] -> [FDout, Cout])
         [ Q , ^h00] -> [^h00 ,  L  ];
         [ Q , ^h01] -> [^h01 ,  L  ];
         [ Q , ^h02] -> [^h01 ,  L  ];
         [ Q , ^h3F] -> [^h20 ,  L  ];
         [ Q , ^h7E] -> [^h3F ,  L  ];
         [ Q , ^h7F] -> [^h00 ,  H  ];


end     FDRND1


MODULE  FDRND2
flag    '-r3'
TITLE   'RT4 - Frame Difference Rounding 14 to 12 bits
               Jose R. Alvarez, Accom Inc.
               8/91
               Version A
```

```
'
FDRnd2 device 'P22V10';

"Input Signals
        CLK                             pin 1;
        Cin                             pin 2;
        b7,b8,b9,b10,b11,b12,b13,b14    pin 3, 4, 5, 6, 7, 8, 9, 10;
        CTL0, CTL1                      pin 11, 13;

"Output Signals
        WRDADJ                          pin 16;
        OVFL                            pin 17;
        FD6,FD7,FD8,FD9,FD10,FD11       pin 23, 22, 21, 20, 19, 18;

        True, False     = 1,0;
        High, Low       = 1,0;
        H,L,Q,X,Z       = 1,0,.C.,.X.,.Z.;

"Two lower bits are below the binary point
        FPin    = [b14, b13, b12, b11, b10, b9, b8, Cin];
        FDout   = [     FD11,FD10,FD9, FD8, FD7,FD6     ];


        Q6      = (b8   $ Cin);
        Q7      = (b9   $ (b8  & Cin));
        Q8      = (b10  $ (b9  & b9  & Cin));
        Q9      = (b11  $ (b10 & b9  & b8  & Cin));
        Q10     = (b12  $ (b11 & b10 & b9  & b8  & Cin));
        Q11     = (b13  $ (b12 & b11 & b10 & b9  & b8  & Cin));
        Q12     = (b14  $ (b13 & b12 & b11 & b10 & b9  & b8 & Cin));


EQUATIONS

        FD6     := Q6  ;
        FD7     := Q7  ;
        FD8     := Q8  ;
        FD9     := Q9  ;
        FD10    := Q10 ;
        FD11    := Q11 ;

        OVFL    := (b14 != b13) # (!CTL0 & OVFL); "CLT0 = H resets OVFL
                                                   " Notice the difference if
                                                   " Q12 and Q11 are used.


test_vectors
        ([CLK, FPin, CTL0] -> [FDout, OVFL])
         [ Q , ^h00,   L ] -> [^h00 ,   L ];
         [ Q , ^h01,   L ] -> [^h01 ,   L ];
         [ Q , ^h02,   L ] -> [^h01 ,   L ];
         [ Q , ^h03,   L ] -> [^h02 ,   L ];
         [ Q , ^hFF,   L ] -> [^h00 ,   L ]; "Correct if 2's complement
         [ Q , ^hFE,   L ] -> [^h3F ,   L ];
         [ Q , ^h7E,   L ] -> [^h3F ,   H ]; "OVFL needs to be reset from here
         [ Q , ^h7E,   H ] -> [^h3F ,   H ]; "It will not reset if OVFL
         [ Q , ^h3F,   H ] -> [^h20 ,   L ]; "Reset when no conflict

end     FDRND2
MODULE  RT4_COut
flag    '-r3'
TITLE   'RT4 - C Output PAL -> Performs 10 to 8 rounding and blanking
                Jose R. Alvarez, Accom Inc.
                8/91
                Version A
'

COut device 'P22V10';
        X9, X8, X7, X6, X5, X4, X3, X2, X1, X0    pin 10, 9, 8, 7, 6, 5, 4, 3, 2, 1;
        R                                                             pin 11;
        B                                                             pin 13;
        C9, C8, C7, C6, C5, C4, C3, C2, C1, C0    pin 18,19,17,20,16,21,15,22,14,23;

        True, False     = 1,0;
```

```
        High, Low       = 1,0;
        H,L,Q,X,Z       = 1,0,.C.,.X.,.Z.;

"       X is in positive complement binary form"
"   in case of chrominance, the signal zero
"   level is offset to midrange
        XInput          = [X9, X8, X7, X6, X5, X4, X3, X2, X1, X0];
        COutput         = [C9, C8, C7, C6, C5, C4, C3, C2, C1, C0];


"       -----------------------
"       Rounding to Upper 8 bits
"
"       R --> ROUND
"       B --> BLANK
"       -----------------------

        CB      = X1;
        Q0      = !R & X0;
        Q1      = !R & X1;
        Q2      = !R & X2 # R & (X2 $ CB);
        Q3      = !R & X3 # R & (X3 $ (X2 & CB));
        Q4      = !R & X4 # R & (X4 $ (X3 & X2 & CB));
        Q5      = !R & X5 # R & (X5 $ (X4 & X3 & X2 & CB));
        Q6      = !R & X6 # R & (X6 $ (X5 & X4 & X3 & X2 & CB));
        Q7      = !R & X7 # R & (X7 $ (X6 & X5 & X4 & X3 & X2 & CB));
        Q8      = !R & X8 # R & (X8 $ (X7 & X6 & X5 & X4 & X3 & X2 & CB));
        Q9      = !R & X9 # R & (X9 $ (X8 & X7 & X6 & X5 & X4 & X3 & X2 & CB));

EQUATIONS

        C0      = !B & Q0 ;
        C1      = !B & Q1 ;
        C2      = !B & Q2 ;
        C3      = !B & Q3 ;
        C4      = !B & Q4 ;
        C5      = !B & Q5 ;
        C6      = B # (!B & Q6) ; "Alright, the black level 16 or 64 stays"
        C7      = !B & Q7 ;
        C8      = !B & Q8 ;
        C9      = !B & Q9 ;


test_vectors
        ([XInput,       R,      B]      ->      [COutput])

         [ X,           X,      H]      ->      [^h040];        "blank"
         [^h120,        H,      L]      ->      [^h120];        "round"
         [^h121,        H,      L]      ->      [^h120];        "round"
         [^h122,        H,      L]      ->      [^h124];        "round"
         [^h123,        H,      L]      ->      [^h124];        "round"
         [^h11C,        H,      L]      ->      [^h11C];
         [^h11D,        H,      L]      ->      [^h11C];
         [^h11E,        H,      L]      ->      [^h120];
         [^h11F,        H,      L]      ->      [^h120];
         [^h005,        L,      L]      ->      [^h005];        "normal"
         [^h006,        L,      L]      ->      [^h006];        "normal"
         [^h3F9,        L,      L]      ->      [^h3F9];        "normal"
         [^h3FA,        L,      L]      ->      [^h3FA];        "normal"


end     RT4_COut
MODULE  RT4_YClipout
flag    '-r3'
TITLE   'RT4 - Y (RP-125)(CCIR 601) Output Clipping PAL
                Jose R. Alvarez, Accom Inc.
                8/91
                Version A
'

YClip device 'P22V10';

"Input Signals -- notice bit swapping
        CLOCK                                           pin  1;
```

```
        X9, X8, X7, X6, X5, X4, X3, X2, X1, X0    pin  7,  6,  8,  5,  9,  4, 10,  3, 11,  2;

"Output Signals
        Y9, Y8, Y7, Y6, Y5, Y4, Y3, Y2, Y1, Y0    pin 14, 15, 16, 17, 18, 19, 20, 21, 22, 23;


"Definitions
        True, False       = 1,0;
        High, Low         = 1,0;
        H,L,Q,X,Z         = 1,0,.C.,.X.,.Z.;
"       X is in positive binary form"
        XInput            = [X9, X8, X7, X6, X5, X4, X3, X2, X1, X0];
        YOutput           = [Y9, Y8, Y7, Y6, Y5, Y4, Y3, Y2, Y1, Y0];

"       ======================================
"       Clip to 601 levels 235 and 16 in  8-bits (220 levels)
"                  and   940 and 64 in 10-bits (877 levels)
"       ======================================

        Top     = (XInput > 940);
        Bottom  = (XInput <  64);

        Q0      = (X0 & !Bottom) & !Top;
        Q1      = (X1 & !Bottom) & !Top;
        Q2      = (X2 & !Bottom) #  Top;
        Q3      = (X3 & !Bottom) #  Top;
        Q4      = (X4 & !Bottom) & !Top;
        Q5      = (X5 & !Bottom) #  Top;
        Q6      = (X6 #  Bottom) & !Top;
        Q7      = (X7 & !Bottom) #  Top;
        Q8      = (X8 & !Bottom) #  Top;
        Q9      = (X9 & !Bottom) #  Top;


EQUATIONS

        Y0      := Q0 ;
        Y1      := Q1 ;
        Y2      := Q2 ;
        Y3      := Q3 ;
        Y4      := Q4 ;
        Y5      := Q5 ;
        Y6      := Q6 ;
        Y7      := Q7 ;
        Y8      := Q8 ;
        Y9      := Q9 ;


test_vectors
        ([XInput, CLOCK]       ->      [YOutput])

         [    0 ,    Q  ]      ->     [   64  ];
         [   63 ,    Q  ]      ->     [   64  ];
         [   64 ,    Q  ]      ->     [   64  ];
         [   65 ,    Q  ]      ->     [   65  ];
         [  128 ,    Q  ]      ->     [  128  ];
         [  511 ,    Q  ]      ->     [  511  ];
         [  512 ,    Q  ]      ->     [  512  ];
         [  939 ,    Q  ]      ->     [  939  ];
         [  940 ,    Q  ]      ->     [  940  ];
         [  941 ,    Q  ]      ->     [  940  ];
         [ 1023 ,    Q  ]      ->     [  940  ];


end     RT4_YClipout


MODULE  RT4_CClipout
flag    '-r3'
TITLE   'RT4 - C (RP-125)(CCIR 601) Output Clipping PAL
                Jose R. Alvarez, Accom Inc.
                8/91
                Version A
'
```

```
CClip device 'P22V10';

"Input Signals -- notice bit swapping
        CLOCK                                    pin  1;
        X9, X8, X7, X6, X5, X4, X3, X2, X1, X0   pin  7,  6,  8,  5,  9,  4, 10,  3, 11,  2;

"Output Signals
        Y9, Y8, Y7, Y6, Y5, Y4, Y3, Y2, Y1, Y0   pin 14, 15, 16, 17, 18, 19, 20, 21, 22, 23;


"Definitions
        True, False     = 1,0;
        High, Low       = 1,0;
        H,L,Q,X,Z       = 1,0,.C.,.X.,.Z.;

"       X is in shifted bipolar binary form"
        XInput          = [X9, X8, X7, X6, X5, X4, X3, X2, X1, X0];
        YOutput         = [Y9, Y8, Y7, Y6, Y5, Y4, Y3, Y2, Y1, Y0];


"       ========================================
"       Clip to 601 levels 240 and 16 in  8-bits (225 levels)
"                     and   960 and 64 in 10-bits (897 levels)
"       ========================================
"         Chrominance signal is symmetrically
"         distributed around level 128 or 512
"         as the case may be for 8 or 10 bits
"       ========================================

        Top     = (XInput > 960);
        Bottom  = (XInput <  64);

        Q0      = (X0 & !Bottom) & !Top;
        Q1      = (X1 & !Bottom) & !Top;
        Q2      = (X2 & !Bottom) & !Top;
        Q3      = (X3 & !Bottom) & !Top;
        Q4      = (X4 & !Bottom) & !Top;
        Q5      = (X5 & !Bottom) & !Top;
        Q6      = (X6 #  Bottom) #  Top;
        Q7      = (X7 & !Bottom) #  Top;
        Q8      = (X8 & !Bottom) #  Top;
        Q9      = (X9 & !Bottom) #  Top;


EQUATIONS

        Y0      := Q0 ;
        Y1      := Q1 ;
        Y2      := Q2 ;
        Y3      := Q3 ;
        Y4      := Q4 ;
        Y5      := Q5 ;
        Y6      := Q6 ;
        Y7      := Q7 ;
        Y8      := Q8 ;
        Y9      := Q9 ;


test_vectors
        ([XInput, CLOCK]        ->       [YOutput])

         [    0 ,   Q  ]        ->     [   64  ];
         [   63 ,   Q  ]        ->     [   64  ];
         [   64 ,   Q  ]        ->     [   64  ];
         [   65 ,   Q  ]        ->     [   65  ];
         [  128 ,   Q  ]        ->     [  128  ];
         [  511 ,   Q  ]        ->     [  511  ];
         [  512 ,   Q  ]        ->     [  512  ];
         [  939 ,   Q  ]        ->     [  939  ];
         [  940 ,   Q  ]        ->     [  940  ];
         [  941 ,   Q  ]        ->     [  941  ];
         [  959 ,   Q  ]        ->     [  959  ];
         [  960 ,   Q  ]        ->     [  960  ];
         [  999 ,   Q  ]        ->     [  960  ];
         [ 1023 ,   Q  ]        ->     [  960  ];
```

```
end     RT4_CClipout
MODULE  AIFRND_Y1
flag    '-r3'
TITLE   'RT4 - Adaptive Interpolative Rounding 15 to 12 bits
          Luminance signal path
           Jose R. Alvarez, Accom Inc.
           8/91
           Version A
'

AIFrndY1 device 'P22V10';

"Input Signals
        CLK                             pin 1;
        b0, b1, b2, b3, b4 ,b5, b6, b7  pin 2, 3, 4, 5, 6, 7, 8, 10;
        OVFL                            pin 9;

"Output Signals
        Cout                            pin 18;
        YF0, YF1, YF2, YF3, YF4, YF5    pin 23, 22, 21, 20, 19, 17;

        True, False     = 1,0;
        High, Low       = 1,0;
        H,L,Q,X,Z       = 1,0,.C.,.X.,.Z.;

"Two lower bits are below the binary point
        YFin    = [b7,  b6,  b5,  b4,  b3,  b2,  b1];
        YFout   = [YF5, YF4, YF3, YF2, YF1, YF0];

        CB      =  b1;

        Q0      = (b2  $ CB);
        Q1      = (b3  $ (b2 & CB));
        Q2      = (b4  $ (b3 & b2 & CB));
        Q3      = (b5  $ (b4 & b3 & b2 & CB));
        Q4      = (b6  $ (b5 & b4 & b3 & b2 & CB));
        Q5      = (b7  $ (b6 & b5 & b4 & b3 & b2 & CB));


EQUATIONS

        YF0     := Q0 ;
        YF1     := Q1 ;
        YF2     := Q2 ;
        YF3     := Q3 ;
        YF4     := Q4 ;
        YF5     := Q5 ;

        Cout    :=  b7 & b6 & b5 & b4 & b3 & b2 & CB;

test_vectors
        ([CLK, YFin] -> [YFout, Cout])
         [ Q , ^h00] -> [^h00 ,  L  ];
         [ Q , ^h01] -> [^h01 ,  L  ];
         [ Q , ^h02] -> [^h01 ,  L  ];
         [ Q , ^h3F] -> [^h20 ,  L  ];
         [ Q , ^h7E] -> [^h3F ,  L  ];
         [ Q , ^h7F] -> [^h00 ,  H  ];


end     AIFRND_Y1


MODULE  AIFRND_Y2
flag    '-r3'
TITLE   'RT4 - Adaptive Interpolative Rounding 15 to 12 bits
          Luminance signal path
           Jose R. Alvarez, Accom Inc.
           8/91
           Version A
'

AIFrndY2 device 'P22V10';
```

```
"Input Signals
        CLK                           pin 1;
        Cin                           pin 2;
        b7,b8,b9,b10,b11,b12,b13,b14  pin 3, 4, 5, 6, 7, 8, 9, 10;

"Output Signals
        OVFL                          pin 17;
        YF6,YF7,YF8,YF9,YF10,YF11     pin 23, 22, 21, 20, 19, 18;

        True, False     = 1,0;
        High, Low       = 1,0;
        H,L,Q,X,Z       = 1,0,.C.,.X.,.Z.;

"Two lower bits are below the binary point
        YFin    = [b14, b13, b12, b11, b10, b9, b8, Cin];
        YFout   = [     YF11,YF10,YF9, YF8,YF7,YF6    ];


        Q6      = (b8   $ Cin);
        Q7      = (b9   $ (b8  & Cin));
        Q8      = (b10  $ (b9  & b9  & Cin));
        Q9      = (b11  $ (b10 & b9  & b8  & Cin));
        Q10     = (b12  $ (b11 & b10 & b9  & b8  & Cin));
        Q11     = (b13  $ (b12 & b11 & b10 & b9  & b8  & Cin));
        Q12     = (b14  $ (b13 & b12 & b11 & b10 & b9  & b8 & Cin));


EQUATIONS

        YF6     := Q6  ;
        YF7     := Q7  ;
        YF8     := Q8  ;
        YF9     := Q9  ;
        YF10    := Q10 ;
        YF11    := Q11 ;

        OVFL    := (b14 != b13);


test_vectors
        ([CLK, YFin] -> [YFout, OVFL])
         [ Q , ^h00] -> [^h00 ,   L ];
         [ Q , ^h01] -> [^h01 ,   L ];
         [ Q , ^h02] -> [^h01 ,   L ];
         [ Q , ^h03] -> [^h02 ,   L ];
         [ Q , ^hFF] -> [^h00 ,   L ]; "Correct if 2's complement
         [ Q , ^hFE] -> [^h3F ,   L ];
         [ Q , ^hBF] -> [^h20 ,   H ];
         [ Q , ^hBE] -> [^h1F ,   H ];
         [ Q , ^h7F] -> [^h00 ,   H ];
         [ Q , ^h7E] -> [^h3F ,   H ];

end     AIFRND_Y2
MODULE  AIFRND10_Y
flag    '-r3'
TITLE   'RT4 - Luminance Rounding 12 to 10 bits.
                Performs clipping at top of range

                 Jose R. Alvarez, Accom Inc.
                 8/91
                 Version A
'

Frnd10Y device 'P22V10';

"Input Signals
        X11, X10, X9, X8, X7, X6 pin 13, 11, 10, 9, 8, 7;
        X5, X4, X3, X2, X1, X0          pin 6, 5, 4, 3, 2, 1;

"Output Signals
        Y9, Y8, Y7, Y6, Y5              pin 18, 19, 17, 20, 16;
        Y4, Y3, Y2, Y1, Y0              pin 21, 15, 22, 14, 23;

        True, False     = 1,0;
        High, Low       = 1,0;
```

```
        H,L,Q,X,Z          = 1,0,.C.,.X.,.Z.;

"       X is in positive binary form"
        XInput             = [X11,X10,X9,X8, X7,X6,X5,X4, X3,X2,X1,X0];
        YOutput            = [ Y9,Y8, Y7,Y6,Y5,Y4, Y3,Y2,Y1,Y0];


        CB      = X1;

        Q0      = (X2  $ CB);
        Q1      = (X3  $ (X2  & CB));
        Q2      = (X4  $ (X3  & X2 & CB));
        Q3      = (X5  $ (X4  & X3 & X2 & CB));
        Q4      = (X6  $ (X5  & X4 & X3 & X2 & CB));
        Q5      = (X7  $ (X6  & X5 & X4 & X3 & X2 & CB));
        Q6      = (X8  $ (X7  & X6 & X5 & X4 & X3 & X2 & CB));
        Q7      = (X9  $ (X8  & X7 & X6 & X5 & X4 & X3 & X2 & CB));
        Q8      = (X10 $ (X9  & X8 & X7 & X6 & X5 & X4 & X3 & X2 & CB));
        Q9      = (X11 $ (X10 & X9 & X8 & X7 & X6 & X5 & X4 & X3 & X2 & CB));

        TOP     = (XInput >= ^hFFE) & (XInput <= ^hFFF);

EQUATIONS

"       D1 Clipping did not fit here, but the simplest
"       equations are listed below for future
"       reference:
"
"       Qup     = [Q9, Q8, Q7, Q6, Q5, Q4, Q3, Q2];
"       QH      = (Qup == ^hFF);
"       QL      = (Qup == ^h00);
"
"       Y0      = !B & Q0 & !QL ;
"       Y1      = !B & ((Q1 & !QL) # QH);
"       Y2      = !B & ((Q2 & !QH) # QL);
"

        Y0      = Q0 # TOP;
        Y1      = Q1 # TOP;
        Y2      = Q2 # TOP;
        Y3      = Q3 # TOP;
        Y4      = Q4 # TOP;
        Y5      = Q5 # TOP;
        Y6      = Q6 # TOP;
        Y7      = Q7 # TOP;
        Y8      = Q8 # TOP;
        Y9      = Q9 # TOP;


test_vectors
        ([XInput]        ->       [YOutput])
         [^h000 ]        ->       [^h000  ];       "normal
         [^h003 ]        ->       [^h001  ];       "round
         [^h004 ]        ->       [^h001  ];       "normal
         [^h005 ]        ->       [^h001  ];       "normal
         [^h006 ]        ->       [^h002  ];       "round
         [^hFFC ]        ->       [^h3FF  ];       "normal
         [^hFFD ]        ->       [^h3FF  ];       "normal
         [^hFFE ]        ->       [^h3FF  ];       "round - clip @ top
         [^hFFF ]        ->       [^h3FF  ];       "round - clip @ top

end     AIFRND10_Y


"*************************************************************************
"*************************************************************************
"*************************************************************************


MODULE  AIFRND10_C
```

```
flag    '-r3'
TITLE   'RT4 - Chrominance Rounding 12 to 10 bits.
              Performs clipping at top of range

               Jose R. Alvarez, Accom Inc.
               8/91
               Version A
'

Frnd10C device 'P22V10';

"Input Signals
        X11, X10, X9, X8, X7, X6 pin 13, 11, 10, 9, 8, 7;
        X5, X4, X3, X2, X1, X0          pin 6, 5, 4, 3, 2, 1;

"Output Signals
        C9, C8, C7, C6, C5              pin 18, 19, 17, 20, 16;
        C4, C3, C2, C1, C0              pin 21, 15, 22, 14, 23;

        True, False     = 1,0;
        High, Low       = 1,0;
        H,L,Q,X,Z       = 1,0,.C.,.X.,.Z.;

"       X is in positive binary form"
        XInput          = [X11,X10,X9,X8, X7,X6,X5,X4, X3,X2,X1,X0];
        COutput         = [ C9,C8, C7,C6,C5,C4,  C3,C2,C1,C0];


        CB      = X1;

        Q0      = (X2  $ CB);
        Q1      = (X3  $ (X2  & CB));
        Q2      = (X4  $ (X3  & X2 & CB));
        Q3      = (X5  $ (X4  & X3 & X2 & CB));
        Q4      = (X6  $ (X5  & X4 & X3 & X2 & CB));
        Q5      = (X7  $ (X6  & X5 & X4 & X3 & X2 & CB));
        Q6      = (X8  $ (X7  & X6 & X5 & X4 & X3 & X2 & CB));
        Q7      = (X9  $ (X8  & X7 & X6 & X5 & X4 & X3 & X2 & CB));
        Q8      = (X10 $ (X9  & X8 & X7 & X6 & X5 & X4 & X3 & X2 & CB));
        Q9      = (X11 $ (X10 & X9 & X8 & X7 & X6 & X5 & X4 & X3 & X2 & CB));

        TOP     = (XInput >= ^h7FE) & (XInput <= ^h7FF);

EQUATIONS

"       D1 Clipping did not fit here, but the simplest
"       equations are listed below for future
"       reference:
"
"       Qup     = [Q9, Q8, Q7, Q6, Q5, Q4, Q3, Q2];
"       QH      = (Qup == ^hFF);
"       QL      = (Qup == ^h00);
"
"       C0      = !B & Q0 & !QL ;
"       C1      = !B & ((Q1 & !QL) # QH);
"       C2      = !B & ((Q2 & !QH) # QL);
"

        C0      = Q0 # TOP;
        C1      = Q1 # TOP;
        C2      = Q2 # TOP;
        C3      = Q3 # TOP;
        C4      = Q4 # TOP;
        C5      = Q5 # TOP;
        C6      = Q6 # TOP;
        C7      = Q7 # TOP;
        C8      = Q8 # TOP;
        C9      = Q9 & !TOP;


test_vectors
        ([XInput]       ->      [COutput])
         [^h000 ]       ->      [^h000  ];      "normal
         [^h003 ]       ->      [^h001  ];      "round
         [^h004 ]       ->      [^h001  ];      "normal
```

```
        [^h005 ]        ->      [^h001  ];      "normal
        [^h006 ]        ->      [^h002  ];      "round
        [^h7FC ]        ->      [^h1FF  ];      "normal
        [^h7FD ]        ->      [^h1FF  ];      "normal
        [^h7FE ]        ->      [^h1FF  ];      "clip
        [^h7FF ]        ->      [^h1FF  ];      "clip
        [^hFFC ]        ->      [^h3FF  ];      "normal
        [^hFFD ]        ->      [^h3FF  ];      "normal
        [^hFFE ]        ->      [^h000  ];      "round
        [^hFFF ]        ->      [^h000  ];      "round

end     AIFRND10_C
MODULE  RT4_IFSCTL
flag    '-r3'
TITLE   'RT4  - Input Frame Store Control PAL
                Jose Alvarez, Accom Inc.
                10/91
                Version A
'

IFSctl1 device 'P22V10';

"Input Signals
        CLK                     pin 1;
        Rdly0                   pin 2;
        Rdly1                   pin 3;
        RDena                   pin 4;  "H-width enable for reset
        WRena                   pin 5;  "H-width enable for reset
        RstRD1                  pin 6;  "Pixel Delay: Feedback Mode
        RstWR1                  pin 7;  "Pixel Delay: Feedback Mode
        RstRD0                  pin 8;  "Pixel Delay: Forward Mode
        RstWR0                  pin 9;  "Pixel Delay: Forward Mode
        FDBK_CTL~               pin 10; "Forward/Feedback Mode
        Mode0                   pin 11; "Controls Read/Write
        Mode1                   pin 13; "Controls Read/Write
        F_IN                    pin 14; "H-width Frame pulse

"Output Signals
        F2_RDena                pin 23;
        F2_WRena                pin 22;
        F2_RstRD                pin 21;
        F2_RstWR                pin 20;
        F1_RDena                pin 19;
        F1_WRena                pin 18;
        F1_RstRD                pin 17;
        F1_RstWR                pin 16;

"Definitions
        True, False     = 1,0;
        High, Low       = 1,0;
        H,L,Q,X,Z       = 1,0,.C.,.X.,.Z.;

        WR1_RD2  = !Mode1 & !Mode0 ; "00
        WR2_RD1  = !Mode1 &  Mode0 ; "01
        READ1    =  Mode1 & !Mode0 ; "10
        READ2    =  Mode1 &  Mode0 ; "11

equations

        "Enables require field-based processor control
        F1_RDena := WR2_RD1 # READ1 ;
        F1_WRena := WR1_RD2 ;


        F2_RDena := WR1_RD2 # READ2 ;
        F2_WRena := WR2_RD1 ;


        F1_RstRD := (  RstRD0 & FDBK_CTL~
                     # RstRD1 & !FDBK_CTL~ ) & RDena ; "Active for 1-H line

        F1_RstWR := (  RstWR0 & FDBK_CTL~
```

```
            # RstWR1 & !FDBK_CTL~ ) & WRena ; "Active for 1-H line


    F2_RstRD := (  RstRD0 & FDBK_CTL~
                 # RstRD1 & !FDBK_CTL~ ) & RDena ;

    F2_RstWR := (  RstWR0 & FDBK_CTL~
                 # RstWR1 & !FDBK_CTL~ ) & WRena ;


"test_vectors


end     RT4_IFSCTL
MODULE  RT4_GMPCTL
flag    '-r3'
TITLE   'RT4  - Global Motion Processing Control PAL
                Jose Alvarez, Accom Inc.
                10/91
                Version A
'

GMPctl1 device 'P22V10';

"Input Signals
        CLK                     pin 1;
        OUT1_525                pin 2;
        Set0                    pin 3;
        Set1                    pin 4;
        F_IN                    pin 5;
        V                       pin 6;
        Horz                    pin 7;
        AccClr_H                pin 8;
        Acc_H                   pin 9;
        VBLANK                  pin 10;
        ACT_H                   pin 11;

"Output Signals
        AccClr~                 pin 23;
        AccClr                  pin 22;
        Acc~                    pin 21;
        Acc                     pin 20;
        ACT_H_V~                pin 19;
        ACT_H_V                 pin 18;
        ACT_HV~                 pin 17;
        ACT_HV                  pin 16;
        ACT_V~                  pin 15;
        ACT_V                   pin 14;


"Definitions
        True, False     = 1,0;
        High, Low       = 1,0;
        H,L,Q,X,Z       = 1,0,.C.,.X.,.Z.;


        " Set1 Set0
        " ---- ----
        "  L    L       Minimum Field Motion
        "  L    H       Sum of Minimum Line Motion
        "  H    X       Accumulate only by Line

equations

        ACT_V     :=  !(VBLANK) ;
        ACT_V~    :=    VBLANK  ;
        ACT_HV    :=  (!VBLANK & ACT_H);
        ACT_HV~   := !(!VBLANK & ACT_H);

        "Set0 LOW:  Use vertical statistics
        "---------------------------------
        ACT_H_V   :=  ((ACT_H & Set0) # (!VBLANK & !Set0)) ;
        ACT_H_V~  := !((ACT_H & Set0) # (!VBLANK & !Set0)) ;
```

```
        Acc      :=  ((Acc_H & Set0) # (VBLANK & !Set0)) ;
        Acc~     := !((Acc_H & Set0) # (VBLANK & !Set0)) ;

        "Set1 LOW: cleared at vertical intervals
        "--------------------------------------
        AccClr   :=  ((AccClr_H & Set1) # (VBLANK & !Set1)) ;
        AccClr~  := !((AccClr_H & Set1) # (VBLANK & !Set1)) ;


"test_vectors
end     RT4_GMPCTL
MODULE  RT4_OFSCTL
flag    '-r3'
TITLE   'RT4  - Output Frame Store Control PAL
                Jose Alvarez, Accom Inc.
                10/91
                Version A
'

OFSctl1 device 'P22V10';

"Input Signals
        CLK                     pin 1;
        ACT_V~                  pin 2;
        SW2_Z~                  pin 3;
        SW2_A_B                 pin 4;
        F_IN                    pin 6;
        RDena                   pin 7;  "OFSR
        WRena                   pin 8;  "OFSW
        RstRD                   pin 9;  "OFSRR
        RstWR                   pin 10; "OFSRW
        Mode0                   pin 11;
        Mode1                   pin 13;

"Output Signals
        F2_RDena                pin 23;
        F2_WRena                pin 22;
        F2_RstRD                pin 21;
        F2_RstWR                pin 20;
        F1_RDena                pin 19;
        F1_WRena                pin 18;
        F1_RstRD                pin 17;
        F1_RstWR                pin 16;
        SW2_B~                  pin 15;
        SW2_A~                  pin 14;


"Definitions
        True, False     = 1,0;
        High, Low       = 1,0;
        H,L,Q,X,Z       = 1,0,.C.,.X.,.Z.;

        WR1_RD2   = !Mode1 & !Mode0 ; "00
        WR2_RD1   = !Mode1 &  Mode0 ; "01
        READ1     =  Mode1 & !Mode0 ; "10
        READ2     =  Mode1 &  Mode0 ; "11


equations
                                               "SW2_Z~  = 0 ... Disables A/B
        SW2_A~   :=  SW2_A_B # !SW2_Z~ ;  "SW2_A/B = 0 ... Normal Input
        SW2_B~   := !SW2_A_B # !SW2_Z~ ;  "SW2_A/B = 1 ... Delayed Input

        "Enables require field-based processor control
        F1_RDena := WR2_RD1 # READ1 ;
        F1_WRena := WR1_RD2 ;


        F2_RDena := WR1_RD2 # READ2 ;
        F2_WRena := WR2_RD1 ;


        F1_RstRD := RstRD & RDena ; "Active for 1-H line
        F1_RstWR := RstWR & WRena ; "Active for 1-H line
```

```
        F2_RstRD := RstRD & RDena ;
        F2_RstWR := RstWR & WRena ;


"test_vectors



end     RT4_OFSCTL
module HCNTR10_ABZ   flag '-r3'

TITLE   'RT4 - Horizontal 10-bit Counter with reset PAL
                Jose R. Alvarez, Accom Inc.
                10/91
                Version A
'

HCtr10_ABZ device 'P22V10';


"Input signals

        CLK, EN525, ACT_H, ACT_V        pin 1, 2, 3, 4;

"Output signals
"
"   If we use a symmetrical arrangement such as:
"
"                           *       *
"       Q9,Q8,Q7,Q6,Q5,Q4,Q3,Q2,Q1,Q0     pin 18,19,17,20,16,21,15,22,14,23;
"
"   The bits indicated with * run out of terms in the 22V10.
"   For a delay of 728 pixels
"   For this reason, a different arrangement is used:
"
"
"       Q9,Q8,Q7,Q6,Q5,Q4,Q3,Q2,Q1,Q0     pin 18,19,17,20,15,21,16,23,14,22;


"   The design is made to accommodate this seemingly peculiar order
"   Therefore, another PAL is used to both clock and rearrange the data
"
"   If the delay is 858 pixels, then the following arrangement is
"   necessary:
"
"
"       Q9,Q8,Q7,Q6,Q5,Q4,Q3,Q2,Q1,Q0     pin 18,19,17,20,14,21,16,23,15,22;
"
"
"


        "Delay 866 pixels
        Q9,Q8,Q7,Q6,Q5,Q4,Q3,Q2,Q1,Q0   pin 18,19,17,20,16,21,14,23,15,22;



"Definitions

        True, False     = 1,0;
        High, Low       = 1,0;
        H,L,C,X,Z       = 1,0,.C.,.X.,.Z.;

        QOUT            = [Q9,Q8,Q7,Q6,Q5,Q4,Q3,Q2,Q1,Q0];

"       ~RESET           = (QOUT != 728);
"       ~RESET           = (QOUT != 858);
        ~RESET           = (QOUT != 866);

EQUATIONS

        Q0 := ~RESET & (Q0 $  1);
        Q1 := ~RESET & (Q1 $  Q0);
        Q2 := ~RESET & (Q2 $ (Q1 & Q0));
```

```
        Q3 := ~RESET & (Q3 $ (Q2 & Q1 & Q0));
        Q4 := ~RESET & (Q4 $ (Q3 & Q2 & Q1 & Q0));
        Q5 := ~RESET & (Q5 $ (Q4 & Q3 & Q2 & Q1 & Q0));
        Q6 := ~RESET & (Q6 $ (Q5 & Q4 & Q3 & Q2 & Q1 & Q0));
        Q7 := ~RESET & (Q7 $ (Q6 & Q5 & Q4 & Q3 & Q2 & Q1 & Q0));
        Q8 := ~RESET & (Q8 $ (Q7 & Q6 & Q5 & Q4 & Q3 & Q2 & Q1 & Q0));
        Q9 := ~RESET & (Q9 $ (Q8 & Q7 & Q6 & Q5 & Q4 & Q3 & Q2 & Q1 & Q0));

"TEST_VECTORS
"
"       ([CLK, ACT_H, ACT_V] -> QOUT])
"

end HCNTR10_ABZ

"*************************************************************************
"*************************************************************************
"*************************************************************************

module HDELAY_ABZ   flag '-r3'

TITLE   'RT4 - Horizontal 10-bit Counter with reset PAL
                Jose R. Alvarez, Accom Inc.
                10/91
                Version A
'

HDelay_ABZ device 'P22V10';

"Input signals:


        " For a delay of 728:
"       Q9,Q8,Q7,Q6,Q5,Q4,Q3,Q2,Q1,Q0     pin 7,6,8,5,10,4,9,2,11,3;

        " For a delay of 858:
"       Q9,Q8,Q7,Q6,Q5,Q4,Q3,Q2,Q1,Q0     pin 7,6,8,5,11,4,9,2,10,3;

        " For a delay of 866
        Q9,Q8,Q7,Q6,Q5,Q4,Q3,Q2,Q1,Q0   pin 7,6,8,5,9,4,11,2,10,3;


"Output signals:

        ABZHen                          pin 18;
        ABZHrst                         pin 19;

"Definitions

        True, False     = 1,0;
        High, Low       = 1,0;
        H,L,C,X,Z       = 1,0,.C.,.X.,.Z.;


        Hctr            = [Q9,Q8,Q7,Q6,Q5,Q4,Q3,Q2,Q1,Q0];


EQUATIONS
"       ABZHen  :=  (Hctr != 858);
        ABZHen  :=  !(Hctr < 866);

"       ABZHrst :=  (Hctr == 858);
"       ABZHrst :=  (Hctr == 858) # (Hctr == 429);
        ABZHrst :=  !(Hctr == 866) ;

end HDELAY_ABZ
module HCNTR10_F   flag '-r3'

TITLE   'RT4 - Horizontal 10-bit Counter with reset PAL
                Jose R. Alvarez, Accom Inc.
                10/91
                Version A
'
```

```
HCtr10_F device 'P22V10';


"Input signals

        CLK, EN525, ACT_H, ACT_V        pin 1, 2, 3, 4;

"Output signals
"
"   If we use a symmetrical arrangement such as:
"
"                             *       *
"       Q9,Q8,Q7,Q6,Q5,Q4,Q3,Q2,Q1,Q0    pin 18,19,17,20,16,21,15,22,14,23;
"
"   The bits indicated with * run out of terms in the 22V10.
"   For a delay of 728 pixels
"   For this reason, a different arrangement is used:
"
"
"       Q9,Q8,Q7,Q6,Q5,Q4,Q3,Q2,Q1,Q0    pin 18,19,17,20,15,21,16,23,14,22;
"

"   The design is made to accommodate this seemingly peculiar order
"   Therefore, another PAL is used to both clock and rearrange the data
"
"   If the delay is 858 pixels, then the following arrangement is
"   necessary:
"
"
"       Q9,Q8,Q7,Q6,Q5,Q4,Q3,Q2,Q1,Q0    pin 18,19,17,20,14,21,16,23,15,22;
"
"
"

        "Delay 866 pixels
        Q9,Q8,Q7,Q6,Q5,Q4,Q3,Q2,Q1,Q0   pin 18,19,17,20,16,21,14,23,15,22;


"Definitions

        True, False     = 1,0;
        High, Low       = 1,0;
        H,L,C,X,Z       = 1,0,.C.,.X.,.Z.;

        QOUT            = [Q9,Q8,Q7,Q6,Q5,Q4,Q3,Q2,Q1,Q0];

"       ~RESET           = (QOUT != 728);
"       ~RESET           = (QOUT != 858);
        ~RESET          = (QOUT != 866);


EQUATIONS
        Q0 := ~RESET & (Q0 $  1);
        Q1 := ~RESET & (Q1 $  Q0);
        Q2 := ~RESET & (Q2 $ (Q1 & Q0));
        Q3 := ~RESET & (Q3 $ (Q2 & Q1 & Q0));
        Q4 := ~RESET & (Q4 $ (Q3 & Q2 & Q1 & Q0));
        Q5 := ~RESET & (Q5 $ (Q4 & Q3 & Q2 & Q1 & Q0));
        Q6 := ~RESET & (Q6 $ (Q5 & Q4 & Q3 & Q2 & Q1 & Q0));
        Q7 := ~RESET & (Q7 $ (Q6 & Q5 & Q4 & Q3 & Q2 & Q1 & Q0));
        Q8 := ~RESET & (Q8 $ (Q7 & Q6 & Q5 & Q4 & Q3 & Q2 & Q1 & Q0));
        Q9 := ~RESET & (Q9 $ (Q8 & Q7 & Q6 & Q5 & Q4 & Q3 & Q2 & Q1 & Q0));

"TEST_VECTORS
"
"       ([CLK, ACT_H, ACT_V] -> QOUT])
"

end HCNTR10_F


"***************************************************************************
"***************************************************************************
"***************************************************************************
```

```
module HDELAY_FD   flag '-r3'

TITLE   'RT4 - Horizontal 10-bit Counter with reset PAL
                Jose R. Alvarez, Accom Inc.
                10/91
                Version A
'

HDelay_FD device 'P22V10';


"Input signals:


        " For a delay of 728:
"       Q9,Q8,Q7,Q6,Q5,Q4,Q3,Q2,Q1,Q0     pin 7,6,8,5,10,4,9,2,11,3;

        " For a delay of 858:
"       Q9,Q8,Q7,Q6,Q5,Q4,Q3,Q2,Q1,Q0     pin 7,6,8,5,11,4,9,2,10,3;

        " For a delay of 866
        Q9,Q8,Q7,Q6,Q5,Q4,Q3,Q2,Q1,Q0   pin 7,6,8,5,9,4,11,2,10,3;

"Output signals:

        FDHen                          pin 18;
        FDHrst                         pin 19;

"Definitions

        True, False     = 1,0;
        High, Low       = 1,0;
        H,L,C,X,Z       = 1,0,.C.,.X.,.Z.;


        Hctr            = [Q9,Q8,Q7,Q6,Q5,Q4,Q3,Q2,Q1,Q0];


EQUATIONS

"       FDHen   :=  (Hctr != 858);
        FDHen   :=  !(Hctr < 866);

"       FDHrst  :=  (Hctr == 858);
        FDHrst  :=  !(Hctr == 866);

end HDELAY_FD
MODULE  HFILTRND
flag    '-r3'
TITLE   'RT4 - Horizontal Motion Filter Rounding PAL
                Jose R. Alvarez, Accom Inc.
                10/91
                Version A
'

HFiltRnd device 'P22V10';
        CLK                                                                       pin
1;
        X10,X9,X8,X7,X6,X5,X4,X3,X2,X1,X0                pin 13,11,10,9,8,7,6,5,4,3,2;
        Y7,Y6,Y5,Y4,Y3,Y2,Y1,Y0                                 pin 18,19,17,20,16,21,15,22;
        OVFLW                                                                pin 14;

        True, False     = 1,0;
        High, Low       = 1,0;
        H,L,Q,X,Z       = 1,0,.C.,.X.,.Z.;

"       X is in two's complement binary form"
"   Binary point is between X1 and X0
        Xinput          = [X10, X9, X8, X7, X6, X5, X4, X3, X2, X1, X0];
        Youtput         =         [Y7, Y6, Y5, Y4, Y3, Y2, Y1, Y0];

"   -------------------------
"       Rounding from 11 to 8 bits
"       Binary point: X1
"       Binary sign : X10
"   -------------------------
```

```
        CB      = X0;

        Q0      = X1 $ CB;
        Q1      = X2 $ (X1 & CB);
        Q2      = X3 $ (X2 & X1 & CB);
        Q3      = X4 $ (X3 & X2 & X1 & CB);
        Q4      = X5 $ (X4 & X3 & X2 & X1 & CB);
        Q5      = X6 $ (X5 & X4 & X3 & X2 & X1 & CB);
        Q6      = X7 $ (X6 & X5 & X4 & X3 & X2 & X1 & CB);
        Q7      = X8 $ (X7 & X6 & X5 & X4 & X3 & X2 & X1 & CB);
        Q8      = X9 $ (X8 & X7 & X6 & X5 & X4 & X3 & X2 & X1 & CB);
        SGN             = X10 ;
        CLIP    = (Xinput > ^h1FE) & (SGN == L);

EQUATIONS

        Y0      := Q0 # CLIP;
        Y1      := Q1 # CLIP;
        Y2      := Q2 # CLIP;
        Y3      := Q3 # CLIP;
        Y4      := Q4 # CLIP;
        Y5      := Q5 # CLIP;
        Y6      := Q6 # CLIP;
        Y7      := Q7 # CLIP;
        OVFLW   := (X10 != X9);

"   -----------------------------------------------------------
"                            *              *             *
"       Xinput          = [X10, X9, X8, X7, X6, X5, X4, X3, X2, X1, X0];
"       Youtput         =         [Y7, Y6, Y5, Y4, Y3, Y2, Y1, Y0];
"                                          ^              ^
"   -----------------------------------------------------------

test_vectors
   ([CLK, Xinput] -> [Youtput, OVFLW])
        [ Q , ^h000 ] -> [^h00  ,   L  ];
        [ Q , ^h0FF ] -> [^h80  ,   L  ];
        [ Q , ^h0AB ] -> [^h56  ,   L  ];
        [ Q , ^h1AB ] -> [^hD6  ,   L  ];
        [ Q , ^h1FF ] -> [^hFF  ,   L  ];
        [ Q , ^h202 ] -> [^hFF  ,   H  ];
        [ Q , ^h2FF ] -> [^hFF  ,   H  ];

end     HFILTRND
```

What is claimed is:

1. A video real-time disk system which comprises a video storage and retrieval subsystem connected by a plurality of parallel data channels to a disk storage means having a like plurality of storage surfaces and a like plurality of interface circuits, with one of said like plurality of interface circuits being connected between one of said plurality of parallel data channels and one of said like plurality of storage surfaces, said video storage and retrieval subsystem further including means for smooth motion processing a group of video fields by creating additional fields between two original fields in the group of video fields, said means for smooth motion processing being connected to said video storage and retrieval subsystem, in which said means for smooth motion processing comprises a frame store having an input and an output connected to a multiplexer and to a subtracter, an output of said subtracter being connected to a mixer and to a rectifier, said rectifier having an output connected to a two-dimensional low pass filter, said two-dimensional low pass filter having an output connected to a means for performing a non-linear transfer function, said means for performing a non-linear transfer function having an output connected to said mixer, said mixer and said multiplexer having outputs connected to an adder, said adder having an output connected to a rounder, said rounder having an output connected to a variable delay.

2. The video real-time disk system of claim 1 in which said system is further configured to carry out motion-adaptive recursive noise reduction.

3. The video real-time disk system of claim 2 in which said system is configured to carry out the motion-adaptive recursive noise reduction by providing first and second amplifiers in said subtracter with resettable coefficients, a third amplifier with a resettable coefficient between said subtracter and said rectifier, a fourth amplifier with a resettable coefficient between said means for performing a non-linear transfer function and said mixer, said adder having an output connected to the input of said frame store, the output of said adder being connected to a rounder, said rounder having an output connected to a variable delay.

4. The video real-time disk system of claim 1 in which said system is further configured to carry out arithmetic averaging over any set of a plurality of frames.

5. The video real-time disk system of claim 4 in which said system is configured to carry out the arithmetic averaging by setting the resettable coefficient of the first amplifier to a reciprocal of the number of frames to be averaged, the resettable coefficients of said second amplifier to +1 and said fourth amplifier to +1 and the resettable coefficient of said third amplifier to zero.

6. The video real-time disk system of claim 1 in which said system is further configured to carry out integration over any set of a plurality of frames.

7. The video real-time disk system of claim 6 in which said system is configured to carry out the integration by setting the resettable coefficient of the first amplifier to +1, the resettable coefficients of said second amplifier to +1 and said fourth amplifier to +1 and the resettable coefficient of said third amplifier to zero.

8. In a video storage and processing system, the improvement comprising means for motion-adaptive smooth motion processing a group of video fields received by said processing system by creating a plurality of additional fields between two original fields in the group of video fields by a combination of motion adaptive interpolation and frame repetition in which said means for smooth motion processing comprises a frame store having an input and an output connected to a multiplexer and to a subtracter, an output of said subtracter being connected to a mixer and to a rectifier, said rectifier having an output connected to a two-dimensional low pass filter, said two-dimensional low pass filter having an output connected to a means for performing a non-linear transfer function, said means for performing a non-linear transfer function having an output connected to said mixer, said mixer and said multiplexer having outputs connected to an adder, said adder having an output connected to a rounder, said rounder having an output connected to a variable delay.

9. In a video storage and processing system, the improvement comprising means for motion-adaptive smooth motion processing a group of video fields received by said processing system by creating a plurality of additional fields between two original fields in the group of video fields by a combination of motion adaptive interpolation and frame repetition, in which said means for smooth motion processing comprises a frame store having an input and an output connected to a multiplexer and to a subtracter, an output of said subtracter being connected to a mixer and to a rectifier, said rectifier having an output connected to a two-dimensional low pass filter, said two-dimensional low pass filter having an output connected to a means for performing a non-linear transfer function, said means for performing a non-linear transfer function having an output connected to said mixer, said mixer and said multiplexer having outputs connected to an adder, said adder having an output connected to a rounder, said rounder having an output connected to a variable delay, said system being configured to carry out motion-adaptive recursive noise reduction by providing first and second amplifiers in said subtracter with resettable coefficients, a third amplifier with a resettable coefficient between said subtracter and said rectifier, a fourth amplifier with a resettable coefficient between said means for performing a non-linear transfer function and said mixer, an output of said adder being connected to the input of said frame store.

10. In a video storage and processing system, the improvement comprising means for motion-adaptive smooth motion processing a group of video fields received by said processing system by creating a plurality of additional fields between two original fields in the group of video fields by a combination of motion adaptive interpolation and frame repetition, said system including first, second, third and fourth amplifiers configured to carry out arithmetic averaging over any set of a plurality of frames by setting a resettable coefficient of the first amplifier to a reciprocal of the number of frames to be averaged, and by setting resettable coefficients of said second amplifier to +1 and said fourth amplifier to +1 and a resettable coefficient of said third amplifier to zero.

11. In a video storage and processing system, the improvement comprising means for motion-adaptive smooth motion processing a group of video fields received by said processing system by creating a plurality of additional fields between two original fields in the group of video fields by a combination of motion adaptive interpolation and frame repetition in which said system further includes first, second, third and fourth amplifiers and is configured to carry out integration over any set of a plurality of frames by setting a resettable coefficient of the first amplifier to +1, a resettable coefficient of said second amplifier to +1, a resettable coefficient of said fourth amplifier to +1, a resettable coefficient of said third amplifier to zero.

* * * * *